(12) United States Patent
Hoffman et al.

(10) Patent No.: US 7,120,596 B2
(45) Date of Patent: Oct. 10, 2006

(54) SYSTEM, METHOD AND COMPUTER PROGRAM PRODUCT FOR LANDED COST REPORTING IN A SUPPLY CHAIN MANAGEMENT FRAMEWORK

(75) Inventors: George Harry Hoffman, Miami, FL (US); Michael James Burk, Miramar, FL (US); Anthony Frank Menninger, Miami, FL (US)

(73) Assignee: Restaurant Services, Inc., Coral Gables, FL (US)

( * ) Notice: Subject to any disclaimer, the term of this patent is extended or adjusted under 35 U.S.C. 154(b) by 1333 days.

(21) Appl. No.: 09/816,491

(22) Filed: Mar. 23, 2001

(65) Prior Publication Data

US 2003/0069859 A1 Apr. 10, 2003

(51) Int. Cl.
*G06F 17/60* (2006.01)

(52) U.S. Cl. ............... 705/28; 705/7; 705/9; 705/34; 705/26

(58) Field of Classification Search ............ 705/7, 705/8, 9, 10, 1, 28, 700, 80, 29, 34, 26
See application file for complete search history.

(56) References Cited

U.S. PATENT DOCUMENTS

| | | | |
|---|---|---|---|
| 4,713,761 A | 12/1987 | Sharpe et al. | |
| 4,799,156 A | 1/1989 | Shavit et al. | |
| 5,204,821 A | 4/1993 | Inui et al. | |
| 5,305,199 A | 4/1994 | LoBiondo et al. | |
| 5,490,060 A | 2/1996 | Malec et al. | |
| 5,638,519 A | 6/1997 | Haluska | |
| 5,687,322 A | 11/1997 | Deaton et al. | 395/214 |
| 5,712,989 A | 1/1998 | Johnson et al. | |
| 5,758,329 A | 5/1998 | Wojcik et al. | |
| 5,765,143 A | 6/1998 | Sheldon et al. | 705/28 |
| 5,771,172 A | 6/1998 | Yamamoto et al. | 364/468.13 |
| 5,774,868 A | 6/1998 | Cragun et al. | 705/10 |
| 5,802,502 A | 9/1998 | Gell et al. | |
| 5,854,746 A | 12/1998 | Yamamoto et al. | |
| 5,884,300 A | 3/1999 | Brockman | 707/2 |
| 5,893,076 A | 4/1999 | Hafner et al. | |
| 5,898,765 A | 4/1999 | Teglovic et al. | |
| 5,914,878 A | 6/1999 | Yamamoto et al. | 364/468.13 |
| 5,946,662 A | 8/1999 | Ettl et al. | |
| 5,950,173 A | 9/1999 | Perkowski | |
| 5,953,707 A | 9/1999 | Huang et al. | 705/10 |
| 5,963,919 A | 10/1999 | Brinkley et al. | 705/28 |

(Continued)

FOREIGN PATENT DOCUMENTS

JP 2002236730 A 8/2002

(Continued)

OTHER PUBLICATIONS www.zdnet.com/ecommerce/stories/main/0,10475,2601706,00.html—"Supply chain gets cold cuts".

(Continued)

*Primary Examiner*—F. Zeender
(74) *Attorney, Agent, or Firm*—Foley & Lardner LLP

(57) ABSTRACT

A system, method and computer program product are disclosed for cost reporting using a network-based supply chain management framework. Data is received utilizing a network. This data relates to goods required by a plurality of stores including a product identifier parameter, and a first cost parameter. A second cost parameter associated with a franchise mark-up is also received so that a total cost can be calculated based on the first cost parameter and the second cost parameter. The total cost is displayed utilizing the network with TCP/IP protocol.

42 Claims, 195 Drawing Sheets

U.S. PATENT DOCUMENTS

| | | | |
|---|---|---|---|
| 5,970,469 A | 10/1999 | Scroggie et al. | |
| 5,970,475 A | 10/1999 | Barnes et al. | |
| 5,974,395 A | 10/1999 | Bellini et al. | 705/9 |
| 5,983,198 A | 11/1999 | Mowery et al. | 705/22 |
| 6,009,407 A | 12/1999 | Garg | |
| 6,032,125 A | 2/2000 | Ando | |
| 6,058,375 A | 5/2000 | Park | |
| 6,061,691 A | 5/2000 | Fox | |
| 6,064,981 A | 5/2000 | Barni et al. | |
| 6,078,900 A | 6/2000 | Ettl et al. | |
| 6,084,528 A | 7/2000 | Beach et al. | |
| 6,115,690 A | 9/2000 | Wong | 705/7 |
| 6,134,557 A | 10/2000 | Freeman | |
| 6,138,106 A | 10/2000 | Walker et al. | |
| 6,141,653 A | 10/2000 | Conklin et al. | |
| 6,148,291 A | 11/2000 | Radican | |
| 6,151,582 A | 11/2000 | Huang et al. | 705/8 |
| 6,157,915 A | 12/2000 | Bhaskaran et al. | |
| 6,167,378 A | 12/2000 | Webber, Jr. | |
| 6,167,380 A | 12/2000 | Kennedy et al. | 705/10 |
| 6,219,653 B1 | 4/2001 | O'Neill et al. | |
| 6,222,533 B1 | 4/2001 | Notani et al. | |
| 6,260,024 B1 | 7/2001 | Shkedy | |
| 6,263,317 B1 | 7/2001 | Sharp et al. | |
| 6,266,652 B1 | 7/2001 | Godin et al. | |
| 6,324,522 B1 | 11/2001 | Peterson et al. | |
| 6,338,050 B1 | 1/2002 | Conklin et al. | |
| 6,341,271 B1 | 1/2002 | Salvo et al. | |
| 6,366,890 B1 | 4/2002 | Usrey | |
| 6,393,408 B1 | 5/2002 | Mosher et al. | |
| 6,418,416 B1 | 7/2002 | Rosenberg et al. | |
| 6,477,513 B1 | 11/2002 | Walker et al. | |
| 6,486,899 B1 | 11/2002 | Bush, Jr. | |
| 6,542,905 B1 | 4/2003 | Fogel et al. | |
| 6,564,226 B1 | 5/2003 | Dickson et al. | |
| 6,587,827 B1 | 7/2003 | Hennig et al. | |
| 6,609,101 B1 | 8/2003 | Landvater | |
| 6,622,056 B1 | 9/2003 | Lindell | |
| 6,643,624 B1 | 11/2003 | Philippe et al. | |
| 6,697,702 B1 | 2/2004 | Hahn-Carlson | |
| 6,725,454 B1 | 4/2004 | Nagel et al. | |
| 6,836,750 B1 | 12/2004 | Wong et al. | |
| 2001/0020230 A1 | 9/2001 | Kaneko et al. | |
| 2001/0032126 A1 | 10/2001 | Macartney-Filgate et al. | |
| 2002/0007324 A1 | 1/2002 | Centner et al. | |
| 2002/0016760 A1 | 2/2002 | Sanjesh | |
| 2002/0019759 A1 | 2/2002 | Arunapuram et al. | |
| 2002/0019761 A1 | 2/2002 | Lidow | |
| 2002/0034673 A1 | 3/2002 | Bisaka et al. | |
| 2002/0049649 A1 | 4/2002 | Kubota | |
| 2002/0069028 A1 | 6/2002 | Merz et al. | |
| 2002/0069096 A1 | 6/2002 | Lindoerfer et al. | |
| 2002/0087371 A1 | 7/2002 | Abendroth | |
| 2002/0099598 A1 | 7/2002 | Eicher, Jr. et al. | |
| 2002/0107761 A1 | 8/2002 | Kark et al. | |
| 2002/0123945 A1 | 9/2002 | Booth et al. | |
| 2002/0128946 A1 | 9/2002 | Chehade et al. | |
| 2002/0143669 A1 | 10/2002 | Scheer | |
| 2002/0143692 A1 | 10/2002 | Helmermann et al. | |
| 2002/0147622 A1 | 10/2002 | Drolet et al. | |
| 2002/0165806 A1 | 11/2002 | Kataria et al. | |
| 2002/0169657 A1 | 11/2002 | Singh et al. | |
| 2002/0169658 A1 | 11/2002 | Adler et al. | |
| 2002/0188499 A1 | 12/2002 | Jenkins et al. | |
| 2002/0194043 A1 | 12/2002 | Lidow | |
| 2002/0194057 A1 | 12/2002 | Lidow | |
| 2002/0198759 A1 | 12/2002 | Gilday et al. | |
| 2002/0198808 A1 | 12/2002 | Myers | |
| 2003/0009392 A1 | 1/2003 | Perkowski | |
| 2003/0033192 A1 | 2/2003 | Zyman et al. | |
| 2003/0195791 A1 | 10/2003 | Waller et al. | |
| 2003/0208390 A1 | 11/2003 | Posner | |
| 2003/0208434 A1 | 11/2003 | Posner | |
| 2003/0212610 A1 | 11/2003 | Duffy et al. | |
| 2004/0010463 A1 | 1/2004 | Hahn-Carlson et al. | |

FOREIGN PATENT DOCUMENTS

| | | |
|---|---|---|
| WO | 99/67729 | 12/1999 |
| WO | 00/51038 | 8/2000 |

OTHER PUBLICATIONS http://www.foodlogistics.com/archives/jul00/jul00-coverstory.html—"Cover Story: Supply Chain Management Quaterly Efficient Foodservice Response Moving Towards Efficiency".

http://www.localbusiness.com/Story/Print/0,1197,NOCITY_55953,00.html "MindFlow: Purchasing Savvy".

http://freespace.virgin.net/heathcote.echain/white_paper_4.htm "e-Chain Solutions Limited, White Paper 4—Efficient Foodservice Response (EFR)".

http://www.startmag.com/v3n9/v3n9p060.asp "Start—Nov. 1999, v3n9 The Virtual Supply Chain".

http://www.p21.com/acclaim/supply-chain.html "Supply Chain Management".

http://www.sap.com/press/fs_scm.htm "mySAP.com™ Supply Chain Management".

http://www.foodlogistics.com/esupply/esupply/section3.html "An E-Powered Supply Chain".

http://www.supplychainbrain.com/news/ "Supply Chain Brain Quick Read Newsletter Feb. 21, 2001".

Noori, Hamid; Production amd Operations Management; Total Quality Responsiveness; McGraw-Hill; 1995; pp. 422-519.

Noori, Hamid; Production and Operations Management; Total Quality Responsiveness; McGraw-Hill; 1995; pp. 592-601.

PR Newswire; Andersen Consulting Announce Strategic Alliance, Looksmart, Sep. 6, 2000.

Stephanie Stahl, "A Whopping Inventory Task—Burger King's purchasing agency lures suppliers online to streamline its huge distribution system", INFORMATIONWEEK, 1994.

John Rendleman, "Burger King Orders AT&T Mail Service", CommunicationsWeek, 1994.

Microsoft Computer Dictionary, 4th Edition, Microsoft Press, 1999, pp. 167, 242, 334, 421, 443, 444 and 462.

Microsoft Press Computer Dictionary; 3rd Edition; 1997; Microsoft Press; pp. 355 and 463.

Merriam Webster's Collegiate Dictionary; 10th Edition; 1996; p. 139.

Troyer, Charles; The Role of Bar Codes in Food Safety; Food Distributors International; May 2000, entire document.

Common identification Standards; GCI; Global Scorecard.net-Guide to ECT concepts.

Information on Deal Time International, 1998-2002.

Information on Circuit City Stores, Inc., 1996-2002.

"Deal Time.com Spiders Web for Bargains", Mary Hillebrand, Jun. 30, 1999, E-Commerce Times.

Microsoft Press Computer Dictionary 3rd Edition; 1997; Microsoft Press; p. 258.

e-Commerce Solutions for Supply Chain Management: A Comparative Review; Jan. 2001; Lau, Jason.

O'Sullivan R.C., A New Breed of Benchmarking, Association Management, Feb. 2000, vol. 52, No. 2, pp. 69-74 (DIALOG: File 15).

Swartz, Nikki, TSI's Formula for Success, Apparel Industry Magazine, Dec. 1997, vol. 58, No. 12, pp. AS6-AS10 (DIALOG: File 15).

Baldwin, Graeme, Effects of Facilities on Hong Kong Supermarkets, Jan./Feb. 1999, vol. 17, No. 1 / 2, p. 54 (DIALOG, File 15).

U.S. Appl. No. 09/815,463, filed Mar. 23, 2001.
U.S. Appl. No. 09/815,489, filed Mar. 23, 2001.
U.S. Appl. No. 09/815,490, filed Mar. 23, 2001.
U.S. Appl. No. 09/815,515, filed Mar. 23, 2001.
U.S. Appl. No. 09/815,559, filed Mar. 23, 2001.
U.S. Appl. No. 09/815,580, filed Mar. 23, 2001.
U.S. Appl. No. 09/815,590, filed Mar. 23, 2001.
U.S. Appl. No. 09/815,598, filed Mar. 23, 2001.

U.S. Appl. No. 09/815,606, filed Mar. 23, 2001.
U.S. Appl. No. 09/815,660, filed Mar. 23, 2001.
U.S. Appl. No. 09/815,668, filed Mar. 23, 2001.
U.S. Appl. No. 09/815,688, filed Mar. 23, 2001.
U.S. Appl. No. 09/815,715, filed Mar. 23, 2001.
U.S. Appl. No. 09/815,725, filed Mar. 23, 2001.
U.S. Appl. No. 09/815,727, filed Mar. 23, 2001.
U.S. Appl. No. 09/815,729, filed Mar. 23, 2001.
U.S. Appl. No. 09/815,731, filed Mar. 23, 2001.
U.S. Appl. No. 09/815,734, filed Mar. 23, 2001.
U.S. Appl. No. 09/815,759, filed Mar. 23, 2001.
U.S. Appl. No. 09/815,777, filed Mar. 23, 2001.
U.S. Appl. No. 09/815,792, filed Mar. 23, 2001.
U.S. Appl. No. 09/815,813, filed Mar. 23, 2001.
U.S. Appl. No. 09/815,830, filed Mar. 23, 2001.
U.S. Appl. No. 09/815,845, filed Mar. 23, 2001.
U.S. Appl. No. 09/815,864, filed Mar. 23, 2001.
U.S. Appl. No. 09/815,893, filed Mar. 23, 2001.
U.S. Appl. No. 09/815,894, filed Mar. 23, 2001.
U.S. Appl. No. 09/815,897, filed Mar. 23, 2001.
U.S. Appl. No. 09/815,899, filed Mar. 23, 2001.
U.S. Appl. No. 09/815,973, filed Mar. 23, 2001.
U.S. Appl. No. 09/815,989, filed Mar. 23, 2001.
U.S. Appl. No. 09/816,021, filed Mar. 23, 2001.
U.S. Appl. No. 09/816,033, filed Mar. 23, 2001.
U.S. Appl. No. 09/816,048, filed Mar. 23, 2001.
U.S. Appl. No. 09/816,069, filed Mar. 23, 2001.
U.S. Appl. No. 09/816,075, filed Mar. 23, 2001.
U.S. Appl. No. 09/816,083, filed Mar. 23, 2001.
U.S. Appl. No. 09/816,092, filed Mar. 23, 2001.
U.S. Appl. No. 09/816,101, filed Mar. 23, 2001.
U.S. Appl. No. 09/816,121, filed Mar. 23, 2001.
U.S. Appl. No. 09/816,151, filed Mar. 23, 2001.
U.S. Appl. No. 09/816,160, filed Mar. 23, 2001.
U.S. Appl. No. 09/816,167, filed Mar. 23, 2001.
U.S. Appl. No. 09/816,187, filed Mar. 23, 2001.
U.S. Appl. No. 09/816,203, filed Mar. 23, 2001.
U.S. Appl. No. 09/816,212, filed Mar. 23, 2001.
U.S. Appl. No. 09/816,231, filed Mar. 23, 2001.
U.S. Appl. No. 09/816,249, filed Mar. 23, 2001.
U.S. Appl. No. 09/816,268, filed Mar. 23, 2001.
U.S. Appl. No. 09/816,269, filed Mar. 23, 2001.
U.S. Appl. No. 09/816,285, filed Mar. 23, 2001.
U.S. Appl. No. 09/816,296, filed Mar. 23, 2001.
U.S. Appl. No. 09/816,314, filed Mar. 23, 2001.
U.S. Appl. No. 09/816,331, filed Mar. 23, 2001.
U.S. Appl. No. 09/816,349, filed Mar. 23, 2001.
U.S. Appl. No. 09/816,357, filed Mar. 23, 2001.
U.S. Appl. No. 09/816,358, filed Mar. 23, 2001.
U.S. Appl. No. 09/816,388, filed Mar. 23, 2001.
U.S. Appl. No. 09/816,412, filed Mar. 23, 2001.
U.S. Appl. No. 09/816,413, filed Mar. 23, 2001.
U.S. Appl. No. 09/816,414, filed Mar. 23, 2001.
U.S. Appl. No. 09/816,420, filed Mar. 23, 2001.
U.S. Appl. No. 09/816,421, filed Mar. 23, 2001.
U.S. Appl. No. 09/816,422, filed Mar. 23, 2001.
U.S. Appl. No. 09/816,424, filed Mar. 23, 2001.
U.S. Appl. No. 09/816,426, filed Mar. 23, 2001.
U.S. Appl. No. 09/816,427, filed Mar. 23, 2001.
U.S. Appl. No. 09/816,428, filed Mar. 23, 2001.
U.S. Appl. No. 09/816,429, filed Mar. 23, 2001.
U.S. Appl. No. 09/816,430, filed Mar. 23, 2001.
U.S. Appl. No. 09/816,431, filed Mar. 23, 2001.
U.S. Appl. No. 09/816,434, filed Mar. 23, 2001.
U.S. Appl. No. 09/816,454, filed Mar. 23, 2001.
U.S. Appl. No. 09/816,455, filed Mar. 23, 2001.
U.S. Appl. No. 09/816,471, filed Mar. 23, 2001.
U.S. Appl. No. 09/816,488, filed Mar. 23, 2001.
U.S. Appl. No. 09/816,495, filed Mar. 23, 2001.
U.S. Appl. No. 09/816,503, filed Mar. 23, 2001.
U.S. Appl. No. 09/816,507, filed Mar. 23, 2001.
U.S. Appl. No. 09/816,536, filed Mar. 23, 2001.
U.S. Appl. No. 09/816,537, filed Mar. 23, 2001.
U.S. Appl. No. 09/816,543, filed Mar. 23, 2001.
U.S. Appl. No. 09/816,553, filed Mar. 23, 2001.
U.S. Appl. No. 09/816,555, filed Mar. 23, 2001.
U.S. Appl. No. 09/816,560, filed Mar. 23, 2001.
U.S. Appl. No. 09/816,561, filed Mar. 23, 2001.
U.S. Appl. No. 09/816,564, filed Mar. 23, 2001.
U.S. Appl. No. 09/816,565, filed Mar. 23, 2001.
U.S. Appl. No. 09/816,567, filed Mar. 23, 2001.
U.S. Appl. No. 09/816,576, filed Mar. 23, 2001.
U.S. Appl. No. 09/816,582, filed Mar. 23, 2001.
U.S. Appl. No. 09/816,881, filed Mar. 23, 2001.
U.S. Appl. No. 09/816,896, filed Mar. 23, 2001.
U.S. Appl. No. 09/816,922, filed Mar. 23, 2001.
U.S. Appl. No. 09/816,944, filed Mar. 23, 2001.
U.S. Appl. No. 09/816,976, filed Mar. 23, 2001.
U.S. Appl. No. 09/834,465, filed Apr. 13, 2001.
U.S. Appl. No. 09/834,600, filed Apr. 13, 2001.
U.S. Appl. No. 09/834,838, filed Apr. 13, 2001.
U.S. Appl. No. 09/834,924, filed Apr. 13, 2001.

FIG. 26

SALES FORECAST WORKSHEET - SYSTEM

| WEEK | Q1 | Q2 | HISTORY | | | | | | | FORECAST | | | | | | Q3 | Q4 |
|---|---|---|---|---|---|---|---|---|---|---|---|---|---|---|---|---|---|
| | | | W-6 | W-5 | W-4 | W-3 | W-2 | W-1 | W+1 | W+2 | W+3 | W+4 | W+5 | W+6 | | | |
| GRP's | | | | | | | | | | | | | | | | | |
| NTN'L MARKETING THEME | | | | | | | | | | | | | | | | | |
| ADVERTISING SCORE | | | | | | | | | | | | | | | | | |
| LOCAL CONSIDERATIONS | | | | | | | | | | | | | | | | | |
| COMPETITION INDEX | | | | | | | | | | | | | | | | | |
| WEATHER INDEX | | | | | | | | | | | | | | | | | |
| SEASONALITY INDEX | | | | | | | | | | | | | | | | | |
| SALES HISTORY/FORECAST TOTAL ($/STORE) | | | | | | | | | | | | | | | | | |
| KEY PRODUCTS BY MENU ITEM (UNITS/DAY/STORE) | | | | | | | | | | | | | | | | | |
| WHOPPERS | 437 | 327 | 203 | 207 | 193 | 234 | 297 | 282 | 300 | 344 | 358 | 394 | 413 | 409 | 284 | 327 |
| WHOPPERS W/CHEESE | 208 | 172 | 143 | 140 | 135 | 155 | 196 | 172 | 163 | 172 | 179 | 196 | 206 | 204 | 143 | 164 |
| YWM WHOPPERS | 805 | 723 | 701 | 692 | 623 | 760 | 921 | 829 | 900 | 943 | 829 | 912 | 958 | 948 | 707 | 813 |
| etc... | | | | | | | | | | | | | | | | | |
| KEY PRODUCTS BY INVENTORY ITEM (CASES/DAY/STORE) | | | | | | | | | | | | | | | | | |
| BEEF - WHOPPER 4.0 oz | 10.1 | 8.5 | 7.3 | 7.2 | 6.6 | 8.0 | 9.8 | 8.9 | 9.5 | 10.1 | 9.5 | 10.4 | 11.0 | 10.8 | 7.9 | 9.1 |
| CHEESE - AMERICAN SLICED | 0.3 | 0.2 | 0.2 | 0.2 | 0.2 | 0.2 | 0.3 | 0.2 | 0.2 | 0.2 | 0.2 | 0.3 | 0.3 | 0.3 | 0.2 | 0.2 |
| MAYO - BULK | 2.8 | 2.4 | 2.0 | 2.0 | 1.9 | 2.2 | 2.8 | 2.5 | 2.7 | 2.8 | 2.7 | 2.9 | 3.1 | 3.0 | 2.2 | 2.5 |
| PICKLES - PAIL | 1.8 | 1.5 | 1.3 | 1.3 | 1.2 | 1.4 | 1.7 | 1.6 | 1.7 | 1.8 | 1.7 | 1.8 | 1.9 | 1.9 | 1.4 | 1.6 |
| WRAP WHOPPER | 0.4 | 0.3 | 0.3 | 0.3 | 0.3 | 0.3 | 0.4 | 0.3 | 0.3 | 0.4 | 0.3 | 0.4 | 0.4 | 0.4 | 0.3 | 0.3 |
| KETCHUP - BULK | 1.9 | 1.6 | 1.4 | 1.4 | 1.2 | 1.5 | 1.8 | 1.7 | 1.8 | 1.9 | 1.8 | 2.0 | 2.1 | 2.0 | 1.5 | 1.7 |
| BUN - WHOPPER 5" (DOZEN) | 120.8 | 101.8 | 87.3 | 86.6 | 79.3 | 95.8 | 117.8 | 106.9 | 113.6 | 121.6 | 113.8 | 125.2 | 131.4 | 130.1 | 94.5 | 108.7 |
| LETTUCE - SHREDDED | 3.4 | 2.9 | 2.5 | 2.4 | 2.2 | 2.7 | 3.3 | 3.0 | 3.2 | 3.4 | 3.2 | 3.5 | 3.7 | 3.7 | 2.7 | 3.1 |
| TOMATOES | 4.5 | 3.8 | 3.3 | 3.2 | 3.0 | 3.6 | 4.4 | 4.0 | 4.3 | 4.6 | 4.3 | 4.7 | 4.9 | 4.9 | 3.5 | 4.1 |
| ONIONS - SLICED | 4.5 | 3.8 | 3.3 | 3.2 | 3.0 | 3.6 | 4.4 | 4.0 | 4.3 | 4.6 | 4.3 | 4.7 | 4.9 | 4.9 | 3.5 | 4.1 |
| etc... | | | | | | | | | | | | | | | | | |

2600, 2602, 2604

| | PROMOTIONAL MONITOR - SYSTEM & REGIONAL | | | | | | | | | | | |
|---|---|---|---|---|---|---|---|---|---|---|---|---|
| | HISTORY | | | | WEEK #1 | | | | | | | |
| | W-4 | W-3 | W-2 | W-1 | D+1 | D+2 | D+3 | D+4 | D+5 | D+6 | D+7 | TOTAL |
| TOTAL SALES ($/STORE) | $23,000 | $23,500 | $23,250 | $23,450 | $2,888 | $3,150 | $3,413 | $3,413 | $3,675 | $5,513 | $4,200 | $26,250 |
| MENU ITEM SALES FOR KEY PRODUCTS (UNITS/RESTAURANT/WEEK) | | | | | | | | | | | | |
| CATEGORY  SEGMENT | | | | | | | | | | | | |
| WHOPPER  WHOPPERS | 215 | 211 | 228 | 269 | 32 | 34 | 37 | 37 | 40 | 60 | 46 | 286 |
| WHOPPERS W/CHEESE | 146 | 142 | 148 | 162 | 18 | 20 | 21 | 21 | 23 | 35 | 26 | 165 |
| YWVM WHOPPERS | 699 | 679 | 714 | 813 | 94 | 103 | 111 | 111 | 120 | 180 | 137 | 857 |
| WHOPPER TOTAL | 1,060 | 1,032 | 1,090 | 1,244 | 144 | 157 | 170 | 170 | 183 | 275 | 209 | 1,309 |
| VARIANCE FROM EXPECTED (HIGHLIGHTED AREAS ARE OUTSIDE OF EXPECTED RANGE) | | | | | | | | | | | | |
| WHOPPER  WHOPPERS | 11.4% | -9.8% | -23.2% | -4.6% | 2.3% | 3.0% | 1.0% | 4.0% | 11.0% | 16.0% | 8.0% | 6.5% |
| WHOPPERS W/CHEESE | 8.1% | -8.4% | -24.5% | -5.8% | 1.0% | 4.0% | 1.0% | 4.0% | 13.0% | 14.0% | 9.0% | 6.6% |
| YWVM WHOPPERS | 12.2% | -10.7% | -22.5% | -1.9% | 3.0% | 3.0% | 1.0% | 5.0% | 16.0% | 9.0% | 7.0% | 7.7% |
| WHOPPER TOTAL | 10.6% | -9.6% | -23.4% | -4.1% | 2.1% | 3.3% | 1.0% | 4.3% | 13.3% | 16.3% | 8.0% | 6.9% |

DISTRIBUTION CENTER: ALLIANT TOPEKA

TIME PERIOD (MONTH/YR): JUN-00

DELIVERY ORDER FILL RATE

TOTAL CASES ORDERED: 65712

| OPERATIONS: | WAREHOUSE OUTS | DAMAGES | MISPICKS | SHORT ON TRUCK | OVERLOOKED AND NOT RETURNED | TOTAL OPERATIONS |
|---|---|---|---|---|---|---|
| CASES: | 154 | 68 | 62 | 284 | 0 | 568 |
| PERCENT: | 0.23% | 0.10% | 0.09% | 0.43% | 0.00% | 0.86% |

| PURCHASING: | OUT OF STOCKS | SUBSTITUTIONS | OUT OF CODE | TOTAL PURCHASING |
|---|---|---|---|---|
| CASES: | 990 | 70 | 0 | 1060 |
| PERCENT: | 1.51% | 0.11% | 0.00% | 1.61% |

| DISTRIBUTION CENTER TOTAL: | CASES | PERCENT |
|---|---|---|
| OPERATIONS: | 568 | 0.86% |
| PURCHASING: | 1060 | 1.61% |
| GRAND TOTAL: | 1628 | 2.48% |

DELIVERY ORDER FILL RATE: 97.52%

ON-TIME DELIVERY RATE

| TOTAL # OF DELIVERIES: | 1232 |
|---|---|
| # OF ON-TIME DELIVERIES: | 0 |
| ON-TIME DELIVERY RATE: | 0.00% |

PERFECT ORDER RATE

| TOTAL # OF DELIVERIES: | 1232 |
|---|---|
| TOTAL # OF PERFECT ORDERS: | 725 |
| PERFECT ORDER RATE: | 58.85% |

| | FILL RATE | ON-TIME | PERFECT ORDER |
|---|---|---|---|
| ALLIANT-PADUCAH | 99.14% | 90.06% | |
| ALLIANT-TOPEKA | | | |
| ALLIANT WIXOM | 99.05% | 98.71% | |
| KING-ATLANTA | 99.34% | 92.91% | 78.70% |
| KING-JACKSONVILLE | 99.65% | 96.56% | 80.90% |
| KING-LOUISVILLE | 99.78% | 94.53% | 86.98% |
| MAINES 29, CONKLIN | 99.41% | | 79.25% |
| MAINES 30, CLEVELAND | | | |
| MAINES LONG ISLAND | 99.41% | | |
| MAINES NEW ENGLAND | 99.68% | | 79.83% |
| MBM FULLERTON | 99.13% | 94.15% | #DIV/0! |
| MBM LEWISVILLE | 99.51% | 92.88% | #DIV/0! |
| MBM ORLANDO | 99.76% | 93.60% | #DIV/0! |
| MBM ROCKY MOUNT | 99.13% | 92.46% | #DIV/0! |
| MCCABE'S | 99.80% | 99.72% | 96.84% |
| MCLANE LUBBOCK | #DIV/0! | #DIV/0! | #DIV/0! |
| NICHOLAS & CO. | 99.60% | 96.04% | 85.37% |
| PFD SUPPLY | 99.16% | 90.79% | 80.12% |
| PFG VICTORIA | 99.42% | #DIV/0! | |
| PYA/MONARCH | 99.20% | 97.79% | |
| REINHART-CEDAR RAPIDS | 99.05% | 98.65% | |
| REINHART-OAK CREEK | 99.31% | 93.69% | |
| REINHART-ROGERS | 99.50% | 95.49% | |
| RESTAURANTS NW | 99.03% | 99.07% | 80.47% |
| SHAMROCK COMMERCE CITY | 99.54% | 94.88% | 85.13% |
| SHAMROCK PHOENIX | 98.81% | 93.88% | |
| SYGMA HARRISBURG | 99.69% | | 82.88% |
| SYGMA STOCKTON | 99.69% | | |
| SYSCO | 99.68% | 100.00% | 82.47% |

| | FILL RATE | ON-TIME | PERFECT ORDER |
|---|---|---|---|
| BKC MIN | 98.50% | 90.00% | 78.00% |
| RSI MIN | 99.50% | 90.00% | 80.00% |

| | |
|---|---|
| | OK |
| | DIDN'T MEET RSI MIN. |
| | DIDN'T MEET BK MIN. |

FIG. 32

3500 

| | MONTHLY TOTAL OVERCHARGE | PERFECT ORDER PERCENTAGE | MONTHLY CARRYING % INVOICE FOB |
|---|---|---|---|
| GOODIES | $1,904 | | 2.33% |
| COMARK INSTRUMENTS, INC. | $4,861 | | |
| WHITEFORD FOODS, INC. | $0 | 97.3% | 2.41% |
| LEPAGE BAKERY / COUNTRY KITCHE | $3,700 | | |
| NCR-SYSTEMEDIA | $0 | 92.1% | 2.16% |
| SIGNATURE MEATS GROUP | $0 | | 1.94% |
| SCHWEBEL'S BAKING CO | $0 | 95.1% | 1.50% |
| MAUI CUP | $0 | | |
| MIRA PLASTICS | $0 | | 1.25% |
| DIXIE PRODUCE & PACKAGING | | | |
| NOR-LAKE, INC. | | | |
| FORT JAMES OPERATING COMPANY | $0 | | 1.46% |
| FRESH ADVANTAGE, KC | $0 | 98.6% | 1.90% |
| SILVER KING - MN - CORP | | | |
| TYSON FOODS | $0 | | |
| READY ACCESS | | | |
| GEORGIA PACIFIC TISSUE | | | 2.44% |
| CLOUGHERTY PACKING | | 94.8% | 2.51% |
| BEVERAGE - AIR | $0 | 93.4% | |
| COMPONENT HARDWARE GROUP, INC | | | 2.06% |
| COCA - COLA USA | $0 | | |
| TOASTMASTER | $1,909 | 93.5% | 1.55% |
| GRANT COUNTY FOODS | | 96.3% | 2.20% |
| FRESH EXPRESS | $0 | | |
| TAYLOR FARMS | | | 1.04% |
| MODULAR DISPENSING SYSTEM | $0 | | |
| CENTURY PRODUCTS, LLC | $3,428 | | |
| ROSE PACKING COMPANY | | 93.3% | 2.98% |

| | MONTHLY TOTAL OVERCHARGE | PERFECT ORDER PERCENTAGE | MONTHLY CARRYING % INVOICE FOB |
|---|---|---|---|
| RSI MIN | $5,000.00 | 92.00% | 3.00% |

| | |
|---|---|
| | OK |
| | DIDN'T MEET RSI MIN. |

FIG. 35

MOCK REPORT /1

| | FY01 | OCT-00 | NOV-00 | DEC-00 | JAN-01 | FEB-01 | MAR-01 | APR-01 | MAY-01 |
|---|---|---|---|---|---|---|---|---|---|
| FOOD COST INDEX | | | | | | | | | |
| PLAN | 99.75 | 99.69 | 99.20 | 98.63 | 100.33 | 100.49 | 101.12 | 100.44 | 99.92 |
| ACTUAL | | 99.10 | 98.90 | | | | | | |
| VARIANCE GOOD/(BAD) | | 0.59 | 0.30 | | | | | | |
| TOTAL DOLLAR PURCHASES (IN MILLIONS) /2 | | | | | | | | | |
| PLAN | $2,237.24 | $183.98 | $182.73 | $184.54 | $187.33 | $187.03 | $189.14 | $187.47 | $186.83 |
| ACTUAL | | $182.84 | $182.08 | | | | | | |
| VARIANCE GOOD/(BAD) | | $1.14 0.6% | $0.65 0.4% | | | | | | |

/1 INCLUDES ON FOOD COST INDEX ITEMS
/2 BASED ON FY 99 SALES VOLUMES

┌─────────────────────────────────────────────────────────┐
│  TRANSMITTING INVOICE LEVEL SALES DATA FROM THE SUPPLIER │── 4732
│     TO THE SUPPLY CHAIN MANAGER UTILIZING A NETWORK      │
└─────────────────────────────────────────────────────────┘
                            │
                            ▼
┌─────────────────────────────────────────────────────────┐
│ SENDING INVOICE LEVEL SALES DATA FROM THE DISTRIBUTORS   │── 4734
│   TO THE SUPPLY CHAIN MANAGER UTILIZING THE NETWORK      │
└─────────────────────────────────────────────────────────┘
                            │
                            ▼
┌─────────────────────────────────────────────────────────┐
│  COMMUNICATING DAILY SALES DATA FROM THE STORES TO THE   │── 4736
│      OFFICE OF THE SUPPLY CHAIN MANAGER UTILIZING THE    │
│                         NETWORK                          │
└─────────────────────────────────────────────────────────┘
                            │
                            ▼
┌─────────────────────────────────────────────────────────┐
│   TRANSMITTING DAILY SALES DATA FROM THE OFFICE OF THE   │
│   SUPPLY CHAIN MANAGER TO THE SUPPLY CHAIN MANAGER       │── 4738
│ UTILIZING THE NETWORK, WHEREIN THE DAILY SALES DATA IS   │
│ ORGANIZED BASED ON THE STORES FROM WHICH THE DAILY       │
│                SALES DATA ORIGINATED                     │
└─────────────────────────────────────────────────────────┘
```

Printer Friendly Version

REINHART - CEDAR RAPIDS, IA
Local Promotion Summary by DC
Tuesday, October 24, 2000

5400

The information contained in this report is privileged and confidential. It is intended only for viewing and use by Distributor. If you are not Distributor, you are hereby notified that dissemination, distribution, or copying of this report is strictly prohibited.

| Local Promotion Option | ADI | Start Date | Projected Dly Usage | Duration (In Weeks) | Participating Rest Count | Non-Participating Restaurants |
|---|---|---|---|---|---|---|
| 32 oz. Motor Cup | Chicago, IL | 5/1/00 | 85 | 99 | 8 | |
| | Davenport-RI-Moline, IA | 6/1/00 | 85 | 32 | 17 | |
| | Des Moines-Ames, IA | 7/10/00 | 85 | 17 | 28 | |
| | Omaha, NE | 7/10/00 | 85 | 17 | 50 | |
| | Peoria, IL | 6/1/00 | 85 | 99 | 17 | |
| | Sioux City, IA | 6/26/00 | 85 | 99 | 10 | |
| | Springfield-Decatur-Chmpg, IL | 6/1/00 | 85 | 99 | 1 | |
| 32 oz. Motor Cup Total | | | | | 131 | |
| Big King | Cedar Rapids-Waterloo-Dubq, IA | 4/15/00 | | 99 | 19 | |
| | Davenport-RI-Moline, IA | 4/15/00 | | 99 | 17 | |
| | Ottumwa-Kirksville, IA | 4/15/00 | | 99 | 3 | |
| Big King Total | | | | | 39 | |
| Pancake Minis | Chicago, IL | 5/15/00 | 20 | 99 | 9 | |
| | Peoria, IL | 5/1/00 | 20 | 99 | 17 | |
| | Sioux City, IA | 4/15/00 | 20 | 99 | 10 | |
| Pancake Minis Total | | | | | 35 | |

Landed Cost Report

Restaurant Number: 00003473    Date: 10/22/00    Retrieve

5600

Printer Friendly Version    Restaurant Landed Cost Verification Report

Report Date: Sunday, October 22, 2000
Restaurant Number: 00003473
Distribution Center: REINHART - CEDAR RAPIDS, IA Report Contact: Robert Harris
Contact Number: 305-529-3409

The information contained in this report is privileged and confidential. It is intended only for viewing and use by Franchisee User. If you are not Franchisee User, you are hereby notified that dissemination, distribution, or copying of this report is strictly prohibited.

| DC Item No | RSI Item No | RSI Item Description | DC Cost | Markup | Rest Cost |
|---|---|---|---|---|---|
| 10340 | 4439 | REGISTER TAPE-THERMAL 2.25" X 165' | $21.27 | $1.57 | $22.84 |
| 12860 | 3586 | SUGAR SUBSTITUTE-PINK PKT 2000 CT | $5.87 | $1.57 | $7.44 |
| 18986 | 359 | SAUCE-BULK-KRAFT BULLSEYE | $24.48 | $1.57 | $26.05 |
| 19432 | 4473 | COFFEE-FOLGERS REGULAR | $44.50 | $1.57 | $46.07 |
| 20788 | 67 | MUSTARD-BULK 3GAL | $6.45 | $1.57 | $8.02 |
| 20940 | 4281 | WRAP-LOCAL OPTION | $29.78 | $1.57 | $31.35 |
| 24340 | 86 | SAUCE-BULK MAYONNAISE | $7.81 | $1.57 | $9.38 |
| 24500 | 4270 | WATER-ICE MOUNTAIN 5L | $6.41 | $1.57 | $7.98 |

12800

LANDED COST BY DISTRIBUTION CENTER

| ITEM | INV FOB | FREIGHT | LANDED | ROUTING |
|---|---|---|---|---|
| BAG - MEDIUM | 4.85 | 0.23 | 5.08 | TL |
| BAG - LARGE | 6.7 | 0.23 | 6.93 | TL |
| BISCUITS - FROZEN | 12.33 | 1.15 | 13.48 | TL |
| BRUSH - POT, LONG HANDLE | 40.2 | 2.02 | 42.22 | TL |
| BRUSH - POT, SHORT HANDLE | 24 | 1.39 | 25.39 | TL |
| CARTON - BREAKFAST | 16.59 | 1.1 | 17.69 | RDC |
| CARTON - LARGE FRY | 29.91 | 0.81 | 30.72 | RDC |
| CARTON - MEDIUM FRY | 18.92 | 0.73 | 19.65 | TLMIN |

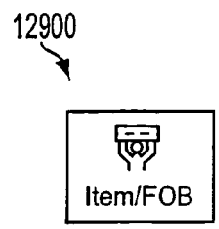

| | | | |
|---|---|---|---|
| Supplier Item Desc: | | Item No: | |
| Current: | ⊙ Yes ○ No | Tie Qty: | |
| Items per Case: | 5000 | High Qty: | |
| Innerpack Contents: | 5/1000 | Cases Per Pallet: | |
| Item Size: | | Stacking Allowed: | |
| Case Length: | | Universal Product Code: | |
| Case Width: | | Cases Per Truckload: | 1350 |
| Case Depth: | | Net Weight: | 39.00 |
| Case Dimension U/M: | INCHE(S) | Gross Weight: | 39.00 |
| Item Cube: | 0.95  CUBIC FEET | Weight U/M: | POUND(S) |
| Item Shelf Life: | | BarCode: | |
| White Boxes Are Copied Across Suppliers / Grey Boxes Are Only Copied Within Same Supplier | | | |

| Site Information | Site Id: 17355 | Site Role: *FOB Shipping Point* |
| Site Name: | TYSON FOODS - NEW HOLLAND, PA | |

| Site Information | Site Id: 16 | | FOB Shipping Point |
| Name: | AMERISERVE-FARMINGDALE, NY | Railroad Name: | |
| Status: | Active ▼ | Rail Sidings: | ☐ |

| Item: | WRAP-BACON DOUBLE CHEESEBURGER DELUXE | Begin: 7/1/96 | End: 9/1/96 | Final: ☐ |
| --- | --- | --- | --- | --- |
| Override Rules: ○ Yes ⊙ No | Apply By: Cell ▼ | | | |

| DC | Supplier FOB Point |
| --- | --- |
| AMERISERVE-DENVER, CO | TYSON FOODS - GREEN FOREST, AR |
| AMERISERVE-DOUGLASVILLE, | TYSON FOODS - ALBERTVILLE, AL |
| AMERISERVE-FARMINGDALE, N | TYSON FOODS - NEW HOLLAND, PA |

| Con FOB | Inv FOB | Freight | Landed |
| --- | --- | --- | --- |
| 34.3200 | 34.3900 | 0.8400 | 35.2300 |
| 34.3200 | 34.3900 | 0.2900 | 34.6800 |

| Contr | LB | Trk | Routing |
| --- | --- | --- | --- |
| 96 | 83,600 | 2.0 | TL |
| 96 | 215,040 | 5.1 | TL |

FIG. 137

13800
FIG. 138
13900
| Min Ordr | UM | Slip | Deliv. |
|---|---|---|---|
| 1 | TRUCKLOAD(S) | Pallet | |
| 1 | TRUCKLOAD(S) | Pallet | |
FIG. 139
14000
| Carrier | Stated Vol |
|---|---|
| TRUCK | 83,600 |
| TRUCK | 215,040 |
FIG. 140
14200
FIG. 142
14100
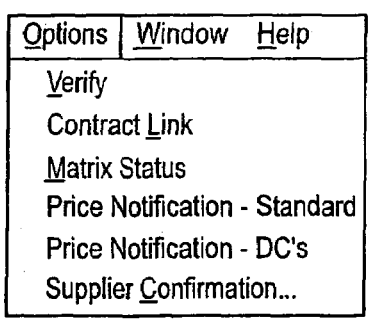
FIG. 141
14300
| Cost | ▷ | Edit / View ... | F3 |
|---|---|---|---|
| Commodities | ▷ | New (using previous matrix) ... | F4 |
| | | New (build matrix) ... | F5 |
| Vendor Rating | ▷ | | |
| Contact Management | ▷ | Multi Item Price Notification ... | |
FIG. 143

14500
FIG. 145
14600
| Contract ID: | 673 - TYSON FOODS | | | |
|---|---|---|---|---|
| Initial Buyer Name: | Jamie Hersh | ▼ | Current Buyer Name: | Chris Stainton ▼ |
FIG. 146
14700
| Contract Start Date: | 05/15/98 |
|---|---|
| Contract End Date: | 12/31/02 |
| Execution Date: | 5/15/98 |
| Effective: | Shipment Date ▼ |
| Payment Terms: | Net 10 ▼ |
FIG. 147
14800
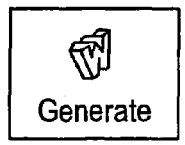
FIG. 148
14900
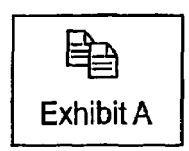
FIG. 149
15000
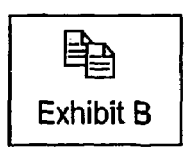
FIG. 150

15100
| Select the End Dates to Use on the Exhibit | | | |
|---|---|---|---|
| Item Description | Cost Matrix End Date | Contract End Date | No End Date |
| BEEF - 77% | ○ 8/1/98 | ⊙ 2/24/08 | ○ No Date |
| BEEF-WHOPPER 4.0 OZ | ○ 8/1/98 | ⊙ 2/24/08 | ○ No Date |
| BEEF-WHOPPER JR. 2.8 OZ. | ○ 8/1/98 | ⊙ 2/24/08 | ○ No Date |
FIG. 151
15200
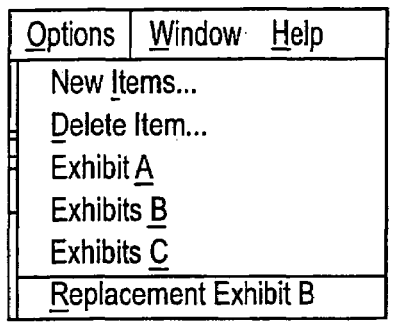
FIG. 152
15300
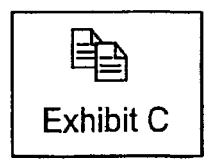
FIG. 153

15600

| Proposal - Foam Hot Cups & Polystyrene Lids |

| Main Info | Items | Suppliers | DCs | FOB Price | DC/Rest. | Usage | Templates | View Bid |

Proposal Information

Proposal ID: 1021                                    Proposal Due Date: 06/12/97

Proposal Name: Foam Hot Cups & Polystyrene Lids      Contract Begin Date: 07/01/97

Buyer Name: Dennis Clabby                            Contract End Date: 06/30/98

Actions

| #: | Date: | Action Description: |
|---|---|---|
| 1 | 05/28/97 | Sent this bid to Dart and also sent a request for information to WinCup. |

| | Proposal - Foam Hot Cups & Polystyrene Lids | ▽ △ |
|---|---|---|

| Main Info | Items | Suppliers | DCs | FOB Price | DC/Rest. | Usage | Templates | Recreate Bid |

[ Search ]  [ Query ]  [ Reset ]

6 Rows Found                                                                    5 Rows Selected

15902

| Item Description | |
|---|---|
| CUP-HOT 12 OZ (PAPER) | DRY |
| CUP-HOT 16 OZ (PAPER) | DRY |
| CUP-HOT 8 OZ (PAPER) | DRY |

[ > ]

[ >> ] — 15904

[ << ] — 15906

[ < ] — 15908

| Item Description |
|---|
| CUP-HOT 12 OZ (DRY) |
| CUP-HOT 16 OZ (500 CT) (DRY) |
| CUP-HOT 8 OZ (DRY) |
| LID-HOT 12/16 OZ (DRY) |
| LID-HOT 8 OZ (DRY) |

| Main Info | Items | Suppliers | DCs | FOB Price | DC/Rest. | Usage | Templates | Recreate Bid |

Select The Appropriate FOB Price Component Worksheet For Each Item

| Item Description | FOB Price Component |
|---|---|
| MAYO-BULK | Mayonnaise Components ▼ |
| | (None Selected) |
| | Generic FOB Pricing |
| | Mayonnaise Components |

| Item | Growth % | Gross Wgt. | Item Cube | Contract Period |
|---|---|---|---|---|
| CHICKEN-BK BROILER | 5.00% | 32 | 1.26 | 09/01/97 to 12/31/97 |
| CHICKEN-PATTY | 7.00% | 37.00 | 1.09 | |
| CHICKEN-TENDERS | 0.00% | 25.00 | 1.06 | |

| Distribution Center | Previous Case Usage | Projected Rest. Count | Covg. Factor | Avg. # RM | DC/Item Growth | Projected Unit Usage |
|---|---|---|---|---|---|---|
| POST-ALBUQUERQ | 576 | 30 | 99.34% | 6.03 | 5.00% | 755 |
| POST-DENVER | 833 | 39 | 99.05% | 6.68 | 5.00% | 1,083 |
| POST-SALT LAKE | 116 | 2 | 80.00% | 5.46 | 5.00% | 37 |

FIG. 161

| Report Name | Supply | MS Word | Editable Y/N |
|---|---|---|---|
| Bid Proposal Cover Letter | | ? | Y |
| General Terms and Conditions | | ? | N |
| Usage Estimates | ? | | N |
| Supplier Facility Worksheets | ? | | N |
| Item Information Worksheets | ? | | N |
| Sample Supply Agreement | | ? | N |
| BK Specification Request | | ? | N |
| FOB Price Component | | ? | Y |
| Truckload Freight Worksheet | ? | | N |
| LTL Freight Worksheet | ? | | N |

| Bid Proposal Name: | (None) | ⇳ |
| --- | --- | --- |
| | Foam Hot Cups & Polystyrene Lids ( 07/01/97 to 06/30/98 ) | |
| | Ham, Sausage, Bacon Freight Bid ( 10/01/97 to 12/31/97 ) | |

| | |
|---|---|
| Analysis Name: | Hash Brown Actual |
| Analysis ID: | 1036 |
| Buyer: | Dennis Clabby ▽ |
| Period of Agreement: | 10/1/97   THRU   9/30/98 |
| Unit Of Measure: | CASE(S) ▽ |

| Version ( 1 ) of ( 9 ) | Base version | |
|---|---|---|
| What is the max # of FOB points to allocate to each DC? | | One FOB |
| What is pricing method for this version? | | FOB + Freigh ▽ |
| What is the RSI Invoice FOB Upcharge (Downcharge)? | | 0.0000 |
| Override RDC Truckload Validation? | | No ▽ |
| Solution Strategy: Standard ▽ | Last Revision: | 9/15/97 1:04 PM |

FIG. 179

| Item Description | Supplier FOB |
|---|---|
| CUP-COLD 16 OZ | DOPACO-DOWNINGTOWN, PA |
| CUP-COLD 22 OZ | DOPACO-DOWNINGTOWN, PA |
| CUP-COLD 32 OZ | DOPACO-DOWNINGTOWN, PA |

Supplier Item Desc: 16 OZ COLD CUP    Item No: CP2942
Items per Case:                       Tie Qty: 5
Innerpack Contents: 1200              High Qty: 5
Item Size:                            Cases Per Pallet: 25
Item Shelf Life:                      Stacking Allowed: ● Yes  ○ No
— Mandatory —
Case Length: 22.125                   Case Cube: 3.43 CUBIC FEET
Case Width: 15.125                    Cases Per Truckload: 769
Case Depth: 17.75                     Gross Weight: 29.28 POUND(S)
Case U/M  INCHE(S)                    Net Weight: 27.28 POUND(S)

| Supplier | Terms | SLP/PLT | Minimum | Maximum | Include | |
|---|---|---|---|---|---|---|
| CAVENDISH FARMS | ⇩ | Pallet ⇩ | | | ⊙ Yes  ○ No | |
| J.R. SIMPLOT COMPANY | ⇩ | Pallet ⇩ | | | ⊙ Yes  ○ No | |
| LAMB-WESTON, INC. | ⇩ | Pallet ⇩ | 200,000,000 | | ⊙ Yes  ○ No | |

| Supplier FOB | Minimum | Maximum | Include |
|---|---|---|---|
| LAMB-WESTON, INC. -PASCO, WA | 90,000,000 | 110,000,000 | ⊙ Yes  ○ No |
| LAMB-WESTON, INC. -RICHLAND WA | 0 | 55,000,000 | ⊙ Yes  ○ No |
| LAMB-WESTON, INC. -AMERICAN FALLS ID | 90,000,000 | 110,000,000 | ⊙ Yes  ○ No |

| Supplier | Terms | SLP/PLT | Minimum | Maximum | Include | |
|---|---|---|---|---|---|---|
| MCCAIN FOODS | ⇩ | Pallet ⇩ | | | ⊙ Yes  ○ No | |
| NESTLE FOOD COMPANY | ⇩ | Pallet ⇩ | | | ⊙ Yes  ○ No | |
| ORE-IDA FOODS | ⇩ | Pallet ⇩ | 225,000,000 | | ⊙ Yes  ○ No | |

| Supplier FOB | Minimum | Maximum | Include |
|---|---|---|---|
| MCCAIN FOODS, LTD.-PRINCE EDWARD ISLAND | 18,000,000 | 30,000,000 | ○ Yes  ⊙ No |
| MCCAIN FOODS,LTD.-PORTAGE LE PRAIRIE | 45,000,000 | 50,000,000 | ○ Yes  ⊙ No |
| MCCAIN FOODS, INC-OTHELLO, WA | 27,000,000 | 132,000,000 | ⊙ Yes  ○ No |

| Supplier | # | Volume | |
|---|---|---|---|
| HUDSON INDUSTRIES | 0 | | ⇧ |
| INTERNATIONAL DIVERSEFOODS | 0 | | |
| SUPERIOR COFFEE & FOODS | 0 | | ⇩ |

| Supplier FOB | Item | Cont FOB | # | Volume |
|---|---|---|---|---|
| HUDSON INDUSTRIES-TROY AL | MAYO-BULK | 8.4200 | 0 | |
| HUDSON INDUSTRIES-TROY AL | SAUCE-BULK-TARTAR | 9.2300 | 0 | |

| Supplier | # | Volume |
|---|---|---|
| SSI FOOD SERVICES | 0 | |
| TEXAS AMERICAN FOOD SERVICE | 0 | |
| WHITEFORD FOODS | 0 | |

| Supplier FOB | Item | Cont FOB | # | Volume |
|---|---|---|---|---|
| TEXAS AMERICAN FOOD SERVICE-TX | BEEF - 77% | 1.0026 | 0 | |
| TEXAS AMERICAN FOOD SERVICE-TX | BEEF - 77% | 1.0016 | 1 | 2,090,000 |
| TEXAS AMERICAN FOOD SERVICE-TX | BEEF - 77% | 1.0010 | 2 | 2,508,000 |

| Supplier | # | Volume |
|---|---|---|
| VENTURA FOODS | 0 | |
| VENTURA FOODS | 1 | 100,000 |

| Supplier FOB | Item | Cont FOB | # | Volume |
|---|---|---|---|---|
| VENTURA FOODS-CHAMBERSBURG, PA | MAYO-BULK | 8.9400 | 0 | |
| VENTURA FOODS-CHAMBERSBURG, PA | MAYO-BULK | 8.8400 | 1 | |
| VENTURA FOODS-CHAMBERSBURG, PA | SAUCE-BULK-TARTAR | 9.5100 | 0 | |
| VENTURA FOODS-CHAMBERSBURG, PA | SAUCE-BULK-TARTAR | 9.4100 | 1 | |
| VENTURA FOODS-CITY OF INDUSTRY | MAYO-BULK | 9.1200 | 0 | |
| VENTURA FOODS-CITY OF INDUSTRY | MAYO-BULK | 9.0200 | 1 | |
| VENTURA FOODS-CITY OF INDUSTRY | SAUCE-BULK-TARTAR | 9.5800 | 0 | |
| VENTURA FOODS-CITY OF INDUSTRY | SAUCE-BULK-TARTAR | 9.4800 | 1 | |

| Total Rest. Growth Amount | | Usage Period | | |
|---|---|---|---|---|
| 5.00% — 19702 | | 09/01/97 to 08/31/98 | | |
| Distribution Center | Current Rest. Count | Restaurant Growth % | Projected Avg. Rest. Count | |
| AMERISERVE\POST-ALBUQUERQUE | 27 | 5.00% | 28 | |
| AMERISERVE\POST-DENVER | 35 | 5.00% | 37 | |
| AMERISERVE\POST-SALT LAKE,UT | 2 | 5.00% | 2 | |
| AMERISERVE-OMAHA, NE | 166 | 5.00% | 174 | |

| Item | | | Item Growth % | | Usage Period | |
|---|---|---|---|---|---|---|
| CHICKEN-PATTY | | | 0.00 | | | |
| Distribution Center | Previous Usage | Projected Rest. Count | Covg. Factor | Avg. # RM | DC/Item Growth | Projected Usage |
| AMER-OMAHA | 44,035 | 166 | 98.49% | 24.12 | 4.00% | 49,205 |
| AMER-PLYMOUTH | 37,141 | 177 | 100.00% | 18.30 | 5.00% | 40,823 |
| AMER-MILWAUK | 38,520 | 188 | 100.00% | 19.02 | 0.00% | 42,909 |

| Supplier FOB | Address | | |
|---|---|---|---|
| CAVENDISH FARMS | Dieppe | NB | E1A6X4 |
| J.R. SIMPLOT COMPANY-HERMISTON, OR | Hermiston | OR | 99999 |
| LAMB-WESTON, INC.-AMERICAN FALLS ID | American Falls | ID | 83211 |

| Distribution Center | Lane Restriction | Honor TL Rate |
|---|---|---|
| AMERISERVE\POST-ALBUQUERQUE | ○ Solver  ○ Required  ⦿ Excluded | ☐ |
| AMERISERVE\POST-DENVER | ○ Solver  ○ Required  ⦿ Excluded | ☐ |
| AMERISERVE\POST-SALT LAKE,UT | ○ Solver  ○ Required  ⦿ Excluded | ☐ |
| AMERISERVE-OMAHA, NE | ○ Solver  ○ Required  ⦿ Excluded | ☐ |
| AMERISERVE-PLYMOUTH, MN | ○ Solver  ○ Required  ⦿ Excluded | ☐ |

FIG. 201

| Supplier FOB | Address | | |
|---|---|---|---|
| CAVENDISH FARMS | Dieppe | NB | E1A6X4 |
| J.R. SIMPLOT COMPANY-HERMISTON, OR | Hermiston | OR | 99999 |
| LAMB-WESTON, INC.-AMERICAN FALLS ID | American Falls | ID | 83211 |

| Distribution Center | Lane Restriction |
|---|---|
| AMERISERVE\POST-ALBUQUERQUE | ○ Solver  ⦿ Required  ○ Excluded |
| AMERISERVE\POST-DENVER | ⦿ Solver  ○ Required  ○ Excluded |

FIG. 202

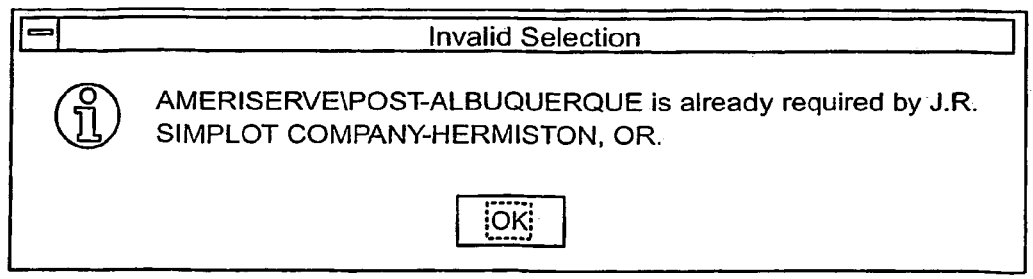

Invalid Selection

AMERISERVE\POST-ALBUQUERQUE is already required by J.R. SIMPLOT COMPANY-HERMISTON, OR.

[OK]

20400

| Supplier FOB | Address | | |
|---|---|---|---|
| CAVENDISH FARMS | Dieppe | NB | E1A6X4 |
| J.R. SIMPLOT COMPANY-HERMISTON, OR | Hermiston | OR | 99999 |
| LAMB-WESTON, INC.-AMERICAN FALLS ID | American Falls | ID | 83211 |

| Distribution Center | Truckload Freight | Lane Distance |
|---|---|---|
| AMERISERVE\POST-ALBUQUERQUE | 1,617 | |
| AMERISERVE\POST-DENVER | 1,277 | |
| AMERISERVE\POST-SALT LAKE,UT | 691 | |

| Supplier FOB | Address | | |
|---|---|---|---|
| O.K. FOODS-FORT SMITH AR | Fort Smith | AR | 72904 |
| TYSON FOODS-GREEN FORREST, AR | Green Forest | AR | 72638 |
| TYSON FOODS-RUSSELVILLE AR | Russelville | AR | 72801 |

| Distribution Center | Weight | LTL Minimum | 0 to 1,000 LBS | 1,001 to 5,000 LBS | 5,001 to 10,000 LBS | 10,001 to 20,000 LBS | 20,000 LBS + |
|---|---|---|---|---|---|---|---|
| PS-ATLANTA | 15,000 | | | | | | 1.10 |
| PS-BURLINGTON | 15,000 | 400.00 | | | | | 1.20 |

| Analysis Region | Force FOB |
|---|---|
| MCCABE-PORTLAND/RNW-ANCHORAGE | ○ Yes ⊙ No |

| Distribution Center Name | Site Role |
|---|---|
| MCCABE QUALITY FOODS-PORTLAND | Corporate & FOB Point |
| RESTAURANTS NW-ANCHORAGE | Corporate & FOB Point |

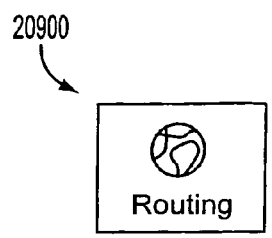

| Report Selection | |
|---|---|
| Report Type: | Report Name: |
| Optional Product Routing ⇩ | Freight Information Provided ⇩ |
| Report Parameters | Freight Information Provided ⇧ |
| Supplier: (All) | LTL Routing Grid By Lane |
| Supplier FOB: (All) | Routing Results By Lane |
| Distribution Center: (All) | Routing Results By Lane, Item |
| | Routing Results w / RDC Breakout By Lane |
| | Routing Results w / RDC Breakout By Lane, Item |
| Version: Base Version | TL Freight Variance Analysis ⇩ |

FIG. 210

21400 — 
| Awarded Volume by Item - Detail |
|---|
| Awarded Volume by Item - Detail |
| Awarded Volume by Item - Freight |
| Awarded Volume by Item - Summary |
| Competing DC Freight Analysis by Item |
| Lane Assignment Matrix |
| Lane Weighted Average Delivered Cost |

FIG. 214

21500 — 
| Assigned Volume Percentages (no conversion) |
|---|
| Assigned Volume Percentages (with conversion) |
| Invoice FOB Detail Comparison (no conversion) |
| Invoice FOB Detail Comparison (with conversion) |
| Invoice FOB Savings Comparison (no conversion) |
| Invoice FOB Savings Comparison (with conversion) |

| Report Type: | Report Name: |
|---|---|
| Comparison Reports ▽ | Assigned Volume Percentages (no conversion) |

FIG. 216

21700 — 
| Report Name: |
|---|
| Assigned Volume Percentages (no conversion) |
| Assigned Volume Percentages (no conversion) |
| Assigned Volume Percentages (with conversion) |
| Invoice FOB Detail Comparison (no conversion) |

FIG. 217

| | |
|---|---|
| Item: | HASH BROWNS(ROUND) ▽ |
| Comparison Versions: | Base version △ |
| | With LTL riding with CCF, forced TL |
| | LTL moving with CCF, no Cavendish ▽ |
| Include Cost Matrices: | Yes ◉  No ◯ |

21800

21900

22500
| Formula Pricing - BEEF - 77% - 04/06/98 | | | | | | | | | | | |
|---|---|---|---|---|---|---|---|---|---|---|---|
| General Info | Pricing | Freight | Formulas | Block Cost | Adjustments | | | | | | |
| Date | FRSH DOM 50% TRIM | FRSH DOM 65% TRIM | FRSH DOM 73% TRIM | FRSH DOM 75% TRIM | FRSH DOM 80% LEAN | FRSH DOM 85% LEAN | FRSH DOM 90% LEAN BL | FRSH DOM 90% LEAN | FRSH DOM 90% LEAN YW | FRZN DOM 90% LEAN BL | IMP AUS 90% LEAN | Lean Fine Txtr Beef |
| 3/23/98 | 0.8800 | 0.9100 | 0.9052 | 0.9300 | 0.9318 | 0.9900 | 0.9900 | 0.9950 | 1.0000 | 0.9500 | 0.9500 | 0.7960 |
| 03/24/98 | 0.8800 | 0.9100 | 0.9149 | 0.9400 | 0.9224 | 0.9800 | 1.0000 | 1.0500 | 1.1000 | 0.9400 | 0.9600 | 0.8400 |
| 03/25/98 | 0.8800 | 0.9150 | 0.8857 | 0.9100 | 0.9224 | 0.9800 | 1.1000 | 1.1500 | 1.2000 | 0.9500 | 0.9300 | 0.9200 |
| 03/26/98 | 0.8850 | 0.9155 | 0.8945 | 0.9190 | 0.9275 | 0.9855 | 1.2000 | 1.2500 | 1.3000 | 0.9600 | 0.9500 | 1.0000 |
| 03/27/98 | 0.8900 | 0.9200 | 0.9344 | 0.9600 | 0.9275 | 0.9855 | 1.0000 | 1.0500 | 1.1000 | 0.9550 | 0.9800 | 0.8400 |
| 03/30/98 | 0.8800 | 0.9300 | 0.9441 | 0.9700 | 0.9318 | 0.9900 | 0.9995 | 0.9998 | 1.0000 | 0.9870 | 0.9650 | 0.7998 |
| 03/31/98 | 0.8860 | 0.9160 | 0.9539 | 0.9600 | 0.9412 | 1.0000 | 1.1000 | 1.1250 | 1.1500 | 0.9550 | 0.9870 | 0.9000 |
| 04/01/98 | 0.8700 | 0.9200 | 0.9393 | 0.9650 | 0.9224 | 0.9800 | 1.2000 | 1.2300 | 1.2600 | 0.9630 | 0.9630 | 0.9840 |
| 04/02/98 | 0.8500 | 0.9400 | 0.9490 | 0.9750 | 0.9318 | 0.9900 | 1.0000 | 1.0250 | 1.0500 | 0.9540 | 0.9870 | 0.8200 |
| 04/03/98 | 0.8515 | 0.9700 | 0.9539 | 0.9800 | 0.9412 | 1.0000 | 1.1000 | 1.0750 | 1.0500 | 0.9580 | 0.9870 | 0.8600 |
| | 0.8753 | 0.9247 | 0.9275 | 0.9529 | 0.9300 | 0.9881 | 1.0690 | 1.0950 | 1.1210 | 0.9572 | 0.9659 | 0.8760 |
FIG. 225
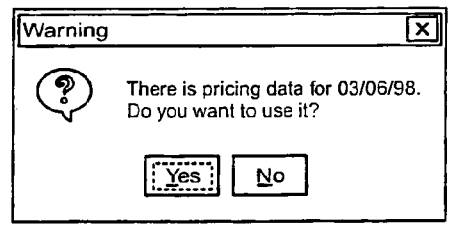
FIG. 226
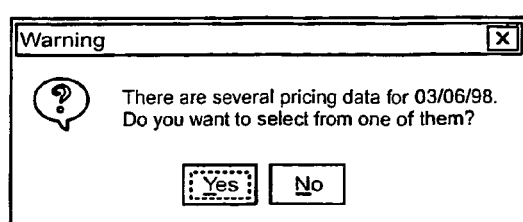
FIG. 227

23000

| Formula Pricing - BEEF - 77% - 04/06/98 | | | | | | | | | | | | | | | | | |
|---|---|---|---|---|---|---|---|---|---|---|---|---|---|---|---|---|---|
| General Info | Pricing | Freight | Formulas | Block Cost | Adjustments | | | | | | | | | | | | |

| | FD50TR | | FD65TR | | FD73TC | | FD80LC | | FD85LN | | FD90LC | | IMAU90 | | LFTB | | Total |
|---|---|---|---|---|---|---|---|---|---|---|---|---|---|---|---|---|---|---|
| Formula | Pct. | Cost | Pct. | Cost | Pct. | Cost | Pct. | Cost | Pct. | Cost | Pct. | Cost | Pct. | Cost | Pct. | Cost | |
| AFS-1 | 0.3120 | 0.2871 | | | | | | | | | 0.1680 | 0.2134 | 0.4000 | 0.3924 | 0.1000 | 0.0911 | 0.9840 |
| DIV-1 | 0.1400 | 0.1295 | 0.2000 | 0.1949 | 0.1400 | 0.1368 | | | | | 0.2000 | 0.2190 | 0.3200 | 0.3139 | | | 0.9941 |
| GS-1 | 0.3270 | 0.3042 | | | | | | | | | 0.1730 | 0.1972 | 0.3600 | 0.3549 | 0.1400 | 0.1303 | 0.9866 |
| S&C-1 | 0.2414 | 0.2200 | | | | | 0.2179 | 0.2026 | 0.2179 | 0.2153 | 0.2179 | 0.2386 | | | 0.1050 | 0.0956 | 0.9721 |
| SER-1 | 0.3250 | 0.2925 | | | | | | | | | 0.1750 | 0.1951 | 0.3650 | 0.3571 | 0.1350 | 0.1236 | 0.9684 |
| TEX-1 | 0.3030 | 0.2766 | | | | | | | | | 0.3410 | 0.3802 | 0.2500 | 0.2452 | 0.1000 | 0.0896 | 0.9916 |
| WHI-1 | 0.3250 | 0.2958 | | | | | | | | | 0.1750 | 0.1969 | 0.3650 | 0.3606 | 0.1350 | 0.1230 | 0.9765 |
| WIS-1 | 0.3325 | 0.2977 | | | | | | | | | 0.4675 | 0.5165 | 0.1000 | 0.0986 | 0.1000 | 0.0890 | 1.0018 |

| Formula Pricing - BEEF - 77% - 04/06/98 | | | | | |
|---|---|---|---|---|---|
| General Info | Pricing | Freight | Formulas | Block Cost | Adjustments |

| Formula | Raw Material Cost | Yield | Block Cost | Margin | FOB Price | Include ? |
|---|---|---|---|---|---|---|
| AFS-1 | 0.9840 | 0.99 | $0.9990 | 0.1232 | $1.1222 | ☑ |
| DIV-1 | 0.9941 | 0.98 | $1.0123 | 0.1669 | $1.1792 | ☑ |
| GS-1 | 0.9866 | 0.98 | $1.0037 | 0.1287 | $1.1324 | ☑ |
| S&C-1 | 0.9721 | 1.00 | $0.9721 | 0.1457 | $1.1178 | ☑ |
| SER-1 | 0.9684 | 0.99 | $0.9831 | 0.1325 | $1.1156 | ☑ |
| TEX-1 | 0.9916 | 0.99 | $1.0067 | 0.1232 | $1.1299 | ☑ |
| WHI-1 | 0.9765 | 0.98 | $0.9939 | 0.1275 | $1.1214 | ☑ |
| WIS-1 | 1.0018 | 0.98 | $1.0202 | 0.1334 | $1.1536 | ☑ |

FIG. 231

23200
| Formula Pricing - BEEF - 77% - 04/06/98 | | | | | | |
|---|---|---|---|---|---|---|
| General Info | Pricing | Freight | Formulas | Block Cost | Adjustments | |
| Formula | Raw Cost | Yield | FOB Price | Margin | Adjustments | Adj. FOB Price |
|---|---|---|---|---|---|---|
| AFS-1 | 0.9840 | 0.9850 | 0.9990 | 0.1232 | 0.0000 | 1.1222 |
| DIV-1 | 0.9941 | 0.9820 | 1.0123 | 0.1669 | 0.1500 | 1.3292 |
| GS-1 | 0.9866 | 0.9830 | 1.0037 | 0.1287 | 0.0000 | 1.1324 |
| S&C-1 | 0.9721 | 1.0000 | 0.9721 | 0.1457 | 0.0000 | 1.1178 |
| SER-1 | 0.9684 | 0.9850 | 0.9831 | 0.1325 | 0.0000 | 1.1156 |
| TEX-1 | 0.9916 | 0.9850 | 1.0067 | 0.1232 | 0.0000 | 1.1299 |
| Amount | Adjustment Desc |
|---|---|
| 0.1500 | Upcharge |
FIG. 232
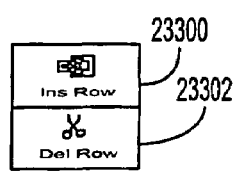
FIG. 233
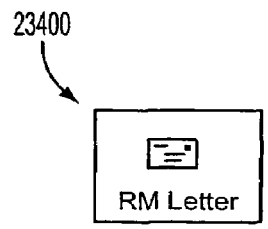
FIG. 234

FIG. 235

Formula Maintenance (23500)

| Formula ID | Facility | Description | Short Name |
|---|---|---|---|
| 5 | AMERICAN FOOD SERVICE | American Food Service Formula A | AFS-1 |
| 7 | DIVERSITY FOOD PROCESSING - VIRGIN | DIV Formula - 1b | DIV 1 |
| 8 | GOOD SERVINGS PRODUCTS - NH | Good Servings Formula 1 | GS-1 |

Number of Rows: 14

| Material Type | Begin Date | Percentage |
|---|---|---|
| Fresh Domestic 50% Trim | 10/03/1997 | 31.2000% |
| Fresh Domestic 73% Trim | 10/01/1996 | 20.0000% |
| Fresh Domestic 85% Lean | 10/01/1997 | 5.0000% |
| Fresh Domestic 90% Lean | 10/01/1997 | 18.8000% |

Number of Rows: 6 — 100.0000%

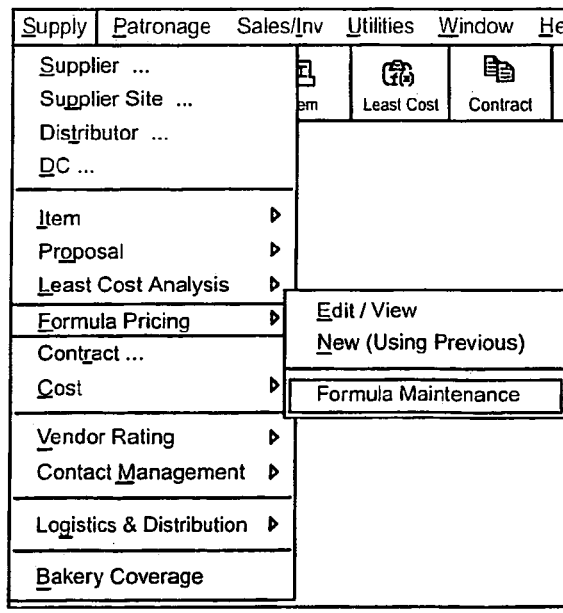

FIG. 236

| DISTRIBUTION CENTER: | |
| TIME PERIOD (MONTH/YR): | |

DELIVERY ORDER FILL RATE - ADDENDUM 1

| TOTAL CASES ORDERED: | |

23700

| OPERATIONS: | WAREHOUSE OUTS | DAMAGES | MISPICKS | SHORT ON TRUCK | OVERLOOKED AND NOT RETURNED | TOTAL OPERATIONS |
|---|---|---|---|---|---|---|
| CASES: | | | | | | 0 |
| PERCENT: | #DIV/0! | #DIV/0! | #DIV/0! | #DIV/0! | #DIV/0! | #DIV/0! |

| PURCHASING: | OUT OF STOCKS | SUBSTITUTIONS | OUT OF CODE | TOTAL PURCHASING |
|---|---|---|---|---|
| CASES: | | | | 0 |
| PERCENT: | #DIV/0! | #DIV/0! | #DIV/0! | #DIV/0! |

| DISTRIBUTION CENTER TOTAL: | CASES | PERCENT |
|---|---|---|
| OPERATIONS: | 0 | #DIV/0! |
| PURCHASING: | 0 | #DIV/0! |
| GRAND TOTAL: | 0 | #DIV/0! |

| DELIVERY ORDER FILL RATE: | #DIV/0! |

ON-TIME DELIVERY RATE - ADDENDUM 2

| TOTAL # OF DELIVERIES: | |
| # OF ON-TIME DELIVERIES: | |
| ON-TIME DELIVERY RATE: | #DIV/0! |

23702

PERFECT ORDER RATE

| TOTAL # OF DELIVERIES: | |
| TOTAL # OF PERFECT ORDERS: | |
| PERFECT ORDER RATE: | #DIV/0! |

SIGNATURE: _____

DATE: _____

FIG. 237

SYSTEM, METHOD AND COMPUTER PROGRAM PRODUCT FOR LANDED COST REPORTING IN A SUPPLY CHAIN MANAGEMENT FRAMEWORK

FIELD OF THE INVENTION

The present invention relates to information storage and processing systems, and more particularly, relates to the management of supply chains using such systems.

BACKGROUND OF THE INVENTION

Many types of manufacturing database management and inventory control systems exist today. Each of these systems views the process from the narrow viewpoint of the goals of such a system. For example, inventory control processes tend to determine when the inventory of an item is projected to be depleted and when to order goods to prevent such depletion. The inventory control process does not generally take into account the problems associated with availability of materials and machines to satisfy the inventory demand. On the other hand, the manufacturing control process considers the availability problem but does not take into account the effect of a sales promotion that will deplete an inventory faster than projected. A marketing department in preparing a sales promotion will often not consider the effect that promotion will have on availability, inventory and profit margin but tends to focus on sales goals. What is needed is a system that will support managers with each of these view points in understanding the effect of the various decisions that can be made on the supply chain as a whole both currently and into the near future.

Supply chain information flows today are fragmented, limited, and, in some cases, non-existent. The lack of timely communication between the different participants in the supply chain has resulted in higher costs for the system, for example, by limiting its ability to adequately measure distributor performance or to analyze promotion and new product activities, e.g., sales success, etc. In addition, the system continues to suffer from excess inventories and waste, unnecessary stock outs and rationing of products. A company cannot effectively react to these issues because the information that is needed to make sound management decisions is not available when it is needed.

From a marketing perspective, this lack of information has significantly hampered a company's ability to evaluate marketing tactics, post-program. Such companies also do not possess historical data that can assist it in developing marketing strategy and related plans, and understanding the essence of a brand.

Today, there is limited access to, and limited participation in, supply chain information systems by restaurants, franchisees, distributors, suppliers, etc. The infrastructure for supply chain information systems is inadequate. Restaurant point-of-sale (POS) systems are diverse and do not allow for data flows and the resulting analysis. At any point in time, it is not known how much product is selling, when it is selling or where it is selling. As long as this situation is allowed to continue, activities throughout the supply chain will continue to be reactive, error-prone, time-consuming and costly.

SUMMARY OF THE INVENTION

A system, method and computer program product are disclosed for cost reporting using a network-based supply chain management framework. Data is received utilizing a network. This date relates to goods required by a plurality of stores including a product identifier parameter, and a first cost parameter. A second cost parameter associated with a franchise mark-up is also received so that a total cost can calculated based on the first cost parameter and the second cost parameter. The total cost is utilizing the network with TCP/IP protocol.

In one aspect, the total cost may be calculated by adding the first cost parameter and the second cost parameter. In another aspect, the total cost may be displayed utilizing a network-based interface. In further aspect, the data may be received from a plurality of distributors. In such an aspect, the data may relate to goods required by a plurality of stores from the distributors. In one aspect, the network may include a wide area network.

BRIEF DESCRIPTION OF THE DRAWINGS

FIG. 26 illustrates a Sales Forecast Worksheet presenting historical data and projected data;

FIG. 27 depicts a Promotion Monitoring Worksheet illustrating statistics such as variance from expected levels;

FIG. 30 depicts a sample report for a distribution center;

FIG. 32 illustrates a distributor ranking report;

FIG. 35 illustrates a distributor ranking report that provides statistics on the number of orders filled, on-time deliveries, and perfect orders delivered;

FIG. 36 illustrates a Food Cost Summary report that compares the actual cost of food against a projected cost;

FIG. 47 is a flow diagram of a process for providing network-based supply chain communication according to another embodiment of the present invention;

FIG. 53 is a schematic illustration of an exemplary POS Implied Daily Usage—Distributor report that may be displayed in the supply chain coordinator web site in accordance with an embodiment of the present invention;

FIG. 54 is a schematic illustration of an exemplary local promotion summary by distribution center report that may be displayed in the supply chain coordinator web site in accordance with an embodiment of the present invention;

FIG. 55 is a schematic illustration of an exemplary POS implied daily usage—supplier report that may be displayed in the supply chain coordinator web site in accordance with an embodiment of the present invention;

FIG. 56 is a schematic illustration of an exemplary retailer landed cost verification report that may be displayed in the supply chain coordinator web site in accordance with an embodiment of the present invention;

FIG. 114 is a flowchart of a process for providing local distribution committees in a supply chain management framework in accordance with an embodiment of the present invention;

FIG. 115 is a flowchart of a process for price auditing in a supply chain management framework in accordance with an embodiment of the present invention;

FIG. 116 is a flowchart of a process for auditing performance in a supply chain framework in accordance with an embodiment of the present invention;

FIG. 117 is a flowchart of a process for providing an electronic mail virtual private network in a supply chain management framework in accordance with an embodiment of the present invention;

FIG. 118 is a flowchart of a process for secret pricing in a supply chain management framework in accordance with an embodiment of the present invention;

FIG. 119 is a flowchart of a process for managing risk in a supply chain management framework in accordance with an embodiment of the present invention;

FIG. 120 is a flowchart of a process for product tracking in a supply chain management framework in accordance with an embodiment of the present invention;

FIG. 121 is a flowchart of a process for auctioning surplus products in a supply chain management framework in accordance with an embodiment of the present invention;

FIG. 122 is a flowchart of a process for managing a supply chain utilizing a network in accordance with an embodiment of the present invention;

FIG. 123 is a flowchart of a process for managing a supply chain utilizing a network in accordance with an embodiment of the present invention;

FIG. 124 is a flowchart of a process for disseminating calendar information in a supply chain utilizing a network in accordance with an embodiment of the present invention;

FIG. 125 illustrates a graphical user interface for generating cost system components;

Figure 126:
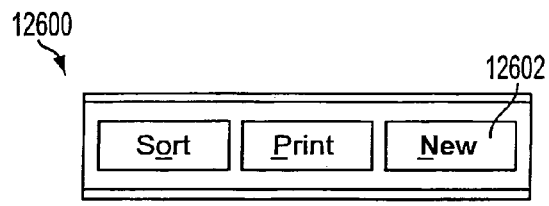
Figure 127:
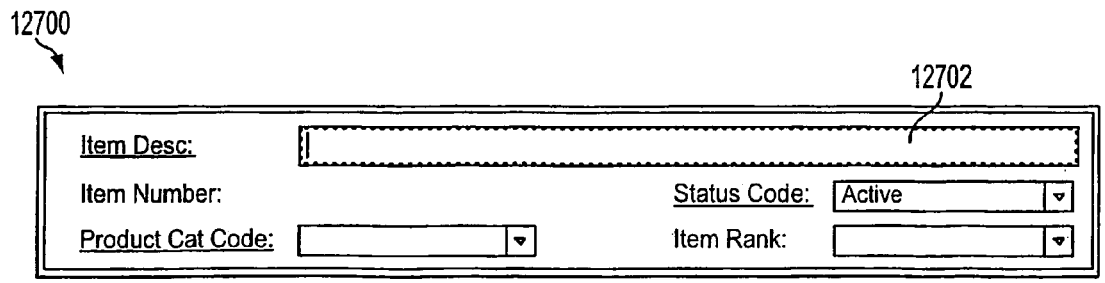
Figure 133:
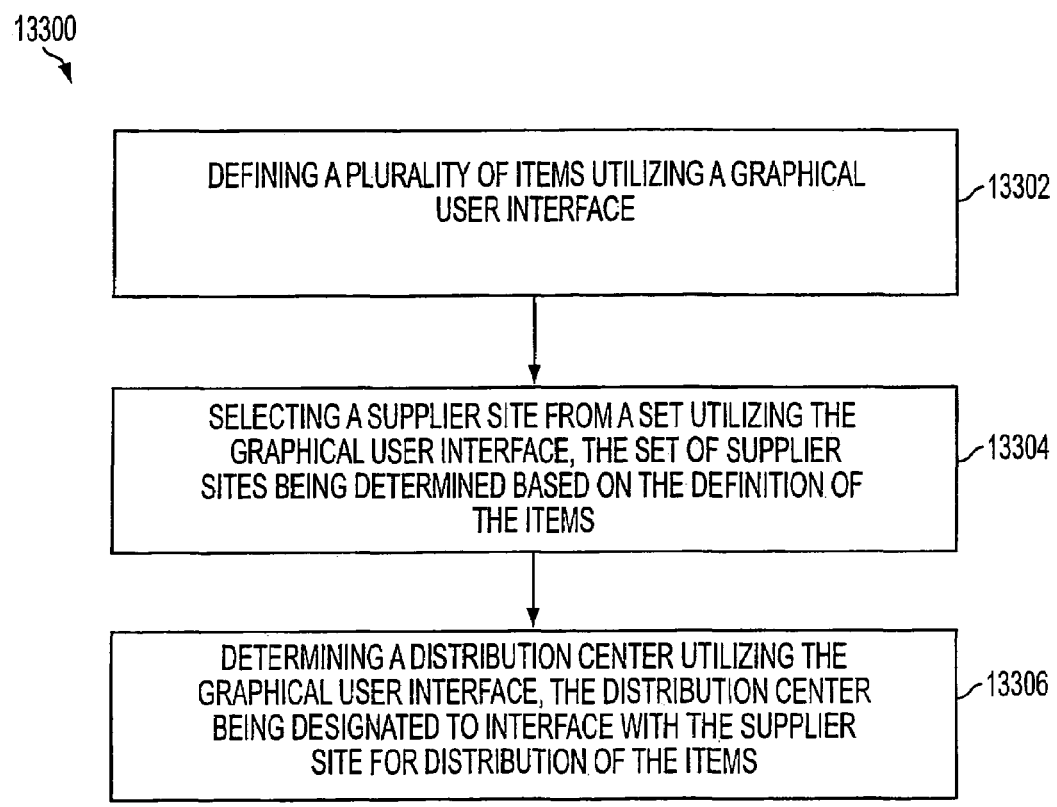
Figure 144:
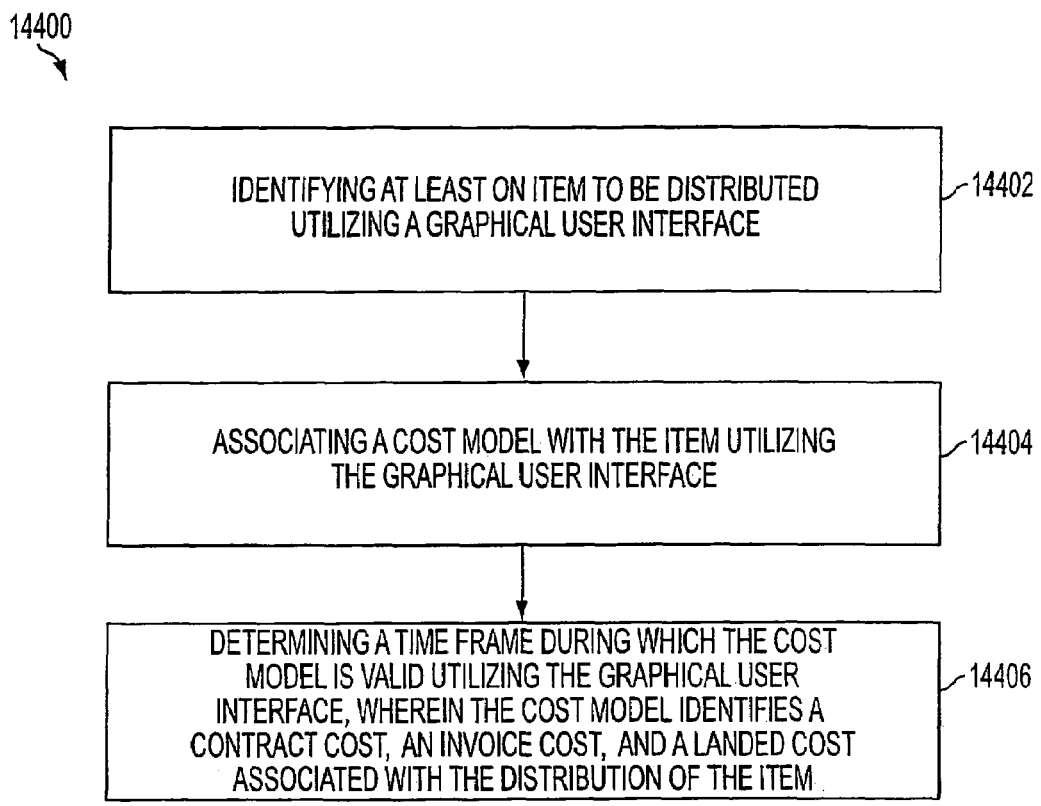
Figure 154:
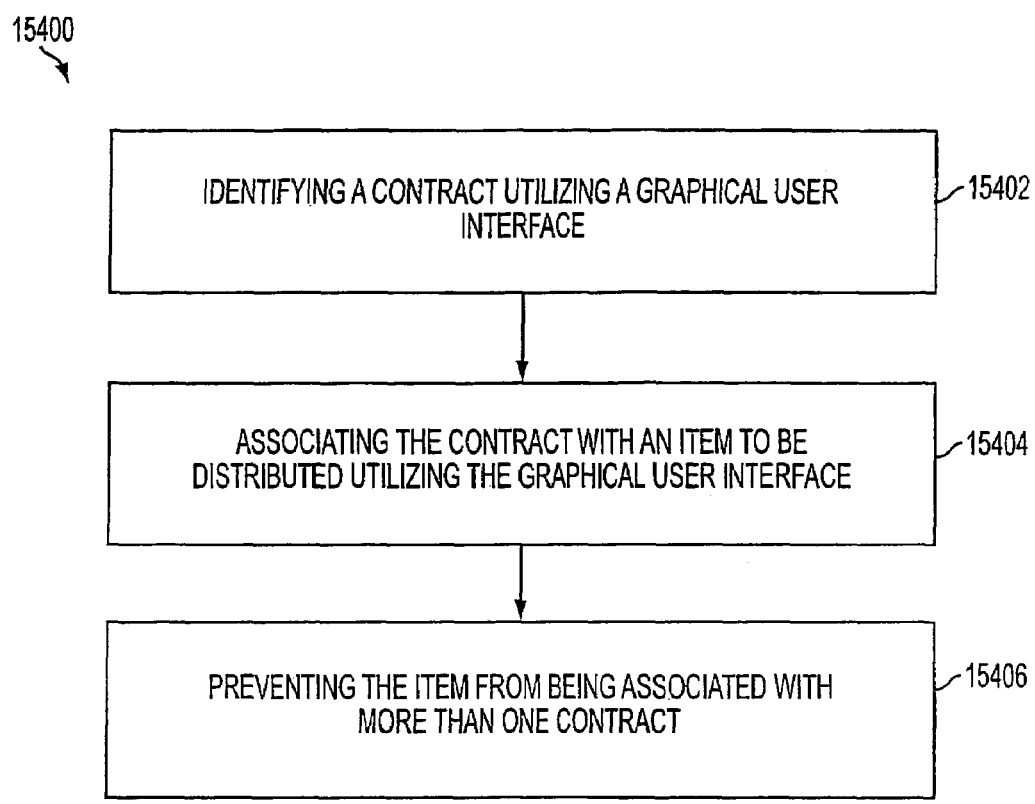
Figure 155:
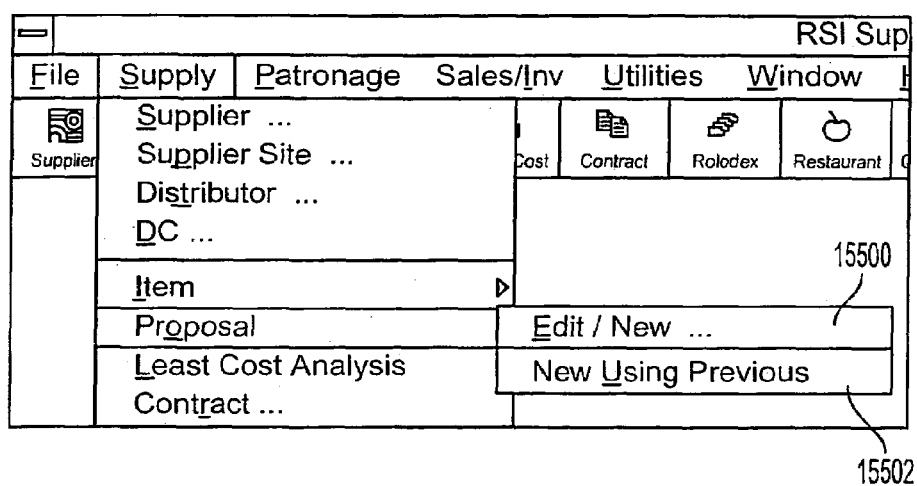
Figure 157:
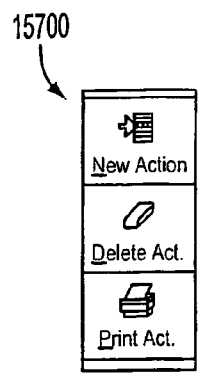
Figure 158:
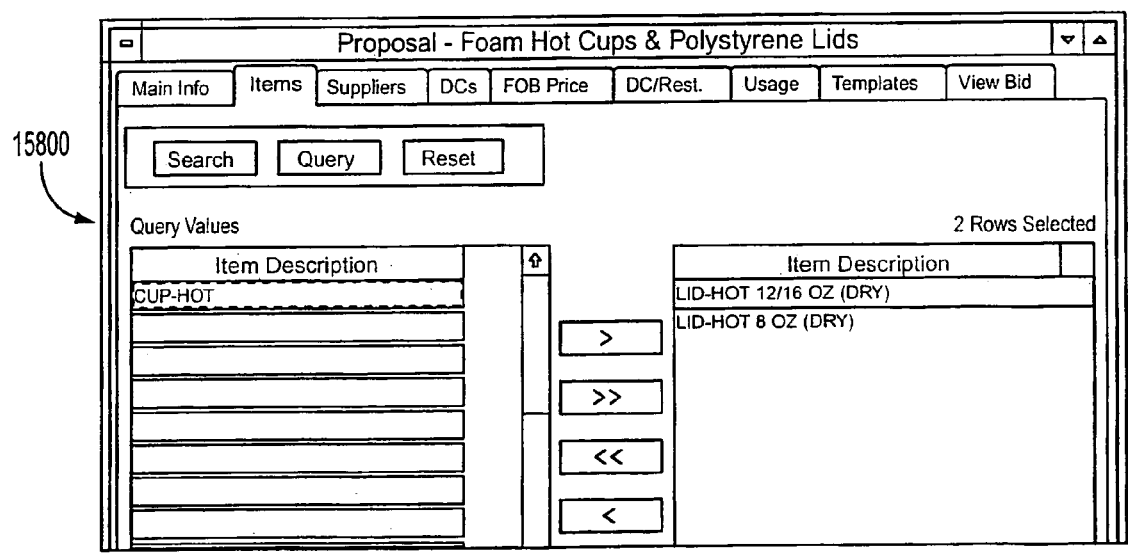
Figure 162:
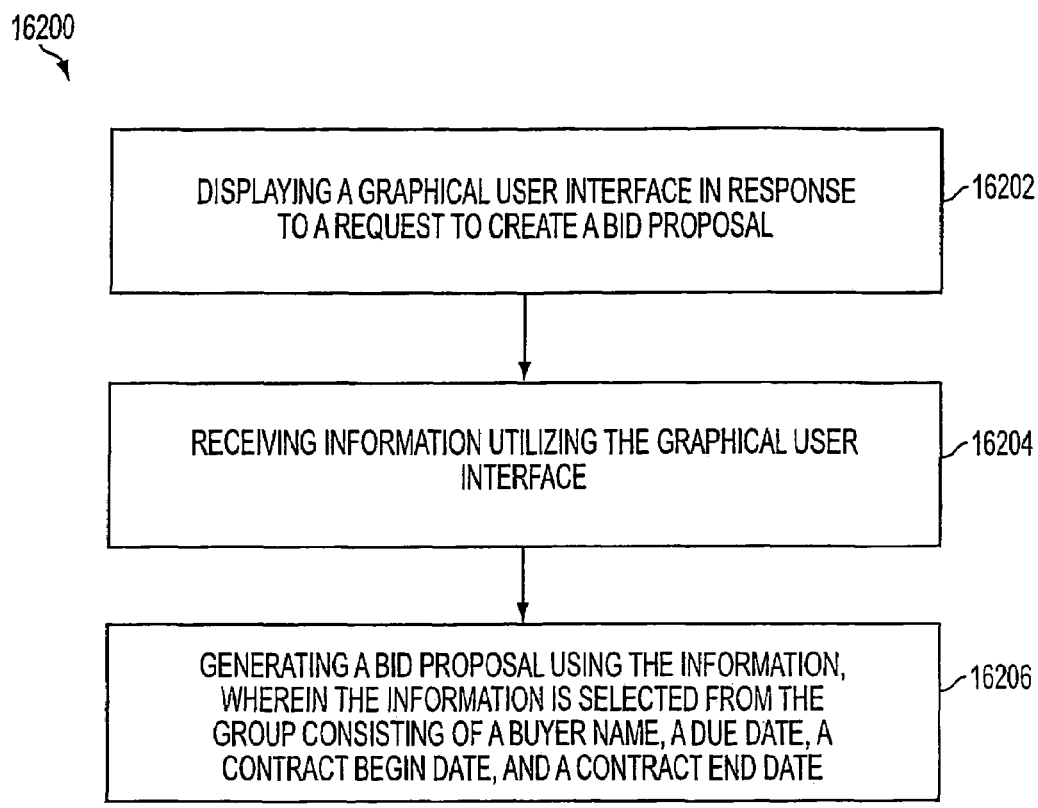
Figures 163, 164:
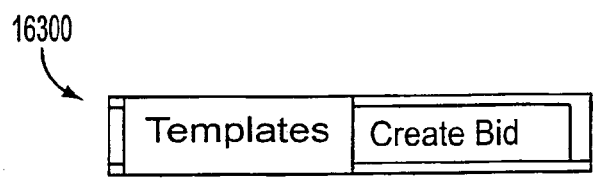
Figure 165:
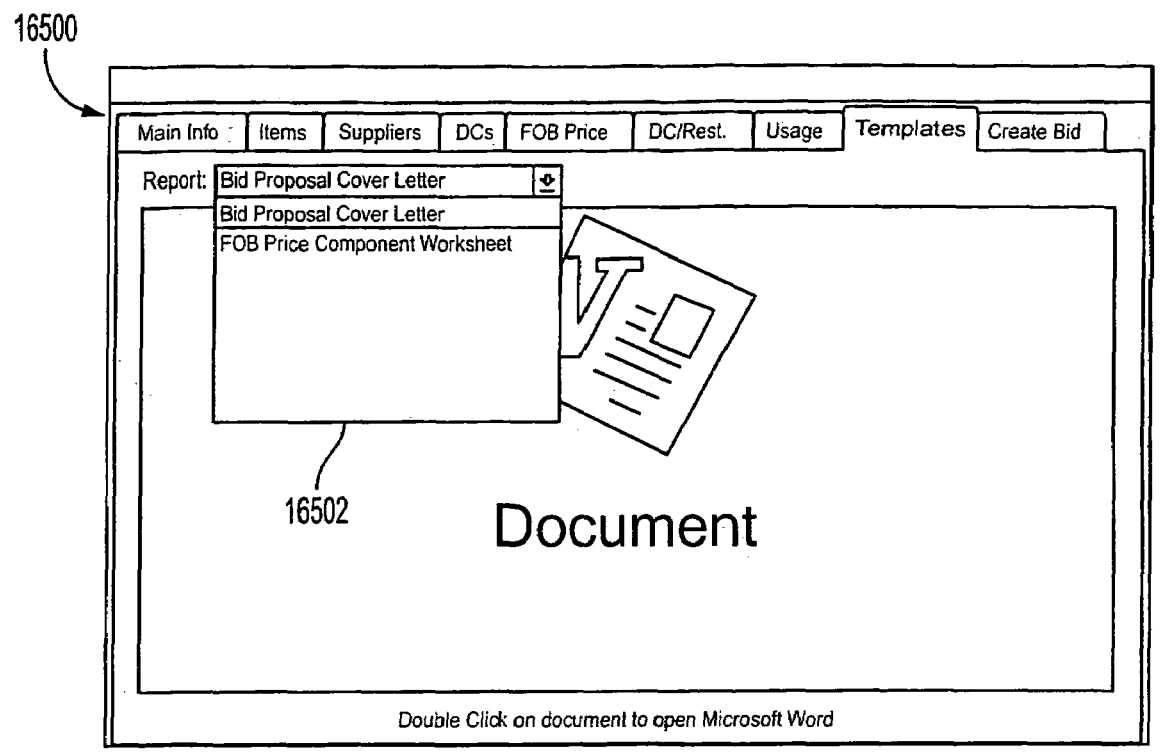
Figure 166:
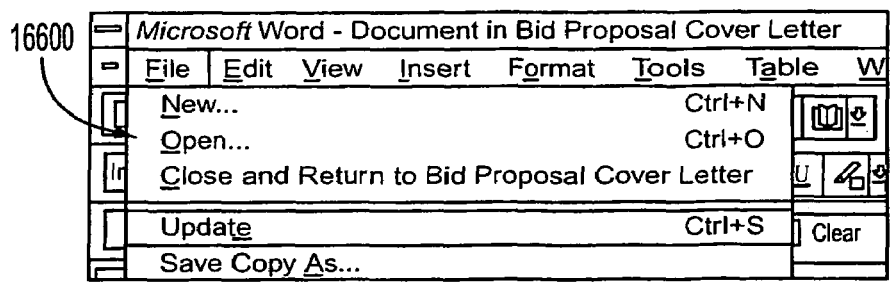
Figures 167, 168, 169:
Figure 170:
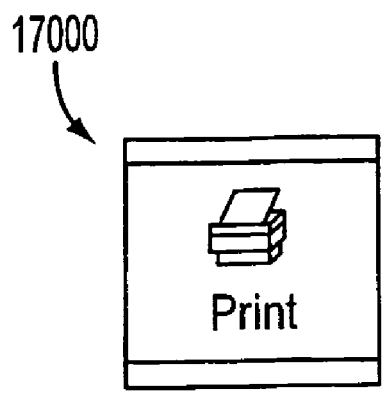
Figure 171:
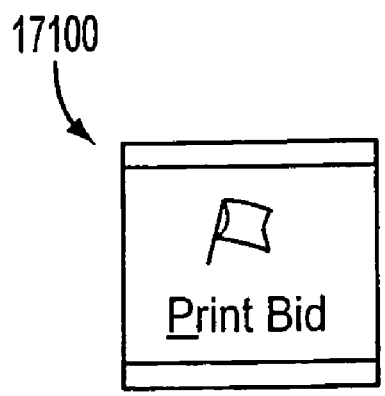
Figure 172:
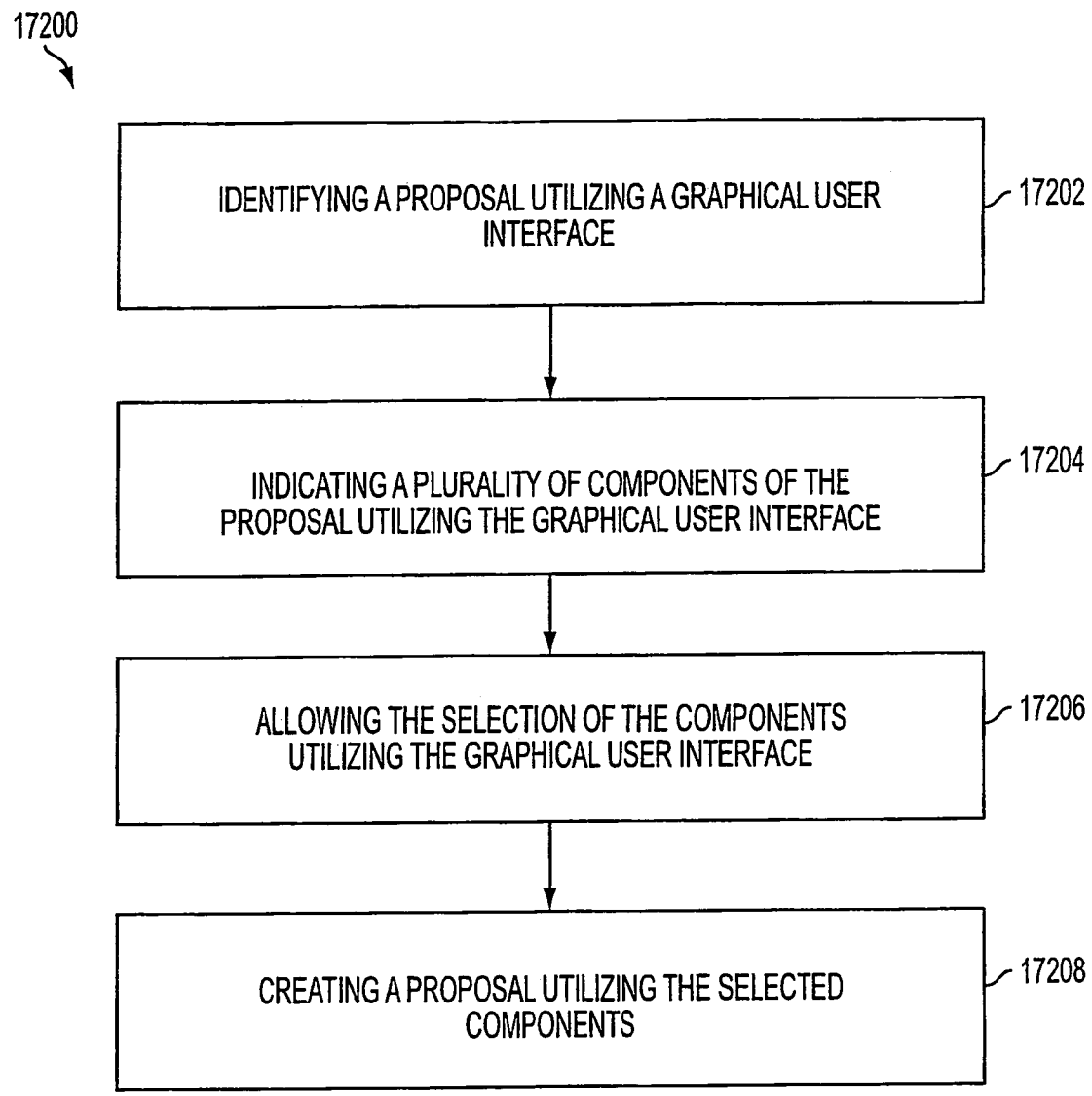
Figure 173:
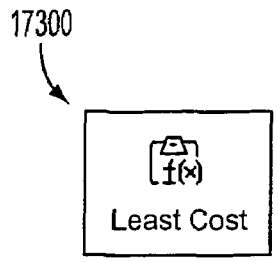
Figure 174:
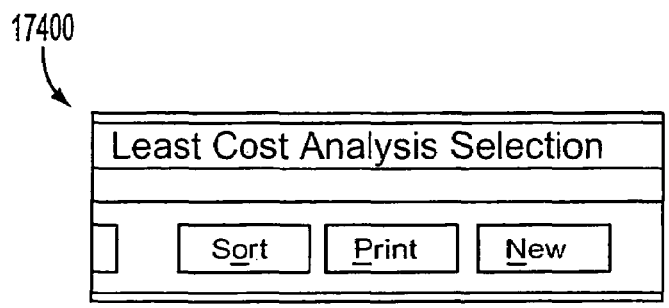
Figure 175:
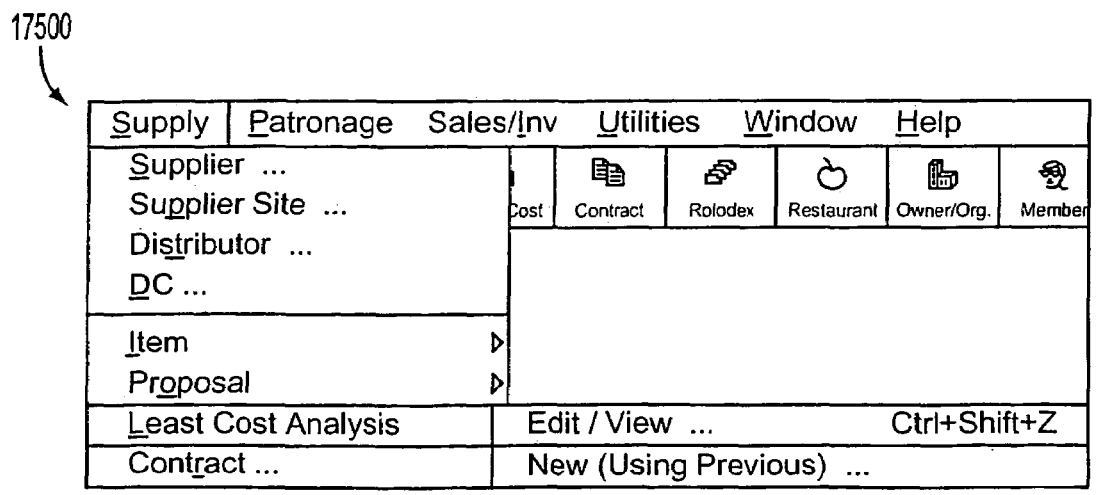
Figure 177:
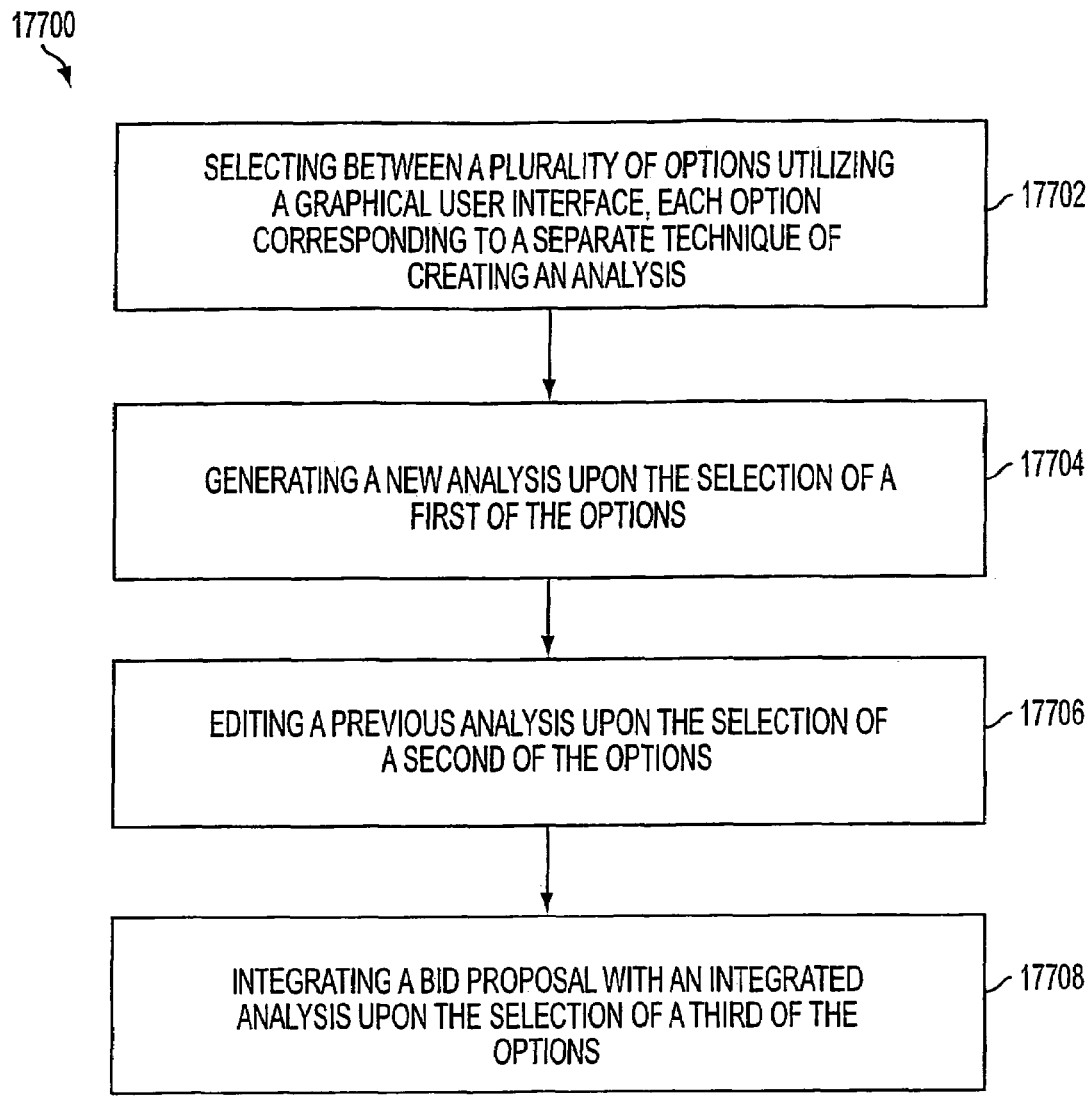
Figure 180:
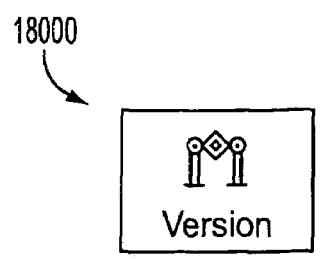
Figure 181:
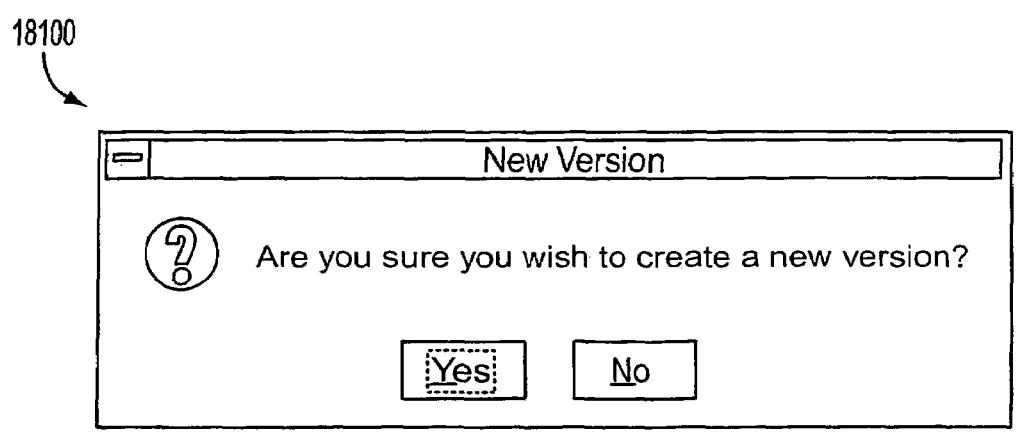
Figure 182:
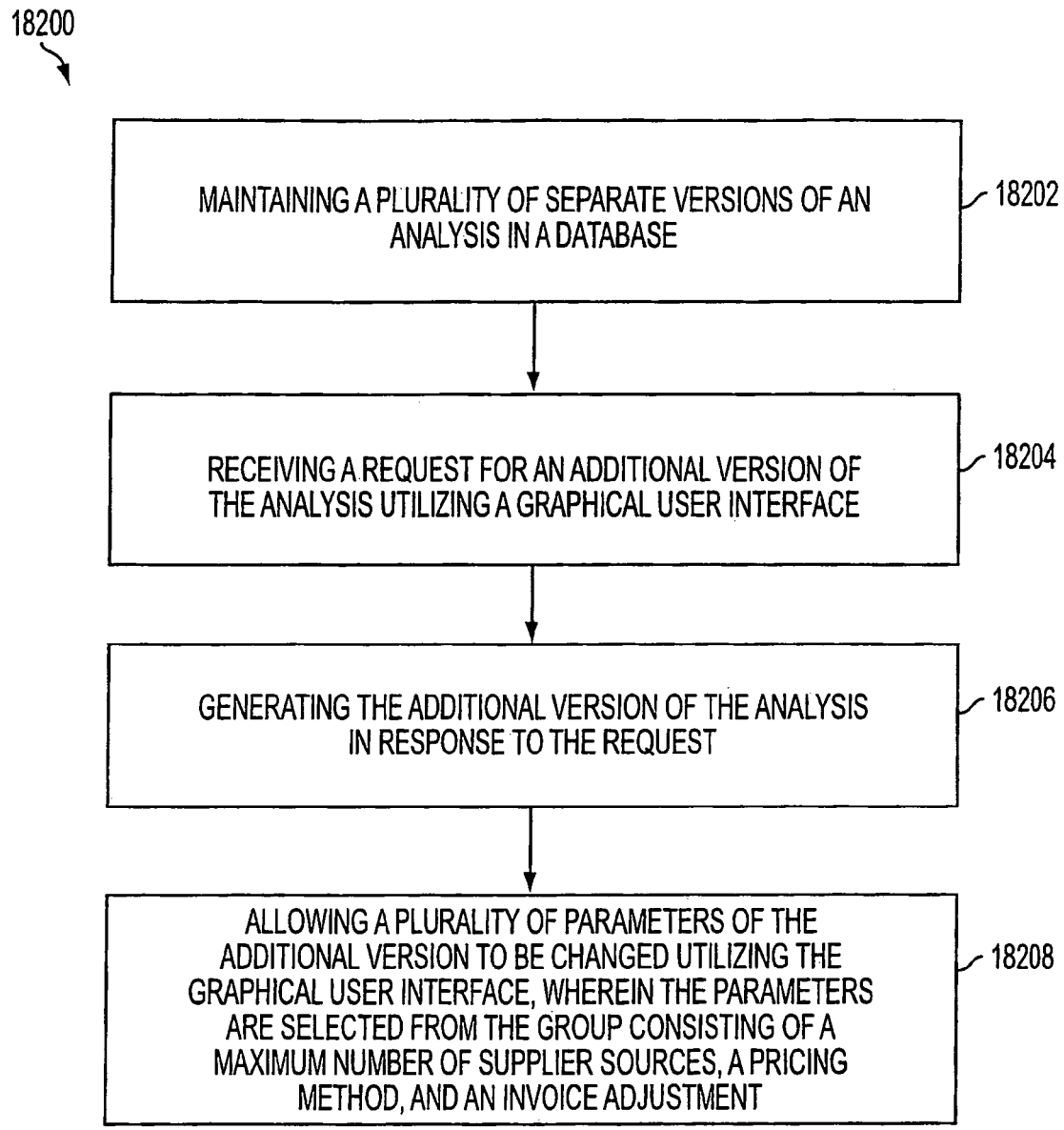
Figure 183:
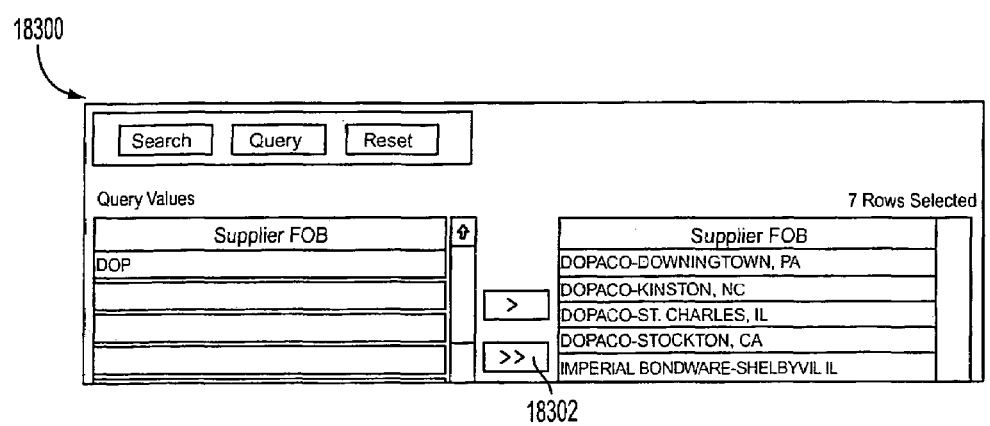
Figure 184:
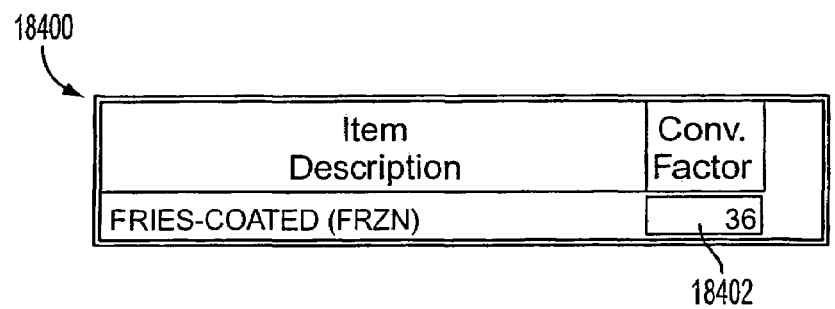
Figure 185:
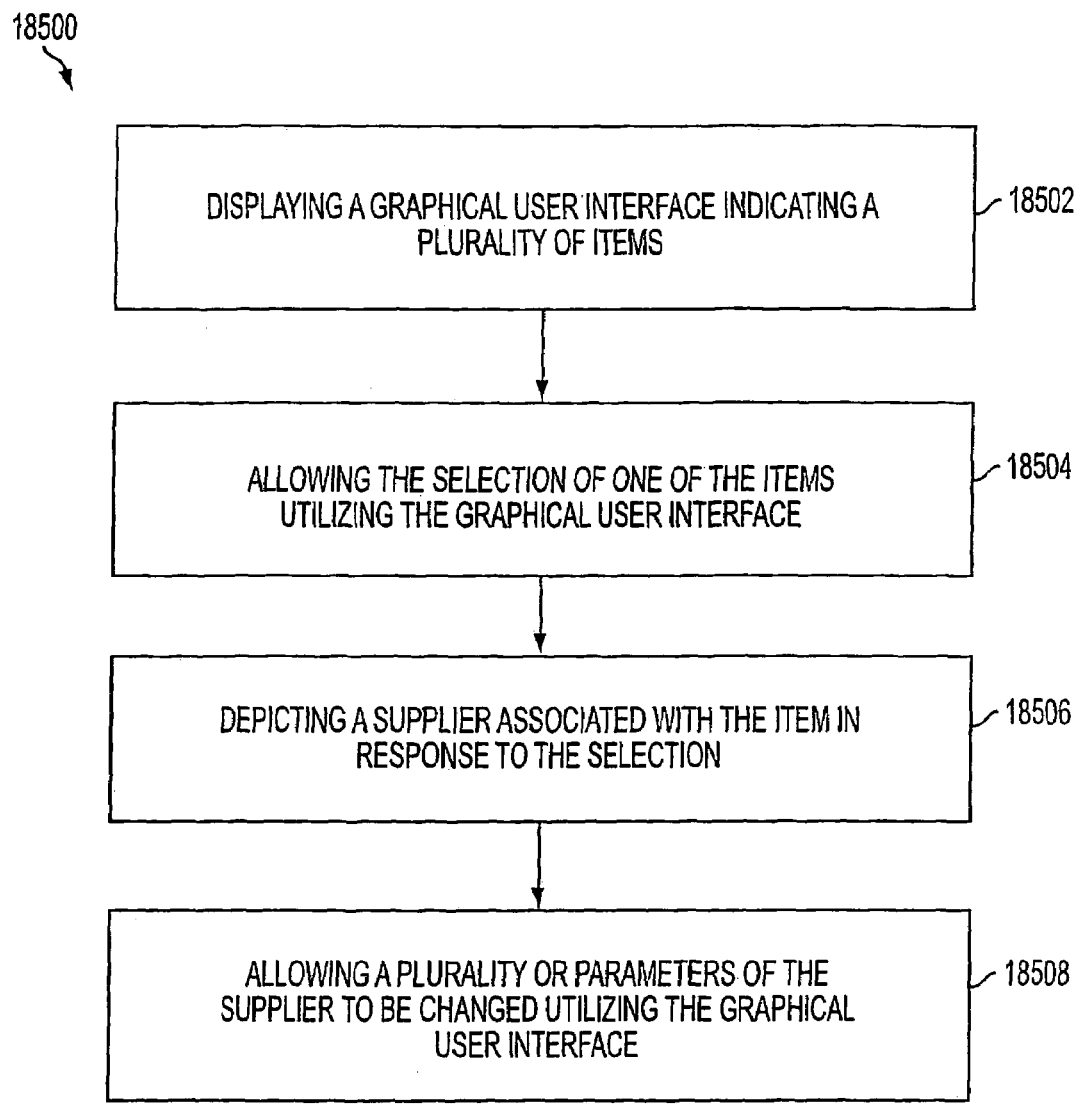
Figure 188:
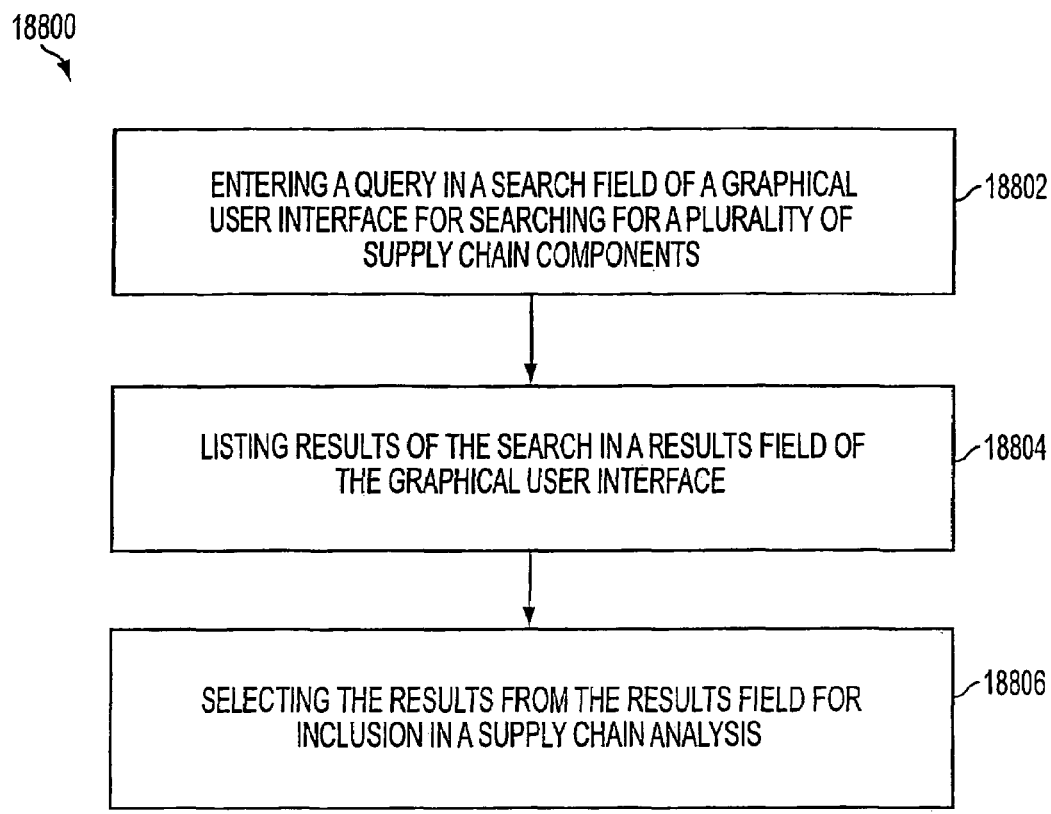
Figure 191:
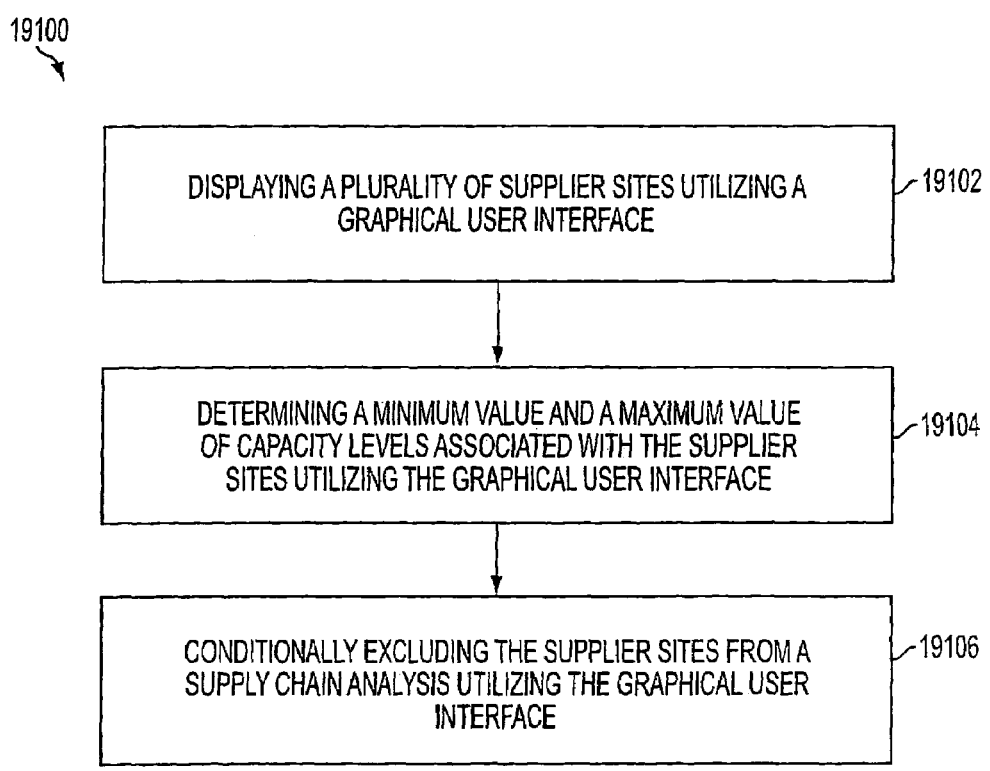
Figure 195:
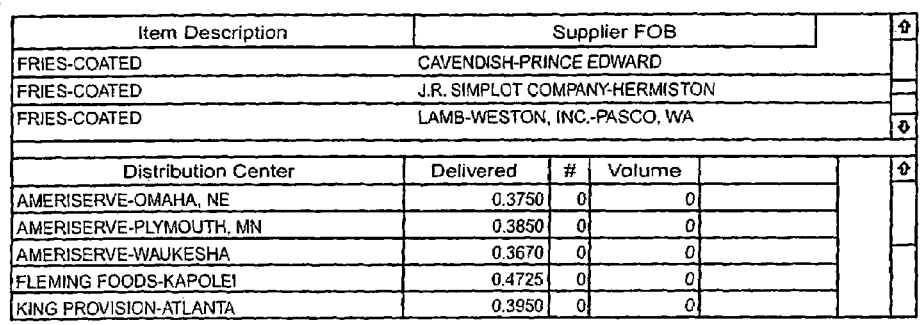
Figure 196:
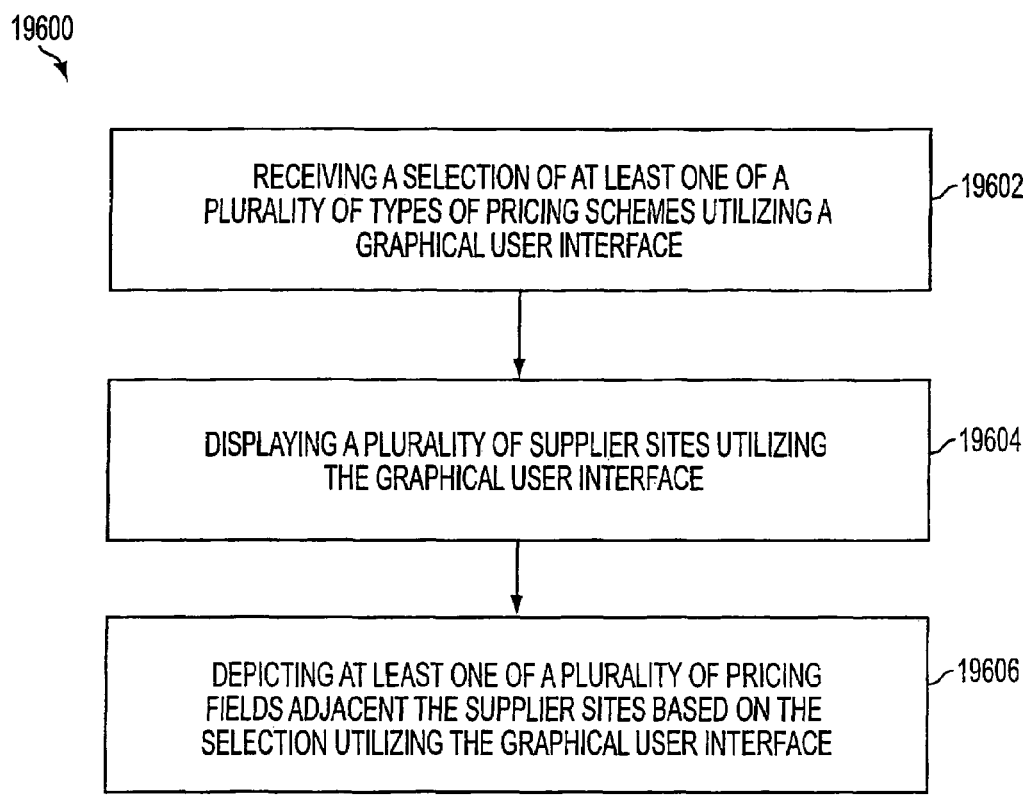
Figure 199:
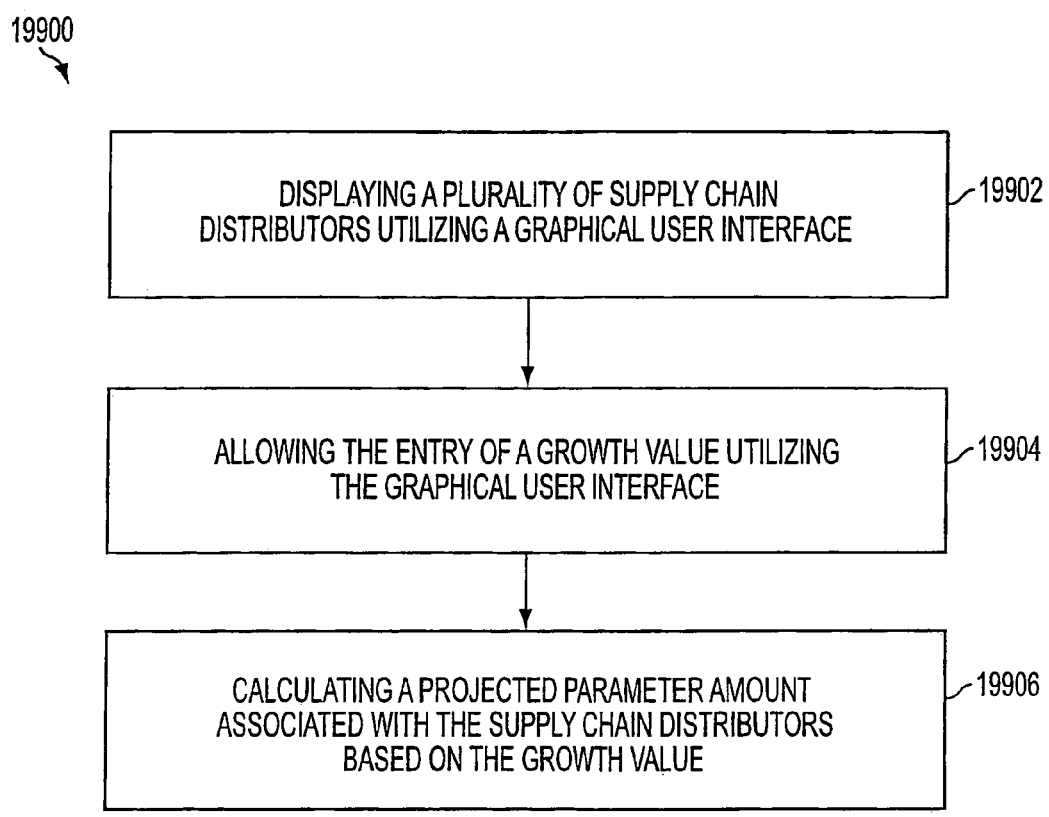
Figure 203:
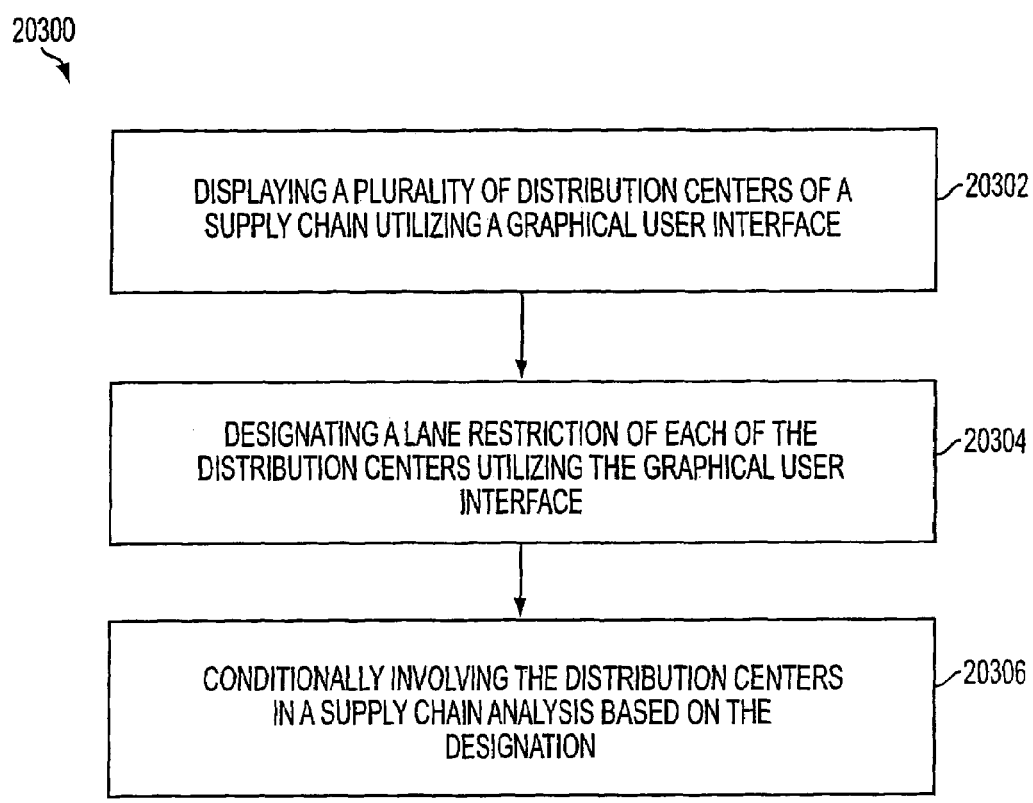
Figure 206:
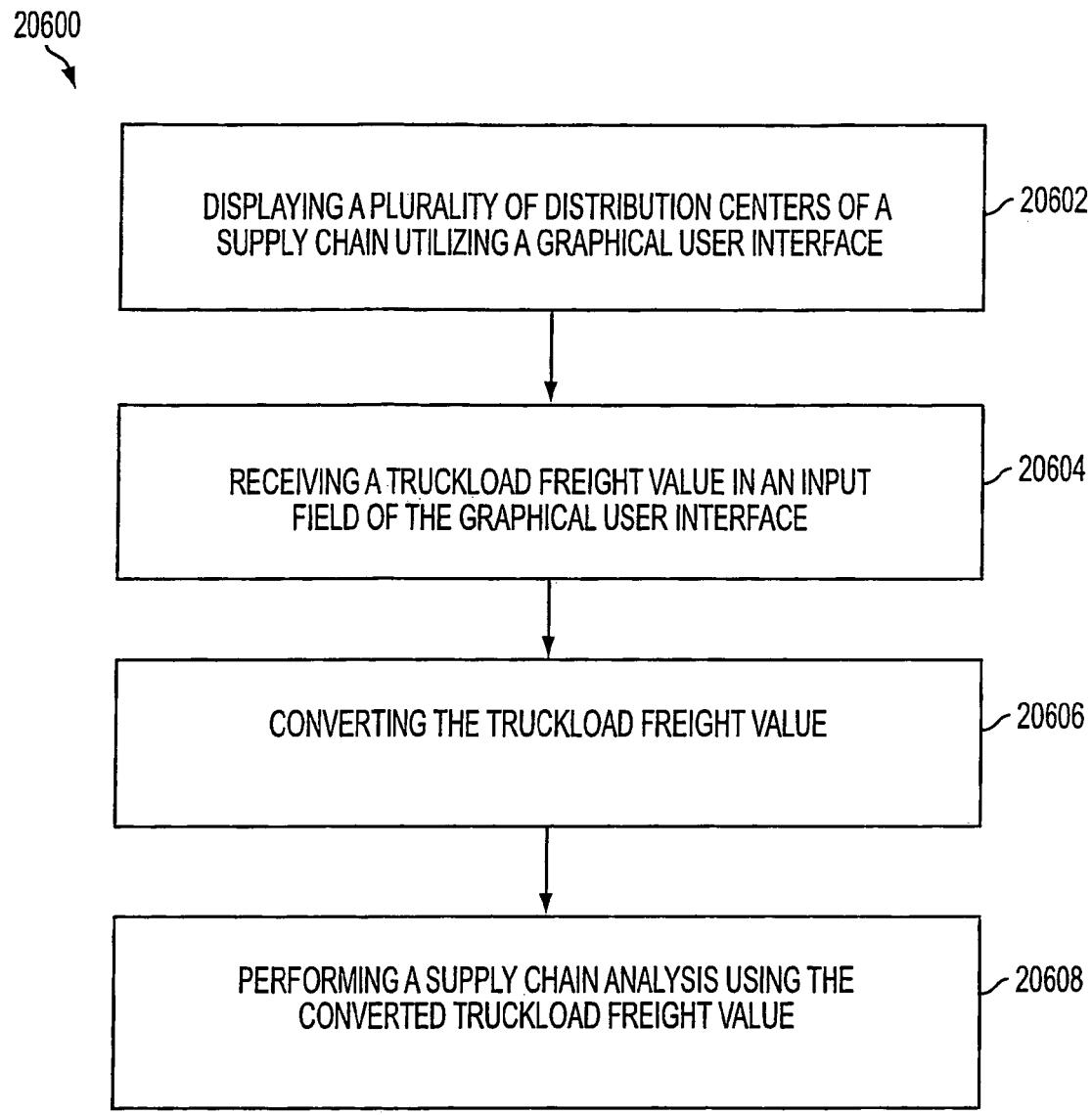
Figure 208:
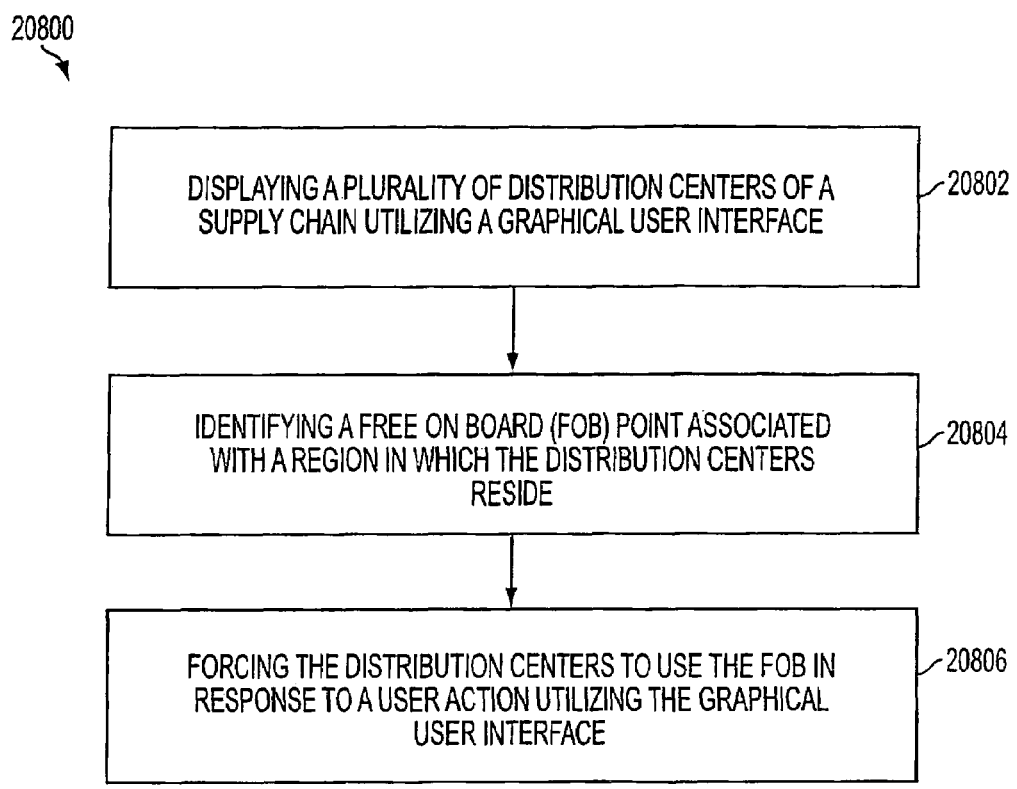
Figure 211:
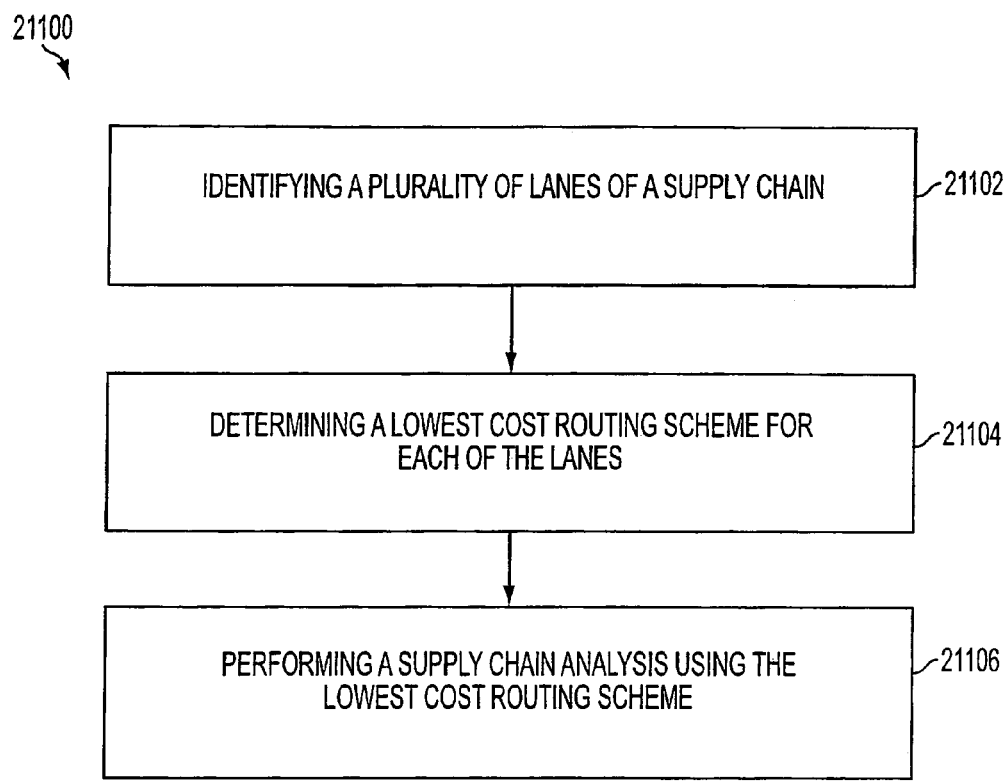
Figure 212:
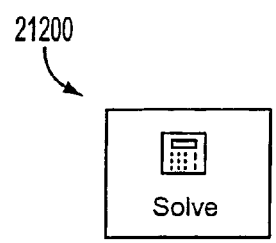
Figure 213:
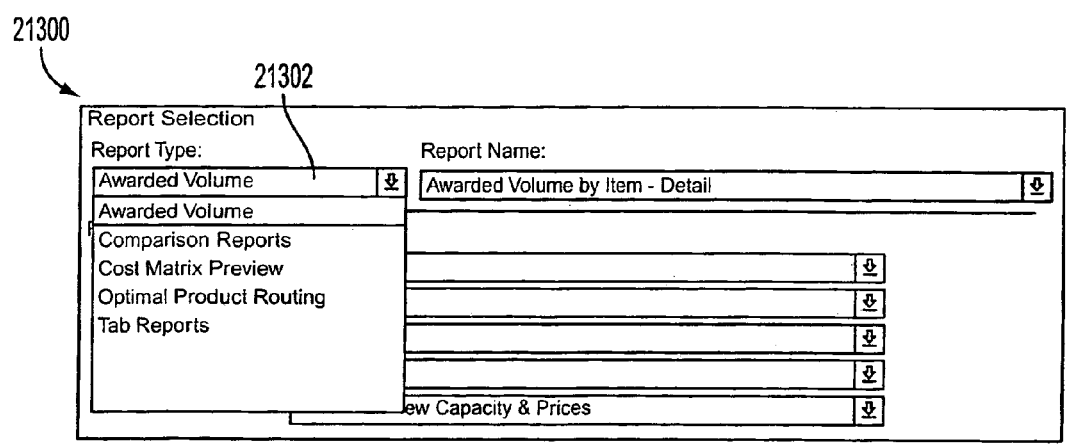
Figures 218, 219:
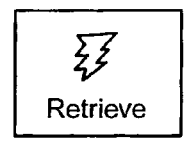
Figure 220:
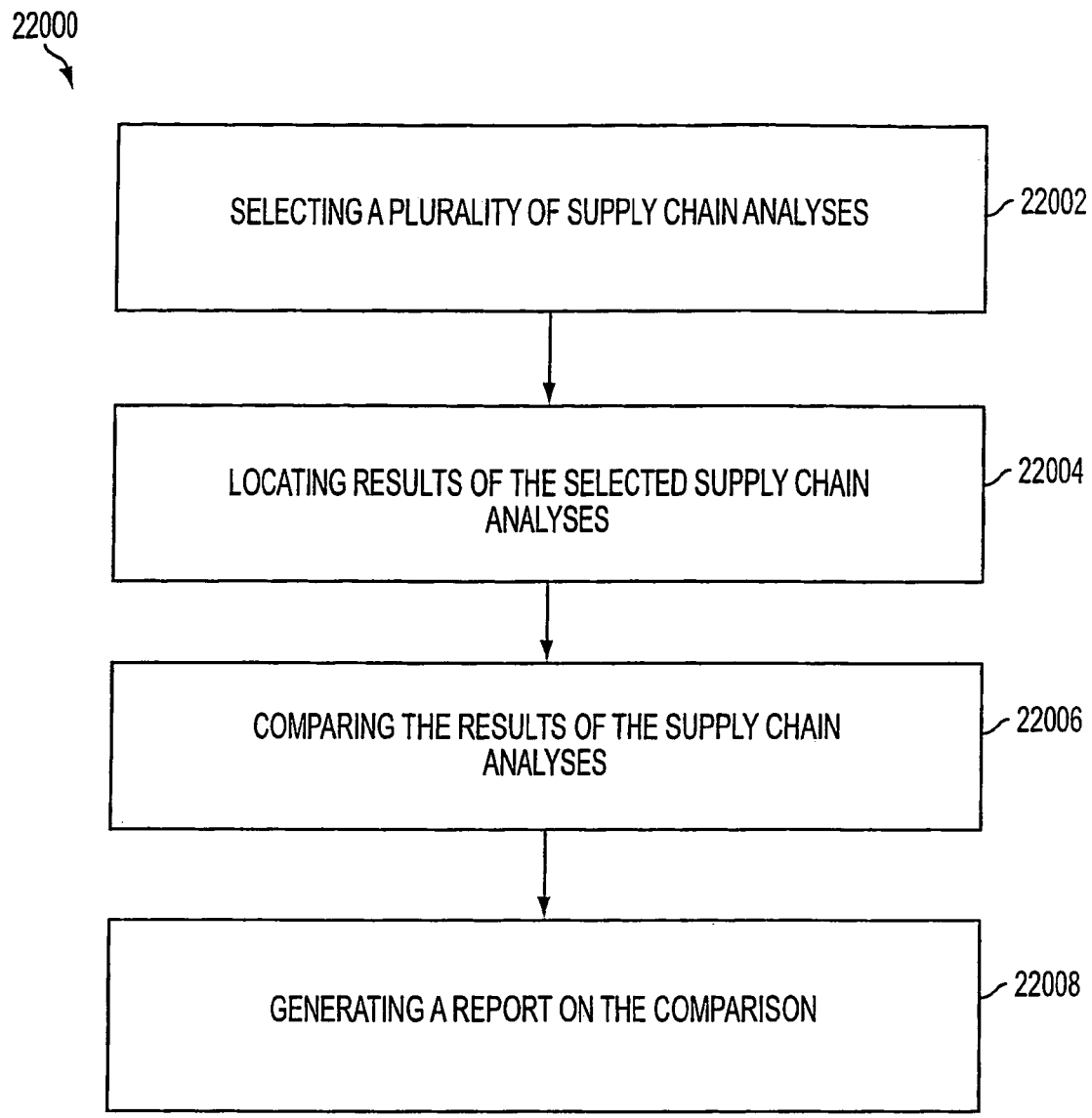
Figure 221:
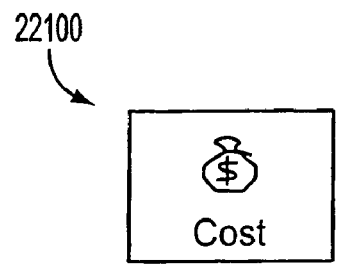
Figure 222:
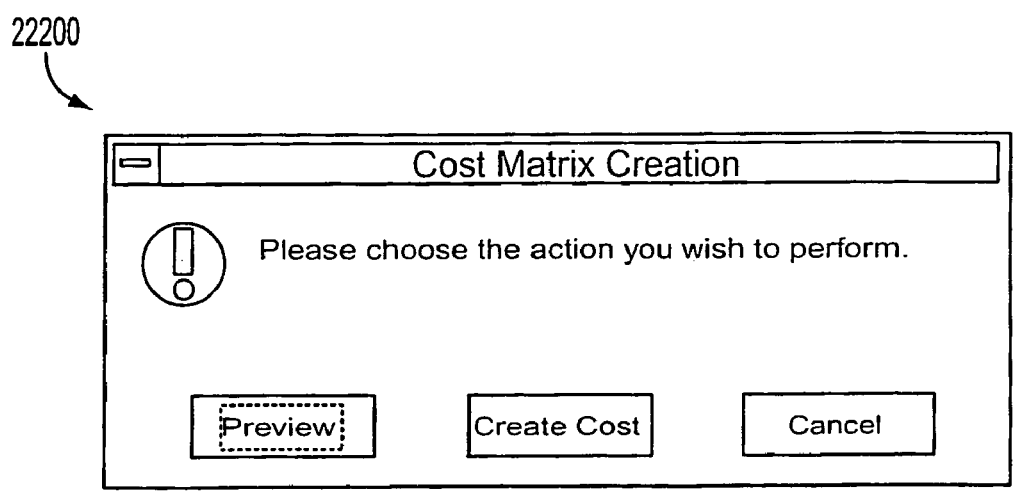
Figures 223, 224:
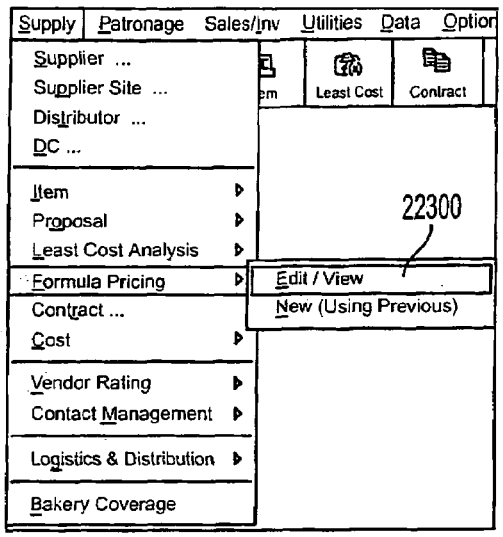
Figure 228:
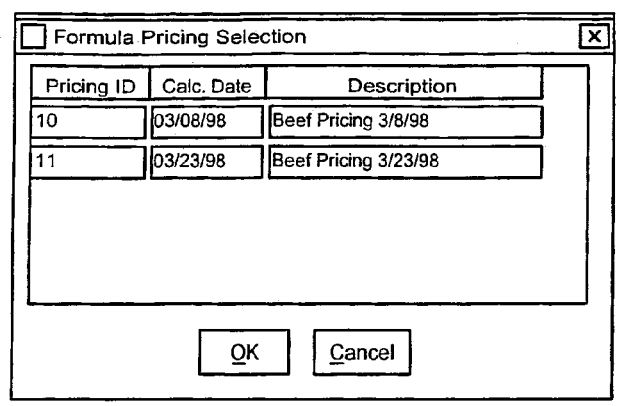
Figure 229:
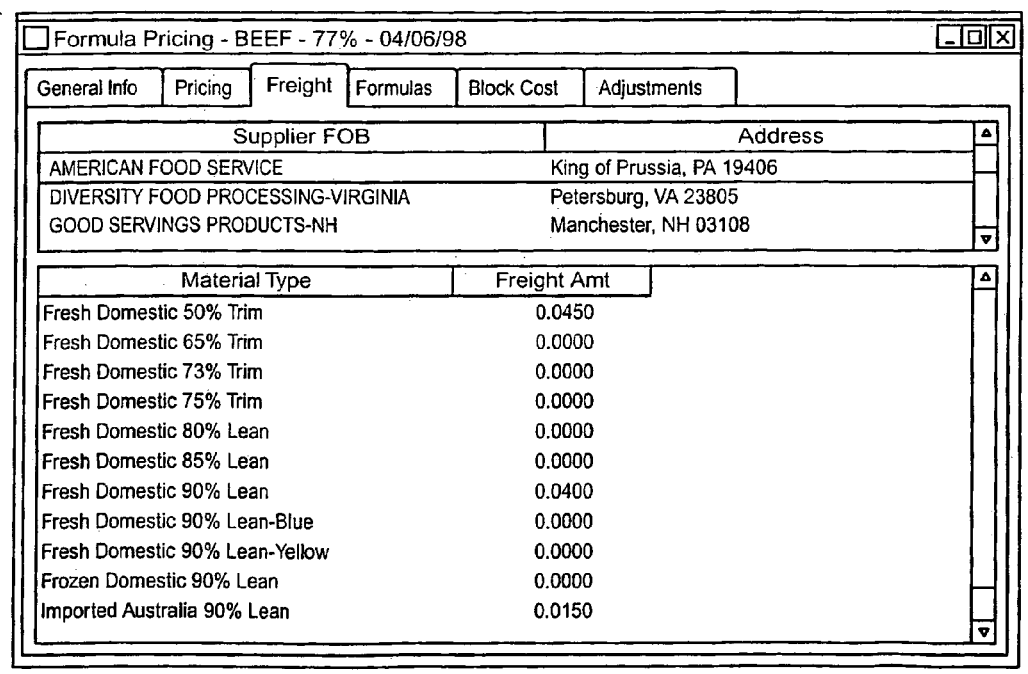
Figure 238:
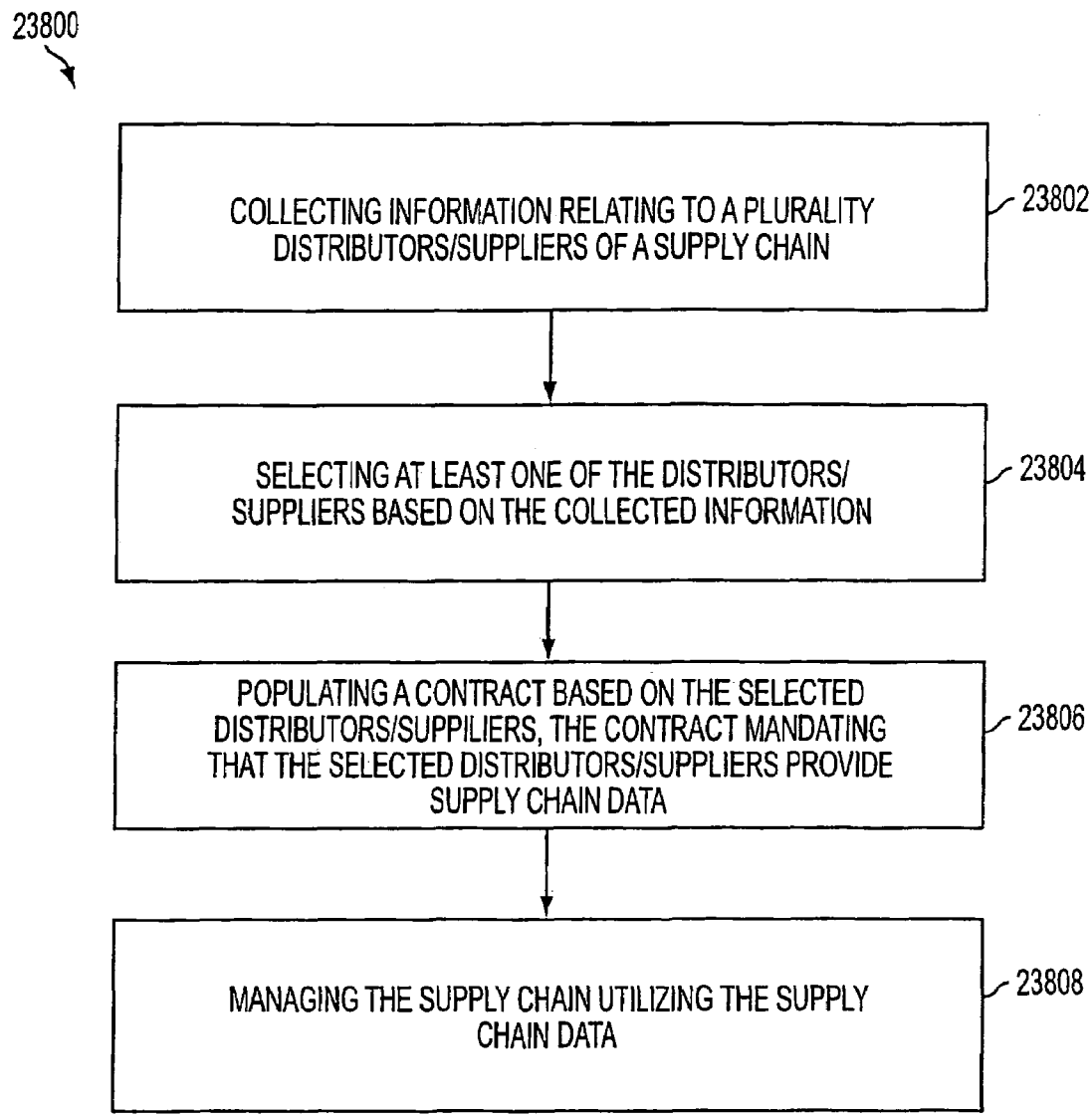
Figure 239:
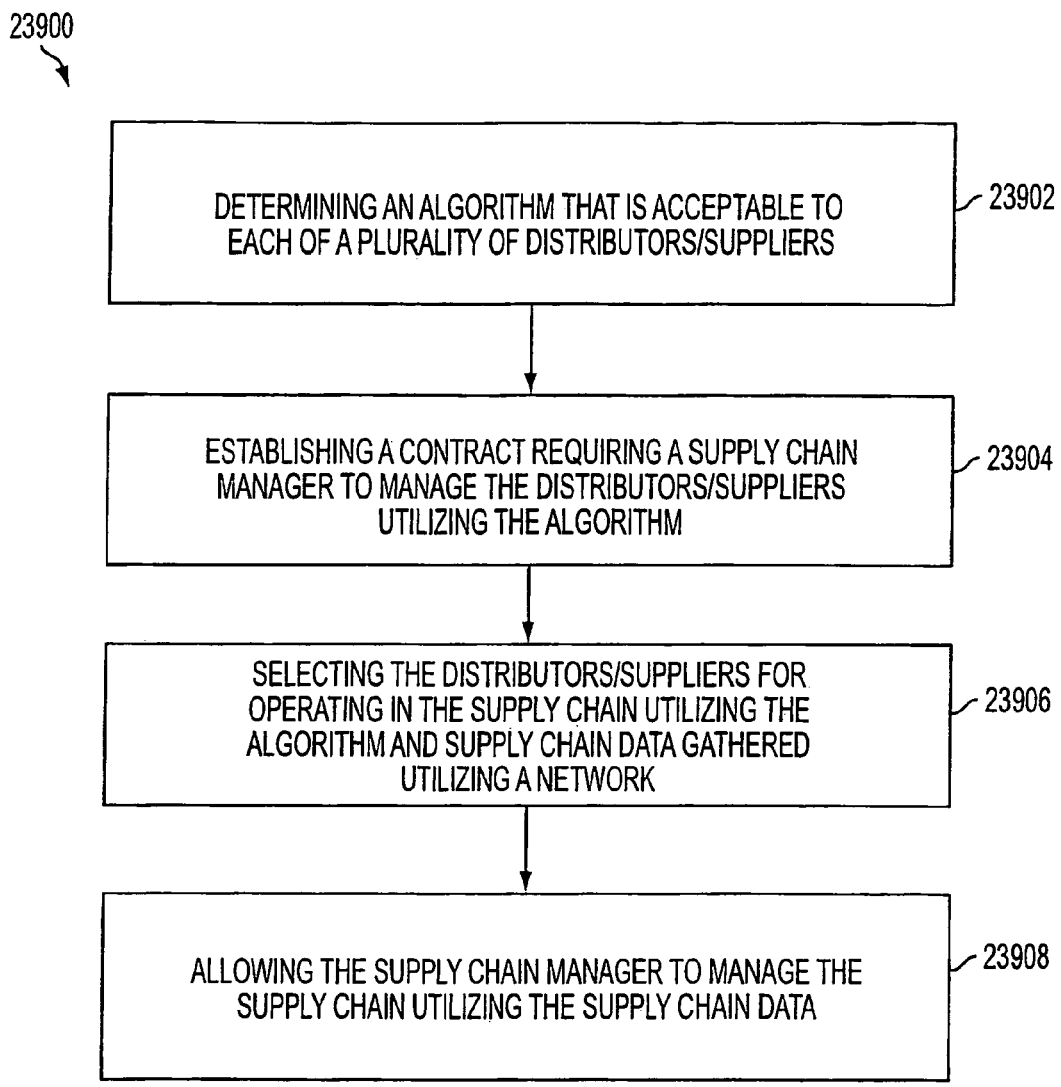
Figure 240:
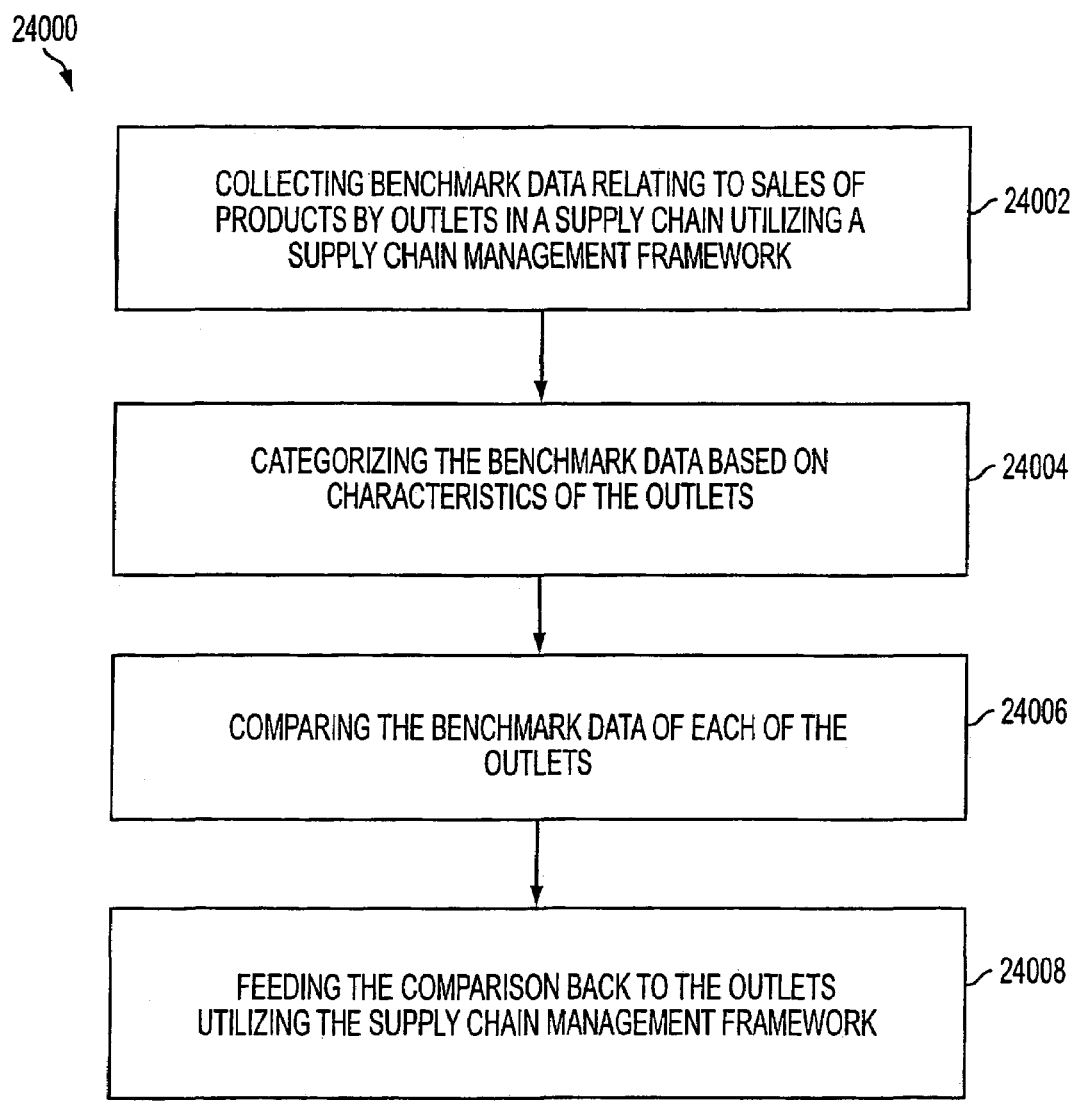
Figure 241:
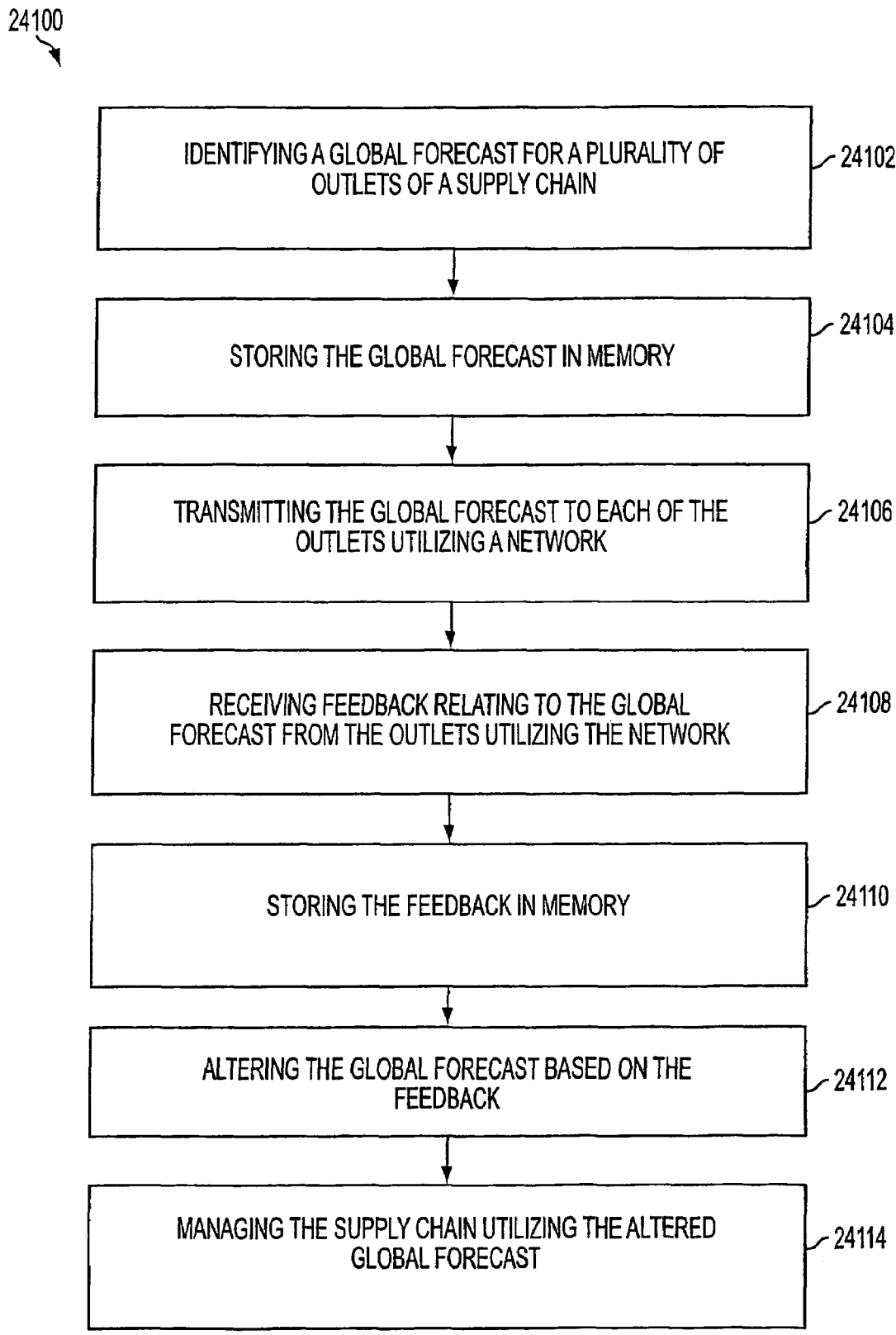

FIG. 126 depicts a selection screen;

FIG. 127 illustrates an Add Items window displayed upon selecting Items from the Supply menu and New for the selection screen;

FIG. 128 illustrates a Landed Cost Report by Distribution Center;

FIG. 129 illustrates an Item/FOB button that calls up an FOB window;

FIG. 130 depicts an FOB window;

FIG. 131 illustrates a window for adding an FOB point;

FIG. 132 depicts a screen for adding Distribution Centers;

FIG. 133 is a flowchart of a process for creating cost system components in a supply chain utilizing a network in accordance with an embodiment of the present invention;

FIG. 134 illustrates a matrix window for creating matrices;

FIG. 135 illustrates a matrix that identifies the source and destination for a product in question;

FIG. 136 illustrates an FOB matrix;

FIG. 137 illustrates a contract matrix;

FIG. 138 depicts a Contract button;

FIG. 139 depicts a minimum order matrix;

FIG. 140 illustrates a shipping matrix;

FIG. 141 shows an Options menu;

FIG. 142 illustrates a Notification toolbar button;

FIG. 143 illustrates selection of a Multi-Item Price Notification;

FIG. 144 is a flowchart of a process for utilizing cost models in a supply chain utilizing a network in accordance with an embodiment of the present invention;

FIG. 145 depicts a New Item button;

FIG. 146 illustrates a Contract/Buyer association screen;

FIG. 147 depicts a contract schedule screen;

FIG. 148 illustrates a Generate button;

FIG. 149 illustrates an Exhibit A button, which upon selection provides the Supplier with the "Approved Products" listing for the current contract;

FIG. 150 illustrates an Exhibit B button, which upon selection provides the detail on per case pricing and volume for each lane assigned to this Supplier;

FIG. 151 shows a screen for selecting end dates to use on an exhibit;

FIG. 152 illustrates an Options drop down menu;

FIG. 153 depicts an Exhibit C button for generating a report which lists product routing for each lane and any minimum order quantities;

FIG. 154 is a flowchart of a process for creating a contract utilizing a supply chain graphical user interface in accordance with an embodiment of the present invention;

FIG. 155 shows a Proposal submenu;

FIG. 156 illustrates a Bid Proposal window used for generating a proposal;

FIG. 157 illustrates toolbar buttons for adding, deleting and printing actions;

FIG. 158 illustrates a page under the Items tab;

FIG. 159 illustrates the page under the Items tab upon selection of the Search button;

FIG. 160 illustrates a page under the FOB Price tab for selecting FOB price component worksheets;

FIG. 161 depicts a window for managing Distribution Center usage;

FIG. 162 is a flowchart of a process for creating a bid proposal utilizing a supply chain graphical user interface in accordance with an embodiment of the present invention;

FIG. 163 illustrates a Templates button which calls a Template window;

FIG. 164 depicts the Template window called by the Templates button;

FIG. 165 illustrates a window displayed upon selection of the Templates tab;
FIG. 166 is an illustration of a Microsoft Word menu;
FIG. 167 is an illustration of the page presented upon selection of the Create Bid tab;
FIG. 168 shows a Create Bid button;
FIG. 169 illustrates a drop down list box from which a user can select reports for viewing;
FIG. 170 illustrates a Print button;
FIG. 171 depicts a Print Bid button;
FIG. 172 is a flowchart of a process for proposal reporting utilizing a supply chain graphical user interface in accordance with an embodiment of the present invention;
FIG. 173 depicts a Least Cost toolbar button;
FIG. 174 illustrates a standard query screen;
FIG. 175 shows a Supply menu;
FIG. 176 depicts a drop down list for changing Bid selection;
FIG. 177 is a flowchart of a process for analysis creation utilizing a supply chain graphical user interface in accordance with an embodiment of the present invention;
FIG. 178 illustrates a window displayed upon beginning an analysis;
FIG. 179 depicts an option selection window;
FIG. 180 illustrates a version button for creating new versions of analyses;
FIG. 181 illustrates a verification window that appears upon selection of the version button;
FIG. 182 is a flowchart of a process for analysis version control in a supply chain management framework in accordance with an embodiment of the present invention;
FIG. 183 depicts a tab page for adding and removing FOBs from an analysis;
FIG. 184 illustrates a portion of the Item tab page;
FIG. 185 is a flowchart of a process for editing supplier information in a supply chain management framework in accordance with an embodiment of the present invention;
FIG. 186 illustrates a page that is displayed upon selection of the Item/FOB tab;
FIG. 187 shows an Update button for updating cost information;
FIG. 188 is a flowchart of a process for adding components in a supply chain management analysis in accordance with an embodiment of the present invention;
FIG. 189 is an illustration of an exemplary analysis window displayed upon selecting a Capacity tab;
FIG. 190 illustrates another analysis window;
FIG. 191 is a flowchart of a process for managing supplier sites in a supply chain management framework in accordance with an embodiment of the present invention;
FIG. 192 is a depiction of an FOB pricing window;
FIG. 193 depicts an illustrative FOB Volume Pricing screen;
FIG. 194 depicts a Supplier Volume Pricing window;
FIG. 195 shows a Delivered Pricing screen;
FIG. 196 is a flowchart of a process for pricing in a supply chain management framework in accordance with an embodiment of the present invention;
FIG. 197 is a depiction of a Projected Restaurant Growth screen;
FIG. 198 illustrates a Projected Usage Estimation screen;
FIG. 199 is a flowchart of a process for projecting distribution center usage in a supply chain management framework in accordance with an embodiment of the present invention;
FIG. 200 illustrates an Excluding Lanes screen displayed upon selection of a Lane Restrict tab;

FIG. 201 is a depiction of a Forcing Lanes window;
FIG. 202 depicts a message screen;
FIG. 203 is a flowchart of a process for restricting lanes in a supply chain management framework in accordance with an embodiment of the present invention;
FIG. 204 is an illustration of a Truckload Freight window displayed upon selection of a TL Freight tab;
FIG. 205 illustrates an LTL Freight page;
FIG. 206 is a flowchart of a process for managing freight in a supply chain management framework in accordance with an embodiment of the present invention;
FIG. 207 depicts a restriction window;
FIG. 208 is a flowchart of a process for imposing regional restrictions in a supply chain management framework in accordance with an embodiment of the present invention;
FIG. 209 shows a Routing button;
FIG. 210 illustrates a Report Selection window;
FIG. 211 is a flowchart of a process for product routing in a supply chain management framework in accordance with an embodiment of the present invention;
FIG. 212 illustrates a Solve button;
FIG. 213 illustrates the Report Selection window which allows selection of the report type;
FIG. 214 illustrates a Report Name drop down list of related reports;
FIG. 215 illustrates another Report Name drop down list of related reports;
FIG. 216 shows a Report Selection window;
FIG. 217 depicts a report name drop down list;
FIG. 218 illustrates parameter entry fields for report generation;
FIG. 219 shows a Retrieve button for retrieving a report;
FIG. 220 is a flowchart of a process for comparison reporting in a supply chain management framework in accordance with an embodiment of the present invention;
FIG. 221 illustrates a Cost button;
FIG. 222 is a depiction of a Cost Matrix Creation window;
FIG. 223 illustrates the Formula Pricing submenu of the Supply drop down menu;
FIG. 224 illustrates a Formula Pricing window;
FIG. 225 depicts the page displayed upon selecting the Pricing Tab;
FIG. 226 shows a message window;
FIG. 227 is an illustration of another message window;
FIG. 228 depicts a selection window to allow selection of the pricing data that the user wants to copy over the current pricing;
FIG. 229 is an illustration of the page displayed upon selection of the Freight Tab;
FIG. 230 is a depiction of the page displayed upon selection of the Formulas Tab;
FIG. 231 illustrates the page displayed upon selection of the Block Cost Tab;
FIG. 232 is a depiction of the page displayed upon selection of the Adjustments Tab;
FIG. 233 depicts toolbar icons used to insert or delete adjustments;
FIG. 234 illustrates an RM Letter icon;
FIG. 235 illustrates the Formula Maintenance window that is used to modify or add new formulas; and
FIG. 236 illustrates a Formula Pricing submenu from which a user can open the Formula Maintenance window.

DETAILED DESCRIPTION

The present invention allows participants in a supply chain for an enterprise or collection of enterprises to function as an integrated system. The Supply Chain model of the present invention is responsive and efficient, based on electronic access to critical information that is available when it is needed at various points throughout the Supply Chain. As a result the Supply Chain is highly flexible, reliable and user friendly, responsive to consumer demands, able to respond to short lead times and able to significantly lower Supply Chain costs.

The present invention positions a Brand for growth, competition and profitability by installing and managing the infrastructure that facilitates accurate, timely and relevant information flows throughout the Supply Chain.

The present invention overcomes traditional difficulties with supply chain information flows, namely that the flow of information is fragmented, untimely, and/or nonexistent. Further, the present invention overcomes deficiencies in prior art supply chain information systems such as limited access; limited participation; and inadequate infrastructure; which result in the unavailability of accurate, timely management information from Supply Chain activities; business decisions not being based on the best information; unfavorable impact on the cost of products; and error prone, time consuming, and costly activities throughout the Supply Chain.

The organizational structure, technology applications and information systems that form portions of the Supply Chain are enablers that allow for effective management of the Supply Chain. The methodology of the present invention provides the means to efficiently capture, analyze and feed back timely Supply Chain data to the appropriate parties.

The claimed invention is applicable to many different industries, including but not limited to, pharmaceuticals, health and personal care products, computer and internet technology, automotive, home product supply, food and beverage, telecommunications, machinery, air conditioning and refrigeration, chemical, department store supply, office product supply, aircraft and airline related industries, education, consumer electronics, hotel, gasoline stations, convenience stores, music and video, etc. For purposes of illustration only, portions of the following description will be placed in the context of a Supply Chain for food services, including food distribution, retail outlet management and operation, and marketing. One skilled in the art will appreciate that the various embodiments and concepts of the present invention are applicable to a plethora of industries without straying from the spirit of the present invention. As such, the scope of the present invention is to be in no way limited to food services only.

Overview

The present invention includes a supply chain management system involving at least one supply chain participant. Supply chain participants include a supply chain manager. The supply chain manager may be a supply chain participant, a department of, division of or consultant for a supply chain participant, or an independent entity unrelated to the other supply chain participants. The supply chain manager may be allowed to exercise management rights without taking title or possession of any goods passing through the supply chain.

Supply chain participants may also include brand owners, point of sale outlets, point of sale outlet owners, a cooperative or consortium of point of sale outlet owners, distributors, or suppliers. Suppliers may supply one or more of finished goods, partially finished goods or raw materials.

The supply chain management system of the present invention includes six system components which may be integrated independently, on a parallel path, but ultimately are able to electronically interface with each other. Typically, a supply chain may include retailers, distributors and suppliers or equivalents thereof.

The supply chain management system according to one aspect of the present invention, increases the Quality Of Service (QOS) to supply chain participants, lowers costs and adds new value to supply chain participants with its "predictive" nature based on statistically driven models, discussed below.

Supply chain participants, as used herein, refers without limitation to stores and other vendors/outlets, distributors, suppliers, etc. Further, suppliers include suppliers of raw, partially finished, and finished goods.

In general, the supply chain management system integrates various components, which components may include:
1. In-Retailer Systems
2. Retailer/Distributor Electronic Interface
3. Supplier/Distributor Electronic Interface
4. Data Warehouse
5. Information Services
6. Web Architecture and Internet Access It should be understood that some or all of these components or analogous components may also be applicable to various industries including those industries set forth above.

Figure 1A:
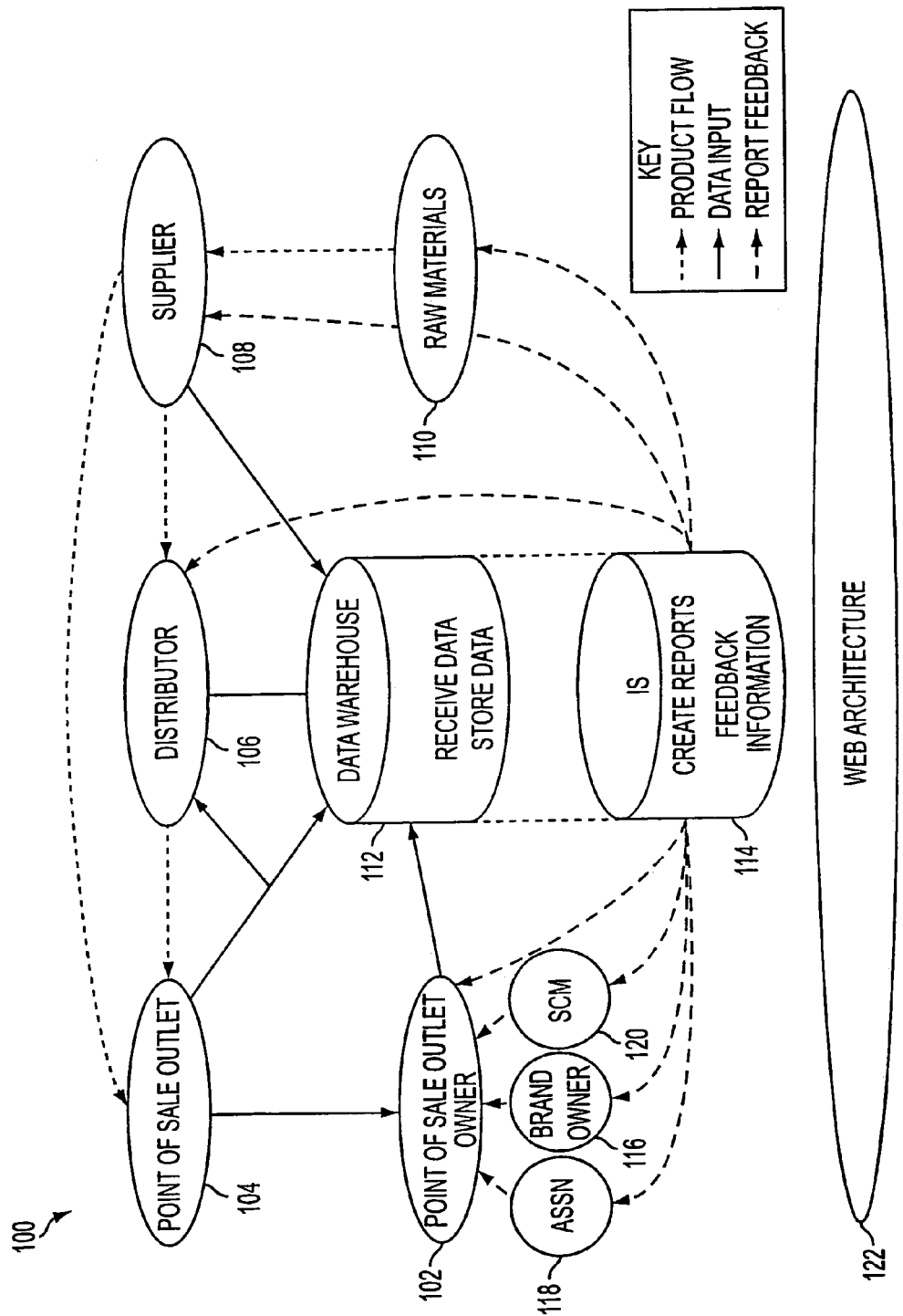
FIG. 1A illustrates an electronic reporting and feedback system according to an embodiment of the present invention.

FIG. 1A illustrates an electronic reporting and feedback system 100 according to an embodiment of the present invention.

In-Retailer Systems support point of sale outlet owners 102 with Point of Sale (POS) and BOH hardware and software solutions, and provide leadership in the evolution of retailer systems to ensure electronic connectivity to the Supply Chain. This component enables electronic data collection of daily menu item sales for the information database. It also enhances retailer operations by providing retail outlet managers with tools that help free their time to focus on the customers.

Retailer-Distributor Electronic Interface establishes an electronic purchasing system and thus "electronic commerce" between POS outlets 104 and distributors/"direct" suppliers 106,108. This includes electronic order entry (via Web or BOH), order confirmation, product delivery/receiving, electronic invoicing, electronic wire payment transfers, data collection, and most important, contract compliance and distributor performance measurement, which assists in managing distributor performance.

Supplier-Distributor Electronic Interface facilitates the development of electronic commerce between system suppliers and distributors including electronic ordering and confirmations, electronic invoicing and payments and electronic supplier performance measuring and reporting. Electronic commerce between raw material suppliers 110 and suppliers is also provided.

Data Warehouse 112 is a central collection point that electronically collects and warehouses timely, critical Supply Chain information for all Supply Chain participants. This includes distributor and supplier performance measures, representations of daily outlet item sales with translations to specified product requirements, and inventory levels, sales history and forecasts at various points in the Supply Chain, thereby providing a basis for collaborative planning and forecasting. The data stored in the Warehouse is then available for quick, secure access.

Information Services analyzes 114, organizes and feeds back Supply Chain data to meet the information needs of Supply Chain end users such as a brand owner 116, the Supply Chain Coordinator (SCC) 118, retail outlet management 120. This includes information on Supply Chain performance, collaborative planning and forecasting, promotion planning and inventory management. Services that benefit franchisees include electronic invoice auditing, distributor performance reporting, food cost reporting and analysis, franchisee sales/cost comparables, and other reports. Information Services also determines a proper format in which to present the data so that it is in the most useful form for the end user. It also works with Supply Chain users to develop/evaluate analytical/operational tools.

Web Architecture 122—underlying all this electronic activity is technology, the web architecture with Internet access (through proprietary service or an Internet Service Provider (ISP)) that allows these electronic communications to take place efficiently and effectively. Encompassed in this component is the building of initial web applications and security for the Supply Chain.

Figure 1B:
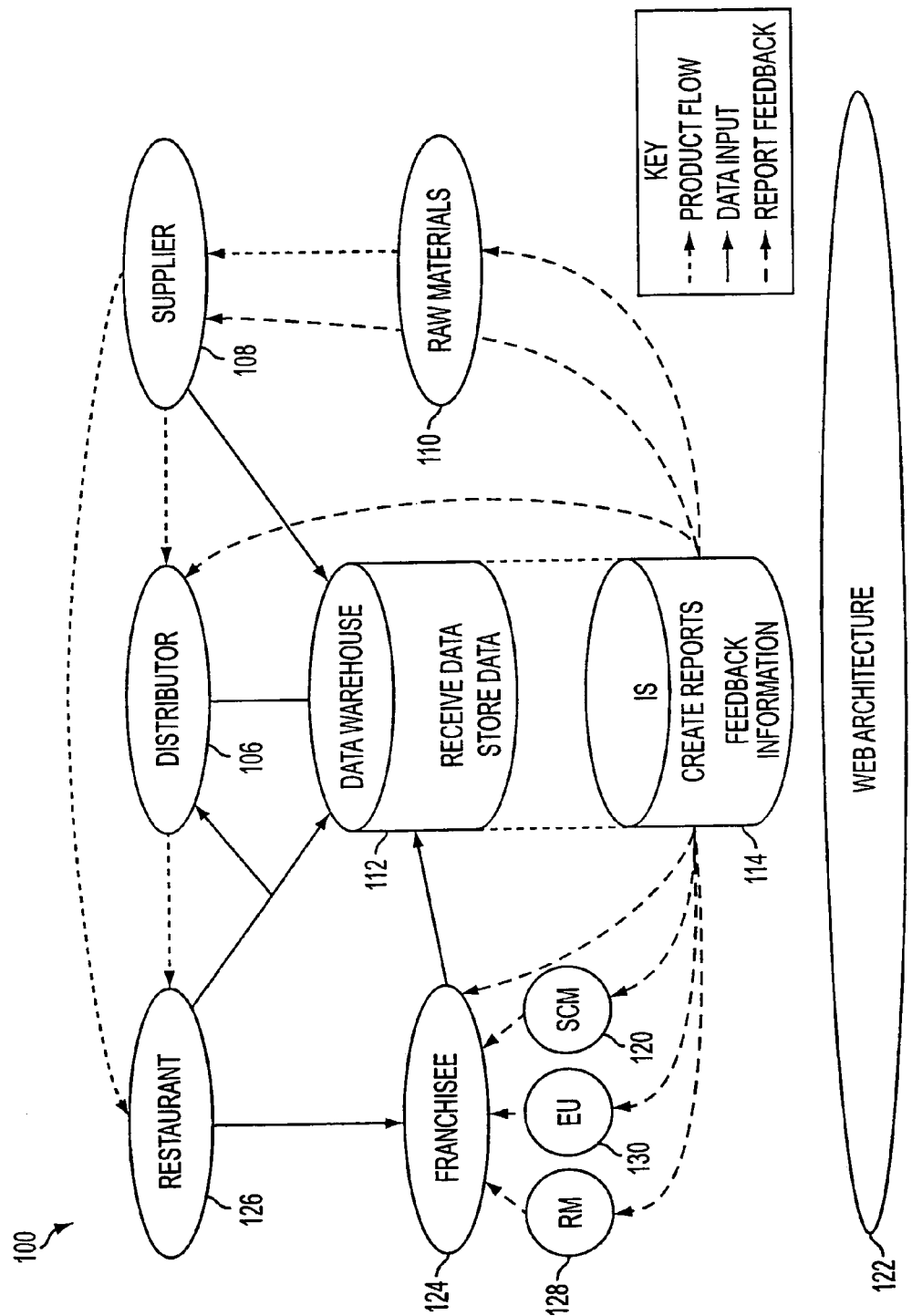
FIG. 1B illustrates an electronic reporting and feedback system for restaurants according to an illustrative embodiment of the present invention.

FIG. 1B illustrates the electronic reporting and feedback system 100 of FIG. 1A adapted for restaurants according to an illustrative embodiment of the present invention. In this situation, the POS outlet comprises a restaurant 126, a franchisee 124 is the POS outlet owner, and end users include restaurant management 128 and other end users 130.

Figure 2:
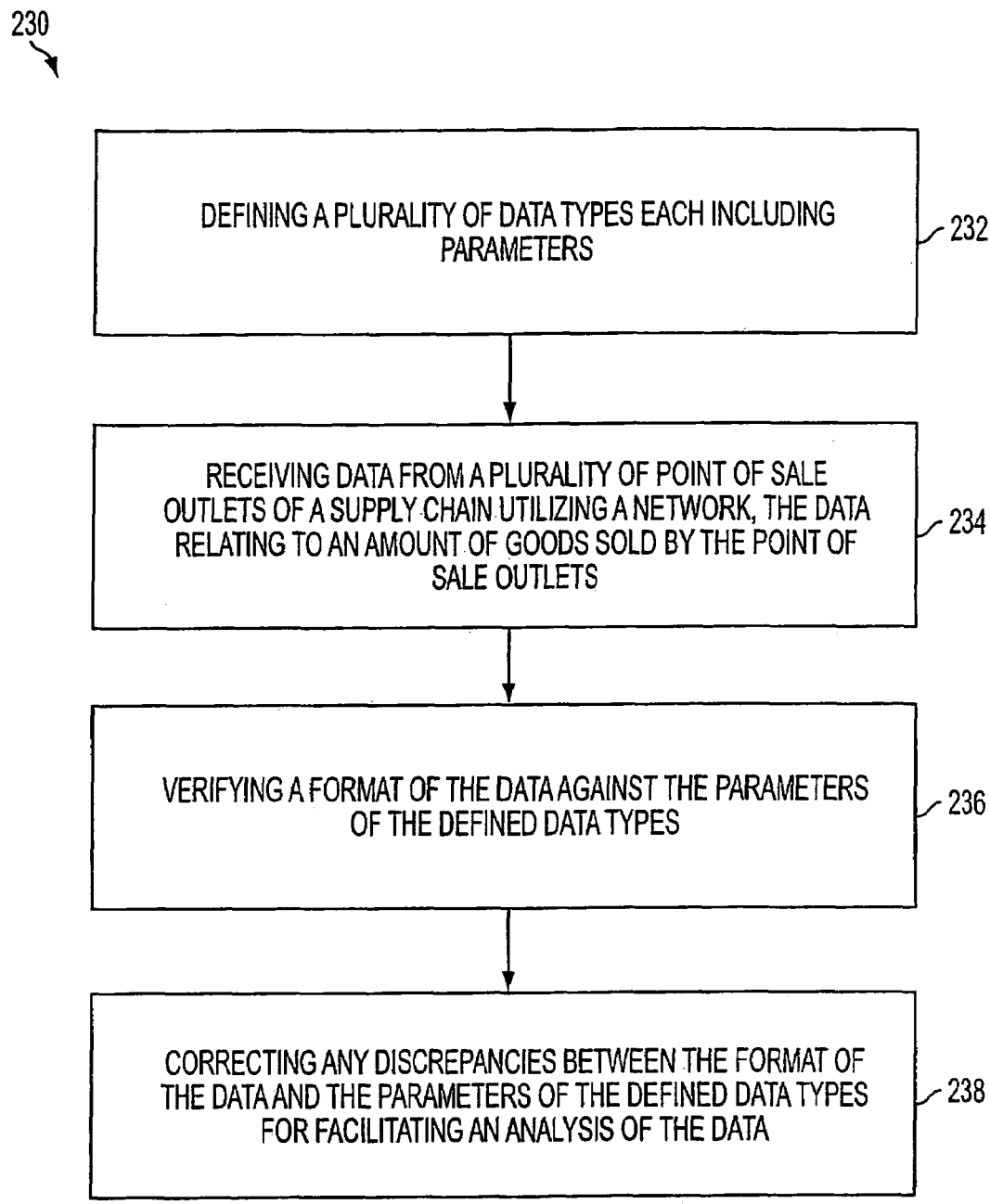
FIG. 2 is a flowchart of a process for normalizing data in a supply chain management framework in accordance with an embodiment of the present invention.

FIG. 2 is a flowchart of a process 230 for normalizing data in a supply chain management framework. A plurality of data types are defined with each data type including parameters in operation 232. Data is received utilizing a network from a plurality of POS outlets of a supply chain that relates to an amount of goods sold by the POS outlets in operation 234. A format of the data is verified against the parameters of the defined data types in operation 236 and any discrepancies between the format of the data and the parameters of the defined data types are corrected for facilitating an analysis of the data in operation 238.

In one aspect, the corrections may be logged. In another aspect, the discrepancies may be displayed utilizing a network-based interface. In a further aspect, discrepancies may be corrected by translating the format of the data in accordance with the parameters of the defined data types. In another aspect, the network may include the Internet. In an additional aspect, the corrected data may be displayed utilizing a network-based interface.

Figure 3:
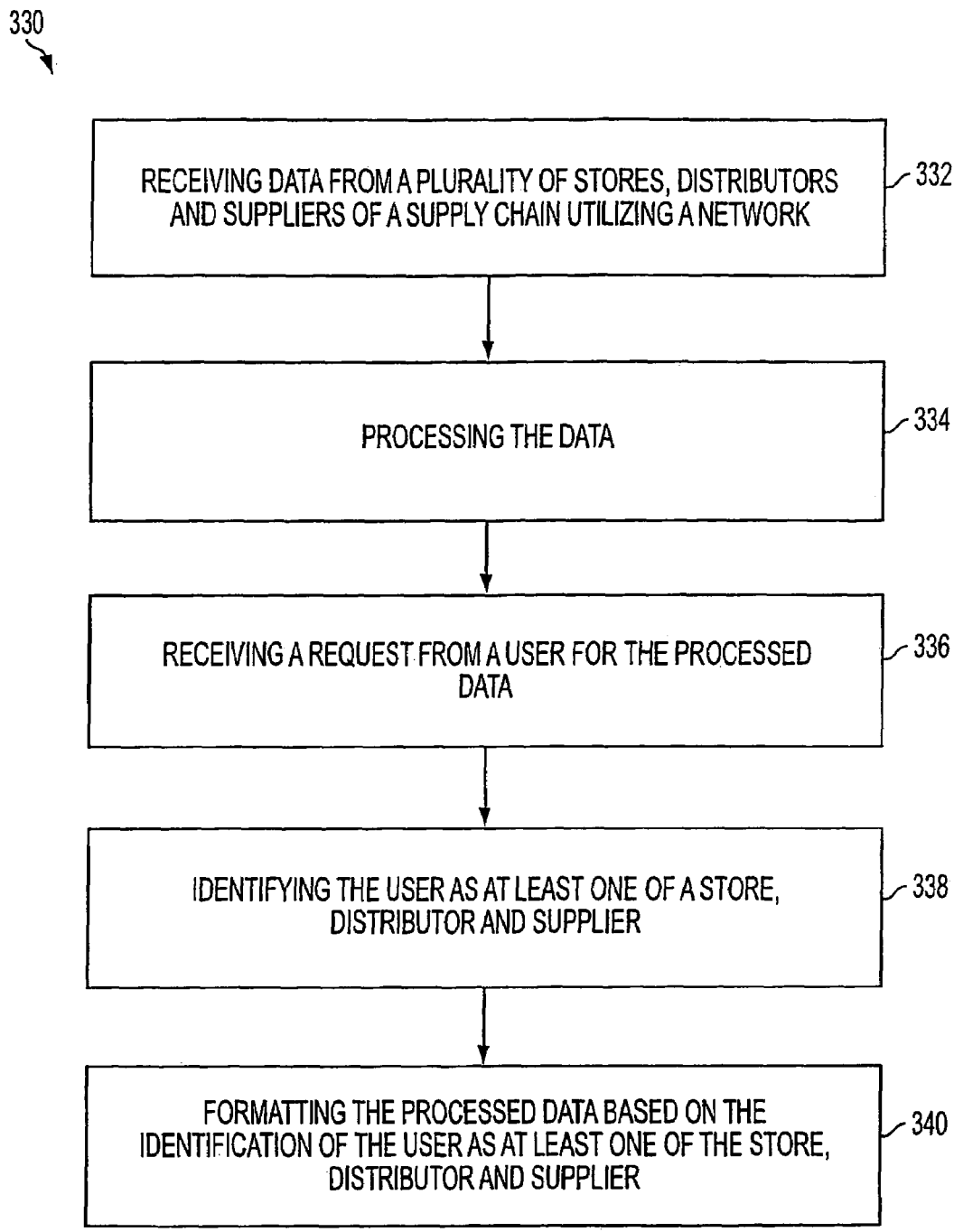
FIG. 3 is a flowchart of a process for reporting in a network-based supply chain management framework in accordance with an embodiment of the present invention.

FIG. 3 is a flowchart of a process 330 for reporting in a network-based supply chain management framework. Utilizing a network, data is received from a plurality of stores, distributors and suppliers of a supply chain in operation 332. The data is processed in operation 334. Subsequently, a request is received from a user for the processed data in operation 336. The user is then identified as either relating to a store, distributor or supplier in operation 338 and the processed data is formatted based on the identification of the user as a store, distributor or supplier in operation 340.

In one aspect, the format may includes a first format for the store, a second format for the distributor, and a third format for the supplier. In another aspect, the format may utilize a coding scheme unique to the user. In an additional aspect, the formatted, processed data may be made accessible via a network-based interface. In a further aspect, the network may include the Internet. In yet another aspect, the request may be received utilizing the network.

Figure 4:
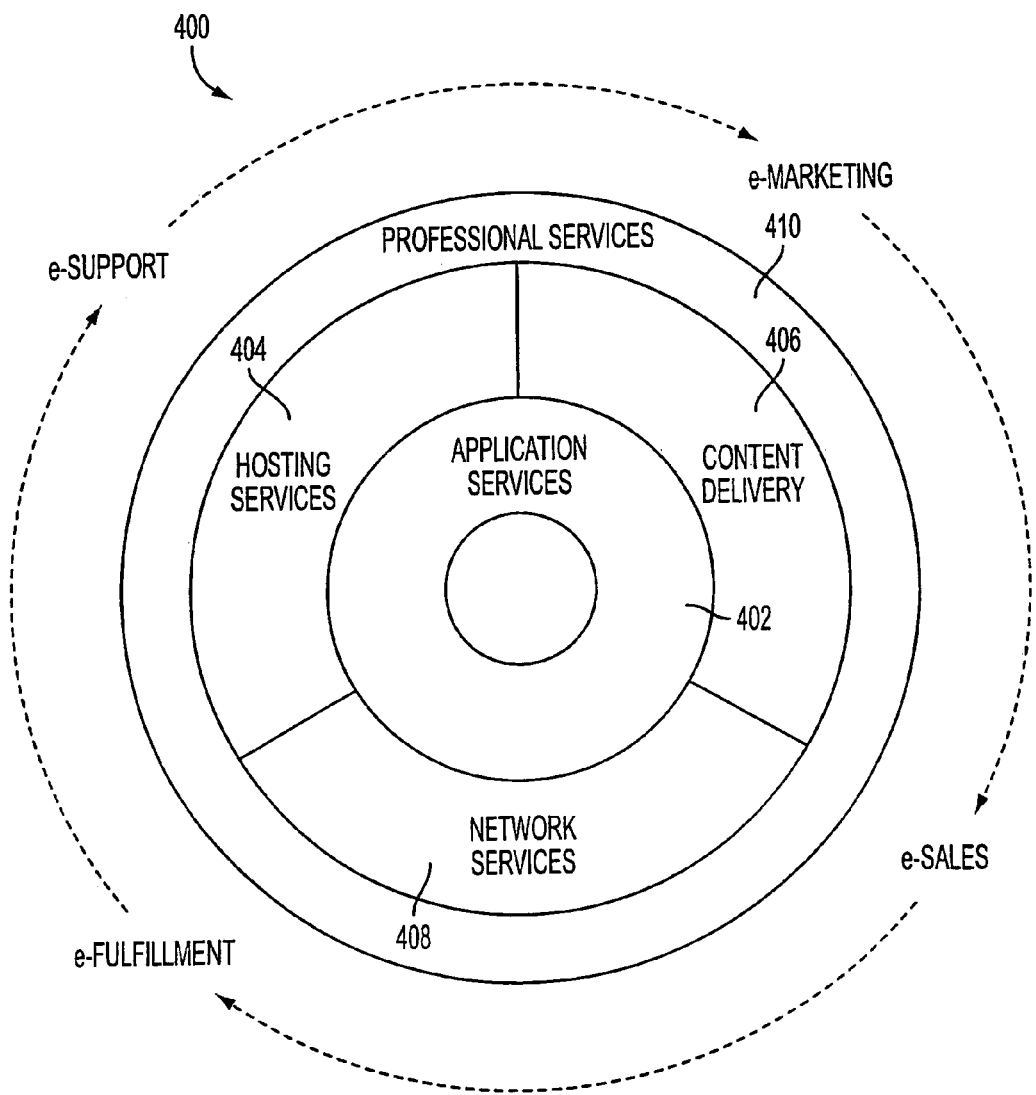
FIG. 4 illustrates an infrastructure for web services according to a preferred embodiment of the present invention.

FIG. 4 illustrates an infrastructure 400 for web services according to a preferred embodiment of the present invention. As shown, application services 402 are at the core of the infrastructure. Secondary components include hosting services 404, content delivery 406, and network services 408. Professional services 410 are provided for each of the components. Additional services can include support for electronic commerce, eMarketing, eSales, and eFulfillment.

Figure 5:
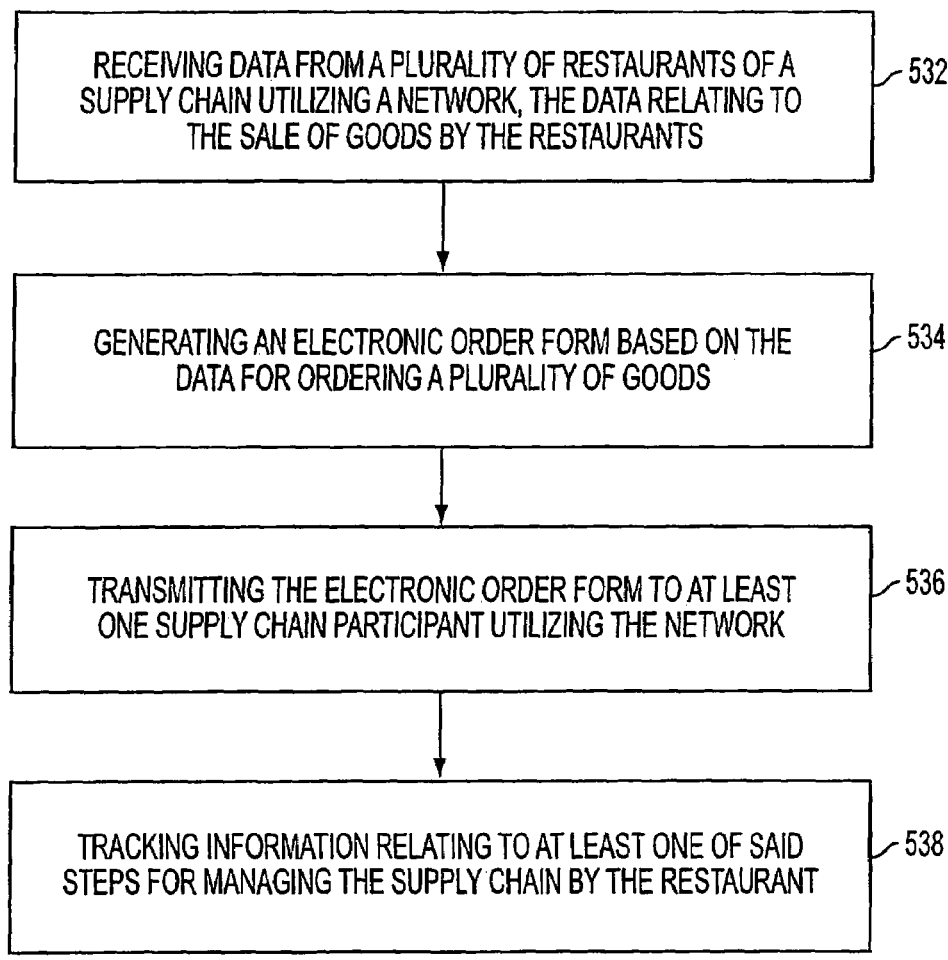
FIG. 5 is a flowchart of a process for managing a supply chain utilizing a network in accordance with an embodiment of the present invention.

FIG. 5 is a flowchart of a process 530 for managing a supply chain utilizing a network. Data is received from a plurality of restaurants of a supply chain utilizing a network in operation 532. This data relates to the sale of goods by the restaurants. An electronic order form for ordering a plurality of goods is then generated based on the data in operation 534. The electronic order form is subsequently transmitted to at least one supply chain participant utilizing the network in operation 536. For example, the form can be transmitted to a distributor of the supply chain utilizing the network via a restaurant-distributor interface. The electronic order form can also be transmitted to at least one supplier of the supply chain utilizing the network via a distributor-supplier interface. Information relating to at least one of the operations in the above process for managing the supply chain is tracked by the restaurant in operation 538.

In one aspect, the data may be transmitted to the supply chain participants. In such an aspect, the data may be parsed to match each corresponding supply chain participant. The data may also be made accessible to the supply chain participant via a network-based interface. In another aspect, the data may be accessible to the supply chain participant only after verification of an identity of the supply chain participant. In an additional aspect, the tracked information may relate to each of said operations of the above process.

Figure 6:
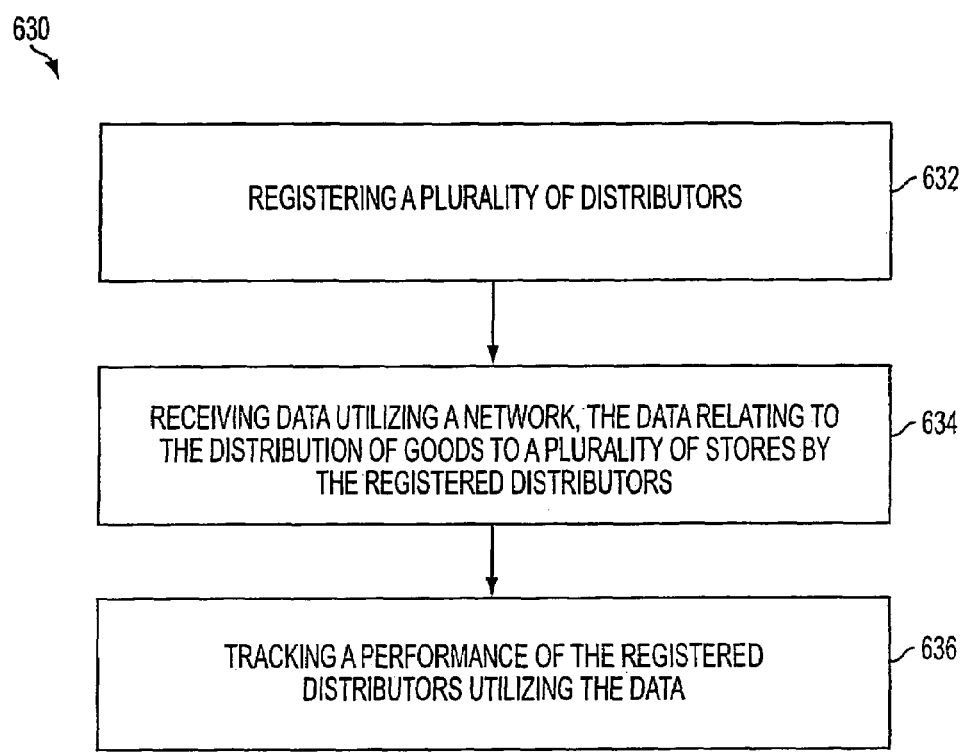
FIG. 6 is a flowchart of a process for tracking a performance of distributors in accordance with an embodiment of the present invention.

FIG. 6 is a flowchart of a process 630 for tracking a performance of distributors in which a plurality of distributors are registered in operation 632. Data is received utilizing a network in operation 634. This data relates to the distribution of goods to a plurality of stores by the registered distributors. A performance of the registered distributors is then tracked utilizing the data in operation 636.

In one aspect, the data may include delivery dates associated with the goods. In such an aspect, the performance may be tracked by comparing the delivery dates with a plurality of target dates. As another aspect, the performance may be tracked by comparing the delivery dates with delivery dates associated with other distributors. In another aspect, the performance may be displayed to the stores utilizing a network-based interface. In a further aspect, the data relating to the distribution of goods may be received from the stores.

Figure 7:
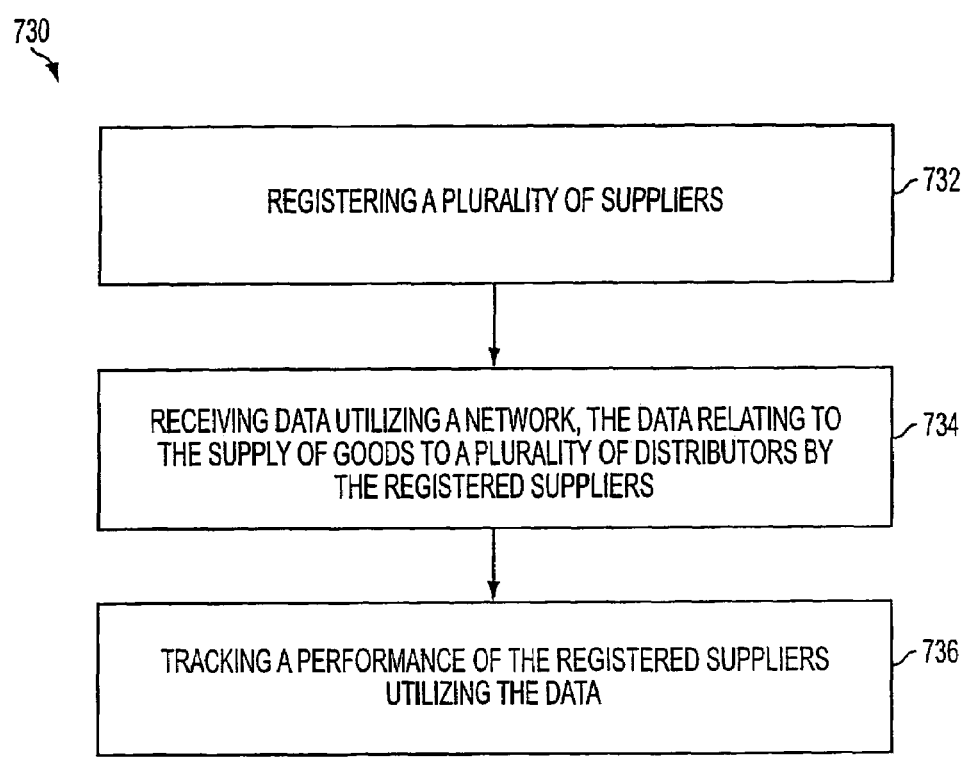
FIG. 7 is a flowchart of a process for tracking a performance of suppliers in accordance with an embodiment of the present invention.

FIG. 7 is a flowchart of a process 730 for tracking a performance of suppliers. In general, a plurality of suppliers are registered in operation 732. Data is then received utilizing a network in operation 734. This data relates to the supply of goods to a plurality of distributors by the registered suppliers. A performance of the registered suppliers is tracked utilizing the data in operation 736.

In an aspect, the data may includes inventory levels associated with the goods. As an aspect, the performance may be tracked by comparing the inventory levels with a plurality of target inventory levels. As another aspect, the performance may be tracked by comparing the inventory levels with inventory levels associated with other suppliers. In another aspect, the performance may be displayed to the stores utilizing a network-based interface. In a further aspect, the data may be received from the stores.

Figure 8:
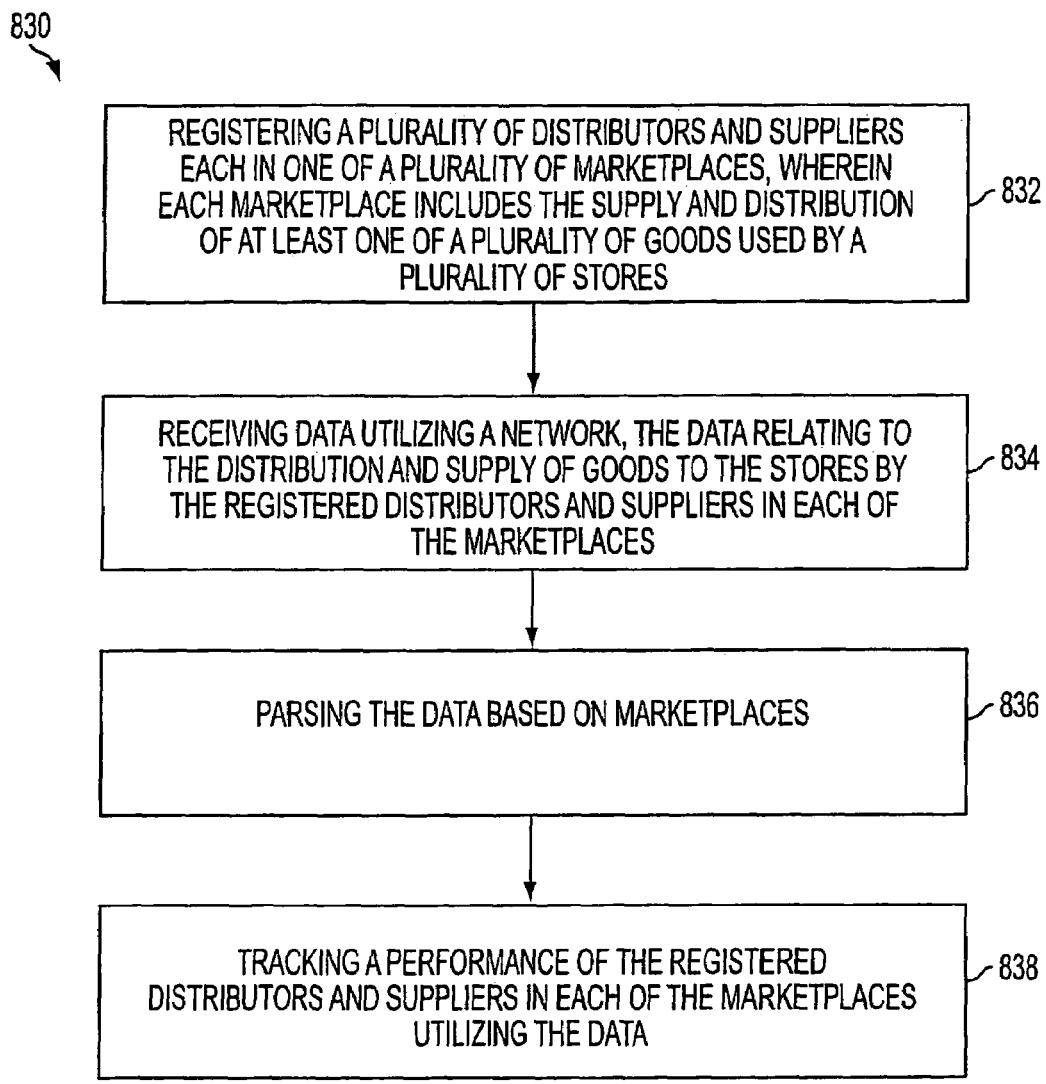
FIG. 8 is a flowchart of a process for tracking the performance of suppliers and distributors in a plurality of marketplaces in a supply chain management framework in accordance with an embodiment of the present invention.

FIG. 8 is a flowchart of a process 830 for tracking the performance of suppliers and distributors in a plurality of marketplaces in a supply chain management framework. In operation 832, a plurality of distributors and suppliers are registered each in one of a plurality of marketplaces with each marketplace involving the supply and distribution of at least one of a plurality of goods used by a plurality of stores.

Data is received utilizing a network that relates to the distribution and supply of goods to the stores by the registered distributors and suppliers in each of the marketplaces in operation 834. The received data is parsed based on marketplaces in operation 836 and a performance of the registered distributors and suppliers is tracked in each of the marketplaces utilizing the data in operation 838.

In one aspect, the data includes delivery dates associated with the goods. In such an aspect, the performance may be tracked by comparing the delivery dates with a plurality of target dates. As another aspect, the performance may be tracked by comparing the delivery dates with delivery dates associated with other distributors. In another aspect, the performance is displayed to the stores utilizing a network-based interface. In a further aspect, the data includes inventory levels associated with the goods. In such an aspect, the performance may be tracked by comparing the inventory levels with a plurality of target inventory levels. As another aspect, the performance may be tracked by comparing the inventory levels with inventory levels associated with other suppliers.

Results

The present invention makes critical performance information available to the Supply Chain system. The timeliness and level of detail of this information enable the supply chain coordinator to manage distributors and suppliers at standards prior art systems have been unable to achieve before. For example, timely performance information is provided against which Supply Chain management (coordinator) can take immediate action. Such performance information includes system inventory levels and movement, ordering activity, order fill rates, on-time deliveries, and product quality issues. Note that the supply chain coordinator may or may not hold an ownership interest in the other supply chain participants. Further, the supply chain coordinator does not need to be associated with the other participants in any way other than in relation to supply chain management.

Significant opportunities exist for Supply Chain participants to realize substantial savings and marketing opportunities through improved speed to market for promotions and more responsive inventory management.

Further, retailer management is given online access to the full Supply Chain database, subject to maintaining the confidentiality of individual franchisees/retailers. For the very first time, retail outlet management will be able to evaluate Supply Chain and retail outlet sales information to develop Brand menu and marketing program strategies. In addition, another first, retailer management is allowed to evaluate the success of past marketing programs by comparing actual sales to forecasts and reviewing Gross Profit Margin analyses of programs.

According to an embodiment of the present invention, Supply Chain management is able to provide online local promotion information to distribution centers, suppliers, Field Marketing, ADIs and Local Distribution Committees. This improves the speed to market for promotions and new products, as well as provides the ability to make ongoing program adjustments.

The advantages of being able to share and update a common data base at the convenience of all users provides enhanced coordination between all participants, improved planning, less over-ordering and product waste, and less time spent managing and coordinating local promotions. For new contracted distributors, daily distributor invoice feeds can be established.

Franchisees are provided with many advantages. Tools are provided to evaluate and select new retail POS and BOH hardware and software systems for system-wide communication with their retailers, each other and with the Supply Chain. They are given the ability to order products and manage inventory electronically, and are given access to valuable management information and tools.

Retailers are provided with the ability to conduct efficient electronic commerce with distributors and "direct" suppliers. They are also allowed to communicate easily with the Supply Chain.

Business Analysis

Figure 9:
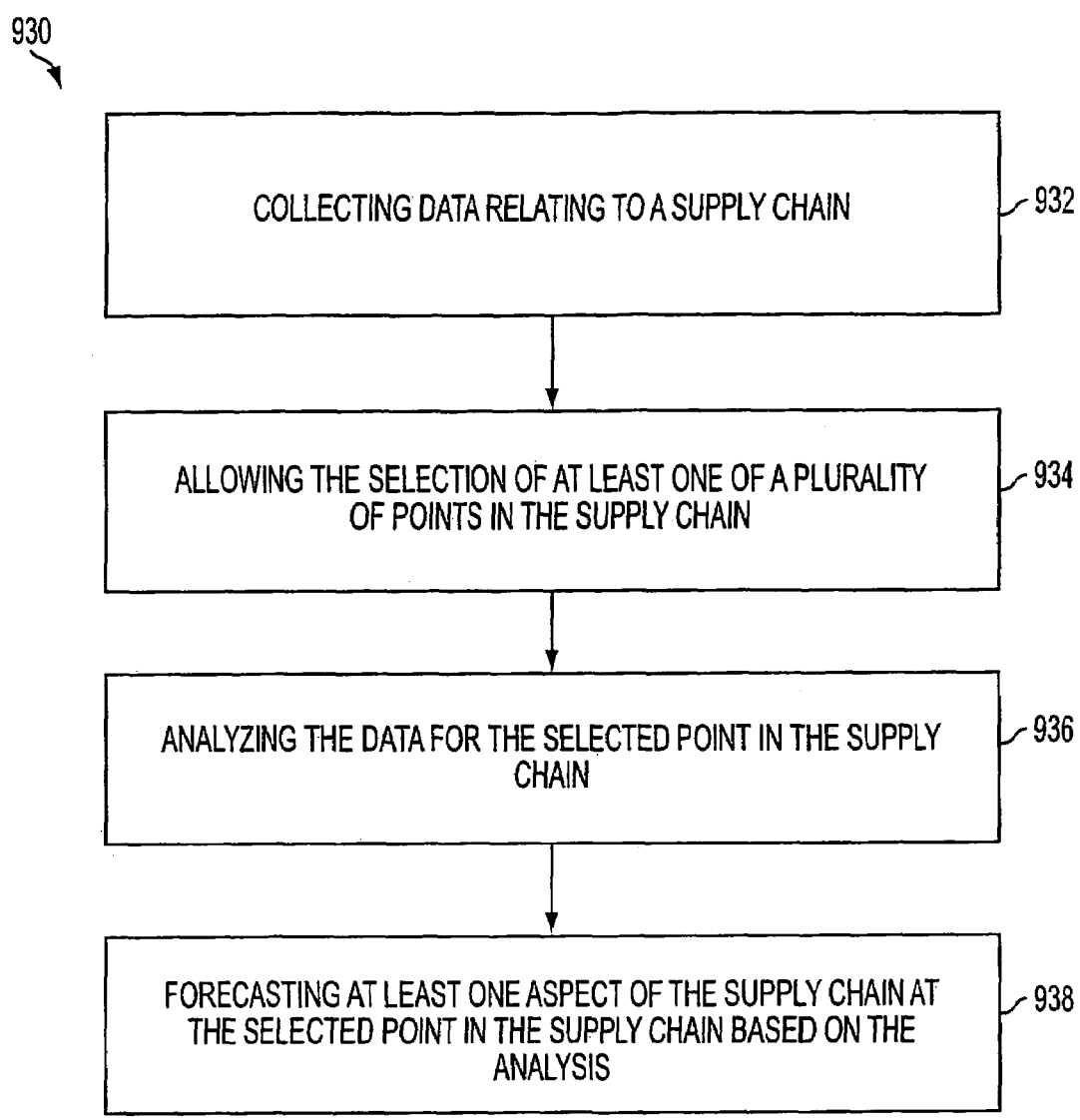
FIG. 9 is a flowchart of a process for forecasting the sale of goods in a store utilizing a network-based supply chain management framework in accordance with an embodiment of the present invention.

FIG. 9 is a flowchart of a process 930 for forecasting the sale of goods in a store utilizing a network-based supply chain management framework. Data relating to a supply chain is collected in operation 932. The selection of one or more of a plurality of points in the supply chain is also allowed in operation 934 so that the data for the selected point in the supply chain may be analyzed in operation 936. Based on this analysis, a forecast is made of one or more aspects of the supply chain at the selected point in the supply chain in operation 938.

In one aspect, one of the points may be a store. In such an aspect, the data may reflect a sale of goods in the store. In another aspect, one of the points may be a supplier. In further aspect, one of the points may be a distributor. In an additional aspect, the forecast may be displayed utilizing a network-based interface.

Figure 10:
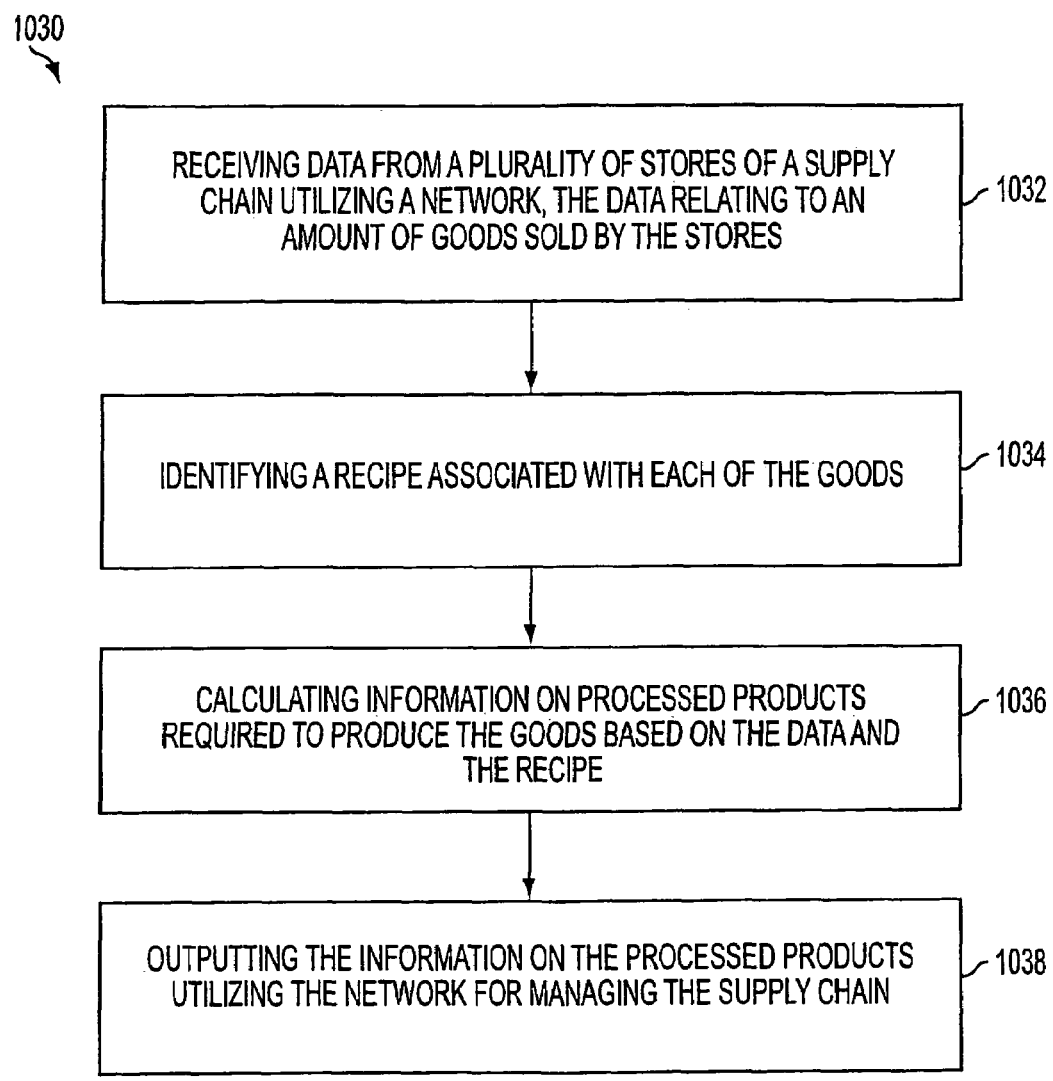
FIG. 10 is a flowchart of a process for inventory management utilizing a network-based framework in accordance with an embodiment of the present invention.

FIG. 10 is a flowchart of a process 1030 for inventory management utilizing a network-based framework. Data is received from a plurality of stores of a supply chain utilizing a network in operation 1032. This data relates to an amount of goods sold by the stores. A recipe associated with each of the goods is identified in operation 1034 and information on processed products required to produce the goods is then calculated based on the data and the recipe in operation 1036. The information on the processed products is outputted utilizing the network for managing the supply chain in operation 1038.

In one aspect, the data may include an amount of the goods, and can be based on a function of menu demand. In another aspect, the recipe may indicate a type and an amount of the processed products required to produce each of the goods. In an additional aspect, the information may indicate a type and an amount of the processed products. For example, the demand for beef can be calculated. In a further aspect, the information may be outputted utilizing a network-based interface. In yet another aspect, the network may include the Internet.

Back orders can be reconstructed. Also, key demand information is gathered directly from the store, greatly increasing accuracy and reducing response time.

Sales forecasting and inventory management are components in an embodiment of the Supply Chain management system. A theme of this model is transparent communication of current (i.e. virtually real-time) and expected sales to some or all supply chain participants in a statistically meaningful distribution everyday for all inventory level products. In other words, predictive supply chain behavior can be determined and analyzed. Of course the counterbalance here is the commitment to maintain the confidentiality of the particular data source/franchisee.

Sales forecasting and analysis includes the accurate forecasting of menu items sales, monitoring system performance against forecasts, and communicating critical information to customers.

The sales forecasting and reporting subsystem allows Supply Chain management to develop, maintain and communicate sales forecasts to supply chain constituents including, for example: 1) the franchisee community; 2) the distribution community; and 3) the supplier/manufacturing community. Some benefits of this activity include: 1) optimization of inventory levels throughout the supply chain; 2) improved logistics management; 3) improved production planning; and 4) improved promotion planning, including promotion marketing and execution. Further benefits include reduction in obsolete inventory cost, reduction in lost sales due to shortages, improved promotional decision making, reduction in supply chain cost through improved inventory and capacity management, and improved invoice averaging and revenue planning and reconciliation.

One aspect of the present invention provides an analytic model which enables a large and extended ecosystem, comprised of many similar but otherwise independent operating units, to quickly and inexpensively share near-real time data, with a trusted 3rd party, from a selected (and non-disclosed) sources, in a highly granular format, and then have extracted meaningful projections of future behavior for all of the other independent operating units so as to effect their purchase decisions. The combination of (a) confidential and very specific data, (b) accumulated quickly and cheaply, (c) shared to similar operating units, (d) leading to predictive supply chain decisions for the benefit of manufactures, suppliers, distributors and operators is a major benefit provided by the present invention.

Figure 11:
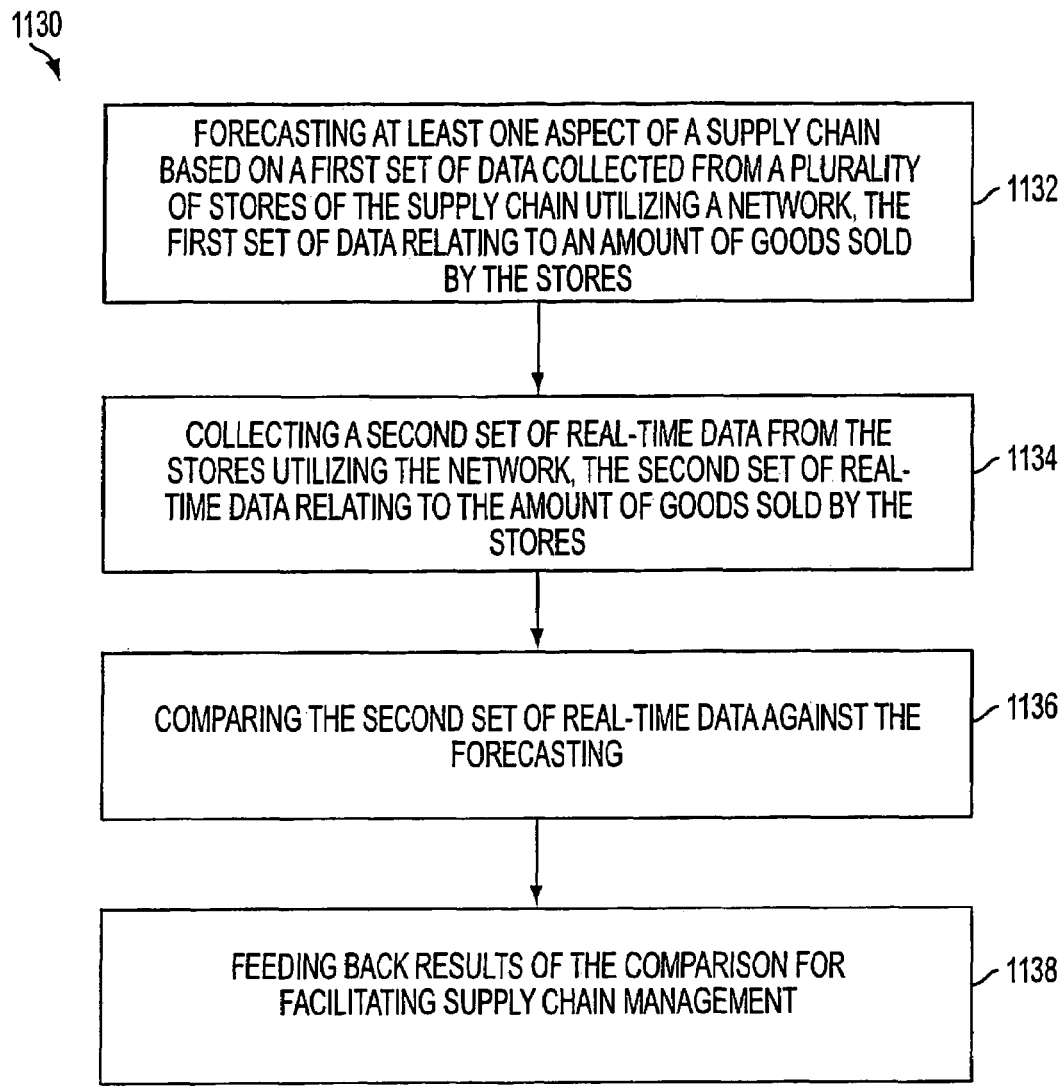
FIG. 11 is a flowchart of a process for providing feedback on forecasting relating to the sale of goods in a store utilizing a network-based supply chain management framework in accordance with an embodiment of the present invention.

FIG. 11 is a flowchart of a process 1130 for providing feedback on forecasting relating to the sale of goods in a store utilizing a network-based supply chain management framework. Forecasting of at least one aspect of a supply chain is performed in operation 1132 based on a first set of data collected from a plurality of stores of the supply chain utilizing a network. The first set of data relates to an amount of goods sold by the stores. A second set of real-time data is collected from the stores utilizing the network in operation 1134. The second set of real-time data relates to the amount of goods sold by the stores. The second set of real-time data is compared against the forecasting in operation 1136 and the results of the comparison are fed back for facilitating supply chain management in operation 1138.

In an aspect, the results of the comparison are fed back utilizing a network-based interface. In another aspect, the results of the comparison include a percent difference between the first set of data and the second set of data. In a further aspect, the network includes the Internet. In one embodiment, the aspect of the supply chain includes sales of goods. In another embodiment, the aspect of the supply chain includes a demand of raw products required to produce the goods.

Overall Business Analysis Model

Figure 12:
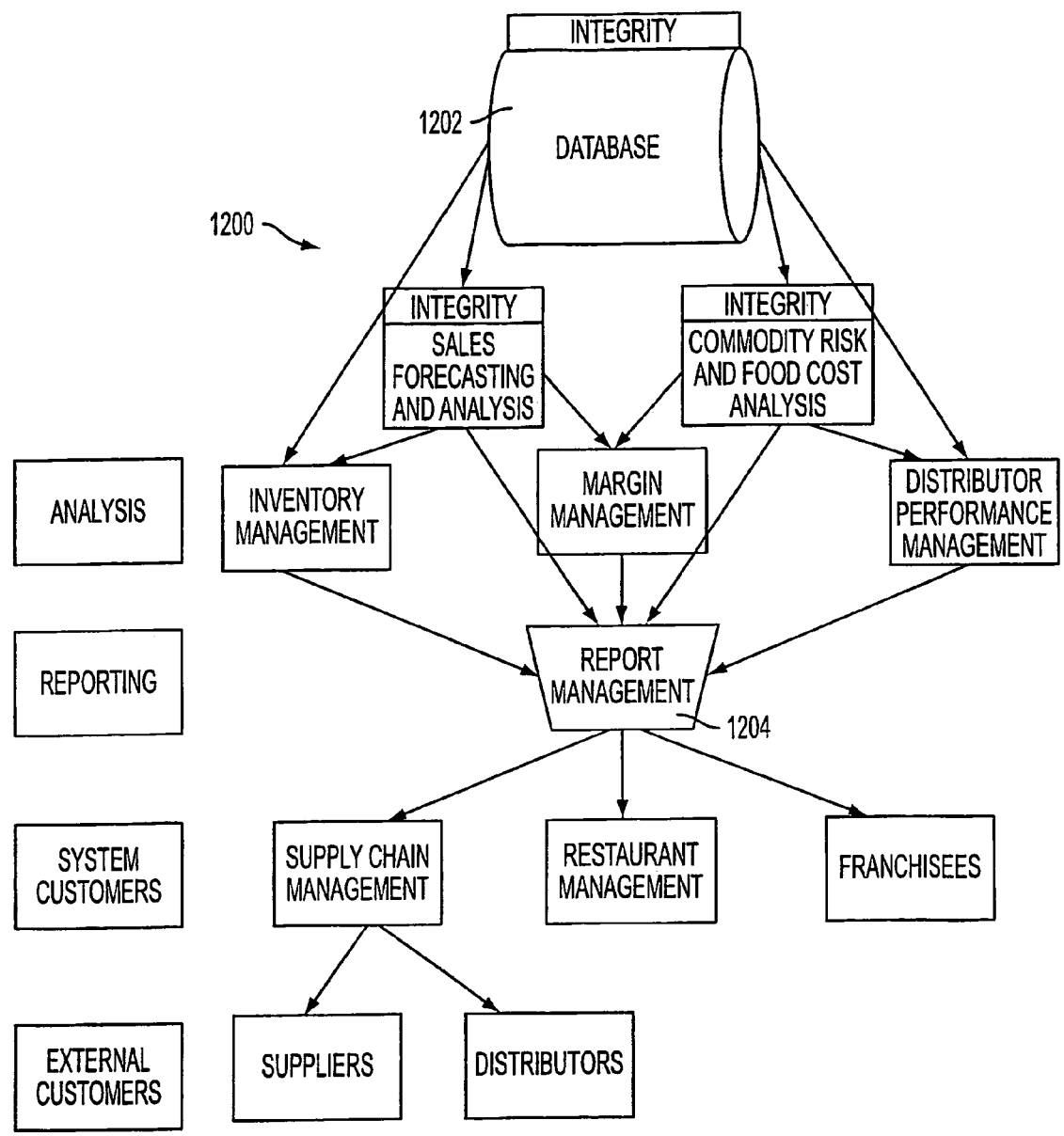
FIG. 12 illustrates an integrated supply chain analysis model according to an embodiment of the present invention.

The sales forecasting and inventory management model is best described in the larger context of an integrated supply chain analysis model 1200, shown in FIG. 12. This is done to reflect the fact that there are multiple customers of this information with different requirements. Sales forecasting and inventory management can be viewed as separate but interdependent analytic activities due to the core competencies, information, and systems that are required to support each.

As shown in FIG. 12, data such as menu item sales is collected in a database 1202. An integrity check can be performed prior to storing the data in a database. Various types of analysis are performed on the data and reports are generated by Report Management 1204 and are sent to participants in the Supply Chain, who may then distribute them to external customers. The analysis and reporting processes are described in more detail below.

Sales Forecasting and Inventory Management Process

Figure 13:
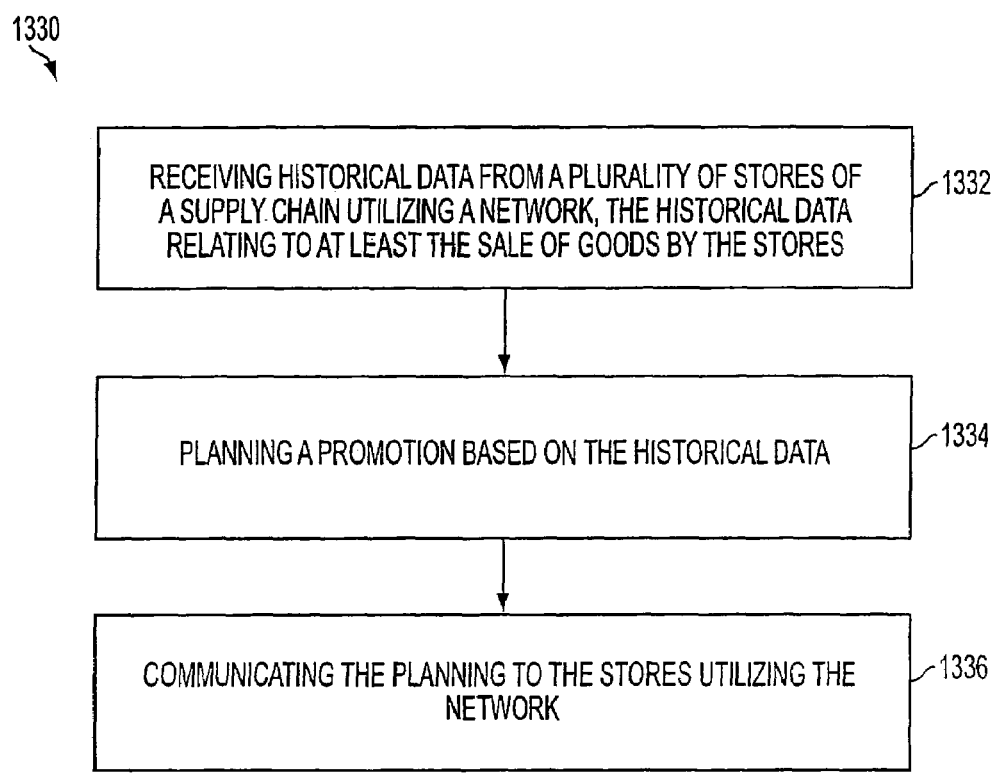
FIG. 13 is a flowchart of a process for planning promotions according to one embodiment of the present invention.

FIG. 13 is a flowchart of a process 1330 for planning promotions in which historical data is collected utilizing a network from a plurality of stores of a supply chain in operation 1332. This historical data relates to at least the sale of goods by the stores and can be further categorized based on seasonality, past marketing and/or advertising support, etc. A promotion is then planned based on the historical data in operation 1334 and this planning is subsequently communicated to the stores utilizing the network in operation 1336.

In one aspect, the planning may be communicated utilizing a network-based interface. In another aspect, the network may include the Internet. In a further aspect, the promotion may be planned by coinciding a time frame of the promotion with a time frame reflected by the historical data. As a further aspect, the promotion may be planned by coinciding a start time of the promotion with a start time reflected by the historical data. In an additional aspect, the promotion may be planned by selecting an amount of ordered goods of the promotion based on an amount of ordered goods reflected by the historical data. In even another aspect, an impact of the promotion on a promotional item may be forecasted. Additionally, the impact of the promotion on a non-promotional item may also be forecasted.

Figure 14:
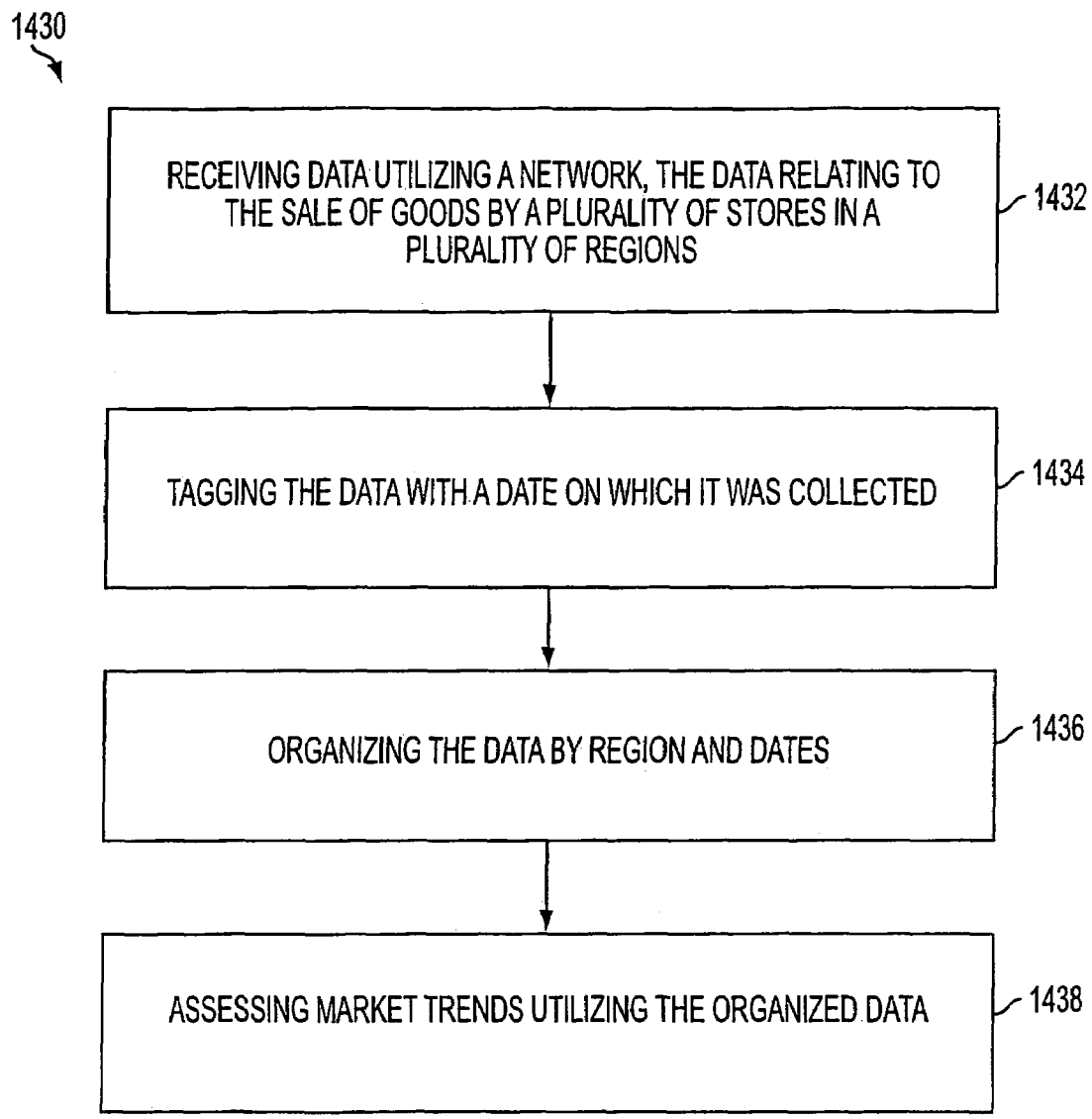
FIG. 14 is a flowchart of a process for assessing market trends in a supply chain management framework in accordance with an embodiment of the present invention.

FIG. 14 is a flowchart of a process 1430 for assessing market trends in a supply chain management framework. A network is utilized in operation 1432 to receive data that relates to the sale of goods by a plurality of stores in a plurality of regions. The received data is tagged with a date on which it was collected in operation 1434 and then organized by region and dates in operation 1436. Market trends are then assessed utilizing the organized data in operation 1438.

In one aspect, the network includes the Internet. In another aspect, the market trends are assessed via a network-based interface. In a further aspect, the market trends are assessed utilizing a graph. As a further aspect, the graph may include dates as one coordinate.

Figure 15:
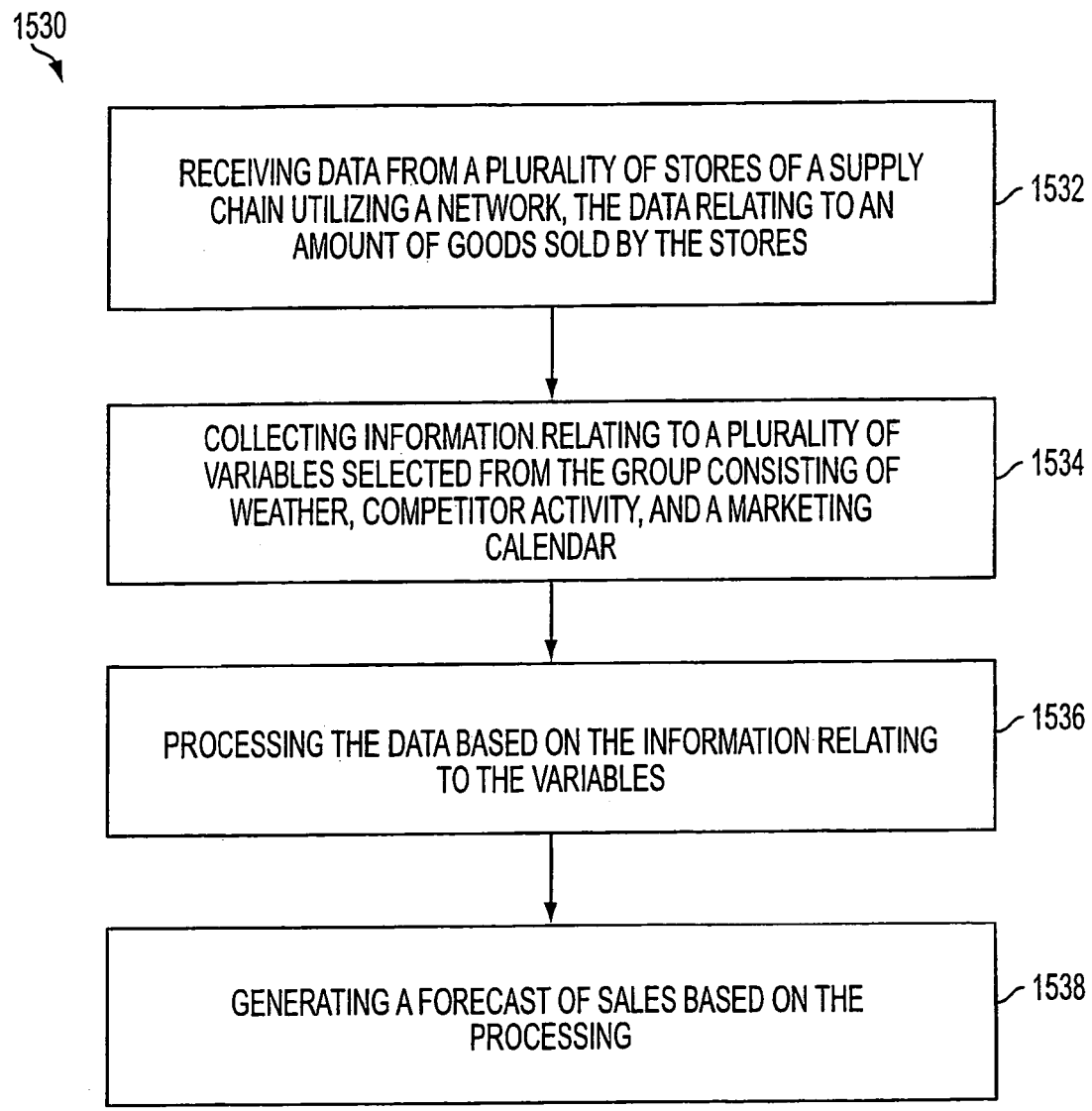
FIG. 15 is a flowchart of a process for collecting data to forecast sales in a supply chain in accordance with an embodiment of the present invention.

FIG. 15 is a flowchart of a process 1530 for collecting data to forecast sales in a supply chain. Utilizing a network in operation 1532, data is received from a plurality of stores of a supply chain that relates to an amount of goods sold by the stores. Information is also collected in operation 1534 that relates to a plurality of variables such as weather, competitor activity, and/or a marketing calendar—which may include one or more of the following types of information: cyclical sales, seasonality, historical performance of same or similar products, and elements of marketing support. The data is processed based on the information relating to the variables in operation 1536 and a forecast of sales is generated based on the processing in operation 1538.

In one aspect, the all of the variables (weather, competitor activity, and marketing calendar) are utilized. In another aspect, the information relating to the weather includes weather forecast. In a further aspect, the information relating to the competitor activity includes a forecast of a promotion of a competitor. In an additional aspect, the information relating to the marketing calendar includes a forecast of a promotion of the stores. In one aspect, the network includes the Internet.

As part of the data needs analysis, there are three different processes that address the issue of improving supply chain performance during promotional periods. These processes are:

Zero tolerance—meaning that there was no tolerance for either excess inventories after the promotion, nor is it appropriate to run out of product during the promotion.

While supplies last—meaning that the promotion was active until each all of the product was depleted.

Estimated Usage Report (EUR)—this is similar to the current FOR process that is used for premiums purchasing.

One objective of the sales forecasting and reporting system is to provide timely information to the supply chain allowing for: production, inventory and logistics planning; reaction to deviations from plan as quickly as possible; and/or volume estimates in support of contracting processes.

According to an illustrative embodiment of the present invention, a sales forecasting methodology is based on weekly menu item sales information. These sales forecast are all promotion centric, which is appropriate for this example, given that many businesses run promotions several weeks per year. The process begins with an analyst extracting appropriate comparative sales data based on the type of promotion. This data is formatted in a manner that allows analyst to observe the following data:

National Promotion Description
Advertising Commitment in GRPs
Premium Promotion
Premium Advertising Commitment in GRPs
Date of Promotion
Average Weekly Sales Volume during Promotion Period
Average Daily Sales of Key Menu Items During Promotion Based on this information, the analyst makes a best guess of sales increases and cannibalization impacts. This menu item sales forecast is then translated into product requirements at the distributor and manufacturer/supplier level and communicated to the system.

A preferred sales forecasting and reporting system provides weekly forecasts for management of product volumes during promotion periods. The forecast horizon in this example is 3–6 months and can be in terms of average weekly menu item sales, with a particular focus on promotions and cannibalization.

In a food service supply chain, for example, historical menu item sales information is available by restaurant by day for geographically distributed restaurants. Exogenous variables should include: promotion type, GRP's for promotion, any other concurrent promotional activities, seasonality, competitive environment, and other factors that can be identified.

Figure 16:
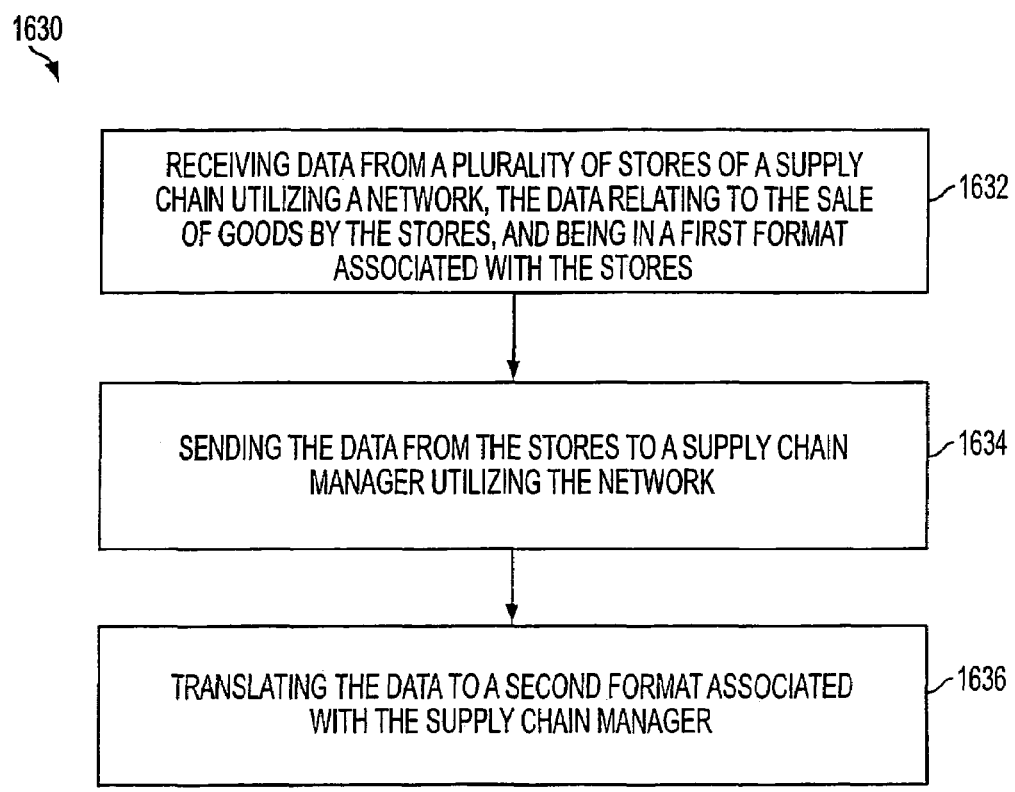
FIG. 16 is a flowchart of a process for tracking the sale of goods in a store utilizing a network-based supply chain management framework in accordance with an embodiment of the present invention.

FIG. 16 is a flowchart of a process 1630 for tracking the sale of goods in a store utilizing a network-based supply chain management framework. Data is received from a plurality of stores of a supply chain utilizing a network in operation 1632. This data relates to the sale of goods by the stores and is in a first format associated with the stores. This data is then sent from the stores to a supply chain manager (also known as a supply chain coordinator) utilizing the network in operation 1634 where the data is translated into a second format associated with the supply chain manager in operation 1636.

In an aspect, the stores may include restaurants. In such an aspect, the data in the first format may include daily totals. These daily totals may reflect a price associated with the goods. As a further aspect, the data in the second format may include monthly totals. As another aspect, the data in the second format may include a grouping of the goods.

Preferably, data collection and reporting is in a format that allows for derivation of product requirements to support forecasted menu item sales (i.e. how many boxes of hamburger patties are required based on menu item sales forecast). Actual sales are tracked against forecasted sales on a daily basis and alerts are generated if the deviation is significant. Sales forecasting accuracy reports and post promotion analysis are provided. The sales forecast can be in a form that allows for gross profit analysis to be developed.

Some benefits to retailer outlets from the collection and analysis of information include feedback of comparative and operation information including sales mix trends, actual and/or standard (or ideal) product cost, actual and/or standard (or ideal) gross margin, and comparable information from participating retailers on this information. Supply chain providers benefit by having access "real-time" sales information. This drives efficiencies in two ways: 1) Management of promotional volumes and inventories, and 2) Management of on going production planning. Regarding promotional volumes and inventories, supply chain providers are permitted to react faster by having sales information up to many weeks earlier than currently available. With respect to production planning, by having "real-time" sales information, suppliers are able to maintain lower safety stocks, improving capital efficiency.

Many of the benefits from "Integrated Supply Chain Management" are derived from the ability to deliver useful information for planning and operational purposes. The coordinator of the supply chain is given the information required to further optimize and decrease supply chain costs, especially for promotion management and risk management.

Figure 17:
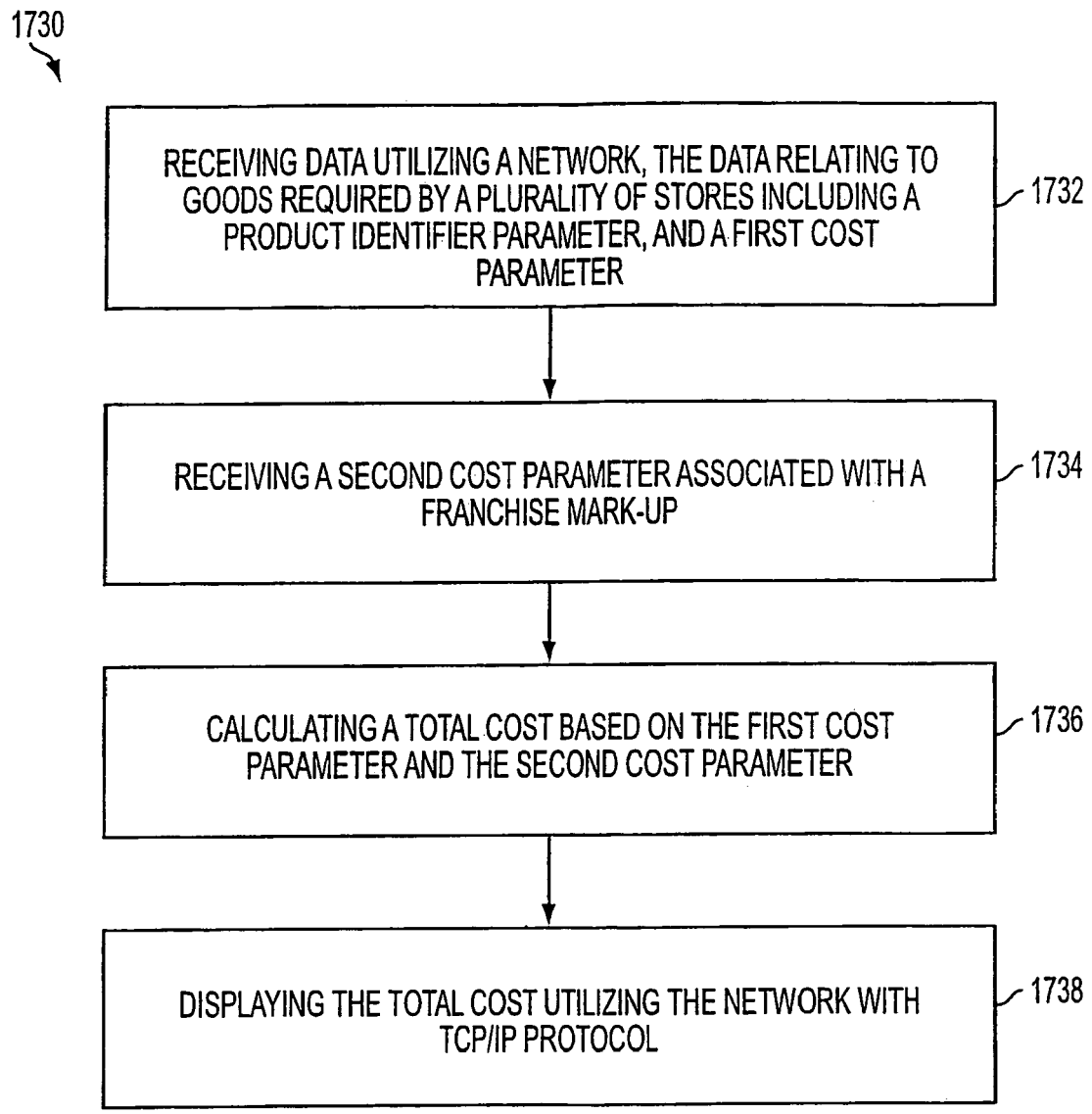
FIG. 17 is a flowchart of a process for cost reporting using a network-based supply chain management framework in accordance with an embodiment of the present invention.

FIG. 17 is a flowchart of a process 1730 for cost reporting using a network-based supply chain management framework. Data is received utilizing a network in operation 1732. This data relates to goods required by a plurality of stores including a product identifier parameter, and a first cost parameter. A second cost parameter associated with a franchise mark-up is also received in operation 1734 so that a total cost can be calculated based on the first cost parameter and the second cost parameter in operation 1736. The total cost is displayed utilizing the network with TCP/IP protocol in operation 1738.

In an aspect, the total cost may be calculated by adding the first cost parameter and the second cost parameter. In another aspect, the total cost may be displayed utilizing a network-based interface. In a further aspect, the data may be received from a plurality of distributors. In such an aspect, the data may relate to goods required by a plurality of stores from the distributor. In one aspect, the network may include a wide area network. The sales and forecasting system can also provide longer-term forecasts, which supports contracting processes. The forecast horizon is variable based on contract needs, such as 1–5 years. The forecast can be in terms of retailer average weekly item sales. System level forecasts can be extrapolated from average weekly item sales forecasts. Historical item sales information is made available by retailer by day. Some exogenous variables include: store count, comparable sales changes, and changes in sales mix.

Preferably, data collection and reporting is in a format that allows for derivation of product requirements to support forecasted item sales. Forecasts and reports can be distributed via the Internet in a fixed report format or Excel spreadsheet, for example, depending on the recipient of the information.

Figure 18:
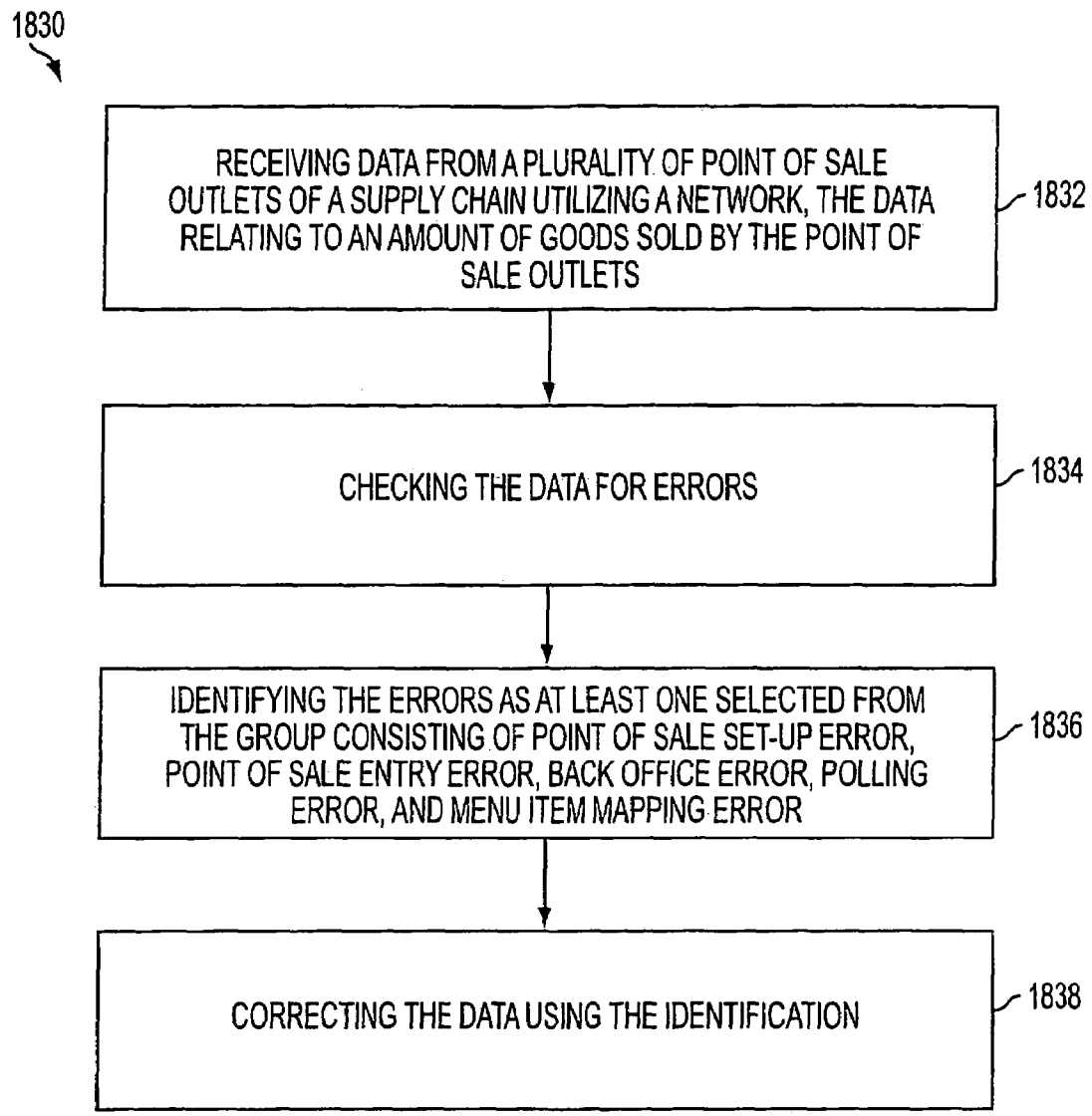
FIG. 18 is a flowchart of a process for forecasting the sale of goods in accordance with an embodiment of the present invention.

FIG. 18 is a flowchart of a process 1830 for forecasting the sale of goods. Data is received in operation 1832 utilizing a network from a plurality of point of sale outlets (e.g., retailers) of a supply chain where the data relates to an amount of goods sold by the point of sale outlets. The data is checked for errors in operation 1834. Each detected error is identified in operation 1836 as either a point of sale set-up error, a point of sale entry error, a back office error, a polling error, or a menu item mapping error so that the data can be corrected using the identification in operation 1838.

In an aspect, the network may include the Internet. In another aspect, the data may be checked for errors in real-time. In a further aspect, the identified errors may be logged. As an aspect, the log may be transmitted to the point of sale outlets utilizing the network. As another aspect, the log may be transmitted to a supply chain manager utilizing the network.

Figure 19:
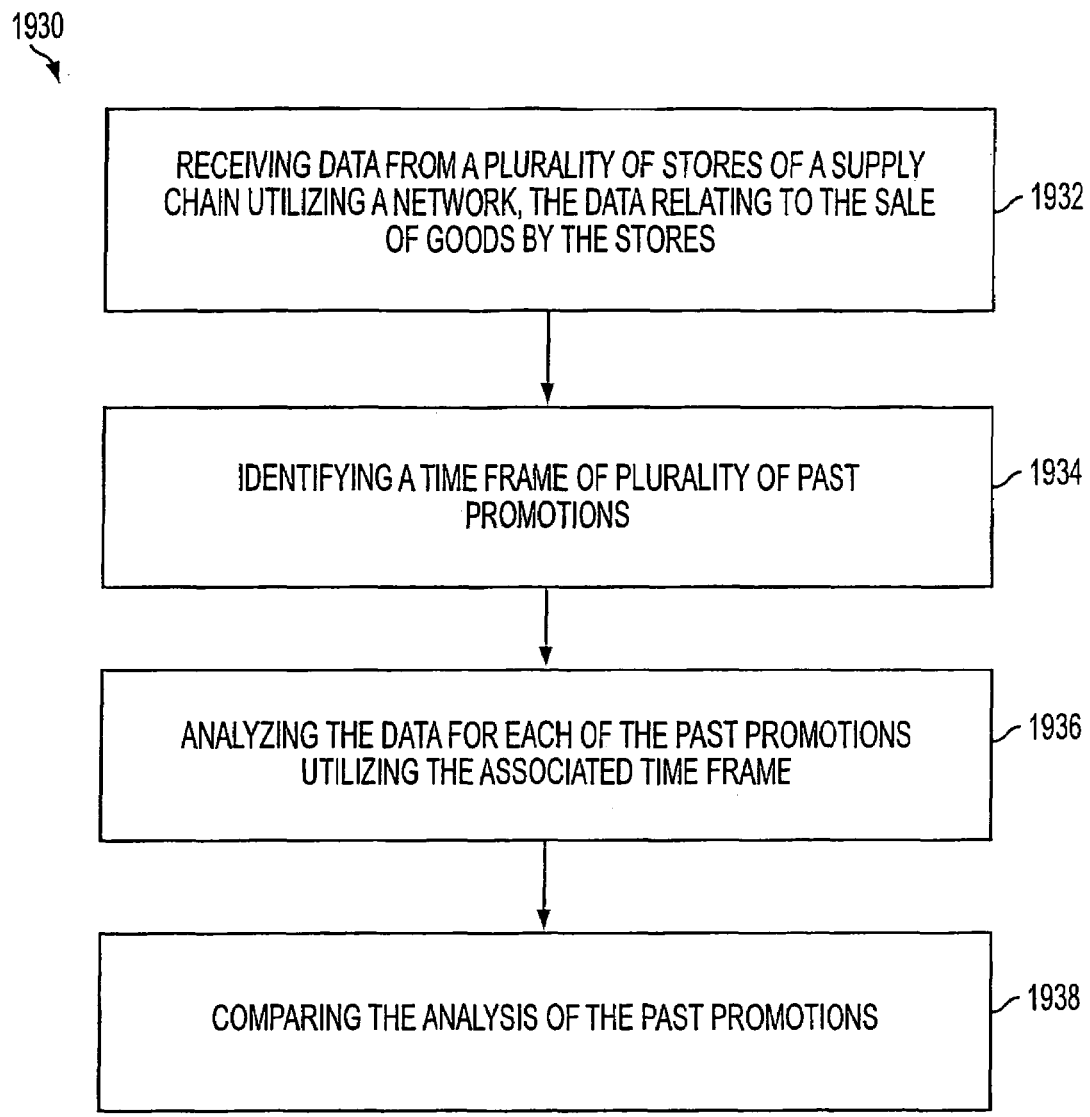
FIG. 19 is a flowchart of a process for evaluating a success of a promotion utilizing a network-based supply chain management framework in accordance with an embodiment of the present invention.

FIG. 19 is a flowchart of a process 1930 for evaluating a success of a promotion utilizing a network-based supply chain management framework. Data from a plurality of stores of a supply chain is received utilizing a network in operation 1932. This data relates to the sale of goods by the stores. A time frame of a plurality of past promotions is identified in operation 1934 and the data for each of the past promotions is analyzed utilizing the associated time frame in operation 1936. The resulting analyses of the past promotions are then compared in operation 1938.

In an aspect, the stores may include restaurants. In another aspect, the past promotions may then be ranked. In a further aspect, the comparison may be displayed utilizing a network-based interface. In one aspect, the time frame may include a start date and a finish date. In an additional aspect, the data may include an amount of revenue associated with the sale of the goods.

Figure 20:
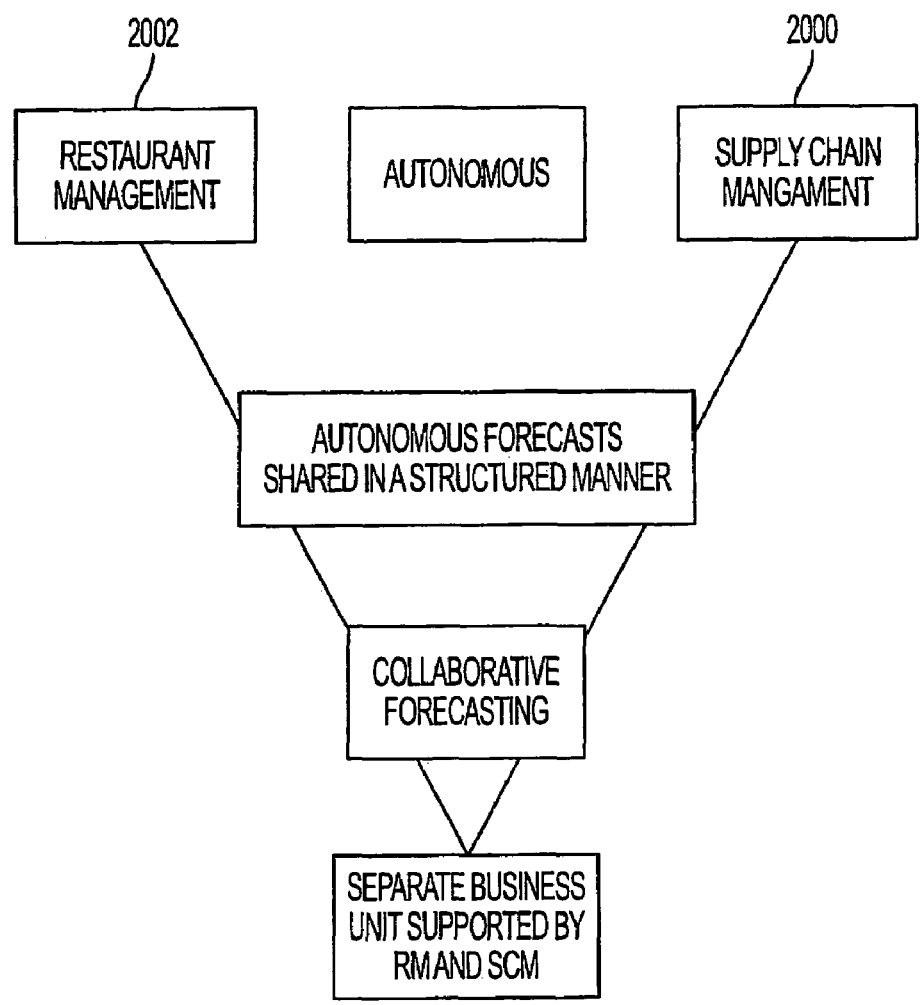
FIG. 20 illustrates levels of integration between the supply chain coordinator and retail management.

To accomplish the forecasting and reporting objectives of the present invention, some integration may be required between the supply chain coordinator and retail management. FIG. 20 illustrates potential levels of integration between the supply chain coordinator 2000 and retail management 2002. At the highest level, the two are autonomous. The two may share their own forecasts, or may collaborate to create forecasts. The ideal situation is one in which a separate business unit is supported by the two. This leverages resources, eliminates bias, joins forecasts and implications of results, and provides for sharing of knowledge.

Figure 21:
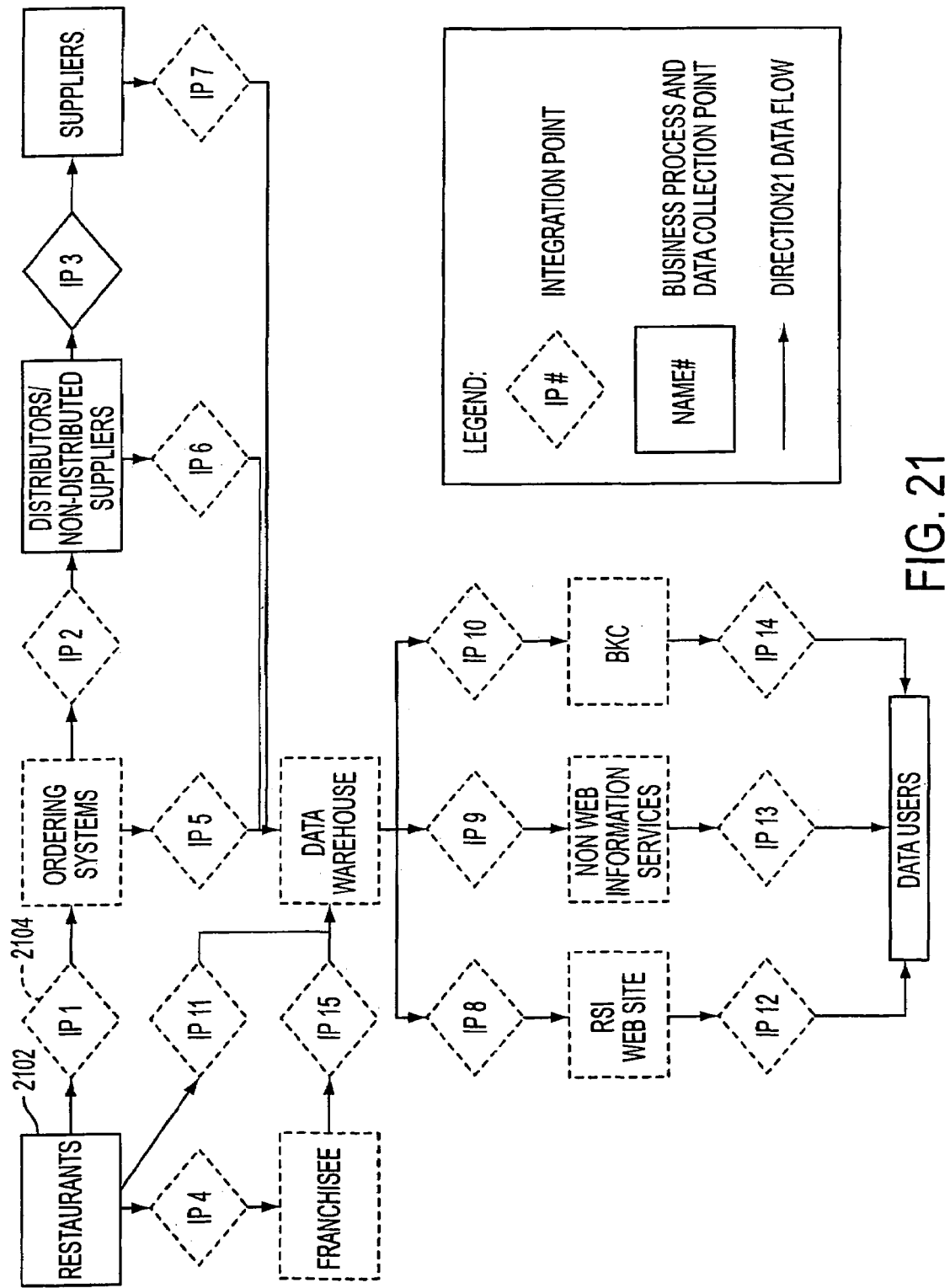
FIG. 21 is a flow diagram depicting integration ownership.

FIG. 21 is a flow diagram depicting integration ownership. As shown, data flows from business process and data collection points 2102 to integration points 2104. The definition of the integration point parameters are owned by the owners of the business process and data collection point of the same border style.

Data Collection

Figure 22:
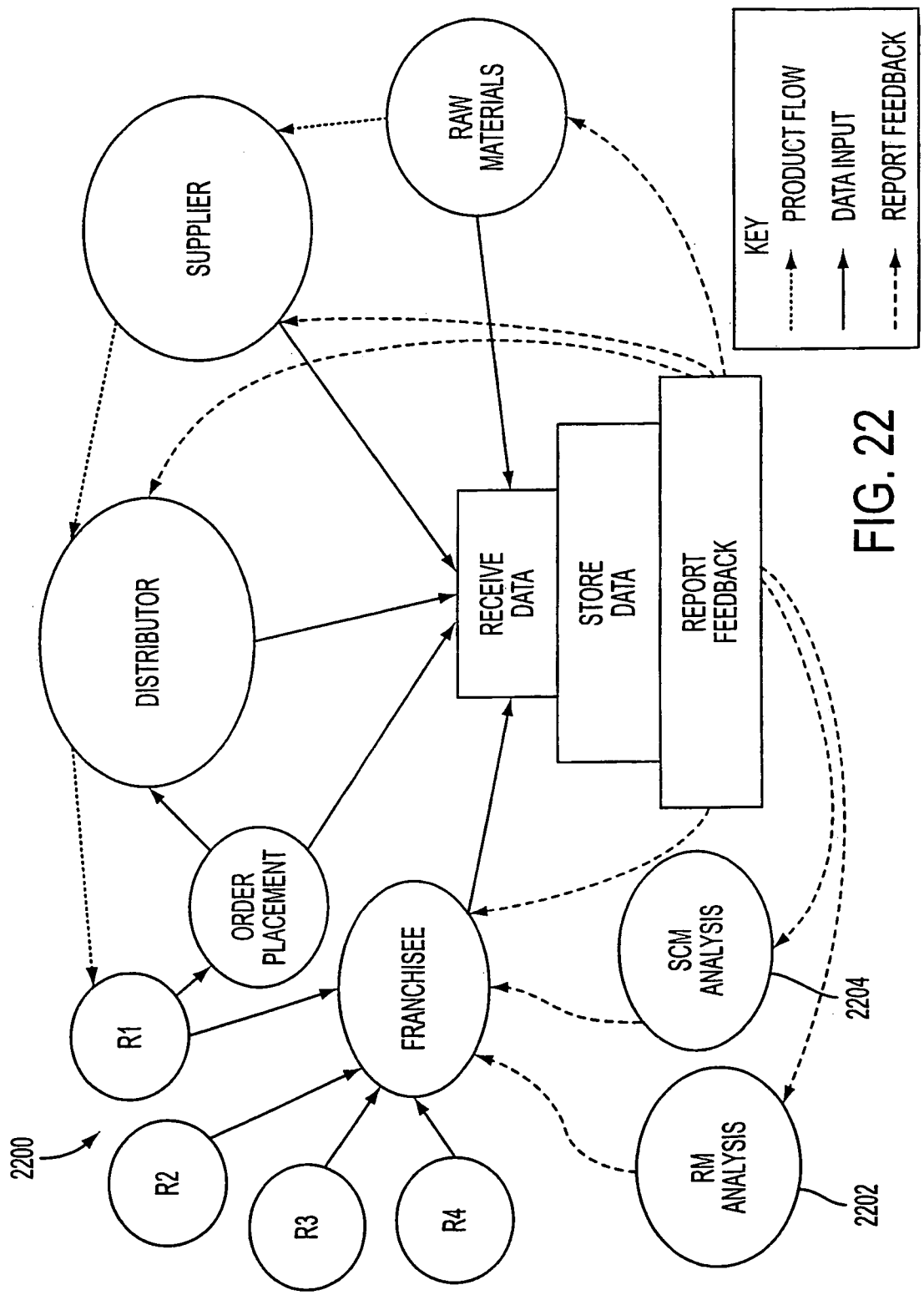
FIG. 22 illustrates an electronic reporting and feedback system according to a preferred embodiment of the present invention.

FIG. 22 illustrates an electronic reporting and feedback system 2200 according to a preferred embodiment of the present invention. As shown, data is received several of the participants in the Supply Chain and stored. Reports are generated and sent back to some or all of the participants. Also note that retail management 2202 and the supply chain coordinator 2204 are also allowed to perform their own analyses and provide feedback to other members of the Supply Chain.

Collection of Menu Item Sales

The primary element of forecasting is the communication of product movement throughout the system. Sales information can be received from suppliers and distribution centers monthly, weekly, daily, etc. Preferably, sales data from the POS by store is received daily, as it provides much more information regarding specific menu items and promotional items.

The collection and dissemination of this data allow both the supply chain coordinator and the franchisee to benefit by sharing sales information and sales forecasting. The system also benefits from improved supply chain performance. Further benefits include providing franchisees with access to new reports on sales mix, food cost and distributor performance; and providing franchisees with a better understanding of menu sales mix on margins both in everyday situations as well as promotional situations. The supply chain coordinator, suppliers and distributors have access to virtually real-time sales, allowing for improved management of inventory and improved sales forecasting. Margin management information improves the supply chain coordinator's decision making capability in the area of risk management and purchasing.

Figure 23:
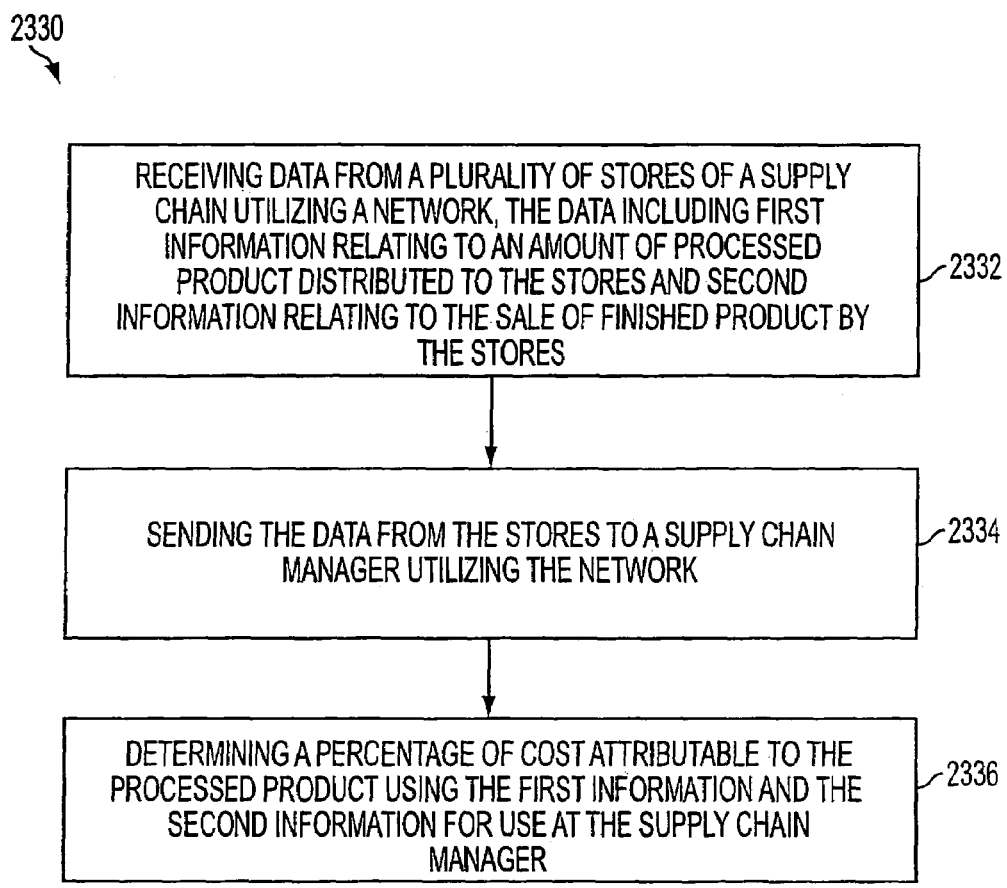
FIG. 23 is a flowchart of a process for raw product supply chain reporting in accordance with an embodiment of the present invention.

FIG. 23 is a flowchart of a process 2330 for processed product supply chain reporting wherein a network is utilized to receive data from a plurality of stores of a supply chain in operation 2332. The data includes a first set of information relating to an amount of processed product distributed to the stores and a second set of information relating to the sale of finished product by the stores. The network is also utilized to send the data from the stores to a supply chain manager in operation 2334 where a percentage of cost attributable to the processed product is determined using the first and second sets of information for use at the supply chain manager in operation 2336.

In an aspect, the stores may include restaurants. In such an aspect, the processed product may include food. In another aspect, the first set of information may include an amount of the finished product. In a further aspect, the second set of information may include an amount of the processed product. In one aspect, the percentage may be made available utilizing a network-based interface.

Historical daily menu item sales data on a per store basis is the preferred backbone for all decision making and expanding analysis. Other causal information, variables that predict sales, can be collected and married with the menu item sales data to more accurately forecast. These variables might include weather, competitive information, marketing calendar, etc. Additional information such as menu item recipes can be used to further manipulate the data.

In a preferred embodiment, daily menu item sales data is received from restaurants on a per restaurant basis. This information is used to support the sales forecasting function and is used to report sales volumes to distributors and suppliers/manufacturers. Distributor level sales data is received on a weekly basis for all distributors, while supplier level sales data is received on a weekly basis for suppliers of "key products". In order to best support real time supply chain management, access to information on product flow at the point of sale is provided on a daily basis. A representative sample of daily menu item sales can be collected if collection of all the data is not desired because of cumbersomeness, communications problems, etc.

Figure 24:
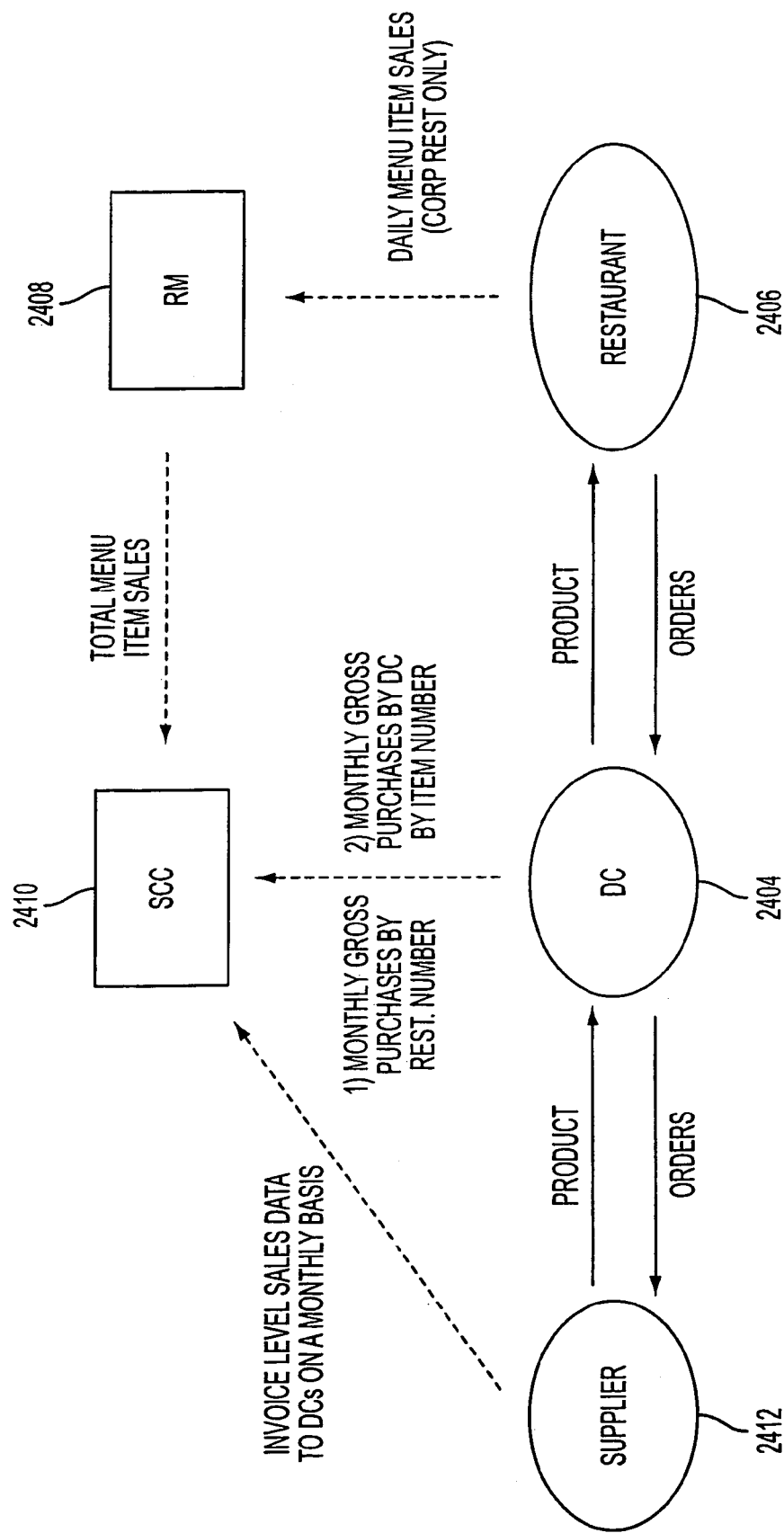
FIG. 24 is a flow diagram illustrating basic communication and product movement according to an illustrative embodiment of the present invention.

FIG. 24 is a flow diagram illustrating basic communication and product movement according to an illustrative embodiment of the present invention. As shown, orders and products move back and forth between suppliers 2402, distributors 2404, and restaurants 2406. Daily menu item sales data is sent from the restaurants to restaurant management 2408, where it is compiled and forwarded to the supply chain coordinator 2410. The distributor sends periodic gross purchased by restaurant and item number to the supply chain coordinator. The supply chain coordinator also receives periodic invoice level sales data from the supplier.

Figure 25:
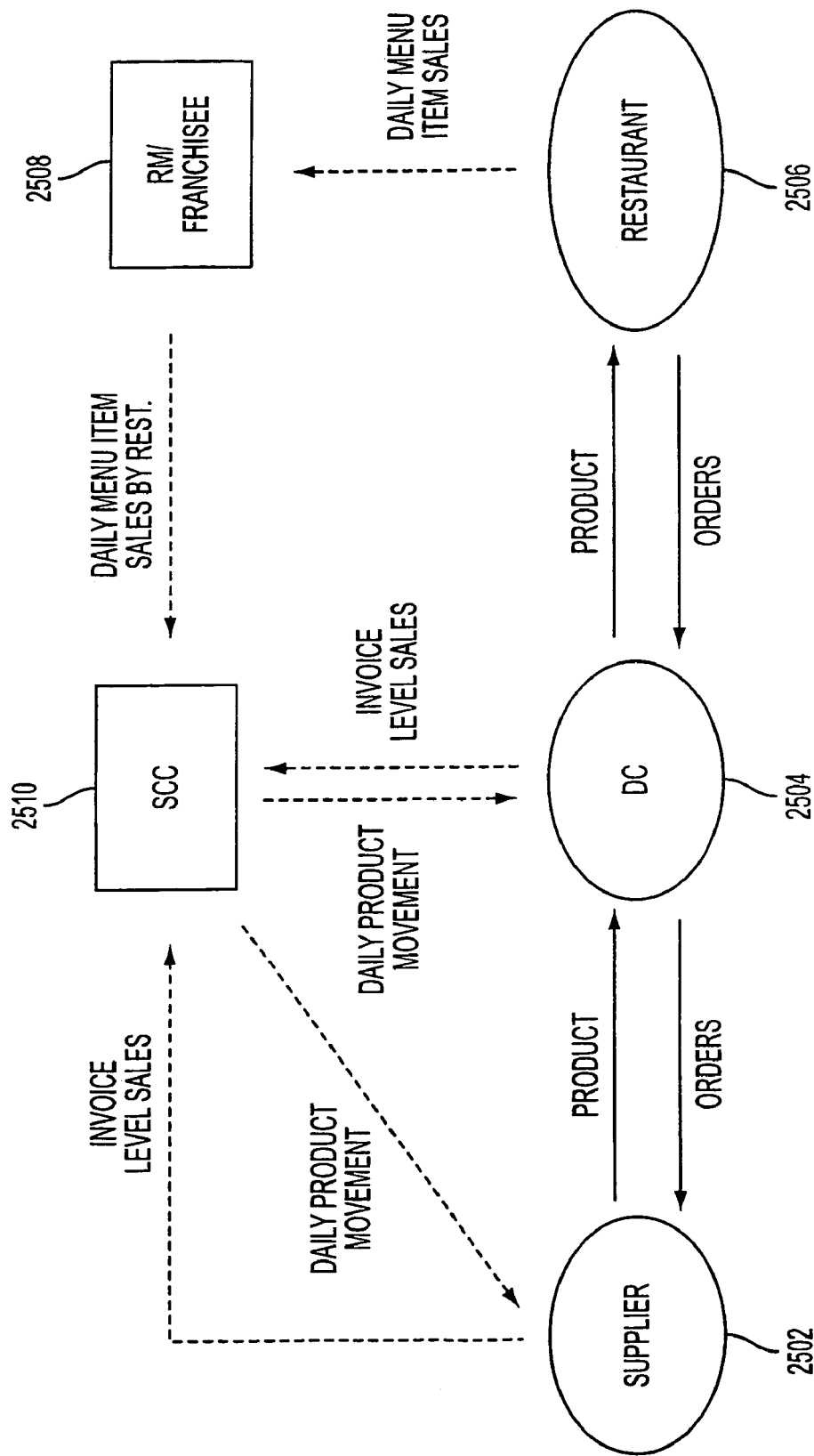
FIG. 25 is a flow diagram illustrating advanced communication and product movement according to an illustrative embodiment of the present invention.

FIG. 25 is a flow diagram illustrating advanced communication and product movement according to an illustrative embodiment of the present invention. Again, orders and products move back and forth between suppliers 2502, distributors 2504, and restaurants 2506. Daily menu item sales data is sent from the restaurants to restaurant management 2508, where it is forwarded to the supply chain coordinator 2510. The distributor sends invoice level sales information to the supply chain coordinator and receives daily product movement reports. The supply chain coordinator also receives invoice level sales data from the supplier and returns daily product movement reports to the supplier.

FIG. 26 illustrates a Sales Forecast Worksheet 2600 that sets forth historical data 2602 and projected data 2604. FIG. 27 depicts a Promotion Monitoring Worksheet 2700 illustrating statistics 2702 such as variance from expected levels.

Figure 28:
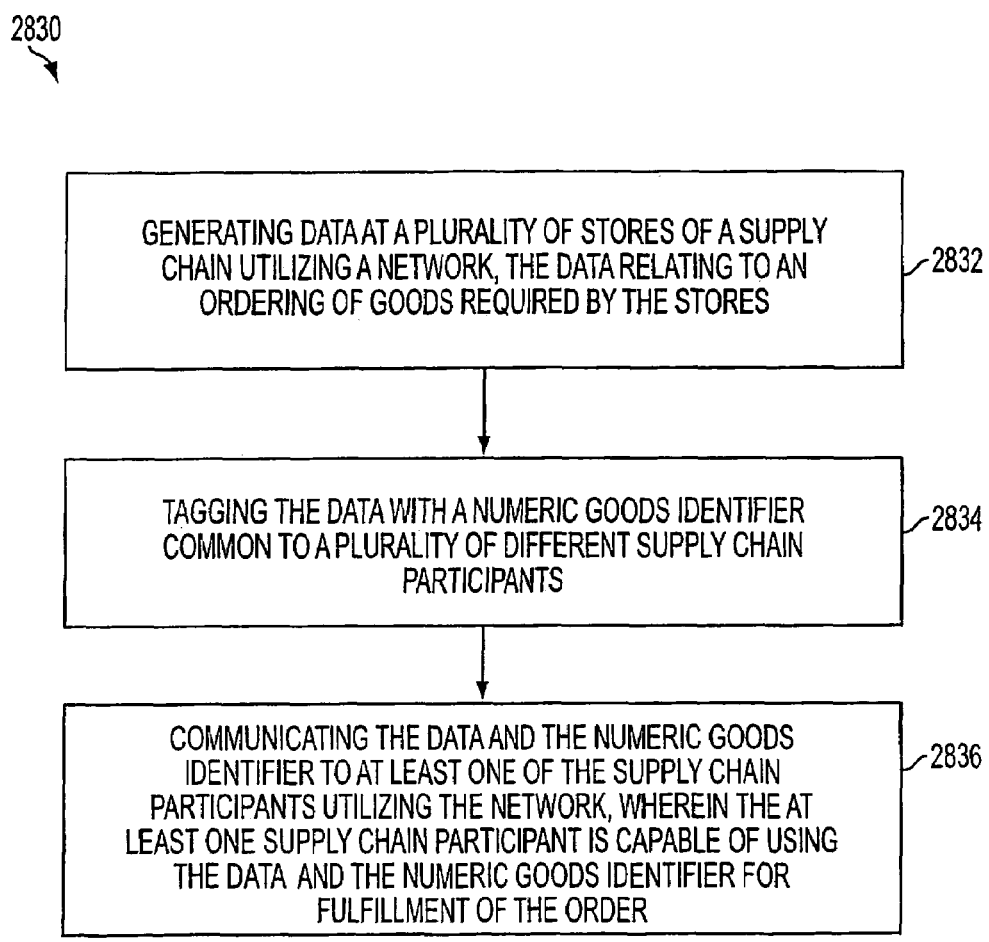
FIG. 28 is a flowchart of a process for identifying goods in a network-based supply chain management framework in accordance with an embodiment of the present invention.

FIG. 28 is a flowchart of a process 2830 for identifying goods in a network-based supply chain management framework. Data is generated at a plurality of stores of a supply chain utilizing a network in operation 2832. The generated data relates to an ordering of goods required by the stores. The generated data is tagged with a numeric goods identifier common to a plurality of different supply chain participants in operation 2834. The generated data and the numeric goods identifier are communicated via the network to one or more of the supply chain participants that are capable of using the data and the numeric goods identifier for fulfillment of the order in operation 2836.

In one aspect, the numeric goods identifier may include a global trade identification number (GTIN). In another aspect, the generated data and the numeric goods identifier may be communicated utilizing a network-based interface. In a further aspect, the numeric goods identifier may actually be positioned on the goods. In such an aspect, the numeric goods identifier may be positioned on the goods in the form of a bar code. In another aspect, the generated data may be tagged by including the numeric goods identifier therewith. In yet another aspect, outlet information is communicated between the supply chain participants. Also, order information can be synchronized between supply chain providers.

Reports

Figure 29:
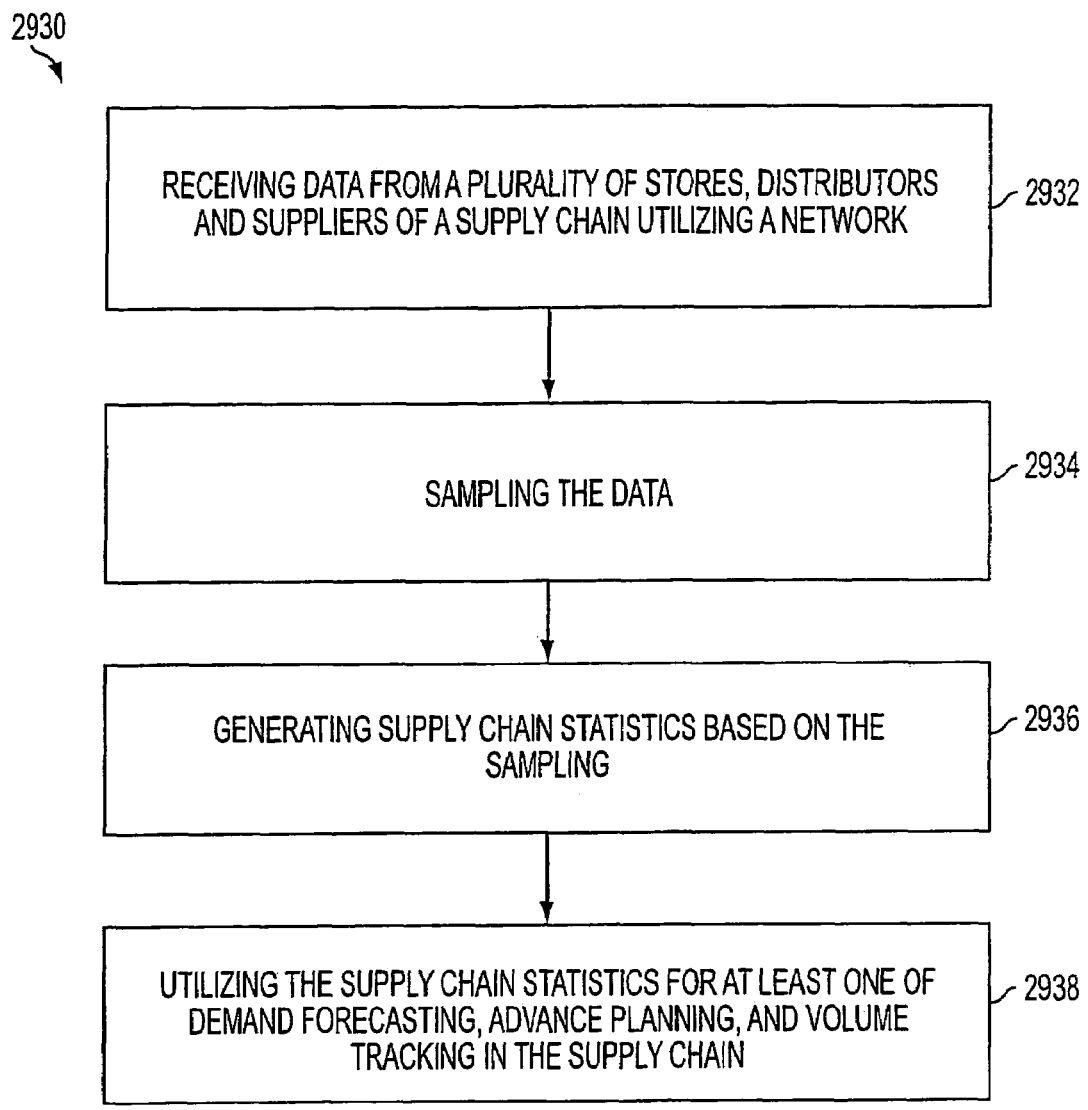
FIG. 29 is a flowchart of a process for generating supply chain statistics in accordance with an embodiment of the present invention.

FIG. 29 is a flowchart of a process 2930 for generating supply chain statistics. Data is received utilizing a network from a plurality of stores, distributors and suppliers of a supply chain in operation 2932. Preferably, the data is received from less than all of the stores, distributors and suppliers to generate closely-controlled representative statistics. The data is sampled in operation 2934 and supply chain statistics are generated based on the sampling in operation 2936. The generated supply chain statistics are utilized for demand forecasting, advance planning, and/or volume tracking in the supply chain in operation 2938.

In an aspect, the sampling may be representative of a predetermined percentage of the stores, distributors, and suppliers. In another aspect, the statistics may represent sales of the stores. In a further aspect, the statistics may represent goods ordered by the stores. In an additional aspect, the statistics may represent a timeliness of delivery of the ordered goods by the distributors. In one aspect, the statistics may represent an inventory of the suppliers.

Distributor

FIG. 30 depicts a sample report 3000 for a distribution center. Measurements of operation performance are provided in an Operations section 3002 and include warehouse outs, damages, mispicks, short on truck, and overlooked and not returned. A Purchasing section 3004 includes statistics in Out of Stock, Substitutions, and Out of Code fields. Other sections of the report preferably include Delivery Order Fill Rate, On-time Delivery, Perfect Order Rate, and Price Compliance.

Figure 31:
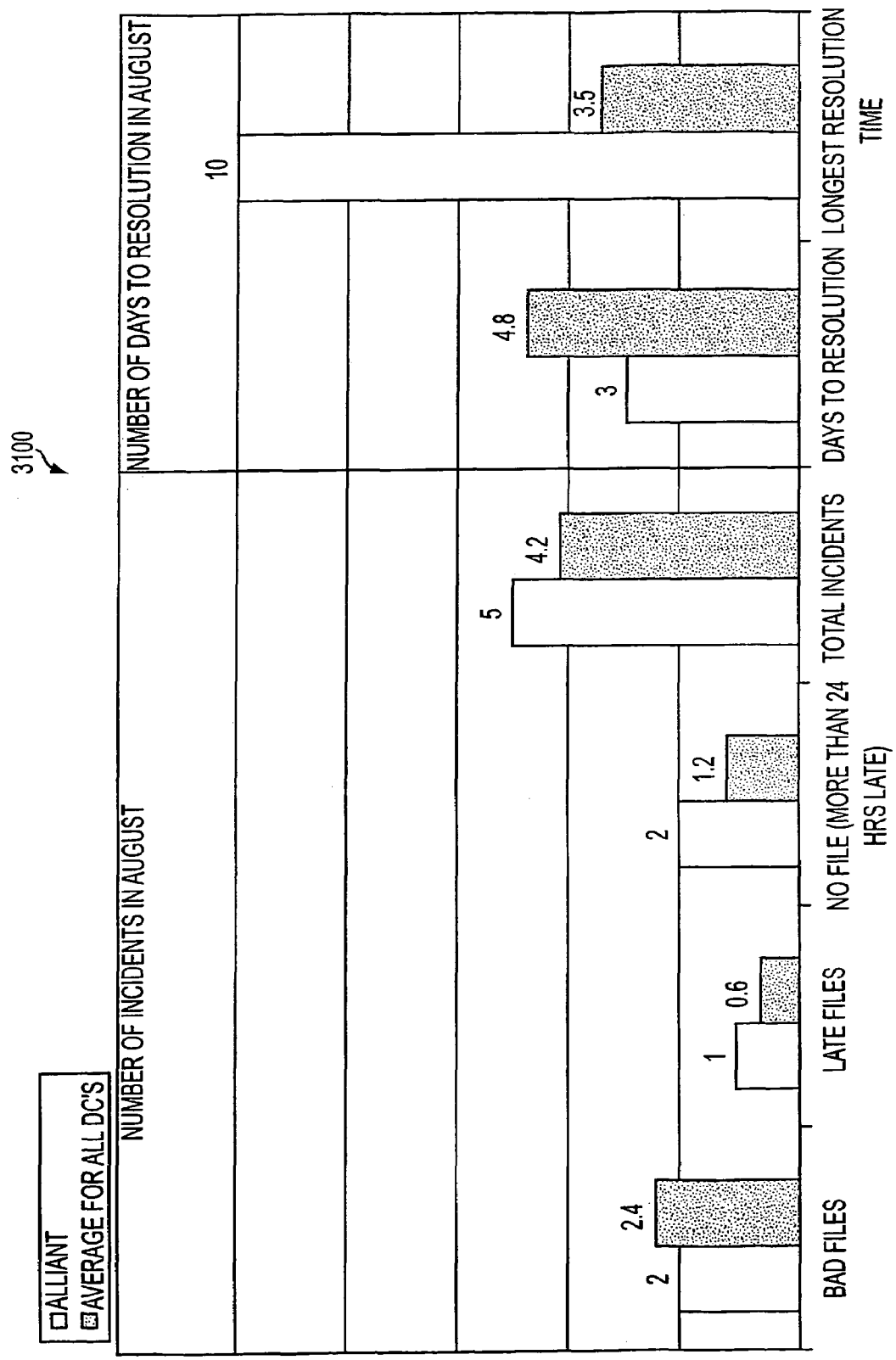
FIG. 31 illustrates a Data Quality report.

FIG. 31 illustrates a Data Quality report 3100. The report provides a comparison the following items to a group average: Bad Files, Late Files, No Files, and Time to Resolve.

FIG. 32 illustrates a distributor ranking report 3200 that provides statistics on the number of orders filled, on-time deliveries, and perfect orders delivered, and whether they med the minimum required by the supply chain coordinator, retail management, or both.

Supplier

Figure 33:
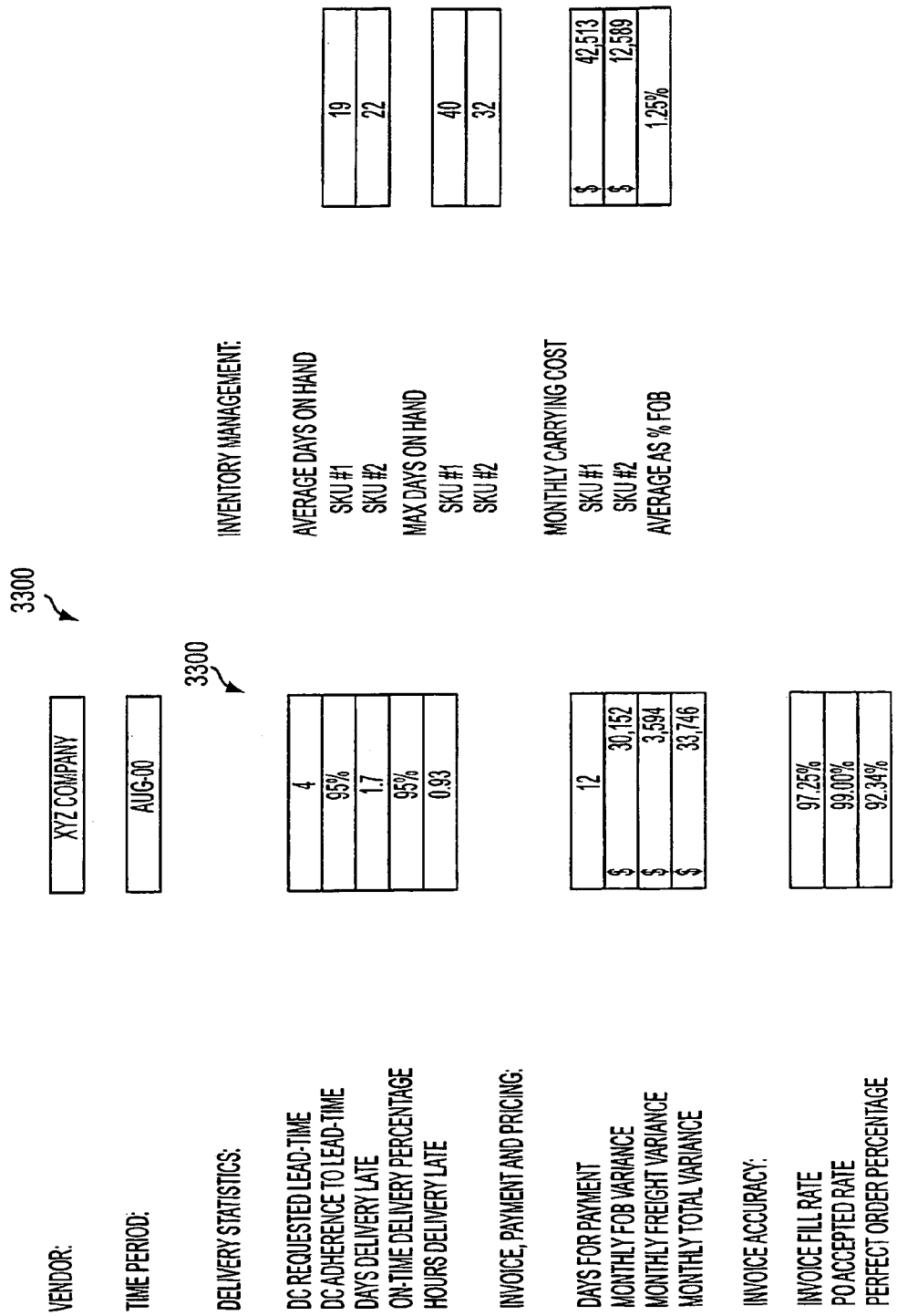
FIG. 33 depicts a sample Supplier report.

FIG. 33 depicts a sample Supplier report 3300. The report includes a Delivery Statistics section 3302 and other sections relating to Invoices and Inventory.

Figure 34:
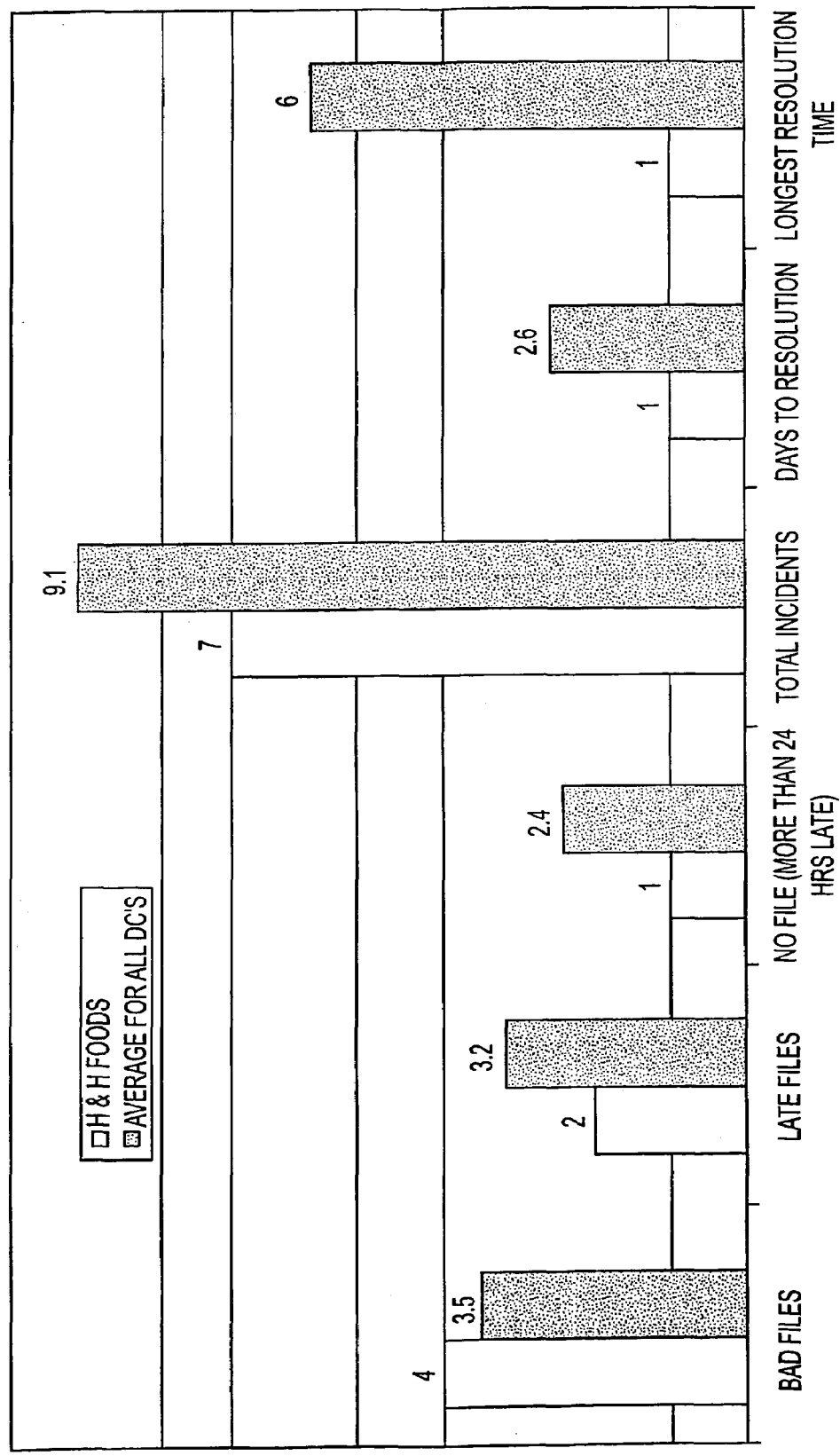
FIG. 34 illustrates a Data Quality report.

FIG. 34 illustrates a Data Quality report 3400. The report provides a comparison the following items to a group average: Bad Files, Late Files, No Files, and Time to Resolve.

FIG. 35 illustrates a distributor ranking report 3500 that provides statistics on the number of orders filled, on-time deliveries, and perfect orders delivered, and whether they met the minimum required by the supply chain coordinator, retail management, or both.

Cost

FIG. 36 illustrates a Food Cost Summary report 3600 that compares the actual cost of food against a projected cost.

Promotions

Figure 37:
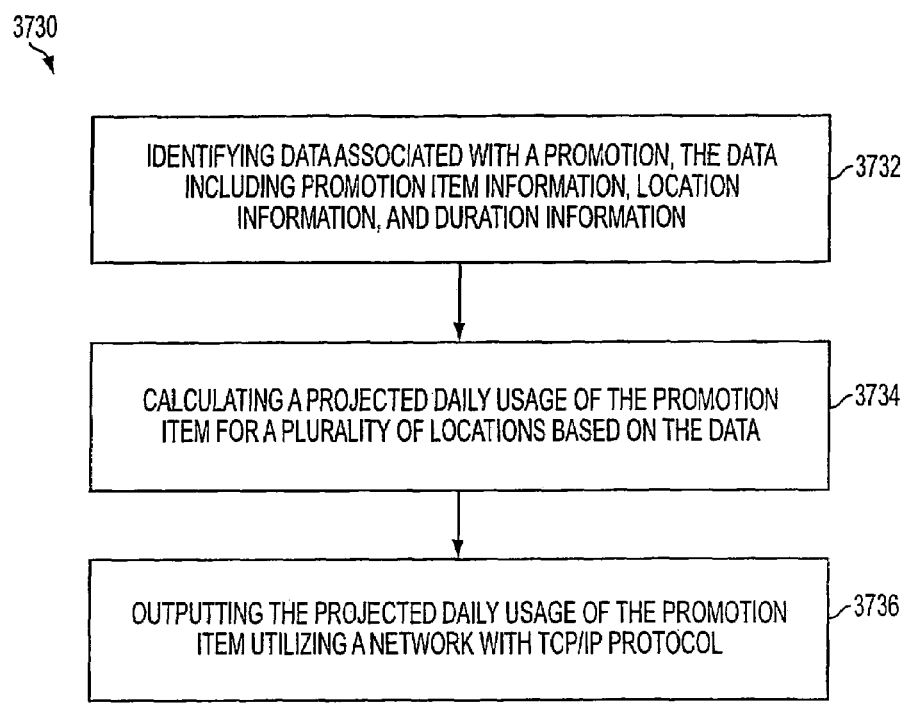
FIG. 37 is a flowchart of a process for promotion reporting in a network-based supply chain management framework in accordance with an embodiment of the present invention.

FIG. 37 is a flowchart of a process 3730 for promotion reporting in a network-based supply chain management framework. Data associated with a promotion is identified in operation 3732. Included in the data is promotion item information, location information, and duration information. A projected daily usage of the promotion item is calculated for a plurality of locations based on the data in operation 3734 and the projected daily usage of the promotion item is outputted utilizing a network with TCP/IP protocol in operation 3736. Using this information, supplies can be shipped where they are needed, on a daily basis if need be. Further, the projected daily usage can be separated by region for statistical purposes.

In an aspect, each location may include a store. In another aspect, the calculating may include parsing the data based on location information and the promotion item, and dividing the data by the duration information. In a further aspect, the promotion items may include utensils. In yet another aspect, the promotion items may include food. In one aspect, the projected daily usage may be outputted via a network-based interface. In even another aspect, a projected daily usage of finished goods may also be calculated for the plurality of locations based on the data. Next, the projections may be translated into a forecast of processed products required for the plurality of locations as well as into a forecast of delivery and storage parameters.

Confirmations

Figure 38:
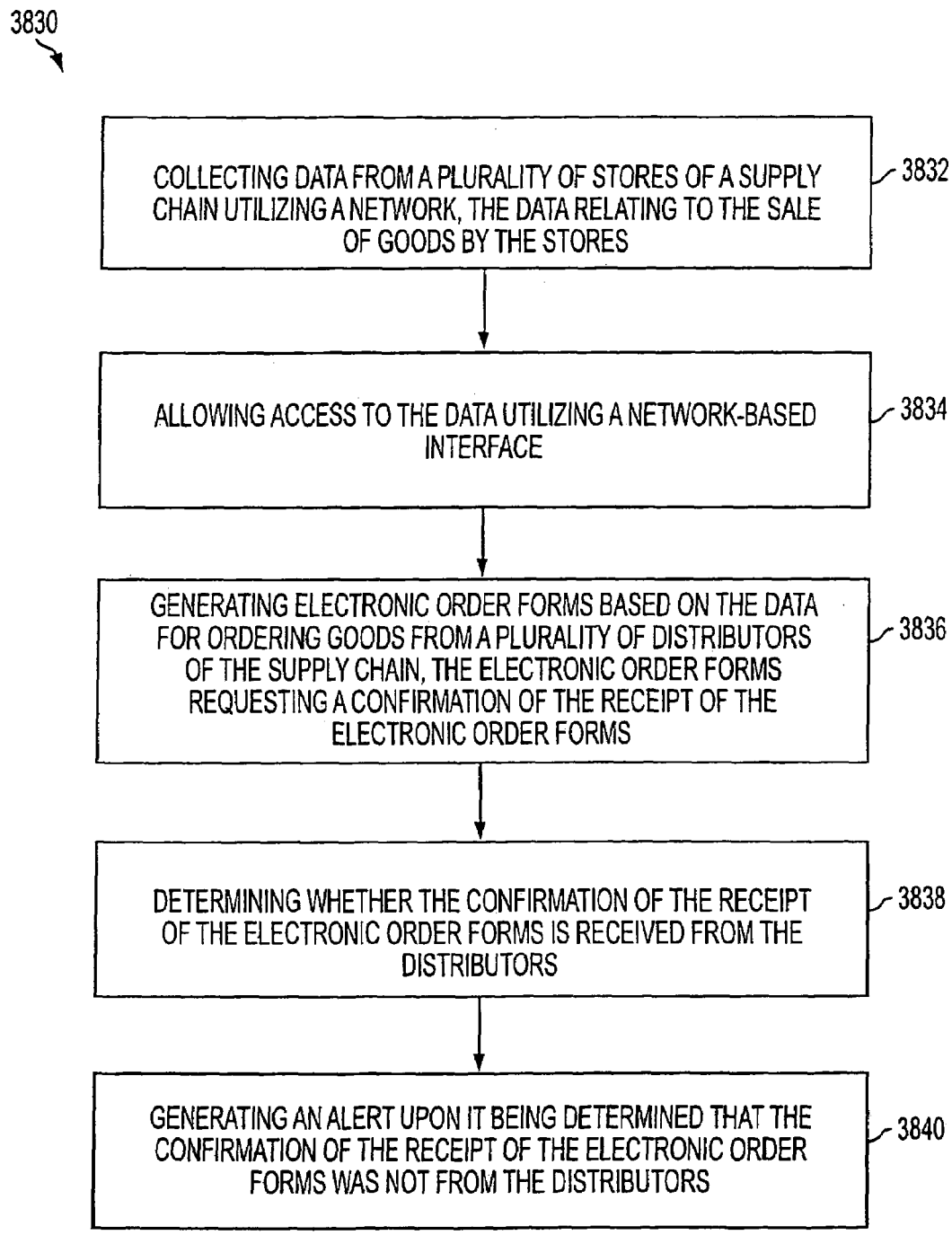
FIG. 38 is a flowchart of a process for order confirmation in a supply chain management framework in accordance with an embodiment of the present invention.

FIG. 38 is a flowchart of a process 3830 for order confirmation in a supply chain management framework. A network is utilized in operation 3832 to collect from a plurality of stores of a supply chain data relating to the sale of goods by the stores. Access is allowed to the data utilizing a network-based interface in operation 3834. Electronic order forms are generated in operation 3836 based on the data for ordering goods from a plurality of distributors of the supply chain. These electronic order forms request a confirmation of the receipt of the electronic order forms. A determination is made as to whether the confirmation of the receipt of the electronic order forms is received from the distributors in operation 3838. If it is determined that the confirmation of the receipt of the electronic order forms was not from the distributors, then an alert is generated in operation 3840.

In one aspect, the confirmation is received utilizing the network. In such an aspect, the network may include the Internet. In another aspect, the alert is transmitted to the stores utilizing the network. As an aspect, the alert may be displayed on the network-based interface. As a further aspect, the alert may include an electronic mail message.

Revenue Generation

The Supply Chain management system of the present invention creates, from its members, a web community with like interests. As a result, a number of different types of vendors may be interested in connecting to the site due to the captive audience comprising the web community, and because the community is a highly targeted audience with similar business goals/interests.

One area of revenue generation is collection of fees for advertising. Fees can be charged for such things as co-branding, local service and product providers, national providers of optional items/services, distributor specials, utilities, etc.

Revenue can also be generated by charging a fee to participants who buy and sell though the site, such as bakeries, soft drink vendors, coffee vendors, equipment vendors, consumers, restaurants, etc.

Sales and services can also be a source of revenue. Potential sources can be utilities, office products, computers, and equipment. Providing an auction service can also create revenue.

A preferred embodiment of the present invention utilizes one or more of the following revenue models: investment in web site, charge per unit sold through site, exposures or click through, or a combination of these.

Following are several processes for generating revenue.

Figure 39:
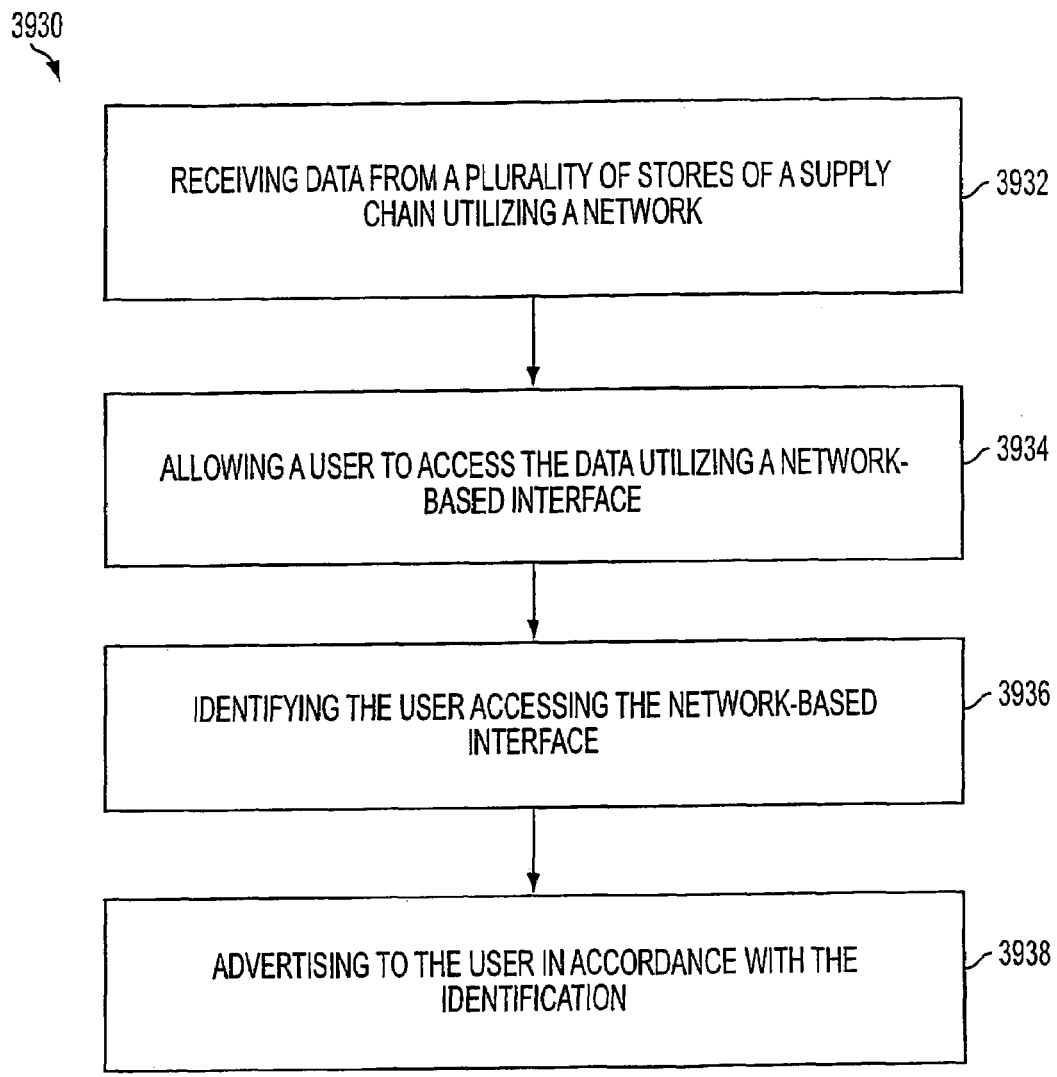
FIG. 39 is a flowchart of a process for advertising in a network-based supply chain management framework in accordance with an embodiment of the present invention.

FIG. 39 is a flowchart of a process 3930 for advertising in a network-based supply chain management framework in which data is received utilizing a network from a plurality of stores of a supply chain in operation 3932. A supply chain participant is allowed to access the data utilizing a network-based interface in operation 3934. The supply chain participant accessing the network-based interface is identified in operation 3936 and advertising is presented to the supply chain participant in accordance with the identification in operation 3938.

In an aspect, the network includes the Internet. In another aspect, the supply chain participant may be a supplier, a distributor, and/or a store. In such an aspect, the advertising advertises the sale of products required for the production of the goods produced by the stores. As another aspect, the advertising may be conducted by at least one of the supply chain participants. In an additional aspect, a charge may be required for the advertising.

Figure 40:
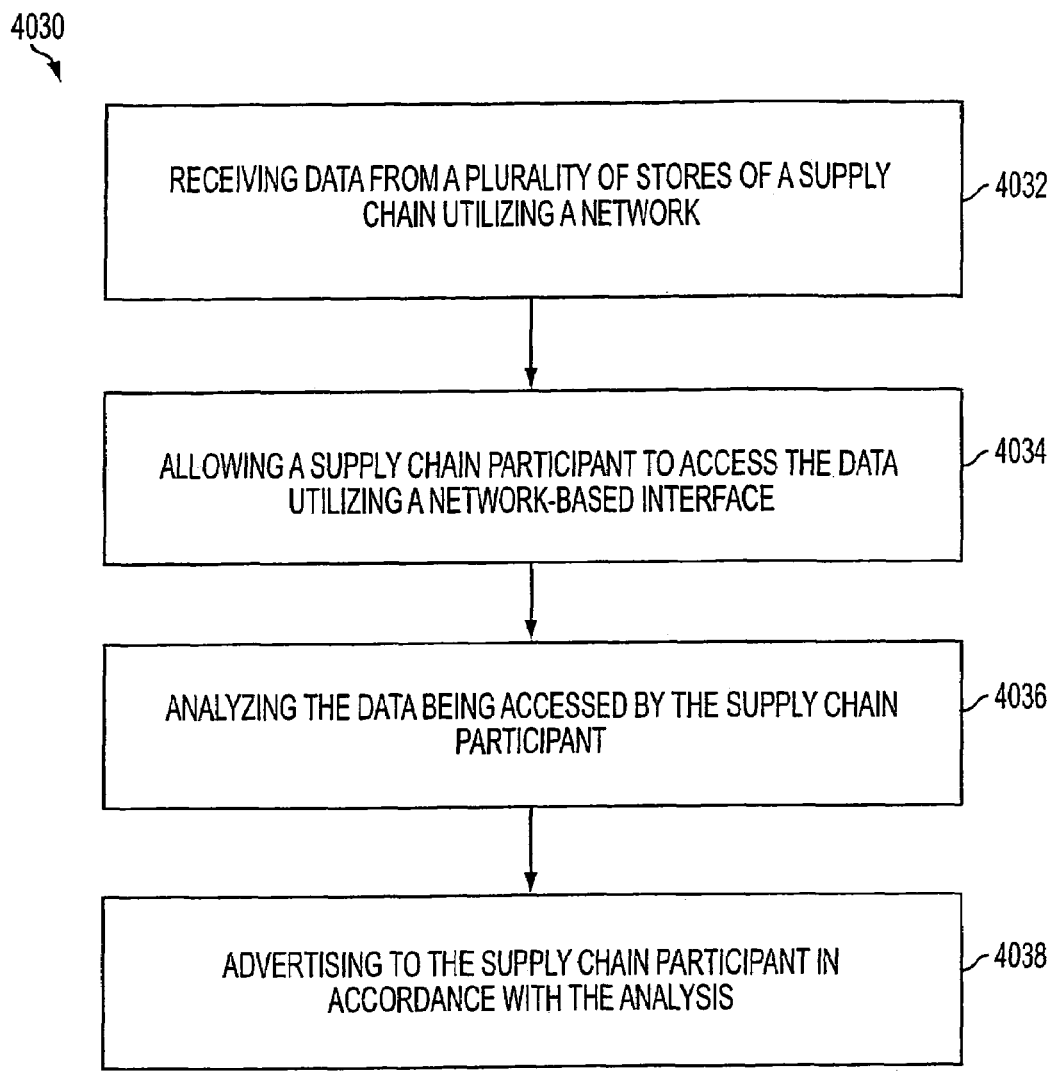
FIG. 40 is a flowchart of a process for advertising in a network-based supply chain management framework in accordance with an embodiment of the present invention.

FIG. 40 is a flowchart of a process 4030 for advertising in a network-based supply chain management framework. Data from a plurality of stores of a supply chain is received utilizing a network in operation 4032. A supply chain participant is allowed to access the data utilizing a network-based interface in operation 4034. The data being accessed by the supply chain participant is analyzed in operation 4036 so that advertising may be presented to the user in accordance with the analysis in operation 4038.

In an aspect, the network includes the Internet. In another aspect, the supply chain participant may be a supplier, a distributor, and/or a store. In such an aspect, the advertising may advertise the sale of products required for the production of the goods produced by the stores. As another aspect, the advertising may be conducted by one of the supply chain participants. In one aspect, charge is required for the advertising.

Figure 41:
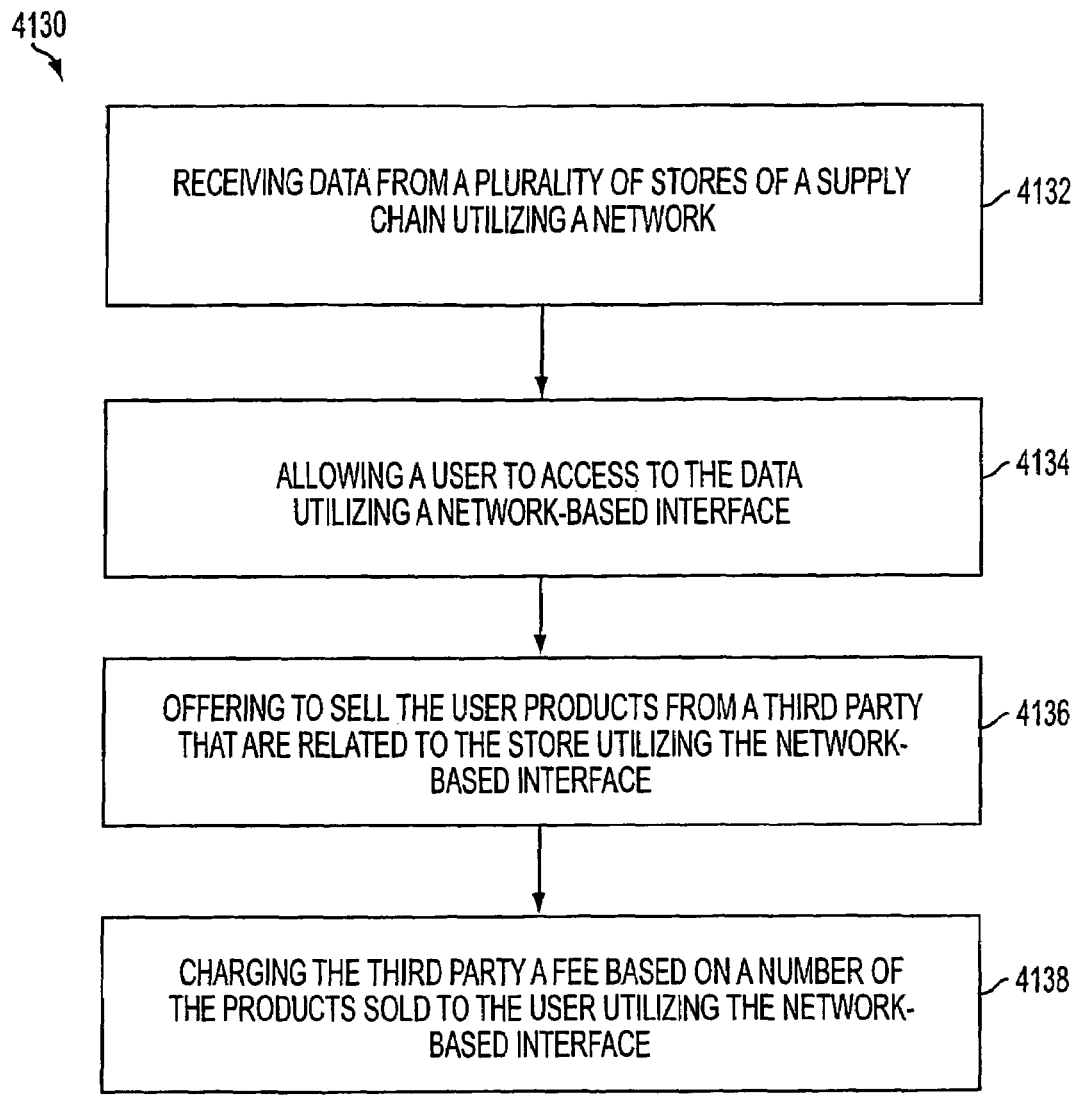
FIG. 41 is a flowchart of a process for generating revenue utilizing a network-based supply chain management framework in accordance with an embodiment of the present invention.

FIG. 41 is a flowchart of a process 4130 for generating revenue utilizing a network-based supply chain management framework. A network is utilized to receive data from a plurality of stores of a supply chain in operation 4132. A user is allowed to access to the data utilizing a network-based interface in operation 4134. Offers are then made to the user to sell products from a third party that are related to the store utilizing the network-based interface in operation 4136. The third party is charged a fee based on a number of the products sold to the user utilizing the network-based interface in operation 4138.

In one aspect, the network includes the Internet. In another aspect, the user may be a supplier, a distributor, and/or a store. In such an aspect, the products may be required for the production of the goods produced by the stores. In such an aspect, the advertising may be conducted by at least one of the users.

Figure 42:
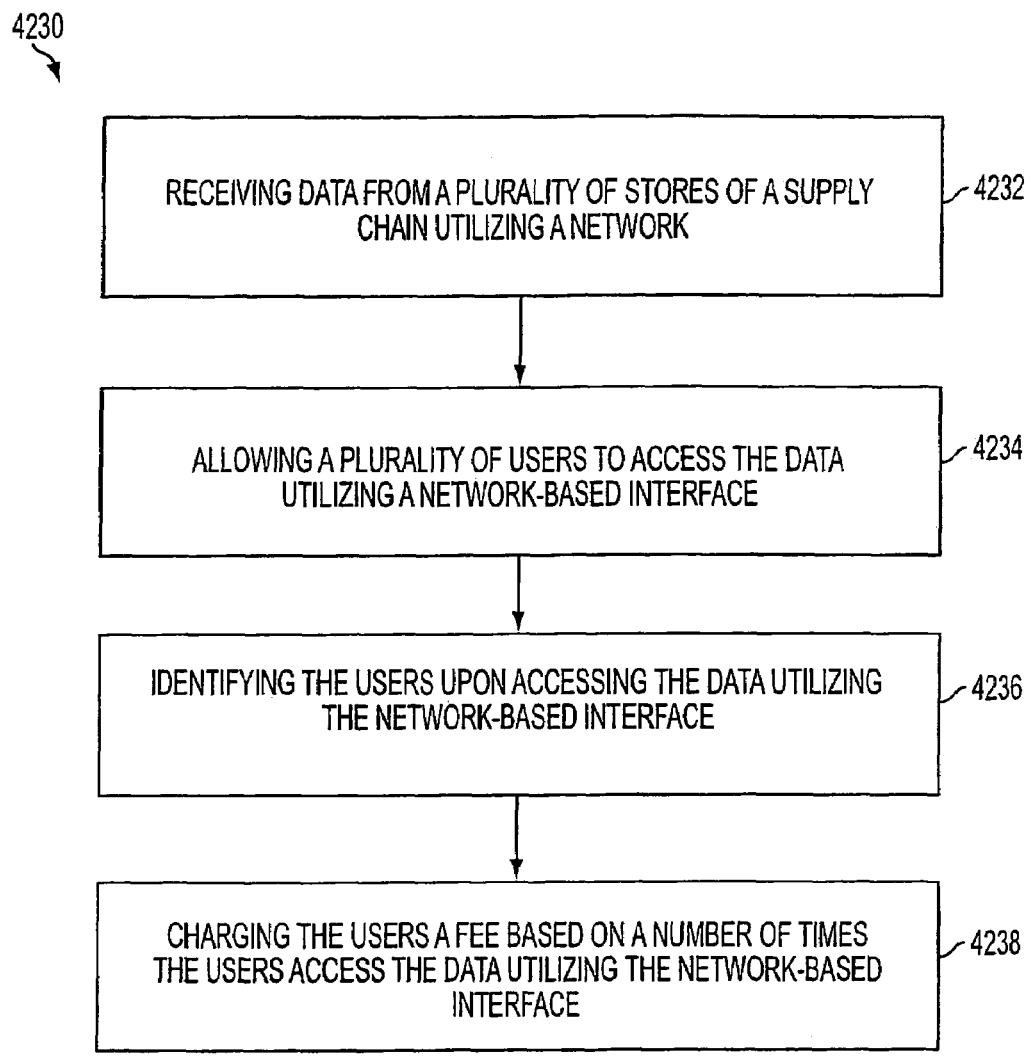
FIG. 42 is a flowchart of a process for generating revenue utilizing a network-based supply chain management framework in accordance with an embodiment of the present invention.

FIG. 42 is a flowchart of a process 4230 for generating revenue utilizing a network-based supply chain management framework. Data is received via a network from a plurality of stores of a supply chain in operation 4232. A plurality of users are allowed to access the data utilizing a network-based interface in operation 4234. The users are identified upon accessing the data utilizing the network-based interface in operation 4236 so that the users can be charged a fee based on a number of times the users access the data utilizing the network-based interface in operation 4238.

In an aspect, the network includes the Internet. In one aspect, the users include suppliers, distributors, and/or stores. In another aspect, advertising is displayed on the network-based interface which advertises the sale of products required for the production of the goods produced by the store. As an aspect, the advertising may be conducted by at least one of the users. As another aspect, a charge is required for the advertising.

Figure 43A:
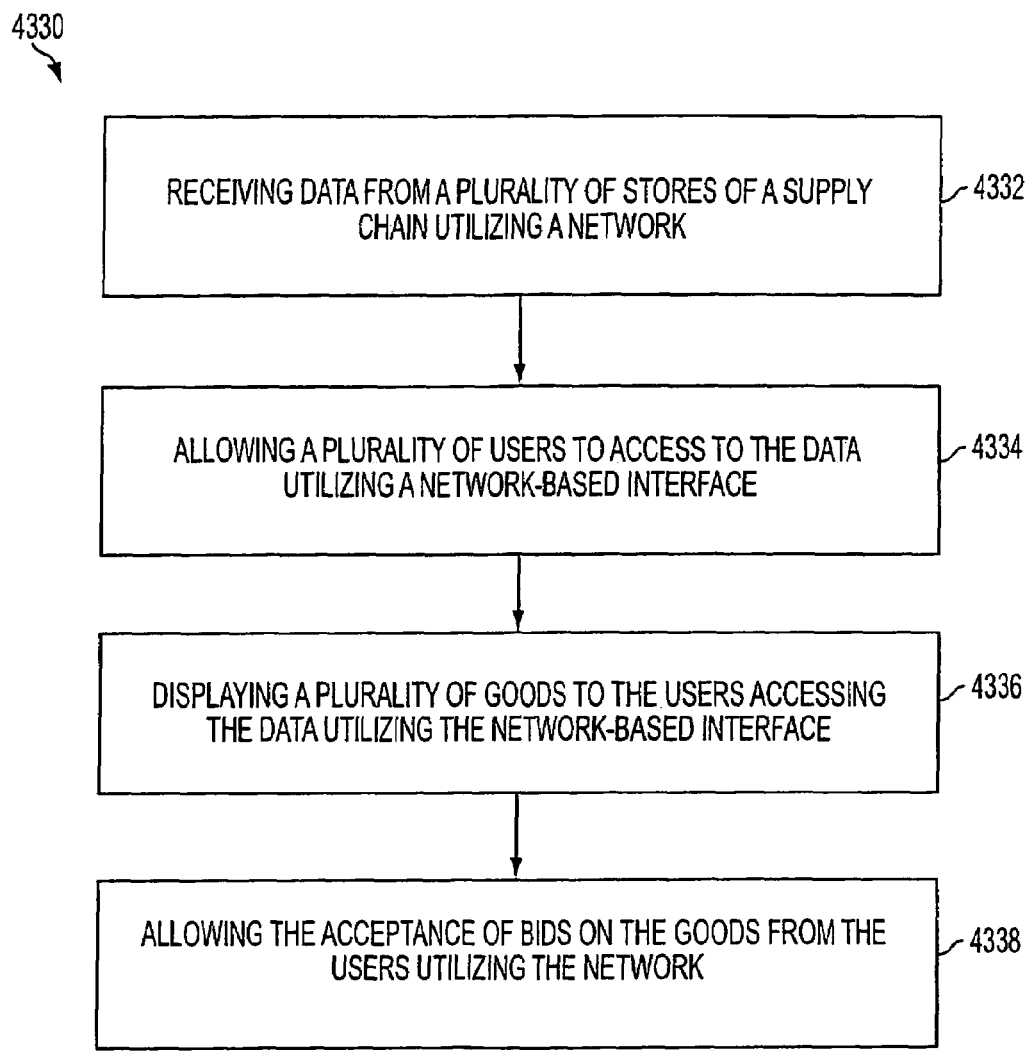
FIG. 43A is a flowchart of a process for an auction function utilizing a network-based supply chain management framework in accordance with an embodiment of the present invention.

FIG. 43A is a flowchart of a process 4330 for an auction function utilizing a network-based supply chain management framework. Data is received via a network from a plurality of stores of a supply chain in operation 4332. A plurality of users are allowed to access to the data utilizing a network-based interface in operation 4334. A plurality of goods are displayed to the users accessing the data utilizing the network-based interface in operation 4336. Subsequently, the acceptance of bids on the goods is allowed from the users utilizing the network in operation 4338.

In one aspect, the network includes the Internet. In another aspect, the users may be a supplier, a distributor, and/or a store. In a further aspect, advertising is displayed on the network-based interface which advertises the sale of products required for the production of the goods produced by the store. In such an aspect, the advertising may be conducted by at least one of the users. As another aspect, a charge may be required for the advertising.

Figure 43B:
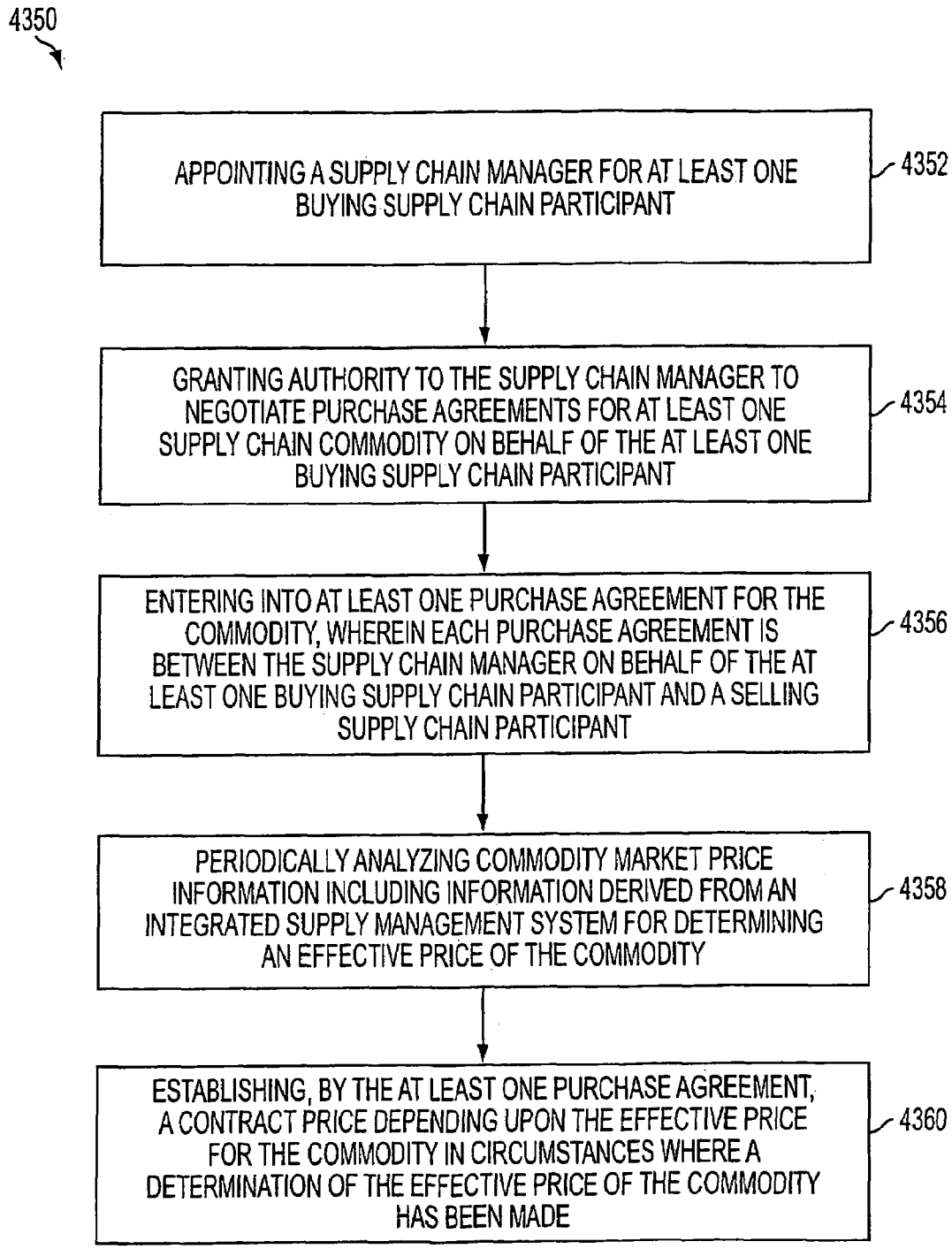
FIG. 43B is a flow diagram of a process for utilizing market demand information for generating revenue.

FIG. 43B is a flow diagram of a process 4350 for utilizing market demand information for generating revenue. In operation 4352, a supply chain manager is appointed for at least one buying supply chain participant. Such appointment can be made arbitrarily, by default, upon selection by the supply chain participant, etc. In operation 4354, a grant of authority is given to the supply chain manager to negotiate purchase agreements for at least one supply chain commodity on behalf of the at least one buying supply chain participant. One or more purchase agreements for the commodity are entered into in operation 4356. Each purchase agreement is between the supply chain manager on behalf of the at least one buying supply chain participant and a selling supply chain participant. A periodic analysis of commodity market price information is performed in operation 4358. Such price information includes information derived from an integrated supply management system for determining an effective price of the commodity. In the purchase agreement(s), a contract price that depends upon the effective price for the commodity is established in operation 4360 in circumstances where a determination of the effective price of the commodity has been made.

In one aspect, the supply chain manager is granted authority to negotiate purchase agreements for the at least one supply chain commodity on behalf of all buying supply chain participants. The commodity can be a raw material, a partially finished good, and/or a finished good. In a further aspect, the at least one purchase agreement establishes a contract price depending upon an actual market price for the commodity in circumstances where no determination of the effective price of the commodity has been made. In one aspect, an actual market price of the commodity is kept secret from the at least one buying supply chain participant. In another aspect, an identity of the at least one buying supply chain participant is kept secret from a supplier of the commodity.

One benefit of this embodiment of the present invention is that the supply chain manager may have greater information about market demand for various raw material commodities than a distributor, and may wish to benefit from the availability of this information. By fixing an "effective raw material price," the supplier is free to either take the required position (at no cost, since the contract price will be based upon the effective price), or take a contrary view, with the associated risk and benefit.

An additional benefit of this system is that the supply chain manager may exploit raw material information without: (1) disclosing confidential information beyond the fixed price analysis; and (2) needing to include raw material suppliers immediately into the integrated supply chain models.

Figure 43C:
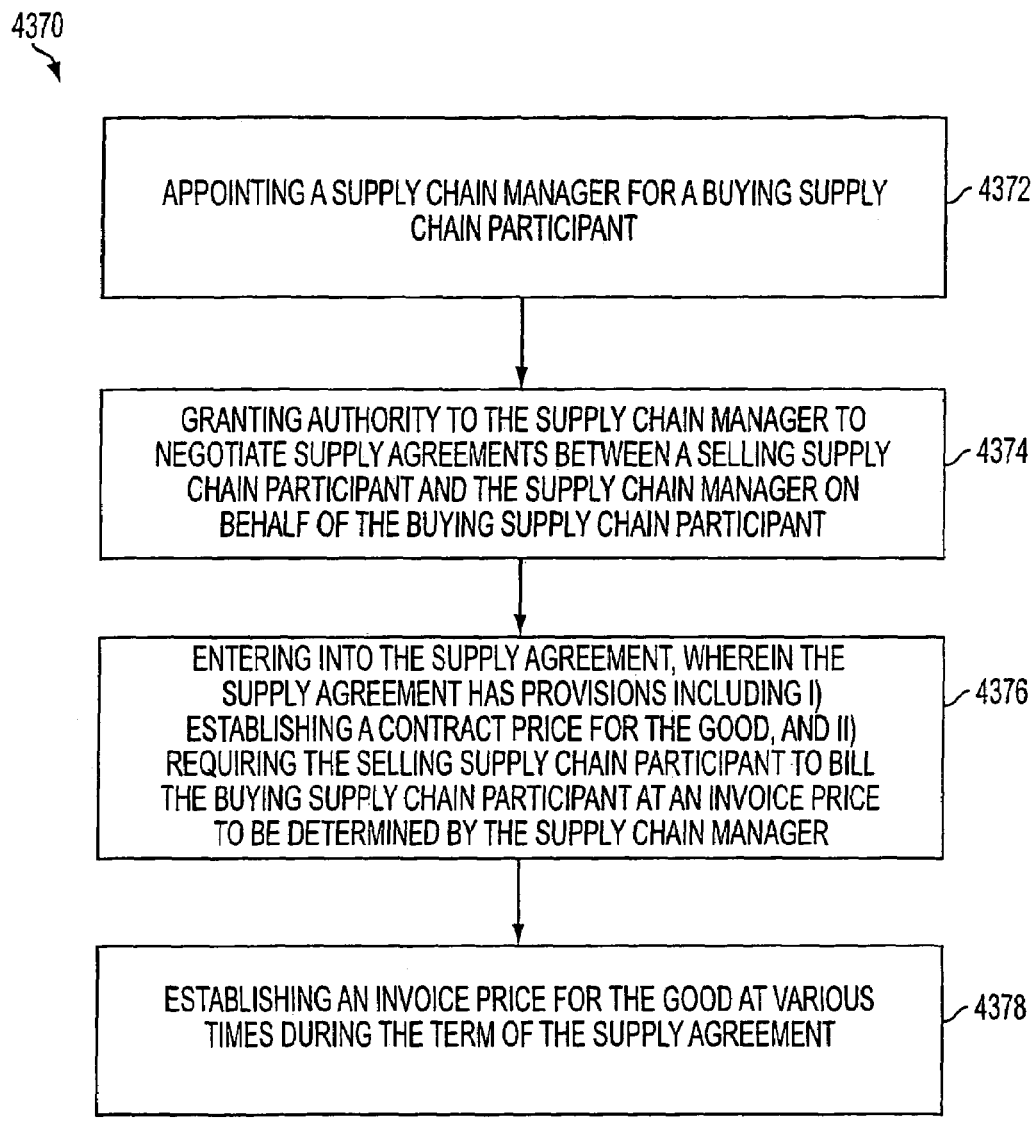
FIG. 43C is a flow diagram of another process for generating revenue according to an embodiment of the present invention.

FIG. 43C is a flow diagram of another process 4370 for generating revenue according to an embodiment of the present invention. A supply chain manager is appointed for a buying supply chain participant in operation 4372. In operation 4374, authority is granted to the supply chain manager to negotiate supply agreements between a selling supply chain participant and the supply chain manager on behalf of the buying supply chain participant. The supply agreement is entered into with the supply agreement having at least the following provisions: i) establishing a contract price for the good, and ii) requiring the selling supply chain participant to bill the buying supply chain participant at an invoice price to be determined by the supply chain manager in operation 4376. In operation 4378, an invoice price for the good is established at various times during the term of the supply agreement.

By controlling the invoice price, the distributor does not know the contract price of the supplier. Another advantage provided is that the supply chain manager can direct supplier to buy raw materials at a particular price based on supply and demand information gathered by the supply chain management system.

In one aspect of the present invention, the invoice price is collected from the buying supply chain participant(s). Preferably, the billing and collecting are performed at the direction of the supply chain manager. In another aspect, an overpayment to a selling supply chain participant for a commodity is reconciled by paying the difference between the corresponding contract price and the corresponding invoice price to the supply chain manager. In a further aspect, an underpayment to a selling supply chain participant for a commodity is reconciled by paying the difference between the corresponding invoice price and the corresponding contract price to the selling supply chain participant.

Figure 43D:
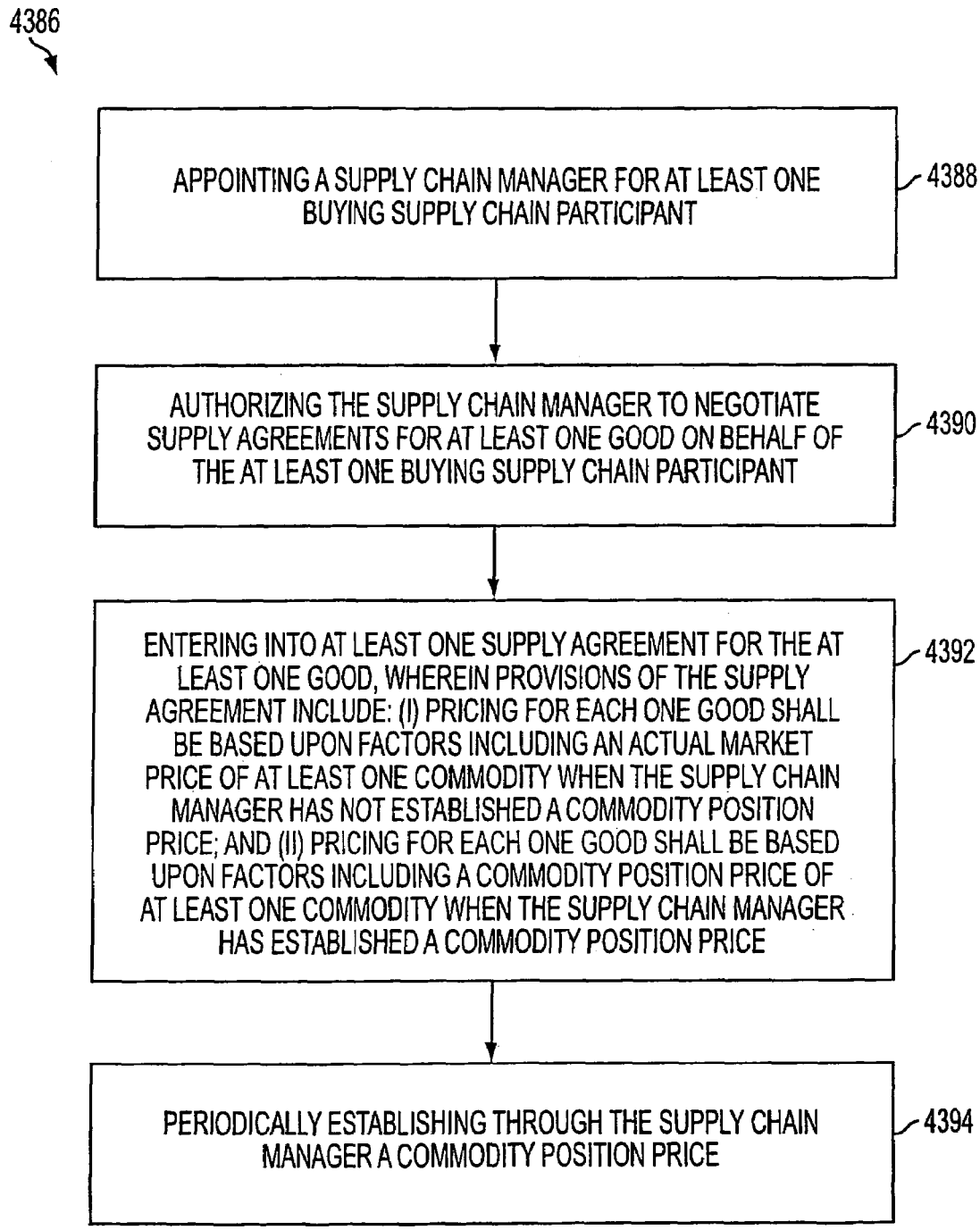
FIG. 43D is a flow chart of a process 4386 for risk management in a supply chain management framework.

FIG. 43D is a flow chart of a process 4386 for risk management in a supply chain management framework. In operation 4388, a supply chain manager is appointed for at least one buying supply chain participant. Such appointment can be made arbitrarily, by default, upon selection by the supply chain participant, etc. In operation 4390, the supply chain manager is given authority to negotiate supply agreements for at least one good on behalf of the at least one buying supply chain participant. Note that the good may be a raw material and/or a filly finished good as well. One or more supply agreements are entered into for the at least one good in operation 4392. Provisions of the supply agreement include: (i) pricing for each one good shall be based upon factors including an actual market price of at least one commodity when the supply chain manager has not established a commodity position price; and (ii) pricing for each one good shall be based upon factors including a commodity position price of at least one commodity when the supply chain manager has established a commodity position price. Periodically, in operation 4394, a commodity position price is established through the supply chain manager, so that the supply chain manager may thereby address risks to the supply chain of varying market levels and market volatility of the at least one goods.

In one aspect of the present invention, commodity position prices can be established based on information including information derived from receiving data from a plurality of supply chain participants of a supply chain utilizing a network, the data relating to the sale of products by the supply chain participants.

In one aspect, the supply chain manager is granted authority to negotiate supply agreements for the at least one good on behalf of all buying supply chain participants. In another aspect, an actual market price of the at least one good is kept secret from the at least one buying supply chain participant. In a further aspect, an identity of the at least one buying supply chain participant is kept secret from a supplier of the at least one good. In yet another aspect, each supply agreement is between the supply chain manager on behalf of the at least one buying supply chain participant and a selling supply chain participant. In even a further aspect, the good may be an at least partially finished good. In an additional aspect, the determining may include the analyzing of data collected from a plurality of supply chain participants relating to the sale of goods.

Technology Overview

Figure 44:
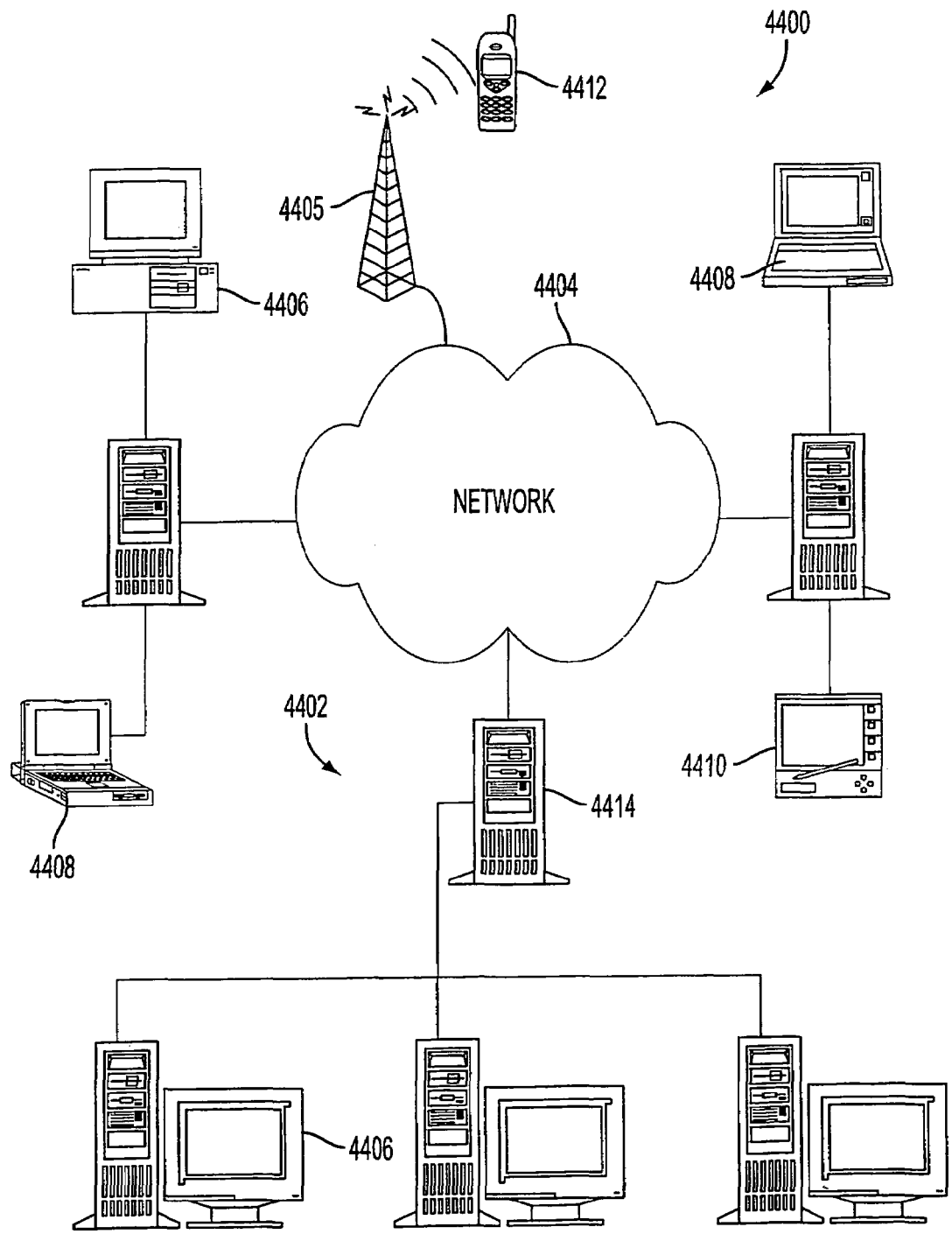
FIG. 44 illustrates an exemplary system with a plurality of components in accordance with one embodiment of the present invention.

FIG. 44 illustrates an exemplary system 4400 with a plurality of components 4402 in accordance with one embodiment of the present invention. As shown, such components include a network 4404 which take any form including, but not limited to a local area network, a wide area network such as the Internet, and a wireless network 4405. Coupled to the network 4404 is a plurality of computers which may take the form of desktop computers 4406, lap-top computers 4408, hand-held computers 4410 (including wireless devices 4412 such as wireless PDA's or mobile phones), or any other type of computing hardware/software. As an option, the various computers may be connected to the network 4404 by way of a server 4414 which may be equipped with a firewall for security purposes. It should be noted that any other type of hardware or software may be included in the system and be considered a component thereof.

Figure 45:
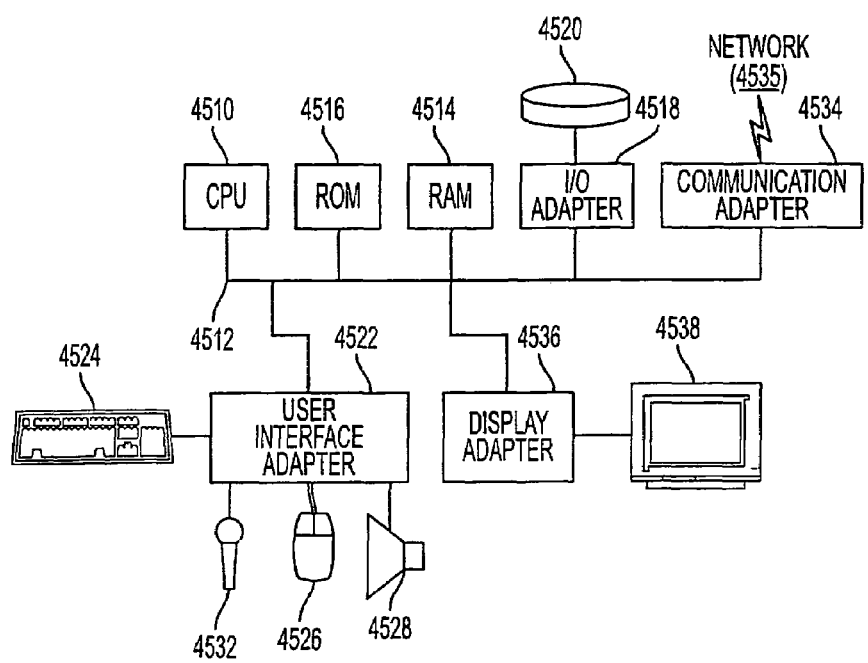
FIG. 45 is a schematic diagram of a hardware implementation of one embodiment of the present invention.

A representative hardware environment associated with the various components of FIG. 44 is depicted in FIG. 45. In the present description, the various sub-components of each of the components may also be considered components of the system. For example, particular software modules executed on any component of the system may also be considered components of the system. FIG. 45 illustrates a typical hardware configuration of a workstation in accordance with one embodiment having a central processing unit 4510, such as a microprocessor, and a number of other units interconnected via a system bus 4512.

The workstation shown in FIG. 45 includes a Random Access Memory (RAM) 4514, Read Only Memory (ROM) 4516, an I/O adapter 4518 for connecting peripheral devices such as disk storage units 4520 to the bus 512, a user interface adapter 4522 for connecting a keyboard 4524, a mouse 4526, a speaker 4528, a microphone 4532, and/or other user interface devices such as a touch screen (not shown) to the bus 4512, communication adapter 4534 for connecting the workstation to a communication network 4535 (e.g., a data processing network) and a display adapter 4536 for connecting the bus 4512 to a display device 4538.

An embodiment of the present invention may be written using traditional methodologies and programming languages, such as C, Pascal, BASIC or Fortran, or may be written using object oriented methodologies and object-oriented programming languages, such as Java, C++, C#, Python or Smalltalk. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

- Objects can represent physical objects, such as automobiles in a traffic-flow simulation, electrical components in a circuit-design program, countries in an economics model, or aircraft in an air-traffic-control system.
- Objects can represent elements of the computer-user environment such as windows, menus or graphics objects.
- An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

- Behavior versus protocol. Class libraries are essentially collections of behaviors that can be called when those individual behaviors are desired in the program. A framework, on the other hand, provides not only behavior but also the protocol or set of rules that govern the ways in which behaviors can be combined, including rules for what a programmer is supposed to provide versus what the framework provides.
- Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.
- Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the server. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. SGML documents are documents with generic semantics that are appropriate for representing information from a wide range of domains and are HTML compatible. HTML has been in use by the World-Wide Web global information initiative since 1990. HTML is an application of ISO Standard 8879; 1986 Information Processing Text and Office Systems; Standard Generalized Markup Language (SGML).

XML (Extensible Markup Language) is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML can be used by any individual or group of individuals or companies that wants to share information in a consistent way.

XML, a formal recommendation from the World Wide Web Consortium (W3C), is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page.

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystems's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to Java is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for Java without undue experimentation to practice the invention.

Transmission Control Protocol/Internet Protocol (TCP/IP) is a basic communication language or protocol of the Internet. It can also be used as a communications protocol in the private networks called intranet and in extranet. When one is set up with direct access to the Internet, his or her computer is provided with a copy of the TCP/IP program just as every other computer that he or she may send messages to or get information from also has a copy of TCP/IP.

TCP/IP comprises a Transmission Control Protocol (TCP) layer and an Internet Protocol (IP) layer. TCP manages the assembling of series of packets from a message or file for transmission of packets over the internet from a source host to a destination host. IP handles the addressing of packets to provide for the delivery of each packet from the source host to the destination host. Host computers on a network, receive packets analyze the addressing of the packet If the host computer is not the destination the host attempts to route the packet by forwarding it to another host that is closer in some sense to the packet's destination. While some packets may be routed differently through a series of interim host computers than others, TCP and IP provides for the packets to be correctly reassembled at the ultimate destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously (note that the TCP layer itself is not stateless as far as any one message is concerned. Its connection remains in place until all packets in a message have been received.).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets one logon to remote computers, and the Simple Mail Transfer Protocol (SMTP). These and other protocols are often packaged together with TCP/IP as a "suite."

Personal computer users usually get to the Internet through the Serial Line Internet Protocol (SLIP) or the Point-to-Point Protocol. These protocols encapsulate the IP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX)is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPTP) and Microsoft has extended Windows NT_to support it. VPN software is typically installed as part of a company's firewall server.

Wireless refers to a communications, monitoring, or control system in which electromagnetic radiation spectrum or acoustic waves carry a signal through atmospheric space rather than along a wire. In most wireless systems, radio frequency (RF) or infrared transmission (IR) waves are used. Some monitoring devices, such as intrusion alarms, employ acoustic waves at frequencies above the range of human hearing.

Early experimenters in electromagnetic physics dreamed of building a so-called wireless telegraph. The first wireless telegraph transmitters went on the air in the early years of the 20th century. Later, as amplitude modulation (AM) made it possible to transmit voices and music via wireless, the medium came to be called radio. With the advent of television, fax, data communication, and the effective use of a larger portion of the electromagnetic spectrum, the original term has been brought to life again.

Common examples of wireless equipment in use today include the Global Positioning System, cellular telephone phones and pagers, cordless computer accessories (for example, the cordless mouse), home-entertainment-system control boxes, remote garage-door openers, two-way radios, and baby monitors. An increasing number of companies and organizations are using wireless LAN. Wireless transceivers are available for connection to portable and notebook computers, allowing Internet access in selected cities without the need to locate a telephone jack. Eventually, it will be possible to link any computer to the Internet via satellite, no matter where in the world the computer might be located.

Bluetooth is a computing and telecommunications industry specification that describes how mobile phones, computers, and personal digital assistants (PDA's) can easily interconnect with each other and with home and business phones and computers using a short-range wireless connection. Each device is equipped with a microchip transceiver that transmits and receives in a previously unused frequency band of 2.45 GHz that is available globally (with some variation of bandwidth in different countries). In addition to data, up to three voice channels are available. Each device has a unique 48-bit address from the IEEE 802 standard. Connections can be point-to-point or multipoint. The maximum range is 10 meters. Data can be presently be exchanged at a rate of 1 megabit per second (up to 2 Mbps in the second generation of the technology). A frequency hop scheme allows devices to communicate even in areas with a great deal of electromagnetic interference. Built-in encryption and verification is provided.

Encryption is the conversion of data into a form, called a ciphertext, that cannot be easily understood by unauthorized people. Decryption is the process of converting encrypted data back into its original form, so it can be understood.

The use of encryption/decryption is as old as the art of communication. In wartime, a cipher, often incorrectly called a "code," can be employed to keep the enemy from obtaining the contents of transmissions (technically, a code is a means of representing a signal without the intent of keeping it secret; examples are Morse code and ASCII). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if User A sends User B a message, User A can find out User B's public key (but not User B's private key) from a central administrator and encrypt a message to User B using User B's public key. When User B receives it, User B decrypts it with User B's private key. In addition to encrypting messages (which ensures privacy), User B can authenticate himself to User A (so User A knows that it is really User B who sent the message) by using User B's private key to encrypt a digital certificate. When User A receives it, User A can use User B's public key to decrypt it.

Communication

Data collection and dissemination is preferably accomplished over a network such as the Internet.

Figure 46:
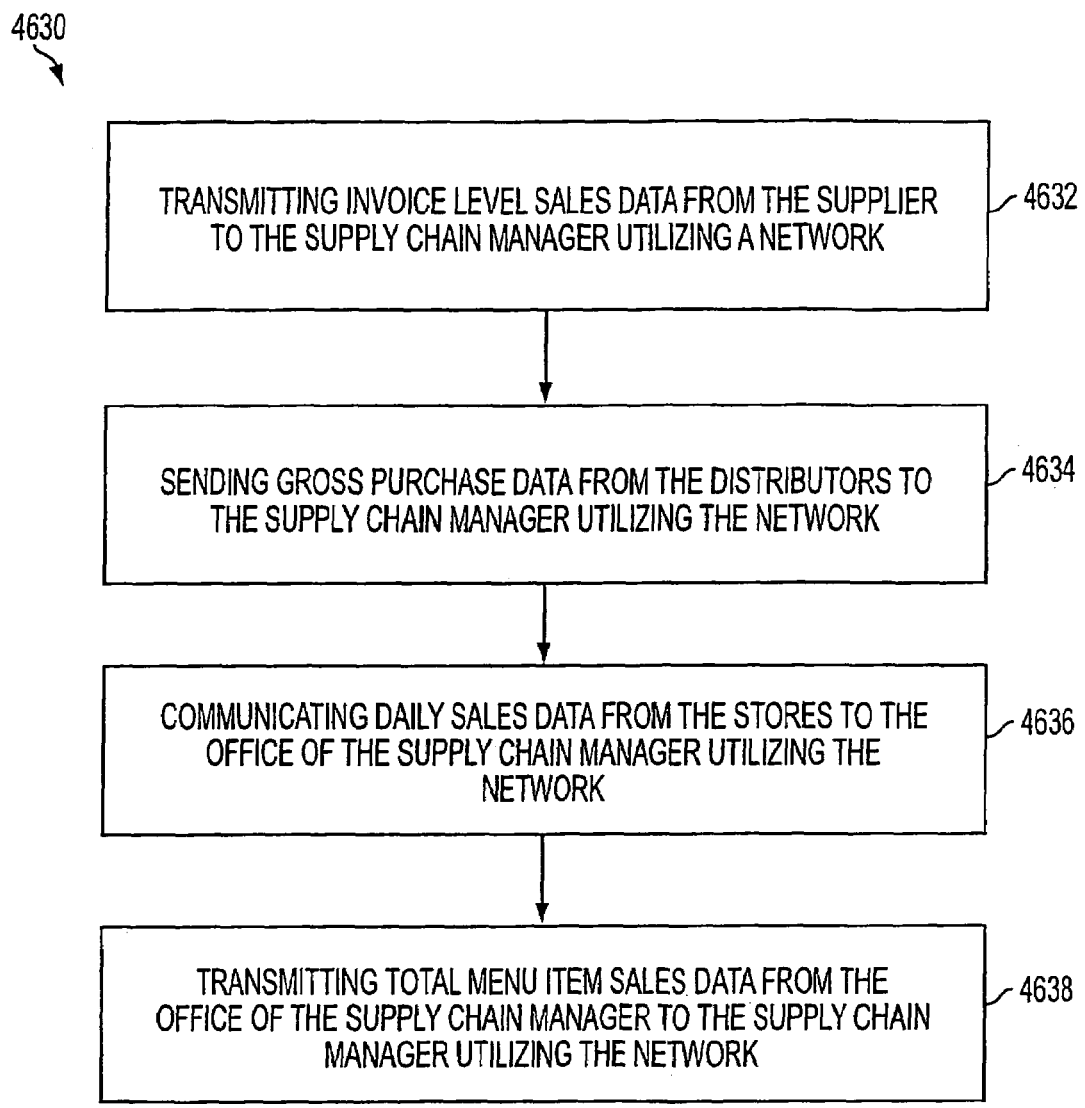
FIG. 46 is a flowchart of a process for providing network-based supply chain communication between stores, distributors, suppliers, a supply chain manager, and a corporate headquarters in accordance with an embodiment of the present invention.

FIG. 46 is a flowchart of a process 4630 for providing network-based supply chain communication between participants in the supply chain such as stores, distributors, suppliers, a supply chain manager, and an office of the supply chain manager. Invoice level sales data is transmitted from the supplier to the supply chain manager utilizing a network in operation 4632. Gross purchase data is sent from the distributors to the supply chain manager utilizing the network in operation 4634. Daily sales data is communicated from the stores to the office of the supply chain manager utilizing the network in operation 4636 and total menu item sales data is transmitted from the office of the supply chain manager to the supply chain manager utilizing the network in operation 4638.

In an aspect, the network includes the Internet. In another aspect, the stores, the distributors, the suppliers, the supply chain manager, and the office of the supply chain manager communicate utilizing a network-based interface. In a further aspect, the gross purchase data includes monthly gross purchase data. In one aspect, the supply chain manager manages the distributors.

FIG. 47 is a flowchart of a process 4730 for providing network-based supply chain communication between participants in the supply chain such as stores, distributors, suppliers, a supply chain manager, and an office of the supply chain manager. Invoice level sales data is transmitted from the supplier to the supply chain manager utilizing a network in operation 4732. Invoice level sales data is sent from the distributors to the supply chain manager utilizing the network in operation 4734. Daily sales data is communicated from the stores to the office of the supply chain manager utilizing the network in operation 4736. Daily sales data is transmitted from the office of the supply chain manager to the supply chain manager utilizing the network in operation 4738. The daily sales data is organized based on the stores from which the daily sales data originated.

In one aspect, the network includes the Internet. In another aspect, the stores, the distributors, the suppliers, the supply chain manager, and the office of the supply chain manager communicate utilizing a network-based interface. In a further aspect, the gross purchase data includes monthly gross purchase data. In an additional aspect, the supply chain manager manages the distributors.

EMail Capability

An E-mail system can be used to report information if external mail capabilities that support the Internet are present. Any existing Internet account can be used, as can one from a value added service provider (e.g. America On-line, Compuserv, Microsoft Network, etc.). If there are no existing E-Mail capabilities, an account can be established with an Internet Service Provider.

SMTP (Simple Mail Transfer Protocol) is a TCP/IP protocol used in sending and receiving e-mail. However, since it's limited in its ability to queue messages at the receiving end, it's usually used with one of two other protocols, POP3 or Internet Message Access Protocol, that let the user save messages in a server mailbox and download them periodically from the server. In other words, users typically use a program that uses SMTP for sending e-mail and either POP3 or IMAP for receiving messages that have been received for them at their local server. Most mail programs such as Eudora let you specify both an SMTP server and a POP server. On UNIX-based systems, sendmail is the most widely-used SMTP server for e-mail. A commercial package, Sendmail, includes a POP3 server and also comes in a version for Windows NT.

The next step is testing E-mail connectivity by sending a message to Supply Chain management's Test Mailbox. A response is made (via other communications means) in the event the E-mail transmission is not received. A reply to the message via E-mail is made once successfully received. As an option, a file attachment (any text-ASCII file) can be included to verify the ability to send messages with separate file attachments.

After receiving confirmation concerning a successful Test Message, an actual data file (created from the Franchisee Information Layout section, below) is sent to the TEST Mailbox. After receiving confirmation concerning successful processing of the Test data, a notification is sent to begin Production reporting according to the reporting period specified in the Franchisee Information Layout section.

Franchisee Information Layout

Table 1 sets forth Illustrative daily POS data elements

TABLE 1

| Fld # | Data Element Name | Type | Size | Column(s) | Example | Req |
|---|---|---|---|---|---|---|
| 00 | Record Type | ID | 3 | 001–003 | FR1 | M |
| 01 | Item Number | ID | 10 | 004–013 | 12645 | M |
| 02 | Item Description | AN | 20 | 014–033 | burger patty | M |
| 03 | Period Date | DT | 8 | 034–041 | 19990601 | M |
| 04 | Retail Outlet Number | ID | 4 | 042–045 | 0107 | M |
| 05 | Total Sales $ | N2 | 6 | 046–051 | 3264.50 | M |
| 06 | Total Quantity | NO | 5 | 052–056 | 1034 | M |

Example: This example should be one line. Field justification is irrelevant.

```
         1         2         3         4         5
12345678901234567890123456789012345678901234567890123456
FR112645   whopper patty       1999060101073264501034
```

General Implementation Information

The following information is a guideline for the requested data files.

Record Type:

All records that are similar are considered a logical group of data. Each record in a group has a unique identifier called a Record Type consisting of three alphanumeric characters. This should be placed before the first field of each record (see the Example above in the Franchisee Information Layout section), and repeated on each row.

Field:

A Field can represent a qualifier, a value, or text (such as a description). A Field can be thought of as a piece of data.

Record:

Each row of data is a Record. To allow for future expansion, Records can be padded to any length.

Field Number:

Based upon the sequential position assignment of a Field in the Record, each Field assumes a unique or numeric location for each Record. The value of the FLD# column represents the position within the Record where the individual Field appears (i.e., FLD#01 will be the first Field following the Record Type, FLD#02 will be the second Field following the Record Type, etc.).

Fields:

Fields can be either left or right justified. The Record Type should always precede the first field. All Fields should completely fill their column sizes (pad with spaces).

Field Types:

| | |
|---|---|
| AN | Alpha/Numeric—Should not be enclosed in quotes (e.g. FXD-4543). |
| Nn | Numeric with n decimal places—Symbolized by the two-position representation Nn. N indicates a numeric, and n indicates the decimal places to the right of a fixed decimal point. This should not contain dollar signs or commas, but may contain decimal points (e.g. N2 for $4,255.50 is 4255.50; N0 for $4,255.50 is 4256). This should be rounded to the respective decimal place (e.g. N2 for $4,255.506 is 4255.51). For negative values, a leading minus sign (−) is used (e.g. N2 for $−12.42 is −12.42). Left-padding with zeroes is optional (e.g. 4532 could be either 4532 or 004532). |
| ID | Identifier Value—May contain alpha/numeric data restricted to a list of possible values. |
| DT | Date Value—Format for the date type is CCYYMMDD, where CC indicates century, YY is the last two digits of the year (00–99), MM is the numeric value of the month (01–12), and DD is the numeric value of the day (01–31). |
| TM | Time Value—Format for the time type is HHMMSS. HH is the numeric expression of the hour (00–23), MM is the numeric expression of the minute (00–59), SS is the numeric expression of the second (00–59), and d..d is the numeric expression of the decimal seconds. This fields may be relevant for EDI formats. |

Size:

The minus sign and the decimal point are counted when determining the length of the data element (Field) value.

Column(s):

Specifies the column numbers allocated to a particular Field.

Requirement (Req):

| | | |
|---|---|---|
| M | Mandatory | This field must be present |
| C | Conditional | This field is present based on a condition |
| O | Optional | This field may become Mandatory or |
| R | Reserved | Reserved for future use |

File Format.

All files can be requested in a fixed-length ASCII format. Programmatically, these are simple to produce. Many PC applications include an export utility which allows specification of column widths and formats. When using spreadsheet applications, column widths and formats may have to be pre-set to produce the desired results. Empty Fields can be filled with spaces.

Compression.

Files can be compressed. Compressing files will typically reduce file sizes to some 20% of their initial size. Preferably, the system supports the use of ZIP files created from a PC. Before transmission, all files would be compressed into one ZIP file using PKZIP, a file compression package available from most software sources.

Secure Web Portal

Figure 48:
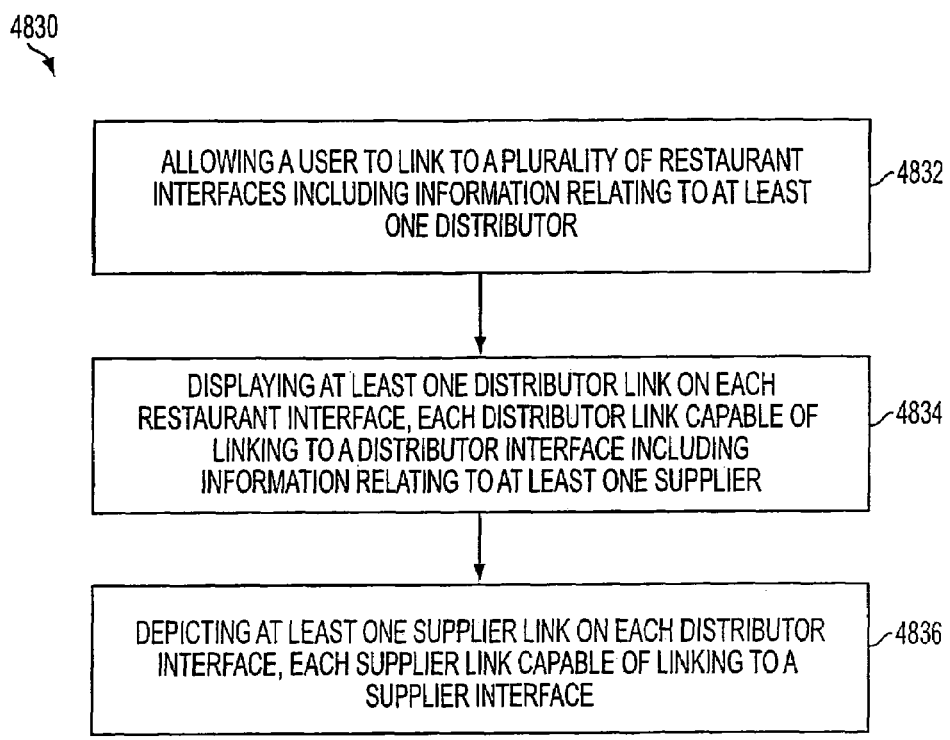
FIG. 48 is a flowchart of a process for providing a restaurant supply chain management interface framework in accordance with an embodiment of the present invention.

FIG. 48 is a flowchart of a process 4830 for providing a restaurant supply chain management interface framework. A user is allowed to link to a plurality of restaurant interfaces including information relating to at least one distributor in operation 4832. One or more distributor links are then displayed on each restaurant interface in operation 4834 with each distributor link capable of linking to a distributor interface including information relating to at least one supplier. At least one supplier link is additionally depicted on each distributor interface in operation 4836 with each supplier link capable of linking to a supplier interface.

In an aspect, all of the interfaces may be written in hypertext mark-up language. In another aspect, the information may identify the distributors and the suppliers. In an additional aspect, the link may include a hyperlink. In a further aspect, the linking may require the entry of an identification code.

Supply Chain Coordinator Web Site/Portal

In an embodiment of the present invention, a supply chain coordinator web site may be provided to allow users easy access to specific information that relates to their role in the restaurant management system.

In one embodiment, users may be registered with the supply chain management system. Upon registration, the user may then be able to access and partake some or all of the features of the supply chain management system. The users can be registered based on information regarding preexisting relationships, based on new information, etc. Actual registration may be accomplished manually, via telephone, or online for example. Some illustrative registration information that can be collected may include, for example:

Identification of the user
User contact information
User function
Goods/Service Provider
Client/Customer
Billing/Payment Status The users may be assigned to specific user groups based on their function. Some exemplary user groups include:

Retail Outlet Members (e.g., Franchisees, Stores, etc.)
Suppliers
Distributors
Retail Outlet Managers
Retail Outlet Management Corporation
Supply Chain Coordinator In addition, users may be linked to the specific retailers, distribution centers and Areas of Direct Influence (ADI's) with which they are involved.

Figure 49:
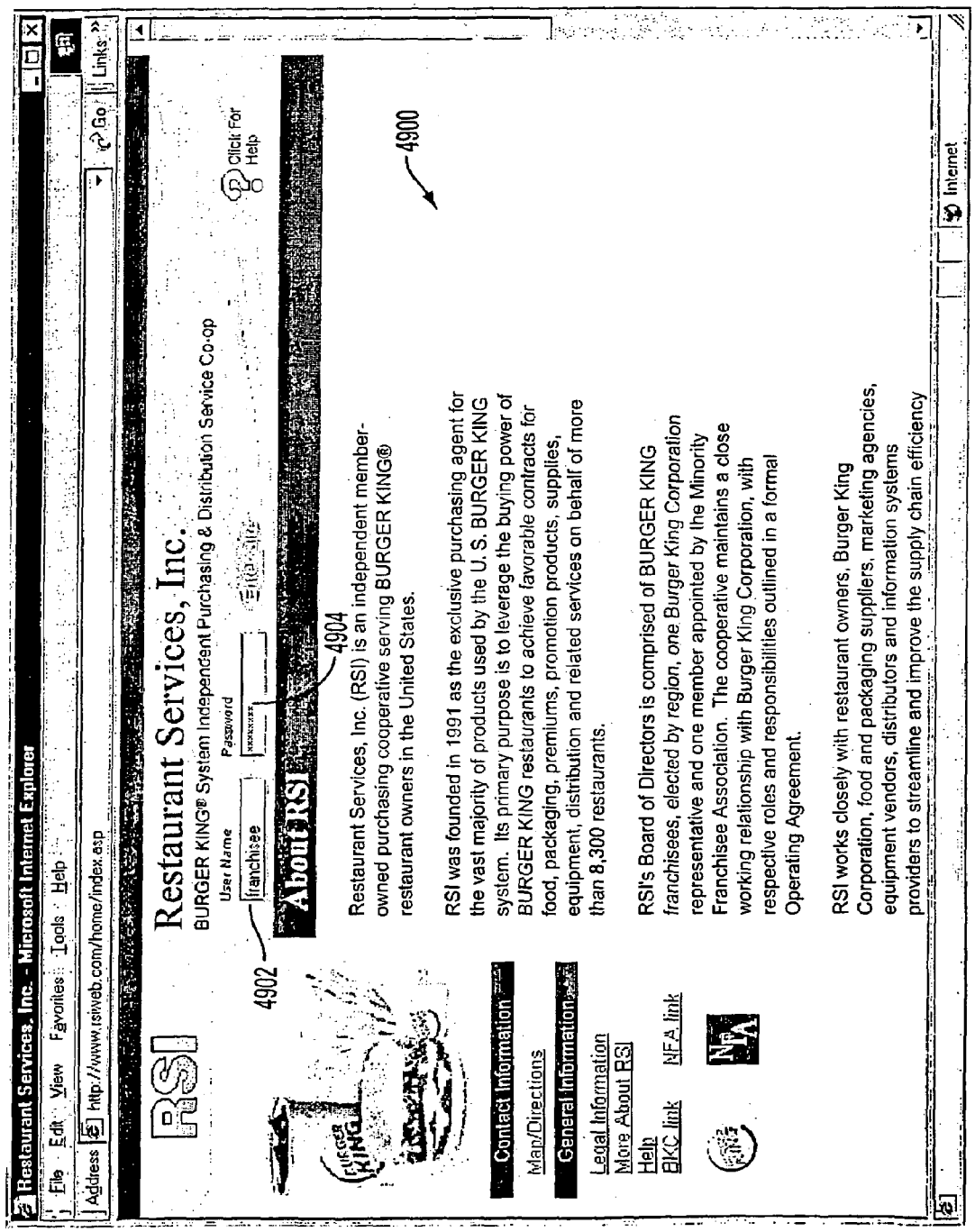
FIG. 49 is a schematic illustration of an exemplary supply chain coordinator web site start page in accordance with an embodiment of the present invention.

FIG. 49 is a schematic illustration of an exemplary supply chain coordinator web site start page 4900 in accordance with an embodiment of the present invention. In a preferred embodiment, the supply chain coordinator web site start page 4900 is accessible via the Internet/World Wide Web. In such an embodiment, any Internet user can get to the supply chain coordinator web site start page. However, preferably, only a user with a valid pre-established user identification can log in to the site. The user identification (user name and password) assigns the user to the appropriate user group and links this user to the appropriate retail outlets, distribution centers and ADI's.

Convenient links to other web sites (e.g., a retail management corporation web site such as, for example, the Burger King Corporation web site, or the National Franchise Association web site) may be included on the supply chain coordinator start page.

In a preferred embodiment, to access the appropriate home page for a specific user group, the user may enter the designated user name 4902 and password 4904 in the log in section near the top of the start page and enters the appropriate site.

Figure 50:
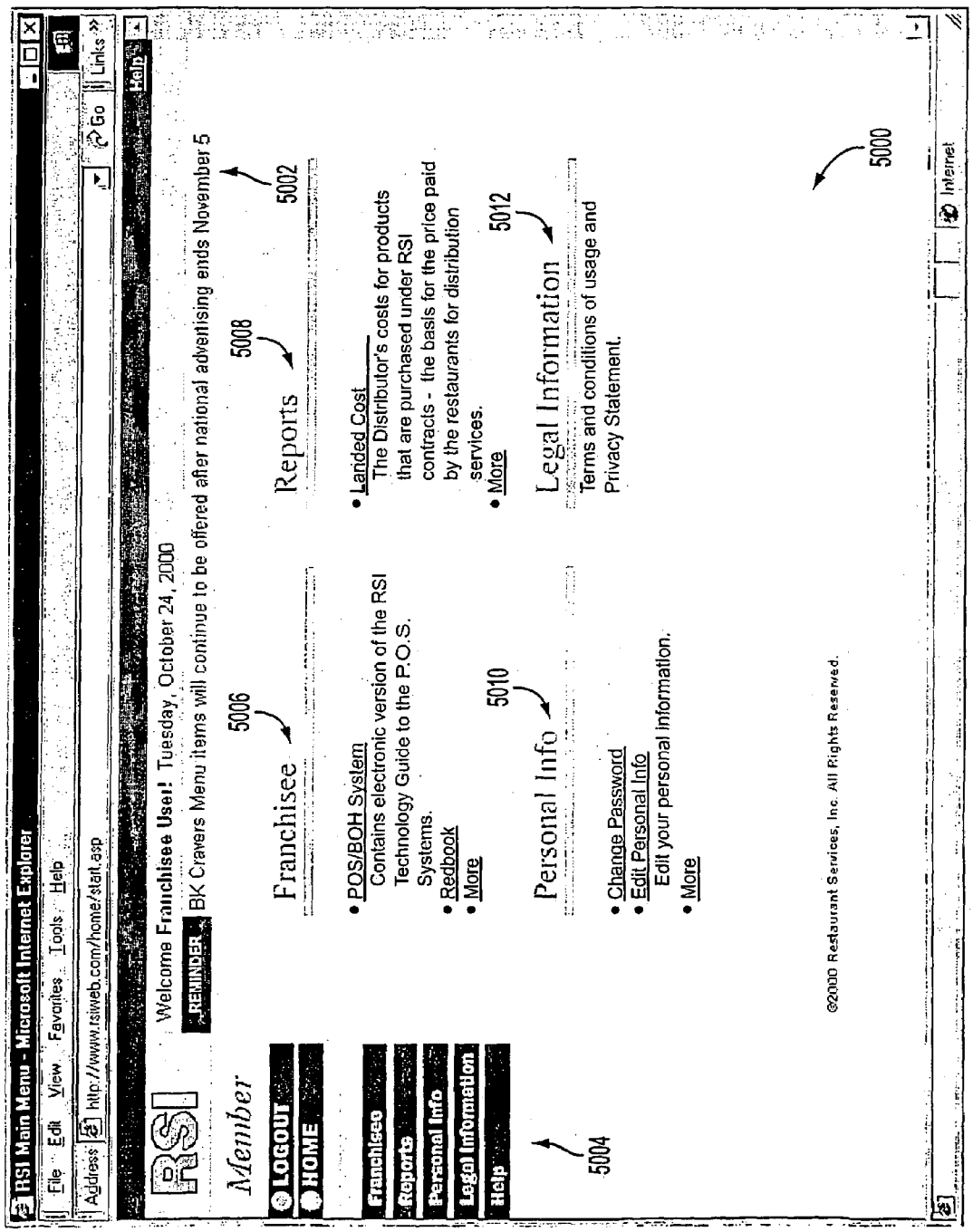
FIG. 50 is a schematic illustration of an exemplary supply chain coordinator Members' Front Page in accordance with an embodiment of the present invention.

FIG. 50 is a schematic illustration of an exemplary supply chain coordinator Members' Front Page 5000 in accordance with an embodiment of the present invention. For supply chain coordinator Members, this front page 5000 may be a personalized with the user's name and a timely business reminder 5002 being displayed on the page. A side panel 5004 identifies the user group to which the user belongs and lists those options and reports available to the user. This information may also be displayed in a frame of the page. As illustrated in FIG. 50, some exemplary options/reports that may be displayed in the front page 5000 include:

Local Promotions 5006—Contains options specific to those involved with local promotions including adding a new ADI promotion, creating a new promotion and viewing current and historical summary of promotions by ADI Franchisee 5008—Contains options specific to franchisees including the electronic versions of the Red Book and the supply chain coordinator Technology Guide to POS Systems Reports 5010—Allows the user access to a list of reports that provide a wide range of information and enable users to perform their jobs more efficiently.

Personal Info 5012—Allows users to maintain their passwords and to view and update their contact information.

Legal 5014—Contains details regarding the terms under which supply chain coordinator operates this site and users' obligations in using the site.

Figure 51:
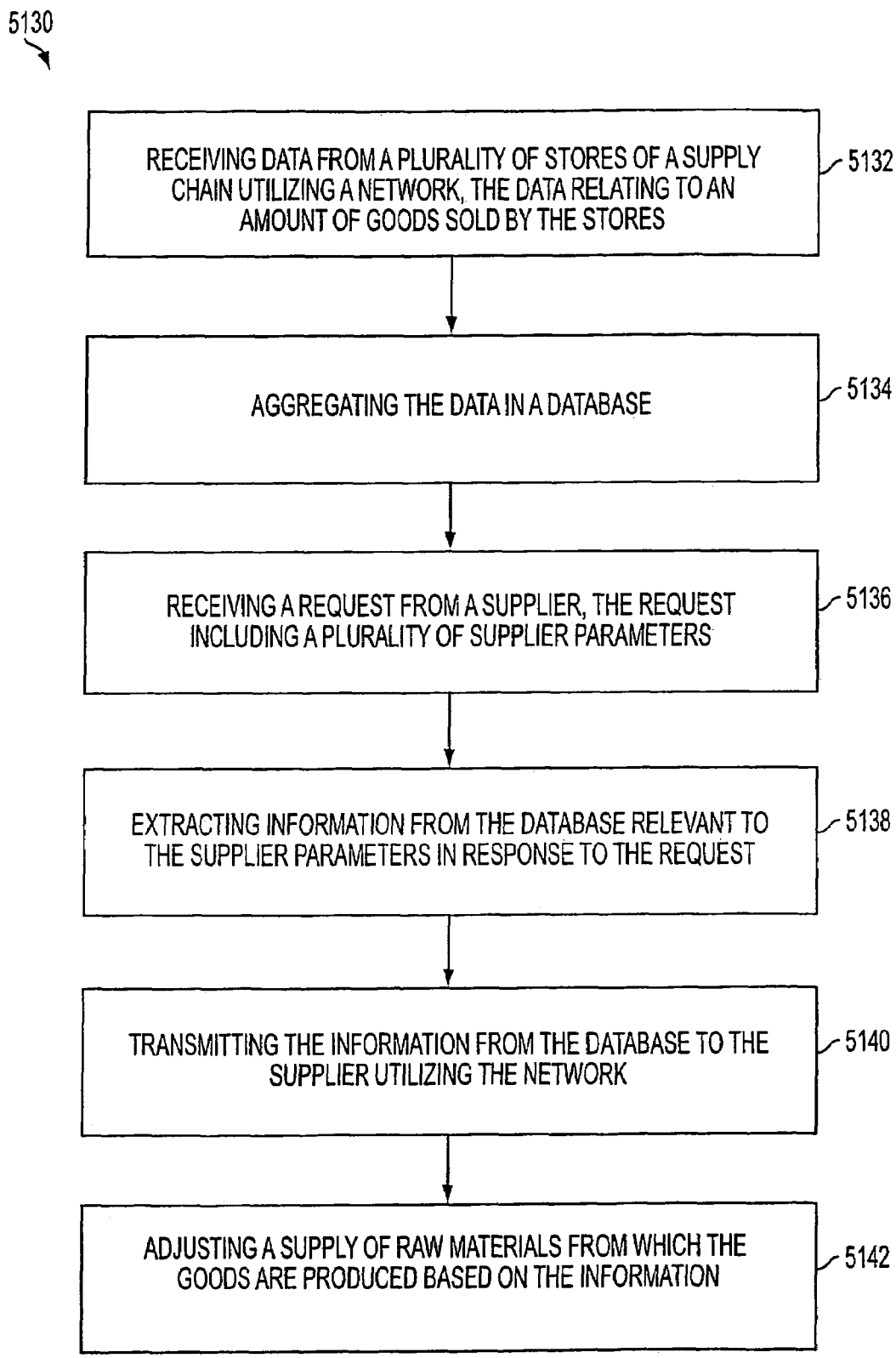
FIG. 51 is a flowchart of a process for providing a supplier interface in accordance with an embodiment of the present invention.

FIG. 51 is a flowchart of a process 5130 for providing a supplier interface. Utilizing a network, data is received from a plurality of stores of a supply chain in operation 5132. This data relates to an amount of goods sold by the stores. The data is aggregated in a database in operation 5134. Subsequently, a request is received from a supplier which includes a plurality of supplier parameters in operation 5136. Information from the database relevant to the supplier parameters is extracted in response to the request in operation 5138 and the information from the database is transmitted to the supplier utilizing the network in operation 5140. Also, a supply of raw materials from which the goods are produced is adjusted based on the information in operation 5142. Note also that the amount/rate of finishing goods and/or supplies can be adjusted based on the information.

In an aspect, the parameters relate to a forecasted amount of the required goods. In another aspect, the network includes the Internet. In a further aspect, the information is displayed utilizing a network-based interface. In one aspect, the stores include restaurants.

Figure 52:
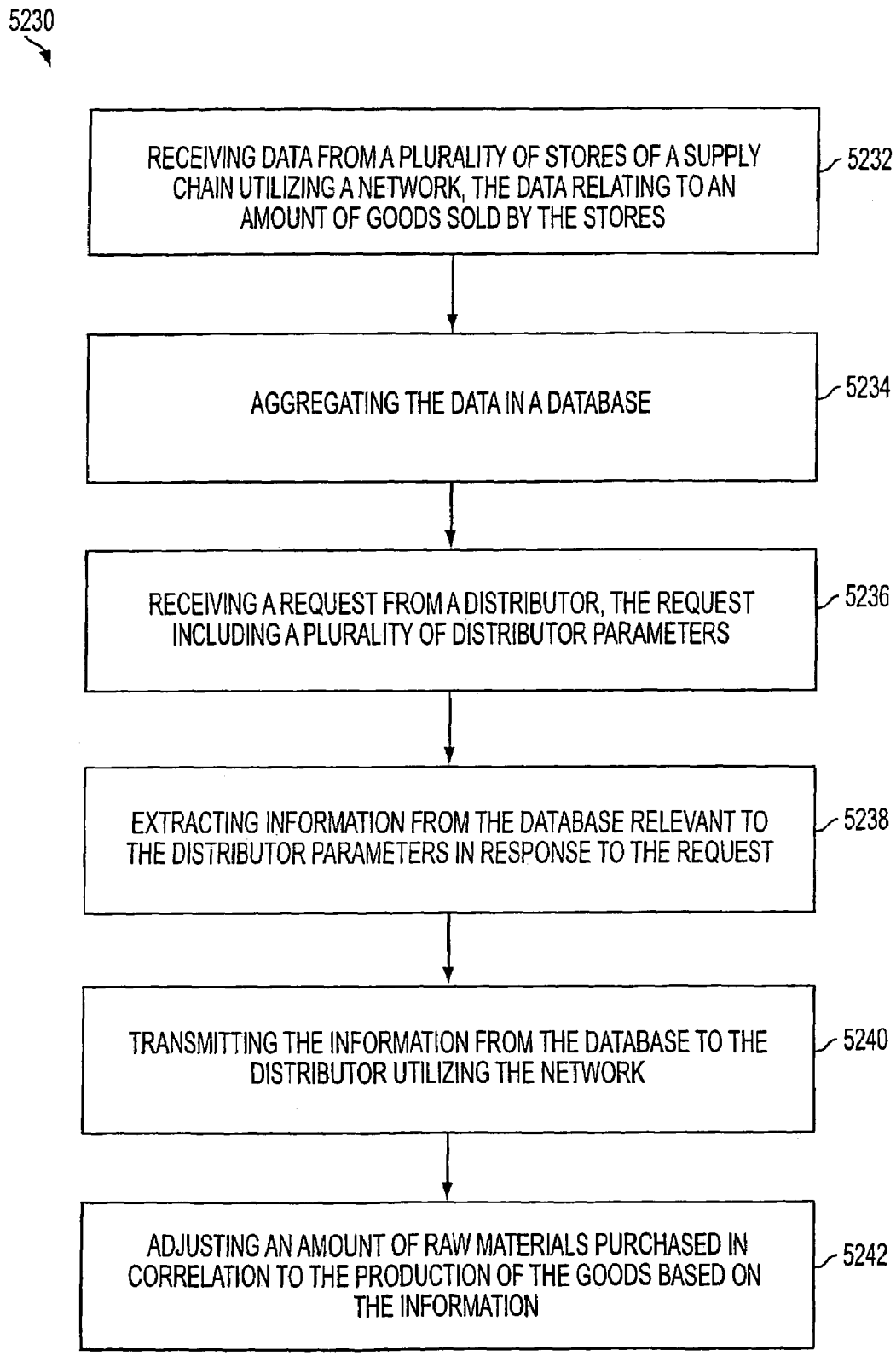
FIG. 52 is a flowchart of a process for providing a distributor interface in accordance with an embodiment of the present invention.

FIG. 52 is a flowchart of a process 5230 for providing a distributor interface. Data is received from a plurality of stores of a supply chain utilizing a network in operation 5232. This data relates to an amount of goods sold by the stores and is aggregated in a database in operation 5234. Upon receiving a request which includes a plurality of distributor parameters from a distributor in operation 5236, information is extracted in operation 5238 from the database relevant to the distributor parameters in response to the request. The information is then transmitted from the database to the distributor utilizing the network in operation 5240 and an amount of raw materials purchased in correlation to the production of the goods is adjusted based on the information in operation 5242.

In an aspect, the parameters relate to a forecasted amount of the required goods to be delivered to the stores. In another aspect, the network includes the Internet. In a further aspect, the information is displayed utilizing a network-based interface. In an additional aspect, the stores include restaurants.

FIG. 53 is a schematic illustration of an exemplary POS Implied Daily Usage—Distributor report 5300 that may be displayed in the supply chain coordinator web site in accordance with an embodiment of the present invention. This report provides distribution centers and supply chain coordinator with timely retail outlet sales information, here of a restaurant. This report 5300 uses menu items sales data collected daily from a sample of restaurants served by each distribution center, and recipes for each menu item, to calculate the estimated usage of each inventory item at the distribution center level. In calculating the data, average per restaurant unit sales of each menu item may be computed based on the restaurants sampled and are then multiplied by the total number of restaurants served to determine implied total sales by menu item.

This report 5300 may also include a daily total for each inventory item for the past 14 days and weekly totals for the 4 weeks prior to the 14 days, as well as a calculation of prior day usage as a percentage of average daily usage for the past 14 days. In a preferred embodiment, this report 5300 may be recalculated daily. For example, in an exemplary, a report containing the prior day's sales can be available after 3 PM on the following business day.

Another report that may be displayed via the supply chain coordinator web site is a service level report which lists each distribution center's fill rate, on-time percentage and the percentage of perfect orders. The service level report may also indicate how the fill rate, on-time and perfect order for each distribution center compare to the minimum standards set by supply chain coordinator and restaurant management corporation.

FIG. 54 is a schematic illustration of an exemplary local promotion summary—by distribution center report 5400 that may be displayed in the supply chain coordinator web site in accordance with an embodiment of the present invention. This report 5400 provides a summary of all local promotional activity for a distribution center. For each local promotion, the report 5400 may list each participating ADI, the date the promotion started in that ADI, the projected daily sales of the promotional menu item, per restaurant (or other retailer), for the ADI, and how many weeks the promotion will run in that ADI.

The local promotion summary—by distribution center report 5400 may also show how many restaurants in the ADI, which are served by the distribution center, are participating in the promotion, and lists the specific restaurant management company's restaurant numbers for restaurants not participating in the promotion (see "Non-Participating Restaurants" column).

FIG. 55 is a schematic illustration of an exemplary POS implied daily usage—supplier report 5500 that may be displayed in the supply chain coordinator web site in accordance with an embodiment of the present invention. This report 5500 provides timely restaurant sales information based on actual restaurant sales to suppliers, supply chain coordinator and supply chain coordinator members. The POS implied daily usage—supplier report 5500 may also use menu item sales data collected daily from a sample of restaurants served by each distribution center, and recipes for each menu item, to calculate the estimated usage of each inventory item provided by the supplier. Usage may be calculated and presented at the distribution center level and totaled by FOB point.

In calculating the data, the average per restaurant unit sales of each menu item are computed based on the restaurants sampled, and then multiplied by the total number of restaurants served to determine implied total sales by menu item. The report 5500 may include:
- a daily total for each inventory item for the past 14 days
- weekly totals for the 4 weeks prior to the 14 days
- a calculation of prior day usage as a percentage of average daily usage for the past 14 days In a preferred embodiment, the POS implied daily usage—supplier report 5500 may be recalculated daily. For example, a report containing the prior day's sales can be available after 3 PM on the following business day.

Another report that may be displayed via the supply chain coordinator web site is an average restaurant daily POS sales report which provides average restaurant daily menu item sales grouped by category and indicates the changes from a prior period. In a preferred embodiment, this report may be recalculated daily. For example, an average restaurant daily POS sales report containing the prior day's sales can be available after 3 PM on the following business day from the day the information was obtained.

FIG. 56 is a schematic illustration of an exemplary restaurant landed cost verification report 5600 that may be displayed in the supply chain coordinator web site in accordance with an embodiment of the present invention. The purpose of the restaurant landed cost verification report 5600 is to inform restaurant operators, for products negotiated by supply chain coordinator, of the contract prices at their back door. In an exemplary embodiment, this report may list:
- the inventory item supplied by the distribution center with the distribution center's cost (see "DC Cost" column)
- the markup amount supply chain coordinator negotiated on behalf of the franchisee (see "Markup" column) and
- the resulting total landed cost as of a specified date (see "Rest Cost" column).

In a preferred embodiment, only inventory items that supply chain coordinator purchases are included. Also, if a franchisee has not appointed supply chain coordinator as supply chain manager, only the distribution center cost will be available in the report and the franchisee may add the mark up as per the franchisee's contract with the distributor. Like the other reports available via the supply chain coordinator web site, the restaurant landed cost verification report 5600 may be recalculated daily and may be printed at any time for any date.

Figure 57:
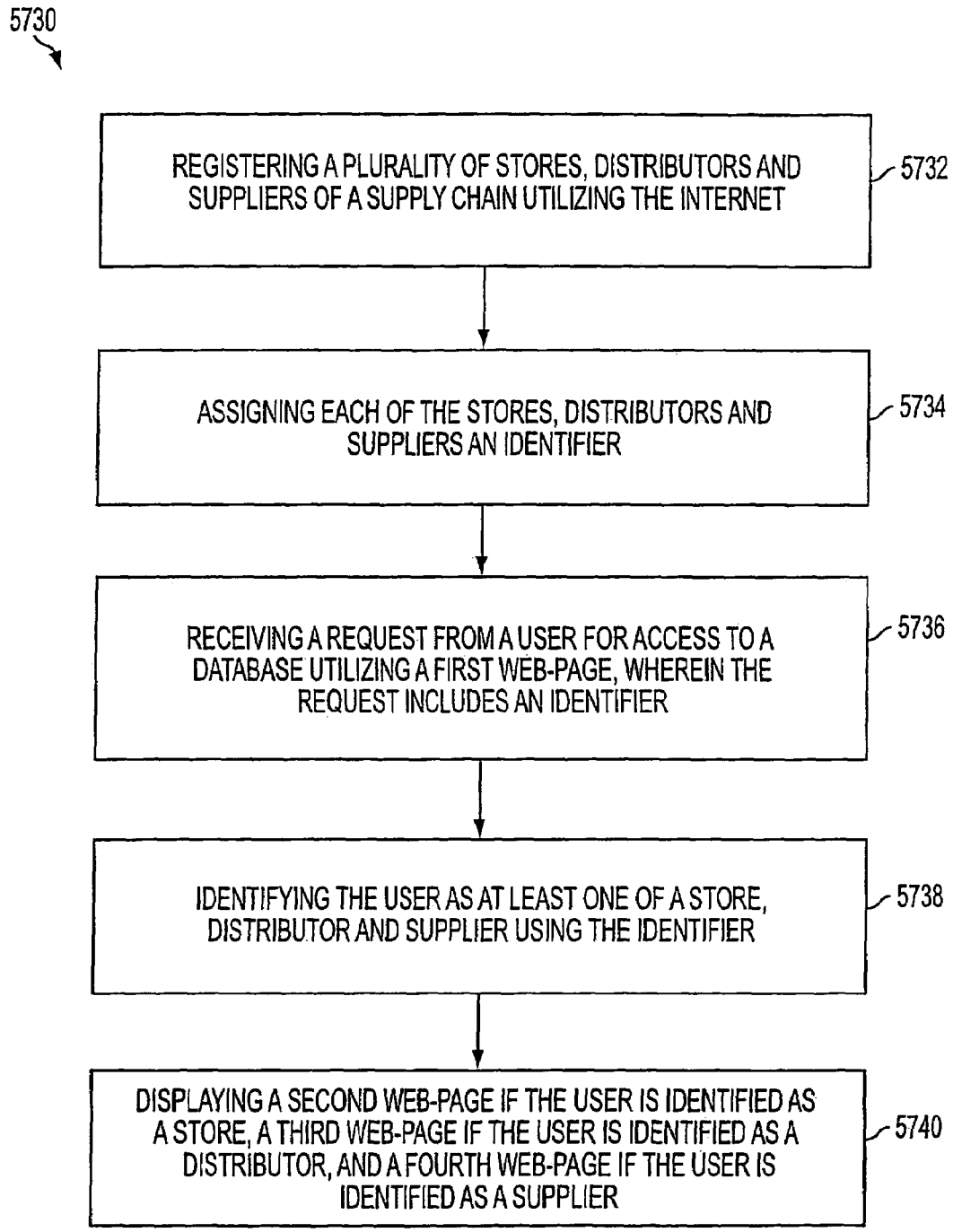
FIG. 57 is a flowchart of a process for navigating a user in a network-based supply chain management interface in accordance with an embodiment of the present invention.

FIG. 57 is a flowchart of a process 5730 for navigating a user in a network-based supply chain management interface. A plurality of stores, distributors and suppliers of a supply chain are registered utilizing the Internet in operation 5732. Each of the stores, distributors and suppliers is assigned an identifier in operation 5734. When a request (which includes an identifier) is received from a user for access to a database utilizing a first web-page in operation 5736, the user is identified as a store, distributor and/or supplier using the identifier in operation 5738. A second web-page is displayed if the user is identified as a store. A third web-page is displayed if the user is identified as a distributor. A fourth web-page is displayed if the user is identified as a supplier (see operation 5740).

This provides a degree of confidentiality among competitors who are supply chain participants. Because many of the participants may need to disclose trade secrets to the supply chain manager, such as prices, sources of raw materials, and quantity data, they may be wary of joining. By providing a separate interface on a per-participant basis, trade secretes are protected, and competitors are more likely to join. Further, this avoids antitrust issues, as sales information can be kept secret to all but the supply chain coordinator.

In one aspect, the database may include data representative of sales by the stores. As another aspect, the database may include data representative of goods ordered by the stores. As an additional aspect, the database may include data representative of goods delivered by the distributors. As a further aspect, the database may include data representative of goods in an inventory of the suppliers. Also, the data may be displayed in each of the web-pages utilizing the Internet.

The following sections describe the secure Integrated Supply Chain web portal. The secure web-enabled integrated supply chain portal allows supply chain management to offer supply chain services within a member community.

The sub-sections that follow describe the security process recommendations, policies, functionality, system requirements, user communities, and technical and organizational issues that need to be addressed during the subsequent design, development and implementation phases.

The specifications contained herein express the Integrated Supply Chain web portal preferred Critical-To-Quality (CTQ) factors. One skilled in the art will appreciate that actual implementation of the requirements may differ from that described without straying from the scope of the invention, as the CTQ criteria may evolve and adapt to market conditions or other influences on their strategic vision and direction.

The recommendations include major functional requirements, interfaces, and infrastructure as well as the non-functional requirements (systems and organizational attributes). It includes functional and system needs.

Integrated Supply Chain Web Portal

One goal of the present invention is to enhance Supply Chain management services to improve the efficiency of their member's supply chain.

The underlying concept of electronic commerce (EC) is to use information to displace time and cost in the supply chain. The Integrated Supply Chain Management system (ISCM) portal functions as the electronic commerce facilitator in the supply chain by efficiently collecting, transporting, transforming and sharing information across the enterprise.

Figure 58:
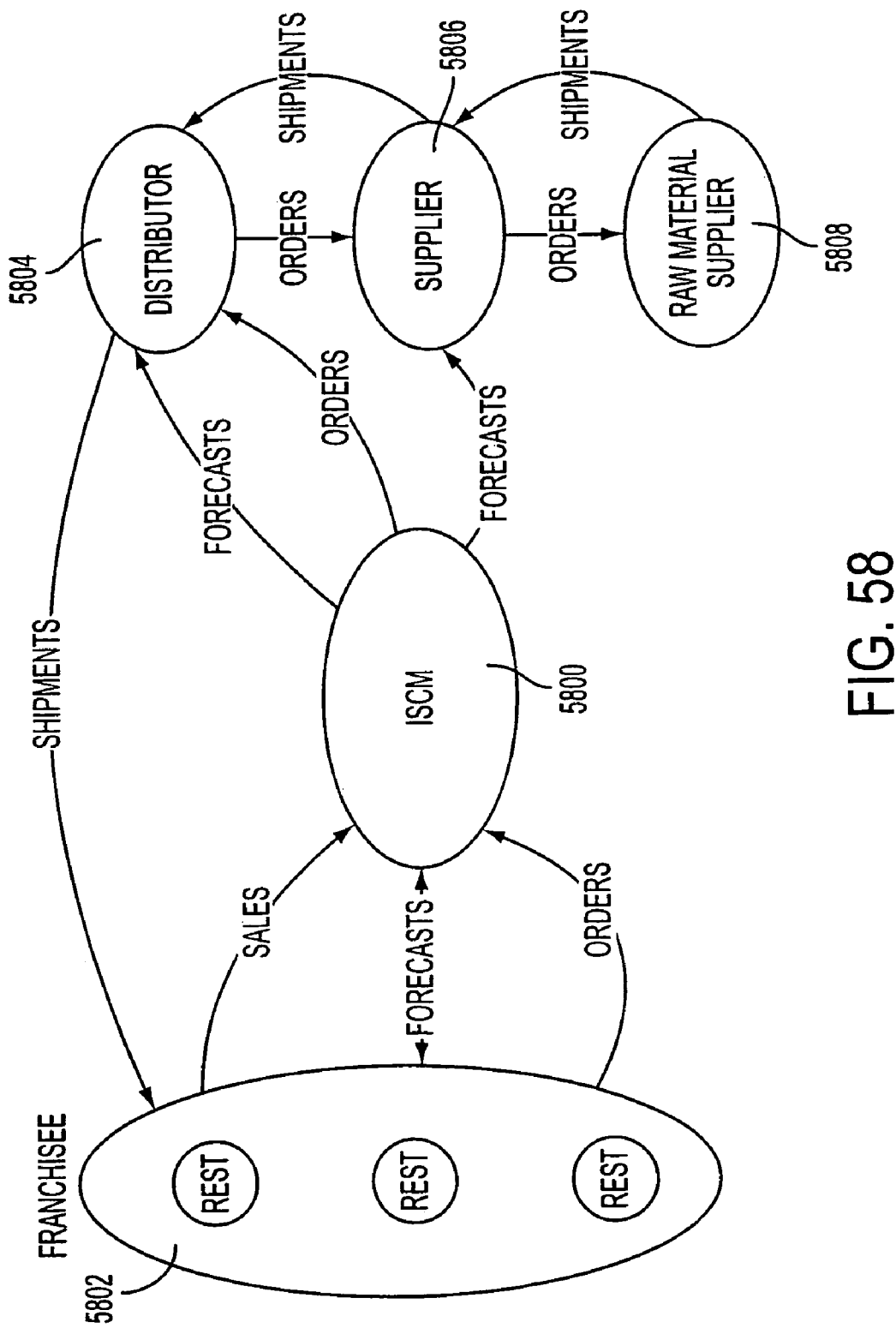
FIG. 58 depicts a high level view of ISCM communications according to an illustrative embodiment of the present invention.

FIG. 58 depicts a high level view of ISCM communications according to an illustrative embodiment of the present invention. The ISCM 5800 provide two capabilities. The first is to distribute consumption and forecast data to the supply chain participants (franchisees 5802, distributors 5804, suppliers 5806, and raw material suppliers 5808) that can use it to effective plan purchases and inventory. The second is to automate restaurant ordering (food and packing, equipment and promotions, etc.).

The process works as follows. Restaurants send detailed menu sales information to the ISCM each day from their point of sale (POS) registers. The POS data is converted from menu sales data to material usage data. Specifically a recipe or bill of materials is used to convert each menu item into its purchased components (e.g. bun, meat, wrapper, etc.). The usage data is made available to the supply chain via the ISCM portal. The data is made available to the portal community in the following forms. Distributors see the daily usage of the materials they supply to the restaurants they service. Additionally this usage will be broken down by their distribution center locations. Suppliers see the daily usage of the products/commodities that they supply to the distributors who service the restaurants. Additionally this usage will be broken down by their plant locations. The franchisee and individual restaurants can view sales in the contexts of material usage.

The restaurants can enter orders and send them to the distributor electronically via the ISCM portal. This information enables the entire supply chain to better plan inventory stocking levels and replenishments. This improved planning results in several supply chain efficiencies and benefits. Waste, obsolescence and carrying costs that result from excessive inventories are reduced. The amount of lost sales that result from inventories that are inadequate to meet demand is reduced. Fewer emergency and expedited orders are created. Advanced shipment planning is enabled, which results in lower freight and transportation costs.

The electronic ordering capability enables the restaurants to reduce the costs and times associated with preparing, submitting and receiving orders.

The ISCM system can be enhanced with additional capabilities that serve to further increase the efficiency of the supply chain. These may include electronic invoicing, electronic funds transfer to pay invoices, evaluated receipt settlement, bar coding, and tracking capabilities.

Figure 59:
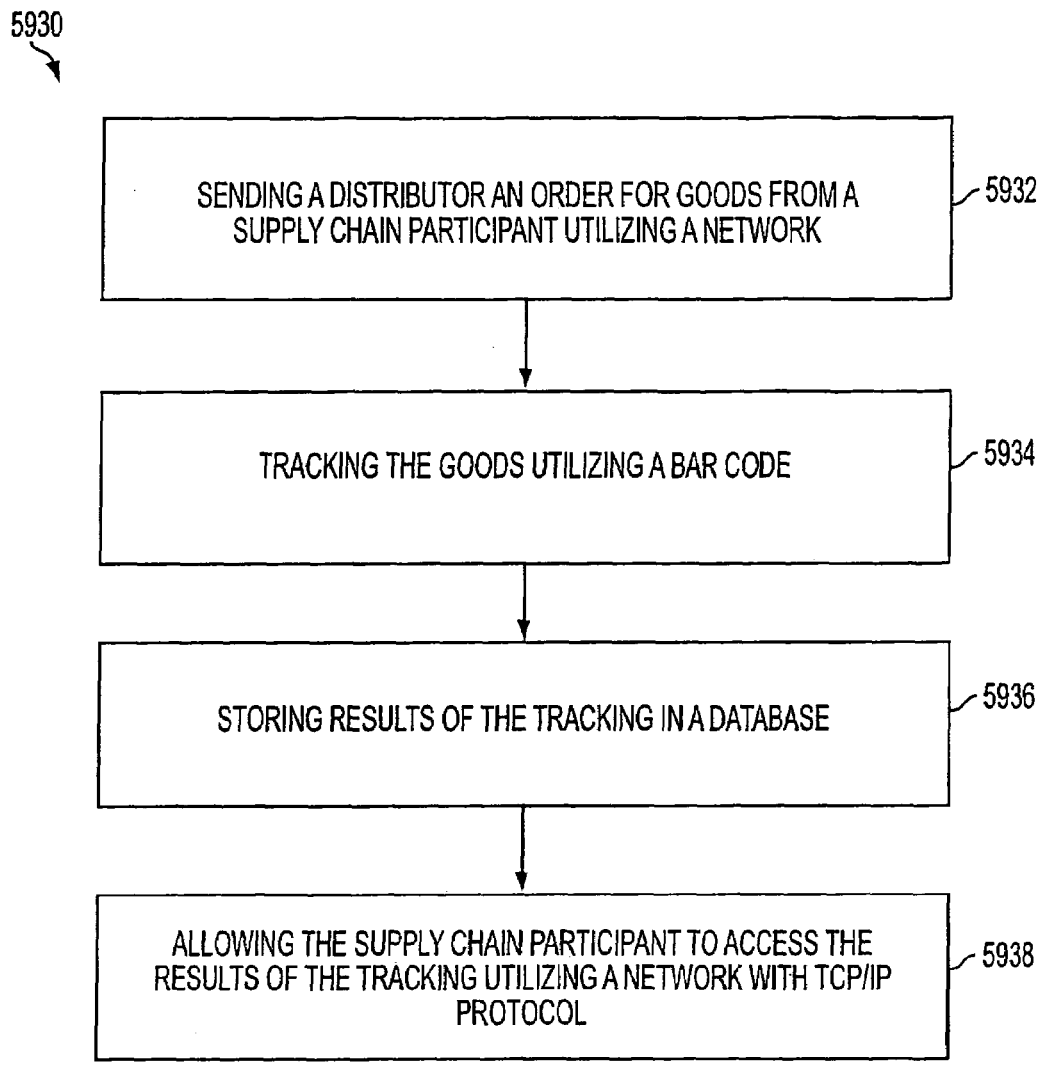
FIG. 59 is a flowchart of a process for tracking the shipment of goods in a network-based supply chain management framework utilizing barcodes in accordance with an embodiment of the present invention.

FIG. 59 is a flowchart of a process 5930 for tracking the shipment of goods in a network-based supply chain management framework utilizing barcodes. In general, a distributor is sent an order for goods from a supply chain participant utilizing a network in operation 5932. The goods are then tracked utilizing a bar code in operation 5934. The results of the tracking are stored in a database in operation 5936 so that the supply chain participant can be allowed to access the results of the tracking utilizing a network with TCP/IP protocol in operation 5938.

In one aspect of the present invention, the barcode is attached at the start of the process so that a common barcode is used throughout the shipping process. However, barcodes can also be attached at other points in the process if desired.

In an aspect, the network may include the Internet. In another aspect, the results may be accessible utilizing a network-based interface. In a further aspect, the supply chain participant may comprise a restaurant. In one aspect, the supply chain participant may be allowed access only after an identity thereof is verified. In an additional aspect, the goods may have the bar code adhered thereto.

ISCM Access and Security Perspective

System management becomes more complicated when security and access management are added to it. They expand the role of ISCM portal to include the function of enterprise gatekeeper in addition to that of information distribution facilitator.

The underlying concepts of electronic commerce (EC), and security and access management are somewhat at odds. EC makes the supply chain more efficient by facilitating the flow information throughout the enterprise. Security and access management on the other hand, restricts access and the flow of information. They may be some of the evils that are needed to prevent outsiders from accessing the system and its data, prevent unauthorized users from performing restricted activities, and preserve privacy within the enterprise by limiting data access to a need to know basis.

Although security is an ingredient to the electronic commerce business model, it has a price that can be measured in direct out of pocket costs, ease of use, flexibility, administration overhead, and system maintenance and flexibility. The greater the protection against unauthorized access and use, the greater the cost of the system and the cost of using the system.

Regarding ease of user, the greater the security of a system the harder it is to use. For example, a security arrangement that requires different passwords to access each sub-function of a system would be very secure. On the other hand it would be perceived by its end users as inefficient and hard to use because of the many passwords that are needed. The end users would prefer a less secure single log on that provides them access to all the functions and data in a system.

In an EC community that is populated by several different players, flexibility in specifying access privileges is important. This due to the fact that the access arrangements can accommodate different functions (e.g. franchisees, distributors, suppliers, the supply chain coordinator, retail management, etc.) and different organizations within a given function. The more flexible the system, the easier it is for the users to adapt it to their organization. However, the price of flexibility in this area is either less security (simplicity) or greater complexity and system development and maintenance costs.

The greater the security of a system, the greater the administrative effort needed to setup users and to maintain security. Additionally the administrative effort becomes more complex as greater security is required and the complexity (effort) increases over time as the system ages.

Complex systems are inflexible and difficult to enhance and maintain. Security makes systems complex in two ways. First, through the introduction of the programs/modules needed to protect the system. Second, by introducing code that attempts to insulate the end user from security (i.e. provide high security without sacrificing flexibility, ease of use, etc.). Insulating complexity can become very pervasive and expensive. As systems grow and expand, the users should be insulated across new modules, features and data views in a fashion consistent with the original approach. This can be difficult when $3^{rd}$ party software is used or when a new feature does not conform to some earlier assumptions regarding users or system structure.

Security challenges the designers of EC systems to provide a level of security that is appropriate for the system's data and users while minimizing the direct and indirect costs of security that were just discussed. Additionally, the designer may try to anticipate the future growth and the expansion of the EC system so that its security architecture can easily accommodate new features, users and data.

Figure 60:
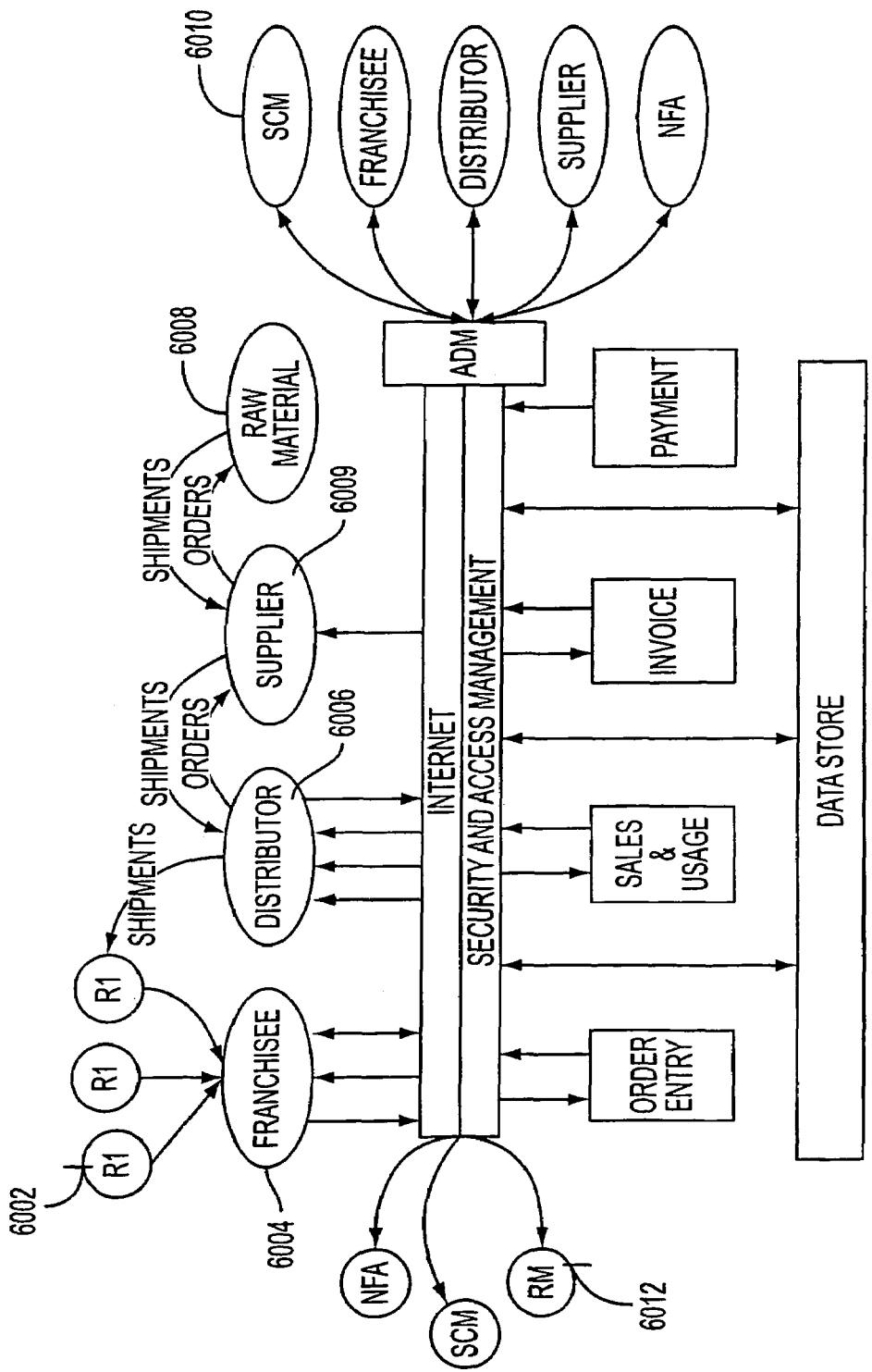
FIG. 60 illustrates the ISCM in the context of security and access management.

FIG. 60 illustrates the ISCM in the context of security and access management. The ISCM System shown in FIG. 60 offers several security challenges.

The user community is comprised of several entities. These include retail outlets 6002, franchisees 6004, distributors 6006, suppliers 6008, the supply chain coordinator 6010 and retailer management 6012. Security attributes and domains need to be established for each entity. Administrative procedures and programs need to be provided to establish and maintain the security attributes and domains of each of these differing entities.

Security management for data access will be complex because data is shared across the community. A single data item (e.g. daily beef usage for a restaurant) can belong to several domains (e.g. restaurant (retailer), franchisee, distributor, supplier, etc.).

The variety of user communities and the organizational variations that are found within each create a challenge to provide a flexible sub administrative capability that will enable user organizations to manage their own domains.

The security challenges and the tradeoffs created by them will be covered in detail in the technical design and recommendation sections.

User Characteristics

User Relationships

Figure 61:
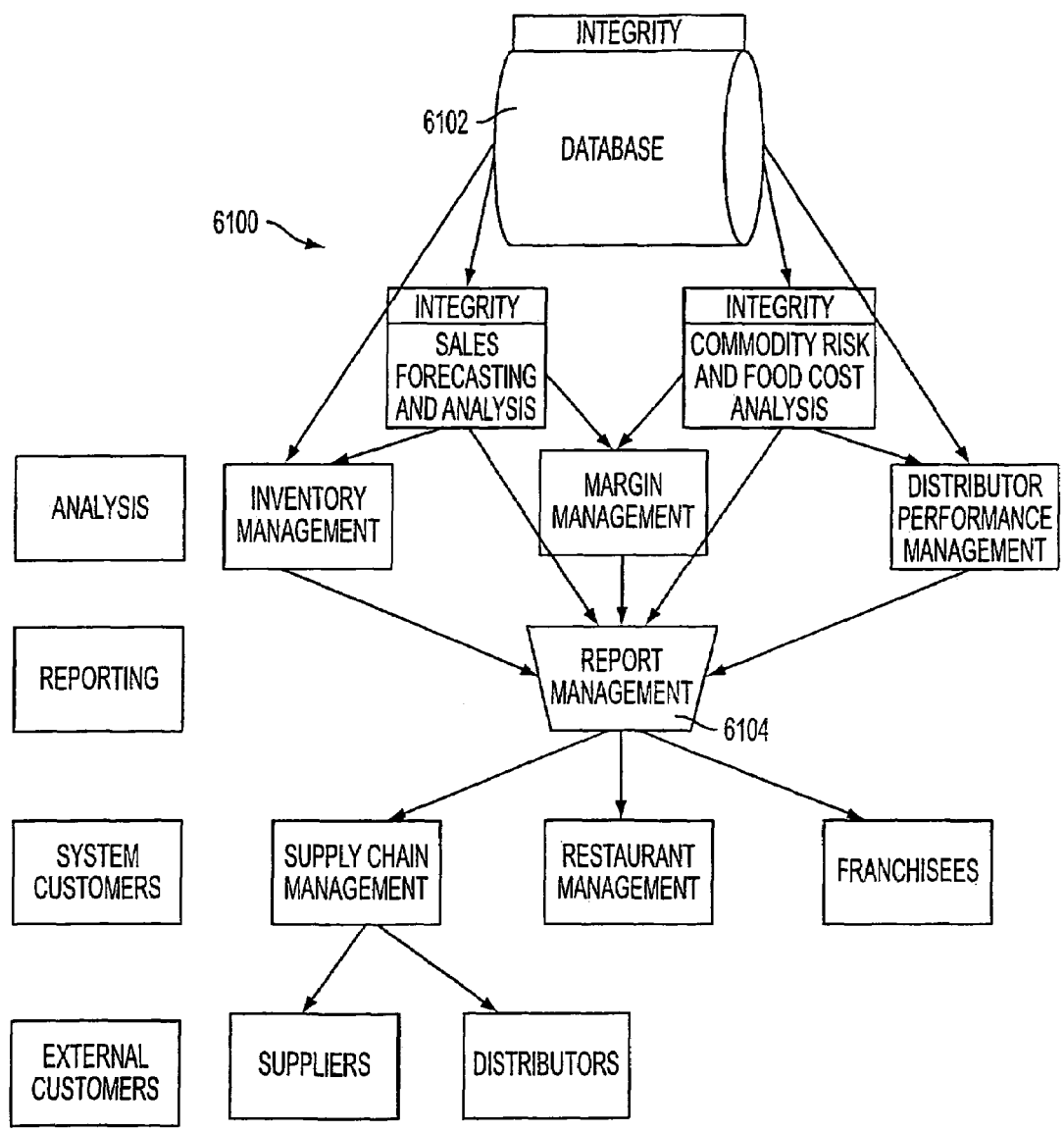
FIG. 61 sets forth the members of the ISCM community and their relationship.

FIG. 61 sets forth the members of the ISCM community 6100 and their relationship. From an operational perspective the ISCM community is made up of management members, member retailers, distributors and suppliers. The supply chain coordinator manages the community from both a goods and services and information perspectives.

The community member relationships can be characterized as follows. Supply chain management gives distributors 6102 the exclusive right to supply all retailers 6104 in the distributor's geographic territory. Retailers order from their assigned distributor. Retailer management approves commodity suppliers 6106. Supply chain management specifies the approved commodity suppliers that each distributor will use. Distributors replenish their inventories by ordering supplies from the suppliers designated by supply chain management.

The purpose of the following sub-sections is to look at the members of the supply chain community in terms of member characteristics (supply chain role that is performed by each member and how each member is organized to perform their role) and members personnel who will likely interact with ISCM. Member domains that will form the basis for security and access management are also defined.

User Organizations

Supply Chain Management

The supply chain coordinator manages the supply chain for their member's retailers. Its services include:

Negotiating supplier agreements on behalf of their members.

Negotiating distributor agreements on behalf of their members. Distributors are given exclusive rights to supply retailers in a given geography. Distributor agreements specify territory, retail outlets, items supplied, suppliers, delivery requirements and quality requirements.

Overseeing and managing the supply chain process to insure consistent and high quality performance.

Providing an ISCM web portal that will make the supply chain more efficient and will enable the members of the supply chain to run their businesses better.

The functions in the following table interact with ISCM:

TABLE 2

| User Function | Description |
| --- | --- |
| System administrator | Person who has access to all of the users and capabilities of ISCM. Responsible for creating, modifying and deleting members, distributors and suppliers. |
| Member administrator | Person who has access to all of the members users of ISCM. Responsible for providing the information for setting up and maintaining members and their domains. Also responsible for providing access to member data to non-member users (e.g. SCC, NFA, RM). |
| Distributor administrator | Person who has access to all of the distributor users of ISCM. Responsible for providing the information for setting up and maintaining distributors and their domains. Also responsible for providing access to distributor data to non-distributor users (e.g. distributor contract negotiator). |
| Supplier administrator | Person who has access to all of the supplier users of ISCM. Responsible for providing the information for setting up and maintaining suppliers and their domains. Also responsible for providing access to supplier data to non-supplier users (e.g. supplier contract negotiator). |
| Operations support/ manager | Person has access to system audit log and system operational reports. Responsible identifying things such as attempts to gain unauthorized access, abnormal usage patterns, system bottlenecks, etc. |
| Help desk | Person(s) responsible for supporting the user community when they have questions or encounter difficulties. |

Figure 62:
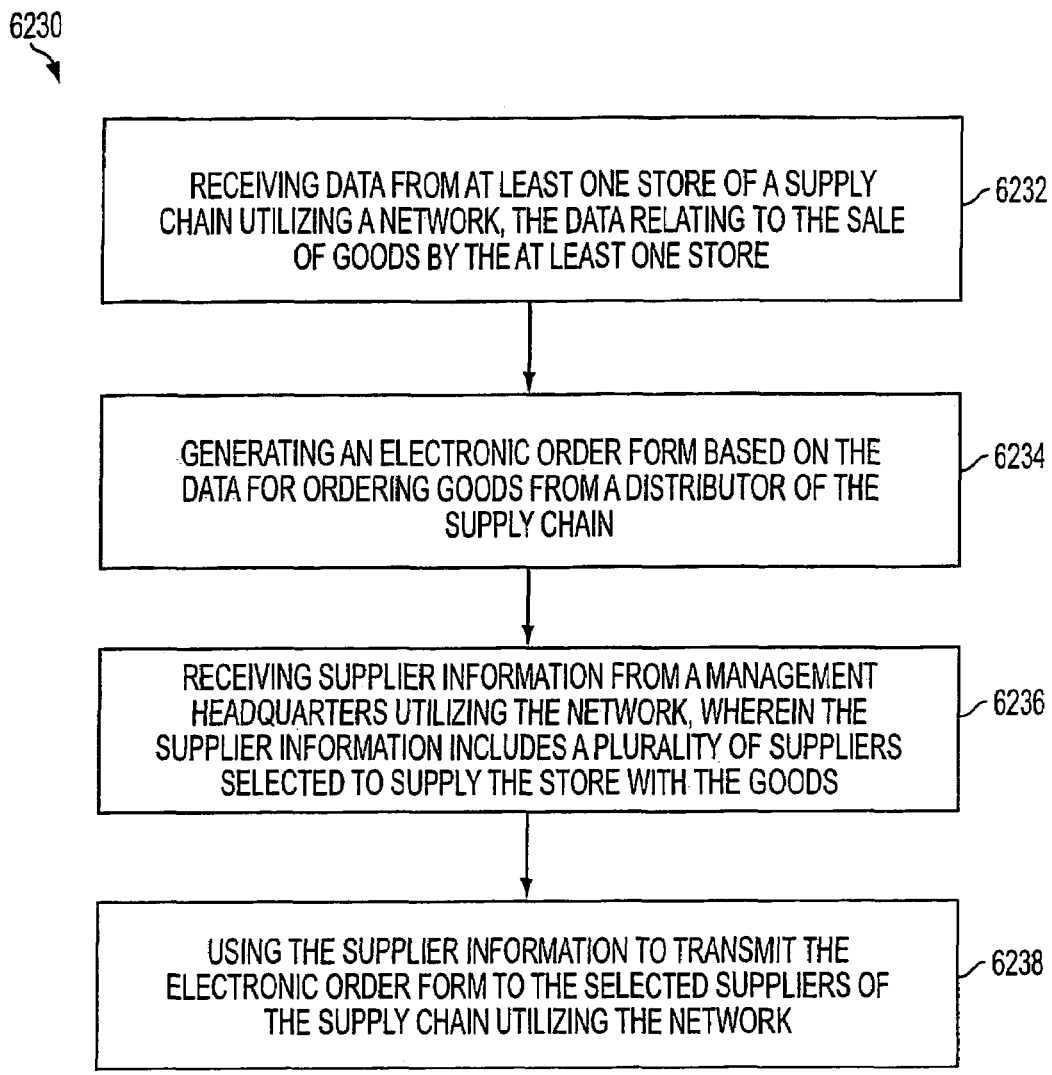
FIG. 62 is a flowchart of a process for selecting suppliers in a supply chain management framework in accordance with an embodiment of the present invention.

FIG. 62 is a flowchart of a process 6230 for selecting suppliers in a supply chain management framework. A network is utilized in operation 6232 to receive data from at least one store of a supply chain that relates to the sale of goods by the at least one store. An electronic order form is generated based on the data for ordering goods from a distributor of the supply chain in operation 6234. Supplier information is received from a management headquarters utilizing the network in operation 6236. The supplier information includes a plurality of suppliers selected to supply the store with the goods. The supplier information is then used to transmit the electronic order form to the selected suppliers of the supply chain utilizing the network in operation 6238.

In one aspect, the network includes the Internet. In another aspect, the electronic order form is generated by the at least one store. In a further aspect, the electronic order form is generated by the distributor. In an additional aspect, the suppliers are selected using the data. In yet another aspect, the suppliers are selected using performance information collected regarding the suppliers.

Members

The members are franchisees who own one to several hundred retail outlets. They also are the owners of the supply chain coordinator cooperative and as such, they are the primary focus ISCM from efficiency and cost reduction points of view.

In the initial form of ISCM, members perform three functions. They create retailer orders and send them to distributors for processing. They provide daily POS data to supply chain management, who will then enhance it and provide it to members, distributors and supplier on an aggregated basis to assist them in planning inventories and purchases. Also, they retrieve and view orders, and enhanced sales history data.

Figure 63:
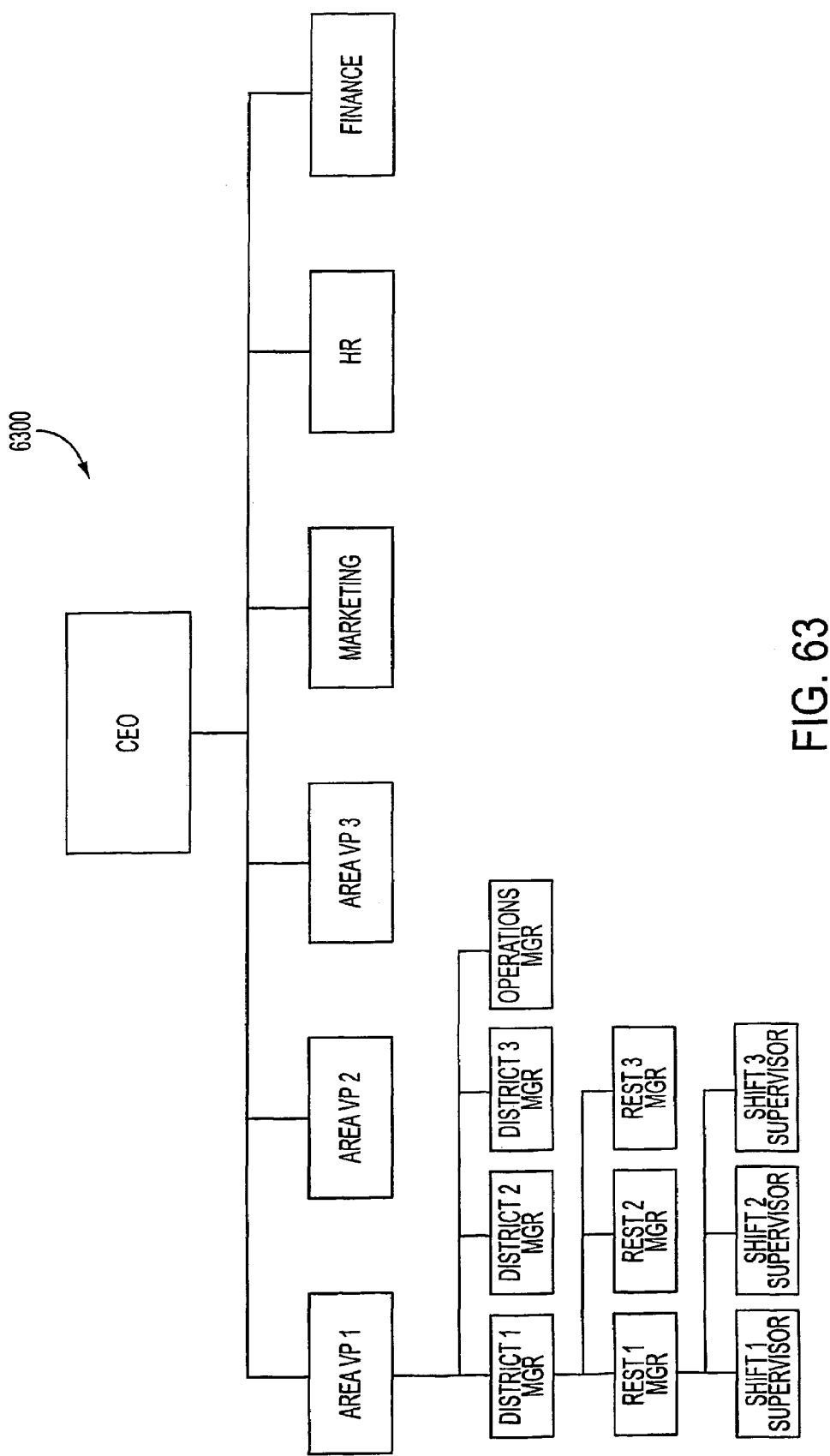
FIG. 63 illustrates a multi-level, complex member organization.

The member organizations that ISCM can support vary from a single level organization to ones that can contain as many as four levels. The structure depends on the nature of the business entity (sole proprietorship, partnership or corporation), the size (number of retail outlets) and the preferences of the owner/CEO/board/partners. The structure impacts ISCM as it dictates the number (width and depth) of data domain levels that ISCM supports. FIG. 63 illustrates a multi-level, complex member organization 6300. The table below illustrates ISCM user functions. Looking to the Usage Type, an Active User uses ISCM in the course of doing their daily job. A Passive User may use ISCM information; doesn't need it to do job.

TABLE 3

| User Function | Usage Type | Description |
|---|---|---|
| Administrator | Active | Responsible for adding, modifying and deleting users in their distributor domain. Sets access permissions for users in their domains. |
| Corporation/owner/ partner: CEO VP of marketing VP of development CFO VP of operations | Passive | View forecasts, and historical sales and usage for corporate level and sub domains below corporate. |
| Area staff: VP Director of OPS Marketing manager | Passive | View forecasts, and historical sales and usage for area level and sub domains below area. |
| District managers | Passive | View forecasts, and historical sales and usage for district level and sub domains below district. |
| Restaurant managers | Active | View orders, forecasts, and historical sales and usage for restaurant. |
| Order preparer | Active | View orders, forecasts, and historical sales and usage for restaurant. Enter orders for restaurants. |

Distributors

Distributors are middlemen with whom the supply chain coordinator has contracted to supply all member retailers in a given geography.

Distributor supply chain services include:

Receive, pick, pack and ship retailer orders as specified by the terms and conditions of a supply chain agreement.

Invoice shipped retailer orders as specified by the terms and conditions of the supply chain agreement.

Provide warehouse storage space for inventory levels that are sufficient to service the retailers in their geography as specified by the terms and conditions of the supply chain agreement.

Provide storage environments (e.g. refrigeration) that are needed to maintain the quality of the items they supply to the retailers in their geography.

Maintain inventory levels that are sufficient to supply retailers as specified by the terms and conditions of the supply chain agreement.

Replenish inventories by buying from approved and/or pre-specified suppliers.

The distributors serve a large geography. As a result, they have several strategically located distribution centers throughout their territory. These distribution centers maintain local inventories and service retailers in their locale to reduce transportation time and costs.

Functions such as sales, accounting, billing, customer service, are generally centralized at a headquarters location.

The supply chain coordinator's contracts with distributors specify:

Service levels that cover things like order cycle times, commodity quality, etc.

Retailers served by the distributor.

Distribution center that services each retailer.

Items/commodities that the distributors will carry in their inventory for the retailers.

Suppliers and supplier plant that will be used to provide each item that will be carried by each distribution center for the retailers they service.

Figure 64:
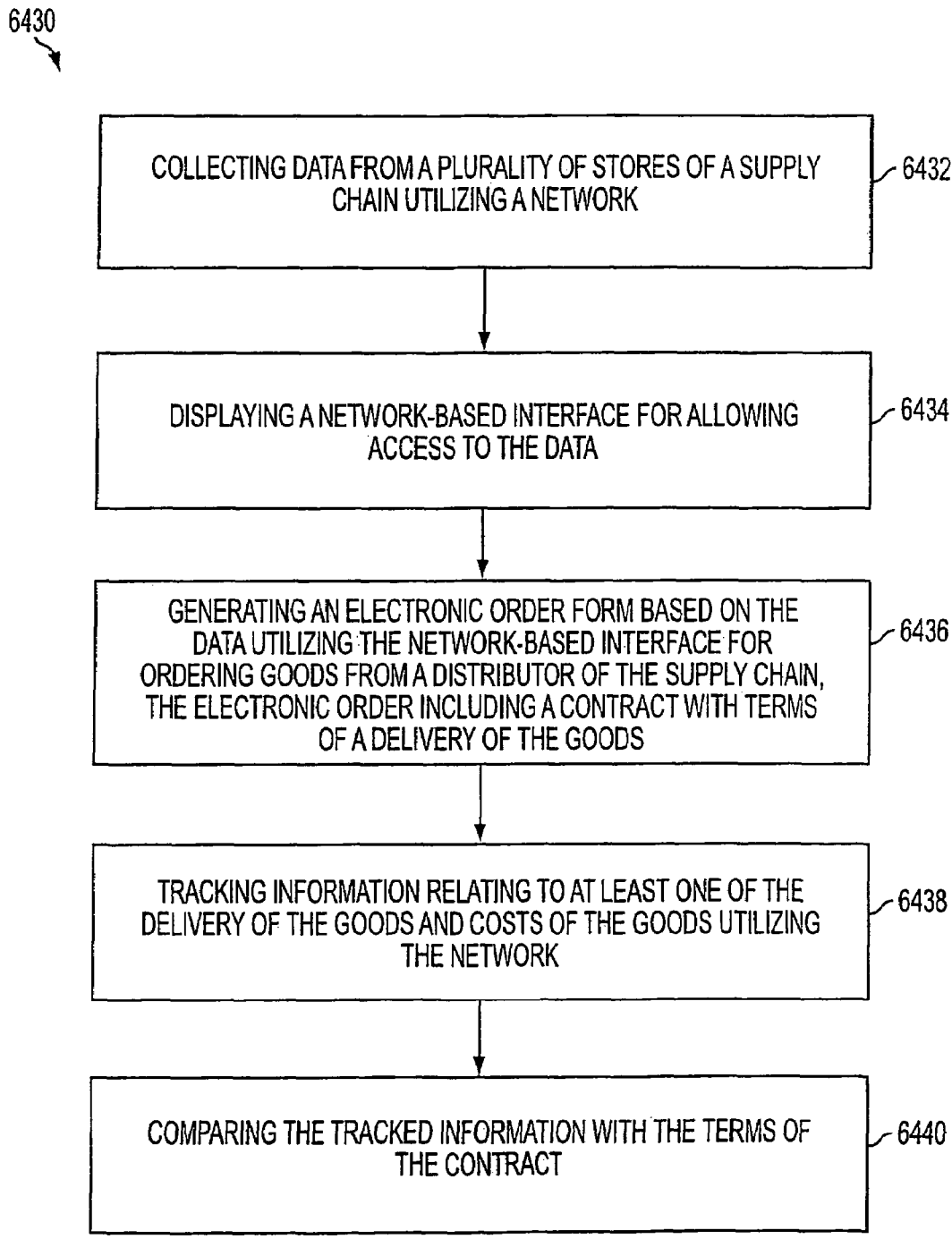
FIG. 64 is a flowchart of a process for contract enforcement in a supply chain management framework in accordance with an embodiment of the present invention.

FIG. 64 is a flowchart of a process 6430 for contract enforcement in a supply chain management framework in which data is collected from a plurality of stores of a supply chain utilizing a network in operation 6432. Next, a network-based interface is displayed for allowing access to the data in operation 6434. An electronic order form is then generated in operation 6436 based on the data utilizing the network-based interface for ordering goods from a distributor of the supply chain, the electronic order including a contact with terms of a delivery of the goods. Information relating to the delivery and/or costs of the goods is tracked utilizing the network in operation 6438 and the tracked information is compared with the terms of the contract in operation 6440.

In one aspect, the information relates to a timeliness of delivery of the goods. In another aspect, the information relates to a quality of the goods delivered by the distributor. In a further aspect, the information relates to a price of the goods delivered by the distributor. In an additional aspect, an alert is sent upon the comparison indicating a discrepancy between the tracked information and the terms of the contract. In such an aspect, the alert may be made available on the network-based interface.

The following table lists distributor functions that may interact with ISCM:

TABLE 4

| User Function | Usage Type | Description |
|---|---|---|
| Administrator | Active | Responsible for adding, modifying and deleting users in their distributor domain. Sets access permissions for users in their domains. |
| Headquarters: CEO/GM Marketing Procurement Credit Accounts receivable Accounts payable | Passive | View orders, forecasts, and historical sales and usage for corporate level and distribution centers below corporate level. |
| Customer Service QA | Active | View orders for all distribution centers to deal with retailers question/issues |

TABLE 4-continued

| User Function | Usage Type | Description |
|---|---|---|
| Account executive | Active | Distributor point of contact for the supply chain coordinator. View orders, forecasts, and historical sales and usage for corporate level and distribution centers below corporate level. |
| Contract manager | Active | View orders, forecasts, and historical sales and usage for corporate level and distribution centers below corporate level. |
| Distribution Center: DC buyer | Active | View forecasts, and historical sales and usage by supplier for DC. Uses information to plan purchases |
| Transportation manager | Active | View orders and forecasts to schedule trucks and determine routes. |
| Order pickers | Active | View individual orders to pick them |
| Shipping | Active | View individual orders to pack and ship them. |

Usage Type: Active User uses ISCM in the course of doing their daily job.
Passive User may use ISCM information; doesn't need it to do job.

accessible utilizing a network-based interface. In an additional aspect, the electronic order forms indicate a type of the goods, an amount of goods, and a target delivery date of the goods. In another aspect, the comparison is used to gauge a performance of the distributors.

Suppliers

Suppliers produce the items that the retailers buy from the distributors. Distributors replenish their inventories with bulk purchases from suppliers.

All suppliers are approved by retail outlet management. The supply chain coordinator negotiates agreements with suppliers on behalf of their members. Distributors can utilize supply chain coordinator-specified suppliers to service the restraints.

Large national/regional suppliers will have several production/processing facilities around the country. The facilities that will supply the distributors are inspected and approved by retailer management. The supply chain coordinator can specify the supplier facility that will be used to replenish each distributor distribution center.

The following table has supplier functions that may interact with ISCM:

TABLE 5

| User Function | Usage Type | Description |
|---|---|---|
| Administrator | Active | Responsible for adding, modifying and deleting users in their supplier domain. Sets access permissions for users in their domains. |
| Headquarters: Marketing Procurement Credit Accounts receivable Accounts payable | Passive | View item forecasts and historical sales and usage for corporate level and for plants below corporate level. |
| Account executive | Active | Supplier point of contact for the supply chain coordinator. View item forecasts and historical sales and usage for corporate level and for plants below corporate level. |
| Plant: Production planner | | View item forecasts, and historical sales and usage. Use to plan production. |
| Buyer | Active | View item forecasts, and historical sales and usage. Use to plan production material purchasing. |
| Transportation manager | Active | View item forecasts, and historical sales and usage. Use to plan transportation. |

Usage Type: Active User uses ISCM in the course of doing their daily job.
Passive User may use ISCM information; doesn't need it to do job.

Figure 65:
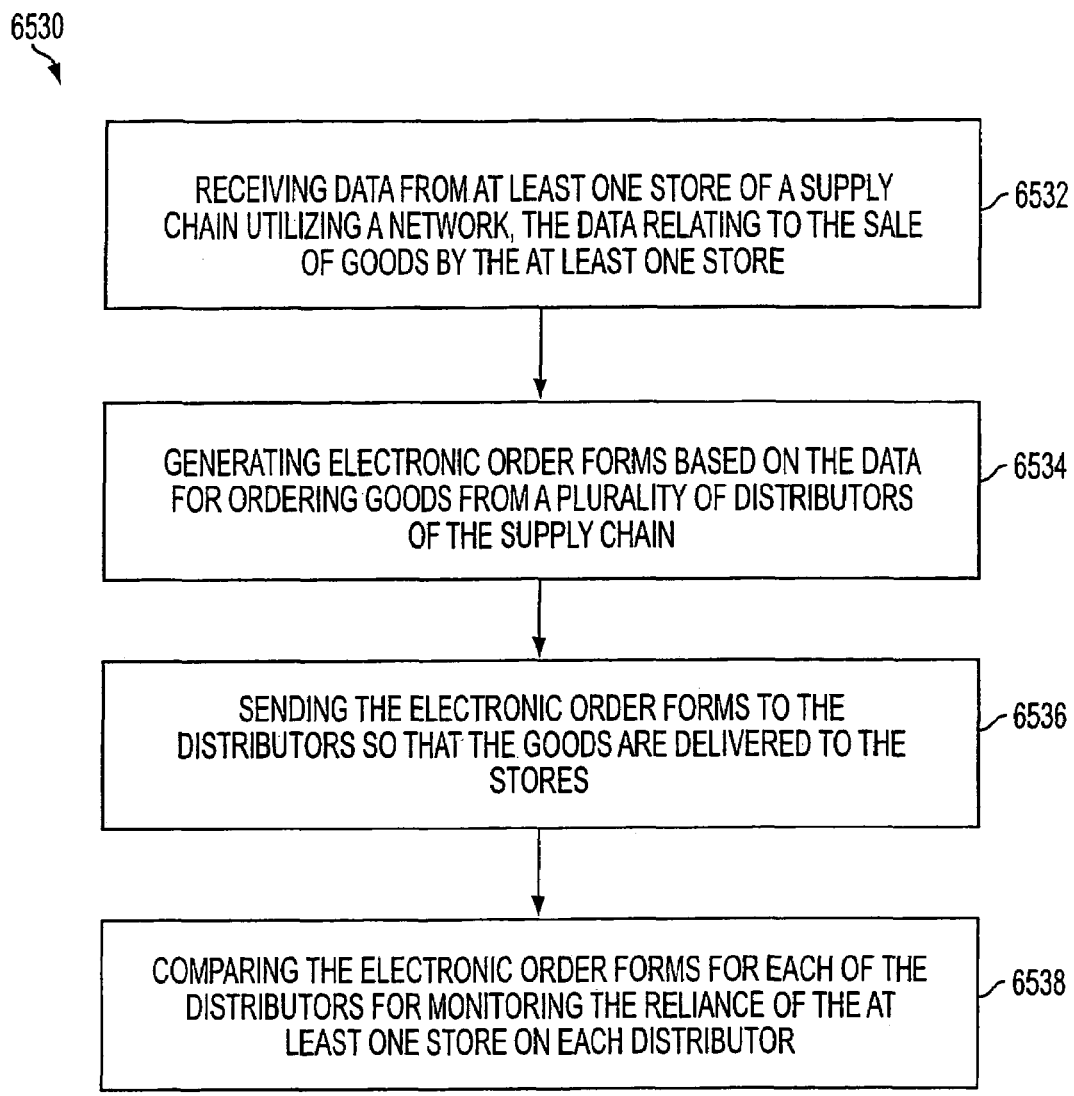
FIG. 65 is a flowchart of a process for monitoring distributor activity in a supply chain management framework in accordance with an embodiment of the present invention.

FIG. 65 is a flowchart of a process 6530 for monitoring distributor activity in a supply chain management framework. Data is received in operation 6532 from at least one store of a supply chain utilizing a network. This data relates to the sale of goods by the store. Electronic order forms are generated in operation 6534 based on the data for ordering goods from a plurality of distributors of the supply chain. The generated electronic order forms are sent to the distributors in operation 6536 so that the goods are delivered to the stores. The electronic order forms for each of the distributors are compared for monitoring the reliance of the store on each distributor in operation 6538.

Figure 66:
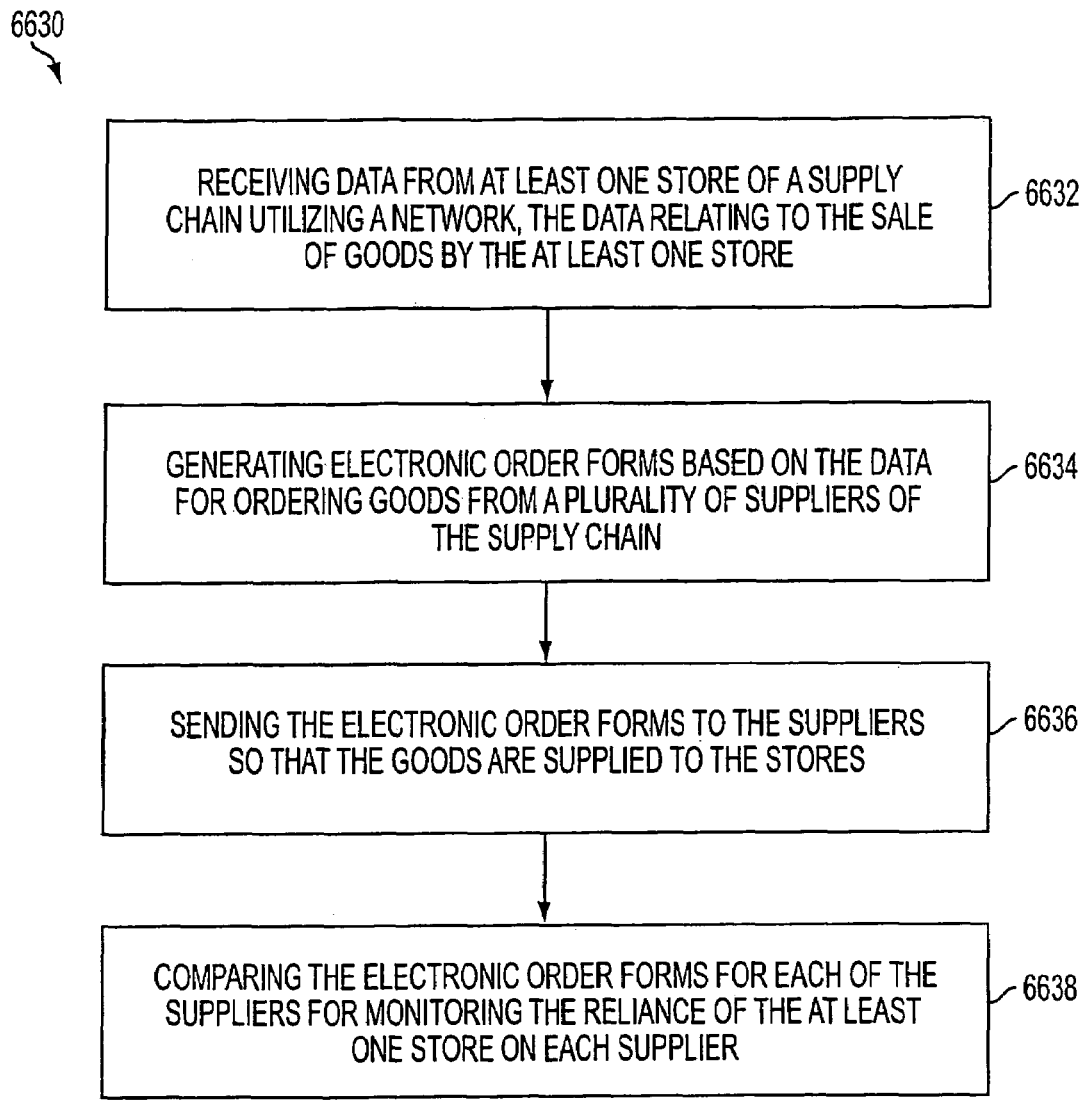
FIG. 66 is a flowchart of a process for monitoring supplier activity in a supply chain management framework in accordance with an embodiment of the present invention.

In one aspect, the network includes the Internet. In another aspect, the electronic order forms are generated by the at least one store. In a further aspect, the comparison is FIG. 66 is a flowchart of a process 6630 for monitoring supplier activity in a supply chain management framework. Data relating to the sale of goods is received from at least one store of a supply chain utilizing a network in operation 6632. Electronic order forms are generated based on the data for ordering goods from a plurality of suppliers of the supply chain in operation 6634. The electronic order forms are sent to the suppliers so that the goods are supplied to the stores in operation 6636. The electronic order forms for each of the suppliers are then compared for monitoring the reliance of the store on each supplier in operation 6638.

In one aspect, the network includes the Internet. In another aspect, the electronic order forms are generated by the at least one store. In a further aspect, the comparison is accessible utilizing a network-based interface. In yet another aspect, the electronic order forms indicate a type of the goods. In an amount of goods. In an additional aspect, the comparison is used to gauge a performance of the suppliers.

User Relationship Domains for Access and Reporting

The following table depicts the domains for access and reporting for members, distributors and suppliers.

TABLE 6

| Member | Member |
|---|---|
|  | Area |
|  | District |
|  | Retailer |
|  | Item |
|  | Quantity |
| Distributor | Distributor (order) |
|  | Distribution center |
|  | Retailer |
|  | Item |
|  | Quantity |
|  | Distributor (usage) |
|  | Item |
|  | Distribution center |
|  | Supplier |
|  | Supplier plant |
|  | Item |
|  | Quantity |
| Supplier | Supplier |
|  | Plant |
|  | Item |
|  | Quantity |

Figure 67:
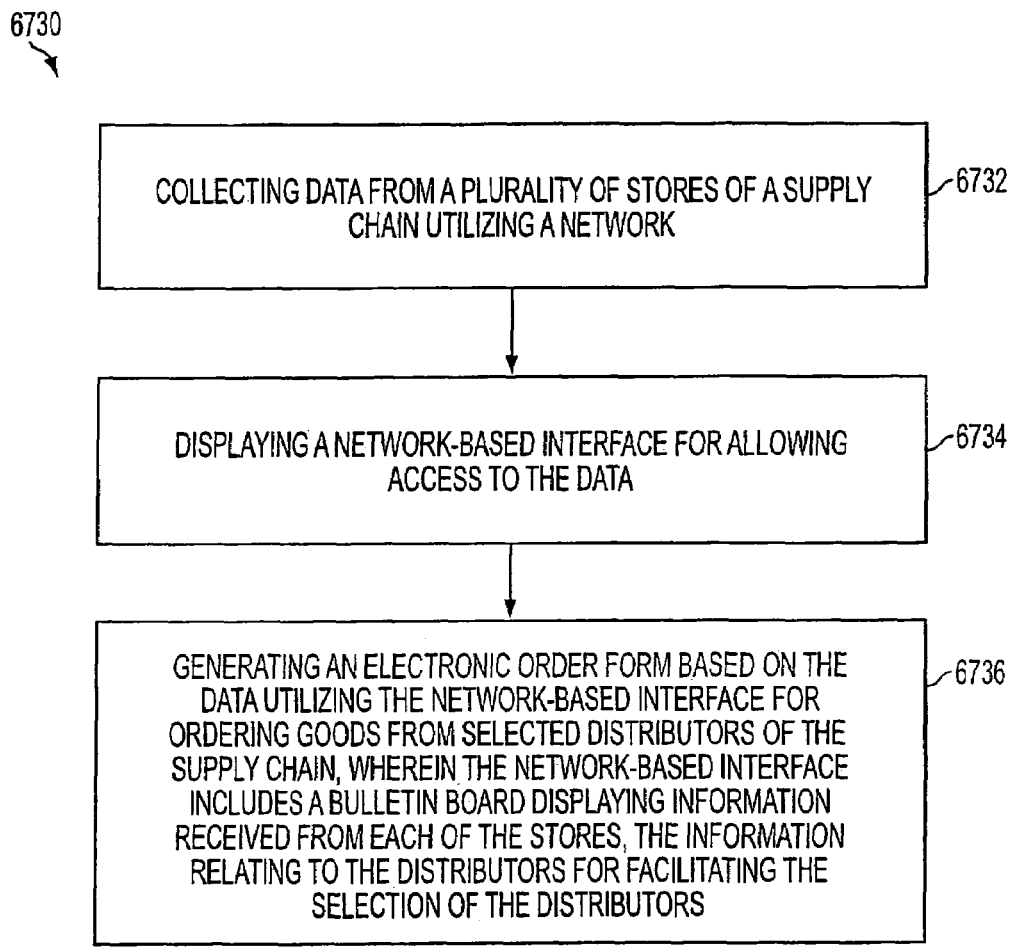
FIG. 67 is a flowchart of a process for a bulletin board feature in a supply chain management framework in accordance with an embodiment of the present invention.

FIG. 67 is a flowchart of a process 6730 for a bulletin board feature in a supply chain management framework. Utilizing a network, data is collected from a plurality of stores of a supply chain in operation 6732. A network-based interface is also displayed for allowing access to the data in operation 6734. An electronic order form is generated in operation 6736 based on the data utilizing the network-based interface for ordering goods from selected distributors of the supply chain. The network-based interface includes a bulletin board displaying information received from each of the stores. The received information relates to the distributors for facilitating the selection of the distributors.

In one aspect, the information relates to a timeliness of deliveries made by the distributors. In another aspect, the information relates to a quality of the goods delivered by the distributors. In a further aspect, the information relates to a price of the goods delivered by the distributors. In an additional aspect, a store from which the information is received is identified. As another aspect, the store from which the information is received may be identified utilizing an electronic mail address for communication purposes.

Figure 68:
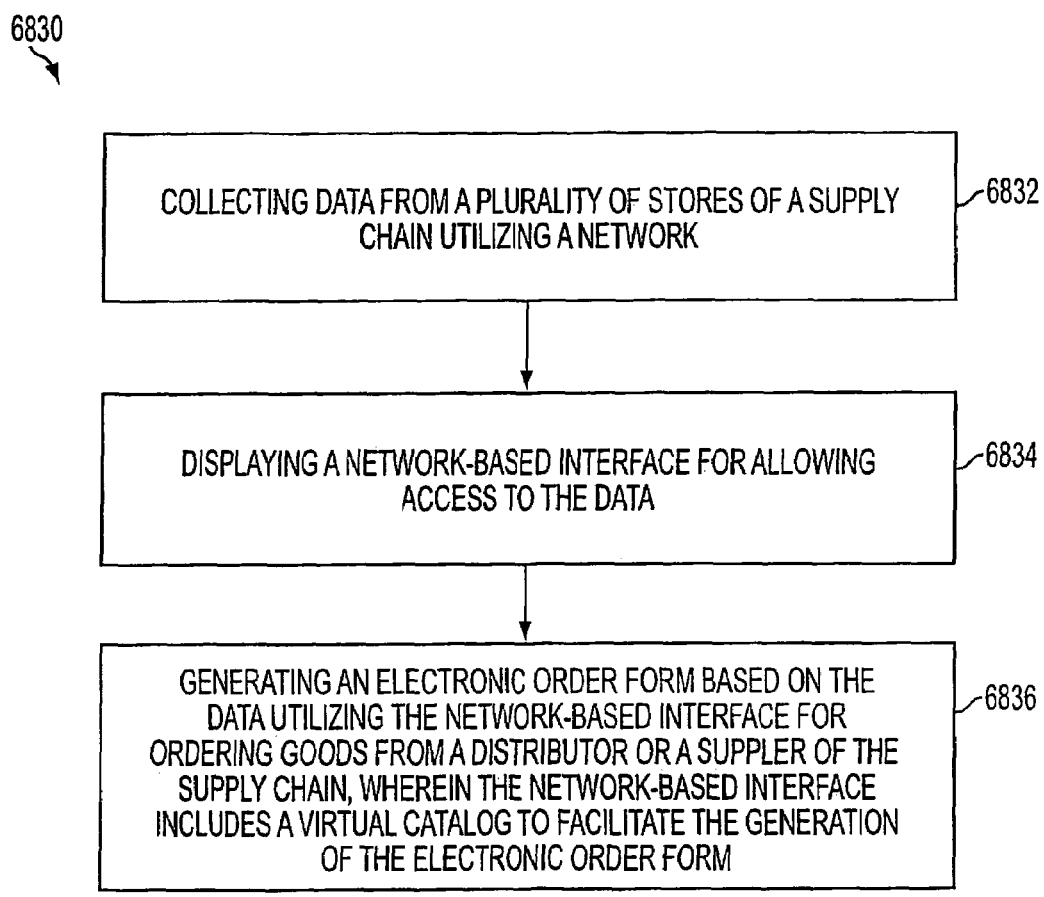
FIG. 68 is a flowchart of a process for a catalog feature in a supply chain management framework in accordance with an embodiment of the present invention.

FIG. 68 is a flowchart of a process 6830 for a catalog feature in a supply chain management framework. Data is collected utilizing a network in operation 6832 from a plurality of stores of a supply chain. A network-based interface is displayed in operation 6834 for allowing access to the data. An electronic order form is subsequently generated in operation 6836 based on the data utilizing the network-based interface for ordering goods from a distributor of the supply chain or a supplier of the supply chain if the goods are not distributed through a distributor. The network-based interface includes a virtual catalog to facilitate the generation of the electronic order form.

In an aspect, the catalog displays a plurality of raw products from which the goods are produced. In such an aspect, the catalog may display a plurality of distributors from which the raw products can be ordered. As a further aspect, the catalog may also display a comparison of performance of the distributors. As an additional aspect, the performance may be calculated based on the data. In an another aspect, the catalog may include links to additional network-based interfaces relating to suppliers.

Critical to Quality Requirements

Overview

When defining the features and functionality of a newly designed system, it is recommended to begin with the actual business needs of the users of the web portal. It has already been defined in the section entitled User Characteristics that the users of the web portal will be managing and maintaining many if not all of the security administrative aspects of the system.

It is important to gather and understand the business needs for each user community and then translate those needs into actual Critical to Quality (CTQ) requirements. To obtain these CTQs, each user group supplied their own Voice Of the Customer (VOC) demands upon the system.

The VOCs are then mapped into high level categories that ultimately map to desired features and functional requirements (discussed in the section entitled Functional Requirements, below).

Figure 69:
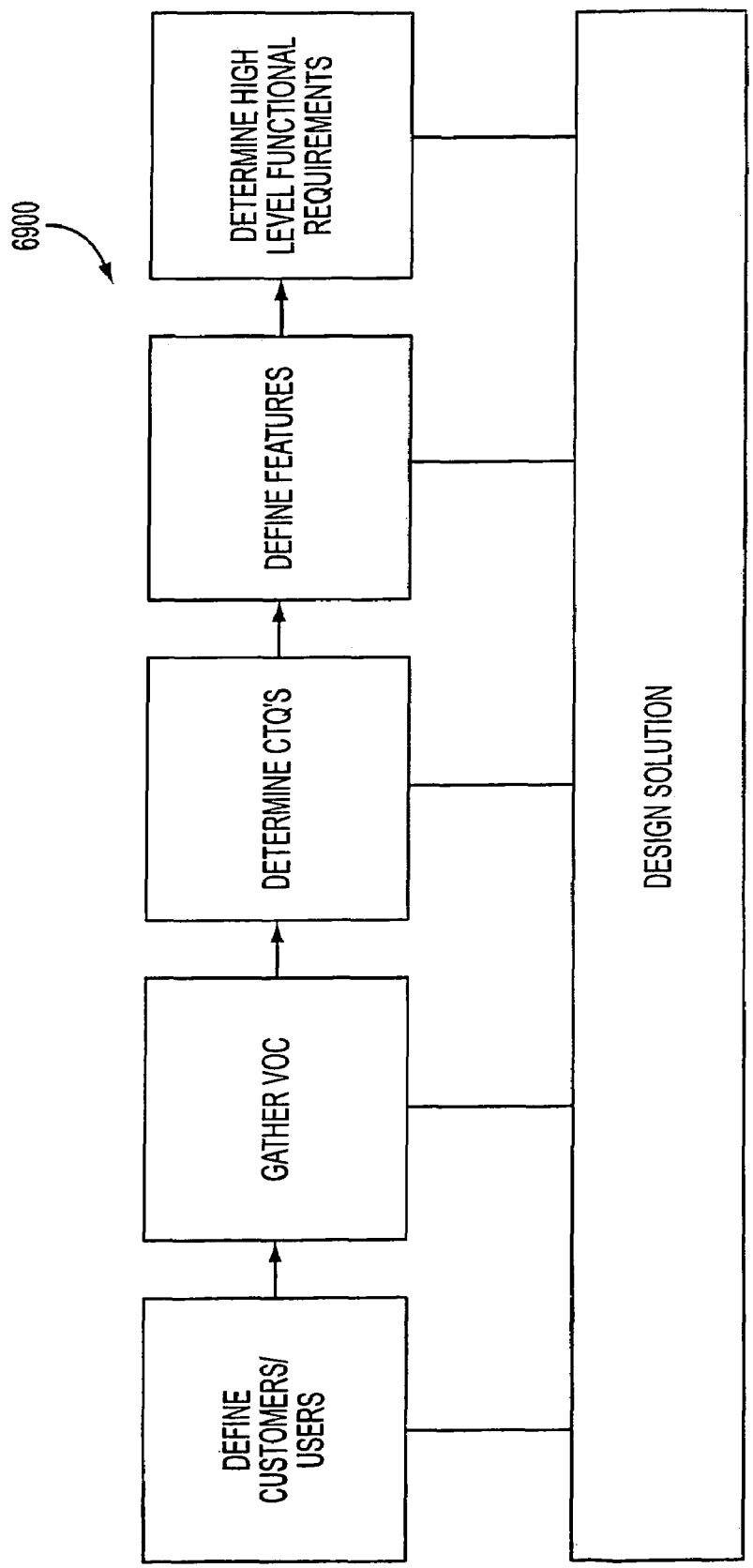
FIG. 69 is an outline of an approach for mapping customers directly to solution design.

The overall approach uses a six sigma consulting methodology 6900 for mapping customers directly to solution design and is outlined in the FIG. 69.

Using this approach, it is possible to design a system solution that ties directly back to the core customer groups and their business needs. Features and high level functional requirements are the core to system design, and using the Six Sigma consulting methodology maintains the integrity of the original business needs as presented by the key stakeholders for the web portal.

The next set of sections will detail the specific VOCs and CTQs that were collected in the workshop sessions. These CTQs will then be tied to the features and functional requirements as outlined in the section entitled Functional Requirements, below.

Voice Of the Customer (VOC)

Each of the core customer communities as outlined in the section entitled User Characteristics were interviewed to collect their VOCs in relation to a web security model. Each workshop discussed potential portal applications and their functionality, providing a back drop for the potential security needs of the system. The following table lists all of the VOCs collected at each workshop, and places them into high level categories.

TABLE 7

| Voice of the Customer | SCC | Member | Supplier Distributor |
|---|---|---|---|
| 1. Securely isolate data and functions to prevent unauthorized access. |  |  |  |
| Isolate my data | X |  |  |
| My data for my eyes only | X |  |  |
| Insure my data is safe | X |  |  |
| Want to feel the system is secure |  | X |  |
| Assume a high level of security; keep competitors out |  | X | X |
| Ability to perform password administration and manage accounts | X | X | X |
| Access right/password changes must be granted immediately. |  | X |  |
| System should require periodic password changes for all accounts |  |  | X |
| Make it difficult for someone to take data directly to a competitor |  |  | X |

TABLE 7-continued

| Voice of the Customer | SCC | Member | Supplier Distributor |
|---|---|---|---|
| 2. Security is simple from an end user's perspective. | | | |
| Make it quick and easy | X | | |
| Give me a single logon with multiple community access. | X | X | |
| Ability to select access rights for all levels | | X | |
| If you make it too difficult to access we won't want to bother accessing it. | | | X |
| 3. Security administration is simple from a user perspective | | | |
| Make maintenance simple | | X | |
| 4. Access management administration is very flexible. | | | |
| Give me a single logon with multiple community access. | X | X | |
| Ability to select access rights for all levels | | X | |
| Simultaneous/reciprocal access | | X | |
| Be able to select individuals to set up access to his/her group | | | X |
| Various levels would have varying degrees of password change enforcement | | | X |
| We need multiple levels of security access | | | X |
| Single individuals may have multiple owner organizations | | | X |
| I need flexibility | | | X |
| 5. System proactively monitors for potential security breaches. | | | |
| I want the system to take preventative measures | | X | |
| We should be able to detect that something isn't right | | X | |
| We want an audit trail of some sort | | | X |
| Incident tracking capability; especially for inappropriate use. | | | X |
| 6. Reports are available that enable community administrator to effectively manage and maintain security and access. | | | |
| Tell me who is using the SCC web site | X | | |
| Show me who is using the system for my organization | X | | |
| Who has done what to my data? | | X | |
| I want reporting functionality for audits. | | X | |
| We should be able to detect that something isn't right | | X | |
| We want an audit trail of some sort | | | X |
| Want to track information flow | | | X |
| Need to know who has access | | | X |
| Need to have detailed information available to determine who went where when. | | | X |
| Incident tracking capability; especially for inappropriate use. | | | X |
| 7. System does not create cost or incremental effort for the supply chain community | | | |
| Don't waste time on the Internet | X | | |
| No incremental cost | X | X | X |
| Don't disrupt my business operations | | X | |
| I don't want to hire anyone for support or administration | | X | |
| I'm concerned about information overload | | | X |
| Target the information and give me what I need to know. | | | X |

TABLE 7-continued

| Voice of the Customer | SCC | Member | Supplier Distributor |
|---|---|---|---|
| This is supposed to represent cost savings | | | X |
| 8. Effective training and documentation | | | |
| Create a common nomenclature (classification and roles) | | | X |
| Training concerns | | | X |
| 9. Integrate with existing systems | | | |
| Single sign-on | X | X | |
| One location "one-stop-shop" | | X | |

CTQs

The VOCs identify most of the security concerns for each user community. These statements are then assessed to fall into distinct and measurable requirements, the critical to quality factors for each of the stated issues.

The following table outlines how each of the high level VOCs categories map to specific CTQ requirements and these items will ultimately map to the desired features and functionality of the security system.

TABLE 8

| | Voice of the Customer | CTQ |
|---|---|---|
| 1. | Securely isolate data and functions to prevent unauthorized access. | Security, Prevention |
| 2. | Security is simple from an end user's perspective. | Simplicity |
| 3. | Security administration is simple from a user perspective | Simplicity, Ease of Use |
| 4. | Access management administration is very flexible. | Flexibility |
| 5. | System proactively monitors for potential security breaches. | Reporting, Prevention |
| 6. | Reports are available that enable community administrator to effectively manage and maintain security and access. | Reporting, Simplicity, Prevention |
| 7. | System does not create cost or incremental effort for the supply chain community | Cost |
| 8. | Effective training and documentation | Simplicity |
| 9. | Integrate with existing systems | Integration, Simplicity |

Business Processes

Overview

Any security model will require certain business processes and procedures to maintain the integrity and ease of use. This section outlines some business processes that need to be in place to begin implementation.

The next section, entitled Policy Requirements, will further identify specify policies that surround and govern aspects of these processes. It is important to note that these procedures need to be assigned clearly to responsible parties, and the policies outlined in the Section entitled Policy Requirements (below) should be clearly provided in order to maintain system integrity.

Adding and Deleting Users

The first procedure that needs to be addressed is how to add and delete users to the system. Users are defined as an individual who requires access to applications and data on the web portal. This process should be replicated throughout the domains and user communities, always managed by a specifically named administrator role (see Administration below).

Adding New Users

The sequence of steps for adding a user begins with authorization:
1. Request for new user account
2. Request verified by administrator, notification sent to user's manager
3. Authorization of new account provided
4. Reference to policy for access rights and privileges for the requested class of user
5. Configure access levels
6. Send new user ID and default password to new user
7. Confirm successful logon and password change at first logon These steps can exist at all user community levels, and also for providing administrator access, such as from the supply chain coordinator corporate to a Member organization. It is important to provide an authorization step before creating an account, so that the administrator is also monitored for security purposes.

Deleting Existing Users

The sequence of steps for deleting a user requires similar authorization:
1. Request for deleting an existing account
2. Request verified by administrator, notification sent to user's manager
3. Authorization for deleting account provided
4. Reference to policy for deleting access rights and privileges for the requested class of user
5. Delete user account
6. Send verification of deletion to user's manager
7. Confirm successful deletion by attempting administrator logon The confirmation of deletion may be a useful step, as security breaches are most likely to occur from an improperly deleted account. The supply chain coordinator should require all levels of security management to provide verification of deleted accounts, especially in the member and supplier/distributor communities.

Changing Key Contact Administrator

At times the key contact administrator within a domain organization may change. While the process of adding a new user as an administrator follows the same process as adding a new user, there are a few additional kick-off steps that initiate the process. The key contact in this process is not the account contact (not the Member owner, or supplier contact person), but is in fact the web portal administrator for that organization.
1. Supplier/Distributor/Member notifies the supply chain coordinator account manager of change in key contact.
2. The account manager validates change via phone call to Supplier/Distributor/Member
3. Upon verification, the account manager notifies the supply chain coordinator administrator of new key contact information
4. The administrator suspends user account rights and privileges
5. The administrator sets up new user account with organization administration rights according to access policy guidelines
6. Notify new administrator of new user ID and default password
7. Confirm successful logon and password change at first logon When the key contact for the security system changes at a domain organization, it is not likely that the supply chain coordinator administrator will be directly notified of the change. That is why it is useful for the account manager to verify the change, and obtain the new user information and submit the request. This process ensures that the administrator is acting upon an authorized and verified request. The process may be audited to trace where the authorization initiated, in the event a false transfer of rights is made.

Auditing and Monitoring

This section describes in detail the procedures to follow for auditing and monitoring the security system usage. What to collect, how to collect it, and how to preserve the integrity of the audit data are all useful procedures for maintaining proper and effective security measures.

Data to Collect

Figure 70:
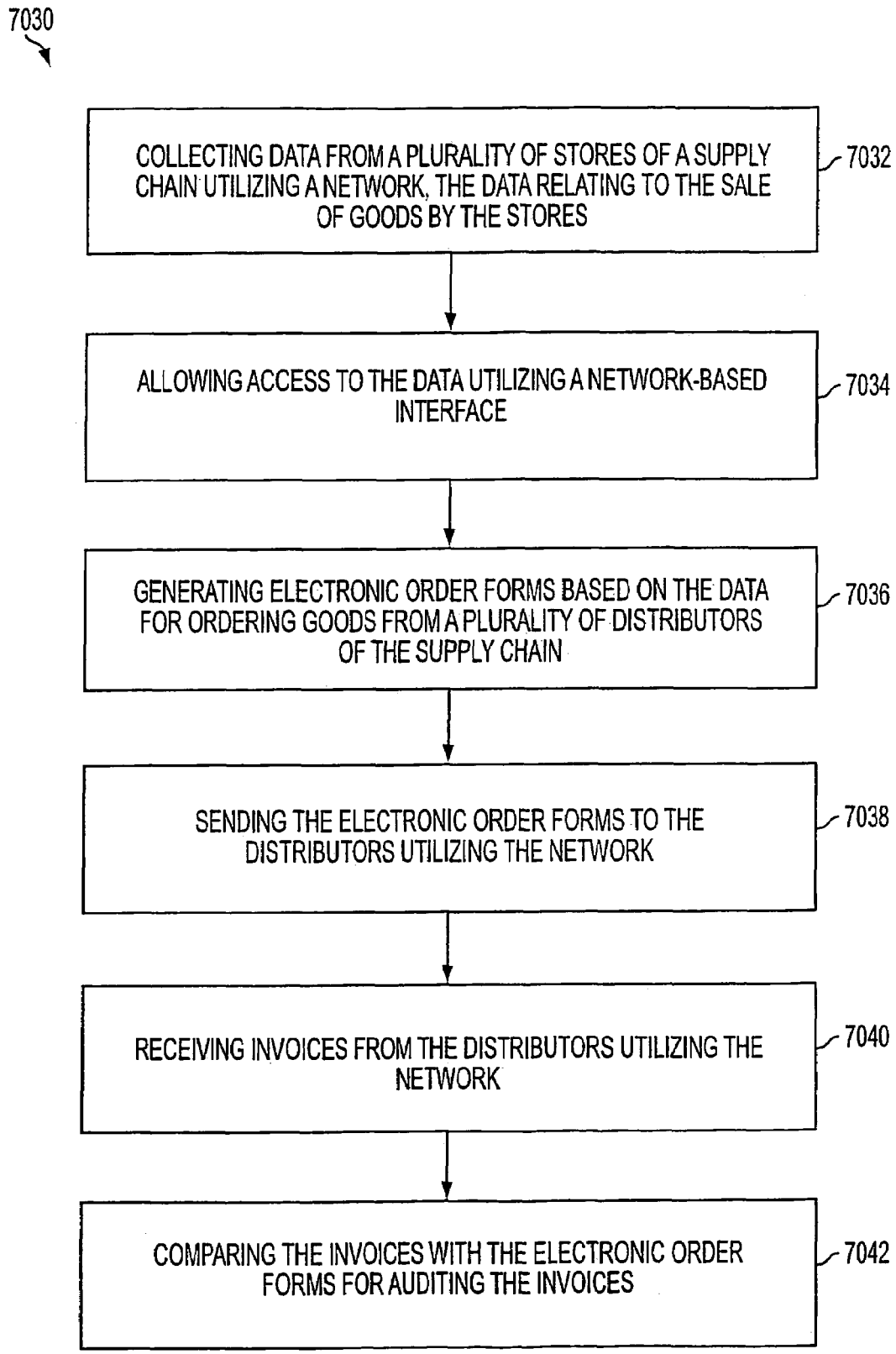
FIG. 70 is a flowchart of a process for electronic invoice auditing in a supply chain management framework in accordance with an embodiment of the present invention.

FIG. 70 is a flowchart of a process 7030 for electronic invoice auditing in a supply chain management framework. Utilizing a network, data is collected in operation 7032 from a plurality of stores of a supply chain that relates to the sale of goods by the stores. Access to the data is allowed utilizing a network-based interface in operation 7034. Electronic order forms are generated in operation 7036 based on the data for ordering goods from a plurality of distributors of the supply chain. The generated electronic order forms are sent to the distributors utilizing the network in operation 7038. Subsequently, invoices are received from the distributors utilizing the network in operation 7040 and the invoices are compared with the electronic order forms for auditing the invoices in operation 7042.

In one aspect, the electronic order forms include a price of the goods. In another aspect, a price of the goods is calculated from the electronic order forms. In such an aspect, the price of the goods may be calculated from the electronic order forms utilizing a table mapping a plurality of goods with a plurality of prices. In further aspect, the electronic order forms are generated by the stores. In an additional aspect, an alert is generated upon a discrepancy being found during the comparison.

Audit data should include any attempt to achieve a different security level by any person, process, or other entity in the network. This information includes login and logout, super user access (administrator rights), and any other change of access or status. The processes outlined previously include a fair amount of authorization and verification steps—these steps are important to create cross domain, cross organizational audit trails.

The actual data to collect may differ for the different types of applications and different types of access changes made within the portal. In general, the information to collect includes:

Username, for login and logouts

Previous and new access rights, to track changes to access

Timestamp

One very important note: Do not gather passwords. There is an enormous potential for security breach if the audit records are improperly accessed. Do not gather incorrect passwords either, as they often differ from the correct passwords by only a single character or transposition.

Collection Process

There are basically three ways to store audit records:
1. Read/write file on a host
2. Write-once/read-many device (CD-ROM or tape drive)
3. Write-only device (e.g. line printer)

File system logging is also the least reliable method. If the logging host has been compromised, the file system is usually the first thing to go—and an intruder could easily cover up traces of the intrusion.

Collecting audit data on a write-once device is slightly more effort to configure than a simple file, but it has the significant advantage of greatly increased security because an intruder could not alter the data showing that an intrusion has occurred. The disadvantage of this method is the need to maintain a supply of storage media and the cost of that media. Also, the data may not be instantly available.

Line printer logging is useful in system where permanent and immediate logs are required. A real time system is an example of this, where the exact point of a failure or attack may be recorded. A laser printer, or other device that buffers data (e.g., a print server), may suffer from lost data if buffers contain the needed data at a critical instant. The disadvantage of, literally, "paper trails" is the need to keep the printer fed and the need to scan records by hand. There is also the issue of where to store the, potentially, enormous volume of paper that may be generated.

For each of the logging methods described, there is also the issue of securing the path between the device generating the log and actual logging device (i.e., the file server, tape/CD-ROM drive, printer). If that path is compromised, logging can be stopped. In an ideal world, the logging device would be directly attached by a single, simple, point-to-point cable. Since that is usually impractical, the path may pass through the minimum number of networks and routers.

If the supply chain coordinator selects an outsourced host for the security system, these options can be optimized against security breaches. Keeping this audit collection process in-house would require effort to secure the various options for maintaining audit data integrity, detailed further in the following sub-section.

Preserving Audit Data

Audit data should be some of the most carefully secured data at the site and in the backups. If an intruder were to gain access to audit logs, the systems themselves, in addition to the data would be at risk.

Audit data may also become useful to the investigation, apprehension, and prosecution of the perpetrator of an incident. If a data handling plan is not adequately defined prior to an incident, it may mean that there is no recourse in the aftermath of an event, and it may create liability resulting from improper treatment of the data.

Legal Considerations

Due to the content of audit data, there are a number of legal questions that arise which might need to be addressed by legal counsel. As the Supply Chain management system collects and saves audit data, it needs to be prepared for consequences resulting both from its existence and its content.

One area concerns the privacy of individuals. In certain instances, audit data may contain personal information. Searching through the data, even for a routine check of the system's security, could represent an invasion of privacy. The privacy policy outlined in the Policy Requirements section (below) should clearly outline procedures that guarantee privacy of an individual user, both in terms of existing contracts (such as between members and retailer management) and also other existing legal regulations.

A second area of concern involves knowledge of intrusive behavior originating from the web portal. If an organization keeps audit data, is it responsible for examining it to search for incidents? If a host in one organization is used as a launching point for an attack against another organization, can the second organization use the audit data of the first organization to prove negligence on the part of that organization?

Security Incident Handling

The operative philosophy in the event of a breach of web security is to react according to a plan. This is true whether the breach is the result of an external intruder attack, unintentional damage, a student testing some new program to exploit vulnerability, or a disgruntled employee. Each of the possible types of events, such as those just listed, should be addressed in advance by adequate contingency plans.

Traditional web security, while quite important in the overall site security plan, usually pays little attention to how to actually handle an attack once one occurs. When an attack is in progress, many decisions are made in haste and can be damaging while tracking down the source of the incident, collecting evidence to be used in prosecution efforts, preparing for the recovery of the system, and protecting the valuable data contained on the system.

One of the most important, and often overlooked, benefits for efficient incident handling is an economic one. Having both technical and managerial personnel respond to an incident requires considerable resources. If trained to handle incidents efficiently, less staff time is required when one occurs.

Another benefit is related to public relations. News about computer security incidents tends to be damaging to an organization's stature among current or potential clients. Efficient incident handling minimizes the potential for negative exposure. In the member community it is important to maintain good public relations with retail management, suppliers, and distributors in the interest of positive supply chain collaboration.

A final benefit of efficient incident handling is related to legal issues. It is possible that in the near future organizations may be held responsible because one of their nodes was used to launch a network attack. In a similar vein, people who develop patches or workarounds may be sued if the patches or workarounds are ineffective, resulting in compromise of the systems, or, if the patches or workarounds themselves damage systems. Knowing about operating system vulnerabilities and patterns of attacks, and then taking appropriate measures to counter these potential threats may be helpful in circumventing possible legal problems.

This section will outline and discuss the following areas of incident handling:

Notification
Identifying an Incident
Law Enforcement and Legislative Agencies
Internal and External Communications
Containment
On-going Activities Notification It is important to establish contacts with various personnel before a real incident occurs. These contacts should include local managers and system administrators, administrative contacts for other domain organizations, and various investigative organizations.

For each type of communication contact, specific "Points of Contact" (POC) should be defined. These may be technical or administrative in nature and may include legal or investigative agencies as well as service providers and vendors. When establishing these contacts, it is important to decide how much information will be shared with each class of contact. It is especially important to define, ahead of time, what information will be shared with the users at a site, with the public (including the press), and with other sites.

A list of contacts in each of these categories is an important time saver for the key contact individuals during an incident. It can be quite difficult to find an appropriate person during an incident when many urgent events are ongoing. It is strongly recommended that all relevant telephone numbers (also electronic mail addresses and fax numbers) be included in the site security policy. The names and contact information of all individuals who will be directly involved in the handling of an incident should be placed at the top of this list.

Identifying an Incident

When an incident occurs, the first step is to identify if it truly is a security incident. Most signs of virus infection, system intrusions, malicious users, etc., are simply anomalies such as hardware failures or suspicious system/user behavior. To assist in identifying whether there really is an incident, it is usually helpful to obtain and use any detection software that may be available. Audit information is also extremely useful, especially in determining whether there is a network attack.

It is extremely important to obtain a system snapshot as soon as one suspects that something is wrong. Many incidents cause a dynamic chain of events to occur, and an initial system snapshot may be the most valuable tool for identifying the problem and any source of attack. Finally, it is important to start a log book. Recording system events, access to data, time stamps, etc., may lead to a more rapid and systematic identification of the problem, and is the basis for subsequent stages of incident handling.

There are certain indications or "symptoms" of an incident that deserve special attention:
1. System crashes.
2. New user accounts (unusual or non-precedent nomenclature, or high activity on a previously low usage account)
3. New files created (usually with strange file names, such as data.xx or *.xx).
4. Accounting discrepancies
5. Changes in file lengths or dates without proper authorization
6. Attempts to write to system without authorization
7. Data modification or deletion (complaints that files or data start to disappear)
8. Denial of service
9. Unexplained, poor system performance
10. Anomalies (e.g. frequent and unexplained "beeps").
11. Suspicious probes (there are numerous unsuccessful login attempts)
12. Suspicious browsing (someone accesses file after file on many user accounts.)
13. Inability of a user to log in due to modifications of his/her account.

This list is not comprehensive, but does highlight some common indicators of security incidents. It is recommended to collaborate with other technical and web security personnel to make a decision as a group about whether an incident is occurring.

Law Enforcement and Investigative Agencies

In the event of an incident with legal consequences, it is important to establish contact with investigative agencies (e.g., the FBI and Secret Service in the U.S.) as soon as possible. It should be acknowledged that the supply chain coordinator and it's user community organizations may have its own local and governmental laws and regulations that will impact how they interact with law enforcement and investigative agencies. The security policies and procedures need to identify those potential differences to help the various domain organizations follow consistent incident response methods.

The supply chain coordinator should notify legal counsel soon after knowledge of an incident is in progress. At a minimum, legal counsel needs to be involved to protect the legal and financial interests of the web portal and subsequent member organizations. There are many legal and practical issues, a few of which are:
1. Negative publicity—Is the supply chain coordinator willing to risk negative publicity or exposure to cooperate with legal prosecution efforts.
2. Downstream liability—Leaving a compromised system as is so it can be monitored while allowing access that causes damage on a downstream system may force liability on the supply chain coordinator for damages incurred.
3. Distribution of information—If the supply chain coordinator web portal distributes information about an attack in which another site or organization may be involved or the vulnerability in a product that may affect ability to market that product, the supply chain coordinator may again be liable for any damages (including damage of reputation).
4. Liabilities due to monitoring—the supply chain coordinator may be sued if users at its site or elsewhere discover that the web portal is monitoring account activity without informing users.

There are no clear precedents yet on the liabilities or responsibilities of organizations involved in a security incident or who might be involved in supporting an investigative effort. Investigators will often encourage organizations to help trace and monitor intruders. Indeed, most investigators cannot pursue computer intrusions without extensive support from the organizations involved. However, investigators cannot provide protection from liability claims, and these kinds of efforts may drag on for months and may take a lot of effort.

On the other hand, an organization's legal council may advise extreme caution and suggest that tracing activities be halted and an intruder shut out of the system. This, in itself, may not provide protection from liability, and may prevent investigators from identifying the perpetrator.

The balance between supporting investigative activity and limiting liability is tricky the supply chain coordinator should consider the advice of legal counsel and the damage the intruder is causing (if any) when making the decision about what to do during any particular incident.

Internal and External Communications

It is crucial during a major incident to communicate why certain actions are being taken, and how the users (or departments) are expected to behave. In particular, it should be made very clear to users what they are allowed to say (and not say) to the outside world (including other departments). For example, it would not be good for an organization if users replied to customers with something like, "I'm sorry the systems are down, we've had an intruder and we are trying to clean things up." It would be much better if they were instructed to respond with a prepared statement like, "I'm sorry our systems are unavailable, they are being maintained for better service in the future."

Communications with customers and contract partners should be handled in a sensible, but sensitive way. One can prepare for the main issues by preparing a checklist. When an incident occurs, the checklist can be used with the addition of a sentence or two for the specific circumstances of the incident.

One of the most important issues to consider is when, who, and how much to release to the general public through the press. The public relations office is trained in the type and wording of information released, and will help to assure that the image of the site is protected during and after the incident (if possible). A public relations office has the advantage that one can communicate candidly with them, and provide a buffer between the constant press attention and the need of the POC to maintain control over the incident.

If a public relations office is not available, the information released to the press can be carefully considered. If the information is sensitive, it may be advantageous to provide only minimal or overview information to the press. It is possible that any information provided to the press will be quickly reviewed by the perpetrator of the incident. Also note that misleading the press may backfire and cause more damage than releasing sensitive information.

Some guidelines to keep in mind are:
1. Provide low levels of technical detail. Detailed information about the incident may provide enough information for others to launch similar attacks on other sites, or even damage the site's ability to prosecute the guilty party once the event is over.
2. Do not speculate. Speculation of who is causing the incident or the motives are very likely to be in error and may cause an inflamed view of the incident.
3. Cooperate with law enforcement. Work with law enforcement professionals to assure that evidence is protected. If prosecution is involved, assure that the evidence collected is not divulged to the press.
4. Maintain focus on containment and recovery. Do not allow the press attention to detract from the handling of the event. It is of primary importance to contain the incident and begin recovery efforts.

Containment

The purpose of containment is to limit the extent of an attack. A part of containment is decision making (e.g., determining whether to shut a system down, disconnect from a network, monitor system or network activity, set traps, disable functions such as remote file transfer, etc.).

Sometimes this decision is trivial; shut the system down if the information is classified, sensitive, or proprietary. Removing all access while an incident is in progress obviously notifies all users, including the alleged problem users, that the administrators are aware of a problem; this may have a deleterious effect on an investigation. In some cases, it is prudent to remove all access or functionality as soon as possible, then restore normal operation in limited stages. In other cases, it is worthwhile to risk some damage to the system if keeping the system up might enable identification of an intruder.

The supply chain coordinator should define acceptable risks in dealing with an incident, and should prescribe specific actions and strategies accordingly. If features and functionality need to be shut town temporarily, there should be a notification process as well as a back-up (non-web based) process to continue normal business operations. As application functionality is implemented into the web portal, each web feature needs to address the potential for shutdown.

On-Going Activities

There are a number of steps the supply chain coordinator should implement to keep up with changes in web security. The following is a list of activities to include for continual incident tracking and handling measures:
1. Subscribe to advisories that are issued by various security incident response teams, like those of the CERT Coordination Center, and update systems against those threats that apply to the supply chain coordinator's web portal technology.
2. Monitor security patches that are produced by the vendors of equipment, software, applications, and third party affiliates, and obtain and install all that apply.
3. Actively watch the configurations of the supply chain coordinator systems to identify any changes that may have occurred, and investigate all anomalies.
4. Review all security policies and procedures annually (at a minimum).
5. Regularly check for compliance with policies and procedures. This audit should be performed by someone other than the people who define or implement the policies and procedures.

Policy Requirements

Overview

Web Portal security policies are designed to address security issues within an Internet community. The supply chain coordinator needs a guide to setting computer security policies and procedures for sites that have systems on the Internet—and may need to also address sites and systems that are not yet connected to the Internet.

The web portal team will need to make many decisions, gain agreement and then communicate and implement these security policies. The focus of this section is on the policies and procedures that need to be in place in order to support the technical security features of the ISC web portal.

The basic approach to developing a security policy plan for a web portal follows traditional protection rules for overall system security [Fites, 1989 Control and Security of Computer Information Systems]:
1. Identify what you are trying to protect
2. Determine what you are trying to protect it from
3. Determine how likely the threats are
4. Implement measures which will protect your assets in a cost-effective manner
5. Review the process continuously; make improvements each time a weakness is found Using approach, the supply chain coordinator will be able to continually identify critical assets and required policies throughout the implementation phase for both the security system, as well as future releases of functionality for the web portal.

Setting Goals for a Security Policy

The types of security-related decisions that are made, or the failure to make them, largely determine how secure or insecure the web portal will be, how much functionality the portal will offer, and how easy the portal is to use. To effectively use security tools and policies, the supply chain coordinator may determine its security goals clearly.

Trade-offs exist when defining goals, as outlined here:

Services Offered vs. Security Provided

Each service offered to users carries its own security risks. For some services the risk outweighs the benefit of the service, and the administrator may choose to eliminate the service, rather than try to secure it.

Ease of Use vs. Security

The easiest system to use would allow access to any user and require no passwords; that is, there would be no security. Requiring passwords makes the system a little less convenient, but more secure. Requiring device-generated one-time passwords (e.g. secure id tokens), makes the system even more difficult to use, but much more secure.

Cost of Security vs. Risk of Loss

There are many different costs to security: Monetary, Performance, and Ease of Use. There are also many levels of risk: Loss of Privacy, Loss of Data, and Loss of Service. Each type of cost can be weighed against each type of loss for optimization.

the supply chain coordinator goals should be communicated to all users, operations staff, and managers through a set of security rules, called a "security policy." The scope of this policy includes all types of information technology as well as the information stored and manipulated by the technology.

Purpose of a Security Policy

The main purpose of a security policy is to inform users, staff and managers of their obligatory requirements for protecting technology and information assets. The policy should specify the mechanisms through with these requirements may be met. Another purpose is to provide a baseline from which to acquire, configure and audit systems and networks for compliance with the policy. Therefore an attempt to use a set of security tools in the absence of at least an implied security policy is meaningless.

Assets and Threats

The cost of protecting oneself against a threat should be less than the cost of recovering if the threat were to strike. Cost in this context should include losses expressed in real currency, reputation, and trustworthiness. Without reasonable knowledge of what one is protecting and what the likely threats are, following this rule of cost-effectiveness may be difficult.

Figure 71:
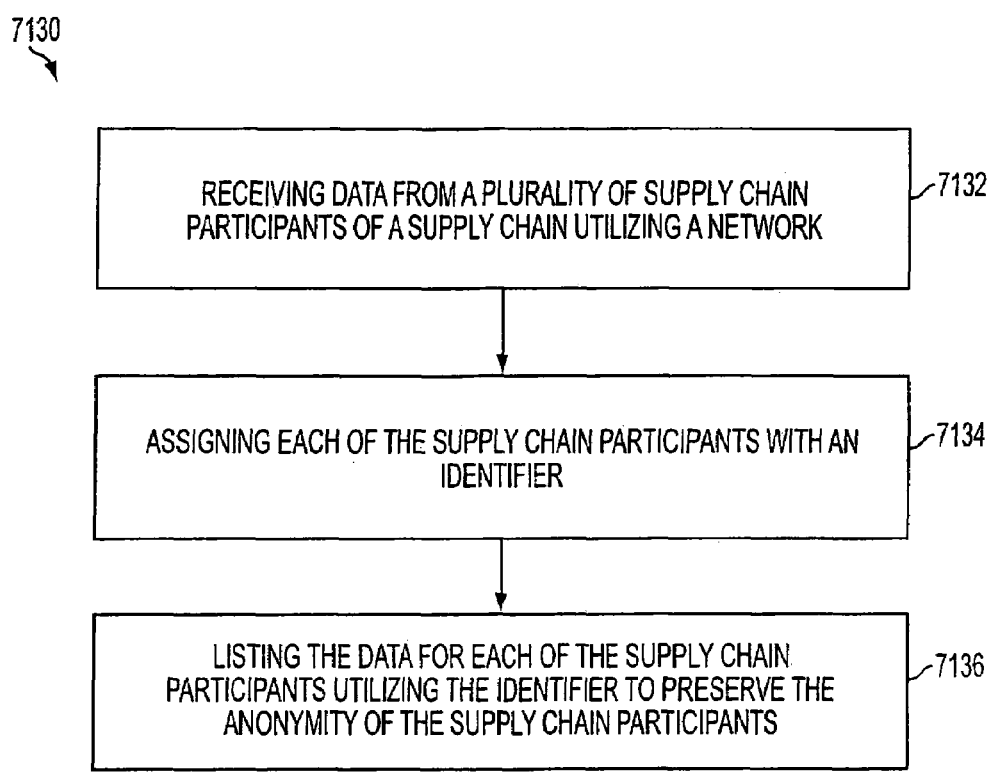
FIG. 71 is a flowchart of a process for providing a network-based supply chain interface capable of maintaining the anonymity of stores in the supply chain in accordance with an embodiment of the present invention.

It is recommended that as the supply chain coordinator designs and implements additional functionality to their ISC web portal, they examine the extent of security levels and features in relation to the value of the assets involved. There are two elements of risk analysis that one should consider:
1. Identifying the assets
2. Identifying the threats Identifying the Assets FIG. 71 is a flowchart of a process 7130 for providing a network-based supply chain interface capable of maintaining the anonymity of supply chain participants in the supply chain. Data is received via a network from a plurality of supply chain participants of a supply chain in operation 7132. Each of the supply chain participants is assigned with an identifier in operation 7134 and the data for each of the supply chain participants is listed utilizing the identifier to preserve the anonymity of the supply chain participants in operation 7136.

In an aspect, the network may include the Internet. In another aspect, the identifier may include a numeric string. In a further aspect, the identifier may indicate a region where the associated store is located. In an additional aspect, the data may be listed utilizing a network-based interface. In one aspect, the supply chain participants may include restaurants.

For each asset, the basic goals of security are availability, confidentiality, and integrity. Each threat should be examined considering how it may affect these areas. The first step for asset protection is to identify all of the things that need protection. The point is to list all things that could be affected by a security problem. Again, a traditional list for system protection is applicable in the Internet arena:

Hardware: boards, keyboards, workstations, personal computers, printers, communication lines, servers, routers Software: source programs, object programs, utilities, diagnostic programs, operating systems, communication programs Data: during execution, stored on-line, archived off-line, backups, audit logs, databases, in transit over communication media People: users, administrators, hardware maintainers Documentation: on programs, hardware, systems, local administrative procedures Supplies: paper, forms, ribbons, magnetic media The supply chain coordinator should use the preliminary goals and objectives for the ISC web portal to identify the primary assets. Existing procedures and policies for system protection is a good starting point to begin the process for asset identification.

Once identified, it is important to note the differing levels of importance for each of these categories to the users of the portal. For example, a member may hold his or her hardware assets at a higher protection value than a supplier, who may have leased assets or complete warranty and maintenance coverage. Documentation for procedures may have higher value for the administrators at the supply chain coordinator corporate, and less so at an end user level, as reliance on the accuracy of these materials falls into a very defined set of users.

Identifying the Threats

Once the assets requiring protection are identified, it may be useful to identify the threats to those assets. The threats may then be examined to determine what potential for loss exists. The following are classic threats to be considered:
1. Unauthorized access to resources and/or information
2. Unintended and/or unauthorized disclosure of information
3. Denial of service The remainder of this section will outline and identify security policies that address these types of threats for most types of assets.

Creating Policy

In order for a security policy to be appropriate and effective, it needs to have the acceptance and support of all levels of employees within an organization. The ISC web portal has the additional challenge of integrating policy acceptance from third party organizations. These outside organizations may have conflicting policies or policies that are considered substandard to the needs for the supply chain coordinator.

It is especially important that corporate management fully support the security policy process otherwise there is little chance that they will have the intended impact, no matter where the incident resides. The following list of individuals should be involved in the creation and review of security policy documents:

Site Security Administrator

Information Technology Technical Staff

Administrators of Large User Groups (e.g. Domain organizations, business divisions)

Security Incident Response Team

Representatives of the user groups affected by the security policy

Responsible management

Legal Counsel

This list is representative, but not necessarily comprehensive. The supply chain coordinator may find as it adds functionality to the web portal that additional representation may be required, especially when integrating third party or member level systems and networks. It may be helpful to bring in representation from stakeholders, management with budget and policy authority, technical staff with knowledge about what can and cannot be supported, and legal counsel that understand the legal ramifications of various policy choices.

Recommended Policies

This section will discuss the specific policy requirements for the web portal. The recommended policies are based on Internet industry standards and best practices for web portal security.

Appropriate Use Policy (AUP)

An Appropriate Use Policy (AUP) may also be part of a security policy. It should spell out what users shall and shall not do on the various components of the system, including the type of traffic allowed on the networks. The AUP should be as explicit as a possible to avoid ambiguity or misunderstanding.

Privacy Policy

Privacy of files and information stored on or within the web portal applications needs to be assured. User information that includes name, address, financial information, and other confidential information may at times need to be shared.

Sometimes during the normal course of operations, a member of the web portal support staff will have a need to view a file belonging to another user of the system. Some examples are: helping a user with an application problem which requires access to the supply chain coordinator's source program; or helping a user resolve an electronic mail problem which requires viewing part of the user's mail message file. Whenever required to view a user's file in the course of helping that user, the consent of the user can be first obtained. In all cases the client should be advised that his/her file(s) may need to be viewed/accessed to assist them.

When assisting web portal users, it is recommended that the Support Staff should use the following guidelines:

Use and disclose the users data/information only to the extent necessary to perform the work required to assist the user. Particular emphasis should be placed on restricting disclosure of the data/information to those persons who have a definite need for the data in order to perform their work in assisting the user.

Do not reproduce user's data/information unless specifically permitted by the user.

Refrain from disclosing a user's data/information to third parties unless written consent is provided by the user.

Return or deliver to the user, when requested, all data/information or copies to the user or someone they designate.

The privacy policy should define reasonable expectations of privacy regarding other issues such as monitoring of electronic mail, logging of keystrokes, as well as access to users' files.

Access Policy

Clearly defined access policies may be helpful to the success for implementing and sustaining a secured web portal. The ability to grant access rights occurs throughout the levels of security as defined by the business needs for the supply chain coordinator corporate, members, suppliers, and distributors. This complexity forces the need for an effective access policy to assure clear adherence to these business rules.

An access policy needs to define access rights and privileges to protect assets from loss or disclosure by specifying acceptable use guidelines for users, operations staff, and management. It should provide guidelines for external connections, data communications, connecting devices to a network, and adding new software to systems. It should also specify any required notification messages (e.g. connect messages should provide warnings about authorized usage and line monitoring, and not simply say "Welcome").

The web portal has identified several concerns as outlined in the voice of the customer (VOC) section earlier, and from those issues is the following recommended approach for granting, restricting, and monitoring access rights:

1. Ensure a minimum level of consistent access control for supply chain coordinator information assets.
2. Ensure protection of the supply chain coordinator information resources in a manner befitting their value and the risks to which they are exposed. It will assure that:

Access is granted proactively rather than by default

Decisions are made by appropriate persons

Decisions are implemented accurately

Access control integrity is maintained

Security violations are monitored and followed up appropriately

1. Ensure that managers of personnel who perform system/security administration functions are responsible for ensuring compliance with this standard.

Note: The Chief Security Officer should recognize that there maybe instances where compelling business need warrants use of a system that cannot comply with this standard.

It is strongly recommended that requests for exceptions must be approved by the Chief Security Officer.

The following items should be part of the overall access policy, as well as detailed in separate and distinct policy statements (see the following sections):

Authorization

Authorization refers to the process of granting privileges to processes and ultimately to users. This differs from Authentication in that authentication is the process used to identify a user (see next section). Once identified reliably, the privileges, rights, property, and permissible actions of the user are determined by authorization.

In a reasonable security system, it is impossible to explicitly list all of the authorized activities of each user with respect to all resources. The recommended approach is outlined within the section entitled Technology (below) that allows for roles and groupings to help manage and maintain the authorization levels for collections of users. The Technology section also describes how hierarchies can be implemented to provide greater flexibility for authorization, and expend authorization controls to span of data control as well as application access control.

However a solution is implemented, policies governing authorization should include the following stipulations:

Requests for access must be properly authorized BEFORE being granted

A process must be followed to ensure that the authorization is valid. In the case when security administration is done for a large number of users with many authorizers, it may be useful to maintain a list of authorized signers or signatures.

Administration

Administration of access rights should be simple and easy to maintain. Policies that specify administrative users and their access rights and privileges should be clearly defined before assigning responsibilities. Who is responsible for what types of administration activities will be the primary result of definitive access policies specifically for administrators. Certain aspects of access policy will simplify the role of the administrator, including the following items:

The user identifications should be unique within the domain for which a particular administrator is responsible. User identifications are called various names depending on the system used. Examples include: USERID, ID, LOGON ID.

New passwords should be issued by a process that ensures that they will not be disclosed to anyone other than the intended recipient. If disclosure occurs in the issuing process, the process must detect it.

Activity/Violation Review

It is important to clearly identify within the Access policy that these activities are monitored and tracked. A review process should be in place to assure that the access rights and privileges are granted appropriately. The following aspects should be addressed in the Access policy:

Security administration activity must be reviewed to verify its accuracy and appropriateness. This review must be conducted by someone other than the person whose activity is being reviewed.

Reported security violations should be reviewed daily. Records should be kept to show that the review occurred, by whom it was conducted and what action, if any, was taken.

Record Keeping

If a data processing system is used as a record keeping system, sufficient backup should be provided to allow recovery of the security activity records in case of system problems.

Records that show the person to whom an ID has been issued, the access requested, the person who authorized it, must be maintained.

Records of IDs that have been suspended and reactivated should be maintained. These Will assist in detecting users who need more training or IDs that are being used for unauthorized access attempts.

Records of terminated employees' access should be kept on hand for at least six months after termination. After that time period that information may be placed in accessible archives.

Records for security violations should be maintained onsite for a minimum of one month. These records will assist in detecting longer term trend and penetration attempts.

Records should be kept to show system/security administrator activities:

Have been reviewed

By whom the review was conducted

What action was taken to deal with any noted exception conditions

It is important to include policy and procedures for granting access as well as removing access for web portal users.

Remote Access

While Internet-based attacks get most of the media attention, most computer system break-ins occur via dial-up modems. The nature of the supply chain coordinator's membership and access requirements will in most cases use dial-up modem access. Policies and procedures to specify and monitor the method and use of dial-in access need to be stated.

There are a variety of configurations for supporting remote access via dial-up lines and other means. In general, the major security issue is authentication—making sure that only legitimate users can remotely access your system. The use of one-time passwords and hardware tokens is recommended for most companies; however, the supply chain coordinator's web portal user communities may not be able or willing to monitor these remote access devices, particularly due to high expense and difficulty to track.

Another issue is the supply chain coordinator's ability to monitor the use of remote access capabilities. The most effective approach is to centralize the modems into remote access servers or modem pools. This design enables an easier monitoring and tracking of dial-in usage.

For low level security requirements, the following dial-in policy is sufficient:

All users who access the web portal system through dial-in connections must periodically change their passwords.

However, the supply chain coordinator has set requirements that demand higher levels of security, with information sources beyond just the supply chain coordinator servers, but also at third party locations, so it may become useful to increase the dial-in protection policy statement to the following:

Direct dial-in connections to the supply chain coordinator web portal systems must be approved by the Operations Support Manager and the Chief Security Officer.

Information regarding access to company computer and communication systems, such as dial-up modem phone numbers, is considered confidential. This information must not be posted on electronic bulletin boards, listed in telephone directories, placed on business cards, or made available to third parties without the written permission of the Operations Support Manager. The Operations Support Manager will periodically scan direct dial-in lines to monitor compliance with policies and may periodically change the telephone numbers to make it more difficult for unauthorized parties to locate company communications numbers.

Additional policy statements should address encryption within any remote access policy, as suggested in the following:

All remote access to the web portal system, whether via dial-up or Internet access, must use encryption services to protect the confidentiality of the session. Supply chain coordinator approved remote access products must be used to assure interoperability for remote access server encryption technologies.

Physical Access

It may be useful for the supply chain coordinator to put into place appropriate safeguards to limit physical access to any computer or computer related device. The retailer level access has multiple opportunities for non-authorized access, and may even require physical locks or other types of security devices to prevent theft of equipment. It becomes more important to set policies in place that at a minimum attempt to secure physical access in the following ways:

Secure Locations. Mainframe, servers and other computer devices may be stored in a location that protects them from unauthorized physical access. Physical access to such equipment potentially provides access to information stored therein. Placing equipment where such access may not be easily restricted does not preclude accountability for such access.

Location Selection. Physical locations for all computer related equipment should be selected to protect against equipment and information loss by flood, fire, and other disasters, natural or man-made.

Review of New Connections to Outside Sources. Proposed access to or from a network external to the agency must be reviewed and approved by the organization head or designee prior to establishment of the connection.

Review of Installation. Installation, upgrade, changes or repairs of computer equipment and computer related devices (hardware, software, firmware) must be reviewed by the organization head for potential physical security risks.

Platform-specific Physical Security. Platform-specific physical security must be established, implemented and periodically reviewed and revised as necessary to address physical vulnerabilities of that platform.

Laptop, Notebook and Portable Computer Devices. Portable computing devices must not be left unattended at any time unless the device has been secured. When traveling, portable computers should remain with the user's carry-on hand luggage.

It is equally important to state within a physical access policy that the accountability for such access is not precluded where exceptions must be made, such as in a restaurant, where locked offices are not common. Users should remain accountable for usage regardless when reasonable attempts have been made to secure physical access to the web portal.

Accountability Policy

An Accountability Policy is needed to define the responsibilities of users, operations staff, and management. It should specify an audit capability, and provide incident handling guidelines (i.e. what to do and whom to contact if a possible intrusion is detected). The previous section outlined procedures for incident handling, and clear accountabilities should be stated in conjunction with those processes.

Authentication Policy

An Authentication Policy establishes trust through an effective password policy, and by setting guidelines for remote location authentication and the use of authentication devices (e.g. one-time passwords and the devices that generate them). Encryption may also be used to authenticate users, as it requires possessing a key to unscramble data, and this policy may apply for some of the more sensitive data exchanges provided through the web portal.

Robust Passwords

In many cases of system penetration, the intruder needs to gain access to an account on the system. One way that goal is typically accomplished is through guessing the password of a legitimate user. This attempt is often accomplished by running an automated password cracking program, utilizing a very large dictionary, against the system's password file. The only way to guard against passwords being disclosed in this manner is through the careful selection of passwords that cannot be easily guessed (i.e. combinations of numbers, letters, and punctuation characters). Passwords should also be as long as the system supports and users can tolerate.

Change Default Passwords

Many existing security systems and application programs are installed with default accounts and passwords. These should be changed immediately to something that cannot be easily guessed or cracked.

Restrict Access to the Password File

Restrict access to the password file, in particular, the security system should protect the encrypted password portion of the file so that would-be intruders do not have them available for cracking. One effective technique is to use shadow passwords where the password field of the standard file contains a dummy or false password. The file containing the legitimate passwords are protected elsewhere on the system.

Password Aging

When and how to expire passwords may become a subject of controversy among the security community. It is generally accepted that a password should not be maintained once an account is no longer in use, yet it is hotly debated whether a user should be forced to change a good password that is in active use. The opposition claims that frequent password changes lead to users writing down their passwords in visible areas (such as sticky notes on a terminal), or for users to select very simple passwords that provide very little if any protection.

Password Lock-Outs/Account Blocking

Some sites find it useful to disable accounts after a predefined number of failed attempts to authenticate. If the supply chain coordinator site uses this mechanism, it is recommended that the mechanism not "advertise" itself. After disabling, even if the correct password is presented, the message displayed should remain that of a failed login attempt. Implementing this mechanism will require legitimate users to contact their system administrator to request that their account be reactivated.

At the supply chain coordinator Member level, it may become cost prohibitive and even an operational nuisance to field the numerous calls that may result from retailer level users locking out of the system. This type of policy may need to be adjusted for effectiveness, as one risks similar issues of writing down passwords in visible locations in order to avoid accidental lock-outs.

Encryption

There will be information assets that the supply chain coordinator will want to protect from disclosure to unauthorized entities. Many existing security systems have built-in file protection mechanisms that allow an administrator to control who on the system may access or "see" the contents of a given file.

A stronger way to provide confidentiality is through encryption. Encryption is accomplished by scrambling data so that it is very difficult and time consuming for anyone other than the authorized recipients or owners to obtain the plain text. Authorized recipients and the owner of the information will possess the corresponding decryption keys that allow them to easily unscramble the text to a readable form. The supply chain coordinator should consider the extent and value of its information assets (as outlined previously) to determine the need for encryption protection.

Additionally, the use of encryption is sometimes controlled by governmental and site regulations, so the supply chain coordinator should encourage administrators to become informed of laws or policies that regulate its use before employing it. As the specific encryption needs require clearly identified data and information sources, so it is outside the scope of this document to mention various programs available for this purpose. However the recommended solutions in this document include systems that provide appropriate use of encryption.

Availability Statement

An Availability Statement sets users' expectations for the availability of resources. It should address redundancy and recovery issues, as well as specify operating hours and maintenance down-time periods. It should also include contact information for reporting system and network failures.

Information Technology System and Network Maintenance Policy

An Information Technology System and Network Maintenance Policy describes how both internal and external maintenance people are allowed to handle and access technology. One important topic to be addressed here is whether remote maintenance is allowed and how such access is controlled. Another area for consideration here is outsourcing and how it is managed.

Violations Reporting Policy

A Violations Reporting Policy indicates the types of violations that must be reported (e.g. privacy and security, internal and external), and to whom these reports are made. A non-threatening atmosphere and the possibility of anonymous reporting will result in a greater probability that a violation will be reported if it is detected.

Supporting information should provide users, staff, and management with contact information for each type of policy violation; guidelines on how to handle outside queries about a security incident, or information that may be considered confidential or proprietary; and cross-references to security procedures and related information, such as company policies and governmental laws and regulations.

Functional Requirements

Introduction

The purpose of this section is to specify the capabilities that must be available in the portal to achieve the security related CTQs.

The section will begin by defining some terms that are commonly associated with the management of security and access.

Next the portal will be viewed from the perspective of security and access management to identify the components that are associated with security and access management.

Lastly each component will be described in terms of the specific functions it must provide to effectively secure and manage portal access.

Some features that characterize the capabilities the portal must possess in order to achieve its CTQs will be used to validate each functional component. These features will include the ones that were explicitly cited in the user workshops plus some capabilities that were added after those sessions.

Definitions

This section will set a baseline for functional specification discussion by:
  Defining concepts and terms that are commonly employed to manage security and access.
  Describing each in the context of the portal and it community.
  Specifying, where applicable, how each will be used to manage security and access.

Community
  Community refers to all of the users of the portal. The security capabilities will be used manage access within the community.

Domain
  A domain is a community subset that relates to a type of user in the portal.
    The portal is comprised of the following domains:
    Members (franchisees)
    Distributors
    Suppliers
    Corporate
    An individual can belong to one or more domains.

Group
  A group relates to an organizational entity in the portal. Examples of groups are a member company or a specific supplier or distributor company.
    Groups belong to domains.
    Groups are made up of one or more data related entities.
      A retailer is an example of a data related entity.
    Groups can be enabled to create sub-groups. A member regional division that consists of several retailers is an example of a sub-group.
    The reason for having groups is to define authorization. A group specifies the data that can be accessed by the individuals that are associated with the group.

Role
  Roles relate to a set of permission within a group.
  Examples of roles are:
  Administrator
  Store manager
  Retail outlet owner
  Roles can be aligned with a corporate function (e.g. marketing) or other criteria
  Reasons for having roles is to define privilege. A role specifies the portal functions an individual can access.

User
  A user relates to an individual in the community.
    User will belong to a domain (i.e. member, supplier, distributor or supply chain coordinator).
    User must be associated with one group.
    User may or may not have a role assigned to them.
    A user's access is controlled through the group(s) to which they belong (authorization) and the role that has been assigned to them (privileges).

Hierarchy
  A hierarchy is a tree structure that maps to a specific domain entity's organization (e.g. member ABC).
    Hierarchies can apply to groups and/or users.
    Group hierarchies are used to further refine authorization.
      View data from any point downwards
      Restrict at intermediate levels below the top group level.
    User hierarchies can be used to delegate permissions or to create users owned by other users (e.g. the relation ship of a district manager to the retailer managers that report to him/her).

Components

Figure 72:
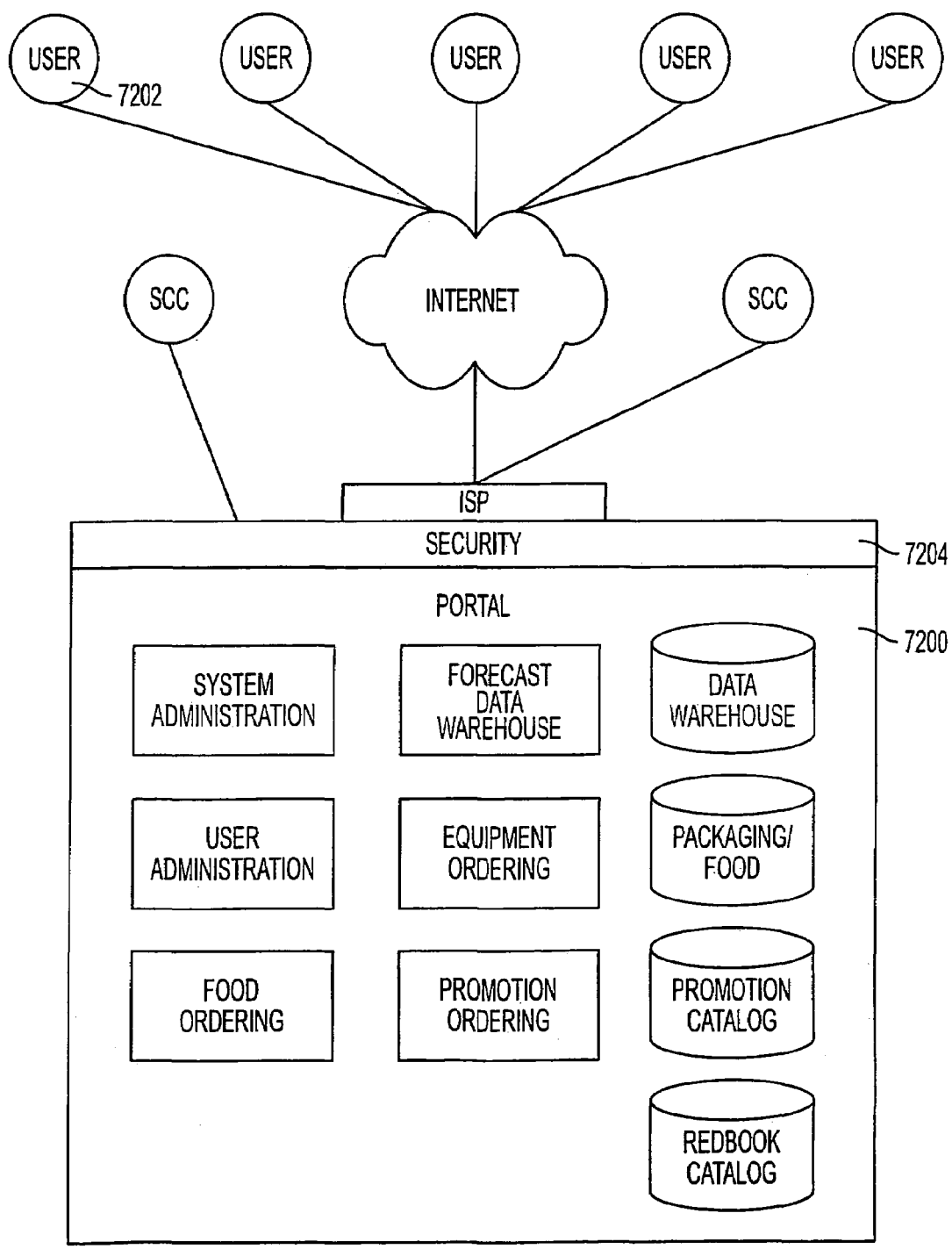
FIG. 72 shows several applications for the web portal.

FIG. 72 shows several applications for the portal 7200. Users (members, suppliers and distributors) 7202 will access the portal via the Internet. Depending on the portal hosting arrangements, users may access the portal via their internal LAN or through the Internet. Access to the portal and its application will be controlled by the security component 7204. The security component will be managed by the supply chain coordinator and user administrators who have been designated by the supply chain coordinator.

Figure 73:
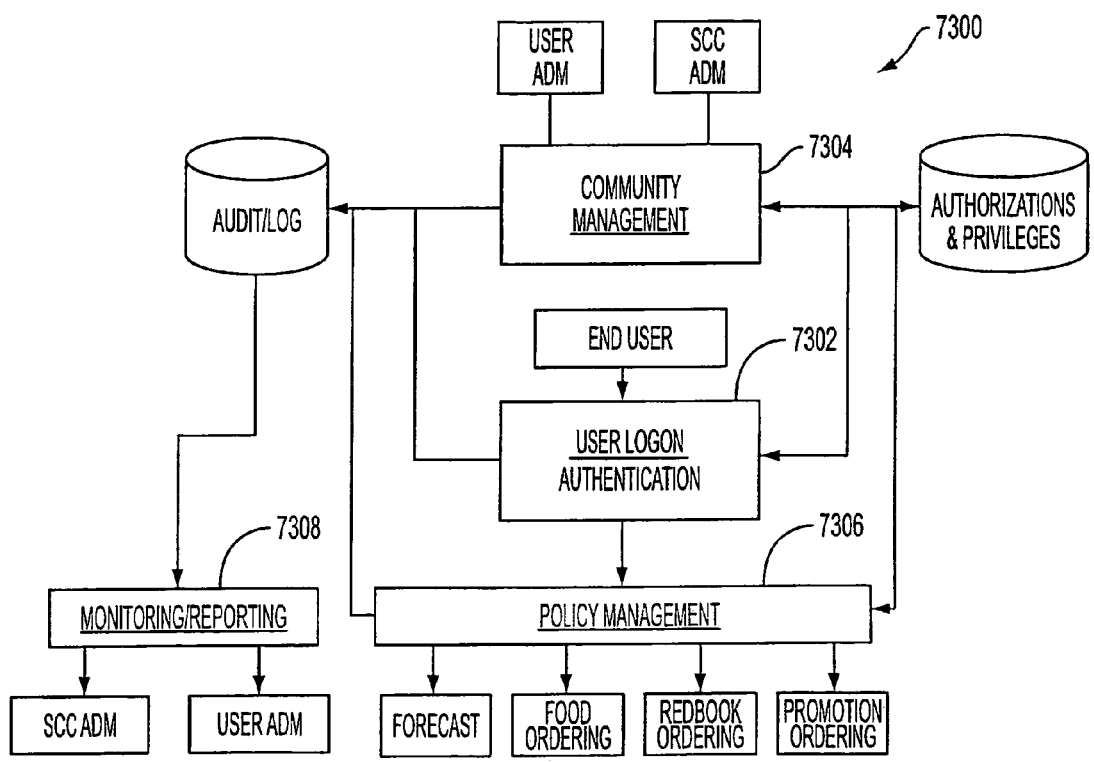
FIG. 73 shows an expanded view of the portal from a security and access control perspective.

FIG. 73 shows an expanded view of the portal 7300 from a security and access control perspective. The role of each component shown is briefly described.

User Logon 7302

The user logon component verifies that a user is authorized to access to the portal.

Community Management 7304

The community management component allows administrators to manage the users in their span of control within the portal. Specifically they can add, change and delete users and they can control what users can view and what functions they can perform.

Policy Management 7306

The policy management component uses the user authorizations and privileges to verify that a user is authorized to perform a requested function.

Reporting 7308

The reporting component provides the administrators with user and activity information that is suitable for managing security and access.

Functions

The purpose of this section is to specify the functions that may be useful for delivering the features for achieving the portal's security related CTQ.

The following factors can be considered in specifying the functions:

- The security features that were identified by the members, supplier and distributors in their workshop sessions. These are the characteristics of the portal that must be present in order to meet their CTQs.
- Additional features that were identified in follow-up review sessions with supply chain coordinator personnel. These are more subtle features that emerged during technical, organizational and authorization discussions.
- Best practices that are frequently employed in system security and access management.

Each functional component will first be described in terms of purpose and general approach. Then details will be provided for each function to specify the capabilities that must be present.

Assuming that the supply chain coordinator desires to use existing 3$^{rd}$ party software as much as possible, the traditional approach of specifying inputs, processing and outputs for each function will not be strictly followed here. Rather, the emphasis will be placed on clearly describing the fall set of capabilities that will be required to deliver the features needed to meet the CTQs. The details associated with the specifics of inputs, forms, detailed processing and outputs will vary by vendor and the vendor's approach to providing the necessary capabilities. It will be the job of the vendors to provide these details so that the supply chain coordinator can use them to determine the best approach for their requirements.

Logon (Authentication)

Function Purpose

The logon function represents the first line of security and it validates that a user is authorized to access the portal.

Function Details

The authentication process begins when a user connects to the portal. At that time they will be prompted for:

Company ID
User ID
Password

The user will enter the requested data and it will be encrypted prior to sending it to the portal logon function. Additionally the password field will be masked when the user enters it (i.e. it won't print on the screen when the user enters it).

Once the user has submitted the information, the logon function will check the portal access control list to determine if access is permitted to the companyID/userID/password combination that the user submitted.

Users failing to enter a valid companyID/userID/password combination will be notified of the failure and re-prompted. A userID will be locked out after n failures.

The logon function will provide the following password management capabilities:

- Password disablement after an administrator specified period of inactivity.
- New user must provide a new password the first time they logon to the portal.
- Passwords will expire after an administrator specified period of time and the user will be required to provide a new one.
- Alternate passwords will be provided for lost/forgotten password situations.
- New passwords will be subjected to minimum security password validation rules. These will include things like minimum/maximum length, percent of characters that must differ, uniqueness, etc.

Once a user has been successfully authenticated the system will:

- Offer an option to the user to change their password
- Show the date and time the user last sign on to the system (detect stolen user ID and password).
- Retrieve the user's profile data that defines what data and functions the user can access and transfer to the policy management function (i.e. portal main menu).

All details associated with the logon session will be written to the audit log. The system administrator will be notified of user ID lockout. The following table lists User Specified Features.

TABLE 9

| Feature | CTQ Category | Explanation |
| --- | --- | --- |
| Lockout user after n unsuccessful logon attempts | Security, Prevention | |
| Notify administrator of lockouts | Security, Prevention | This is a proactive notification that occurs via email, pager, etc. when the attempt occurs |
| On line monitoring | Security, Prevention | This includes administrator notification of lockout and could be expanded to include other threats or situations. |
| Provide alternate passwords for lost/forgotten password situations | Flexibility | |
| Password expiration; require periodic password changes | Security, Prevention | |
| Acceptable password length parameters | Security | |

TABLE 9-continued

| Feature | CTQ Category | Explanation |
|---|---|---|
| Ability to assign/select password | Security | User can specify their password and change it any time. |
| Ability to transfer logon intelligence. | Simplicity | The ability to transfer the user profile information that specifies what data and applications they can access is helpful for supporting a single sign on capability for the portal. |
| Record all activities to the audit log | Security, Prevention, Reporting | This was not an explicitly stated feature. However, it will be required to support the reporting features that were requested by the users. |

Community Management

The community management capability allows administrators to manage the user activities within the portal. Specifically it provides the capabilities to add, change and delete users, and to manage what the user can see and what functions they can perform.

Community management can be covered in four sections:

Community/Domain Wide Administration
 Describes the supply chain coordinator system wide administrative capabilities that will be required to establish the community and the entities that make it up (i.e. members, suppliers, distributors and supply chain coordinator).

Basic Delegated Community Management
 Describes the capabilities that will be needed to achieve the CTQs. Many of the capabilities that are found in this basic model can be accommodated by $3^{rd}$ party software. Some custom programming will likely be required to manage authorization within the complex organizational structures found at the supply chain coordinator.

Group Hierarchical Management
 Describes the use of hierarchies to manage access. This will achieve many of the simplicity and flexibility related CTQs that were not meet by the basic model. It will likely require custom development.

Data Publication
 Describes a capability that is need to support situations such as joint ownership of stores and corporate board committees. It will enable the owner of a group to permit user in other groups to access data in the owner's group. This will be largely custom development.

Community/Domain Wide Administration

Function Purpose

There are certain capabilities that affect the entire community or all of the occupants of a domain (members, suppliers, distributors and supply chain coordinator). These are limited to a single system wide administrator and potentially to domain administrators.

Function Details

Community and domain wide administration will include the following capabilities:
 Community wide administration
  Add/change or delete a domain.
  Delegate domain administration to a domain administrator.
 Domain Administration
 Domains are comprised of organizations (e.g. members). Organizations are made up of data related entities (retailers, distribution center, plants, etc.). The domain administrator needs the following capabilities to create and manage organizations that make up their domain.
  Add, change and delete data related entities (e.g. retailers).
  Link data related entities together (e.g. retailers) into an organization (e.g. member).
  Create an organization administrator and delegate the administration of their organization to them.

Basic Delegated Community Management

Function Purpose

The purpose of community management is to provide a sub administrator with the ability to control what their users can view and what tasks they can perform.

An administrator who has been granted administrative privileges for the sub domain that represents their organization performs community management (e.g. a member's retail outlets make up the member's sub domain).

The basic model provides the administrator with tools that are used to manage a user's access (view and tasks). These tools include:
 Groups to specify span of control.
 Privileges to specify tasks.
 Roles to specify a set of privileges that are associated with a function (e.g. retail outlet manager).

Community management then provides the administrator with the ability to add, change and delete users.

Lastly it enables the administrator to control user's view and access rights by associating them with a group of data related entities (e.g. retailer) to specify what the user can see and with a role or specific privileges to specify what tasks the user can perform.

Figure 74:
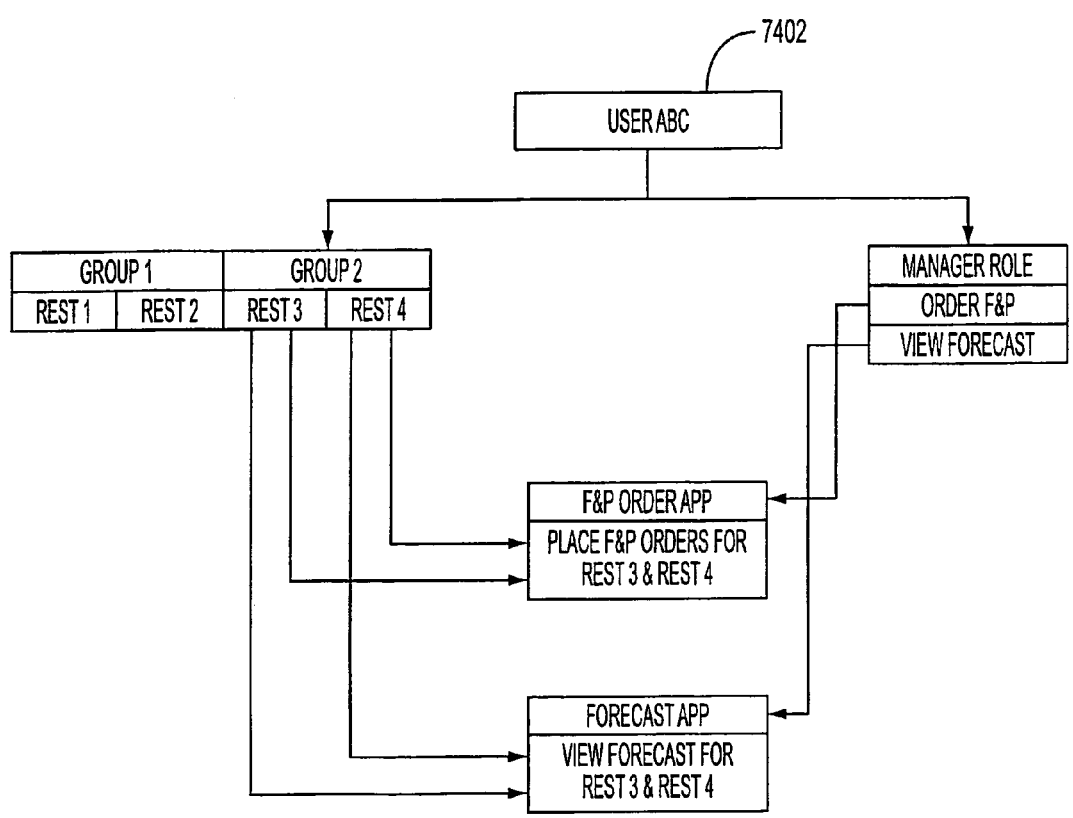
FIG. 74 is a flow diagram showing how group and roles manage access.

FIG. 74 is a flow diagram showing how group and roles manage access. User ABC 7402 is associated with Group 2 and is assign a manager role. This entitles ABC to order F and P and view forecasts for retail outlets 1 and 2.

Function Details

Functional details will be covered in the context of groups, roles and users.

Group Management

As stated earlier, a group is an organizational entity that is made up of one or more data related entities. The retail outlets owned by a franchisee comprise a member group. Groups serve to specify a user's span of control when they are associated with a user.

An administrator who has been authorized to manage groups can create new groups, and change and delete existing groups.

New groups:
 Requires an ID that is unique in the administrator's span of control.
 Requires a descriptive name.
 Entities (e.g. retailers) that are placed in the new group must exist within the administrator's span of control.

In order to change or delete a group, it must exist in the administrator's span of control. Entities being added to an existing group (change) must exist in the administrators span of control.

Role Management

A role is a functional entity that is made up of tasks the function is permitted to perform. A restaurant manager is a role that is permitted (i.e. given a privilege) to perform the tasks of ordering food and packaging, and viewing forecasts.

An administrator who has been authorized to manage roles can create new roles, and change and delete existing ones.

An administrator must possess any privilege they assign to a role.

New roles:

Requires an ID that is unique in the administrators span of control.

Requires a descriptive name

In order to change or delete a role, it must exist in the administrator's span of control.

Privileges can be specified as default or optional when they are assigned to a role. Default privileges are automatically given to a user when they are assigned to a role. The administrator must explicitly specify each optional privilege (yes/no) for a user when they are assigned a role.

A role may be assigned to a group as well as to a user. When it is associated with a group, users receive the privileges specified by the role when they are associated with the group.

User Management

A user is an individual who is authorized to perform some set of tasks on behalf of a group (e.g. a set of retail outlets).

An administrator who has been authorized to manage users can create new users, and change and delete existing ones.

A company ID, a user ID and a password identify a user. The administrator cannot view the user password.

New users:

Require a user ID that is unique in the sub domain (e.g. unique within a member organization).

Require an email address.

Require a descriptive information such as name and address name.

The system will assign the password to a new user and inform them of it via email.

User span of control:

The administrator specifies a user's span of control by associating the user with a group(s) that represent the desired span of control.

The administrator can associate (add) and disassociate (remove) users with groups.

In order modify a user's span of control, the user must exist within the administrator's span of control.

In order associate a user with a group, the group must exist within the administrator's span of control.

User/group application access:

The administrator specifies the application a user/group can perform by assigning roles/privileges to the user/group.

The administrator can add and remove roles/privileges from users/groups.

In order assign a role to a user/group, the role must exist within the administrator's span of control.

In order modify a user roles/privileges, the user must exist within the administrator's span of control.

An administrator must possess any privilege they assign to a user/group.

If a role is being assigned to a user/group, and if the role has optional privileges, the administrator will be shown the optional privileges and allowed to remove ones that they don't want to grant to the user.

Other

All details associated with community management activities will be written to the audit log.

A capability to link community management with the supply chain coordinator's member management system is required to eliminate duplicate data entry and keep the two systems synchronized.

A batch bulk load capability is required to enable user to export data from existing systems to set up their organization in the portal community.

TABLE 10

| Feature | CTQ Category | Explanation |
| --- | --- | --- |
| Distributed community administration | Flexibility | Users need to be able to manage their users and their access within the portal. They don't want to be dependent on the supply chain coordinator. |
| Ability to add, change and delete users. | Security, Flexibility | |
| Ability to assign access to users | Security, Flexibility | Specify span of control and privileges |
| Ability to create roles or level of users | Simplicity, Flexibility | |
| Ability to set up default levels of access | Simplicity, Flexibility | |
| Ability to clone and/or access rights | Simplicity, Flexibility | |
| Mass delete of users | Simplicity, Flexibility | Not provided as a part of community management. |
| Ability to copy a user ID | Simplicity, Flexibility | Provide to extent that a user's access attributes can be easily specified through groups and roles |
| Ability to export user load information from member backend. | Cost | Large member would like to use existing data to establish/maintain their organization in the portal. |
| User can be associated with multiple groups. | Flexibility | District manager A is a backup for district manager B. As a result, A will need to perform ordering district A and B and will need to be associated with both groups. Feature will also be required to support organizations such as finance who will need to view the data of several groups. |

Hierarchy

Function Purpose

The basic community model that was outlined in the previous section supported authorization and access management for a flat single level organization. Although this can be adapted to support a multi-level organization, it falls short on the CTQs related to simplicity and flexibility. Specifically, the administrator must create groups to correspond to each span of control. This results in a single entity having to be included in several groups. For example, a single retailer may be included in a district, region and a corporate group. Administration in a scenario like this is complex and labor intensive. It becomes particularly cumbersome and error prone because things like an organization change (e.g. new retail outlet) requires the modification of several groups (i.e. add it to district, region and corporate group).

A hierarchy provides a superior way to manage span of control and access. The hierarchy defines a company's organization. A user's span of control is set by associating them to the node of the hierarchy that corresponds to their position in the company. This association authorizes them to view the data associated with any entity that belong to the node to which they are assigned. In the case of a new retail outlet, assigning it to a manager also places it in the span of control of the manager's district and region mangers and the corporate CEO.

Hierarchies can also simplify the specification of user privileges by associating them to a hierarchy.

Although hierarchies introduce technical complexity, they greatly simplify administration in large and complex organizations.

The following outlines the requirement details associated with hierarchies.

Function Details

A hierarchy is made up of nodes where a node represents a business function (e.g. retail outlet manager, district manager, etc.). The bottom nodes of a hierarchy are associated with a data related entity (e.g. retail outlet is associated with a manager node/function). They are then grouped under nodes at successively higher levels (e.g. districts, regions, etc.). The top of the hierarchy is a single node (e.g. corporate). In a hierarchy an entity (e.g. retail outlet) will appear in the span of control of each successive parent node.

The following administrative capabilities are required to manage authorization and access with hierarchies.

Hierarchy Management
  Add a node
  Specify a parent node in a hierarchy and add a node beneath it.
  Delete a node
  Specify a node in a hierarchy and delete it. This also results in the deletion of any dependent nodes reporting to the node that was deleted.
  Move a node
  Specify a node in a hierarchy and move it and its dependents to another node (drag and drop).
  Associate a data entity with a node
  Specify a node in a hierarchy and associate a data related entity to it (e.g. retailer) with it. In this situation, no nodes can exist beneath the node specified. Also the data related entity must exist in the administrator's span of control.
  Disassociate a data entity with a node
  Specify a data related entity in a hierarchy structure and delete it from it parent node.
  Move a data entity from one node to another
  Specify a data related entity in a hierarchy structure and move it from its present parent node to a new parent node (drag and drop).

User Span of Control Management

Span of control relates to the data a user can view. Under a hierarchy, associating a user to a node in a hierarchy specifies their span of control. This association entitles the user to view the data associated with any entity that is found in the user's node group.

User Access Management

Access management relates to the functions a user can perform. It is controlled by privileges and roles that are assigned to a user (groups of privileges). Under a hierarchy, roles and privileges can be associated to a node. Any user who is then associated to the node receives the privileges that accompany it. See the table below.

TABLE 11

| Feature | CTQ Category | Explanation |
| --- | --- | --- |
| Ability to publish rights and privileges across hierarchies. | Simplicity, Flexibility | |
| Ability to authorize multiple levels of a hierarchy | Simplicity, Flexibility | |
| Ability to manage access against hierarchies | Simplicity, Flexibility | |
| Flexible data access and management. | Simplicity, Flexibility | |

Data Publication

Function Purpose

Portal data (e.g. a retailer) is owned by one and only one sub domain entity (e.g. member). The ability to view and process that data is restricted to users and groups who inhabit the entity's sub domain and who have been authorized to do so by its administrator.

However, there are several business situations where an organization needs to view and process data that is owned by another organization that may or may not belong to the same domain. Some common examples are:
  Two members share ownership of a retailer. As a result both members need to view information about the jointly held retail outlets and order supplies for them.
  Members belong to the supply chain coordinator board or corporate committees.

In order to participate in these roles the members need to view and potentially access data in the supply chain coordinator's domain.

The data publication capability is a mechanism for the owners (e.g. member A) of an entity (e.g. retailer 123) to permit a users in another organization (e.g. member B) to view and access the entity's (i.e. retailer 123) data.

Function Details

Data publication is an administrative privilege. It is used by a data owner's administrator to setup a relationship with another party in the portal that will allow that party to view and access data entities (e.g. retailers) that are found the owner's sub domain.

The data publication function will possess the following capabilities.
  The administrator can add, change or delete a data publication relationship.
  Any data entity that is published must exist in the administrator span of control.
  The following elements will be provided to specify a data publication relationship.
    The span of control (view) that is associated with a data publication. The span of control may be specified as an individual entity (e.g. a retailer), a group (e.g. a district) or a hierarchical node (if a hierarchy feature is provided).
    Privileges or functions the receiver can perform with the published data.
    The domain (i.e. member, supplier, distributor, supply chain coordinator) and sub-domain ID (company ID) of the organization to which the data is being published.
    The group or node ID in the receiving organization that the published data will be associated with.
    The user ID of the person in the receiving organization who will own the data. This person will control the user views and access (privileges) associated with the published data in their organization.

All details associated with creating or modifying a data publication relationship will be written to the audit log. The following table sets forth User Specified Features:

TABLE 12

| Feature | CTQ Category | Explanation |
| --- | --- | --- |
| User can view or access data in another sub-domain in their domain. | Simplicity Flexibility | Joint ownership of retail outlets by distinct members. |
| User can view or access data in different domain. | Simplicity Flexibility | Support board of directors and committees that require members to view and access supply chain coordinator corporate data. |

Policy Enforcement

Function Purpose

The policy enforcement function is a centralized capability that manages access to all of the applications that comprise the portal.

Policies specify the access requirements for each application that makes up the portal. The policy enforcement function determines if a requesting user meets the access requirements for an application. The user is granted access by the policy enforcement function if they meet they requirements specified by the policy.

Function Details

A central administrative capability is required to maintain the policies that are used to manage access to the portal's applications.

The details associated with policy enforcement are as follows:

When a user successfully logs on to the system by providing a valid user ID and password, their span of control and application privileges are retrieved.

The user is presented with main menu for the portal.

The user requests a function from the menu.

The policy enforcement function retrieves the access policies for the requested application from the central policy repository.

The user's span of control and application privileges are evaluated against the application's policies.

If the user satisfies the requirements specified by the policy, access is granted.

If the user does not satisfy the requirements specified by the policy, access is denied.

Details associated with an access request are recorded in the central audit log.

The policy enforcement function is responsible for interfacing with the portal applications and passing them information about the user that they require.

The following table sets forth User Specified Features.

TABLE 13

| Feature | CTQ Category | Explanation |
| --- | --- | --- |
| Single sign on | Simplicity | After signing on to the portal, the user can access all applications that make up the portal. |

TABLE 13-continued

| Feature | CTQ Category | Explanation |
| --- | --- | --- |
| Ability to integrate with affiliates (i.e. other $3^{rd}$ applications that make up the portal). | Simplicity Integration Cost | Provide the affiliate application with the user information it requires to function. Prevent redundant data entry, redundant security, etc. |
| Ability to interface with other applications: supply chain coordinator $3^{rd}$ party Remote hosts Platform independent | Simplicity Integration Cost | The supply chain coordinator wants to use $3^{rd}$ parties and application service providers (ASPs) for their portal applications. The policy enforcement manager must be capable of interfacing with a variety of platforms in a variety of situations. |
| Centralized policy management | Simplicity Integration Cost | Don't want redundant application access permission management. |

Reporting

Function Purpose

The portal must provide its administrators with two forms of reporting:
Community management reports.
An event reporting capabilities that provides the administrator with the data and tools for researching issues, problems, potential breaches, etc.

Functional Details

The functional details of reporting will be covered from the perspective of report type.

Community Management Reports

Community management reports provide administrators with the information they need to manage their users, groups, roles and hierarchies (if implemented).
Reports will likely include:
User information report showing things such as:
Basic user information (name, address, telephone number, etc.)
User span of control
Roles/privileges
Usage data (date of last logon, number of logon, total logon time, average logon time, etc.)
User lockout
Group reports showing thing such as:
The entities (e.g. retailers) that make up a group.
Role associated with a group.
Users associated with a group.
Role reports showing things such as:
Default and optional privileges associated with each role.
Groups associated with each role.
Users assigned to each role.
Users assigned to each available privilege.
Report content will be limited by the administrator's span of control.

Query and filter capabilities will be required to specify report type and content (e.g. a specific group, a range of users, all roles, user usage details for date range, etc.).

Event Reporting

An event is a system activity that is written to the audit log. Examples of events include connection to the portal, logon attempt, application access requests, add a new user, system errors, etc. Information will accompany an events that identifies it, identifies the user that initiated it, the date and time the event was initiated, status (success/failure), etc.

Events are recorded so that the details associated with them are available to research problems, security breach attempts, etc.

An alert capability is required to specify administrator notification (email, page, etc.) in the case of certain events (e.g. attempted breach, a portal application is unavailable, etc.).

Because event reports from the audit log are run in response to problems or issues, good filtering capabilities will be required to eliminate unneeded data and provide the administrator with only the information they are seeking. Filters should include user(s), event, and date and time.

The following table sets forth User Specified Features.

TABLE 14

| Feature | CTQ Category | Explanation |
| --- | --- | --- |
| The following community management reports were identified: Master user list Click and view access list User with published data authorization (i.e. users in other domains or sub-domains. Usage reports | Security Reporting Prevention | |
| Lockout notification | Security | |
| Online monitoring capability | Security Reporting Prevention | |
| View audit log | Security Reporting Prevention | |
| Parameter driven reports | Simplicity | |

Technology

Component and Actor Definition of the Supply Chain Coordinator Web Portal

As detailed in the previous section, the supply chain coordinator's portal may allow access to supply chain applications. The nature of the applications require a feature and function set; this engagement collected CTQs and functions from the community and organized them along categories.

This section places a slightly different view of requirements on the portal. There may be a public site and a private site (secured access); there may also be applications behind the portal provided by $3^{rd}$ party application service providers that fall under the private site. There may be administration pages to setup authentication and authorization policies. It is also a requirement that the portal support communications between the supply chain coordinator and the community and between community members.

System View Components

Some functional components that may comprise the Portal:

PVC: Public View Component

SVC: Secure View Component

AC: Administrative Component

CUC: Contact Us Component

A more detailed description of each of these components is stated in the following sections.

Public View Component

The Public View Component describes the functionality that is available to users of the public web pages on the supply chain coordinator portal.

Secure View Component

The Secure View Component describes the functionality that is available to users once they have logged onto the private pages of the supply chain coordinator portal. The private pages include access to the Applications and other functionality.

Administrative Component

The Administrative Component describes the functionality that allows users to access administrative links available to Company Administrators and individual Users. Additionally, the component contains information required for users to log on and request passwords.

Contact Us Component

The Contact Us Component describes the functionality and information that is available to users on both the public and private pages of the supply chain coordinator. This information consists of service-related questions and other areas of concern for community members.

Actor Definition

An actor is a user that plays a role with respect to the system. It is someone or something outside the application that interacts with the supply chain coordinator portal. The defined use cases and their definitions are specified below.

The systems 'Actors' are the different types of people involved in the business process. Earlier, several types of users are defined for each customer type (supply chain coordinator member, supply chain coordinator, supplier, distributor, retail outlet manager). While those are separate organizations, the actors in each share qualities at this high level of definition. The actors for the supply chain coordinator exchange portal are:

Company Administrator (Tier 1 Registered User; Access to public and private pages)

Exchange User (Tier 2 Registered User; Access to public and private pages)

Non-Registered User (Tier 3; Access to public pages only)

Content Manager (CM, Internal GXS/RM User who has permissions to submit updated content; Access to public and private pages)

Internal Administrator (Internal GXS/RM User who has permissions to run reports validate the registration status of potential customers; Access to public and private pages)

Actor Details

Company Administrator; (Tier 1 Registered User; Access to Public and Private Pages)

Description: A Registered User (Tier 1) is a registered community member who has Company Administrator responsibilities for their account.

Computer skills: Computer skill can vary, but a general knowledge of the Web is assumed.

Business Knowledge: Knowledge of products and services related to the supply chain coordinator suite of applications. This User may be responsible for setting up roles/responsibilities/permissions for Tier 2 Users in the account and company.

Exchange Level User; (Tier 2 Registered User; Access to Public and Private Pages)

Description: A Registered User (Tier 2) is a registered user who has the second level of privileges. Tier 2 Users may use applications for which they are registered, but they may not sign up for additional applications without approval from their Tier 1 User.

Computer Skills: Computer skill can vary, but a general knowledge of the Web is assumed.

Business Knowledge: Knowledge of products and services related to a solutions suite of applications.

Non-Registered User; (Tier 3; Access to Public Pages only)

Description: A Non-Registered User (Tier 3) has access to the public pages of the supply chain coordinator. They may be able to register via their company administrator, (if the company has registered) or they may be able to register via the automated registration process (an option described in the upcoming sections). Until they are registered, Tier 3 users may not have any level of access to the private pages of the supply chain coordinator.

Computer Skills: Computer skill can vary, but a general knowledge of the Web is assumed.

Business Knowledge: Knowledge of products and services related to the solutions suite of applications.

Content Manager

Description: A CM is a Content Manager who has been authorized to add/update content to the portal, pertaining to the particular products they own.

Computer skills: Computer skill can vary, but a general knowledge of the Web is assumed.

Business Knowledge: Knowledge of products and services related to the solutions suite of applications.

Internal Administrator

Description: An Internal Administrator is a registered user who has been authorized to access certain report generation functionality on the private pages of the supply chain coordinator. They may be the only users allowed to view certain links related to report generation (Similar to Content Managers and the Upload Content Link).

Computer skills: Computer skill can vary, but a general knowledge of the Web is assumed.

Business Knowledge: Should be at the RailMarketplace.com, Inc. or GXS executive or marketing level, interested in site usage and feedback for further enhancements.

Portal Components and Requirement Index

The following section is an attempt to outline the requirements expressed by stakeholders/subject matter experts (SMEs) associated with the supply chain coordinator portal. These requirements revolve around the feature/function lists collected in meetings with the supply chain community as addressed in the previous sections. This list should be considered proposed at this point and based on GE's interpretation of the features collected. IT may be finalized through prioritization and solution decisions. It may be further refined by the design process that the organization chosen to deliver this solution must complete during implementation.

A listing of these component areas along with their index key is provided below. Table 15 provides a listing of functional requirements so that they can be easily found.

TABLE 15

| Req. ID | Requirement Name | Included in Approach |
|---|---|---|
| Public View Component | | |
| UC-PVC.01 | View Public Site | |
| UC-PVC.02 | View supply chain coordinator press releases | |
| UC-PVC.03 | View Service Info | |
| UC-PVC.04 | View Media Coverage/Latest News | |
| UC-PVC.05 | Request to Register | |
| UC-PVC.06 | View Legal Pages (Extends from PVC.06) | |
| UC-PVC.07 | View About Us | |
| UC-PVC.08 | View Site Map | |
| UC-PVC.09 | View FAQ's | |
| UC-PVC.10 | Submit Feedback | |
| Secure View Component | | |
| UC-SVC.01 | View Secure Welcome Page | |
| UC-SVC.02 | Select Application | |
| UC-SVC.03 | Launch Application | |
| UC-SVC.04 | View Application Request Form | |
| UC-SVC.05 | Submit Application Request Form | |
| UC-SVC.07 | View "Community Directory" | |
| UC-SVC.08 | Search "Community Directory" | |
| UC-SVC.09 | Community Directory- New User Listing | |
| UC-SVC.10 | Submit Feedback | |
| UC-SVC.11 | Submit User Survey | |
| UC-SVC.12 | Register for Training | |
| UC-SVC.13 | Quit Private Pages | |
| UC-SVC.14 | View Press Releases | |
| UC-SVC.15 | View Service Info | |
| UC-SVC.16 | View Media Coverage/Latest News | |
| UC-SVC.17 | View Site Map | |
| UC-SVC.18 | View FAQ's | |
| Administrative Component | | |
| UC-AC.01 | Login | |
| UC-AC.02 | Submit "Password" Reminder Request | |
| UC-AC.03 | Re-set Password | |
| UC-AC.04 | Submit "Administration" Change Request | |
| UC-AC.05 | Add Content | |
| UC-AC.06 | Submit "User Information" Change Request | |
| UC-AC.07 | Generate User Report | |
| UC-AC.08 | Generate Site Activity Report | |
| UC-AC.09 | Clone User | |
| UC-AC.10 | Mass Delete of Users | |
| UC-AC.11 | Create and Manage Hierarchies | |
| UC-AC.12 | Manages Access Rights Relative to Hierarchies | |
| UC-AC.13 | Grant Privilege to Another User | |
| UC-AC.14 | View Master User List | |
| UC-AC.15 | View Access List | |
| UC-AC.16 | View Users Who Can Access My Company's Data | |
| Contact Support Component | | |
| UC-CUC.01 | Submit Tech Support Feedback | |
| UC-CUC.02 | View Tech Support Main Page | |
| UC-CUC.02 | Access Email ASP | |
| UC-CUC.04 | Submit Press Analyst Questions | |
| UC-CUC.05 | View Business Development | |
| UC-CUC.06 | Submit Billing Questions | |
| UC-CUC.07 | Submit Accounts Payable Questions | |
| UC-CUC.08 | Verify Account Information | |
| UC-CUC.09 | Submit "Other" Questions | |

Index Key
PVC: Public View Component
SVC: Secure View Component
AC: Administrative Component
CUC: Contact Us Component Technology Options Now that the features have been defined and categorized, and the portal components and actors are known, technology must be selected to address high priority items such as integrating affiliate sites, central policy management, and distributed user administration. Considerations for this selection may include the following IT strategy drivers:

Integrating Existing and New Security Systems
- Integrating existing applications with new Web-based applications
- Providing a seamless integration between portal and affiliate sites
- Delegated and single-point administration
- Centralized security management
- Scalability of the integrated security systems This list of general drivers matches up well to the feature list as collected:
- Distributed User Administration
- Administrative Audit Trail
- Access Management
- Logon/Password Management
- Reporting
- Policy Enforcement
- Data Management Security is a major concern, as web sites may contain proprietary business information such as news, data/information, and procurement systems. Without adequate security, opportunities are presented for inappropriate dissemination of proprietary information, sabotage, and other mischievous acts.

Comprehensive Security for the supply chain community breaks down into three areas: Web, Network, and Security. Each of the features extends across all three areas, as the following chart illustrates.

Figure 75:
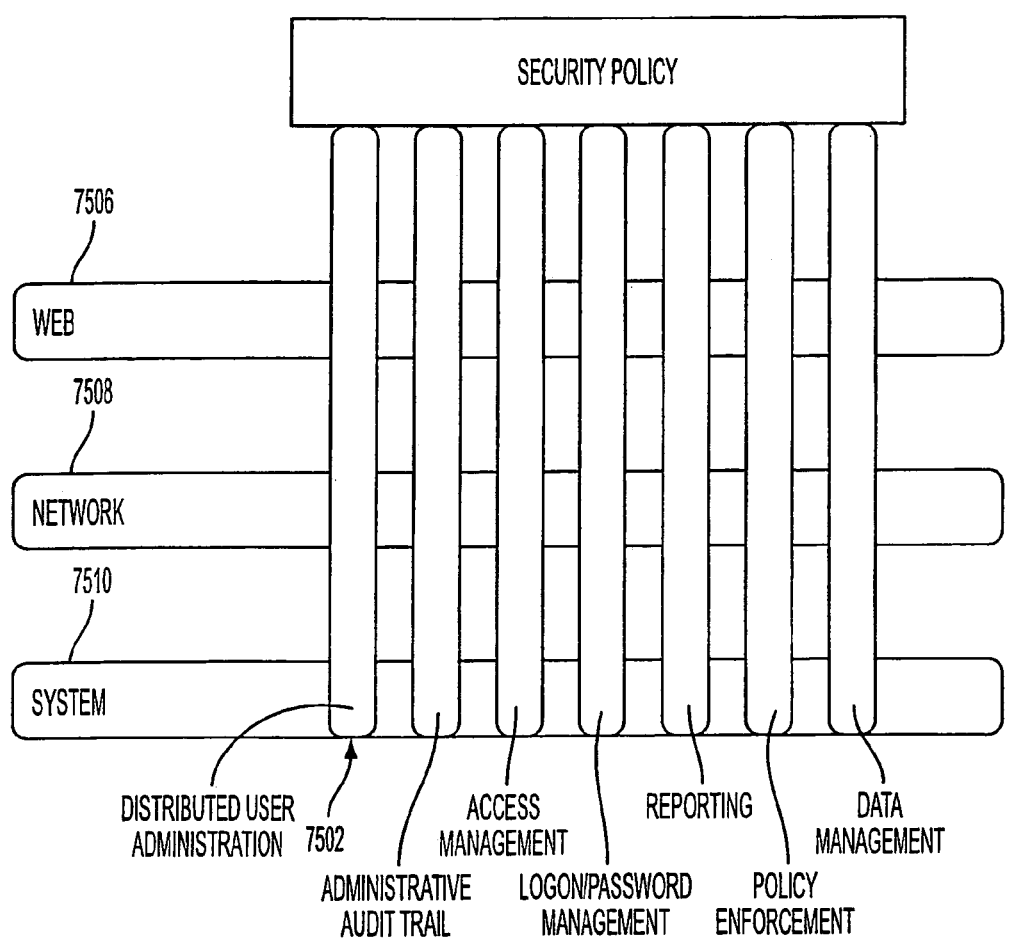
FIG. 75 is a schematic illustrating features and functions across web, network and system areas.

FIG. 75 is a schematic illustrating features 7502 and functions 7504 across web 7506, network 7508 and system areas 7510. Each area is very important to a strong security policy that may allow the supply chain coordinator to operate in a real-time integrated supply chain mode, but community management at the web layer was the main focus of this engagement and where most of the options and decisions need to be made.

Technically, from the web portal view, there are two main approaches to meeting the CTQs of the supply chain communities. The first option is for the supply chain coordinator to use its existing NT infrastructure. The second option involves purchasing a portal management solution to abstract user management from applications.
- Using the existing NT infrastructure
- Using the basic functionality of the portal management solution with minimal configuration If option 2 is selected, there are two additional levels of implementation that are additive to option 2. These may be overall options 3 and 4:
3. Further development within the portal management solution to add additional features
4. In addition to extension of the portal management solution, creating custom developed community administration features in a relational database that are matched to the portal directory structure There is a choice to be made between approach 1 and 2. Approaches 2 through 4 build on each other, with approach 4 including all the functionality of choices 2 and 3 as well.

Within choice 2, 3, and 4, there are also sub-decisions to make about products or level of customization. Table 16 illustrates chart comparing options and product/customization levels.

TABLE 16

| Option 1 | Option 2 | Option 3 | Option 4 |
| --- | --- | --- | --- |
| Use current NT security solution | Netegrity or Securant Security Management Solution Software | Security Management Solution Software + Custom Administration | Security Management Solution Software + Custom Administration + Advanced Community Structure |

The technology portion of this report may provide a section on each approach. The technical architecture for each may be detailed, as well as decisions that can be made by the supply chain coordinator within each. Each section may then compare the functionality pieces outlined in the section entitled Fundamental Requirements to that provided by the approach being described. Finally, costs and level of effort for each approach may be included at the end of each section.

After each web portal approach is documented, sections on network and application development recommendations may also be included.

Option 1: Using Internal NT Security

Solution Overview

The supply chain coordinator already manages Windows NT user accounts for all the employees of the supply chain coordinator. This is to control access to internal business applications. The IT team has the ability to create and delete users, assign user groups, and assign privileges to either the individual user or the user group. Access Control Lists manage the resources each user or user group can access, as well as the level of access such as Read, Write, or Execute. These are some of the same functional requirements for the integrated supply chain portal.

Moving to Internet based systems in the NT environment, most applications developed using Microsoft languages and methods run with Microsoft HS as the webserver. HII has authentication functionality included. IIS also provides a authorization features as well such as Read and Write, and since IIS runs as a service on top of Windows NT, it relies heavily on Windows NT user accounts and the Windows NT File System.

This is the approach the supply chain coordinator uses for the pilot web portal system. The supply chain coordinator has created an NT domain for the web application to use. The supply chain coordinator is setting up user accounts in this domain, and the web application is validating users against Windows NT.

Figure 76:
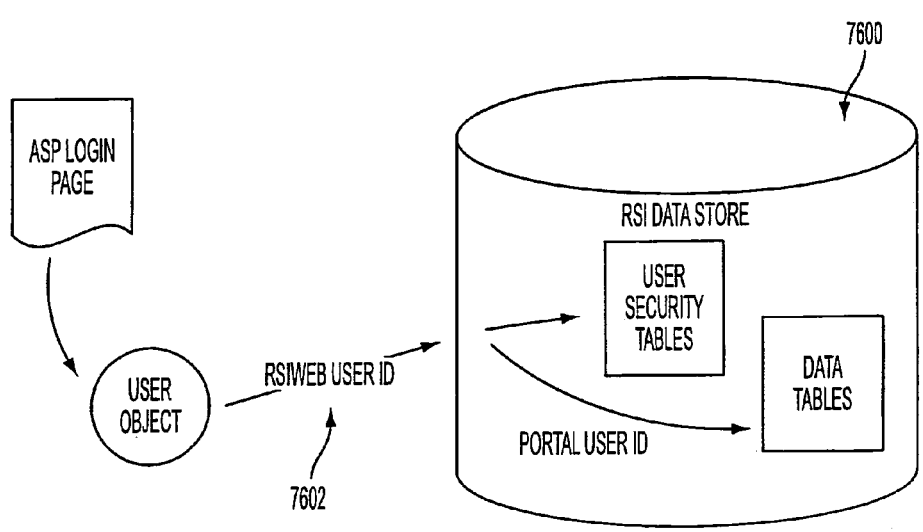
FIG. 76 is a schematic diagram showing a validation of users on a web portal.

FIG. 76 is a schematic diagram 7600 showing a current validation of users on a web portal.

For data access in the current web portal, there is an association of retailers to specific supplier, distributors, or supply chain members. This resides in a supply chain SQL database 7602. The application itself logs onto the database and queries the requested information, using the user id 7604 as a key to make sure the proper data is retrieved for presentation back to the user.

There are ways that the supply chain coordinator could continue this operation to manage the entire community of supply chain users. This would involve centrally administering users and physically adding them to the NT user base. The supply chain coordinator would own validating users and setting up access rights, and would need to communicate frequently with companies (supply chain members, suppliers, distributors) to make sure that user setup was proper.

In order to integrate $3^{rd}$ party provided applications, custom integration would be required in the link between the supply chain portal and the ASP application. The supply chain could work a transfer of user information in the http headers of linked websites. This would provide for an authentication of the user on the $3^{rd}$ party site. After the initial transfer, the user would interact with the $3^{rd}$ party application directly with zero visibility back to the portal. Each $3^{rd}$ party application would also need to manage users themselves and make sure that their user directories were synchronized with the supply chain coordinator. A way around this is for the third party application to trust that the user being passed is valid and to pass all application-specific data to the application at the time of the link. This provides an easier administration in this model but a much lower level of security and is not recommended.

Reporting would be handled by the IIS logs. If community members wanted to know what their employees were doing on the supply chain applications, they would need to submit a request to the supply chain coordinator. The supply chain coordinator would then need to manually check their logs and find out what user activities occurred. If a community member wanted to know what activities were performed on a $3^{rd}$ party hosted application, the supply chain coordinator would then need to contact the $3^{rd}$ party provider and have them manually search their logs and provide reports back to the supply chain coordinator which could then be shared with the community member.

Comparison to Requested Functions

In a previous section, the features requested by the supply chain community were detailed along with the functions those features imply. The following table shows whether functions are provided by this approach along with an explanation. Table 17 illustrates features within option one.

TABLE 17

| Feature | Y/N | Explanation |
|---|---|---|
| SECURITY | | |
| Lockout user after n unsuccessful logon attempts | Y | Application can be written to lockout after n successful tries |
| Notify administrator of lockouts | Y | IIS log should capture failed attempt. Application can capture lockout event and write to NT log |
| On line monitoring | | Lockouts are captured in the NT log. |
| Provide alternate passwords for lost/forgotten password situations | | |
| Password expiration; require periodic password changes | Y | This can be configured in NT and added to application with minimal development |
| Acceptable password length parameters | Y | Included in NT |
| Ability to assign/select password | Y | The supply chain coordinator would create in IIS |
| Ability to transfer logon intelligence. | N | Not part of NT; a custom integration effort is required per additional $3^{rd}$ party application. |

TABLE 17-continued

| Feature | Y/N | Explanation |
|---|---|---|
| Record all activities to the audit log | N | Only activities for applications the supply chain coordinator hosts can be captured. |
| COMMUNITY MANAGEMENT | | |
| Distributed community administration | N | The supply chain coordinator must manage the community centrally |
| Ability to add, change and delete users. | Y | The supply chain coordinator would perform centrally |
| Ability to assign access to users | Y | Access Control Lists could be setup in NT |
| Ability to create roles or level of users | Y | NT allows user groups. Levels beyond that are not supported. |
| Ability to set up default levels of access | Y | Read or Write |
| Ability to clone and/or access rights | Y | NT can be configured to allow this. |
| Mass delete of users | | |
| Ability to copy a user ID | Y | There are workaround to enable this using NT. |
| Ability to export user load information from member backend. | N | Details would be needed and sent to the supply chain coordinator for a custom load |
| User can be associated with multiple groups. | N | Here groups refers to corporate organizations, and NT structure makes all users part of the same organization within an NT domain. |
| Hierarchies | N | NT security does not support complex hierarchical structures. |
| Ability to publish rights and privileges across hierarchies. | N | No hierarchies. |
| Ability to authorize multiple levels of a hierarchy | N | No hierarchies |
| Ability to manage access against hierarchies | N | No hierarchies |
| Flexible data access and management. | N | NT provides very rigid security structures |
| DATA PUBLICATION | | |
| User can view or access data in another sub-group in their domain. | N | Data is within a domain. |
| User can view or access data in different domain. | N | NT has single domain. |
| POLICY ENFORCEMENT | | |
| Single sign on | N | A workaround for SSO is detailed in the section above, but IIS and NT are not SSO products. |
| Ability to integrate with affiliates (i.e. other $3^{rd}$ applications that make up the portal). | N | Not supported. |
| Ability to interface with other applications: the supply chain coordinator $3^{rd}$ party Remote hosts Platform independent | N | Not supported |
| Centralized policy management | N | This refers to all policies for multiple applications. NT security manages policies for all applications running on in the NT domain, but not applications outside of it. |

TABLE 17-continued

| Feature | Y/N | Explanation |
|---|---|---|
| REPORTING | | |
| The following community management reports were identified: Master user list Click and view access list User with published data authorization (i.e. users in other domains or sub-domains. Usage reports | | The NT admin can view some of these reports, but they would not be available to the general community as this requirement specifies. |
| Lockout notification | Y | NT admin can see lockout notification. |
| Online monitoring capability | N | Not available through web. Available to NT admin on admin desktop. |
| View audit log | Y | Admin can view |
| Parameter driven reports | N | Not provided to community users. |

It is possible to custom develop additional authentication and access control functionality on top of NT-based applications. Code can be written in ASP to provide this additional functionality, which would provide a portion of the functionality included in the products considered for option 2. For the purpose of this study, however, it is assumed that the cost of such development would greater than the cost of option 2, purchasing a portal management solution.

Costs and Timelines for Option 1

In terms of up front cost, this is the supply chain coordinator's lowest cost alternative. The NT administration features already exist, the supply chain coordinator has skilled NT administrators, and the equipment is already in place. An additional server may be required to handle the number of portal requests once the applications are fully available and ramped.

However, this approach fails on several fronts including application integration and distributed administration. Therefore, the supply chain coordinator would need to manage the community centrally with this alternative. The supply chain coordinator would need many administrators to manage the community with this approach, so that should factor into the ongoing costs of this approach.

Option 2: Implementing a Portal Management Solution

Two shortfalls of using the internal NT approach are:
The supply chain coordinator would only be able to have one set of business rules apply to each user
Users would need to be managed centrally.

These shortfalls are especially critical considering the supply chain coordinator is planning to outsource many of the applications behind the portal to ASP providers. In a sense, the supply chain coordinator may become an ASP integrator. With this in mind, a component of a solution is providing a clear method for the supply chain coordinator to deliver ASP model services to members and trading partners with distributed administration.

Extracting User Management from Applications

Option 2 is based on a layer of abstraction between security and the supply chain coordinator's applications. Doing this entails purchasing a security management solution that offers single sign-on and the ability to create a unified directory for users across applications. The benefit of the unified directory is the ability to enable the same user to belong to multiple applications (managed by different community owners) without the need to manage the user as many separate users. For example, the supply chain member could belong to the supply chain board community to access board-related reports. The same user may be a user of a supply chain service application, such as order management. In addition, the supply chain member may be enabled to access collaborative applications such as email. The issue, however, is that each application has its own set of privileges and roles that drive business process.

Figure 77:
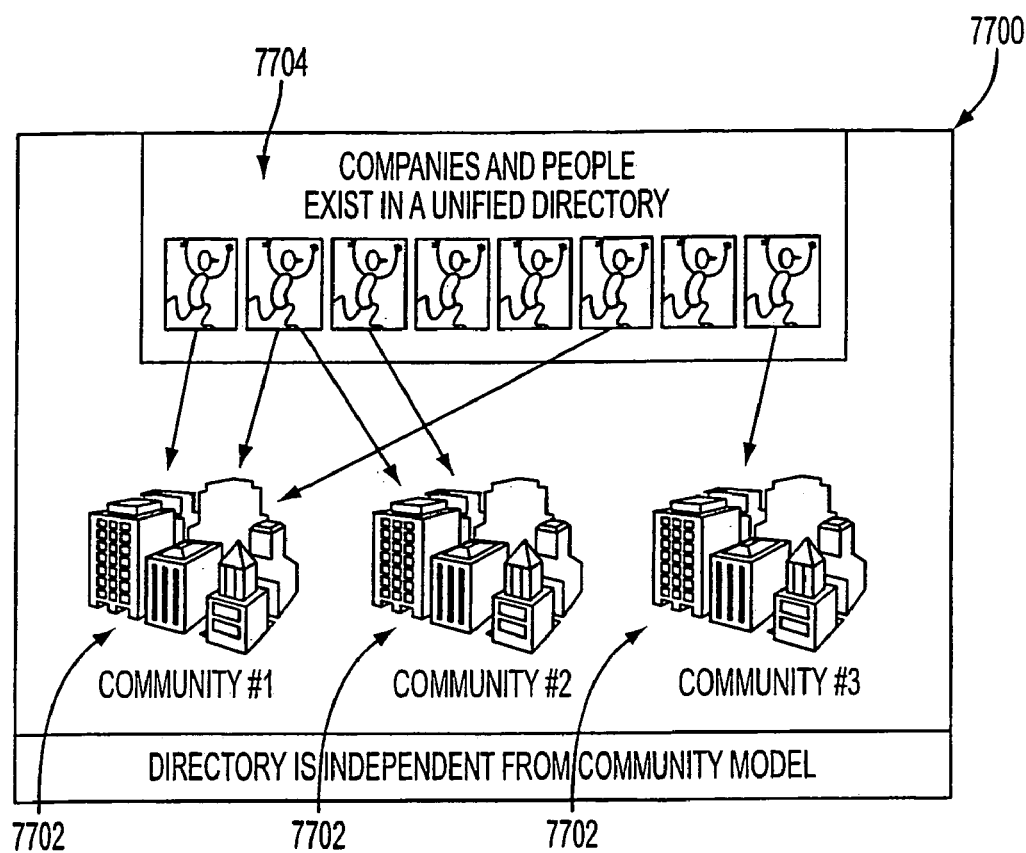
FIG. 77 graphically shows how user roles are managed in a multi-community environment.

In a single-entity model, such as option 1, roles are defined and users are assigned privileges and roles. However, the defined privileges and roles are pervasive across all applications that are accessed by that sign-on. Allowing the same user to have a single sign-on with different roles based upon the application community they are interacting with (even the same physical application in two different communities) is not possible. This is possible if the supply chain coordinator chooses to implement a single sign-on infrastructure including a unified directory environment, as the community is separate from the directory that defines the users. FIG. 77 graphically shows how user roles are managed in a multi-community environment 7700.

The separation of community 7702 and directory 7704 also allows the administration in each community to be different even though the user is shared. Consider the example presented earlier in this section. The supply chain coordinator's IT may control administration for board member reports, while the actual community member controls administration for the order management application. The separation allows changes to a user's profile in one community without impacting the user's existence in another. This is especially useful when adding and removing users. The supply chain coordinator may want to remove a user from the ASP order management service but still have them exist in the board member report application Single Sign-On Definitions To discuss single sign-on, central policy management, and delegated administration, it is important to define two terms.

Authentication—First step in single sign-on. Uniquely identify a user based on company id, user id, and password.

Authorization—Occurs after authentication. The level of application of data access allowed for an individual user.

Portal Management Solutions

As the integrated supply chain concept caught on, organizations had to deal with the challenges of single sign-on and distributed administration. These are the same issues the supply chain coordinator is dealing with as they begin their initiatives. The first response of large community owners was to custom build solutions on top of their IIS or Netscape server-based applications, as was suggested as possible in option 1. But as organizations began to build custom solutions, there were many failures or limitations on what could be accomplished. At the same time, the market has matured as the need for SSO and distributed organizations expanded to more organizations. Off-the-shelf single sign-on portal management solutions came to market, and many owners of large communities have replaced their homegrown systems with solutions based on these products, which have the following features:

User entitlement management

Authentication with single sign-on

Distributed and delegated user administration (group level responsibility)

Affiliate Services (integrate ASPs)

Centralized privilege management (one place for all applications)

User tracking (configurable)

Ability to link attributes for personalization to single sign-on

Distributed and delegated portal administration

Integration with most directory services

Web-Based Single Sign-On/Portal Management Architecture

SSO/Portal Management products are software packages that run on their own server. They also require a directory to operate against. This can be either LDAP or database directories.

The interaction between applications and the SSO/Portal Management server is client-server based, with the application webserver using an agent or plug-in (client) to reference the central policy server for user validation.

Figure 78:
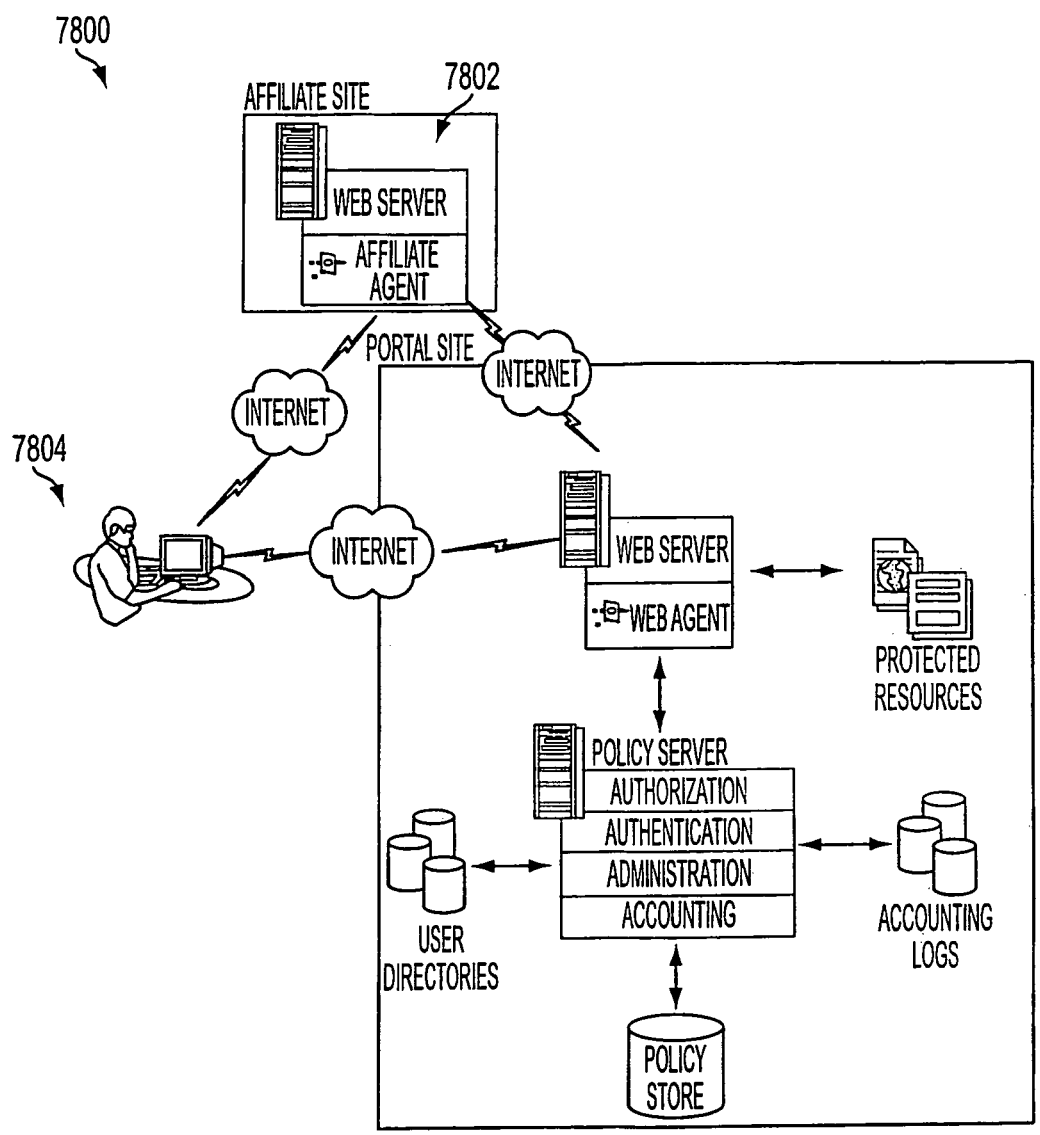
FIG. 78 illustrates a schematic showing the protection of resources with a central policy server, a separate user directory, and the integration of affiliate sites through an agent client.

FIG. 78 illustrates a schematic 7800 showing the protection of resources with a central policy server, a separate user directory, and the integration of affiliate sites 7802 through the agent client 7804.

Technologies Supported by SSO Products

Within each area of the architecture, there are multiple methods supported. Solutions can run on multiple operating platforms and with multiple types of user directories. Solutions can be extended with multiple development languages, support many authentication technologies, and operate in conjunction with many network security implementations.

Policy Based Security

Figure 79:
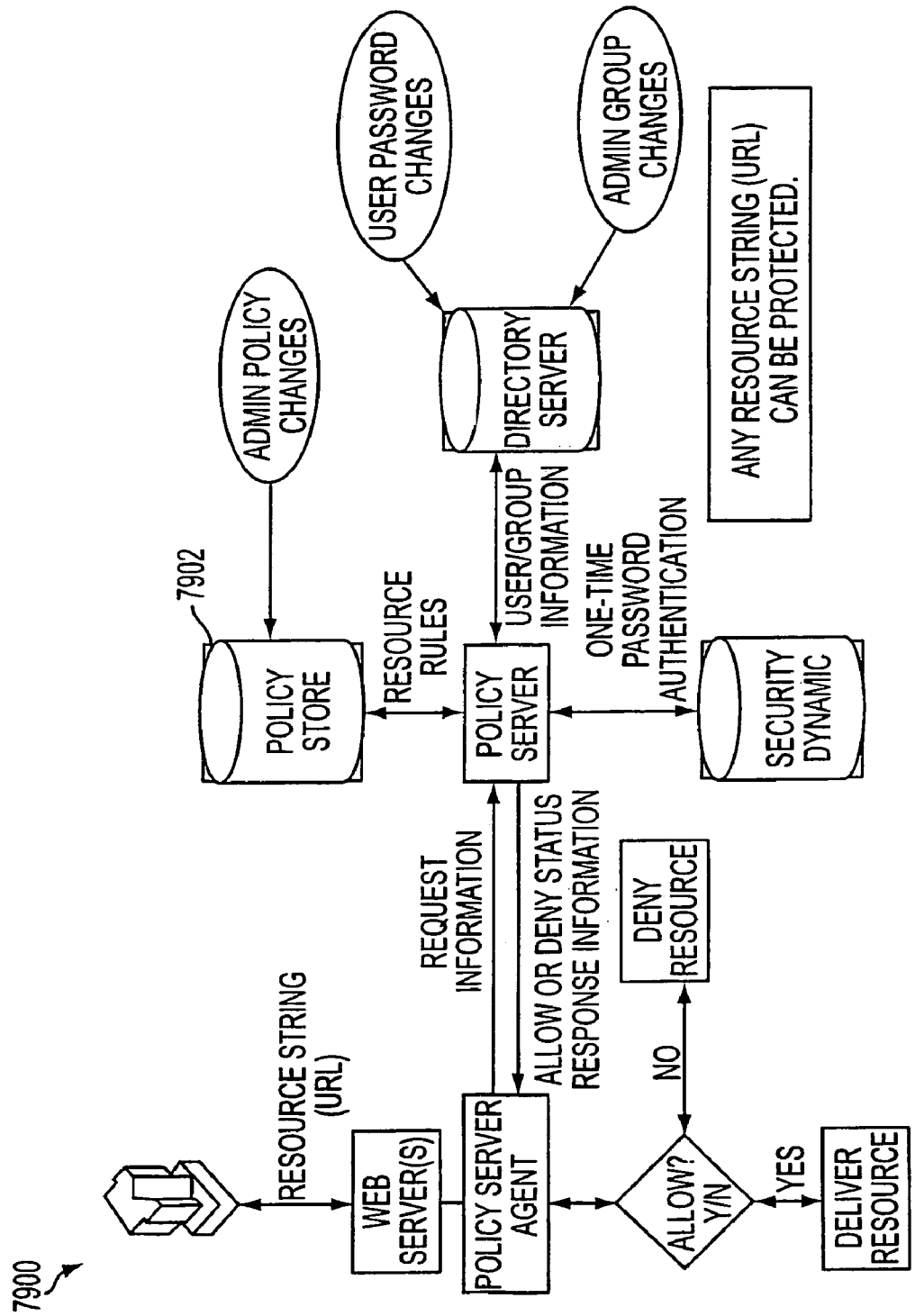
FIG. 79 illustrates a policy based security architecture in accordance with one embodiment of the present invention.

FIG. 79 illustrates a policy based security architecture 7900, in accordance with one embodiment of the present invention. One of the features of SSO/Portal Management solutions is central policy enforcement for distributed resources. Historically, policies and users were all managed in the same data store as the application being used. In the SSO model, a layer of abstraction exists where administrators manage policies in one repository and users in another. Applications then access the policy server 7902 (which references the policy and user repository) through an agent. The policy server returns an allowed and denied status.

When purchasing an off-the-shelf product, the infrastructure above is part of the solution. The work that must be performed is setup user and policy management, and then to actually create the users and the policies.

Comparison to Requested Functions

In a previous section, the features requested by the supply chain coordinator's community were detailed along with the functions those features imply. The following table shows whether functions are provided by this approach along with an explanation. Table 18 illustrates the various features associated with option two.

TABLE 18

| Feature | Y/N | Explanation |
|---|---|---|
| SECURITY | | |
| Lockout user after n unsuccessful logon attempts | Y | Supported |
| Notify administrator of lockouts | Y | Supported |

TABLE 18-continued

| Feature | Y/N | Explanation |
|---|---|---|
| On line monitoring | | |
| Provide alternate passwords for lost/forgotten password situations | | |
| Password expiration; require periodic password changes | Y | Supported |
| Acceptable password length parameters | Y | Supported |
| Ability to assign/select password | Y | Supported (not self-registration) |
| Ability to transfer logon intelligence. | Y | Agent to integrate affiliate sites. |
| Record all activities to the audit log | Y | Supported |
| COMMUNITY MANAGEMENT | | |
| Distributed community administration | Y | Basic in this option. |
| Ability to add, change and delete users. | Y | Supported |
| Ability to assign access to users | Y | Supported |
| Ability to create roles or level of users | Y | Supported |
| Ability to set up default levels of access | Y | Supported |
| Ability to clone and/or access rights | Y | Supported with configuration |
| Mass delete of users Ability to copy a user ID | | |
| Ability to export user load information from member backend. | N | Supported, but not implemented |
| User can be associated with multiple groups. | N | Groups here refers to organizations, which required customization |
| HIERARCHIES | | |
| Ability to publish rights and privileges across hierarchies. | N | No hierarchies |
| Ability to authorize multiple levels of a hierarchy | N | No hierarchies |
| Ability to manage access against hierarchies | N | No hierarchies |
| Flexible data access and management. | N | SSO out of the box does not deal with application-specific access (data required with an application) |
| Data Publication | N | Not supported |
| User can view or access data in another sub-domain in their domain. | N | Not supported |
| User can view or access data in different domain. | N | Not supported |
| POLICY ENFORCEMENT | | |
| Single sign on | Y | Supported |
| Ability to integrate with affiliates (i.e. other 3$^{rd}$ applications that make up the portal). | Y | Supported |
| Ability to interface with other applications: The supply chain coordinator 3$^{rd}$ party Remote hosts Platform independent | Y | Supported |
| Centralized policy management | Y | Supported |
| REPORTING | | |
| The following community management reports were identified: Master user list Click and view access list User with published data | N | Admin can see some of this data, but it is not enabled to be viewed by users through their own application |

TABLE 18-continued

| Feature | Y/N | Explanation |
|---|---|---|
| authorization (i.e. users in other domains or sub-domains. | | |
| Usage reports | | |
| Lockout notification | Y | |
| Online monitoring capability | | |
| View audit log | N | The supply chain coordinator's admin only - not readily available to individual users |
| Parameter driven reports | N | The supply chain coordinator's admin only - not readily available to individual users |

In comparing this chart to the one in the last section outlining option 1, there are many more "Yes" functions. These are in the areas of single sign-on, integration of affiliate sites, distributed user administration, and central policy management. What is not supported in this approach are hierarchies, publishing privilege rights to other users outside of one's group, managing application specific data in the user profile, and advanced activity reporting made available to individual users.

Product Options

There are several companies who provide software and services centered around this approach. These companies include Netegrity, Securant, enCommerce (a division of Entrust), and Oblix. For the supply chain coordinator, GE recommends that Netegrity and Securant be evaluated for the portal management software solution. This is as a result of research conducted for GE Global Exchange Services deployments already in production and implementation experience in the General Electric Company.

There are several differences between the two products in architecture more than function. Netegrity is the market leader and has the most large scale implementations, including providing the base architecture for GE's global supplier portal and several other GXS solutions where the requirements were similar to the supply chain coordinator's. Securant waited longer to go to market, but by many accounts has a better future vision and more elegant architecture. Another significant different is that Netegrity is very focused on development around LDAP, where Securant uses database technology as the base under their directory structures.

In order to compare the two products, data is provided below from Giga Information Group. The following is a list of criteria used by Giga Information Group to evaluate web-based single sign-on products:

Multiple Authentication Types—All SSO products support passwords, of course. But some may support additional authentication types, such as biometrics, digital certificates, tokens or smart cards.

Authentication Method—The method differs from the type by representing the underlying authentication architecture. How well does the product handle the registration, suspension, etc.

Quality of Administration—In the case of employee SSO, the emphasis is placed on easy-to-use administrative console, intuitive commands and integration with user data repositories already in existence (e.g., human resources databases). Web SSO products are evaluated similarly, with the added point of distributed, subordinate administration—allowing multiple administrators to manage subsets of the user population.

Breadth of Supported Applications—How diverse are the supported target applications and platforms?

Granular Access Management—The Administrative console should permit the administrator to control authorization not only to certain applications, but also under certain conditions. Web SSO products are heavily weighed on this point.

Robust Architecture—How fault-tolerant and efficient is the underlying architecture of the product itself? How well does it scale to loads and to geographic distances?

Use of Directory Services—To what extent does the product rely on directories, compounded with the ability of that directory to be used for other purposes simultaneously?

End User Ease of Use—For employee SSO, this refers mainly to the familiar desktop experience and the elimination of normal log-in interruptions. For Web SSO users, this refers to the degree to which the user's desktop browser is modified in any way.

Vision—Also known as product road map, which vendor projects the most visionary use for its products during the next five years?

Costs and Timelines

For option 2 the assumption is that the security management solution software provides single sign-on, authentication management, entitlement management, distributed administration and affiliate services. Table 19 shows list of assumed functionality for the purpose of cost and level of effort estimation:

TABLE 19

| Feature List | Option 2: Netegrity or Securant Security Management Solution Software |
|---|---|
| Distributed User Administration | Option 1 plus user registration service with the following directories technology: Netscape LDAP, NT Domains, Novell Directory Services, SQL Database, Oracle Internet Directory |
| Administrative Audit Trail | Basic User/Session/Application tracking |
| Access Management | Web interface to administer authorization and access control, secure portal management |
| Logon/Password Management | Basic authentication schemes, X.509, tokens, Forms, RADIUS, certificates and SSL |
| Reporting | Basic reporting from system/software logs |
| Policy Enforcement | Centralized basic policy-based management |
| Data Management | Basic access rules on data |

Hardware

Once hardware is acquired, the supply chain coordinator may need to host the solution on a dedicated platform. This may require at least two standard server class machines, one for production and one for pre-production/backup. The supply chain coordinator may choose to have a third box as a dedicated development and test environment or dedicated backup.

Product Training

For all developers who customize and build on the security platform, training may be required. The estimated time for training is a month per applied resource.

Resources

The following is an estimated list of resources that may be required to install and configure the security management solution software to provide the functionality in the table above.

1 project manager
1 system integrator
1 QA
1 security consultant

Estimated Project Length
Estimated project length is 2–3 months.

Option 3: Security Management Solution Software+Custom Administration

Option 3 addresses many of the delegated and self-administration requirements the supply chain community demands. While the product itself provide the ability to distribute administration features, most of these center around assigning access privileges for applications or resources. It does not take into account distributed administration of user specific data (preferences and data attributes) that may be required by the applications behind the supply chain portal. The basic product also does not capture and consolidate events from multiple applications and make them available for viewing by individual users and group administrators.

Figure 80:
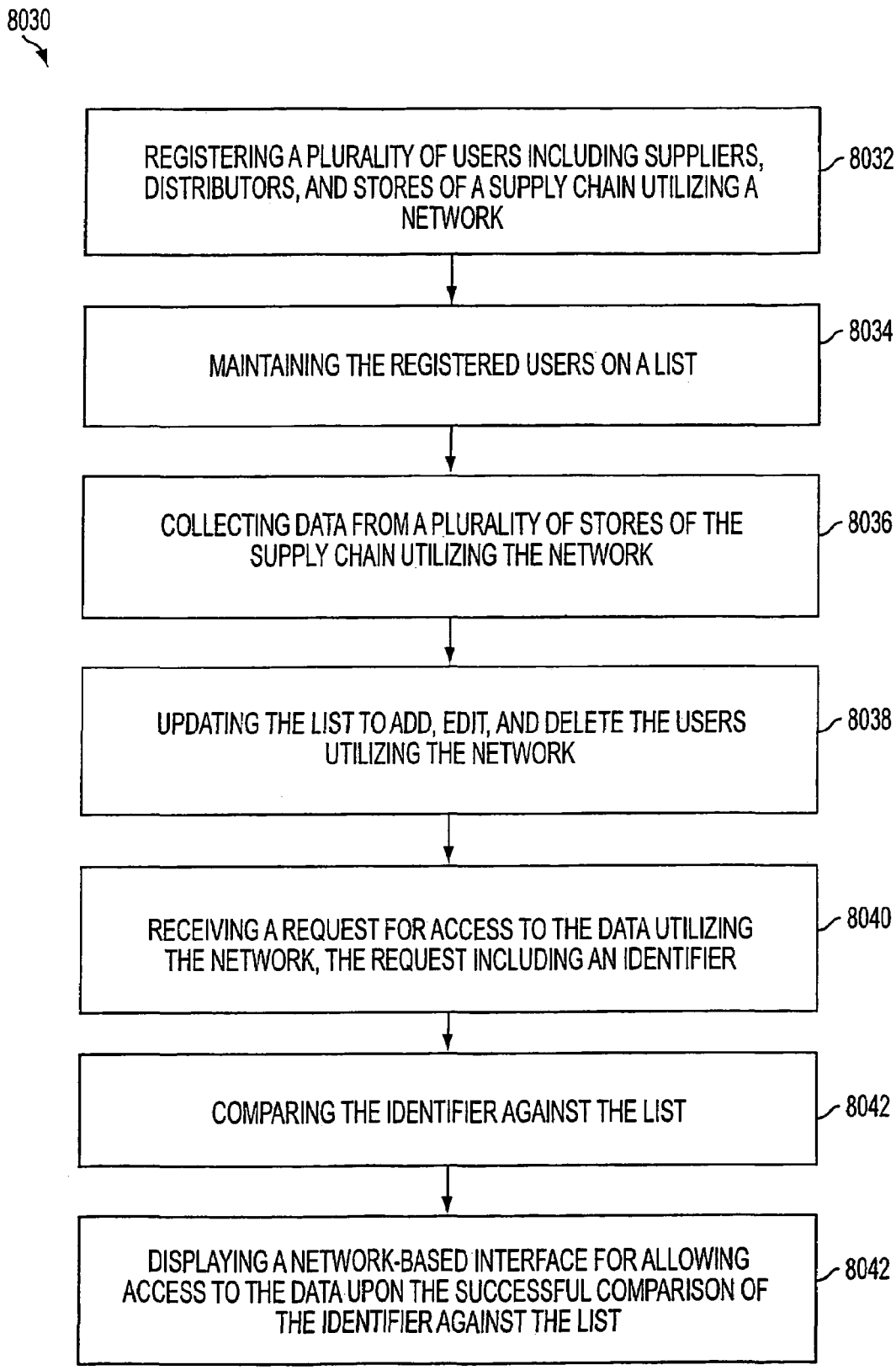
FIG. 80 is a flowchart of a process for a secure supply chain management framework in accordance with an embodiment of the present invention.

FIG. 80 is a flowchart of a process 8030 for a secure supply chain management framework. A plurality of users including suppliers, distributors, and stores of a supply chain are registered utilizing a network in operation 8032. The registered users are maintained on a list in operation 8034. Data from a plurality of stores of the supply chain is collected utilizing the network in operation 8036. The list is updated to add, edit, and delete the users utilizing the network in operation 8038. When a request (which includes an identifier) for access to the data is received utilizing the network in operation 8040, the identifier is compared against the list in operation 8042 and a network-based interface is displayed in operation 8044 for allowing access to the data upon the successful comparison of the identifier against the list.

In one aspect, the identifier includes a password. In another aspect, the data is encrypted. In a further aspect, the list is updated upon receipt of a notice from at least one of the stores. In an additional aspect, only certain data is displayed based on the user being one of the suppliers, distributors, and stores. In one aspect, the network includes the Internet.

Setting Up a Unified Directory

Directory structure may be useful for extending the security management solution. The exact design of the directory may be the first task for an organization implementing the extended functionality for the supply chain coordinator. Directory design is beyond the scope of this engagement, but the following outlines the items to create directory structures that support the supply chain coordinator's needs.

1. Determine the Directory's Goals
2. Plan the Directory Data
3. Identify all data to go into the directory
  Determined where the data may be mastered
  Determine who manages the data and who exactly may be allowed to update data
  Determine who can use the data and form
  Document the results In identifying data, the question of what should go into the directory should be asked. The answer is data that is read often and written little:
  Data that can be expressed in simple object-attribute-value form
  Data useful for more than one audience
  Data accessed from more than one physical location It is also important to ask what should not go into the directory. The answer is data that changes frequently, Large and unstructured chunks of data designed for file systems, ftp servers, web servers, or relational databases, data that requires sophisticated database operations to be accessed and manipulated.

4. Plan the Directory Schema
  Identify all attributes needed to support a directory
  Identify which attributes should be indexed
  Identify all object classes needed to support a directory data
  Determine if and how you may extend the schema
  Document The questions in planning the schema are how may the data be represented?
  What is the authoritative source of each data element
  Who is the owner for each element in the schema
  How is the data element updated in the directory and how often
  How often is the data accessed and in what way
  Would indexing the data element be productive for speeding up lookups?

5. Plan the Directory Tree
6. Plan the Security Policies
7. Plan for Replication and Referrals
8. Create the Implementation Plan Extending the Directory to Meet Application Specific Requirements Adding User Specific Attributes Portal management solutions based on a directory include the ability to create extended attribute columns in the schema. Extended attributes can serve a number of uses by applications. Two common examples are user preferences such as language and local time. Once the directory structure designed by the process above is in place, the supply chain coordinator may need an application to allow users to manage their preferences and other data to be used by applications.

Figure 81:
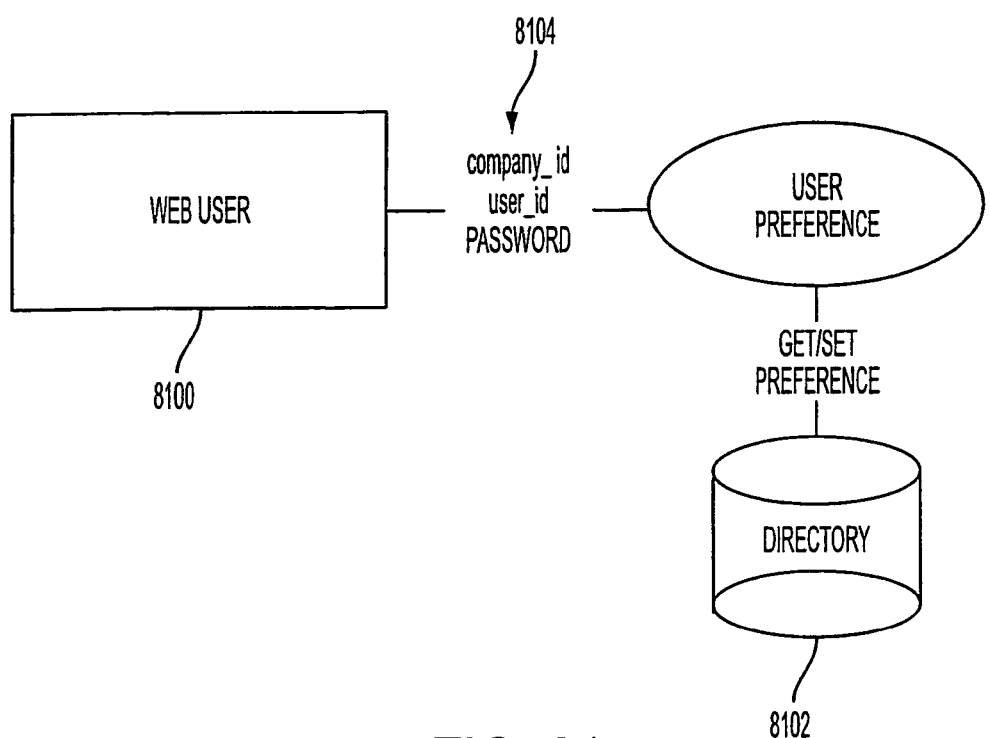
FIG. 81 shows a schematic with attribute setting through a web interface.

FIG. 81 shows a schematic with attribute setting through a web interface 8100. The figure shows an attribute 8102 that can be set through a web interface 8100. The preferences are saved in the directory attributed 8104 to company_id and user_id 8106 (which together form a unique user in the system). Another example of attribute data pertaining to the supply chain applications could be to store single or multiple retailers a specific user can access data for.

For each attribute category the supply chain coordinator decides to include in the directory store, administration screens may be required to add, modify, or delete the attribute data.

Advanced User Privileges for Extended Directory Use

Once the application functionality specified previously exists, a new community management challenge presents itself. The question of who can access the new administrative features and what attributes they can update must be answered.

What makes this challenge much greater than managing privileges in Option 2 is that with the base configuration, privilege models are more simplistic and for the most part reserved for administrator users. Now that application-critical attribute data is being maintained by users themselves in a more distributed model, it may be helpful to make sure that the privileges to access applications and data are distributed properly.

At creation time, a user can get the following privileges:

Default privileges (defined by group type, user type and creator privileges, they are the intersection of these three sets of privileges, what is common to all of them).

Allowable privileges (creator privileges) These privileges are those, which the creator has, but are not included in the users default privileges.

Default privileges are assigned to the user at creation time (a trigger should be automatically fired), the allowable privileges may be granted if the creator choose to. The user privileges can be modified later by a user with sufficient privileges. That modifier user can revoke any privilege, (no matter if he/she has or does not have that privilege) and can grant only the privileges he/she has.

Figure 82:
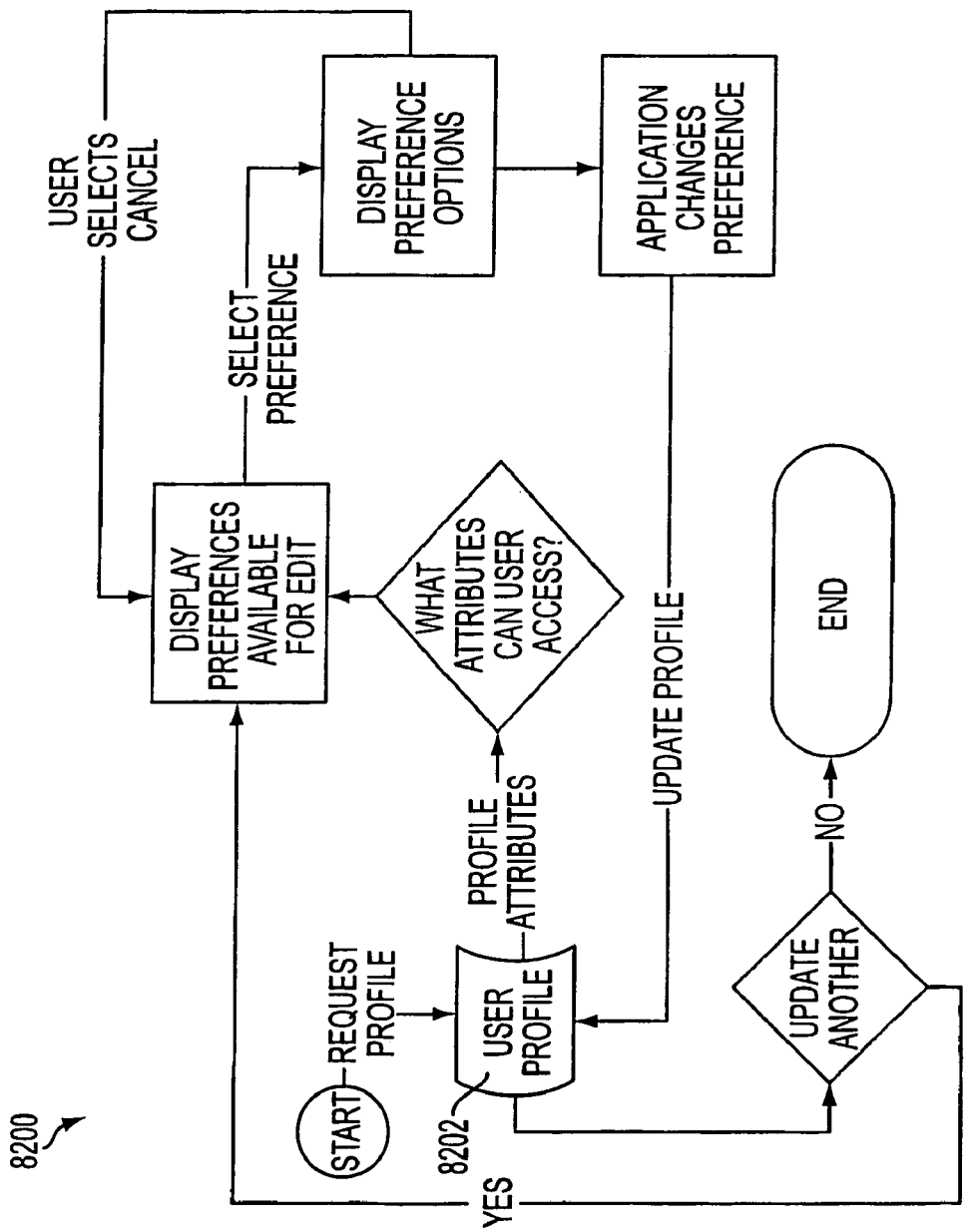
FIG. 82 illustrates a flow diagram for assigning default privileges.

The administrative interface needs to be extended to allow for the addition of allowable features. The process by which default privileges may be assigned also needs to be customized in this approach. Once the more sophisticated privileges are in place, the update preference process is enhanced to check for proper access level. FIG. 82 illustrates a flow diagram 8200 for assigning default privileges.

Once this information is stored and updated in the user profile 8202, the application needs to update the current session. This requires that the session object be able to handle the attribute information so that it can be passed to applications that need it later (another piece of work).

Finally, though outside of the scope of the portal management solution, the applications that may use the extended attribute information must be programmed to correctly receive the information and put in into its application session.

Custom Privilege Templates

Another way to extend the security management solution to make administration easier is privilege templates. There should be privilege templates for each domain in the system. These focus on applications a certain type of user can access. For example, certain functions are only for the supply chain ember users. If there are certain things a user type can perform, making the administrator setup these privileges over and over again for each new user is a waste of time. Setting up a template for all users of that domain makes more sense. The domain privilege templates are created and maintained (add/delete privilege) by admin users.

Throughout the community there are many users who share a similar job function. Some of these differ within a domain, but some also are the same throughout the system. For example, every group may have an administrator regardless of domain. In order to save time in user setup, a user should be able to be assigned a role type that carries a certain number of privileges with it. The role may be used as a template to setup users, or the role might actually become an entity that privileges are assigned to, and whereby a user inherits those privileges by being attached to the role. Some roles may be setup for use across the system by the system administrator; the domain where the role is used may bound these. Other roles might be setup in a domain or group, depending on how much flexibility the supply chain coordinator decides to include in the solution.

The final piece to what a new user can be granted deals with the fact that a user can add only privileges that he/she was granted with, however he/she can delete any privilege that the grantee template contains.

Figure 83:
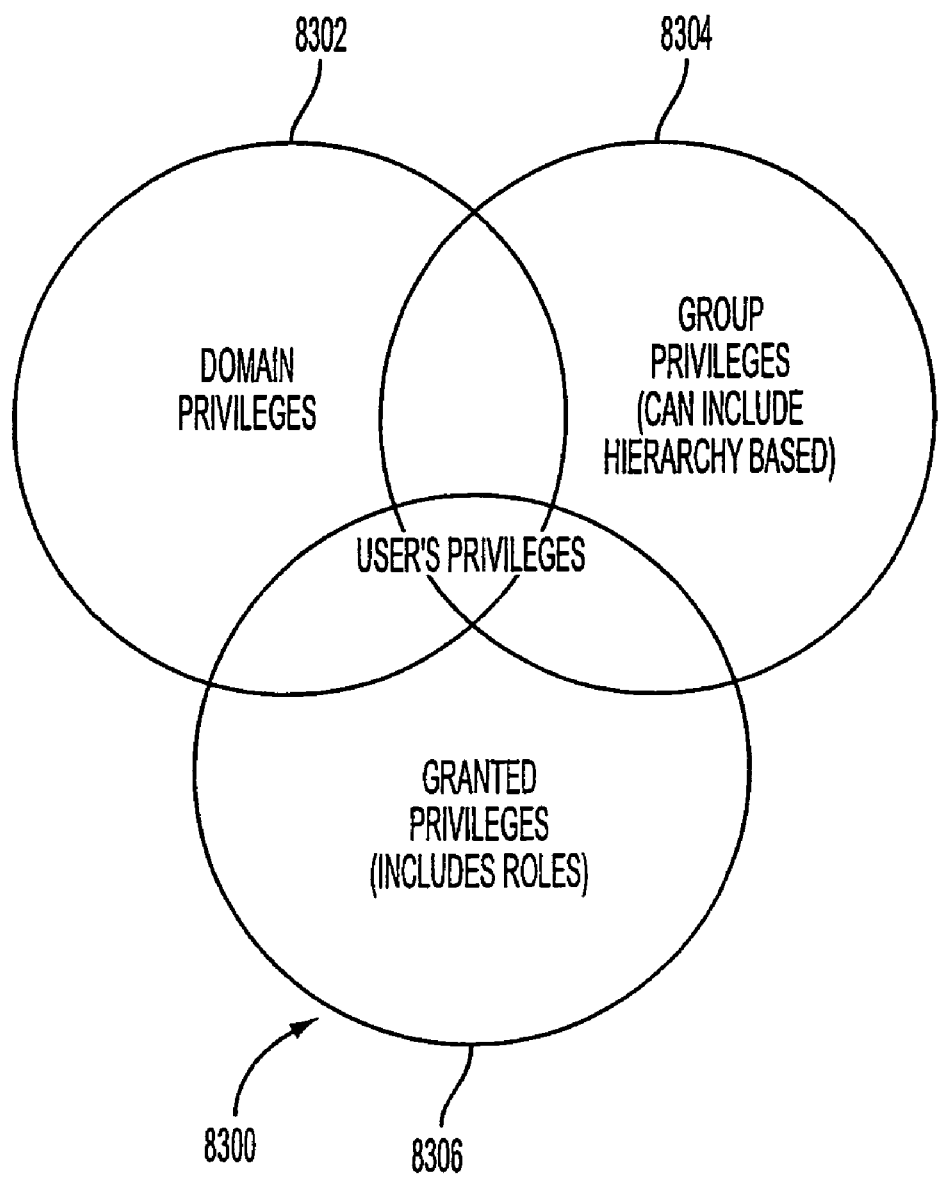
FIG. 83 shows a Zen diagram illustrating the intersection of privileges.

FIG. 83 shows a Venn diagram 8300 illustrating the intersection of privileges, i.e. domain 8302, group 8304, and granted 8306, for a new user.

There should be a user interface for maintaining the tables where domain and role templates are stored. After a new domain or role is created in the system, a UI page is needed that allows the creator to attach newly created templates of privileges to the new domain or role. The creator can grant only his/her privileges.

Combined Activity Logging and Reporting

Another feature the supply chain community asked for was a single place to view the activities their employees perform in supply chain applications. In option 1, this was not possible, as there was not a single view of a user across applications. In option 2, there was single sign-on and the infrastructure to capture some user information across applications, but very little customization performed to take advantage of the infrastructure.

In option 3, two important functions are added. First, development is performed to increase the number of events that are captured about the user. This includes integration to the third party ASP applications to retrieve a set of user initiated events. These events are either stored in the security solution logs or in the supply chain coordinator's database.

The second part of this development effort includes building online visibility to the events captured for a group's administrator. This function gives the distributed community administrators the tracking capabilities they have asked for. These online views and reports should allow a group admin to see activities, both application access related and perhaps even user actions within an application (depending on what the third party ASP applications can provide). There was also discussion during the workout sessions that the system might provide visibility for users within a company, with possible views including all registered users from their company.

Comparison to Requested Functions

In a previous section, the features requested by the supply chain community were detailed along with the functions those features imply. Table 20 shows whether functions are provided by this approach along with an explanation.

TABLE 20

| Feature | Y/N | Explanation |
|---|---|---|
| SECURITY | | |
| Lockout user after n unsuccessful logon attempts | Y | Supported |
| Notify administrator of lockouts On line monitoring Provide alternate passwords for lost/forgotten password situations | Y | Supported |
| Password expiration; require periodic password changes | Y | Supported |

TABLE 20-continued

| Feature | Y/N | Explanation |
|---|---|---|
| Acceptable password length parameters | Y | Supported |
| Ability to assign/select password | Y | Supported (not self-registration) |
| Ability to transfer logon intelligence. | Y | Agent to integrate affiliate sites. |
| Record all activities to the audit log | Y | Supported |
| COMMUNITY MANAGEMENT | | |
| Distributed community administration | Y | Basic in this option. |
| Ability to add, change and delete users. | Y | Supported |
| Ability to assign access to users | Y | Supported |
| Ability to create roles or level of users | Y | Supported |
| Ability to set up default levels of access | Y | Supported |
| Ability to clone and/or access rights | Y | Supported with configuration |
| Mass delete of users | | |
| Ability to copy a user ID | | |
| Ability to export user load information from member backend. | N | Supported, but not implemented |
| User can be associated with multiple groups. | N | Groups here refers to organizations, which required customization |
| HIERARCHIES | | |
| Ability to publish rights and privileges across hierarchies. | N | No hierarchies |
| Ability to authorize multiple levels of a hierarchy | N | No hierarchies |
| Ability to manage access against hierarchies | N | No hierarchies |
| Flexible data access and management. | Y | Custom extensions to support application specific data needed to control data access |
| DATA PUBLICATION | | |
| User can view or access data in another sub-domain in their domain. | N | Not supported |
| User can view or access data in different domain. | N | Not supported |
| POLICY ERFORCEMENT | | |
| Single sign on | Y | Supported |
| Ability to integrate with affiliates (i.e. other 3$^{rd}$ applications that make up the portal). | Y | Supported |
| Ability to interface with other applications: the supply chain coordinator 3$^{rd}$ party Remote hosts Platform independent | Y | Supported |
| Centralized policy management | Y | Supported |
| REPORTING | | |
| The following community management reports were identified: Master user list Click and view access list User with published data authorization (i.e. users in other domains or sub-domains. Usage reports | Y | Custom |
| Lockout notification | Y | |
| Online monitoring capability | | |
| View audit log | Y | Custom |
| Parameter driven reports | Y | Custom |

From the comparison chart, this is a pretty comprehensive alternative. Still missing are the most complex community management items such as hierarchies and data publication across domains, but most other items are supported by this alternative.

Costs and Timelines

For option 3, the assumption is that the security management solution software provides more advanced administration features, self-administration, improved session tracking and event capture, detailed reporting, and custom policy extensions. Table 21 shows a list of assumed functionality for the purpose of cost and level of effort estimation.

TABLE 21

| Feature List | Option 3: Security Management Solution Software + Custom Administration |
|---|---|
| Distributed User Administration | Option 2 plus, Custom approve/reject registration, grant/deny access to applications, grant privilege, modify user profiles, reports |
| Administrative Audit Trail | Custom User/Session/Application tracking |
| Access Management | Web interface to administer authorization and access control, secure portal management and custom agents. |
| Logon/Password Management | Basic authentication schemes, X.509, tokens, Forms, RADIUS, certificates and SSL. Custom notification and online monitoring |
| Reporting | Custom reporting integrated with monitoring systems |
| Policy Enforcement | Custom extension of the policy |
| Data Management | Custom extension |

Software and Hardware

From a cost standpoint, Option 3 assumes that Option 2 has been implemented. Therefore, additional software license fees are not required. Additional hardware is probably not required, unless the load on the directory requires a separate installation of the supply chain coordinator decides to implement a reverse proxy server.

Resources

The following is an estimated list of resources that may be required to install and configure the security management solution software, develop custom administration, and develop custom reports to provide the functionality in the foregoing table.

1 project manager
1 business analysis
1 system integrator
2 web/database developers
1 QA, security consultant Estimated Project Length The estimated project length is 4–6 months (Dependent on completion of option 2)

Option 4: Adding Advanced Community Structures

The supply chain coordinator has a very unique community with real-world issues that defy standard organizational definitions. No two organizational structures or ownership arrangements are the same. Yet being able to map the real world may be useful for fully meeting the community's requirements without clumsy workarounds.

The following section describes several custom additions that could be developed to push out community management to end-users and allow them to manage their web-based applications in a way matching their real-world business organization. Also presented is a way to dynamically manage the relationships between supplier, distributors, and retailers in place of a cross-reference method that requires constant update for application data access.

Each of the following would be custom developed application. While they would integrate heavily with the portal management solution and directory structure in options 2 and 3, they would be stand alone applications that would run in their own environment.

Creation of Hierarchies for Application and Data Access Control

Hierarchies are a way of representing real-world structures inside of an application. The purpose is to provide a more flexible way to manage the relationships between entities and other entities, entities and users, and users and data. Hierarchies are very complex to implement, especially in a many to many community such as the supply chain coordinator has. If implemented properly, however, they can provide group owners a way to manage their application and data controls that matches the way they see their own businesses and maps how they control functions in real life. This section attempts to lay out how hierarchies are implemented, maintained, and how they can be used to enhance privilege storage.

Creating and Managing Domains

The first step in creating a hierarchy is to create domains. Domains are the different types of groups that may exist in the portal, with each one requiring different business rules for privilege assignment. An application function is needed to add a domain or remove a domain as shown below.

Figure 84:
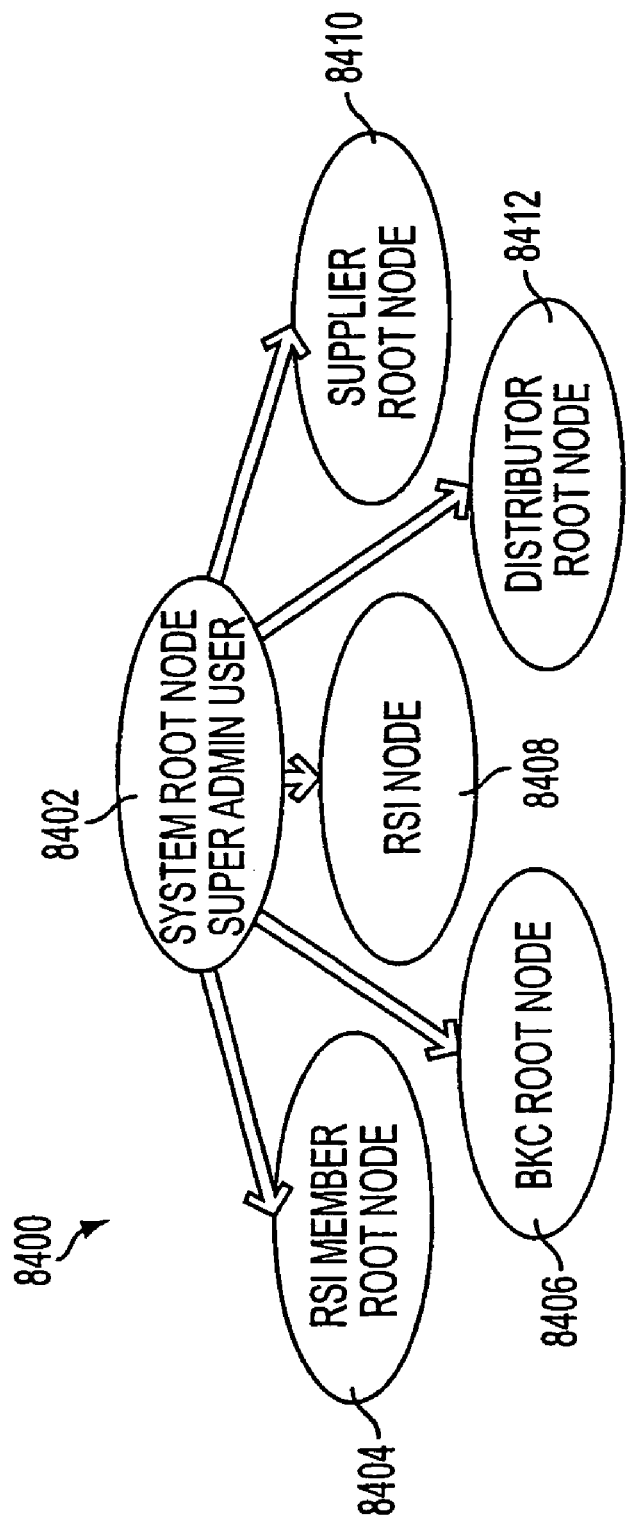
FIG. 84 illustrates a diagram showing a system, supply chain member, retail manager, the supply chain coordinator, supplier, and distributor root nodes.

FIG. 84 illustrates a diagram 8400 showing a system 8402, supply chain member 8404, retail manager 8406, the supply chain coordinator 8408, supplier 8410, and distributor root nodes 8412.

Creating and Managing Groups (Corporate Organizations)

Once domains exist, the next step is to setup groups within a domain. An example is the supplier domain. There are many different supplier companies, and each of these may have their own group (to control data access rights) even though they all share common application access rights. To technically describe groups under the top level domain, the term node is used. Nodes can be single level in nature or built in n-tiered structures, with each node having a parent node. In the case of a top level group, the parent node is the domain itself. An application function to add/modify/delete child nodes is required to add groups as shown in the diagram below.

Figure 85:
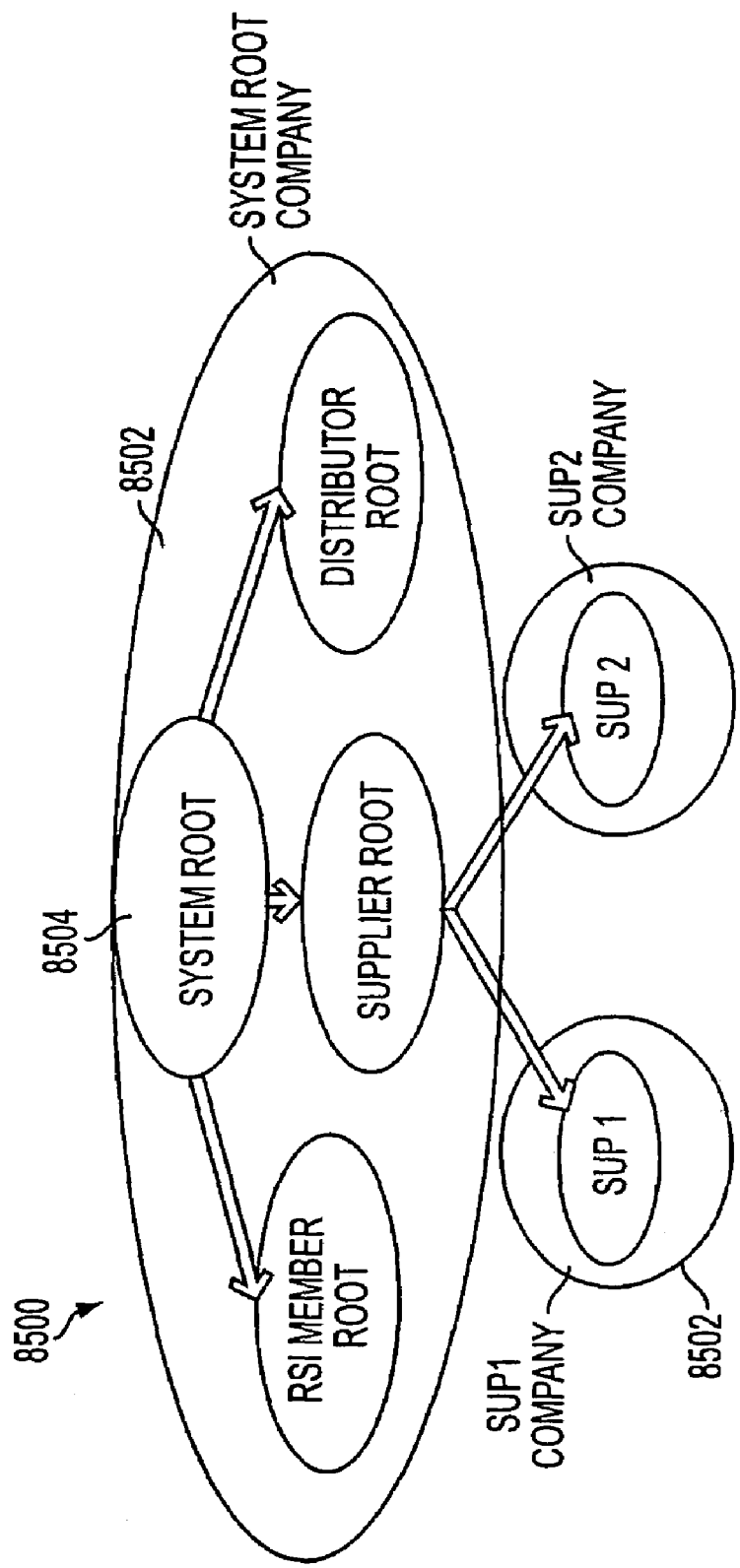
FIG. 85 illustrates another diagram showing groups within domains.

FIG. 85 illustrates another diagram 8500 showing groups 8504 within domains 8502.

Groups exist within a domain. Therefore no matter what roles are created within a group, they are bounded by the privileges granted to a domain.

Adding Users to a Sub-Group (Node) Versus to Companies

In a directory based security model (LDAP or NT), users typically belong to companies (groups). In the move to n-tiered hierarchies, there is also a move from the directory used by the SSO product to a relational database. This is because referential integrity is required to take full advantage of and properly manage hierarchies. By only allowing top level groups (not allowing an n-tired hierarchy), the hierarchies are easily synched to the companies in the directory. If the supply chain coordinator chooses to enable sub-groups, however, users belong to nodes and not companies, and the path to the top node of each hierarchy instance identifies the corresponding company in LDAP. An n-tier hierarchy is shown below.

Figure 86:
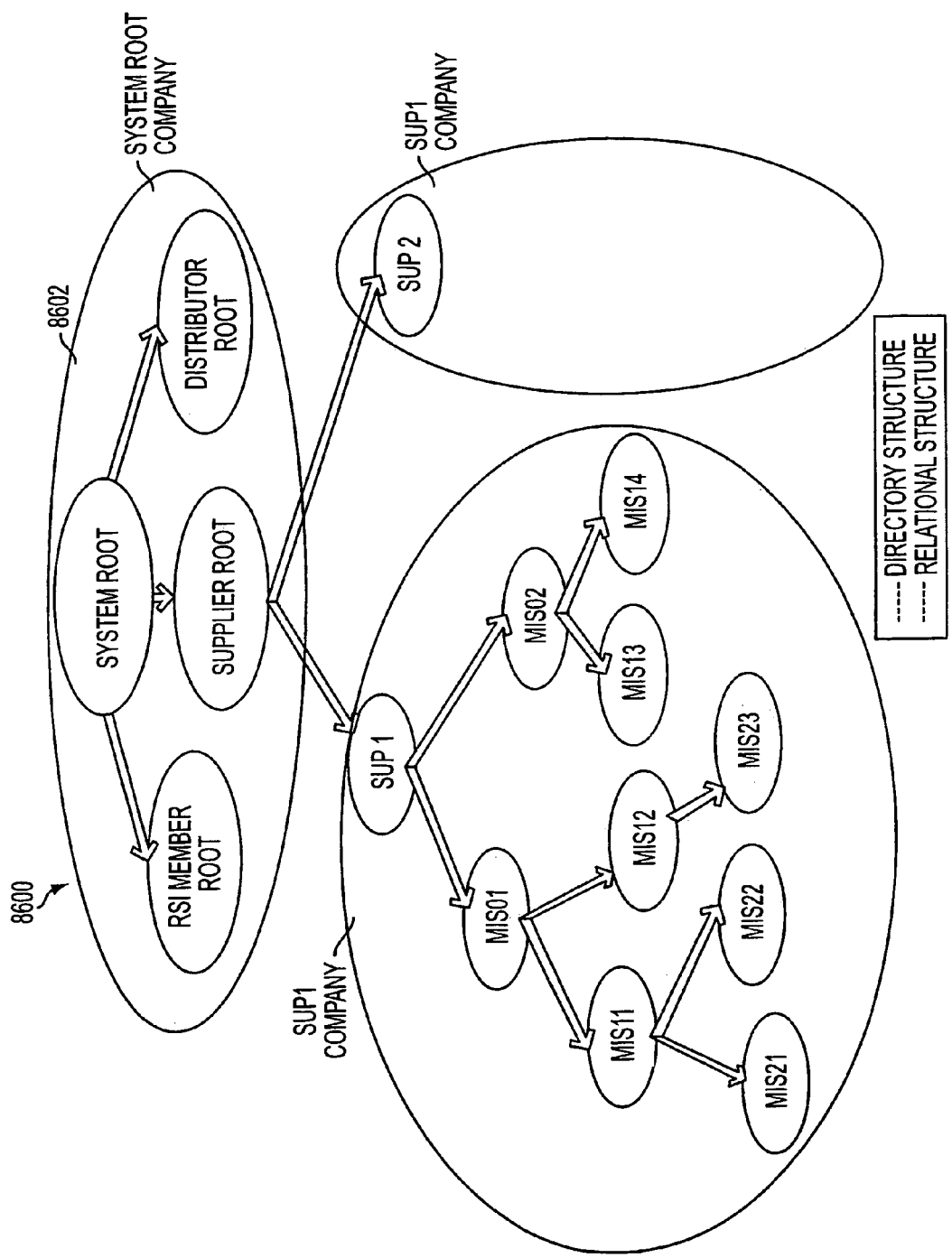
FIG. 86 shows still another diagram showing hierarchies in accordance with one embodiment of the present invention.

FIG. 86 shows still another diagram 8600 showing hierarchies 8602, in accordance with one embodiment of the present invention.

Figure 87:
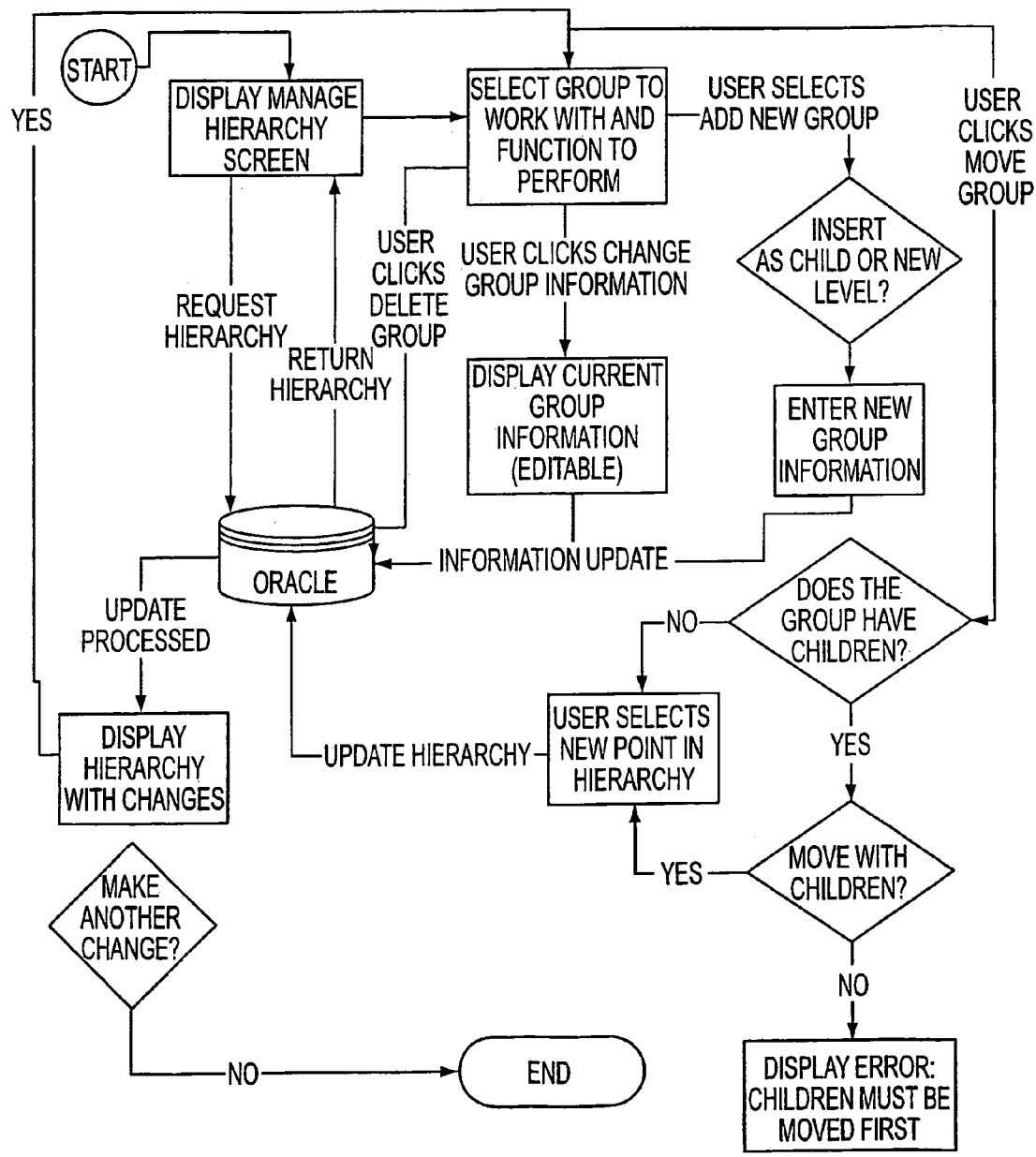
FIG. 87 shows a process for hierarchy management, in accordance with one embodiment of the present invention.

If n-tiered hierarchies are enabled, the management feature must also allow for nodes to be moved from one parent to another, as well as the ability to take a node and all nodes attached below it and move them together. FIG. 87 shows a process 8700 for hierarchy management, in accordance with one embodiment of the present invention.

FIG. 87 shows that this is an involved process requiring proper design, custom implementation, and testing.

Hierarchy Linkages for Data Access Control

In the initial stages, all information distributed by the supply chain coordinator to suppliers and distributors may be packaged by the supply chain coordinator. For example, in the pilot, the supply chain coordinator maintains a list of stores served by a specific distributor. When a report runs, it runs for all retailers associated in the cross-reference table to that distributor. To make sure information is correct, those cross-reference tables must be up to date. This approach also means that the supply chain coordinator is in control of what data can be viewed by a distributor, and there are very few controls over who within a distributor organization can view retailer information. The supply chain member has very little control over their data in this scenario, and the supply chain coordinator has a very high management overhead in this data exchange.

To perform more complex data access control, the supply chain coordinator may choose to implement linkages between organizational hierarchies. As described below, hierarchies can be added to each domain (The supply chain coordinator, supplier, distributor, supply chain member, retail manager) to add application access flexibility. For data purposes, there can be links between nodes of one hierarchy and another. The most common usage of this would be a distribution center to a store.

Example: Looking at a large supply chain member and a distributor that serves them. A generic structure is shown in Table 22.

TABLE 22

| supply chain member | Distributor |
|---|---|
| Corporate Group | Operating Group |
| Division | Region |
| State | Distribution Center |
| City/Area | Retailers |
| Retailer | |

Figure 88:
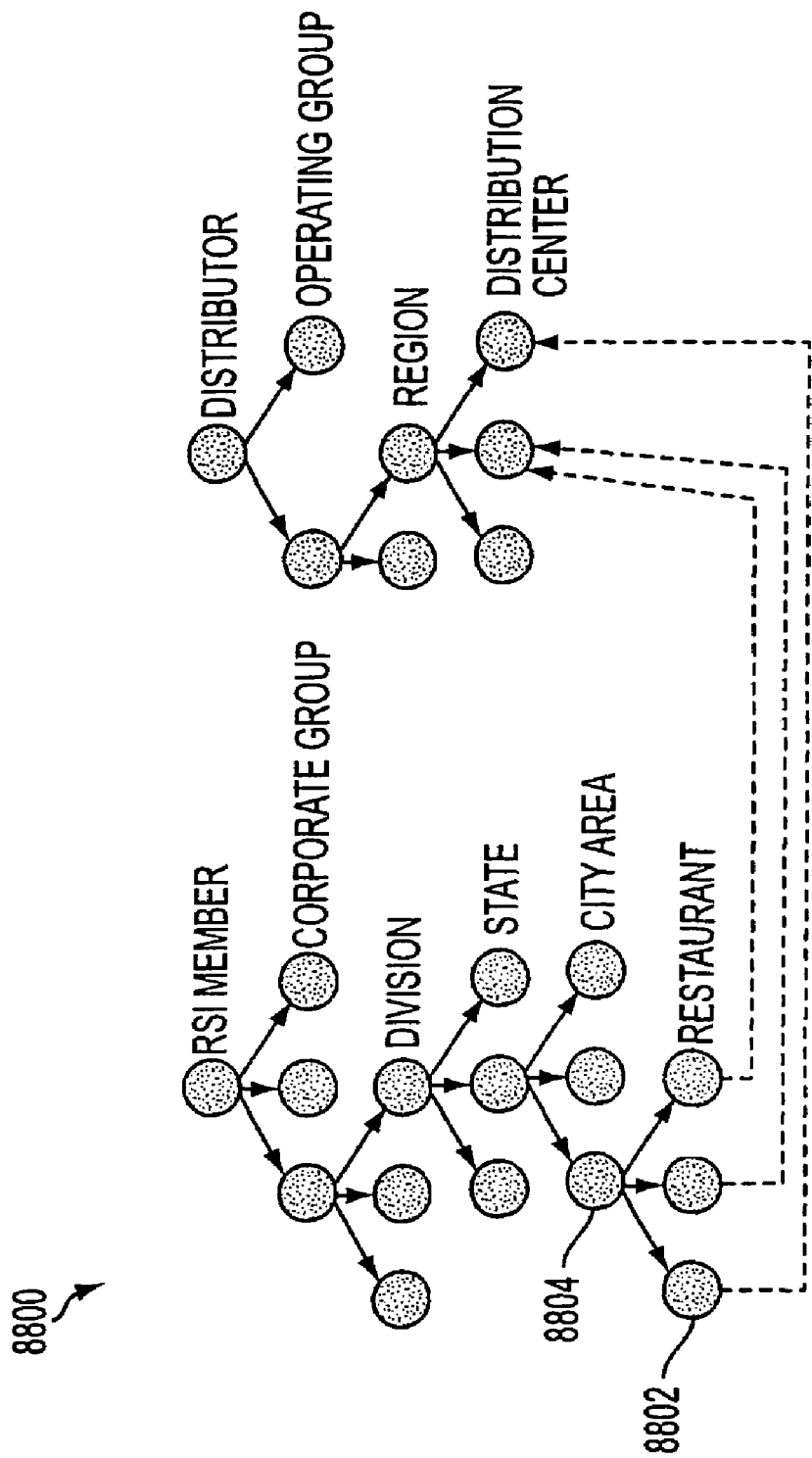
FIG. 88 depicts a hierarchy in the supply chain portal management, in accordance with one embodiment of the present invention.

FIG. 88 depicts a hierarchy 8800 in the supply chain portal management, in accordance with one embodiment of the present invention. In the supply chain members hierarchy, all retailers 8802 are attached to a level of node representing metropolitan areas 8804.

From the diagram before, each retailer of a supply chain member is associated with one (and only one) distribution center of a distributor. This allows a supply chain member to allow access for a distributor to access information for all retailers that they serve. But rather than assigning access for each retailer on its own (maintaining a cross-reference), the can leave the access control to the linkages created. This assumes that the linkages are maintained properly, but the advantage is that distributor access could be restricted to a level below the top level node without the need to update the access privilege every time a retailer status changed. The next section describes how this is technically implemented.

Hierarchy Linkages for Data Publication

Each point in a hierarchy is a "node". Each node has a number or value assigned to it. This NODE_ID is numeric, unique system-wide and would enable the supply chain coordinator hierarchy system to clearly and unambiguous define in the application any location in the supply chain member, supplier, distributor, or retail outlet manager hierarchy.

Figure 89:
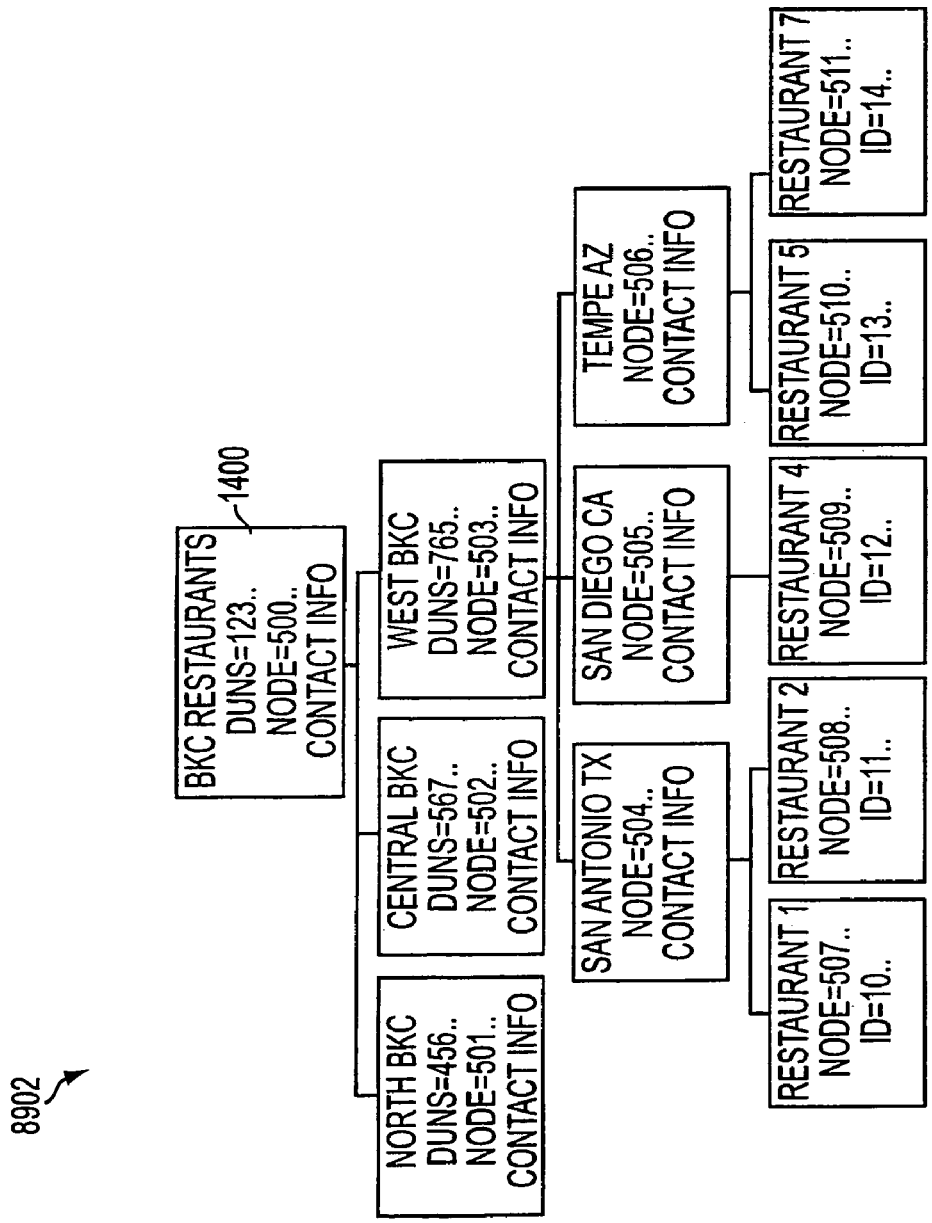
FIG. 89 illustrates the retail outlet manager as part of the supply chain coordinator hierarchy, in accordance with one embodiment of the present invention.

FIG. 89 illustrates the retail manager 8900 as part of the supply chain coordinator hierarchy 8902, in accordance with one embodiment of the present invention.

The node ids or attributes become important in privilege setup. For example, initially a user named "Joe" might be part of the group "Restaurants." In a normal association, Joe would be able to see all data that belongs to his group. The access to data could be restricted in option 2 or 3, but that would have to be handled by the applications or through extended attributes with the actual store numbers in the portal management solution. There was not a concept of inherited data access or restricted data access through the use of nodes.

Now, assume that Joe is really a field auditor in the west restaurant manager division. As the restaurant manager admin, you want to setup Joe so that he can only access data for the West region, and cannot see the other divisions data. In the database portion of the security management system, the company id (restaurant manager) in the company id is replaced with a group id. Because the group id is a sub-group of the top level restaurant manager node, it can be associated back to the company_id that is stored in the directory.

Because Joe now belongs to group 503 and not group 500, he can only see data for restaurants from his node in the hierarchy and downwards. Note Table 23.

TABLE 23

| Group Id | User Id | User Type | Priv. Id | Grantor Id | Restricted Node Id |
|---|---|---|---|---|---|
| 503 | Joe | the supply chain member | View Order Data | 500 | |

Another case might be that while Joe works in the West Region, he actually only audits restaurants in the Tempe Metropolitan area. The columns can be added to the privilege to include other information such as a node that further restricts data access. With the privilege below, Joe can now only view order data for restaurants below node 506, even though there are more restaurants under the scope of node 503. Note Table 24.

TABLE 24

| Group Id | User Id | User Type | Priv. Id | Grantor Id | Restricted Node Id |
|---|---|---|---|---|---|
| 503 | Joe | supply chain member | View Order Data | 500 | 506 |

The concept of extending columns in the privilege store becomes very important when on organization has a requirement to grant access to applications and data to users in another group or another domain.

Granting Privileges Across Groups

Introduction

The requirement to grant access from one group to a user in another group comes from the complex ownership arrangements that the supply chain members have.

The supply chain members are the owners of the data (retailer information). They can publish (grant) their privileges to users in other organizations. The design for this is that supply chain members publish data in their hierarchy by:

Granting access to retailers that belongs to their group or to groups downward in their (supply chain member) hierarchy.

Granting access to specific retailers (many retailer ids).

Granting access to retailers within a state or a zip code.

EXAMPLE

The grantor that belongs to 345-supply chain member node publishes the privilege to view order data to user Joe belonging to 123 supply chain member node. What Joe can see, so far, are the retailers the granter can see in his hierarchy, "R1", "R2", "R3" and "R4".

The grantor can narrow down the publishing by specifying a node in his hierarchy, let us say node 456. At this point, the user can see data for "R1", "R3" and "R4".

A "state" or "zip code" can narrow more the publishing.

Figure 90:
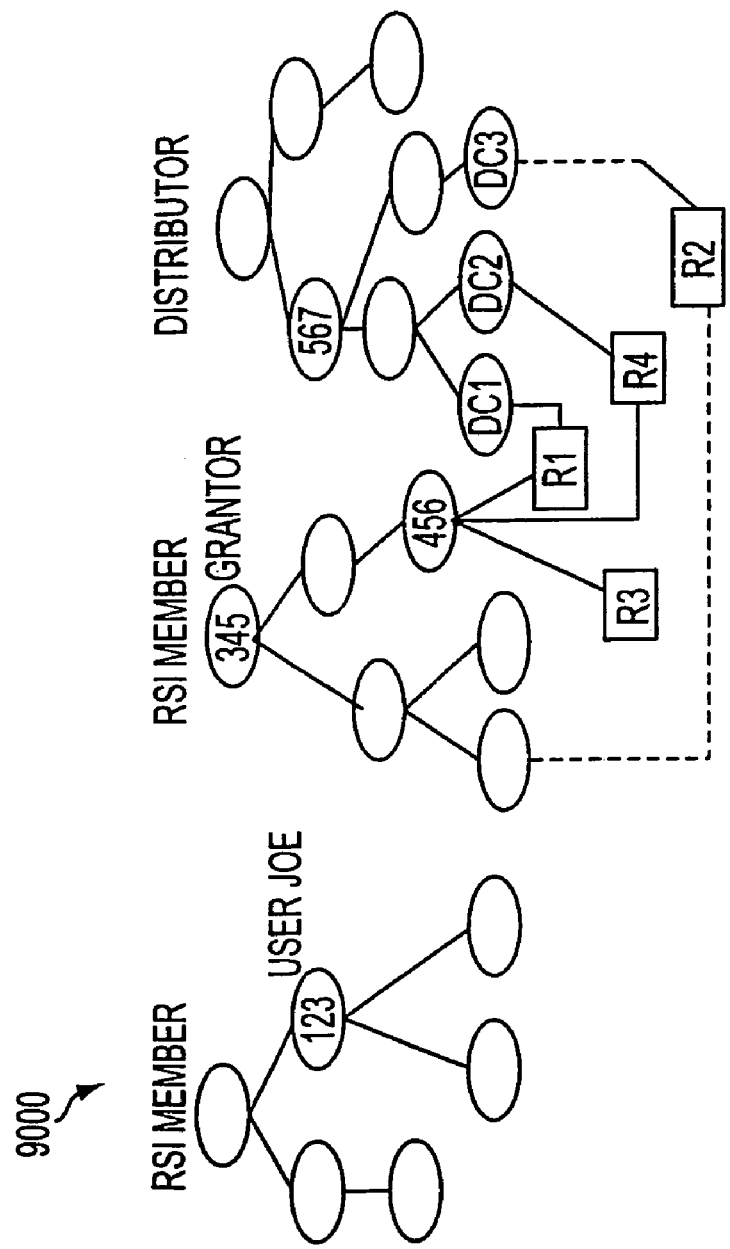
FIG. 90 is a schematic showing the process by which cross-domain access rights are granted.

FIG. 90 is a schematic showing the process 9000 by which cross-domain access rights are granted.

Table 25 shows an example of how the privilege would be written to the central policy management.

TABLE 25

| Group Id | User Id | User Type | Priv. Id | Grantor Id | Restricted Node Id | Restaurant Id(s) | Attributes (state/zip) |
|---|---|---|---|---|---|---|---|
| 123 | Joe | supply chain member | View Order Data | 345 | 456 | | |

Just the node numbers are stored in the directory. When the user is authenticated and accessing applications that need a store list in order to properly enforce data access rules, the custom application written in this alternative must access the hierarchies in the database. From the database, the application translates the intersection of the node ids into a list of valid stores that the user may perform the granted functions. This retailer list is then returned as part of the header strong to the resource requested.

You could even make this more granular by adding attributes for state or zip code associated with the nodes (especially the lowest node, which is a retailer).

Publication Functionality

The following is a list of publication functionality from a supply chain member point of view.

Publish any privilege a user has (and my data span of control) to users that need to perform actions for my retailers.

Publish all my privileges a user have (and my data span of control) to users that need to perform actions for my retailers (mainly for equal partners).

Revoke User Publication

Figure 91:
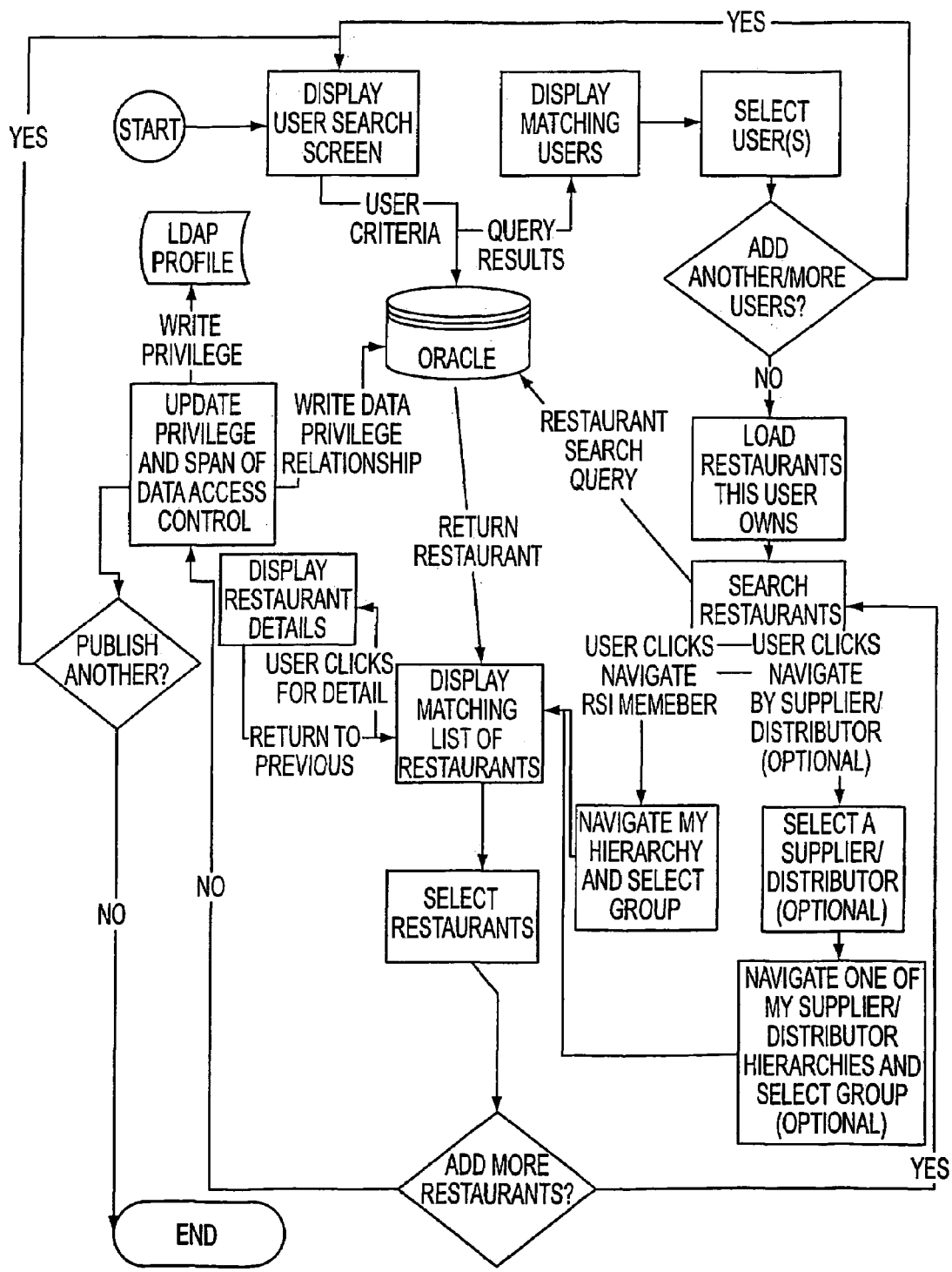
FIG. 91 is a diagram that shows a process flow for an administrative function.

FIG. 91 is a diagram 9100 that shows a process flow for an administrative function. A publication can not be modified, it has to be deleted and then publish again. As with other custom developed community management functionality, a management interface to for granting privileges is required.

Publication Business Rules

A supply chain member can grant access to retailers that belong to their group or to groups downward their hierarchy. A user can see only items at retailer level if he/she got "privilege" published "to him/her. The supply chain member nodes and retailer ids should not be mutually exclusive, as a node can be specified but a retailer may also be specified.

Retailer ids and attributes should be mutual exclusive, either one can be specified, but not both. This is because attributes are restrictive, so by default any store specified must also have that attribute as part of it.

Only the grantor can revoke data publication.

The supply chain member does not publish data to users that belong to supplier or distributor hierarchy.

Suppliers or distributors can see data based on the retailers linked to their hierarchy without the supply chain member specifically publishing data (assuming the application permission has been granted to the supplier/distributor domain by the supply chain coordinator). There is no need for a supplier/distributor to see another supplier/distributor hierarchy data.

The supply chain member can publish data to the supply chain member users.

The supply chain members publish data to another supply chain member user only if the user is not in the same hierarchy with the grantor or if the user is in another branch of the hierarchy than the grantor.

Historical Requirements for Retailer Linkage

A very complex customization of the directory attributes would be to bound all privileges by start and end dates. The reason behind this optional function is that retailers often change hands. It was expressed in the workout sessions that members may need to view historical data for a specific retailer (from both the supplier/distributor side as well as the supply chain member side) even if they not currently own or serve that retailer. There are also legal requirements that may require this ability. Table 26 illustrates an example of this privilege.

TABLE 26

| Group Id | User Id | User Type | Priv. Id | Grantor Id | Restricted Node Id | Retailer Id(s) | Attributes (state/zip) | Start Date | End Date |
|---|---|---|---|---|---|---|---|---|---|
| 123 | Joe | Supply chain member | View Order Data | 345 | 456 | | | Jan. 1, 2000 | Jan. 1, 2001 |

As the number of attributes that need to be used by the application or translated into other information such as retailer numbers increases, so does application load. There are significant impacts on application performance and ease of use, as well as maintainability of both the portal management solution and the applications.

Auto Associate Store Information

Figure 92:
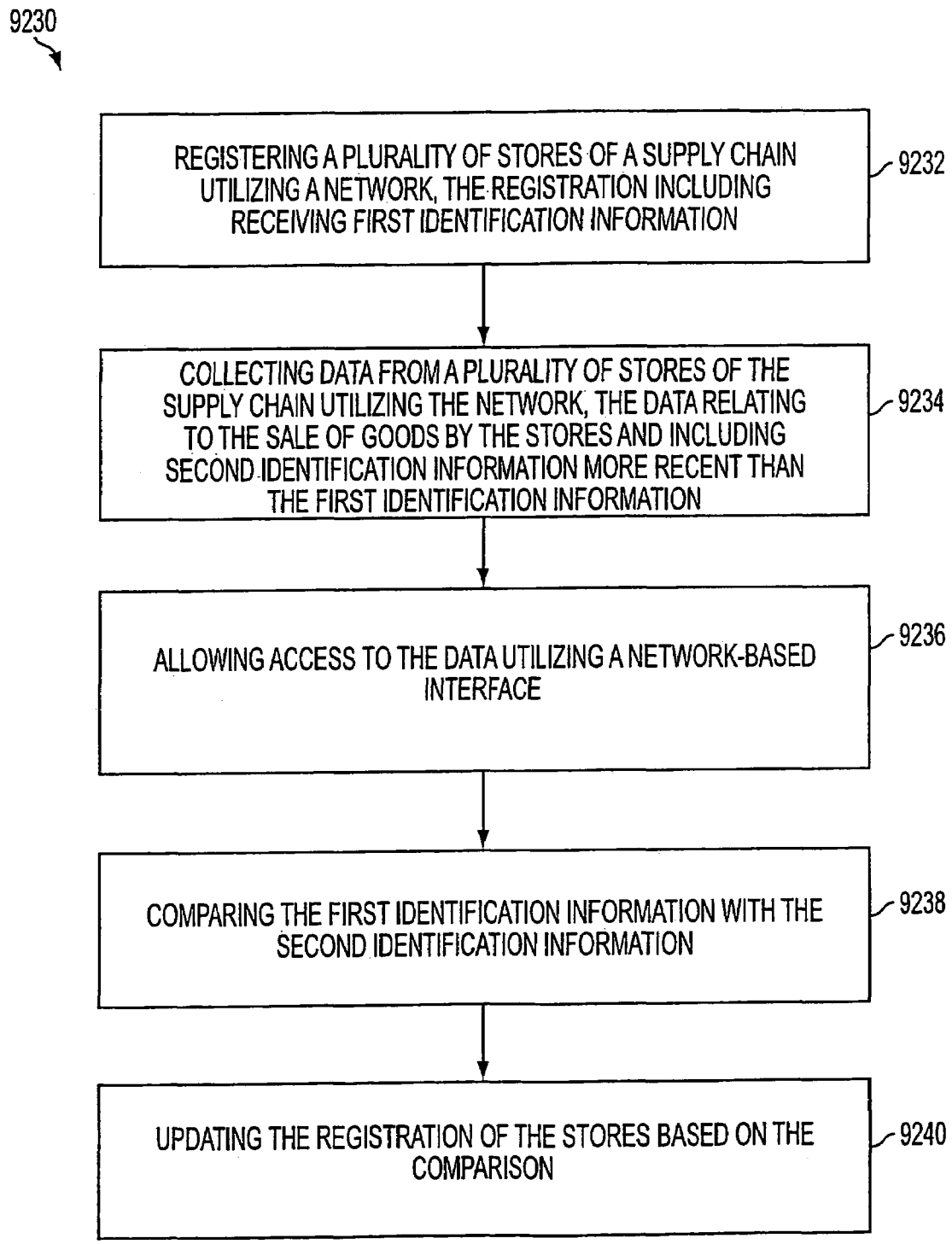
FIG. 92 is a flowchart of a process for updating information in a supply chain management framework in accordance with an embodiment of the present invention.

FIG. 92 is a flowchart of a process 9230 for updating information in a supply chain management framework. A plurality of stores of a supply chain are registered utilizing a network in operation 9232. The registration includes receiving first identification information. Data is collected from a plurality of stores of the supply chain utilizing the network in operation 9234. This data relates to the sale of goods by the stores and includes second identification information more recent than the first identification information. Access to the data is allowed utilizing a network-based interface in operation 9236 so that in operation 9238 the first identification information can be compared with the second identification information in order to allow for the updating of the registration of the stores based on the comparison in operation 9240.

In an aspect, the updating includes updating the first identification information to include the second identification information. In another aspect, the updating includes updating a distributor assigned to the stores based on the comparison. In further aspect, the first information includes a store identification number. In one aspect, the registration is further updated based on the data. In an additional aspect, the network includes the Internet.

The supply chain coordinator receives a load of updated retailer information from the retailer manager. This information is currently batch loaded into the SQL database and updates are made to tables matching retailers to suppliers, distributors, and supply chain members.

A desire is for the supply chain coordinator to automate this maintenance in the portal management solution as well. This is straight forward if the supply chain coordinator continues to use straight cross-reference between retailers and suppliers/distributors as the same tables may probably be accessed by the applications to determine data access in the application. But if hierarchies are used, there may need to be a custom application written to apply the following business rules.

When a new retail outlet is added, the application should check to see if that retailer already exists. If it does not, a new retailer entity should be auto-added to the proper group/the supply chain member node.

Each time new retailer information in the address field arrives, the application may compare the new information to the retailer address information to see if data has changed. If yes, the retailer information is updated.

If the retailer is moved from a group node (deleted or reassigned) and it is the last retailer attached to a group node, the group node and corresponding supply chain member should be auto-deactivated.

Each time new retailer information arrives, the retailer's group/supply chain member information should be compared with the group/supply chain member# the retailer is already associated to. If it is different, the retailer should be reassigned (re-linked) to the appropriate group/supply chain member node. The Auto-add/delete processes may run as appropriate.

One issue may be how to auto-associate a retailer to the proper place in a node. In the design phase, available data elements should be examined to see if it is possible. If not, then there should be an "unattached" node not visible to applications outside of the hierarchy management. When the supply chain coordinator adds a retailer to a supply chain member, that member could assign it to the proper hierarchy point through the distributed administration.

A second issue may be where to associate the new retailer to the distributor or supplier node. There may the ability to pull attributes from the information the supply chain coordinator puts in their database (distribution center number or supplier ship from location). If an attempt is made to auto-associate the new retailer to other domains beyond the supply chain member's, a check process may be required to make sure the auto-association is correct, otherwise unauthorized data access could occur.

Comparison to Requested Functions

In a previous section, the features requested by the supply chain coordinator's community were detailed along with the functions those features imply. Table 27 shows whether functions are provided by this approach along with an explanation.

TABLE 27

| Feature | Y/N | Explanation |
|---|---|---|
| SECURITY | | |
| Lockout user after n unsuccessful logon attempts | Y | Supported |
| Notify administrator of lockouts | Y | Supported |
| On line monitoring | | |
| Provide alternate passwords for lost/forgotten password situations | | |

TABLE 27-continued

| Feature | Y/N | Explanation |
|---|---|---|
| Password expiration; require periodic password changes | Y | Supported |
| Acceptable password length parameters | Y | Supported |
| Ability to assign/select password | Y | Supported (not self-registration) |
| Ability to transfer logon intelligence. | Y | Agent to integrate affiliate sites. |
| Record all activities to the audit log | Y | Supported |
| COMMUNITY MANAGEMENT | | |
| Distributed community administration | Y | Basic in this option. |
| Ability to add, change and delete users. | Y | Supported |
| Ability to assign access to users | Y | Supported |
| Ability to create roles or level of users | Y | Supported |
| Ability to set up default levels of access | Y | Supported |
| Ability to clone and/or access rights | Y | Supported with configuration |
| Mass delete of users | | |
| Ability to copy a user ID | | |
| Ability to export user load information from member backend. | Y | Custom |
| User can be associated with multiple groups. | N | But goal is accomplished with publish privilege feature |
| HIERARCHIES | | |
| Ability to publish rights and privileges across hierarchies. | Y | Custom hierarchies |
| Ability to authorize multiple levels of a hierarchy | Y | Custom hierarchies |
| Ability to manage access against hierarchies | Y | Custom hierarchies |
| Flexible data access and management. | Y | Custom extensions to support application specific data needed to control data access |
| DATA PUBLICATION | | |
| User can view or access data in another group in their domain. | Y | Custom |
| User can view or access data in different domain. | Y | Publication supports this, though only real case is the supply chain coordinator board member, and the supply chain coordinator may handle by system admin having a custom feature to assign access privilege to users instead of publishing privilege across domains |
| POLICY ENFORCEMENT | | |
| Single sign on | Y | Supported |
| Ability to integrate with affiliates (i.e. other 3$^{rd}$ applications that make up the portal). | Y | Supported |
| Ability to interface with other applications: the supply chain coordinator 3$^{rd}$ party Remote hosts Platform independent | Y | Supported |
| Centralized policy management | Y | Supported |
| REPORTING | | |
| The following community management reports were identified: Master user list Click and view access list User with published data authorization (i.e. users in other domains or sub-domains. Usage reports | Y | Custom |

TABLE 27-continued

| Feature | Y/N | Explanation |
|---|---|---|
| Lockout notification | Y | |
| Online monitoring capability | | |
| View audit log | Y | Custom |
| Parameter driven reports | Y | Custom |

Option 4 is the comprehensive community management solution. It requires a lot of customization, a lot of which occurs outside of the SSO/Portal Management solution. It does, however, meet all the functions specified by the supply chain community CTQs.

Cost and Timelines

For option 4, the assumption is that the security management solution software provides hierarchies, hierarchy management, and other customizations detailed in this section. Table 28 is a list of assumed functionality for the purpose of cost and level of effort estimation:

TABLE 28

| Feature List | Option 4: Security Management Solution Software + Custom Administration with Advanced Community Structure |
|---|---|
| Distributed User Administration | Option 3 plus Custom hierarchical community structure at group/role/user level, structure to structure relationship, grant privilege across group, advanced administration features |
| Administrative Audit Trail | Custom User/Session/Application tracking |
| Access Management | Web interface to administer authorization and access control, secure portal management and custom agents. |
| Logon/Password Management | Basic authentication schemes, X.509, tokens, Forms, RADIUS, certificates and SSL. Custom notification and online monitoring |
| Reporting | Custom advanced reporting integrated with monitoring systems |
| Policy Enforcement | Custom extension of the policy |
| Data Management | Custom extension |

Software and Hardware

From a cost standpoint, Option 4 assumes that both option 2 and 3 are already implemented. Therefore, additional software license fees are not required for security management software. Additional hardware is probably required to support the heavy application and database requirements for hierarchies and their use.

The following is an estimated list of resources that may be required to install and configure the security management solution software, develop the custom community management applications, and program custom data structures to provide the functionality in the table above.

1 project manager
1 business analysis
1 system integrator
2 or 3 web/database developers
1 QA
1 security consultant Estimated Project Length The estimated project length is 6–8 months (assumes completion of options 2 and 3)

Network Considerations

The supply chain coordinator can host the web portal itself, co-locate the portal servers at an ISP offering co-location services, or completely outsource the portal management solution (network and servers) to a managed service provider.

Hosting a Secure Portal

From a network view, the following details best practice for configuration of network servers for the portal.

One major issue may be managing a mission-critical network environment where users can execute transactions. The choice of ASP providers must also be a consideration.

Managed Services

A third option is to outsource all port, router, network and platform management. This is called managed services. There is a difference between managing up to the platform (OS) and the actual portal management solution.

The options for managed services to the platform level are the same players. Again, Level 3 is the only large national player in the Miami market. They do not offer managed services on their own, but have a partner program to provide these services. The actual partner for the southern region would need to be confirmed, but it is probably the same company that provides this service in the mid-Atlantic region, named AiNET. A company like AiNET would not have knowledge of the portal management solution itself, but would manage everything else from a security view including attacks against the network and the machines.

The next level of managed service includes actually operating and configuring the portal management solution. Companies in this class have resources already trained in the portal management solution and can take ownership of delivering the software and operating it for a community. Each provider has a number of partners in this area; GE Global Exchange Services is one of these companies. GXS provides managed Netegrity solutions along with others. Securant has many system integrator partners, though it is hard to tell who specializes in hosting and operating their solutions.

Application Security

Many of the applications that may sit behind the portal may be developed and operated by other organizations. The following details some recommendations for applications built on the NT platform using Microsoft framework and for evaluating ASP provided applications' security.

Recommended Policies
    Objects must be cleared before they are reused
    Errors during clearing must be handled in a way that ensures objects are not reused without clearing
    Browser caching directives must be used for sensitive pages
    Use of temporary files must be threadsafe
    Temporary files must be removed when no longer required Approaches
    Clear after use
    Clear before use
    Use finally to ensure that objects are cleared Vulnerabilities
    Database connection is reused, revealing another user's data
    Object pool includes one user's page with another's user page
    Caching algorithm inappropriately matches a request with a response containing another user's data
    Code Quality Recommended Policies
    All code must conform to a consistent style guideline
    All code must be documented
    Intentionally complex code must be justified
    "Easter eggs" shall not be included in the code Approaches
    Use style guideline from www.microsoft.com
    Use tools to enforce style guidelines
    Use design reviews to catch problems early
    Use peer reviews to prevent hidden problems Vulnerabilities
    The more flaws the more likely one is to be exploitable by an attacker
    Poor code quality can rise to the level of a security problem
    Concurrent Programming Recommended Policies
    No thread of execution within the application should be able to substantially affect any other thread Approaches
    Synchronize access to all shared resources, including files and the session
    Eliminate all class and instance variables, unless final
    SingleThreadModel is not recommended for performance reasons Vulnerabilities
    Information in shared resources can be inadvertently
    Debugging is difficult as these problems can be difficult to reproduce
    Database Access Recommended Policies
    Parameters used in database queries must not be able to modify the intended query
    Results from queries must match the expected results
    Reliance on database permissions must be minimized and explicitly identified in the implementation
    The Username and password used to access the database must have the minimum amount of privilege required by the application Approaches
    Single encapsulated library for accessing databases
    Prepared statements should be used instead of ordinary statements Vulnerabilities
    Queries can be modified to reveal data or corrupt database
    Debugging and Testing Recommended Policies
    Code that is not used must be eliminated
    System.output.println( ) must not be used Approaches
    Use an assertions framework
    Keep testing code separate from production Vulnerabilities
    High likelihood that this code may inadvertently get enabled
    Security Organization and Metrics
    Security Roles
    Chief Security Officer Develop Policy, Awareness and Training
    Define and Continuously Revise Corporate Policy and Standards
    Lead Company Wide Awareness and Training Program Continuous Security Risk Assessing and Monitoring
    Enhance Assessment Tools
    Develop Security Dashboards and Scorecards
    Facilitate Session i Champion New Security Initiatives
    Resource Planning and Budgeting Drive Business Specific Security Strategic Planning
    Align Security Strategy with Business Objectives (e-commerce)
    Resource Planning and Budgeting Owner of Security Measurements
    Session i, Security Self-Assessment, Corporate and Business Specific Security Measurements Champion Policy Adoption and Training
    Take Security to the Masses
    Security Manager Lead and Own New Security Initiatives
    Select and Package Latest Technology for New Security Initiatives
    Coordinate with Businesses to Rollout Initiatives Deliver Company-Wide Architecture and Processes
    Define Technical Security Infrastructure (Single Sign-On, Intrusion Detection, Digital Certificates, VPN, etc)

Provide Technical Consulting to Businesses
    Assist Business to Resolve Business Specific Security Issues
    Security Administrator(s)
    Multiple people (Finance, IT, or distributed)

Project Execution of Technology and Process
    Responsible for Implementation in Business Site Administration and Operation of Daily IT Security Activities
    Perform IT Security Tasks, Monitor Outsourcing Vendors and Coordinate with 3rd Parties
        Security Review Structure The new technological infrastructure and its associated electronic reporting and feedback systems equips retailer management with accurate, timely, and previously unavailable information from the Supply Chain on sales, marketing and other performance indicators allow Supply Chain management to fully engage in managing supply and distribution processes and channels toward identified and agreed strategic objectives provide franchisees and retailers with the Supply Chain information they need to operate efficiently and make effective management decisions minimally impacts the resources of Supply Chain management.

With Supply Chain management assuming full responsibility for managing the fundamentals of the Supply Chain system, Supply Chain participants are strategically positioned to focus on the six business priorities that have been identified: operational excellence, boosting sales growth, focusing resources, discovering the essence of the Brand, image transformation and revitalizing franchisee relations.

Supply Chain Management

Figure 93:
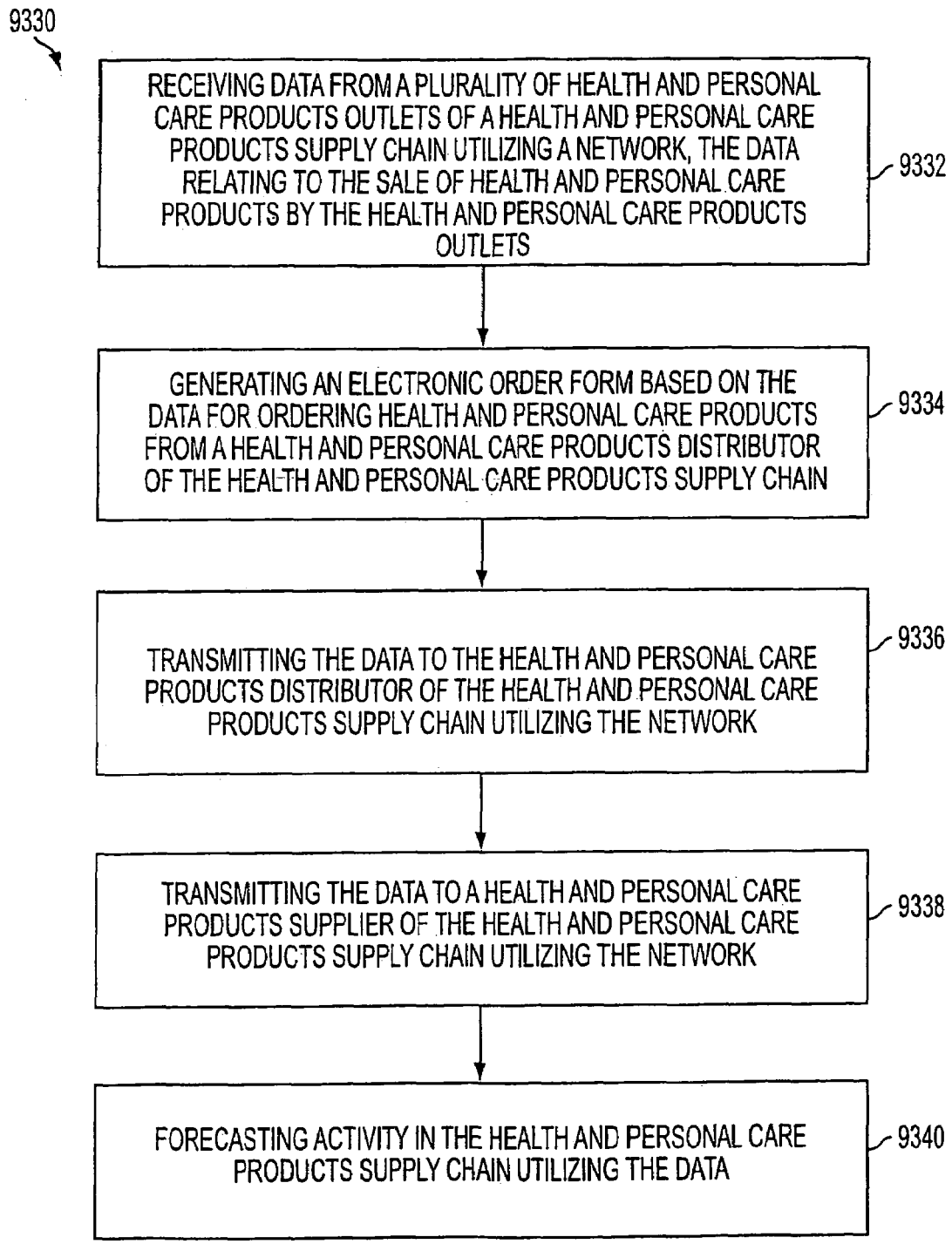
FIG. 93 is a flowchart of a process for managing a health and personal care products supply chain utilizing a network in accordance with an embodiment of the present invention.

FIG. 93 is a flowchart of a process 9330 for managing a health and personal care products supply chain utilizing a network. Such health and personal care products include pharmaceuticals, cosmetics, opticals, health carpe products, etc. A network is utilized in operation 9332 to receive data from a plurality of health and personal care products outlets of a health and personal care products supply chain in which the data relates to the sale of health and personal care products by the health and personal care products outlets. An electronic order form is generated in operation 9334 based on the data for ordering health and personal care products from a health and personal care products distributor of the health and personal care products supply chain. The data is transmitted via the network to the health and personal care products distributor of the health and personal care products supply chain in operation 9336. The data is also transmitted to a health and personal care products supplier of the health and personal care products supply chain utilizing the network in operation 9338. Additionally, activity in the health and personal care products supply chain is forecast utilizing the data in operation 9340.

In one aspect, the data may be parsed to match each of a plurality of health and personal care products distributors and health and personal care products suppliers. As a further aspect, the data may be made accessible to the health and personal care products outlets, the health and personal care products distributor, the health and personal care products supplier via a network-based interface. As an additional aspect, the data may be accessible to the health and personal care products distributor and the health and personal care products supplier only after verification of an identity thereof. In another aspect, the network may include the Internet. In a further aspect, the health and personal care products outlets, the health and personal care products distributor, and the health and personal care products supplier each may forecast utilizing the data.

Figure 94:
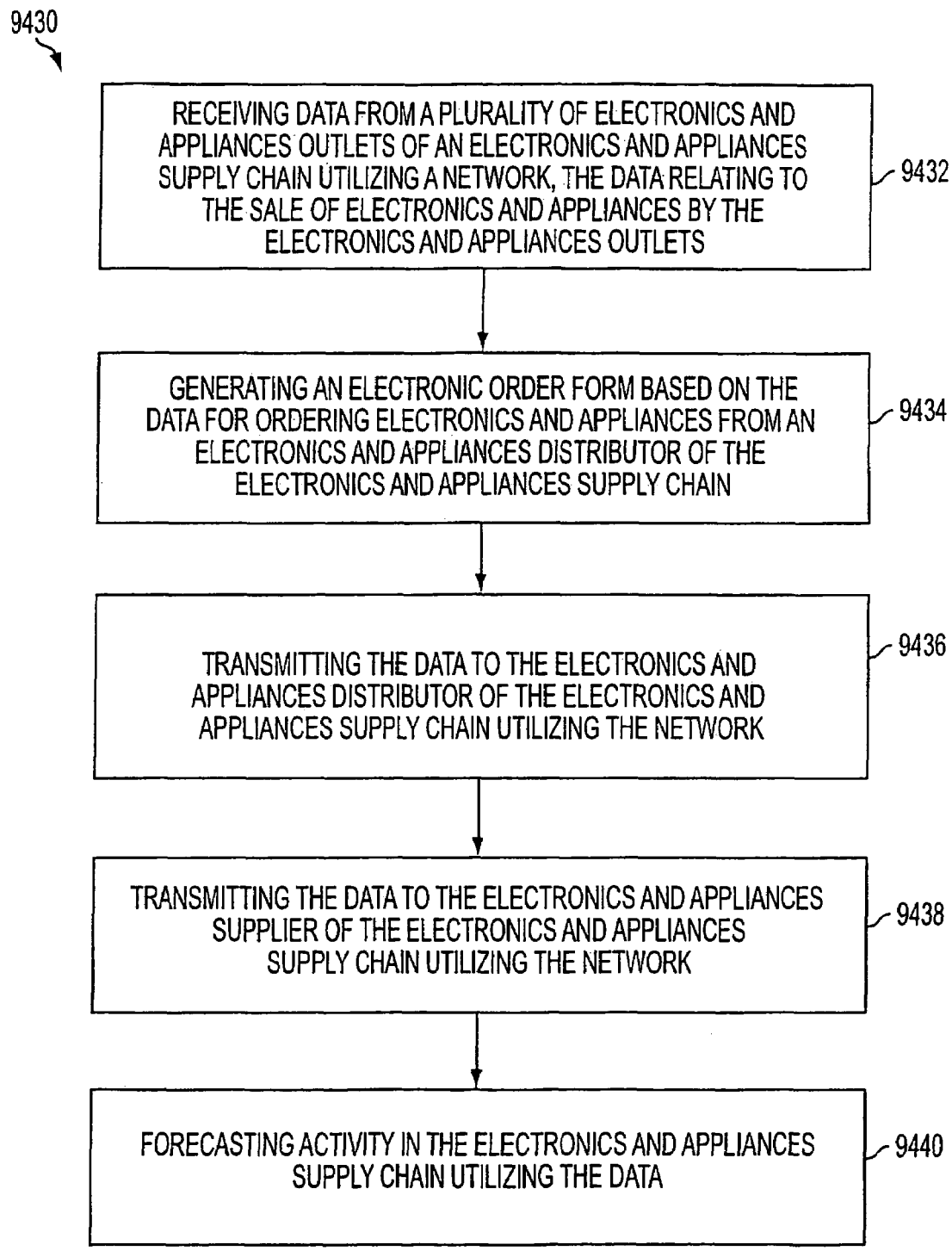
FIG. 94 is a flowchart of a process for managing an electronics and appliances supply chain utilizing a network in accordance with an embodiment of the present invention.

FIG. 94 is a flowchart of a process 9430 for managing an electronics and appliances supply chain utilizing a network. A network is utilized in operation 9432 to receive data from a plurality of computer product outlets of a electronics and appliances supply chain in which the data relates to the sale of computer product by the computer product outlets. An electronic order form is generated in operation 9434 based on the data for ordering computer product from a computer product distributor of the electronics and appliances supply chain. The data is transmitted via the network to the computer product distributor of the electronics and appliances supply chain in operation 9436. The data is also transmitted to a computer product supplier of the electronics and appliances supply chain utilizing the network in operation 9438. Additionally, activity in the electronics and appliances supply chain is forecast utilizing the data in operation 9440.

In one aspect, the data may be parsed to match each of a plurality of electronics and appliances distributors and electronics and appliances suppliers. In another aspect, the data may be made accessible to the electronics and appliances outlets, the electronics and appliances distributor, the electronics and appliances supplier via a network-based interface. In an additional aspect, the data may be accessible to the electronics and appliances distributor and the electronics and appliances supplier only after verification of an identity thereof. In another aspect, the network may include the Internet. In a further aspect, the electronics and appliances outlets, the electronics and appliances distributor, and the electronics and appliances supplier each may forecast utilizing the data.

Figure 95:
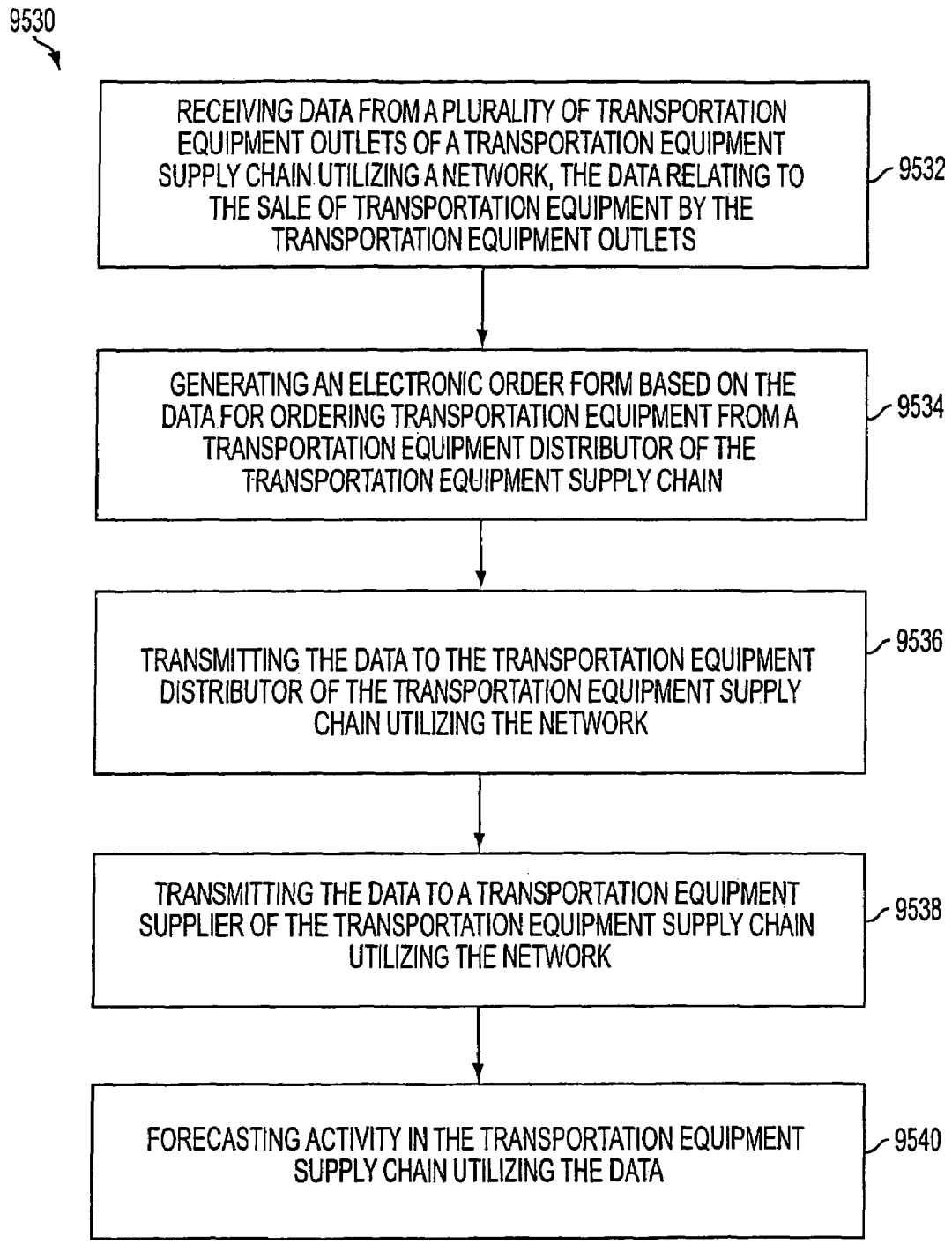
FIG. 95 is a flowchart of a process for managing a transportation equipment supply chain utilizing a network in accordance with an embodiment of the present invention.

FIG. 95 is a flowchart of a process 9530 for managing a transportation equipment supply chain utilizing a network. Transportation equipment can include such things as vehicles, automobiles, motor vehicles, aircraft, watercraft, and the accompanying parts and supplies for each of these, such as engine parts, maintenance supplies (filters, belts, hoses, etc.), washing supplies, etc. A network is utilized in operation 9532 to receive data from a plurality of transportation equipment outlets of a transportation equipment supply chain in which the data relates to the sale of transportation equipment by the transportation equipment outlets. An electronic order form is generated in operation 9534 based on the data for ordering transportation equipment from a transportation equipment distributor of the transportation equipment supply chain. The data is transmitted via the network to the transportation equipment distributor of the transportation equipment supply chain in operation 9536. The data is also transmitted to a transportation equipment supplier of the transportation equipment supply chain utilizing the network in operation 9538. Additionally, activity in the transportation equipment supply chain is forecast utilizing the data in operation 9540.

In one aspect, the data may be parsed to match each of a plurality of transportation equipment distributors and transportation equipment suppliers. In another aspect, the data may be made accessible to the transportation equipment outlets, the transportation equipment distributor, the transportation equipment supplier via a network-based interface. In an additional aspect, the data may be accessible to the transportation equipment distributor and the transportation equipment supplier only after verification of an identity thereof. In another aspect, the network may include the Internet. In a further aspect, the transportation equipment outlets, the transportation equipment distributor, and the transportation equipment supplier each may forecast utilizing the data.

Figure 96:
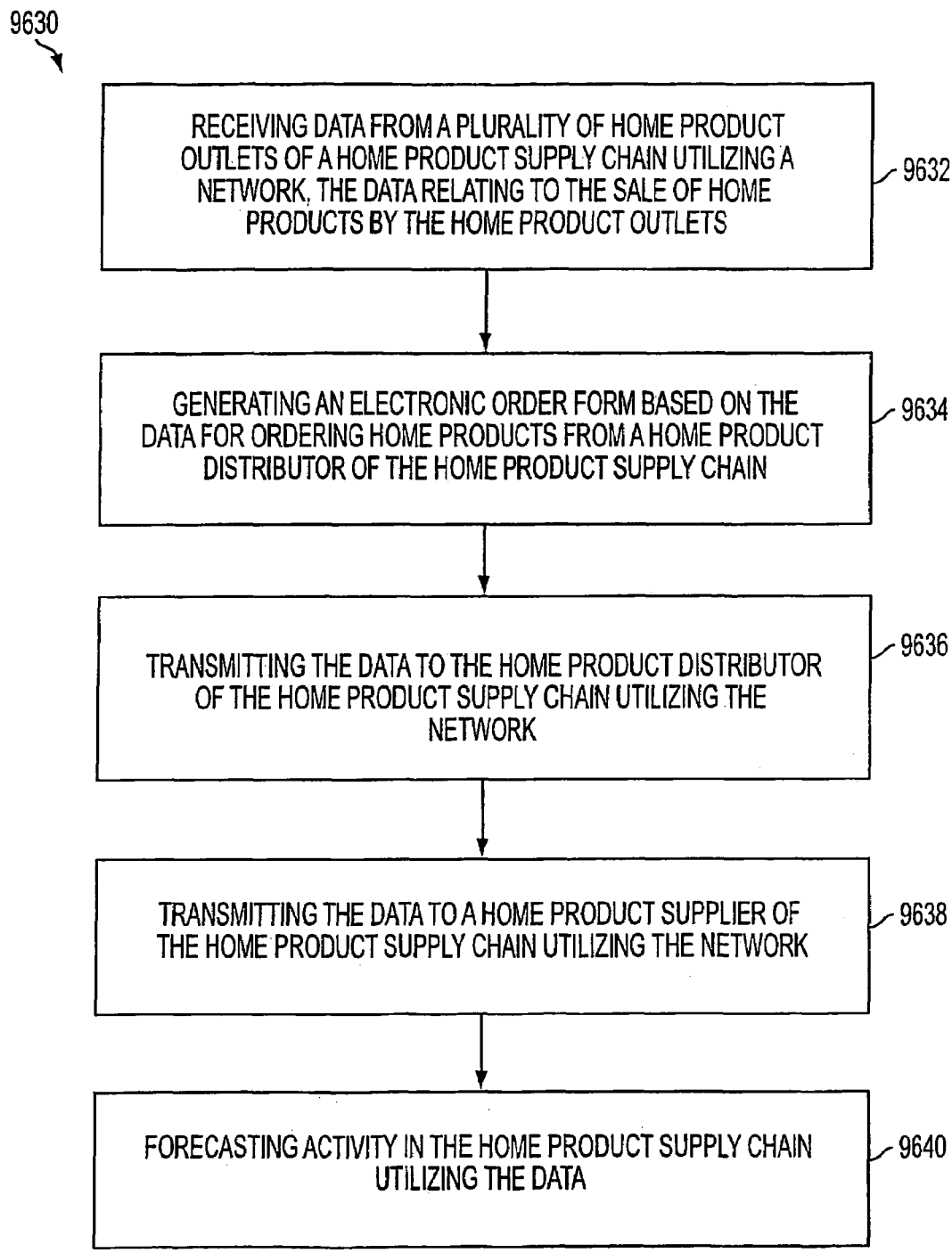
FIG. 96 is a flowchart of a process for managing a home products supply chain utilizing a network in accordance with an embodiment of the present invention.

FIG. 96 is a flowchart of a process 9630 for managing a home products supply chain utilizing a network. Home products can include, for example, building materials, garden equipment and supplies, home furnishings and coverings, furniture, etc. A network is utilized in operation 9632 to receive data from a plurality of home products outlets of a home products supply chain in which the data relates to the sale of home products by the home products outlets. An electronic order form is generated in operation 9634 based on the data for ordering home products from a home products distributor of the home products supply chain. The data is transmitted via the network to the home products distributor of the home products supply chain in operation 9636. The data is also transmitted to a home products supplier of the home products supply chain utilizing the network in operation 9638. Additionally, activity in the home products supply chain is forecast utilizing the data in operation 9640.

In one aspect, the data may be parsed to match each of a plurality of home products distributors and home products suppliers. As a further aspect, the data may be made accessible to the home products outlets, the home products distributor, the home products supplier via a network-based interface. As an additional aspect, the data may be accessible to the home products distributor and the home products supplier only after verification of an identity thereof. In another aspect, the network may include the Internet. In a further aspect, the home products outlets, the home products distributor, and the home products supplier each may forecast utilizing the data.

Figure 97:
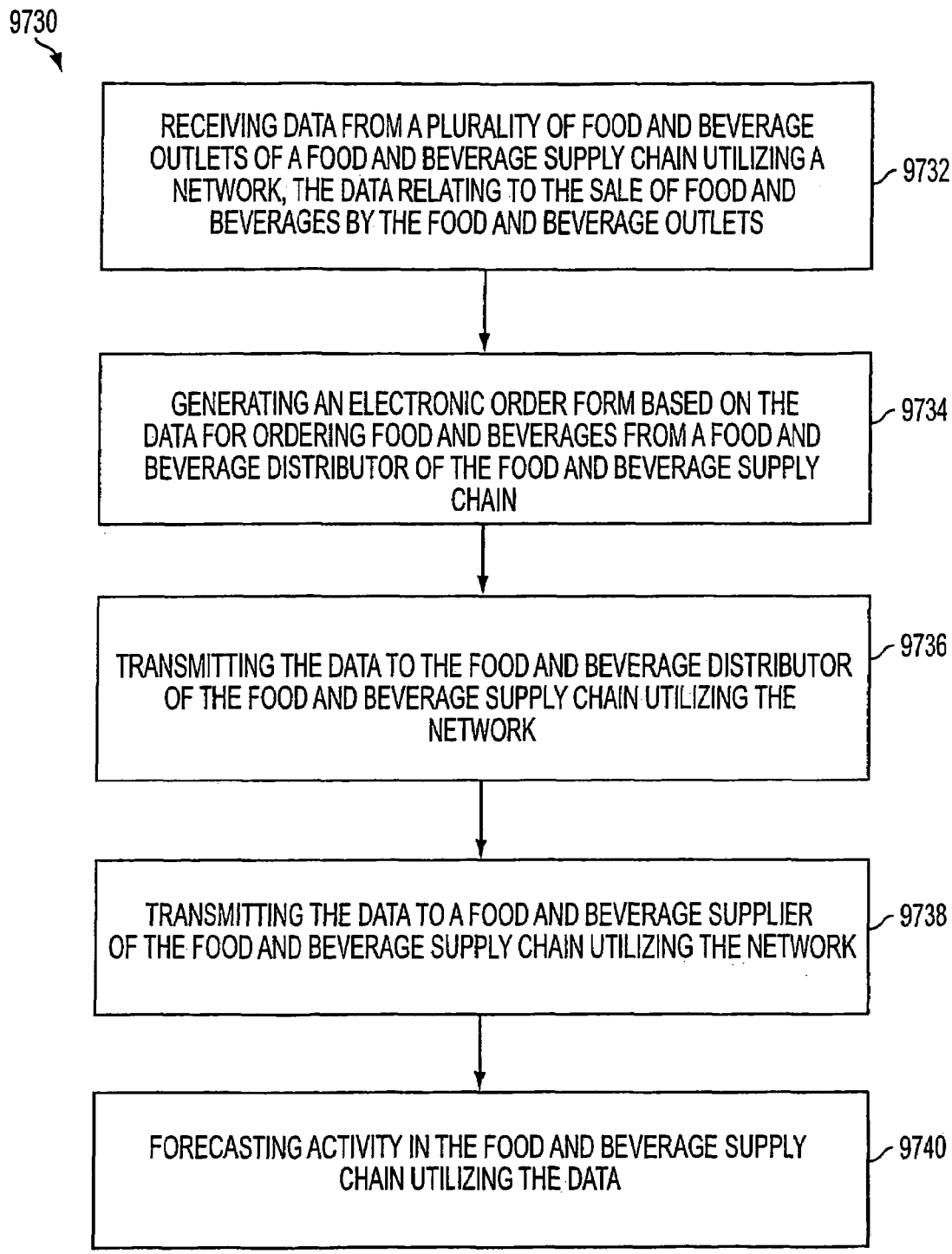
FIG. 97 is a flowchart of a process for managing a food and beverage supply chain utilizing a network in accordance with an embodiment of the present invention.

FIG. 97 is a flowchart of a process 9730 for managing a food and beverage supply chain utilizing a network. A network is utilized in operation 9732 to receive data from a plurality of food and beverage outlets of a food and beverage supply chain in which the data relates to the sale of food and beverage by the food and beverage outlets. An electronic order form is generated in operation 9734 based on the data for ordering food and beverage from a food and beverage distributor of the food and beverage supply chain. The data is transmitted via the network to the food and beverage distributor of the food and beverage supply chain in operation 9736. The data is also transmitted to a food and beverage supplier of the food and beverage supply chain utilizing the network in operation 9738. Additionally, activity in the food and beverage supply chain is forecast utilizing the data in operation 9740.

In one aspect, the data may be parsed to match each of a plurality of food and beverage distributors and food and beverage suppliers. In another aspect, the data may be made accessible to the food and beverage outlets, the food and beverage distributor, the food and beverage supplier via a network-based interface. In an additional aspect, the data may be accessible to the food and beverage distributor and the food and beverage supplier only after verification of an identity thereof. In another aspect, the network may include the Internet. In a further aspect, the food and beverage outlets, the food and beverage distributor, and the food and beverage supplier each may forecast utilizing the data.

Figure 98:
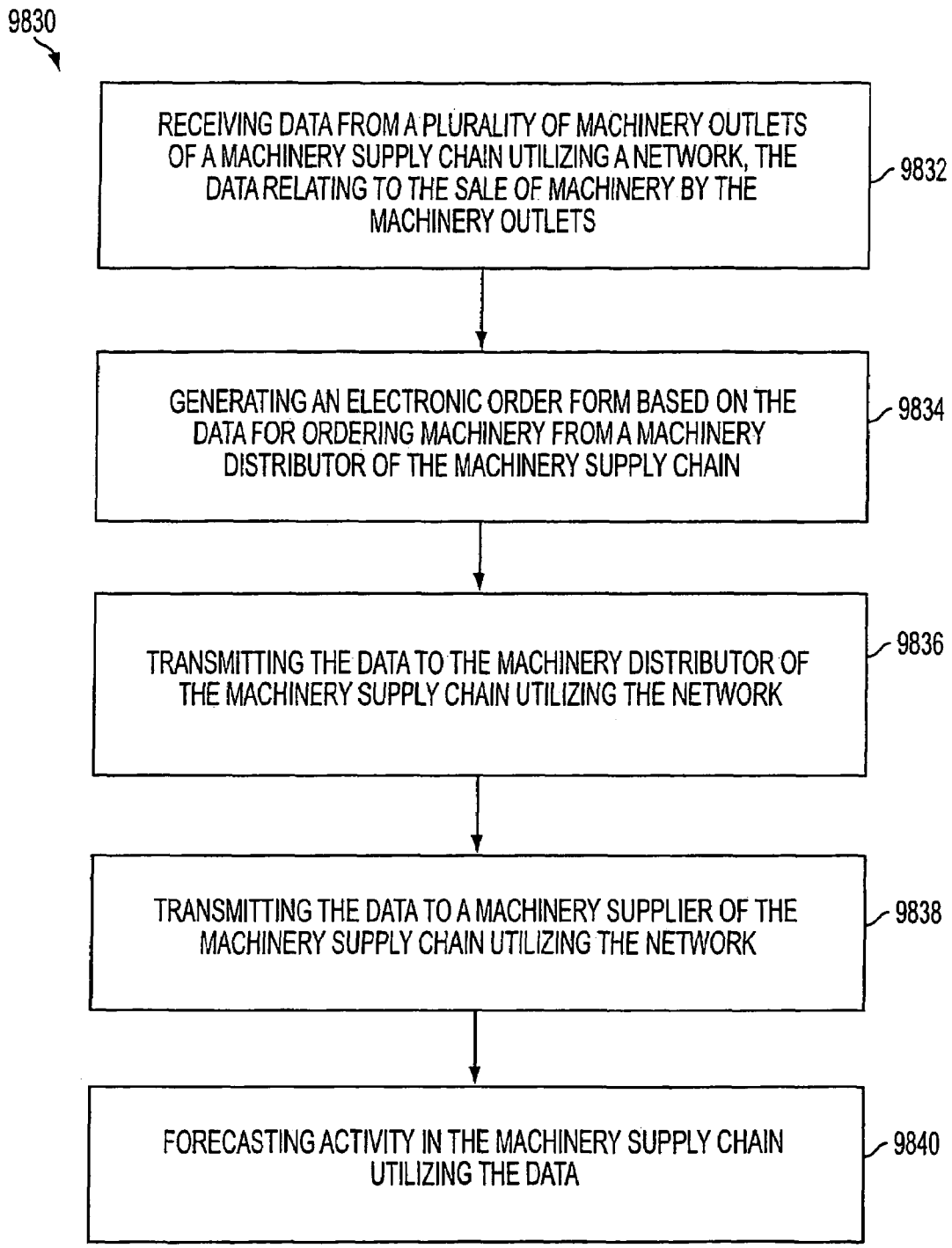
FIG. 98 is a flowchart of a process for managing a machinery supply chain utilizing a network in accordance with an embodiment of the present invention.

FIG. 98 is a flowchart of a process 9830 for managing a machinery supply chain utilizing a network. A network is utilized in operation 9832 to receive data from a plurality of machinery outlets of a machinery supply chain in which the data relates to the sale of machinery by the machinery outlets. An electronic order form is generated in operation 9834 based on the data for ordering machinery from a machinery distributor of the machinery supply chain. The data is transmitted via the network to the machinery distributor of the machinery supply chain in operation 9836. The data is also transmitted to a machinery supplier of the machinery supply chain utilizing the network in operation 9838. Additionally, activity in the machinery supply chain is forecast utilizing the data in operation 9840.

In one aspect, the data may be parsed to match each of a plurality of machinery distributors and machinery suppliers. In another aspect, the data may be made accessible to the machinery outlets, the machinery distributor, the machinery supplier via a network-based interface. In an additional aspect, the data may be accessible to the machinery distributor and the machinery supplier only after verification of an identity thereof. In another aspect, the network may include the Internet. In a further aspect, the machinery outlets, the machinery distributor, and the machinery supplier each may forecast utilizing the data.

Figure 99:
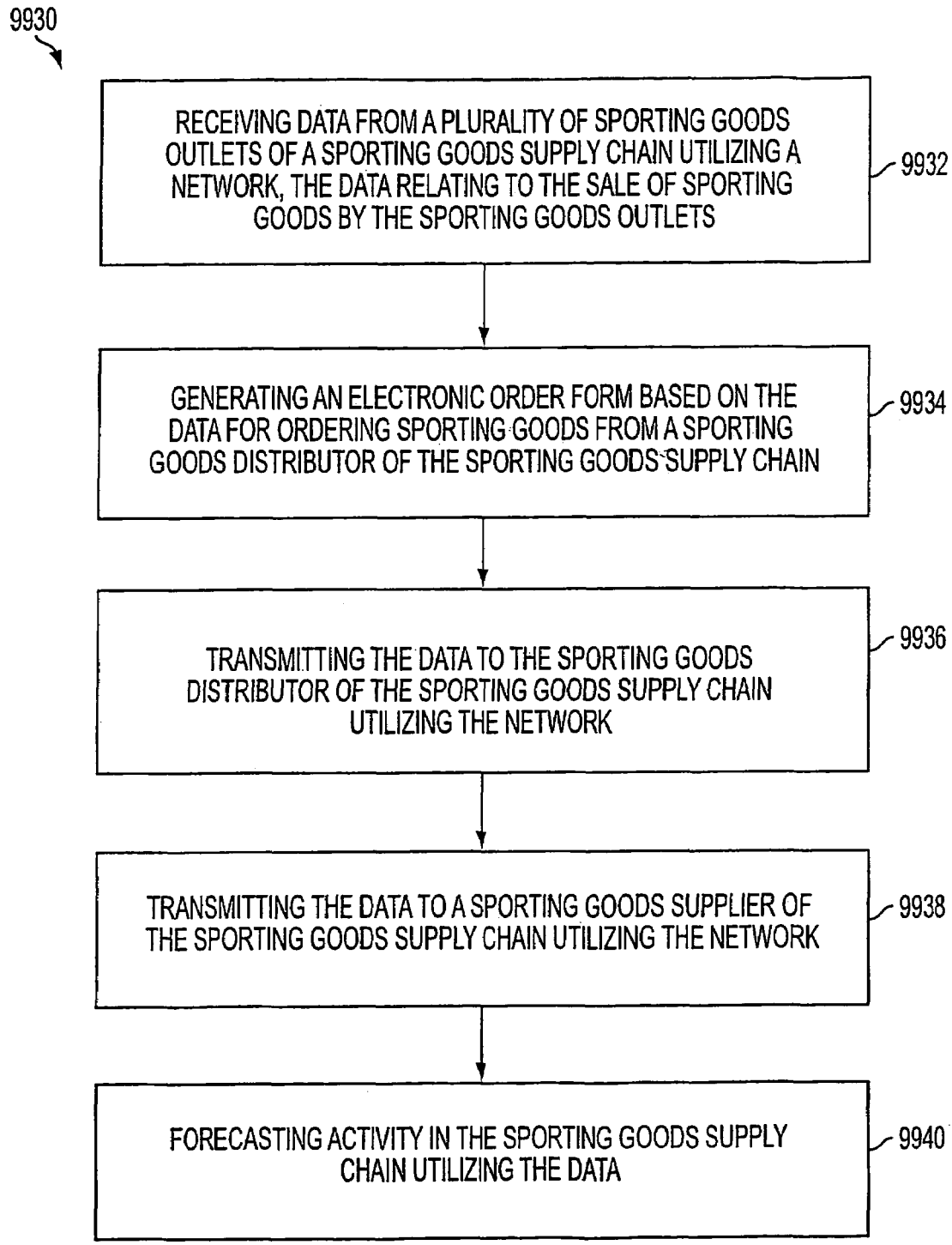
FIG. 99 is a flowchart of a process for managing an sporting good supply chain utilizing a network in accordance with an embodiment of the present invention.

FIG. 99 is a flowchart of a process 9930 for managing a sporting goods supply chain utilizing a network. A network is utilized in operation 9932 to receive data from a plurality of sporting goods outlets of a sporting goods supply chain in which the data relates to the sale of sporting goods by the sporting goods outlets. An electronic order form is generated in operation 9934 based on the data for ordering sporting goods from a sporting goods distributor of the sporting goods supply chain. The data is transmitted via the network to the sporting goods distributor of the sporting goods supply chain in operation 9936. The data is also transmitted to a sporting goods supplier of the sporting goods supply chain utilizing the network in operation 9938. Additionally, activity in the sporting goods supply chain is forecast utilizing the data in operation 9940.

In one aspect, the data may be parsed to match each of a plurality of sporting goods distributors and sporting goods suppliers. In another aspect, the data may be made accessible to the sporting goods outlets, the sporting goods distributor, the sporting goods supplier via a network-based interface. In an additional aspect, the data may be accessible to the sporting goods distributor and the sporting goods supplier only after verification of an identity thereof. In another aspect, the network may include the Internet. In a further aspect, the sporting goods outlets, the sporting goods distributor, and the sporting goods supplier each may forecast utilizing the data.

Figure 100:
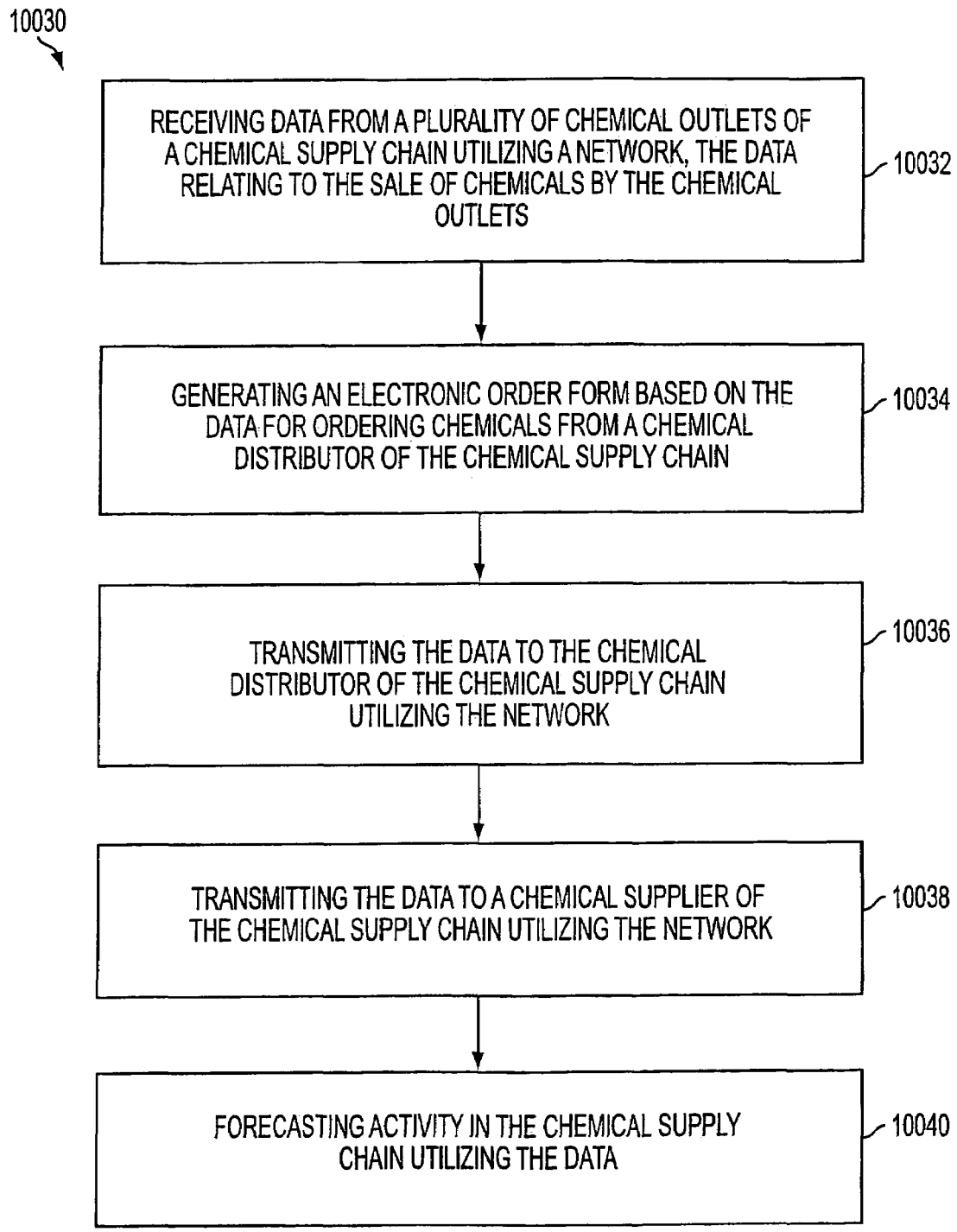
FIG. 100 is a flowchart of a process for managing a chemical supply chain utilizing a network in accordance with an embodiment of the present invention.

FIG. 100 is a flowchart of a process 10030 for managing a chemical supply chain utilizing a network. A network is utilized in operation 10032 to receive data from a plurality of chemical outlets of a chemical supply chain in which the data relates to the sale of chemical by the chemical outlets. An electronic order form is generated in operation 10034 based on the data for ordering chemical from a chemical distributor of the chemical supply chain. The data is transmitted via the network to the chemical distributor of the chemical supply chain in operation 10036. The data is also transmitted to a chemical supplier of the chemical supply chain utilizing the network in operation 10038. Additionally, activity in the chemical supply chain is forecast utilizing the data in operation 10040.

In one aspect, the data may be parsed to match each of a plurality of chemical distributors and chemical suppliers. As a further aspect, the data may be made accessible to the chemical outlets, the chemical distributor, the chemical supplier via a network-based interface. As an additional aspect, the data may be accessible to the chemical distributor and the chemical supplier only after verification of an identity thereof. In another aspect, the network may include the Internet. In a further aspect, the chemical outlets, the chemical distributor, and the chemical supplier each may forecast utilizing the data.

Figure 101:
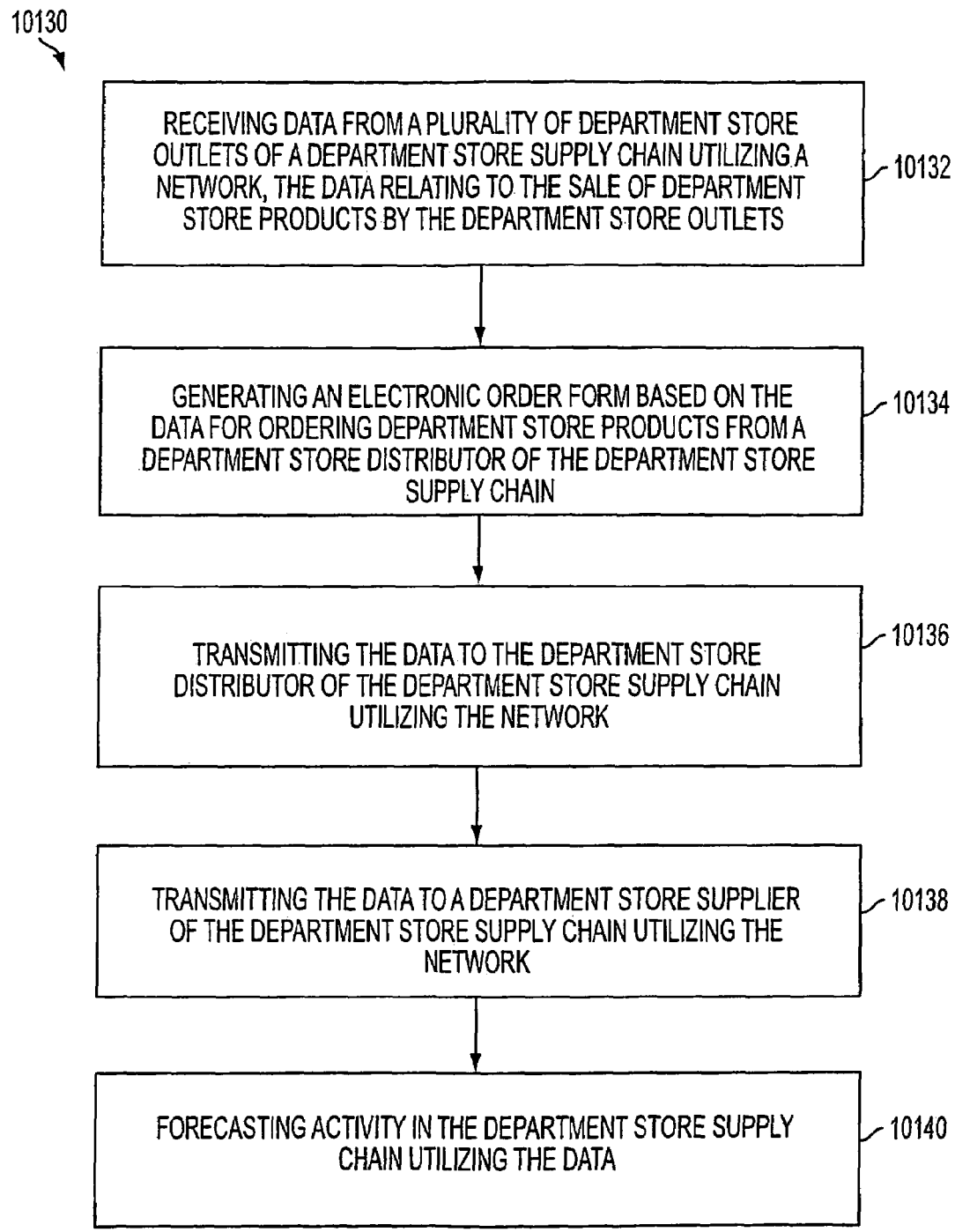
FIG. 101 is a flowchart of a process for managing a department store supply chain utilizing a network in accordance with an embodiment of the present invention.

FIG. 101 is a flowchart of a process 10130 for managing a department store supply chain utilizing a network. A network is utilized in operation 10132 to receive data from a plurality of department store outlets of a department store supply chain in which the data relates to the sale of department store by the department store outlets. An electronic order form is generated in operation 10134 based on the data for ordering department store from a department store distributor of the department store supply chain. The data is transmitted via the network to the department store distributor of the department store supply chain in operation 10136. The data is also transmitted to a department store supplier of the department store supply chain utilizing the network in operation 10138. Additionally, activity in the department store supply chain is forecast utilizing the data in operation 10140.

In one aspect, the data may be parsed to match each of a plurality of department store distributors and department store suppliers. As a further aspect, the data may be made accessible to the department store outlets, the department store distributor, the department store supplier via a network-based interface. As an additional aspect, the data may be accessible to the department store distributor and the department store supplier only after verification of an identity thereof. In another aspect, the network may include the Internet. In a further aspect, the department store outlets, the department store distributor, and the department store supplier each may forecast utilizing the data.

Figure 102A:
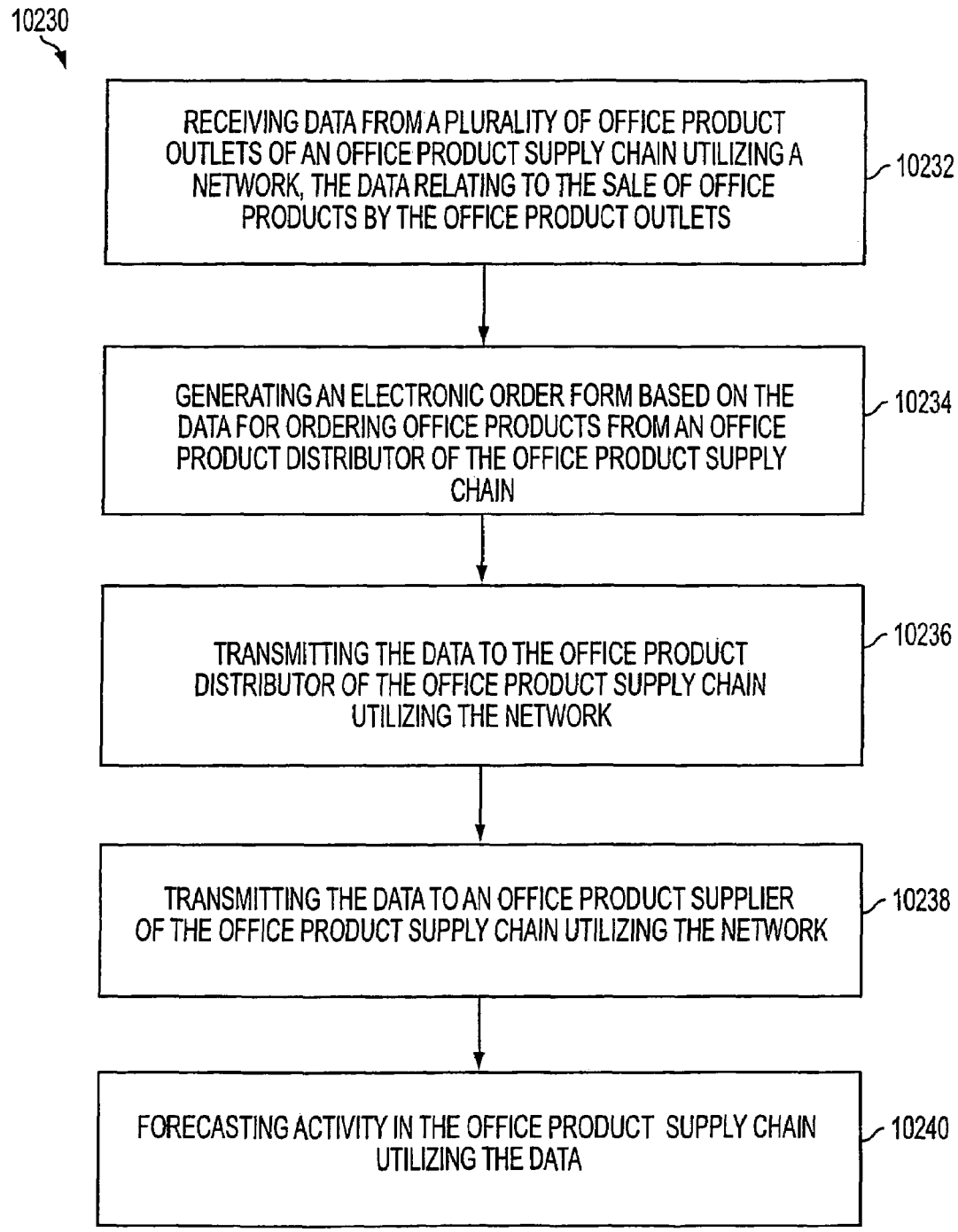
FIG. 102A is a flowchart of a process for managing an office product supply chain utilizing a network in accordance with an embodiment of the present invention.

FIG. 102A is a flowchart of a process 10230 for managing an office product supply chain utilizing a network. Note that office products can include, for example, furniture as well as items typically referred to as office supplies. A network is utilized in operation 10232 to receive data from a plurality of office product outlets of an office product supply chain in which the data relates to the sale of office product by the office product outlets. An electronic order form is generated in operation 10234 based on the data for ordering office product from an office product distributor of the office product supply chain. The data is transmitted via the network to the office product distributor of the office product supply chain in operation 10236. The data is also transmitted to an office product supplier of the office product supply chain utilizing the network in operation 10238. Additionally, activity in the office product supply chain is forecast utilizing the data in operation 10240.

In one aspect, the data may be parsed to match each of a plurality of office product distributors and office product suppliers. As a further aspect, the data may be made accessible to the office product outlets, the office product distributor, the office product supplier via a network-based interface. As an additional aspect, the data may be accessible to the office product distributor and the office product supplier only after verification of an identity thereof. In another aspect, the network may include the Internet. In a further aspect, the office product outlets, the office product distributor, and the office product supplier each may forecast utilizing the data.

Figure 102B:
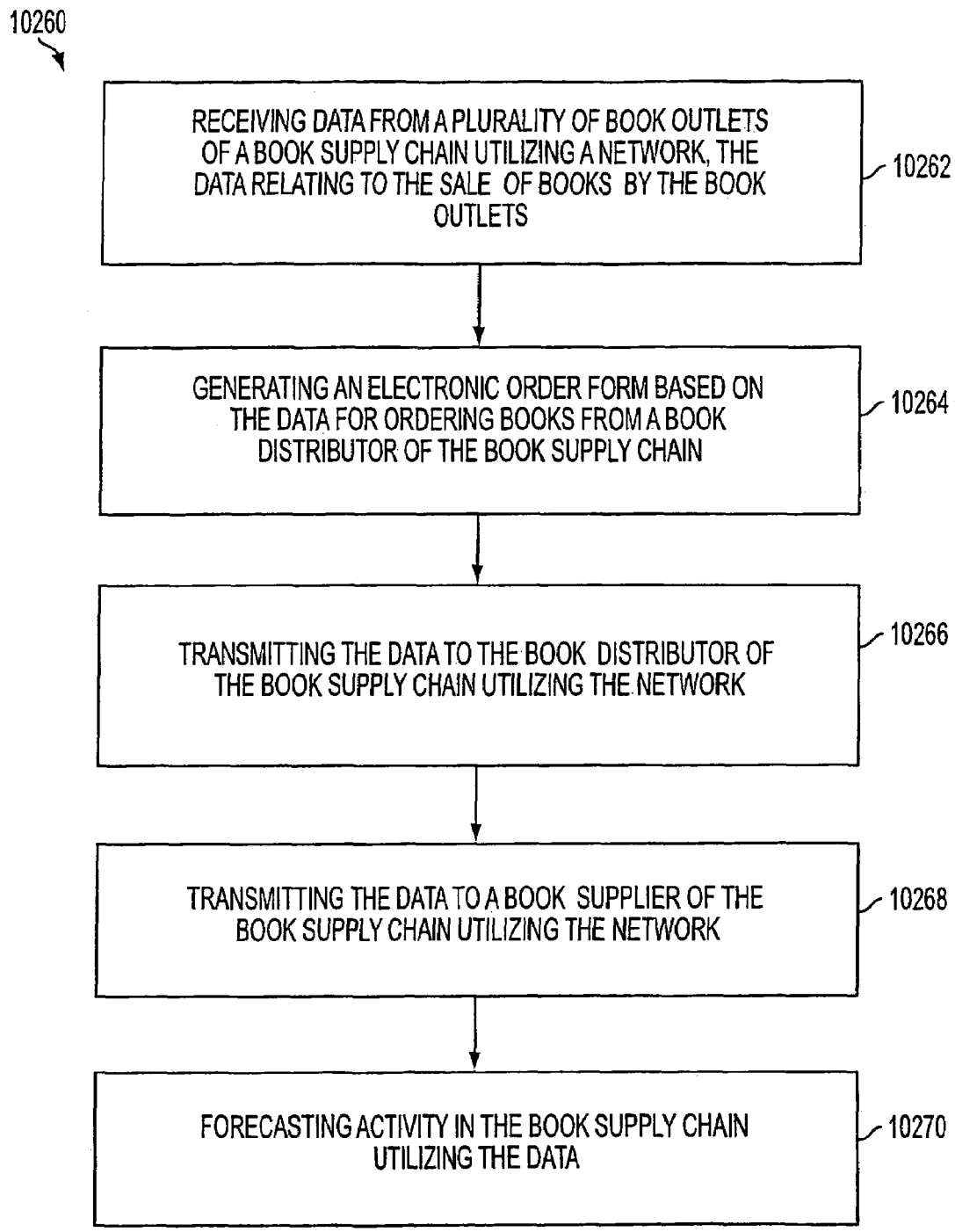
FIG. 102B is a flow diagram of a process for managing a book supply chain utilizing a network according to one embodiment of the present invention.

FIG. 102B is a flow diagram of a process 10260 for managing a book supply chain utilizing a network. In operation 10262, a network is utilized to receive data from a plurality of book outlets of a book supply chain in which the data relates to the sale of books by the book outlets. In operation 10264, an electronic order form is generated based on the data for ordering book from a book distributor of the book supply chain. In operation 10266, the data is transmitted via the network to the book distributor of the book supply chain. In operation 10268, the data is also transmitted to a book supplier of the book supply chain utilizing the network. In operation 10270, activity in the book supply chain is forecast utilizing the data.

In one aspect, the data may be parsed to match each of a plurality of book distributors and book suppliers. In another aspect, the data may be made accessible to the book outlets, the book distributor, the book supplier via a network-based interface. In an additional aspect, the data may be accessible to the book distributor and the book supplier only after verification of an identity thereof. In another aspect, the network may include the Internet. In a further aspect, the book outlets, the book distributor, and the book supplier each may forecast utilizing the data.

Figure 103:
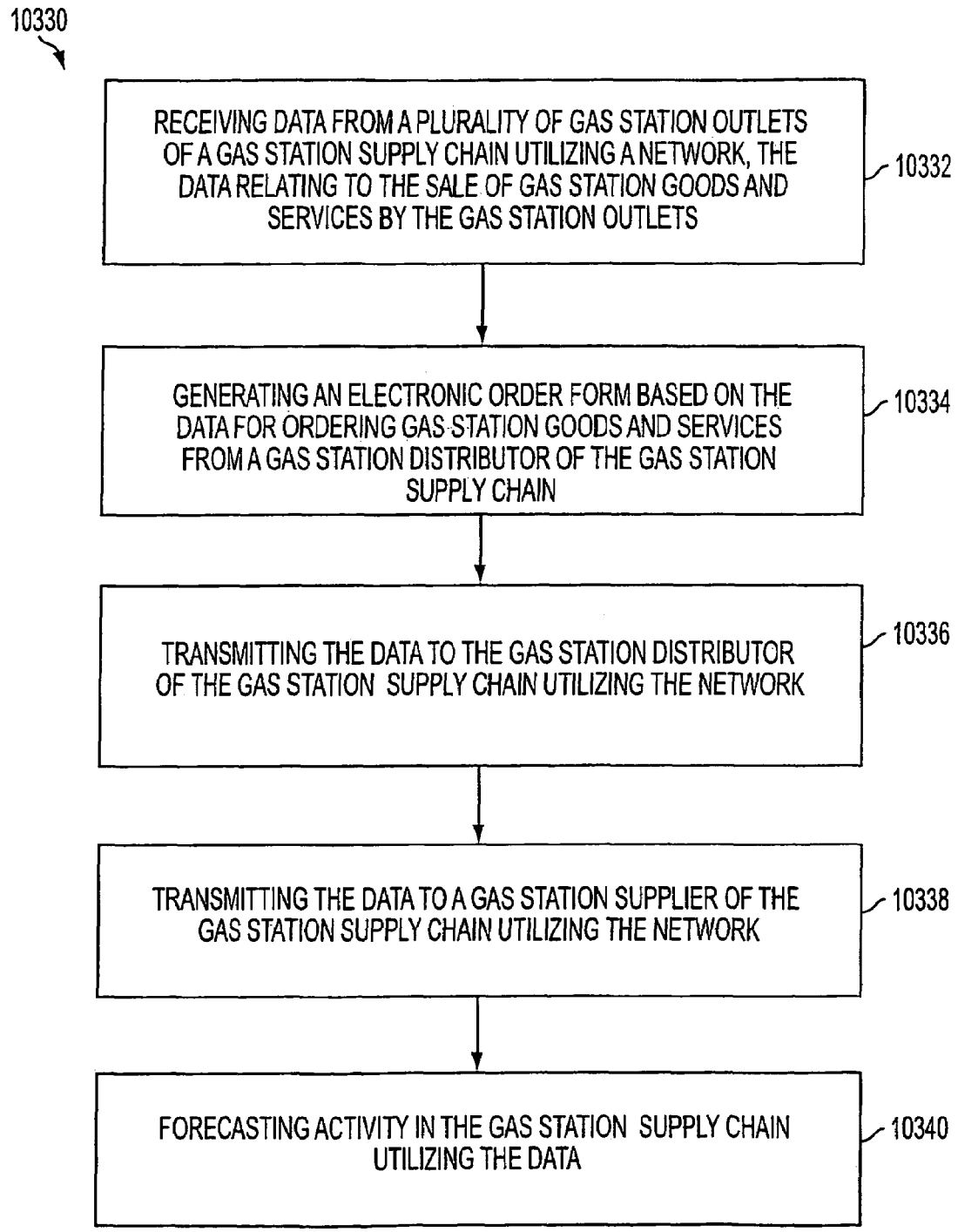
FIG. 103 is a flowchart of a process for managing a gas station supply chain utilizing a network in accordance with an embodiment of the present invention.

FIG. 103 is a flowchart of a process 10330 for managing a gas station supply chain utilizing a network. In operation 10332, a network is utilized to receive data from a plurality of gas station outlets of a gas station supply chain in which the data relates to the sale of gas station goods and services by the gas station outlets. In operation 10334, an electronic order form is generated based on the data for ordering gas station goods and services from a gas station distributor of the gas station supply chain. The data is transmitted via the network to the gas station distributor of the gas station supply chain in operation 10336. The data is also transmitted to a gas station supplier of the gas station supply chain in operation 10338 utilizing the network. Additionally, activity in the gas station supply chain is forecast in operation 10340 utilizing the data.

In one aspect, the data may be parsed to match each of a plurality of gas station distributors and gas station suppliers. In another aspect, the data may be made accessible to the gas station outlets, the gas station distributor, the gas station supplier via a network-based interface. In an additional aspect, the data may be accessible to the gas station distributor and the gas station supplier only after verification of an identity thereof. In another aspect, the network may include the Internet. In a further aspect, the gas station outlets, the gas station distributor, and the gas station supplier each may forecast utilizing the data.

Figure 104A:
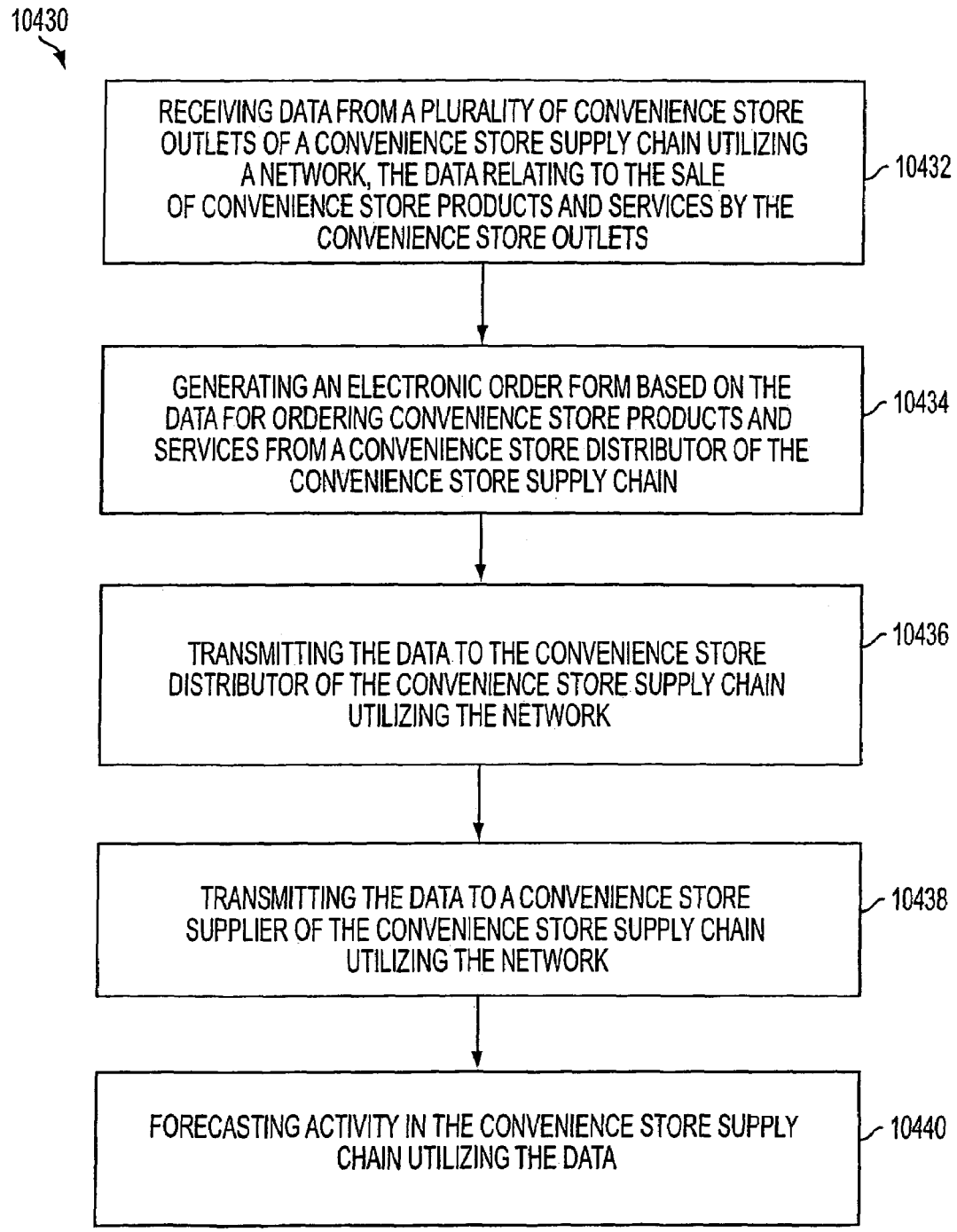
FIG. 104A is a flowchart of a process for managing a convenience store supply chain utilizing a network in accordance with an embodiment of the present invention.

FIG. 104A is a flowchart of a process 10430 for managing a convenience store supply chain utilizing a network. A network is utilized in operation 10432 to receive data from a plurality of convenience store outlets of a convenience store supply chain in which the data relates to the sale of convenience store by the convenience store outlets. In operation 10434, an electronic order form is generated based on the data for ordering convenience store from a convenience store distributor of the convenience store supply chain. The data is transmitted via the network to the convenience store distributor of the convenience store supply chain in operation 10436. In operation 10438, the data is transmitted to a convenience store supplier of the convenience store supply chain utilizing the network. In operation 10440, activity in the convenience store supply chain is forecast utilizing the data.

In one aspect, the data may be parsed to match each of a plurality of convenience store distributors and convenience store suppliers. In another aspect, the data may be made accessible to the convenience store outlets, the convenience store distributor, the convenience store supplier via a network-based interface. In an additional aspect, the data may be accessible to the convenience store distributor and the convenience store supplier only after verification of an identity thereof. In another aspect, the network may include the Internet. In a further aspect, the convenience store outlets, the convenience store distributor, and the convenience store supplier each may forecast utilizing the data.

Figure 104B:
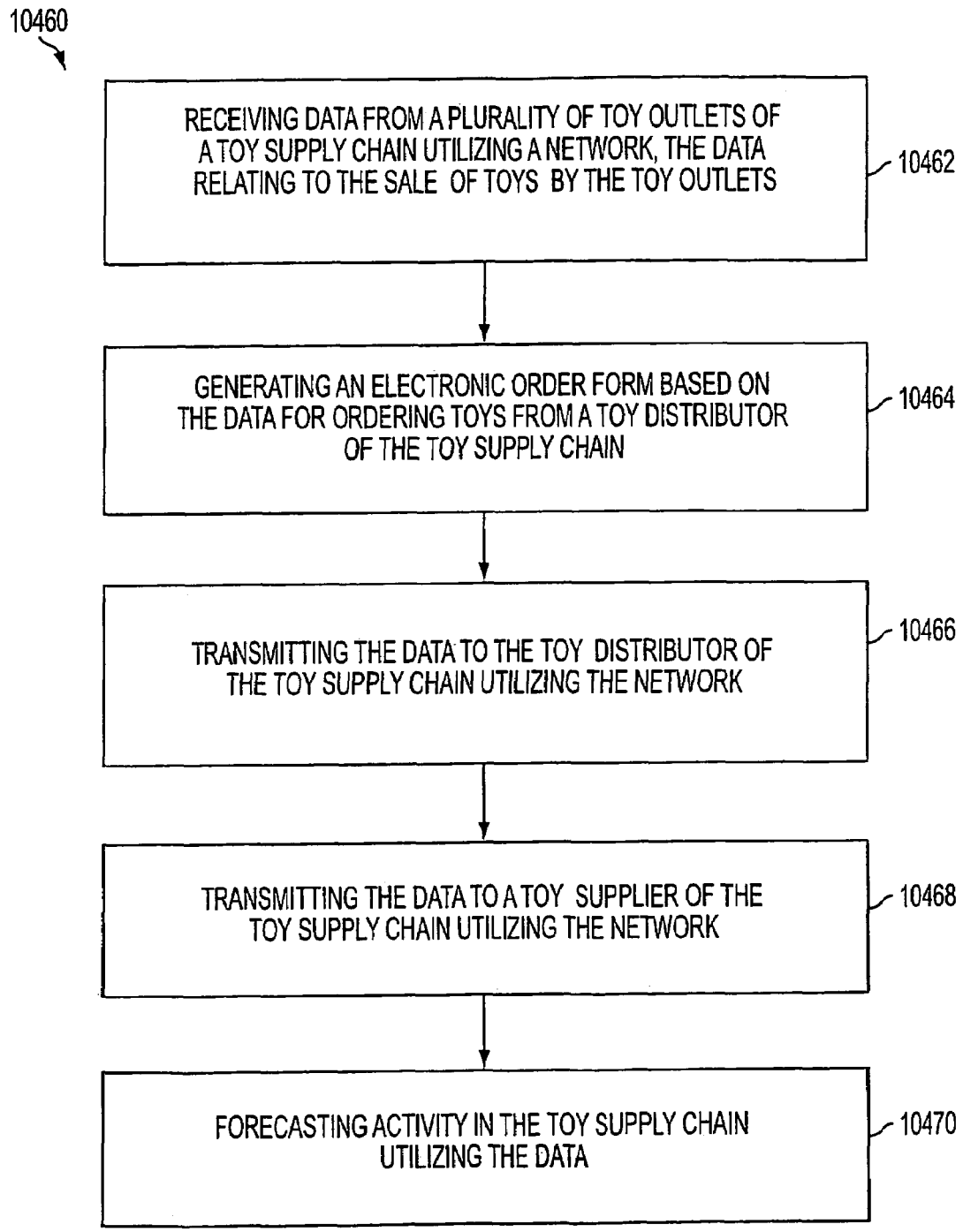
FIG. 104B is a flow diagram of a process for managing a toy supply chain utilizing a network according to an embodiment of the present invention.

FIG. 104B is a flow diagram of a process 10460 for managing a toy supply chain utilizing a network. In operation 10462, a network is utilized to receive data from a plurality of toy outlets of a toy supply chain in which the data relates to the sale of toys by the toy outlets. In operation 10464, an electronic order form is generated based on the data for ordering toy from a toy distributor of the toy supply chain. In operation 10466, the data is transmitted via the network to the toy distributor of the toy supply chain. In operation 10468, the data is also transmitted to a toy supplier of the toy supply chain utilizing the network. In operation 10470, activity in the toy supply chain is forecast utilizing the data.

In one aspect, the data may be parsed to match each of a plurality of toy distributors and toy suppliers. In another aspect, the data may be made accessible to the toy outlets, the toy distributor, the toy supplier via a network-based interface. In an additional aspect, the data may be accessible to the toy distributor and the toy supplier only after verification of an identity thereof. In another aspect, the network may include the Internet. In a further aspect, the toy outlets, the toy distributor, and the toy supplier each may forecast utilizing the data.

Figure 105:
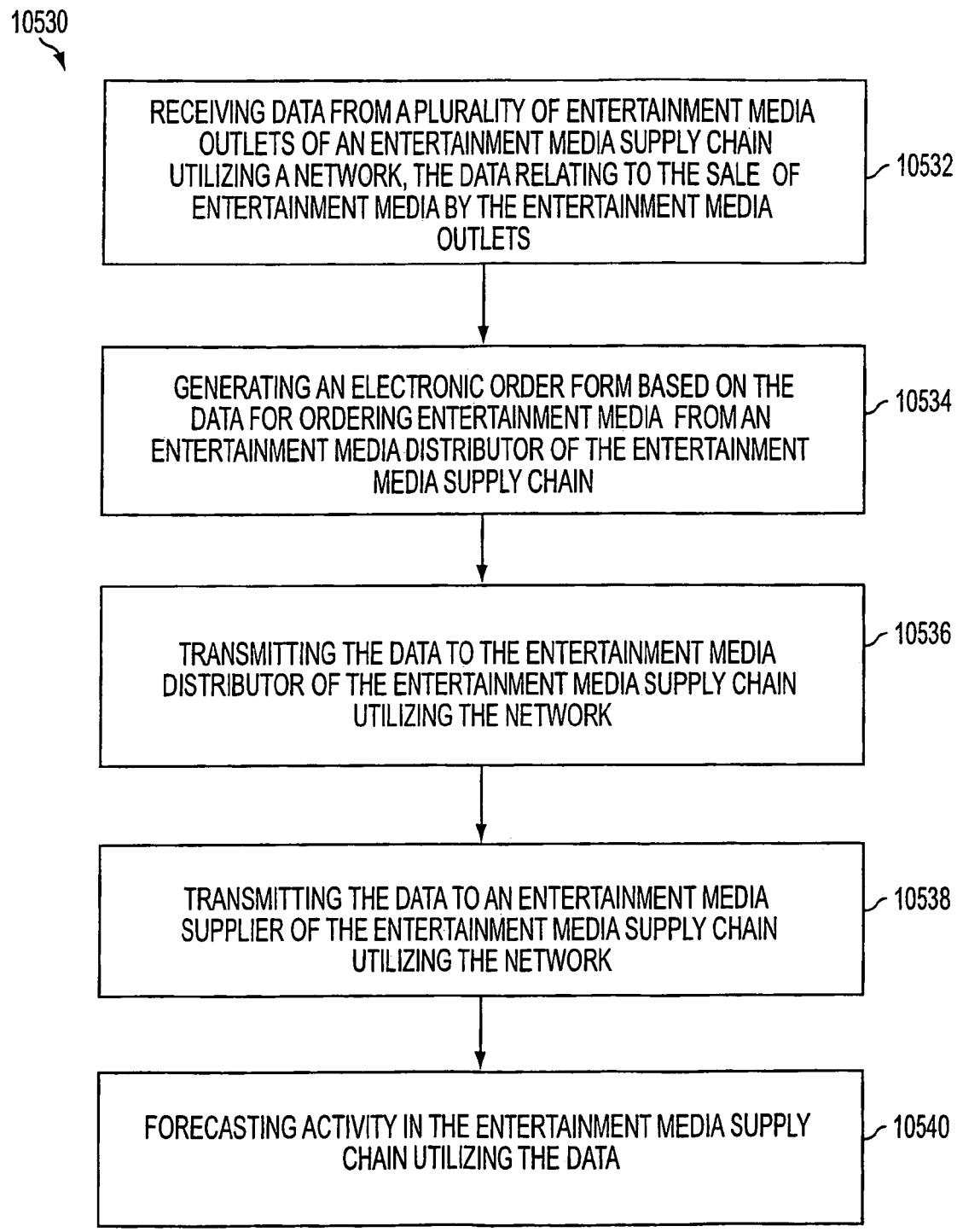
FIG. 105 is a flowchart of a process for managing an entertainment media supply chain utilizing a network in accordance with an embodiment of the present invention.

FIG. 105 is a flowchart of a process 10530 for managing an entertainment media supply chain utilizing a network. Such entertainment media may include mediums with music and/or video stored thereon, etc. In operation 10532, a network is utilized to receive data from a plurality of entertainment media outlets of an entertainment media supply chain in which the data relates to the sale of entertainment media by the entertainment media outlets. In operation 10534, an electronic order form is generated based on the data for ordering entertainment media from an entertainment media distributor of the entertainment media supply chain. In operation 10536, the data is transmitted via the network to the entertainment media distributor of the entertainment media supply chain. In operation 10538, the data is transmitted to an entertainment media supplier of the entertainment media supply chain utilizing the network. In operation 10540, activity in the entertainment media supply chain is forecast utilizing the data.

In one aspect, the data may be parsed to match each of a plurality of entertainment media distributors and entertainment media suppliers. In another aspect, the data may be made accessible to the entertainment media outlets, the entertainment media distributor, the entertainment media supplier via a network-based interface. In an additional aspect, the data may be accessible to the entertainment media distributor and the entertainment media supplier only after verification of an identity thereof. In another aspect, the network may include the Internet. In a further aspect, the entertainment media outlets, the entertainment media distributor, and the entertainment media supplier each may forecast utilizing the data.

Figure 106:
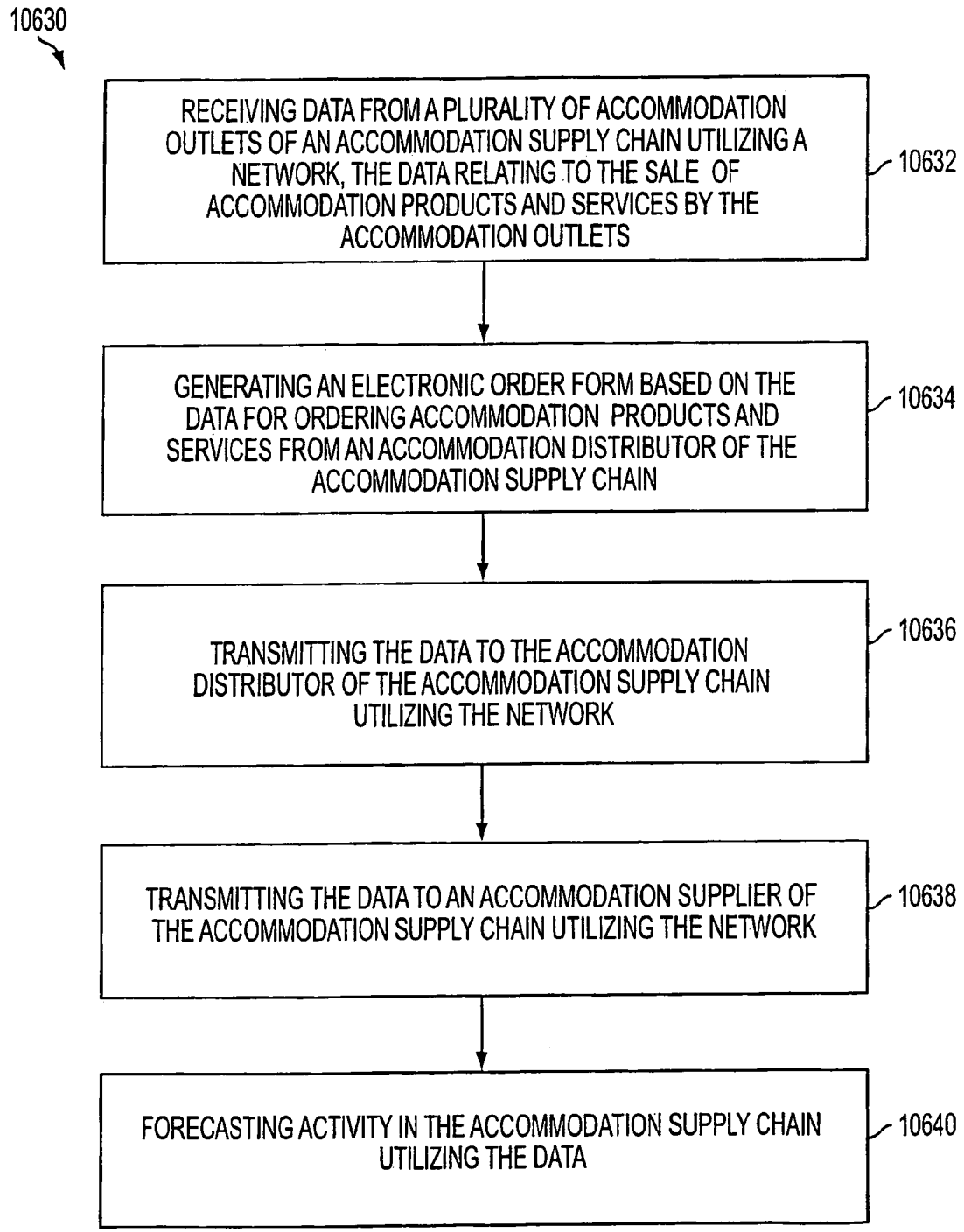
FIG. 106 is a flowchart of a process for managing an accommodation supply chain utilizing a network in accordance with an embodiment of the present invention.

FIG. 106 is a flowchart of a process 10630 for managing an accommodation supply chain utilizing a network. A network is utilized in operation 10632 to receive data from a plurality of accommodation outlets of an accommodation supply chain in which the data relates to the sale of accommodation by the accommodation outlets, such as hotels, motels, inns, resorts, casinos, etc. An electronic order form is generated in operation 10634 based on the data for ordering accommodation from an accommodation distributor of the accommodation supply chain. The data is transmitted via the network to the accommodation distributor of the accommodation supply chain in operation 10636. The data is also transmitted to an accommodation supplier of the accommodation supply chain utilizing the network in operation 10638. Additionally, activity in the accommodation supply chain is forecast utilizing the data in operation 10640.

In one aspect, the data may be parsed to match each of a plurality of accommodation distributors and accommodation suppliers. As a further aspect, the data may be made accessible to the accommodation outlets, the accommodation distributor, the accommodation supplier via a network-based interface. As an additional aspect, the data may be accessible to the accommodation distributor and the accommodation supplier only after verification of an identity thereof. In another aspect, the network may include the Internet. In a further aspect, the accommodation outlets, the accommodation distributor, and the accommodation supplier each may forecast utilizing the data.

Figure 107:
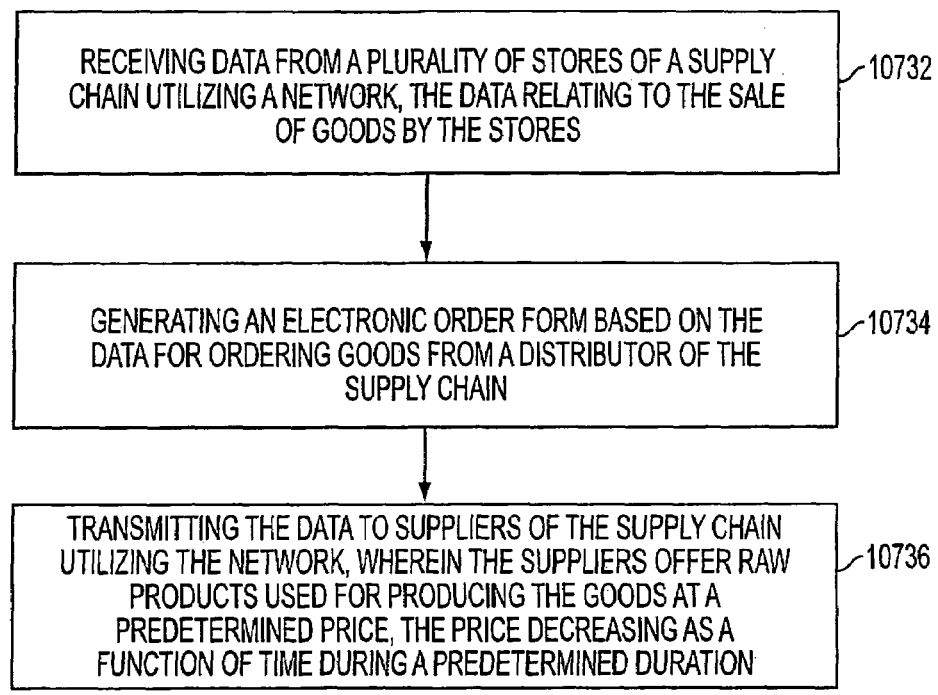
FIG. 107 is a flowchart of a process for a reverse auction in a supply chain management framework in accordance with an embodiment of the present invention.

FIG. 107 is a flowchart of a process 10730 for a reverse auction in a supply chain management framework. Data is received in operation 10732 from a plurality of stores of a supply chain utilizing a network. The data relates to the sale of goods by the stores. An electronic order form is generated based on the data for ordering goods from a distributor of the supply chain in operation 10734. The data is then transmitted to suppliers of the supply chain utilizing the network in operation 10736 so that the suppliers can offer raw products used for producing the goods at a predetermined price, with the price decreasing as a function of time during a predetermined duration.

In one aspect, the data is parsed to match each of a plurality of distributors. In such an aspect, the data may be made accessible to the stores, the distributor, the suppliers via a network-based interface. As a further aspect, the data may be accessible to the distributor and the suppliers only after verification of an identity thereof. In another aspect, the suppliers are chosen by the stores. In a further aspect, the stores, the distributor, and the suppliers each forecast utilizing the data.

Figure 108:
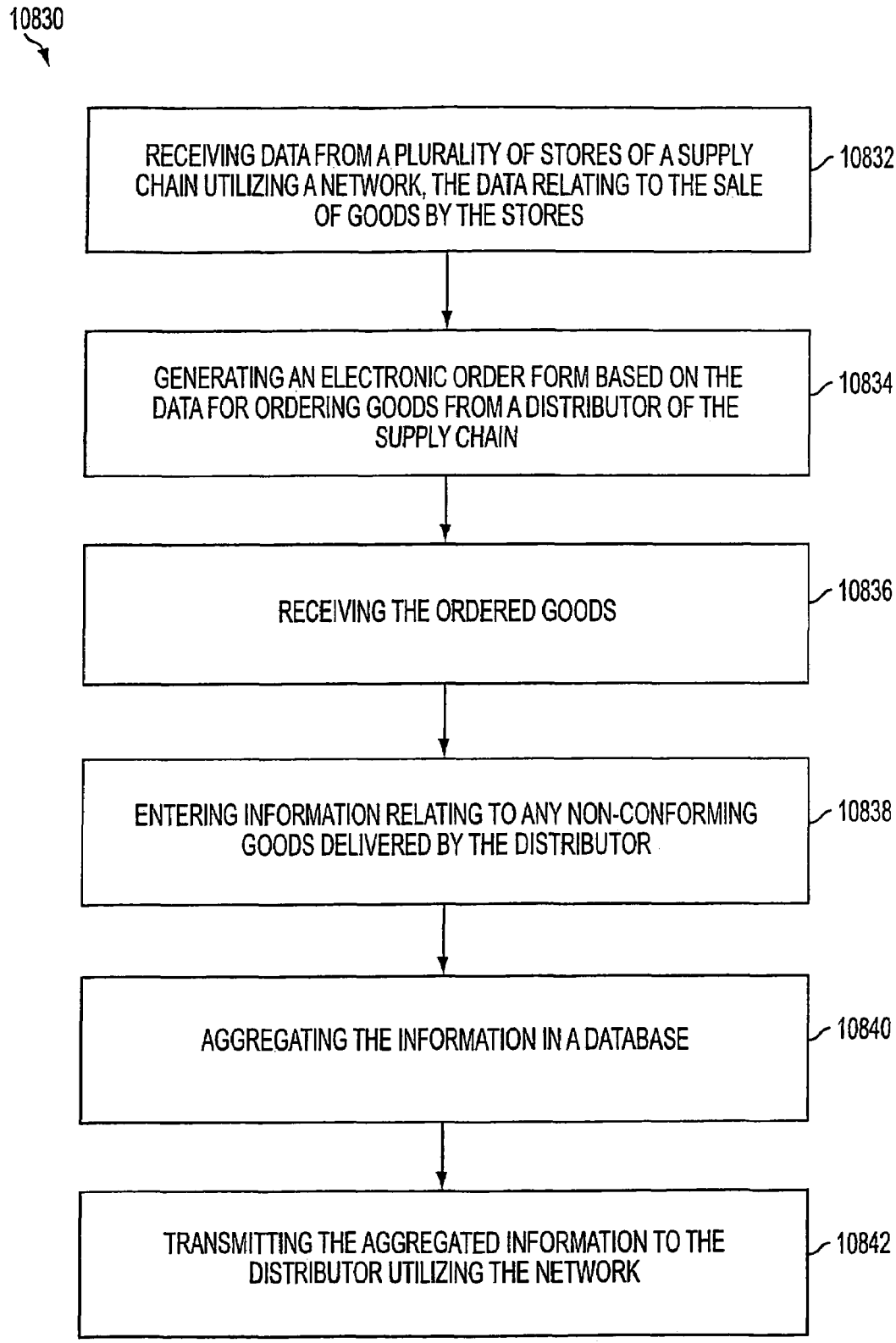
FIG. 108 is a flowchart of a process for tracking damaged goods in a supply chain management framework in accordance with an embodiment of the present invention.

FIG. 108 is a flowchart of a process 10830 for tracking non-conforming goods in a supply chain management framework. Note that as used herein, "non-conforming goods includes damaged goods, mislabeled goods, and inappropriate goods, etc. Thus, it should be understood that this process 10830 may also be utilized for tracking product withdrawals and recalls, as well as tracking wrong products at the wrong time for the wrong purpose so that incorrectly shipped products can be promptly identified so that damaged product, wrong product, incorrect amounts of product are identified and tracked. A network is utilized in operation 10832 to receive data from a plurality of stores of a supply chain. This data relates to the sale of goods by the stores. An electronic order form is generated based on the data for ordering goods from a distributor of the supply chain in operation 10834. When the ordered goods are received in operation 10836, information relating to any non-conforming goods delivered by the distributor is entered in operation 10838 and aggregated in a database in operation 10840. The aggregated information is subsequently transmitted to the distributor utilizing the network in operation 10842.

In one aspect, the information relates to an amount of damage to the goods. In such an aspect, the information may also relate to a type of damage to the goods. In another aspect, a plurality of electronic order forms are generated based on the data for ordering goods from a plurality of distributors of the supply chain. As an aspect in this aspect, the information may be parsed based on the distributor. As a further aspect, a comparison may be performed between the parsed data for each of the distributors. In another aspect, invoices may be automatically adjusted to account for the damaged/nonconforming goods. In yet another aspect, the goods may be salvaged, such as by being donated to charity, shipped back to the distributor, resold, etc.

Figure 109:
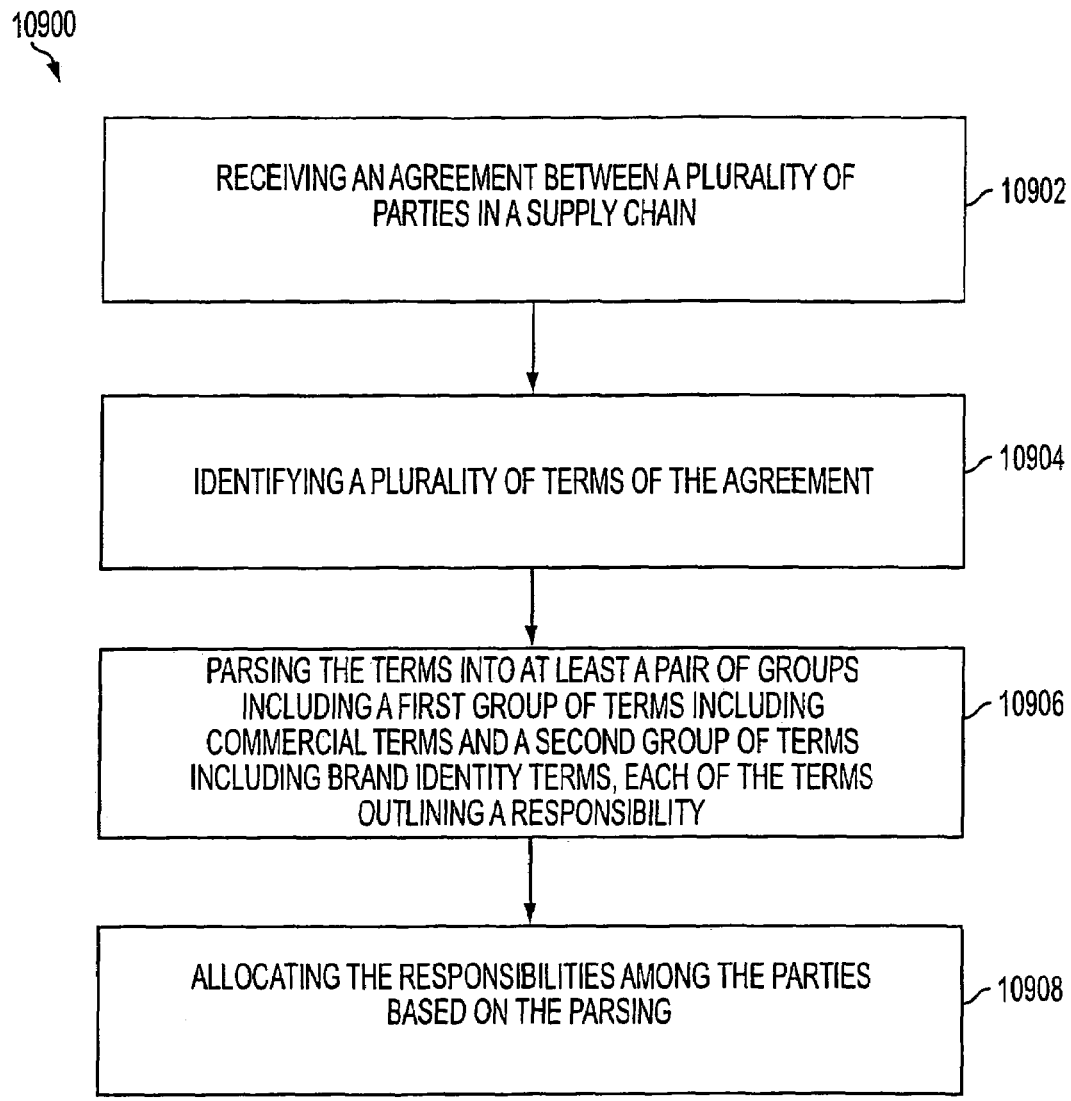
FIG. 109 is a flowchart of a process for allocating responsibilities in a supply chain management framework in accordance with an embodiment of the present invention.

FIG. 109 is a flowchart of a process 10900 for allocating responsibilities in a supply chain management framework. An agreement between a plurality of parties in a supply chain is received in operation 10902. A plurality of terms of the agreement are identified in operation 10904 which are then parsed in operation 10906 into at least a pair of groups including a first group of terms that includes commercial terms and a second group of terms that includes brand identity terms. Also, each of the terms outlines a responsibility. These responsibilities are allocated among the parties based on the parsing in operation 10908.

In one aspect, a first party is allocated the responsibilities outlined by the first group of terms and a second party is allocated the responsibilities outlined by the second group of terms. In another aspect, the parties are allocated the responsibilities outlined by one of the groups of terms. In a further aspect, the agreement is received utilizing network. In such an aspect, the terms may be parsed automatically utilizing a template. As a further aspect, the responsibilities may be allocated by transmitting electronic mail utilizing the network. In an additional aspect, the agreement includes an operating agreement.

Figure 110:
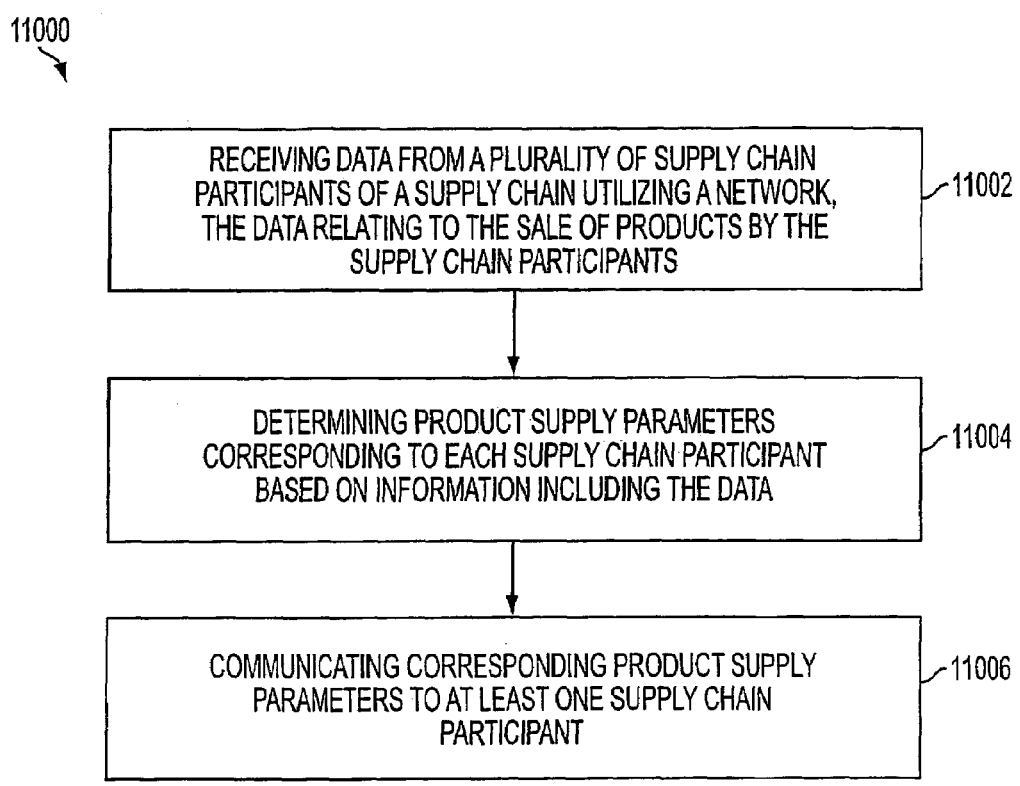
FIG. 110 is a flowchart of a process for determining product supply parameters in a supply chain management framework in accordance with an embodiment of the present invention.

FIG. 110 is a flowchart of a process 11000 for determining product supply parameters in a supply chain management framework. Product supply parameters may include information including the following: price/volume/weight/fob/minimum quantity/payment terms/product specifications. Data is received from a plurality of supply chain participants of a supply chain utilizing a network in operation 11002. The received data relates to the sale of products by the supply chain participants. Product supply parameters corresponding to each supply chain participant are then determined based on information including the data in operation 11004. Next, corresponding product supply parameters is communicated to at least one supply chain participant in operation 11006.

In one aspect, the product supply parameters are determined by a brand owner. In another aspect, the data is transmitted to the distributor and a supplier in accordance with the product supply parameters. In a further aspect, the network includes the Internet. In an additional aspect, forecasting is carried out as a function of the data and the product supply parameters. In another aspect, the product supply parameters indicate a price and an amount of the products to be ordered. In such an aspect, the product supply parameters may also indicate the price and the amount of the products to be ordered utilizing a look-up table which correlates the data to an appropriate price and amount.

Figure 111:
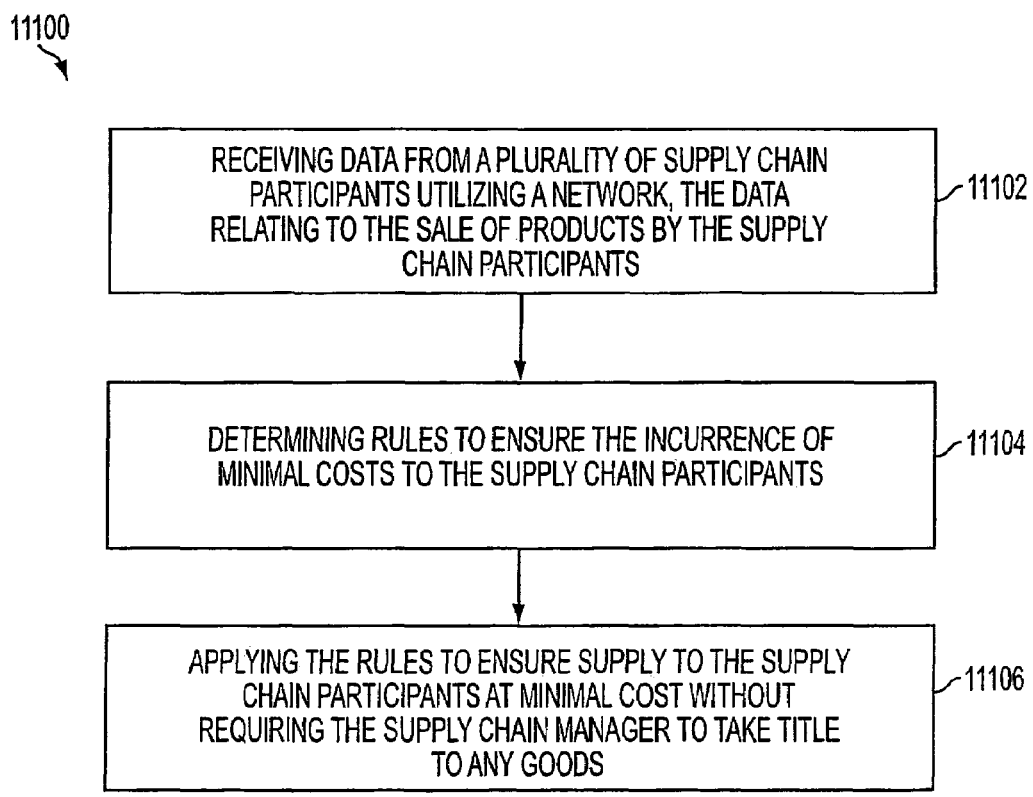
FIG. 111 is a flowchart of a process for reducing costs in a supply chain management framework in accordance with an embodiment of the present invention.

FIG. 111 is a flowchart of a process 6200 for reducing costs in a supply chain management framework. Data is received from a plurality of supply chain participants utilizing a network in operation 11102. The received data relates to the sale of products by the supply chain participants. Rules are determined to ensure the incurrence of minimal costs to the supply chain participants in operation 11104 and the rules are applied to ensure supply to the supply chain participants at minimal cost without requiring the supply chain manager to take title to any goods in operation 11106.

In one aspect, the rules are determined by a brand owner. In another aspect, the rules indicate a distributor to which the electronic order form is to be sent. In a further aspect, the rules indicate an amount of the products to be ordered from the distributor of the supply chain. In an additional aspect, forecasting is carried out as a function of the rules. In another aspect, promotion planning is carried out as a function of the rules.

Figure 112:
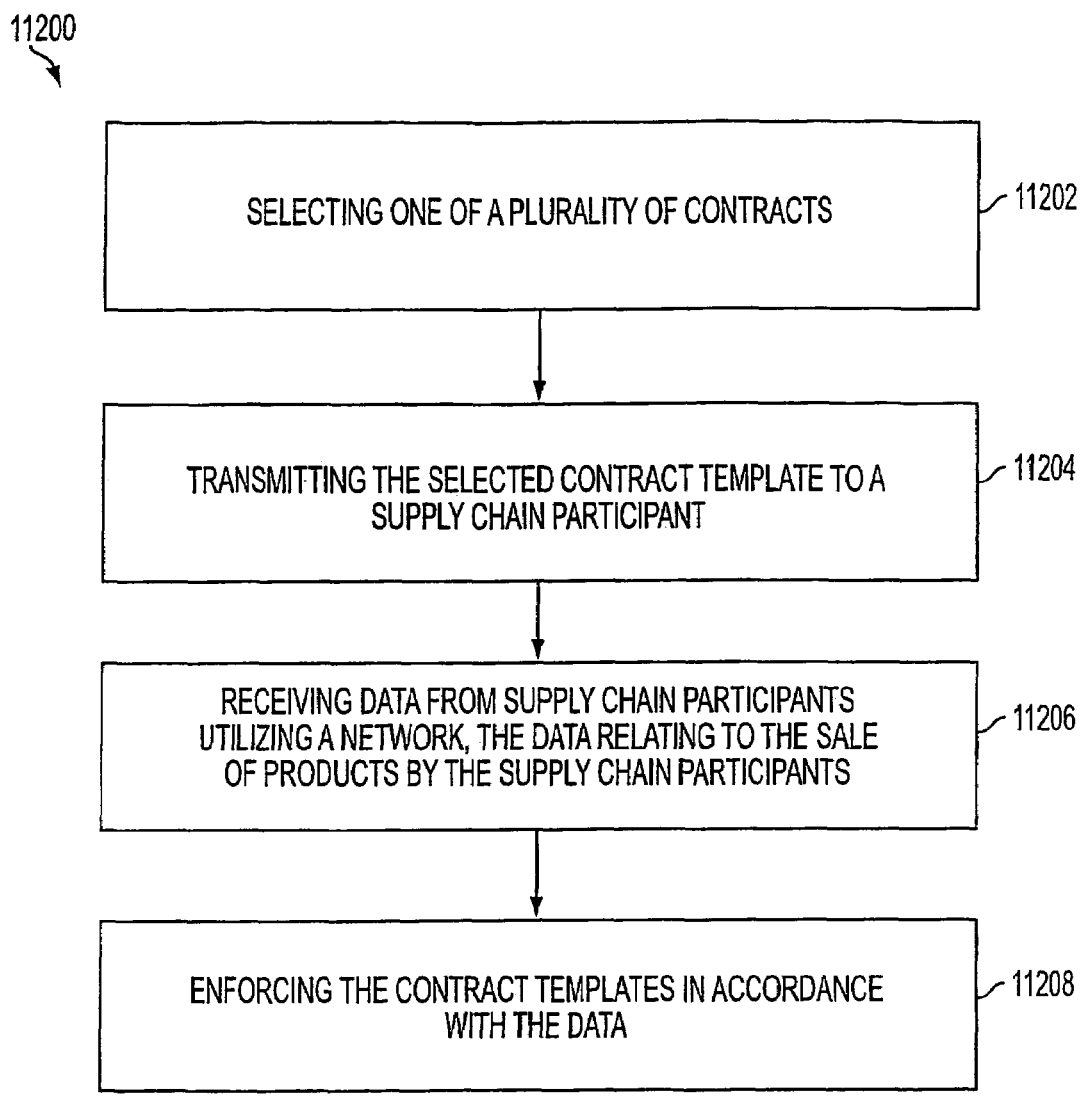
FIG. 112 is a flowchart of a process for handling contracts in a supply chain management framework in accordance with an embodiment of the present invention.

FIG. 112 is a flowchart of a process 11200 for handling contracts in a supply chain management framework. One of a plurality of contracts is selected in operation 11202. The selected contract template is transmitted to a supply chain participant in operation 11204. Data is received from supply chain participants utilizing a network in operation 11206. This data relates to the sale of products by the supply chain participants. The contract templates are then enforced in accordance with the data in operation 11208.

In one aspect, the contract templates compliment each other. In another aspect, each contract template includes portions to be filled out by the supply chain participants. In a further aspect, the selected contract template is transmitted to the supply chain participant utilizing the network. In an additional aspect, the network includes the Internet. In another aspect, an indication of acceptance of the contract is received from the supply chain participant.

Figure 113:
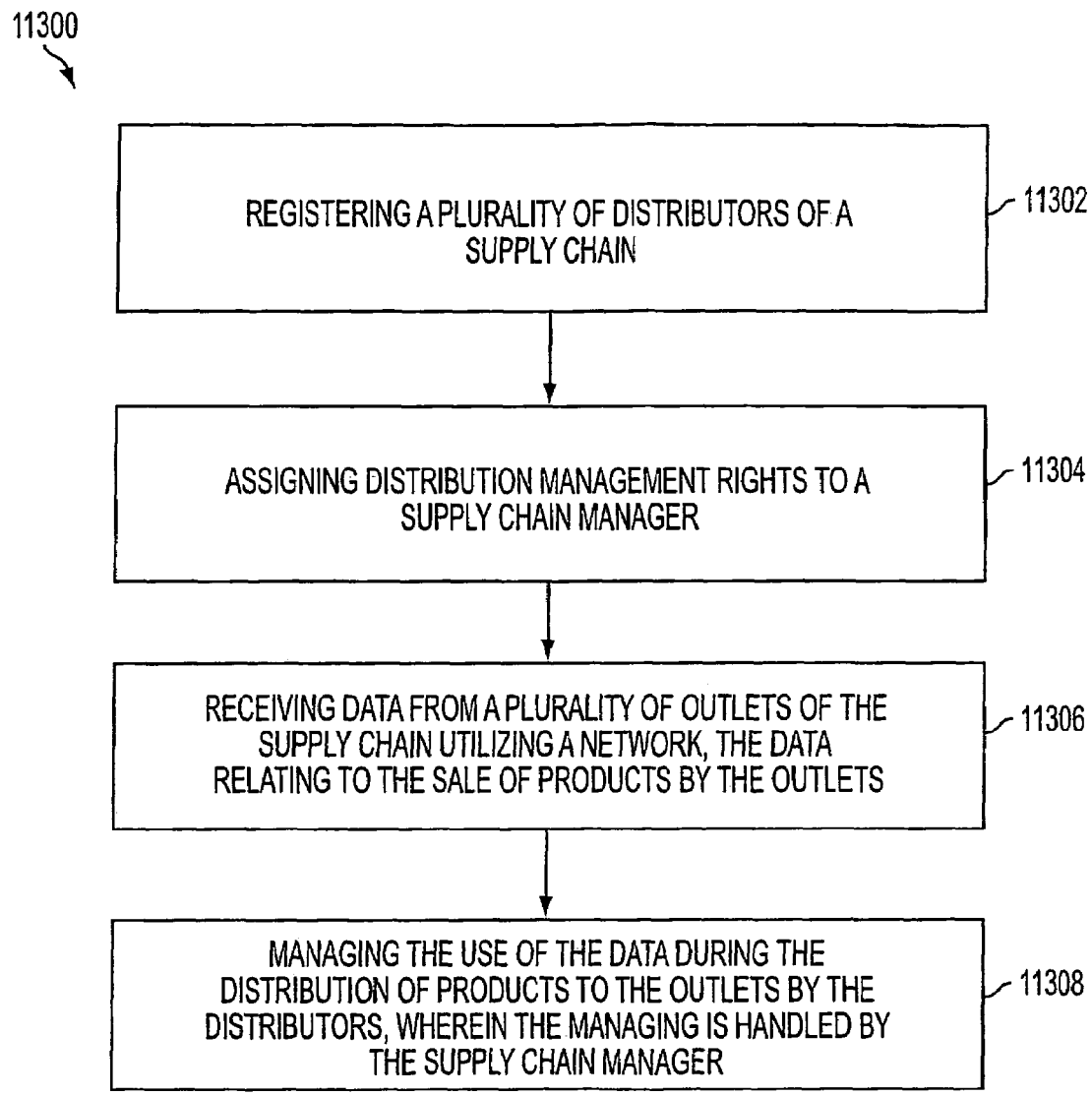
FIG. 113 is a flowchart of a process for centralizing a supply chain management framework in accordance with an embodiment of the present invention.

FIG. 113 is a flowchart of a process 11300 for centralizing a supply chain management framework in which a plurality of distributors of a supply chain are registered in operation 11302. Distribution management rights are then assigned from the distributors to a supply chain manager in operation 11304. Subsequently, data from a plurality of outlets of the supply chain is received utilizing a network in operation 11306. The received data relates to the sale of products by the outlets. The use of the data is managed during the distribution of products to the outlets by the distributors in operation 11308. This management of data use is handled by the supply chain manager.

In one aspect, the assignment is capable of being terminated based on gross negligence on the part of the supply chain manager. In another aspect, the distributors are registered utilizing the network. In a further aspect, the managing includes determining an amount of the products to be distributed to the outlets. In an additional aspect, the managing includes determining a timing of distribution of the products to be distributed to the outlets. In yet another aspect, the managing includes the selection of the distributors to distribute products to the outlets.

Figure 114:
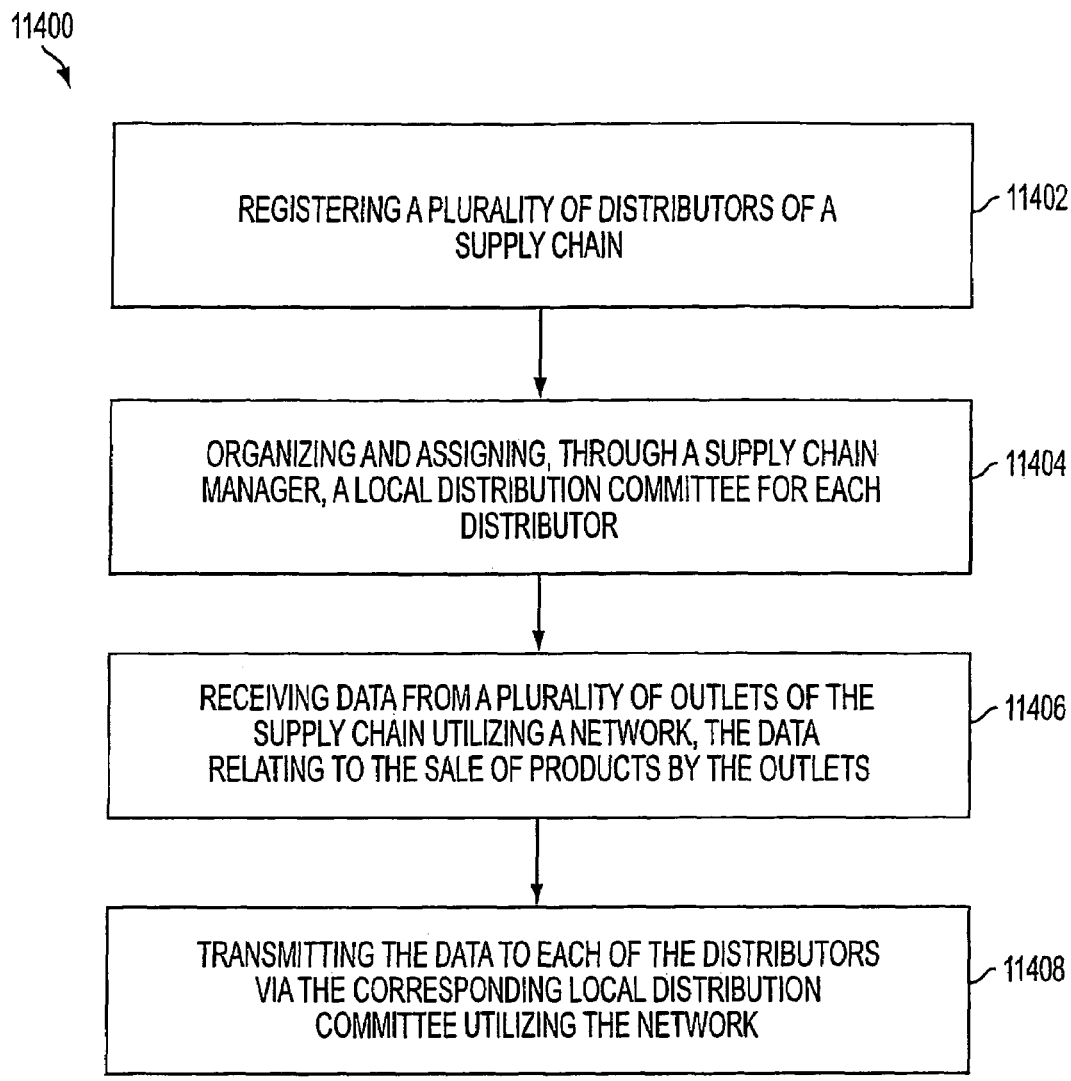

FIG. 114 is a flowchart of a process 11400 for providing local distribution committees in a supply chain management framework. A plurality of distributors of a supply chain are registered in operation 11402. Through a supply chain manager, a local distribution committee is organized and assigned for each distributor in operation 11406. Data from a plurality of outlets of the supply chain is subsequently received utilizing a network in operation 11408. This received data relates to the sale of products by the outlets. The data is then transmitted to each of the distributors via the corresponding local distribution committee utilizing the network in operation 11410.

In one aspect, the data is organized by the corresponding local distribution committee prior to transmission to the distributors. In another aspect, the data is processed by the corresponding local distribution committee prior to transmission to the distributors. In a further aspect, each local distribution committee utilizes the data for forecasting and then transmits the forecasting to the corresponding distributors. In an additional aspect, the distributors are organized and assigned a local distribution committee based on a location thereof. In even another aspect, each local distribution committee includes a network-based interface for transmitting the data.

Figure 115:
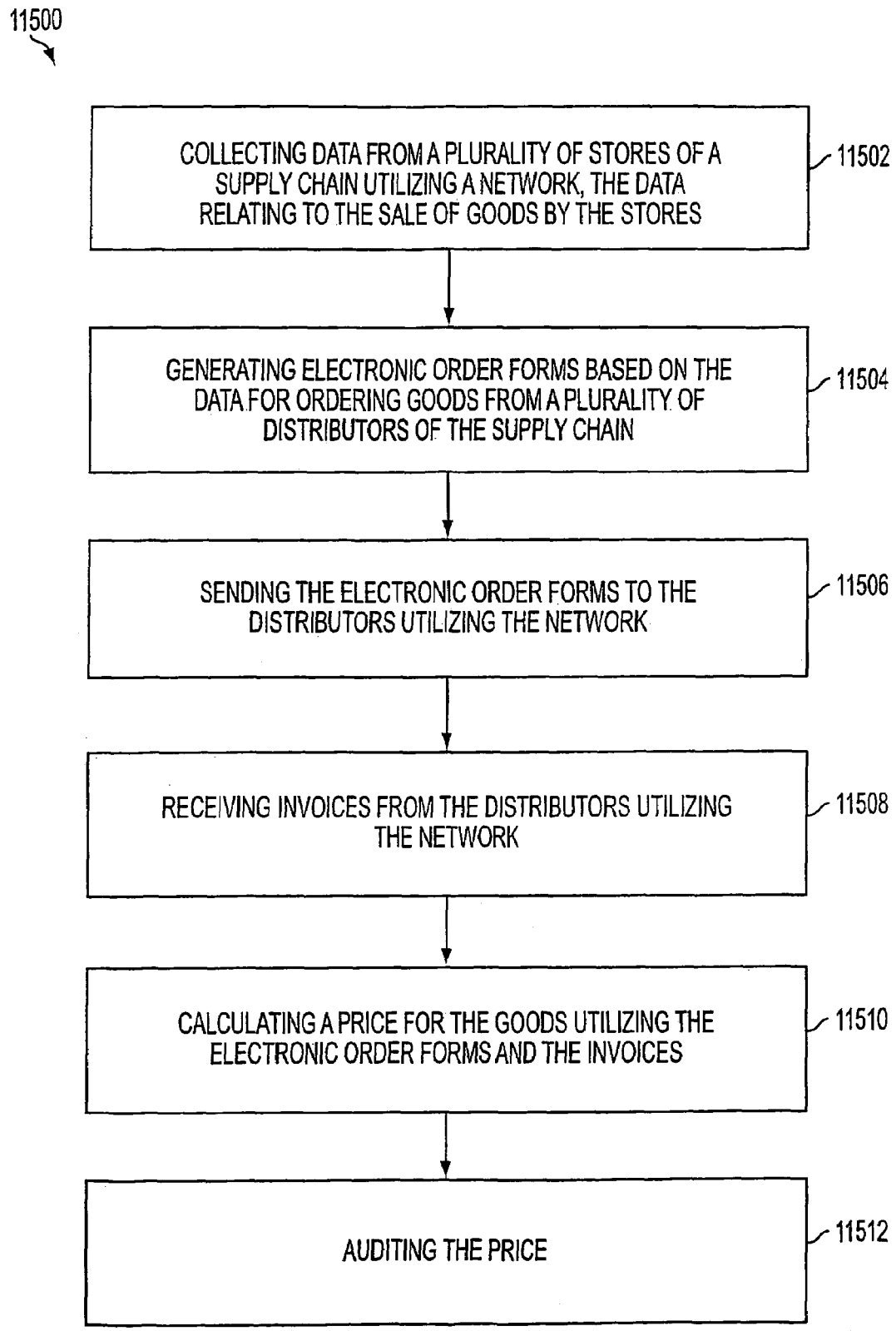

FIG. 115 is a flowchart of a process 11500 for price auditing in a supply chain management framework. A network is utilized in operation 11502 to collect data from a plurality of stores of a supply chain that relates to the sale of goods by the stores. Electronic order forms are generated in operation 11504 based on the data for ordering goods from a plurality of distributors of the supply chain and then sent to the distributors in operation 11506 utilizing the network.

In response, invoices are received from the distributors utilizing the network in operation 11508. A price for the goods is then calculated utilizing the electronic order forms and the invoices in operation 11510. Subsequently, the price is audited in operation 11512.

In one aspect, the price is audited by comparing the price to a predetermined amount. In another aspect, the price of the goods is calculated from the electronic order forms utilizing a table mapping a plurality of goods with a plurality of prices. In a further aspect, the electronic order forms are generated by the stores. In an additional aspect, the electronic order forms are generated by the stores. In yet another aspect, an electronic mail alert is generated in response to the audit.

Figure 116:
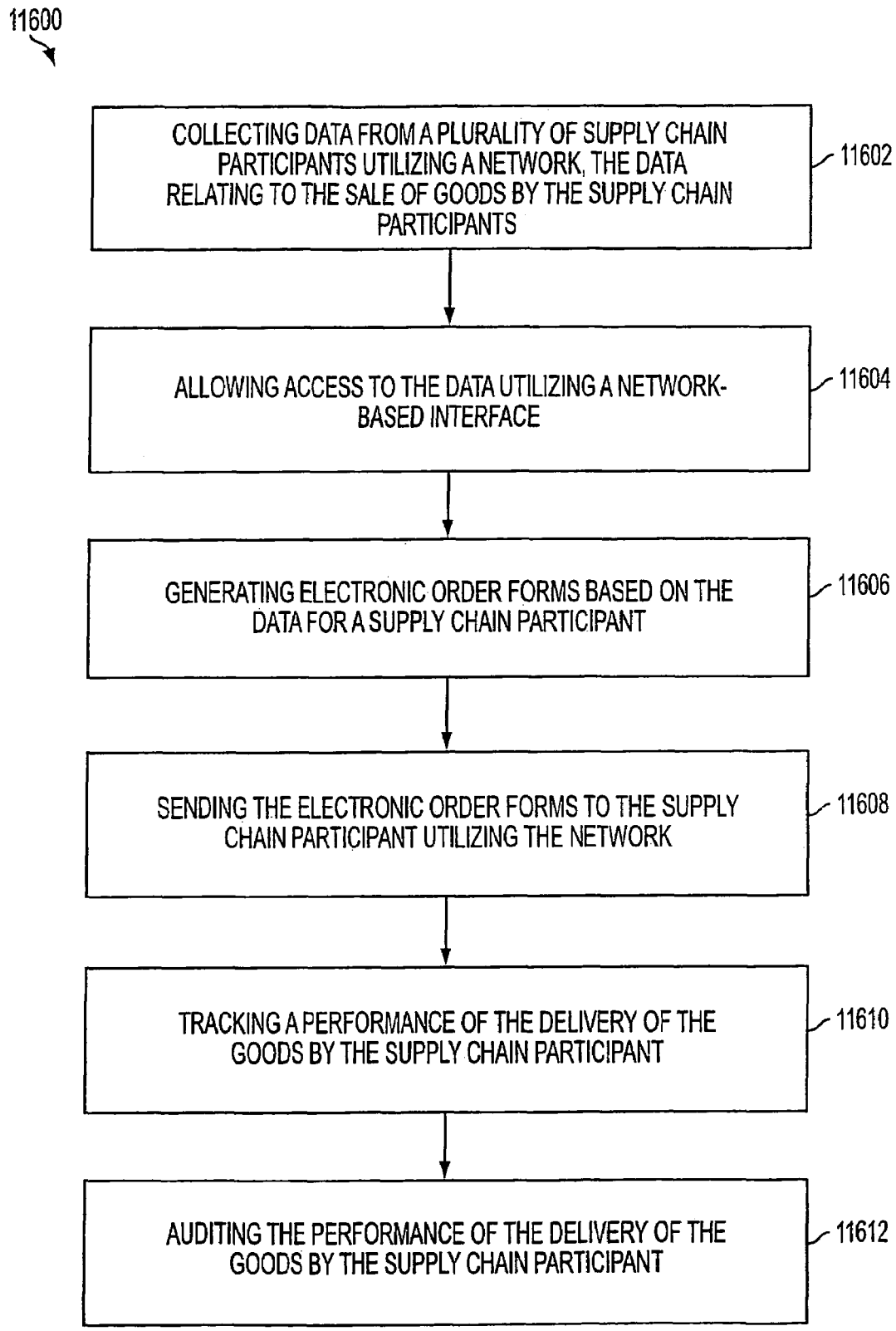

FIG. 116 is a flowchart of a process 11600 for auditing performance in a supply chain framework. Data is collected from a plurality of supply chain participants utilizing a network in operation 11602. This data relates to the sale of goods by the supply chain participants. Access to the data is allowed utilizing a network-based interface in operation 11604. Electronic order forms are generated based on the data for a supply chain participant in operation 11606. The generated electronic order forms are sent to the to the supply chain participant utilizing the network in operation 11608. A performance of the delivery of the goods by the supply chain participant is then tracked in operation 11610. The tracked performance of the delivery of the goods by the supply chain participant is subsequently audited in operation 11612.

In one aspect, the performance may be audited by comparing the performance to a performance indicated on the electronic order forms. In another aspect, the performance may indicate a day of the delivery. In a further aspect, the performance may indicate an hour of the delivery. In an additional aspect, the performance may be tracked by entering the performance utilizing the network-based interface. In another aspect, an electronic mail alert may be generated in response to the audit.

Figure 117:
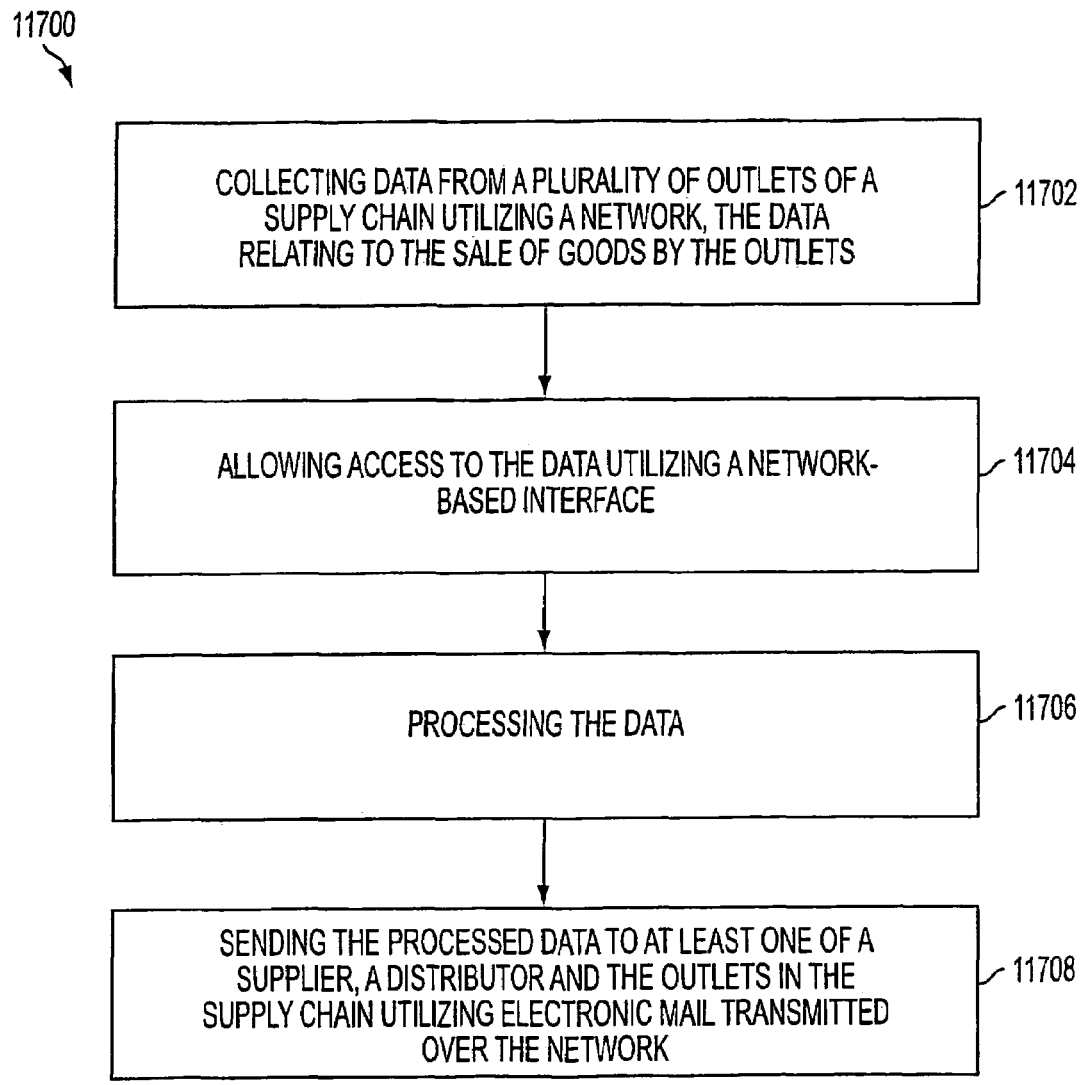

FIG. 117 is a flowchart of a process 11700 for providing an electronic mail virtual private network in a supply chain management framework. Utilizing a network, data is collected in operation 11702 from a plurality of outlets of a supply chain that relates to the sale of goods by the outlets. Access to the data is allowed in operation 11704 utilizing a network-based interface. The data is processed in operation 11706 and then sent in operation 11708 using electronic mail via the network to one or more of the following: a supplier, a distributor and the outlets in the supply chain.

In one aspect, the network includes the Internet. In another aspect, the processed data is sent to the supplier, the distributor, and the outlets. In such an aspect, the supplier, the distributor, and the outlets may be registered with a process that includes the collection of electronic mail addresses thereof. In further aspect, the processed data includes forecasting, promotion planning, and ordering. In an additional aspect, the processed data may be sent to a supplier, a distributor, as well as outlets indicated by the data.

Figure 118:
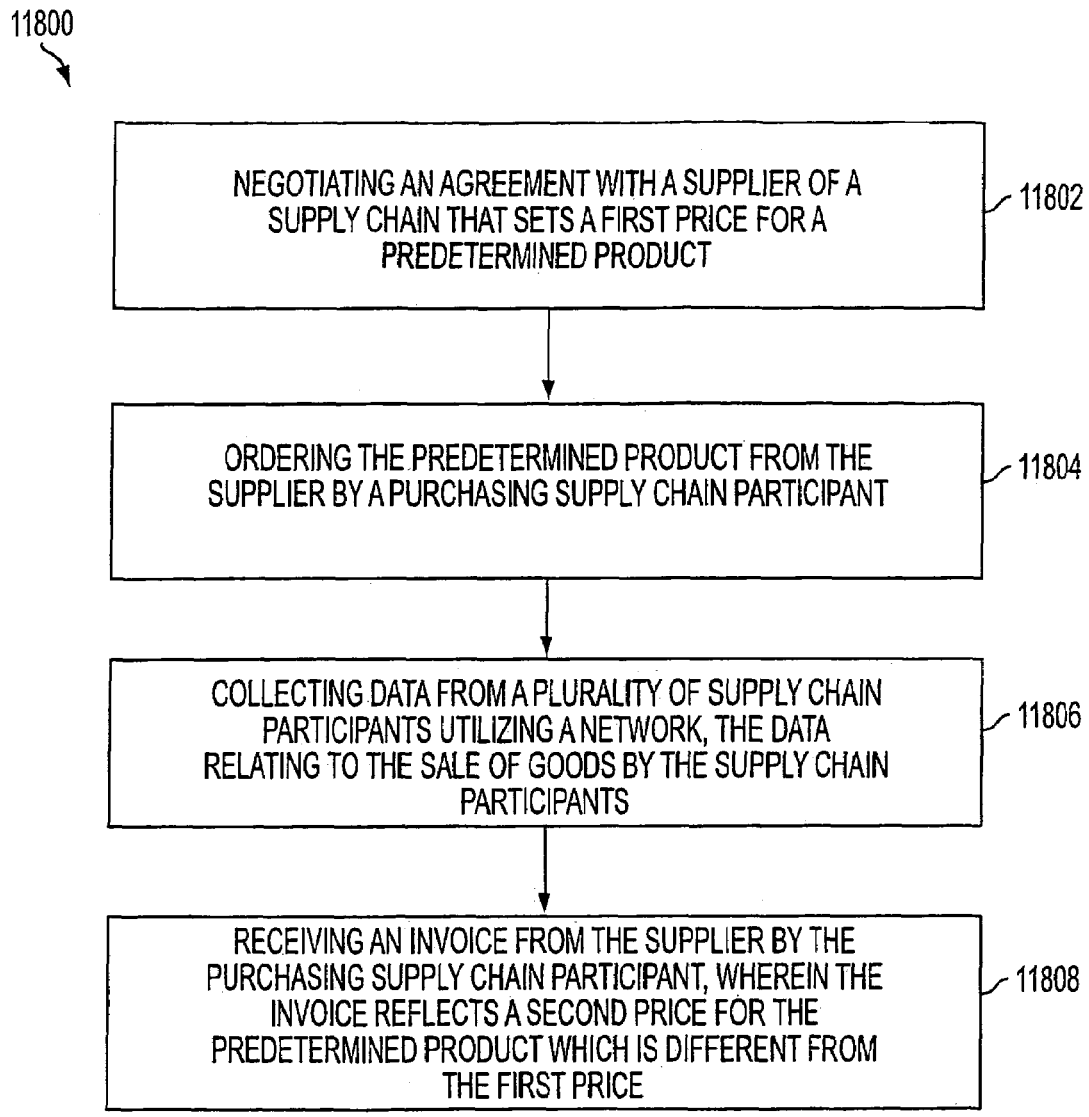

FIG. 118 is a flowchart of a process 11800 for secret pricing in a supply chain management framework. An agreement is negotiated with a supplier of a supply chain that sets a first price for a predetermined product in operation 11802. The predetermined product is then ordered from the supplier by a purchasing supply chain participant in operation 11804. Data is collected from a plurality of supply chain participants utilizing a network in operation 11806. The data relates to the sale of goods by the supply chain participants. An invoice is subsequently received from the supplier by the purchasing supply chain participant in operation 11808. This the invoice reflects a second price for the predetermined product which is different from the first price.

In one aspect, the ordering is carried out utilizing a network. In a similar aspect, the receiving is carried out utilizing a network. In another aspect, the second price is a function of the first price. For example, the first price may be a percentage of the second price. In further aspect, the second price is converted to the first price prior to processing. In such an aspect, the processing may include market analysis. In yet another aspect, a supply chain manager may collect from the supplier an amount equal to a difference between the second price and the first price.

Figure 119:
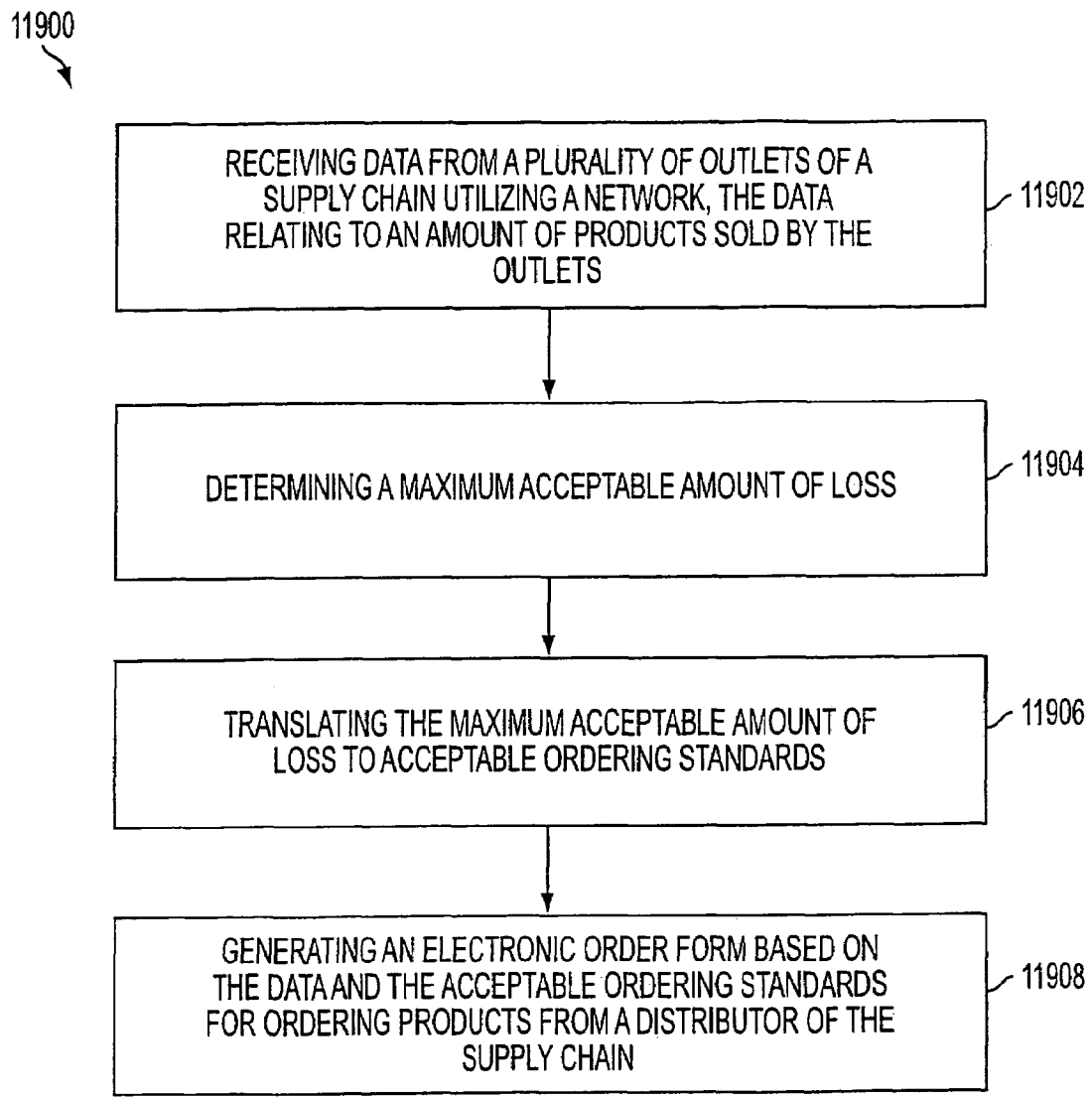

FIG. 119 is a flowchart of a process 11900 for managing risk in a supply chain management framework. A network is utilized in operation 11902 to receive data from a plurality of outlets of a supply chain that relates to an amount of products sold by the outlets. A maximum acceptable amount of loss is determined in operation 11904 and the maximum acceptable amount of loss is translated to acceptable ordering standards in operation 11906. An electronic order form is then generated based on the data and the acceptable ordering standards for ordering products from a distributor of the supply chain in operation 11908.

In one aspect, the maximum acceptable amount of loss includes a predetermined amount of money. In another aspect, the acceptable ordering standards allow the calculation of a maximum amount of products that can be ordered as a function of the data. In a further aspect, the acceptable ordering standards allow the calculation of a maximum price of products that can be ordered as a function of the data. In an additional aspect, the translating is carried out utilizing a look-up table. In yet another aspect, an alert is generated upon the products ordered based on the data not meeting the acceptable ordering standards.

Figure 120:
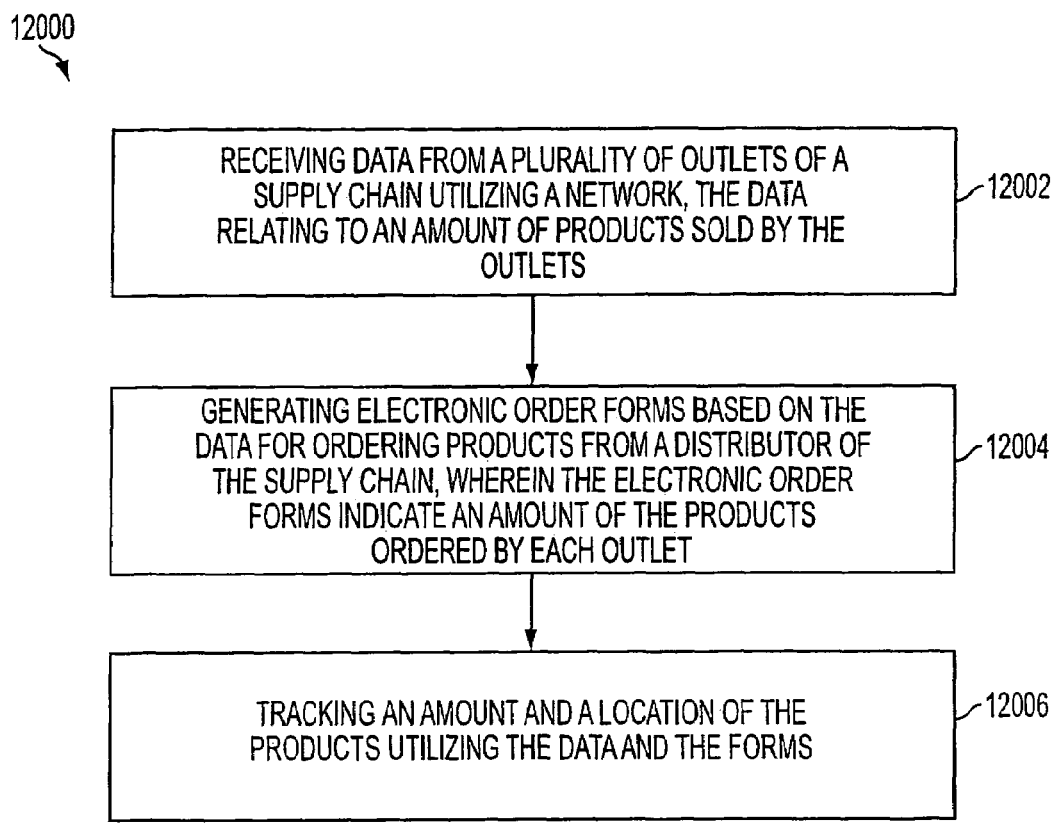

FIG. 120 is a flowchart of a process 12000 for product tracking in a supply chain management framework. Data is received from a plurality of outlets of a supply chain utilizing a network in operation 12002. The received data relates to an amount of products sold by the outlets. Electronic order forms are generated based on the data for ordering products from a distributor of the supply chain in operation 12004. The electronic order forms indicate an amount of the products ordered by each outlet. An amount and a location of the products are tracked utilizing the data and the forms in operation 12006.

In one aspect, the products may be tracked for recall purposes. In another aspect, the amount and the location of the products may be tracked by subtracting the amount of products sold from the amount of products ordered for each of the outlets. In a further aspect, the amount and the location of the products may be audited. In an additional aspect, the amount of products sold and the amount of products ordered may be accessible via a network-based interface. In yet another aspect, the network includes the Internet.

Figure 121:
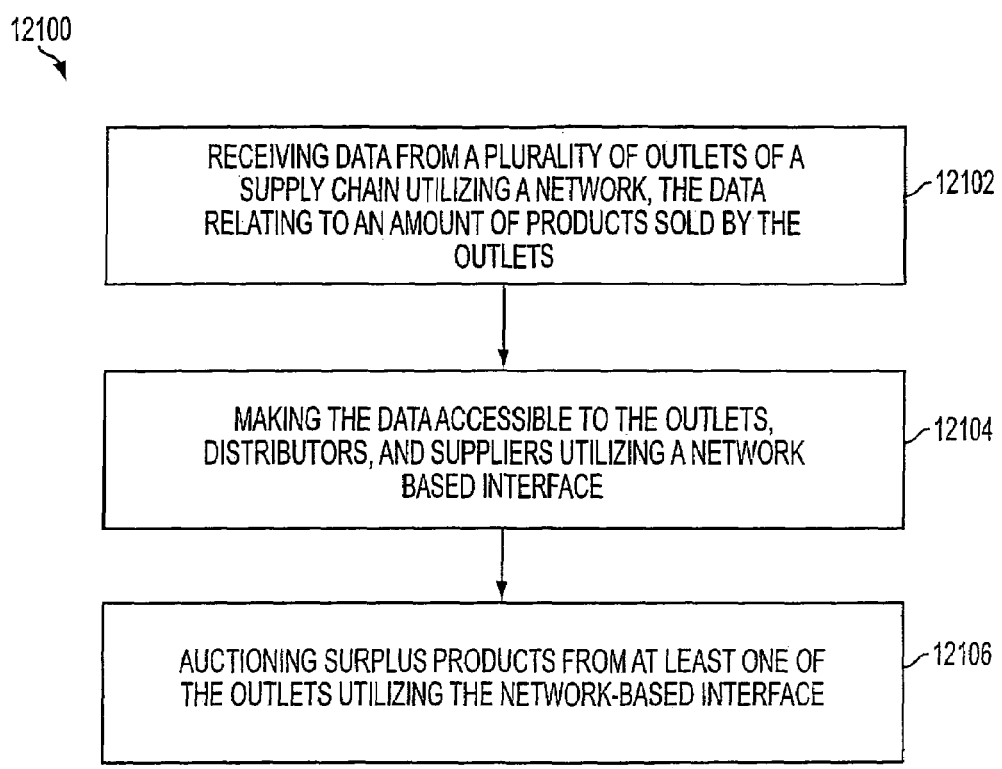

FIG. 121 is a flowchart of a process 12100 for auctioning surplus products in a supply chain management framework. Utilizing a network, data is received from a plurality of outlets of a supply chain in operation 12102. The received data relates to an amount of products sold by the outlets. The received data is then made accessible to the outlets, distributors, and suppliers utilizing a network based interface in operation 12104. Utilizing the network-based interface, surplus products from at least one of the outlets are auctioned in operation 12106.

In one aspect, the outlets, the distributors, and the suppliers may be provided access to the network-based interface. In such an aspect, the outlets, the distributors, and the suppliers may also be capable of submitting bids utilizing the network-based interface. In another aspect, the network includes the Internet. In a further aspect, the auctioning may be initiated in response to one of the outlets closing.

Figure 122:
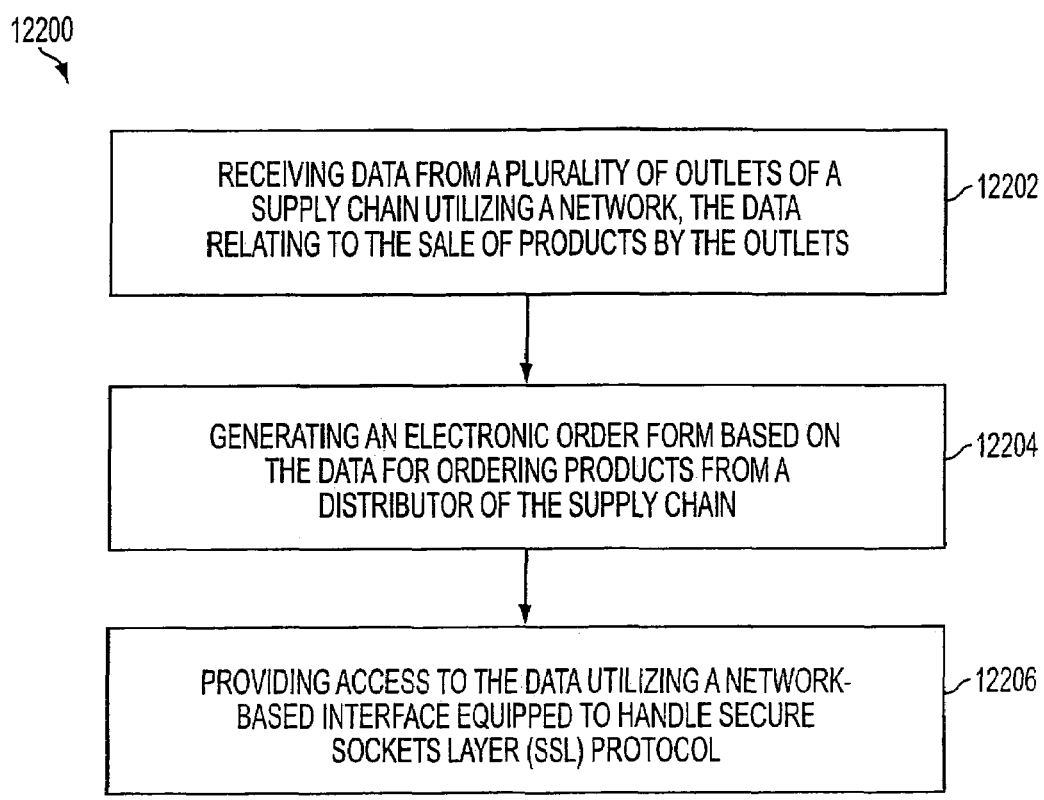

FIG. 122 is a flowchart of a process 12200 for managing a supply chain utilizing a network. Data is received from a plurality of outlets of a supply chain utilizing a network in operation 12202. The received data relates to the sale of products by the outlets. An electronic order form is then generated in operation 12204 based on the data for ordering products from a distributor of the supply chain. Access to the data is provided in operation 12206 utilizing a network-based interface equipped to handle secure sockets layer (SSL) protocol.

In one aspect, the access may be provided only after verification of a password and a user name. In another aspect, the network-based interface may be capable of timing out after a predetermined amount of time. In a further aspect, the data and electronic order form may be encrypted. In yet another aspect, the network includes the Internet. In an additional aspect, the outlets, the distributor, and a supplier each may be provided access to the network-based interface.

Figure 123:
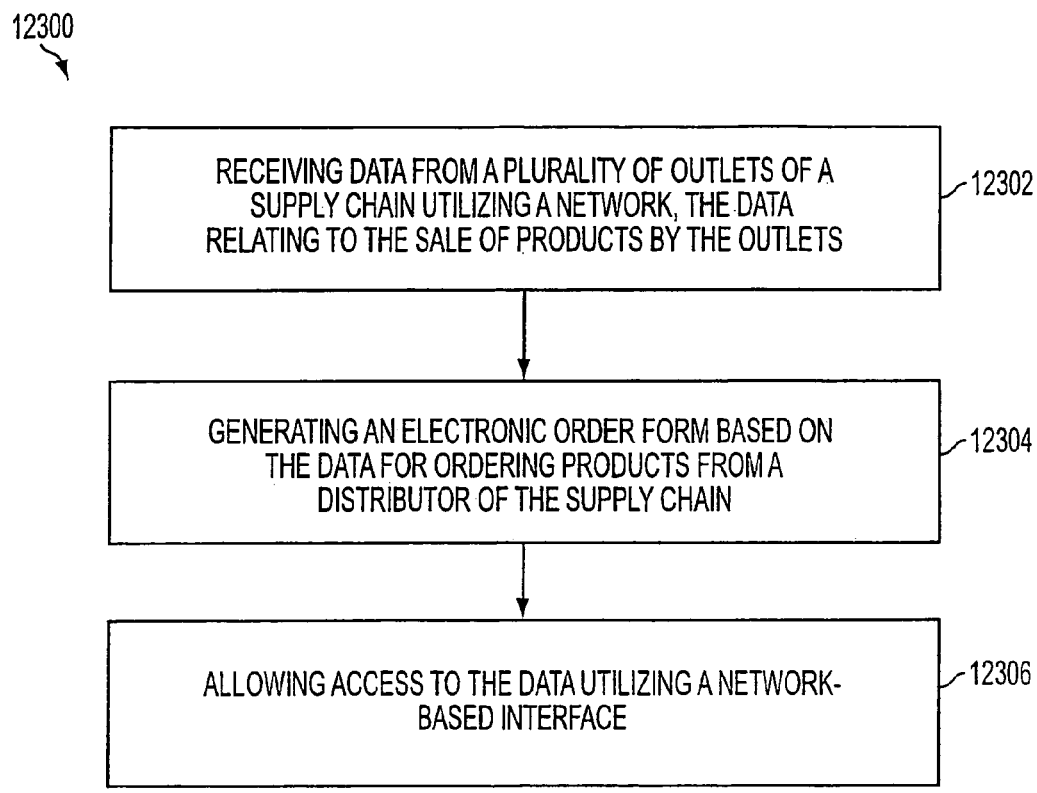

FIG. 123 is a flowchart of a process 12300 for managing a supply chain utilizing a network. Data from a plurality of outlets of a supply chain is received utilizing a network in operation 12302. The received data relates to the sale of products by the outlets. An electronic order form is generated in operation 12304 based on the data for ordering products from a distributor of the supply chain. Access to the data is allowed utilizing a network-based interface in operation 12306.

In one aspect, forecasting may be made available on the network-based interface. In another aspect, promotion planning may be made available on the network-based interface. In a further aspect, the network includes the Internet. In an additional aspect, the outlets, the distributor, and a supplier may be allowed access to the data.

Figure 124:
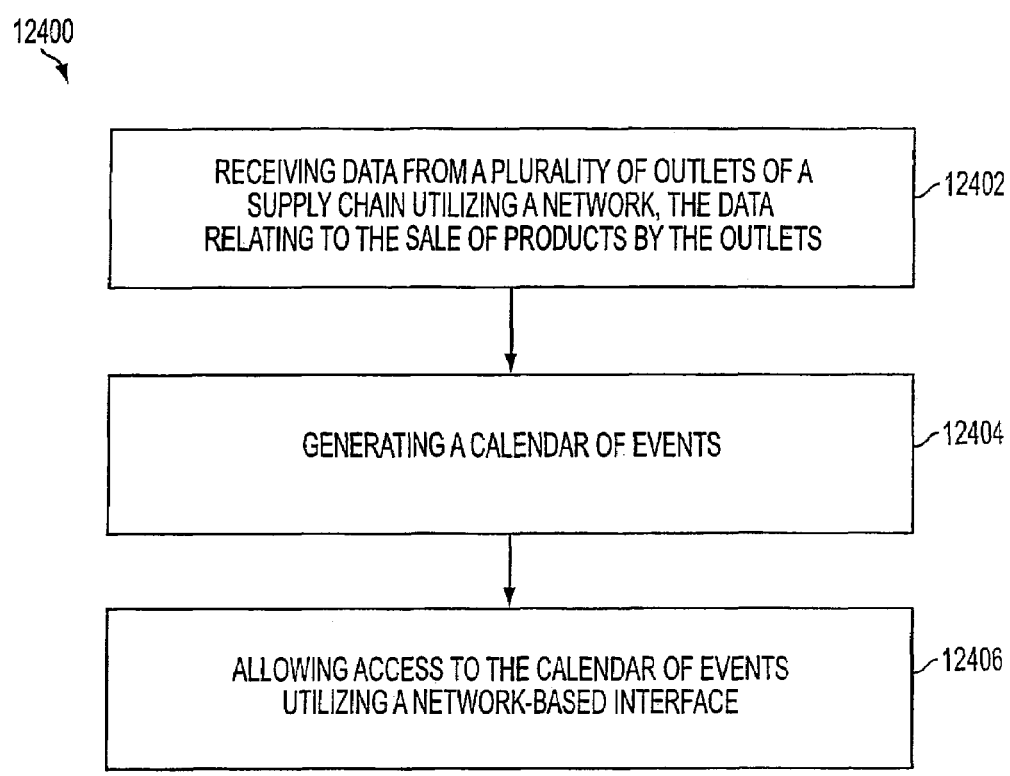

FIG. 124 is a flowchart of a process 12400 for disseminating calendar information in a supply chain utilizing a network. A network is utilized in operation 12402 to receive data from a plurality of outlets of a supply chain relating to the sale of products by the outlets. A calendar of events is generated in operation 12404. Access to the calendar of events is allowed utilizing a network-based interface in operation 12406.

In one aspect, the calendar of events may be generated based at least in part on the data. In another aspect, the calendar of events may be generated based at least in part on promotion planning. In further aspect, the network includes the Internet. In an additional aspect, the access to the calendar of events may be restricted to only a predetermined set of the outlets. In such an aspect, the restricted access may be enforced utilizing passwords as a further option.

Illustrative Embodiment

Figure 125:
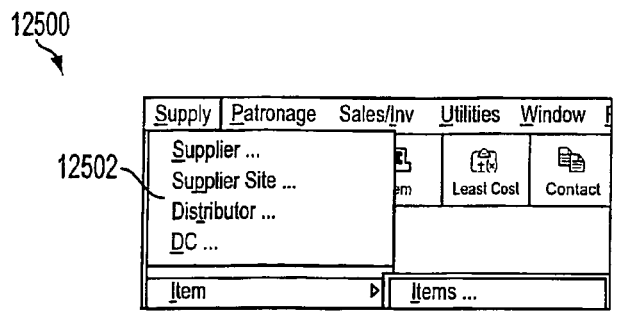

This section illustrates a Supply System according to an exemplary embodiment of the present invention. Accordingly, FIG. 125 illustrates a graphical user interface 12500 for generating cost system components. The basic components of the cost system are Items 12502, FOB points (Supplier Sites) and Distribution Centers. To add to or modify a cost system component, the relevant component is selected from the Supply menu. Then New 12602 is selected from selection screen 12600. See FIG. 126.

FIG. 127 illustrates an Add Items window 12700 displayed upon selecting Items from the Supply menu and New from the selection screen. Several fields of the window are:

Item Desc 12702: Enter a uniquely identifying Item description. This is the name that will appear on all reports including Landed Cost reports, Price Notifications and Contract Exhibits. (The sections entitled Building Cost Matrices and Creating Contracts, below, provide an explanation of these reports.) FIG. 128 illustrates a Landed Cost Report 12800 by Distribution Center.

Product Cat Code: Product category, for example, dry, refrigerated, frozen etc.

Item Rank: Optional, Test, Mandatory or Unknown.

Note that the underlined data indicates that the information is required.

FIG. 129 illustrates an Item/FOB button 12900 that calls up an FOB window 13000 (see FIG. 130) upon its selection. If FOB points are already in the system, Item/FOB associations (Who can supply the product) can be created from this screen. A procedure for adding new FOB points is set forth below.

The information entered for each Item FOB has many implications throughout the purchasing automation systems. The values are used on many of the reports provided to Suppliers, Distributors and Board Members as well as being an integral part in Bid and Least Cost calculations. The following list defines several of the fields of the FOB window. Self-explanatory columns are omitted.

Supplier Item Desc: Item description by which the Supplier identifies the Item. This may not always agree with the Supply Chain coordinator's description and in some cases the Supplier may have the same item description for many Supply Chain coordinator items, for example, promotional cups. PN (PN—Data is used on a Price Notification)

Item Size: Used to store case dimensions; can be replaced by case specific columns. PN Item No: Suppliers Item number. PN Case Length, Width, Depth: Product of the columns should equal the Item Cube.

Tie/High Quantity: Case Width and Height on a pallet, i.e. 3 Cases across on 4 levels. PN Item Cube: Volume per case. PN/BLC (BLC—Data is mandatory to complete the Bid/Least Cost calculations.)

Cases per Truckload: # cases per truck. PN/BLC

Gross Weight: Gross Weight of each case. PN/BLC

The process for adding FOB points is essentially the same as adding Items. In this case, Supplier Sites is selected from the Supply System main menu, then New on the selection screen. FIG. 131 illustrates a window 13100 for adding an FOB point. In the Site Name field 13102, the name of the site is entered. One standard naming convention for a supplier site is SUPPLIER NAME—CITY, STATE. The Site Role field identifies the role of the site. Only sites that have been marked with a role of "FOB Shipping Point" or "Corporate & FOB Point" are available to the purchasing systems when building cost matrices, creating Bids, etc.

The Supplier should be added to the system before identifying the FOB points. In many cases the Suppliers headquarters is also an FOB point. These records will be identified with a site role of "Corporate & FOB Point". See below for a further explanation of Site roles.

FIG. 132 depicts a screen 13200 for adding Distribution Centers. Distribution Centers are added much less frequently and basically have to satisfy the same requirements as FOB points. They must have a role of "FOB Shipping Point" or "Corporate & FOB Point" and have an "Active" status in order to be selected.

FIG. 133 is a flowchart of a process 13300 for creating cost system components in a supply chain utilizing a network in accordance with an embodiment of the present invention. A plurality of items are defined utilizing a graphical user interface in operation 13302. A supplier site is selected from a set utilizing the graphical user interface in operation 13304. The set of supplier sites is determined based on the definition of the items. A distribution center is also determined utilizing the graphical user interface in operation 13306. The distribution center is designated to interface with the supplier site for distribution of the items.

In one aspect of the present invention, the items may be defined utilizing an item identifier, a category, and a rank. In another aspect, the set of supplier sites may be determined utilizing on an association between the definition of the items and the supplier sites. In an additional aspect, the set of supplier sites may be capable of supplying the defined items. In a further aspect, the supplier sites may be defined utilizing a name and a role identifier. In an additional aspect, the items are defined, the supplier site selected, and the distribution center determined utilizing a network.

Building Cost Matrices

Once the basic components of the cost system have been created, the matrices can either be manually created or can be generated by the Least Cost system after completion of analysis. (See the section entitled Creating the Cost Matrices, below, for a detailed explanation of this option.)

FIG. 134 illustrates a matrix window 13400. Matrices can be created from scratch or by making a copy of a previous matrix using a New Using Previous option. The important options at the top of the matrix window are as follows:

Begin:/End: Identifies the starting point and length of the current model. Matrices cannot overlap and at the point one attempts to save an overlapping matrix, he or she will be prompted to change the dates.

Final: Only matrices that have been finalized will appear on all published reports in the system. Note that even if the dates suggest that this matrix is current, the fact that the final indicator is left unchecked will filter it from reports.

Apply By: This feature allows a user to effect a change to one or multiple records. For example, say an Items Invoice FOB price will be the same regardless of the FOB point. If the price for one FOB point is entered, and "Apply By" Supplier is selected, the system would automatically copy the same value to all other FOB points belonging to that Supplier.

FIG. 135 illustrates a matrix 13500. Matrices are preferably used to display performance metrics in an organized and easily understandable manner. Such performance metrics include on time delivery, fill rate, perfect delivery, lead-time, payment periods, costs, order charges, etc.

The primary purpose of a matrix is to identify the source and destination for the product in question. In this example, the Ameriserve Denver Distribution Center (DC) will be supplied by Tyson's Greenforest, Arkansas FOB point.

FIG. 136 illustrates an FOB matrix 13600. Columns in the matrix are set forth below.

Con FOB the Contract FOB is the actual price from the FOB point selected on the current record. In the case of volume pricing, this signifies the price at the volume breakpoint, based on the total award to this FOB point across all DC's.

Inv FOB the Invoice FOB is the weighted average contract FOB for the current matrix. Each contract fob price is weighted based on the volume on that particular lane. This is the price that the DC will actually receive on their invoice. All DC's receive the same invoice price with the exceptions of RDC lanes (See below for a more detailed explanation.)

Freight Actual freight charge on the lane.

Landed the actual cost to the Distribution Center.

FIG. 137 illustrates a contract matrix 13700 displayed upon selection of the Contract button 13800 shown in FIG. 138.

Contr The contract that covers this item and date range. (See the section entitled Creating Contracts for a detailed explanation.) The contract is associated with the Matrix by selecting the Contract Link option on the toolbar.

LB The total weight of product (generally only for beef) on this lane.

Trk The number of trucks that the weight entered represents.

Routing The routing option used on this lane. Either Full Truckload (TL), Less than Truckload (LTL), Re-distribution (RDC) or Truckload with a minimum (TLMIN). The section entitled Optimal Product Routing provides a detailed description with examples of each routing type.

FIG. 139 depicts a minimum order matrix 13900. Matrix items include:

Min Ordr/UM When the usage on a lane suggests that the DC will not order full truckloads, the minimum order for TLMIN orders can be specified using these columns.

Slip Whether the product ships on Slipsheets or Pallets.

Deliv. In certain cases the Suppliers will quote only a price directly to the Distribution Center. In these scenarios the Invoice FOB, Contract FOB, Freight and Landed columns will be blank and the delivered price is entered here.

FIG. 140 illustrates a shipping matrix 14000.

Carrier Rail, Truck, Ship etc. The method of shipment.

Stated Vol the expected volume on the lane. This number will show up on the contract reports discussed in the next section.

Once the matrix is complete, it should be finalized and saved.

At this point the Distribution Center (DC) Price notification can be generated. This communicates to the DC's their FOB points selected and relevant pricing, and is generated by selecting the Price Notification option from the Options menu 14100 (FIG. 141) or the Notification toolbar button 14200 (FIG. 142). Supplier confirmation is provided with the contract for all items except Beef.

For example, since beef pricing is changed much more frequently than other products, their contracts cover multiple cost matrices. They have a separate DC Notification and Supplier Confirmation report, which is only enabled when working with beef items.

The beef reports are generated in letter format and automatically combine all beef items into the same report.

FIG. 143 illustrates selection of a Multi-Item Price Notification 14300. If a Price Notification is generated from the cost matrix window, it will only include the current item.

Also provided can be the facility to generate multi-item price notifications. The windows standard paradigm of CTRL+CLICK and SHIFT+CLICK can be used to select multiple items on the item selection window. The report will automatically combine all selected items in one report, but may or may not be possible to select two matrices for the same item.

FIG. 144 is a flowchart of a process 14400 for utilizing cost models in a supply chain utilizing a network in accordance with an embodiment of the present invention. At least one item to be distributed is identified utilizing a graphical user interface in operation 14402. A cost model is associated with the item utilizing the graphical user interface in operation 14404. The graphical user interface is then utilized to determine a time frame during which the cost model is valid in operation 14406. The cost model identifies a contract cost, an invoice cost, and a landed cost associated with the distribution of the item.

In one embodiment of the present invention, reports for each of the items may be generated utilizing the cost model. As a further aspect, at least one of the reports may be for a plurality of the items. In one aspect, the cost model identifies a source and a destination of the item. In another aspect, a plurality of the cost models may be available for being associated with the item. In a further aspect, the item may be identified and the cost model associated with the item utilizing a network.

Creating Contracts

The Price Notification reports, discussed in the previous section provide the communication link with the DC's, whereas the Supplier reports are generated within the contracts system.

In order to link contracts to cost matrices as discussed in the previous section, the relevant items must first be associated with the contract. An item selection screen is accessed such as by selecting a New Item button 14500 as shown in FIG. 145. The item selection screen works in the same manner as the selection screens discussed in the section on "Creating Cost Components".

Preferably, Item/Contract associations cannot overlap; in other words there cannot be two contracts for the same items with a Supplier at the same time. The system will automatically prevent creation of this situation.

FIG. 146 illustrates a Contract/Buyer association screen 14600.

Contract ID: The contract number is assigned automatically by the system once the user saves for the first time.

Current Buyer: Products frequently change hands as buyer responsibility's change. The present invention provides the ability to select the current buyer to accommodate this fact.

FIG. 147 depicts a contract schedule screen 14700. Pertinent fields are:

Contract Start/End: Contracts can span multiple matrices, but cannot overlap. The dates will appear on all reports sent to the Supplier.

Effective: Either shipment or order date.

Payment Terms: Terms of payment.

Lead-time, Effective and Payment Terms all appear on the DC Price notification.

The present invention also generates several reports. A Generate button 14800, shown in FIG. 148, links to Microsoft Word and populates required fields with the contract information. Once created, a contract cannot be overwritten by the system. Further, contracts can only be removed by an administrative department.

FIG. 149 illustrates an Exhibit A button 14900, which upon selection provides the Supplier with the "Approved Products" listing for the current contract. This identifies the products and FOB points for which the contract is being established.

The Exhibit A report shows all detail added when the Item/FOB records is created. It is important in that it identifies the relationship between the Supply Chain Coordinator's item and the Supplier's item and also ensures that the information in the system is current and correct.

FIG. 150 illustrates an Exhibit B button 15000, which upon selection provides the detail on per case pricing and volume for each lane assigned to this Supplier.

The Exhibit B always retrieves the latest finalized matrix for each item. If the contract has not been linked or the relevant matrix finalized, they should be done prior to generating this report.

In most cases, the contract term will correspond to the start and end dates of the linked matrix. However, if the contract will outlast the matrix, the screen 15100 of FIG. 151 is presented. The various columns include:

Cost Matrix End Date identifies the minimum term but will also mean that at the end of the matrix the contracted pricing will expire and a new Exhibit B should be generated and signed. (See Replacement Exhibit B)

Contract End Date assumes that the pricing will not change for the length of the contract although the matrix suggests that this may not be true.

No End date essentially leaves it open-ended.

Since the Exhibit B will publish the term of the pricing, the choice of end date becomes very important.

In some cases, there may be a need to publish new pricing and volumes during the term of the contract. Selection of the Replacement Exhibit B menu item 15200 accommodates this process. See FIG. 152. The replacement Exhibit B differs from the standard Exhibit B only in that it provides a section at the end of the report for signatures.

Exhibit C, generated upon selecting the Exhibit C button 15300 of FIG. 153, lists product routing for each lane and any minimum order quantities if applicable, whether the product is sent in full truckloads, full truckloads with a minimum order quantity, less than truckload or for re-distribution.

FIG. 154 is a flowchart of a process 15400 for creating a contract utilizing a supply chain graphical user interface in accordance with an embodiment of the present invention. A contract is identified utilizing a graphical user interface in operation 15402. The contract is the associated with an item to be distributed utilizing the graphical user interface in operation 15404. The item is also prevented from being associated with more than one contract in operation 15406.

In one aspect of the present invention, the contract may be identified utilizing a start date, an end date, an execution date, and payment terms. In one embodiment, the contract may be generated by populating a template with information associated with the contract. In another aspect, items capable of being associated with the contract are displayed. In a further aspect, the contract may be identified and the contract associated with the item utilizing a network. In such an aspect, the network may include the Internet.

Bid Proposal Processing

The proposal system has been designed to allow quick and easy creation of a generic proposal for any item(s) and supplier(s) within the Supply System. By centralizing the creation and storage of the data, an online record of all current and historical proposals is enabled. The proposal system is also tightly integrated with the Least Cost analysis system.

The system is made up of two modules: data entry and reporting.

Data Entry allows a user to enter or select all information for generating a complete proposal. Data Entry includes entering general proposal information (i.e. proposal name, buyer name, due date, contract begin date and end date), items, suppliers, restaurants served, usage information, selecting cost component templates, and updating Microsoft Word template documents. Most of the information above will be generated from data within the Supply System, but the system will allow the user to change some information when necessary.

Reporting: After data has been entered, the proposal can be generated and printed. In the reporting module of the proposal process, a user can update specific documents for a supplier, print any of the reports included in the proposal, and/or generate the entire proposal.

By following the flow of the tabs on the proposal window 12900 (see FIG. 129), the user will be guided through the proposal process. When enough data is entered to continue on to the next step in the proposal process more tabs will be enabled. For example, when the user has completed entering information on the Main Info tab, the Items, Suppliers, DCs, and FOB Price tabs will become enabled.

The goal of the proposal system is to provide a way to generate a proposal in a more time efficient manner while at the same time centralizing the storage of proposals and allowing integration of the proposal with the Least Cost Analysis system.

A new Proposal can be created in either of two ways. The first and probably the most simple method is to build the proposal from scratch. Referring to FIG. 155, to create a proposal from scratch, select Proposal from the Supply menu. Then select Edit/New 15500 to open an existing Proposal or create a new proposal. After selecting the Edit/New menu option, the standard query screen is presented. Select New on the standard query screen to begin generating the proposal.

The second method uses the "New Using Previous" feature of the present invention, which will create an entire copy of a previous proposal (not including any documents) and allow the user to make any necessary modifications. To being the process, select the New Using Previous menu item 15502 to copy an existing Proposal into a new Proposal. Note that this feature is similar to the Cost Matrix feature of the same name.

FIG. 156 illustrates a Bid Proposal Window 15600. The Bid Proposal window is made up of several different 'tabs'. These tabs are identified by the labels across the top of the window. Examples of the tabs are 'View Bid' 15602, 'Items' 15604, and 'Usage' 15606.

The first tab visible on the Bid Proposal window when it is opened is the 'Main Info' tab 15608. The 'Main Info' tab is where general information for this proposal is entered. The main info tab on the Bid Proposal window shows general information, comments, and dates associated with this bid. Such information includes:

Proposal ID: Unique identifier for this proposal. Generated by the Supply System, Noneditable, used for identification on specific reports and for retrieval of proposals.

Proposal Name: Unique name for this proposal. It should be representative of the type of proposal the user is completing, and will be the primary method of identifying and retrieving the proposal later.

Buyer Name: Name of buyer creating this proposal. Used to retrieve proposals by buyer.

Proposal Due Date: Date that this proposal is due back to the Supply Chain Coordinator. Used on the proposal Cover Letter report.

Contract Begin Date: Date that contract associated with this proposal begins. Used on the proposal Cover Letter report, and used to determine contract length for usage calculations.

Contract End Date: Date that contract associated with this proposal ends. Used on the proposal Cover Letter report, and used to determine the contract length for usage calculations.

Actions: Actions are comments or activities associated with this proposal. A proposal can have an unlimited number of actions as long as each action has a date and text. To add, delete, or print actions use the buttons on the window's toolbar 15700, shown in FIG. 157.

After entering all of the information on the 'Main Info' tab the user can move to the next tabs, 'Items', 'Suppliers', and 'DCs'. These tabs are where the creation of a proposal begins. Although these elements are added on three separate tabs in this description, the methods used to include them are consistent.

FIG. 158 illustrates the page 15800 under the Items tab. As shown, the left side of the page under each tab is the search and selection area. It functions in the same manner as the rest of the Supply System, in that the user enters a search string and clicks search, and similar names to the search string will be retrieved. For example, as shown in FIG. 159 which illustrates the page 15900 under the Items tab upon selection of the Search button, all Items beginning with "CUP-HOT" would be retrieved. After clicking on the 'Search' button, the present invention shows a list of Items matching 'CUP-HOT'.

These tabs are "Drag and Drop" enabled; the user can select any of the items found and by clicking on the relevant item and dragging it to the right, it is now included in the analysis. By the same token, dragging the selected item to the left will remove it from the proposal. The buttons between the search and selected areas can also can move the selections. Button 15902 moves whatever has been highlighted on the left and includes it in the proposal. Button 15904 moves all items retrieved and includes them in the proposal. Button 15906 removes everything previously included in the proposal. Button 15908 removes only the highlighted selections from the proposal. Further, multi-select using CTRL+Click, and double clicking on any Item to move it are preferably also supported.

After a search for the desired item(s) has been performed, another search can be performed by clicking the 'Query' button and entering new search criteria.

It is important to note that in order to include any of the elements in the proposal, they must have previously been entered in the Supply System. The Supplier selection tab retrieves all active and unapproved Suppliers that match the search criteria and have at least one active contact. Inactive elements should not appear as a relevant selection in any of the tabs.

Since the DCs are generally consistent between proposals, a complete list of all active DCs is retrieved and then the user simply selects the relevant one, or in most cases presses the button to move them all to the right.

When the user leaves any of the tabs for the first time, the new elements are propagated to all dependent tabs. For example, if a new Item is added, that implies new usage information.

FIG. 160 illustrates a page 16000 under the FOB Price tab for selecting FOB price component worksheets. As part of the proposal process Suppliers are asked to bid on FOB prices. The worksheets that are provided to the suppliers can vary depending on the type of items included in the bid. There are several template FOB Price component worksheets in the system. A different worksheet may be associated to each item. For example, if a proposal involving mayonnaise were being prepared, the user would select the 'Mayonnaise Component' worksheet as shown in FIG. 160.

An association between a worksheet and each item must be generated before continuing to the next tab. Once all FOB price components are selected, the remaining tabs are enabled.

The selected worksheets can be printed along with the bid and can be viewed on the 'Template' tab. For more information on the 'FOB Price Component Worksheet' see the Reporting section of this document.

The Proposal mechanism for estimating usage functions in almost exactly the same manner as in the Least Cost Analysis System. It is comprised of two tabs; the DC/Rest tab is used for estimating restaurant growth by DC, and the Usage tab to estimate same store or item growth. The values from the first tab are used in the Usage tab to determine the projected usage. For more information on general processing in these tabs see the section entitled Distribution Center Usage.

FIG. 161 depicts a window 16100 for managing Distribution Center usage. Although the use of the DC/Rest and Usage tabs are almost identical there are a few differences and should be pointed out. Also, the tabs may look the same but the data stored here are used for different purposes in each process. The differences in the proposal system are explained below. Usage information, Gross Weight and Item Cube can be used to determine if LTL sheets are printed and/or RDC's are included.

Gross Weight the approximate gross case weight of each item.

Item Cube the approximate case volume of each item.

Projected Usage Projected usage for the proposal contract period.

For example, if the two (2) week truckload weight estimate (two week usage×gross weight) is less than the system weight default (48,000 LBS) OR the two week volume estimate (two week usage×item cube) is less than system cube default (3000 CFT) for any DC, an LTL worksheet is generated and RDC records will appear on the Truckload Freight Worksheet. The exact gross weight and cube will be requested on the Item Worksheet. Realize that the total gross weight for a truck is 45,000 lbs. LTL rates can be requested for any lane with less than 48,000 lbs. to avoid having to go back to the Supplier for additional rates. Optimal Product Routing in this example uses 43,500 lbs. gross weight of product, which accounts for pallet weight. For a detailed look at the components and processing of the Usage Estimator, see the section of the same name.

FIG. 162 is a flowchart of a process 16200 for creating a bid proposal utilizing a supply chain graphical user interface in accordance with an embodiment of the present invention. A graphical user interface is displayed in response to a request to create a bid proposal in operation 16202. Utilizing the graphical user interface, information is received in operation 16204 so that a bid proposal can then be generated using the information in operation 16206. The received information may include a buyer name, a due date, a contract begin date, and/or a contract end date.

In one aspect of the present invention, the bid proposal may be generated utilizing templates. In another aspect, the information may be selected from a displayed list of available information. In a further aspect, items capable of being associated with the bid proposal may also be displayed. In such an aspect, the information may further include usage information associated with the items. In an additional aspect, the information may be received utilizing a network.

Proposal Reporting

In order to create a proposal, the user first edits template documents and then selects which reports will be included in the proposal. FIG. 163 illustrates a Templates button 16300 which calls the Template window 16400 shown in FIG. 164.

The Proposal consists of two types of reports, Microsoft Word and Coordinator Supply. Microsoft Word reports are formatted and some are editable within Word whereas the Supply System reports are generated by the Supply System but are not editable. The following is a list of reports available in the Proposal System and how they are generated.

The proposal system allows editing of a Microsoft Word template document which is then used to create the actual document that will be included in the proposal. FIG. 165 illustrates a window 16500 displayed upon selection of the Templates tab. A drop down list box 16502 shows which template documents can be edited. As shown in FIG. 165, the available templates include the Cover Letter and Price Component Worksheet. To start Microsoft Word and edit the selected template, the user double clicks on the document in the window.

Once Microsoft Word has started the user can edit the template document to fit his or her needs. The proposal Cover Letter will be used herein as an example in order to demonstrate how to use the template documents. The template bid cover letter is the basic cover letter used to create supplier-specific cover letters.

Only generic changes that apply to all suppliers should be made in the template. When the proposal is created, this document will be copied to all the suppliers and contacts associated with this proposal. The user will be able to edit a supplier specific cover letter later in the proposal process.

When editing of the cover letter ahs been completed, the document is saved by selecting File, Update from Microsoft Word's menus 16600, as shown in FIG. 166. Now the user may return to the Supply System and continue with the proposal process.

Select Update to update the template

After the user has completed editing the templates, the proposal can be created. Before creating the proposal, the user is allowed to select which reports should be included. FIG. 167 is an illustration of the page 16700 presented upon selection of the Create Bid tab. To design/customize the appropriate proposal and select reports, the user checks or unchecks the appropriate boxes. When the user is satisfied with the selections click the 'Create Bid' button 16800 on the toolbar. See FIG. 168.

The present invention then creates all of the documents needed to print this proposal. The user can view any of these reports by making the appropriate selections in the drop down list boxes 16900 shown in FIG. 169. The user also has ability to view any of the proposal reports one at a time and for any specific supplier.

Printing

The proposal system allows a certain degree of flexibility when it comes to printing the proposal. The user can either print out one report for a specific supplier (the currently selected report shown on the window) or print the entire proposal. When printing the entire proposal, the documents will be collated by supplier. Microsoft Word documents will be printed first for all suppliers followed by the Coordinator generated reports. The different printing mechanisms can be controlled by the buttons on the toolbar, shown in FIGS. 170 and 171. For example, the Print button 17000 Prints the currently selected report on the window. The Print Bid button 17100 prints the entire proposal.

This will print all of the reports that have been checked off on the Create Bid tab, only choose this option if the user is sure that he or she is ready to print the entire proposal. The proposal is now ready to be sent out. When proposals are returned, the information can now easily be moved from the proposal process into the Least Cost Analysis.

FIG. 172 is a flowchart of a process 17200 for proposal reporting utilizing a supply chain graphical user interface in accordance with an embodiment of the present invention. A proposal is identified in operation 17202 utilizing a graphical user interface. A plurality of components of the proposal are then indicated utilizing the graphical user interface in operation 17204. The selection of the components is subsequently allowed utilizing the graphical user interface in operation 17206 so that a proposal can be created utilizing the selected components in operation 17208.

In one aspect of the present invention, the proposal may be generated utilizing templates. In another aspect, the graphical user interface may be displayed utilizing a network browser. In a further aspect, the proposal may be editable. In an additional aspect, the proposal may be read-only. In yet another aspect, the proposal may include a bid proposal for goods to be shipped from a supplier to an outlet.

Creating a New Analysis

A Least Cost Analysis can be created in either of three ways. The first and probably the most cumbersome method requires building the analysis from scratch. The second method integrates the Bid proposal selections and creates the basis for a new analysis. Finally, the "New Using Previous" feature can be used, which will create an entire copy of a previous analysis version and allow the user to make any necessary modifications.

After selecting the Least Cost Toolbar button 17300 (see FIG. 173), the user is prompted with the standard query screen 17400, shown in FIG. 175. The New button is selected. The details of the actual Analysis features are covered in a section below.

The New Using Previous option is selected from the menu 17500 shown in FIG. 175. Similar to the Cost Matrix feature of the same name, the user can make a complete copy of a previous Analysis version. However, unlike the Cost system there is no requirement that Analysis' dates cannot overlap.

Referring to the Bid Integration feature, since a lot of the information selected by the user in the Bid Proposal is also relevant to a Least Cost Analysis, the present invention provides the ability to integrate the Bid information in the analysis.

To use the Bid Integration feature, the user selects the New option as above and the first column on the Analysis Tab will provide an alphabetical list of all Bid Proposals in the system. This will copy the Items, Distribution Centers, DC Usage and usage related information such as same store and restaurant growth estimates from the Bid. The user can change the Bid selection or remove it by selecting "(None)" from the drop down list box 17600 shown in FIG. 176.

FIG. 177 is a flowchart of a process 17700 for analysis creation utilizing a supply chain graphical user interface in accordance with an embodiment of the present invention. A graphical user interface is utilized in operation 17702 to select between a plurality of options with each option corresponding to a separate technique of creating an analysis. A new analysis is generated upon the selection of a first of the options in operation 17704. Upon the selection of a second of the options, a previous analysis is edited in operation 17706. Also, upon the selection of a third of the options, a bid proposal is integrated with an integrated analysis in operation 17708.

In one aspect of the present invention, the selection may be received utilizing a network. In such an aspect, the network may include the Internet. In another aspect, the analysis may be a least cost analysis. In a further aspect, the analysis may be capable of being accessed via a network-based interface.

Analysis Tab & Version Control

FIG. 178 illustrates a window 17800 displayed upon beginning an analysis. The information displayed in the window includes:

Analysis Name: The name that identifies the analysis in the system.

Analysis ID: Unique identifier assigned by the system.

Buyer: The buyer responsible for this analysis.

Period of Agreement: The dates that cover the range of the analysis. The dates are used to calculate usage estimates if required, and ultimately to create the Cost Matrix.

Unit of Measure The units that pricing, plant capacities etc., will be entered.

FIG. 179 depicts an option selection window 17900. Each of the following options can be changed by analysis version:

Version Name: The name that uniquely identifies each run of the analysis. Version Control is handled in more detail later in this section.

. . . max # of FOBs . . . : By changing this option, either a single source (One FOB per DC) or a multi-source problem is run. Everything other than "One FOB" is considered multi-source with available selections from two to five FOBs and unlimited.

. . . pricing method . . . : The present invention supports three types of pricing, FOB, FOB+Freight and Delivered. Each version can have a different pricing method. Pricing is covered in detail in the section entitled Pricing.

. . . Upcharge(Downcharge) . . . : Any adjustment positive or negative that should be made to the Invoice FOB calculated by the system.

. . . RDC Truckload Validation . . . : Ignores the fact that the total usage on winning OPR lanes for an FOB may not be enough to warrant RDC routing.

Solution Strategy For very difficult problems, the present invention provides an alternate strategy which a user can choose to determine the least cost. Generally, for problems that are taking fifteen minutes or more, this strategy is recommended. It will arrive at the same answer as the standard strategy but in a much shorter time. Since most of the solutions determined by the solver are returned in seconds the "Cuts" strategy would actually add unnecessary overhead for simple problems.

When the analysis tab is selected, the version button 18000, shown in FIG. 180, is displayed on the toolbar. Unlimited versions of an analysis can be created simply by pressing the button. FIG. 181 illustrates a verification window 18100 that appears upon selection of the version button.

The name assigned to the new version should be representative of the variance being tested in order to easily differentiate between versions later. A discussion of the methods provided for completing version comparisons is presented in the section entitled Solving and reviewing the Solution.

Items, FOB, DCs and Usage information are not considered to be version dependent, and hence this information cannot be changed once a second version of an Analysis has been created. However, a variety of methods of excluding this information from consideration between versions is provided by the present invention.

FIG. 182 is a flowchart of a process 18200 for analysis version control in a supply chain management framework in accordance with an embodiment of the present invention. A plurality of separate versions of an analysis are maintained in a database in operation 18202. A request for an additional version of the analysis is received utilizing a graphical user interface in operation 18204. In response to the request, the additional version of the analysis is generated in operation 18206. A plurality of parameters of the additional version are allowed to be changed utilizing the graphical user interface in operation 18208. The parameters that are allowed to be changed include: a maximum number of supplier sources, a pricing method, and/or an invoice adjustment.

In one aspect of the present invention, the additional version of the analysis may be named in accordance with a variance associated with the additional version. In another aspect, the request may include the selection of an icon on the graphical user interface. In a further aspect, the analysis may be a least cost analysis. In an additional aspect, the request may be received utilizing a network. In yet another aspect, the parameters of the additional version may be capable of being changed utilizing a plurality of fields on the graphical user interface.

Adding Items, FOBs and DCs

Although Items, FOBs and DCs are added on three separate tabs in the Analysis, the methods used to include them are consistent. FIG. 183 depicts a tab page 18300 for adding and removing FOBs from an analysis.

The left side of each tab is the search and selection area. It functions in the same manner as the rest of the system, in that a search string is entered and a search button is selected, and similar names to the search string will be retrieved. For example, in the case shown in FIG. d53, all FOBs beginning with "DOP" would be retrieved.

These tabs are "Drag and Drop" enabled, allowing selection of any of the matches found and by clicking on the relevant match and dragging it to the right, it is now included in the analysis. The buttons 18302 between the search and selected areas can also move the selections, similar to the manner discussed above with reference to FIG. 183. Multi-select using CTRL+CLICK and double clicking on any Item to move it, are also supported. It is important to note that in order to include any of the elements in the analysis, they must have previously been added to the system.

The FOB selection tab retrieves all active and un-approved FOBs that match the search criteria. Inactive elements will never appear as a relevant selection in any of the tabs.

Since the DCs are generally consistent between each analysis, a complete list of all active DCs is retrieved by default and the user selects the relevant DCs or in most cases presses the button to move them to the right.

As shown in FIG. 184, which illustrates a portion of the Item tab page 18400, the Item tab has an additional editable column 18402 for the Item conversion factor.

Conv. Factor: If the analysis is using units other than cases, the present invention converts any input data to the relevant lowest common denominator. For example, if pounds are being used and there were 36 lbs. of a product in a case, the conversion factor would be 36. The default is always one (1), since the large majority of analyses will be in cases.

When leaving either of the tabs for the first time, the system propagates the new elements to all dependent tabs. For example, if a new FOB is added, that implies new pricing, lanes, capacity etc. will also be added and the relevant tabs for each information group are updated.

FIG. 185 is a flowchart of a process 18500 for editing supplier information in a supply chain management framework in accordance with an embodiment of the present invention. A graphical user interface is displayed that indicates a plurality of items in operation 18502. The selection of one of the items is allowed utilizing the graphical user interface in operation 18504. In response to the selection, a supplier associated with the item is depicted in operation 18506. A plurality of parameters of the supplier are also allowed to be changed in operation 18508 utilizing the graphical user interface.

In one aspect of the present invention, the selected parameters may include a case cube, cases per truckload, and/or a gross weight. In another aspect, the changes to the parameters may be updated in a database. In such an aspect, the changes to the parameters may be updated utilizing a network. In one aspect, the network may include the Internet. Additionally, the changes to the parameters may be updated in response to the selection of an icon of the graphical user interface.

Item FOB Information

FIG. 186 illustrates a page 18600 that is displayed upon selection of the Item/FOB tab. As part of the Bid proposal process, the information that has been entered for each Item FOB combination in the system is provided to the Suppliers for correction and/or additions. The Item/FOB tab in the analysis is provided for entry of any changes that they may have made. Even if the analysis is not based on a Bid, some of the information on this tab is crucial to the solver process.

Case Cube: the actual case cube or volume. It is used in the calculation of the per case two week cube on a lane (item cube×two week usage), which is required both by the optimal product routing (OPR) process and in determining which lanes have potential for LTL or RDC shipments. A detailed explanation of OPR process is provided in the section entitled Optimal Product Routing, below.

Cases per Truckload: All freight rates requested by the Bid are truckload rates. Since the majority of analyses are performed in cases, cases per truckload may be used to determine the case freight.

Gross Weight: the actual gross case weight. It is used in the calculation of the per pound two week usage on a lane (gross weight×two week usage), which is required both by the optimal product routing (OPR) process and in determining which lanes have potential for LTL or RDC shipments. A detailed explanation of OPR process is provided in the section entitled Optimal Product Routing, below.

The remaining information is also important, however it is not a factor in determining a Least Cost solution. It is stored separately from the Item/FOB Cost information so that cases per truckload or case weights can be used without effecting the data that is currently considered production.

At the point, the analysis has been completed and a version that will become the production model has been selected. The Cost information is updated by selecting the Update button 18700 on the toolbar. See FIG. 187.

Select the Update button and the present invention creates any Item FOB combinations that do not exist in the Cost system and update any existing combinations with the information the user may have entered to complete the analysis.

FIG. 188 is a flowchart of a process 18800 for adding components in a supply chain management analysis in accordance with an embodiment of the present invention. A query is entered in a search field of a graphical user interface for searching for a plurality of supply chain components in operation 18802. Results of the search are listed in a results field of the graphical user interface in operation 18804. The results are then selected from the results field for inclusion in a supply chain analysis in operation 18806.

In one aspect of the present invention, the selected supply chain components may include supplier sites, distributor sites, and/or items. In another aspect, the results may be selected for inclusion in the supply chain analysis utilizing icons. In such an aspect, the results may also be selected one at a time for inclusion in the supply chain analysis utilizing a first icon. The results may also be selected all at once for inclusion in the supply chain analysis utilizing a second icon. In a further aspect, the supply chain components may include items while the graphical user interface includes a field for entry of a conversion factor. In an additional aspect, the results may be selected for inclusion in the supply chain analysis utilizing a drag and drop feature.

Capacity & Excluding FOBs

The system supports capacity constraints at two levels. Both FOB minimum requirements and capacities can be set. They can also be set at the Supplier level.

FIG. 189 is an illustration of an exemplary analysis window 18900 displayed upon selecting a Capacity tab. For example, in this analysis, two levels of capacity constraints have been added for Lamb-Weston Inc. As a Supplier, Lamb must get at least 200 million pounds of product independent of any further requirement at the FOB level. Both the Pacso, Wash. and American Fall, ID FOB points have minimum requirements of 90 million and maximum capacities of 110 million. The remaining FOB in Richland, Wash. has essentially no minimum, but a 55 million capacity. Although the sum of the plant minimums is less than the Supplier minimum, the solver will allocate business to match the Supplier constraint while still ensuring that each FOB constraint is matched. Naturally, the sum of the plant maximums cannot be less than a Supplier minimum.

As mentioned above, once a second version of an analysis has been created, it is not possible to remove Items, FOBs or DCs. However, a Supplier or individual FOB points can be excluded on the Capacity tab.

FIG. 190 illustrates another analysis window 19000. In this example, two of McCain Foods FOB points have been excluded from this version of the analysis. The solver will not be passed the FOB points or any related information such as lanes, pricing etc. If the "Include" has been changed to "no" at the Supplier level, all the FOB points would be automatically excluded.

FIG. 191 is a flowchart of a process 19100 for managing supplier sites in a supply chain management framework in accordance with an embodiment of the present invention. A plurality of supplier sites are displayed utilizing a graphical user interface in operation 19102. A minimum value and a maximum value of capacity levels associated with the supplier sites are determined utilizing the graphical user interface in operation 19104. The supplier sites are conditionally excluded from a supply chain analysis utilizing the graphical user interface in operation 19106.

In one aspect of the present invention, terms of a contract associated with the supplier sites may also be identified utilizing the graphical user interface. In another aspect, the supplier sites may be conditionally excluded utilizing a toggle button. In a further aspect, the supplier sites may be conditionally excluded separately for different versions. In an additional aspect, the minimum value and the maximum value of the capacity levels may be determined utilizing a network. In such an aspect, the minimum value and the maximum value of the capacity levels may also be determined utilizing TCP/IP protocol.

Pricing

On the analysis tab, the option of selecting the pricing method being for this analysis version is presented. Depending on the selection previously made, the Price tab will be used for FOB or FOB & Freight pricing or the Price Dlvd tab for delivered pricing. The present invention also provides the ability to factor volume pricing into the analysis.

FIG. 192 is a depiction of an FOB pricing window 19200. In the simplest of cases, a price (Contract FOB) will have been negotiated for each Item and FOB combination in the analysis. Since the solver is passed a basket (weighted average across all items in the analysis) price for each lane, no price field can be left blank. In the example shown in FIG. 192, bulk mayonnaise has a price of $8.42 from the Hudson Industries Troy, Ala. plant and bulk tartar sauce is priced at $9.23.

Two forms of volume based pricing are supported in the Least Cost system: Supplier volume and FOB volume. They are mutually exclusive in that by version there can be only one type of pricing.

FIG. 193 depicts an illustrative FOB Volume Pricing screen 19300. In this example, American Food Service offers two volume pricing discounts at their FOB point. Any volume awarded to them from 0 to 2,090,000 pounds has a price of $1.0026/pound. If they are awarded volume between 2,090,000 and 2,508,000 that price drops for all volume to $1.0016/pound. For any volume over 2,508,000 pounds the price drops to $1.0010/pound. As the solver is deciding the optimal distribution model, if their FOB is awarded volume over any of the breakpoints it will grab the lower price and keep solving until the least cost is determined. The new price applies to all volume awarded from that FOB point.

In many cases the Suppliers may not be as concerned about the volume awarded to each individual FOB point as to the overall volume awarded across all their FOB points.

FIG. 194 depicts a Supplier Volume Pricing window 19400. In the pricing scheme shown in FIG. 194, Ventura has negotiated a Supplier volume pricing breakpoint. For any volume awarded between 0 and 999,999 cases the price for bulk mayonnaise will be $8.94 and $9.51/case for bulk tartar from Chambersburg and $9.12 and $9.58/case from City of Industry. If the combined volume across both of their FOB points exceeds 100,000 cases, the price drops to $8.84 and $9.41/case from Chambersburg and $9.02 and $9.48 from City of Industry. This price reduction is independent of the allocation to either FOB point as long as the overall award exceeds the Supplier volume breakpoint. The new price applies to all volume awarded.

It is also possible to have the new solver determine the Least Cost when the pricing is quoted on a delivered basis. Once a pricing method of "Delivered" is selected on the analysis tab the Price Dlvd tab is enabled. FIG. 195 shows a Delivered Pricing screen 19500.

Pricing is entered in the same manner as FOB pricing, and as in FOB pricing, the user must provide a price for all Items on a lane if at least one price is entered. Lanes can be excluded simply by providing no prices for those lanes.

FIG. 196 is a flowchart of a process 19600 for pricing in a supply chain management framework in accordance with an embodiment of the present invention. A selection of at least one of a plurality of types of pricing schemes is received utilizing a graphical user interface in operation 19602. Utilizing the graphical user interface, a plurality of supplier sites are then displayed in operation 19604. At least one of a plurality of pricing fields are depicted adjacent the supplier sites based on the selection utilizing the graphical user interface in operation 19606.

In one aspect of the present invention, the received pricing schemes may include at least one of supplier site pricing, volume pricing, and/or delivered pricing. In another aspect, the received pricing schemes may include all of supplier site pricing, volume pricing, and delivered pricing. In a further aspect, pricing information entered in the pricing fields may be utilized in a supply chain analysis. In an additional aspect, the selection may be received utilizing a network. In even another aspect, the selection may be received utilizing an icon of the graphical user interface.

Distribution Center Usage

The Least Cost mechanism for estimating usage functions operates in the same manner as in the Bid System. It is comprised of two tabs, the DC/Rest tab is used for estimating restaurant growth by DC, and the Usage tab to estimate same store or item growth. The values from the first tab are used in the Usage tab to determine the projected usage. A more detailed explanation of the usage calculations is included in the section entitled Usage Estimator, below.

FIG. 197 is a depiction of a Projected Restaurant Growth screen 19700. The present invention provides the ability to estimate restaurant growth at two levels. First, by entering a percentage in the 'Total Rest. Growth Amount' 19702, the value will be copied and applied to all of the restaurant growth percentages at each DC. In the example shown in FIG. 197, 5.00% was entered and propagated to each DC. The default value can also be overridden and data entered directly for each individual DC. Several of the fields are described below.

Total Rest. Growth Amount Any value entered will be applied uniformly across all DCs in the current analysis.

Restaurant Growth % The user can override the overall amount at each DC simply by entering an alternate estimate percentage.

Projected Avg. Rest. Count Based on the percentages entered, a projected restaurant count is calculated. The user also has the ability to enter values directly simply by entering an alternate value in the relevant cell. The projected restaurant will be carried over to the 'Usage' tab and will affect the DC's projected usage.

FIG. 198 illustrates a Projected Usage Estimation screen 19800. Several fields of the screen are described below. The projected usage for each DC is calculated based on projected restaurants served, data retrieved from Coordinator Link data and DC/Item Growth (same store growth). This projected usage number will be used by the solver for capacity information and also in output reports.

Item Growth % For each Item in the analysis, the user can enter an overall estimate for same store or item growth. As in the restaurant growth tab this value will be applied uniformly across all DCs.

Usage Period Contract period for this analysis. Used to calculate the length of the contract in order to determine previous and projected usage.

Previous Usage Previous Usage is the sales by cases reported to the Supply Chain Coordinator by each DC through the system Link. These sales are based on a time period that is in conjunction with the 'Usage Period'. This period is computed by taking the most recent date which the Supply Chain Coordinator has received data from all of the DCs and using it as the usage end date. The usage begin date is then computed by going backwards for the length of the proposed contract. For example, in the situation shown in FIG. 198, the length of the contract is 1 year. If the most recent date that all DC data had been received was Mar. 1, 2001 then the previous usage period would be Apr. 1, 2000 to Mar. 1, 2001. This would provide a previous usage for the most recent twelve month period in the system.

Projected Rest. Count The projected restaurant count is the number of restaurants that will be served by a DC for the period of the proposed contract. This number is copied from the DC/Rest tab.

Coverage Factor % The coverage factor percentage is a number devised to correctly calculate the DC's projected usage. Coverage Factor is the percent of total restaurants that this DC has served this product to over the past year. For example, if a DC serves 200 restaurants in one month but only sells this item to 100 of those restaurants then the coverage factor would be 50%. If the item was sold to all 200 restaurants then the coverage factor would be 100%.

Avg. # RM Average number of restaurant months. This figure represents the average number of units sold to a restaurant for this item for any given month. This average is a 12 month rolling average calculated based on the data reported to the Supply Chain Coordinator by the DCs.

DC/Item Growth At the DC level, the user can override the overall growth % by entering an alternate value for the relevant DC.

Projected Usage The actual usage estimate for each Item/DC combination. Initially the projected usage will be calculated based on the following formula:

(Projected Rest. Count*Avg.#RM*Coverage Factor %*DC/Item Growth* Number of Months in Contract)

By editing the DC/Item Growth percentage (or overall Item Growth %), the projected usage can be manipulated to the desired level. The user can also directly edit the projected usage amount which will adjust the DC/Item Growth amount accordingly. Usage estimates calculated by the system are always in cases; hence if the user is entering pricing, volume or capacity constraints in any other unit, these values should be modified appropriately.

Note that the previous usage amount is not used in the calculation of the projected usage amount. It is used as a guide only. In the example shown in FIG. 198, no overall Item growth percentage was used, but chicken patty's were projected to grow by 4.00% at the Ameriserve in Omaha and 5.00% at the Ameriserve in Plymouth.

FIG. 199 is a flowchart of a process 19900 for projecting distribution center usage in a supply chain management framework in accordance with an embodiment of the present invention. A plurality of supply chain distributors are displayed utilizing a graphical user interface in operation 19902. The entry of a growth value is allowed in operation 19904 utilizing the graphical user interface so that a projected parameter amount associated with the supply chain distributors can then be calculated based on the growth value in operation 19906.

In one aspect of the present invention, the growth value may include a restaurant growth percentage. As a further aspect, the projected parameter amount may include a projected restaurant count. In another aspect, the growth value may include an item growth percentage. In a further aspect, the projected parameter amount may include a projected item usage amount. In an additional aspect, the projected parameter includes an editable default value.

Lane Restrictions

In the Least Cost system, the ability is provided to override any solution that the solver determines and force certain lanes. The overrides can be established before the solver runs.

It also a good habit to run a least cost version without any lane restrictions, so that an estimation of the relative cost of forcing or excluding lanes can be readily determined.

FIG. 200 illustrates an Excluding Lanes screen 20000 displayed upon selection of a Lane Restrict tab. In an earlier section, a description of excluding Suppliers and/or FOB points using the "Include" indicator was set forth. This is related to the Lane Restrict tab in that if an FOB point is excluded from an analysis version, the lanes are automatically excluded from that FOB point to each DC. In the example shown in FIG. 200, Cavendish Farms was excluded; hence all lanes from that FOB are marked as excluded. The solver will never receive these lanes as potential choices when determining the least cost. It is also possible to exclude individual lanes from this tab. However, the user cannot include a lane if the FOB point has been excluded on the Capacity tab.

It may also be necessary to ensure that certain lanes are forced regardless of whether the lane assignment will prevent the least cost from begin achieved. FIG. 201 is a depiction of a Forcing Lanes window 20100.

In this example, the "Required" option has been selected for the lane from J. R. Simplots Hermiston FOB to Post Albuquerque. The solver will allocate this lane prior to beginning its optimization calculations, hence ensuring that the remaining lane allocations will still minimize the total cost given the lane requirement.

In a multi-source problem, lanes can still be forced, although without adjusting the supporting input the FOB may also receive another DC. For example, if a user wishes a lane to be forced but not allow the relevant FOB to get another DC, the user can simply make the FOB's maximum the DC's usage.

If the product is being single sourced (1 FOB: 1DC), a lane cannot be forced twice. For example if a user attempted to also force the Lamb FOB to Post Albuquerque, the message screen 20200 shown in FIG. 202 would get the following message.

The third Lane Restriction option is marked as Solver in the previous example, and simply means that the lane is available to the solver as a potential lane in the least cost solution.

The Honor TL Rate boxes 20002 (FIG. 200) are used to specify whether or not the Supplier will Honor Truckload (TL) rates for shipments that are not a Full Truckload. See the section below entitled Optimal Product Routing.

FIG. 203 is a flowchart of a process 20300 for restricting lanes in a supply chain management framework in accordance with an embodiment of the present invention. A plurality of distribution centers of a supply chain are displayed utilizing a graphical user interface in operation 20302. A lane restriction of each of the distribution centers is then designated utilizing the graphical user interface in operation 20304. The distribution centers are then conditionally involved in a supply chain analysis based on the designation in operation 20306.

In one aspect of the present invention, it may be determined whether a supplier site has been excluded from the supply chain analysis so that the lane is involved in the supply chain analysis based on the determination. In another aspect, the lane may be allocated prior to the supply chain analysis upon the lane restriction of the distribution centers being designated as required. In a further aspect, the lane may be excluded during the supply chain analysis upon the lane restriction of the distribution centers being designated as excluded. In event another aspect, the lane may be included during the supply chain analysis upon the lane restriction of the distribution centers being designated as to be solved. In an additional aspect, the designation may be received utilizing a network.

Freight

Freight quotes in the least cost system can either be Truckload or LTL.

FIG. 204 is an illustration of a Truckload Freight window 20400 displayed upon selection of a TL Freight tab. For each DC and FOB in the analysis, an input area 20402 is provided for the Truckload Freight amount. Freight is assumed to be consistent across all items in the analysis. Prior to the solver run, the TL freight amount is converted to a case and/or unit freight rate using the Item/FOB tab cases per truckload, and the Item tab conversion factor. If the usage estimates entered suggest that an RDC rate may be applicable on any of the lanes, a lane from the FOB is automatically added to the relevant RDC to this tab.

Lane Distance: This amount is used in estimating freight competitiveness between the Supplier quote and internal estimates. The present invention automatically populates this column from the Supply System.

Note that omitting a rate for a lane has the same effect as excluding the lane.

FIG. 205 illustrates an LTL Freight page 20500. The Bid system automatically generates an LTL worksheet if it determines that certain lanes have the potential to order LTL. Based on the Usage estimates entered or calculated by the system and the gross weight or cube per case entered on the Item/FOB tab, an identification is made as to which lanes have the potential to order LTL and lanes on the LTL Freight Tab are automatically populated.

In the example shown in FIG. 205, O.K. Foods has quoted LTL rates from their Fort Smith FOB to ProSource Atlanta and Burlington. All quotes are in $CWT (hundred weight), hence the Atlanta rate is $165 ($1.10*150) and the Burlington rate is $400 (The LTL minimum of $400 is not satisfied by the quoted rate of $180 (150*1.2)). The Optimal Product Routing (OPR) process will determine which rate to use based on its estimates of two week usage and compare the basket cost with both TL and RDC rates to determine the optimal routing. The entire OPR is discussed in detail in the section below entitled Optimal Product Routing.

Preferably, as projected usage estimates are adjusted on the Usage tab, rows will be added and deleted to this tab when relevant.

FIG. 206 is a flowchart of a process 20600 for managing freight in a supply chain management framework in accordance with an embodiment of the present invention. A graphical user interface is utilized to display a plurality of distribution centers of a supply chain in operation 20602. Next, in operation 20604, a truckload freight value is received in an input field of the graphical user interface. The truckload freight value is converted in operation 20606 so that a supply chain analysis can then be performed using the converted truckload freight value in operation 20608.

In one aspect of the present invention, a suggested value may be displayed in an output field. In an additional aspect, the suggested value may be received from a supply chain manager utilizing a network. In another aspect, the truckload freight value may be converted to a case value. In a further aspect, the truckload freight value may be converted to a freight rate value. In an additional aspect, the truckload freight value may be received utilizing a network.

Regional Restrictions

FIG. 207 depicts a restriction window 20700. The present invention provides the ability to force DCs in a region to be awarded the same FOB point. In the example shown in FIG. 207, a region is established to combine McCabe's DC in Portland and Restaurants North West DC in Alaska. By selecting the Force FOB option to "Yes", the solver will ensure that both DCs receive the same FOB point.

FIG. 208 is a flowchart of a process 20800 for imposing regional restrictions in a supply chain management framework in accordance with an embodiment of the present invention. A plurality of distribution centers of a supply chain are displayed utilizing a graphical user interface in operation 20802. A free on board (FOB) point associated with a region in which the distribution centers reside is identified in operation 20804. The distribution centers are then forced to use the FOB in response to a user action utilizing the graphical user interface in operation 20806.

In one aspect of the present invention, the user action includes the selection of an icon. In another aspect, the region may be user-defined. In a further aspect, a site role of each of the distribution centers may also be displayed utilizing the graphical user interface. In even another aspect, the graphical user interface may be displayed utilizing a network. In an additional aspect, the graphical user interface may be a browser-based interface.

Optimal Product Routing

One of the major features in the least cost system is the Optimal Product Routing (OPR) feature. Because the present invention can factor Truckload, RDC and LTL lanes into the least cost analysis, the OPR engine will automatically determine the optimal routing prior to passing the data to the solver. OPR is automatically run prior to running the solver, but can also be run at any time using the Routing button 20900 on the toolbar. The Routing button is shown in FIG. 209.

Optimal Product Routing is the process of determining for each lane in an analysis, the lowest cost routing (Full Truckload [TL], LTL, RDC) for the Market Basket of Product. The capability is built directly into the Least Cost system. OPR processing includes determining two-week usage as well as determining available routing information.

Regarding two-week usage, the weight and cube of product shipped during a two-week period determines the possible routing types. Lanes with either a two-week weight of more than the amount specified in the analysis (typically 43,500 lbs.), and a two-week cube of more than 3,000 Cubic Feet will only travel TL. Those with less (non-truckload) may also travel LTL, and in the case of Dry product, may also travel RDC. Two-week weight usage is determined for all lanes included in the current version of the analysis.

When determining available routing information, OPR finds the TL, LTL, and RDC information available for each lane and identifies incomplete or missing Freight information. It is important to gather freight quotes on all applicable routing types. For example, a Supplier may only quote an LTL or RDC freight for a non-truckload lane, yet due to the nature of the load it may cost less to ship the product with a standard truckload rate.

OPR operates under the following assumptions:

Truckload There must be a TL freight amount. Even if available, LTL and RDC rates are not considered.

Non-Truckload Any TL or acceptable LTL routing freight amount will suffice, yet quotes for all routing types are strongly recommended.

Honor Truckload (TL) Rate For lanes that are not a Full Truckload, it is important to distinguish whether or not the Supplier will Honor Truckload (TL) rates. This is specified for each lane in the Lane Restrictions tab.

Consider a lane which costs $1,000 to ship for a product which normally has 1,000 Cases per Truckload. Please refer to Table 29, below. If usage warranted a Full Truckload, the freight per case would be $1 (#1)

Now assume that the two-week usage for this lane is only 500 cases. The $1,000 Supplier quote may imply either of the following:

Example #2. The $1,000 rate is the price to ship the lane, whether it is 5 or 500 cases ($1,000/500=$2 per case).

Example #3. Since the Supplier ships other products to the DC (e.g. other BKC products, products from, other concepts) he assumes that all of his trucks will ship full. The Supplier therefore Honors the TL rates, and even though the two-week usage is only 500 cases, charges a per case freight as if the usage warranted a Full Truckload ($1,000/1,000=$1 per case). In this case, it may be useful to choose Honor TL rates on the Lane Restrictions tab of the Least Cost system.

TABLE 29

| # | Type | Truck Frt | CS/ Truck | 2-week Usage | Freight/ Case | Explanation |
|---|------|-----------|-----------|--------------|---------------|-------------|
| 1 | TL | $1,000 | 1,000 | 1,000 | $1.00 | Frt/CS per Truck |
| 2 | TLMIN | $1,000 | 1,000 | 500 | $2.00 | Frt/Usage |
| 3 | HonorTL | $1,000 | 1,000 | 500 | $1.00 | Frt/CS per Truck |

The status of Lane Freight information can be either Complete, Incomplete, or Optional:

Complete All relevant Freight information is available. OPR can continue.
- Truckload shipments with Truckload rates
- Non-Truckload, Dry shipments with TL, valid LTL, and RDC rates
- Non-Truckload, Refrigerated shipments with TL and LTL rates Incomplete Mandatory Freight information is missing. OPR cannot continue.
- Non-Truckload shipments with only an LTL Minimum rate provided (e.g. an LTL Minimum is provided, without specific weight class rates)
- Non-Truckload shipments with LTL rates provided without an appropriate LTL Minimum
- Non-Truckload shipments with LTL rates provided only for higher weight classes (e.g. A Supplier only provides a 10,001–20,000 lbs. rate for a lane with a 5,000 lb. Usage. This weight will never be satisfied.)

Optional Requested (not mandatory) Freight info is missing. OPR can continue.
- Non-Truckload shipments with some, but not all of the applicable quotes (e.g. Dry shipments consider RDC rates, Refrigerated/Frozen do not)
- Non-Truckload shipments with LTL rates provided for weight classes below the appropriate usage (e.g. A Supplier only provides a 10,001–20,000 LBS. rate for a lane with a 22,000 lb. usage.)

In order to ensure the lowest pricing, Logistics recommends requesting all relevant freight information from Suppliers. OPR will not continue if any lanes are Incomplete. OPR can, however, at user request, continue even though the status of certain lanes are Optional. Realize however, that not requesting freight quotes on all applicable routing types may actually inadvertently place a Supplier at a competitive disadvantage. The Supply Chain Coordinator may award business based on Landed Cost, which includes freight. Performing a Least Cost analysis with missing freight information may yield inappropriate lane awards.

This information is available on the 'Solution Tab' of the Least Cost analysis under 'Optimal Product Routing Reports'. More information on these reports can be found in the following section.

The Least Cost system operates on a Market Basket concept for determining per case/unit and total shipment cost for all routings. It considers all Items shipping on a particular lane in the relevant Unit (Case, Pound, Ounces) on which the analysis is based. For all routing types provided, OPR determines the Total Shipment amount for the entire usage specified, and the Unit Shipment amount required to ship a Unit of product.

Shipment Cost is calculated as follows:
- TL Product is shipped based on a Full Truckload freight quote. The Unit Shipment Cost is the Full Truckload cost/Units Per Truckload.
- TLMIN For shipments smaller than a Full Truckload, it may prove more cost effective to ship the Product via the quoted TL rate. This routing is referred to as a Truckload Min, whereby the shipment has a TL quoted freight with a Minimum Order Quantity (MOQ) specified. The Unit Shipment Cost is the Full Truckload cost/Usage, except in the case of Honor TL Rate, where it is the Full Truckload Cost/Units Per Truckload.
- LTL Product is shipped via an LTL carrier, that specializes in partial shipments. The shipment cost is based on a price per hundred weight, and possibly an overall minimum amount for the entire shipment. An LTL Minimum must be provided along with any LTL information. The Unit Shipment Cost is the Total LTL Shipment Cost/Usage.
- RDC For Dry Products only (excluding Alaska and Hawaii RDC's), the Product is shipped via the appropriate Re-Distribution Center (Prosource or Chicago Consolidated RDC). Unit Shipment cost includes Inbound freight to the appropriate RDC, the RDC markup, and Outbound freight to the DC. When a product is shipped RDC, all shipment amounts assume Full Truckloads.

Optimal Product Routing takes into account all of the available freight routing information and determines the lowest cost method of shipping the Market Basket of product for each lane. In the event of multiple routing types having identical shipment costs, OPR is decided in the following order of preference: TL, TLMIN, LTL, and RDC (Dry shipments only).

Winning routing types are chosen on a lane-by-lane basis. When considering all lanes, however, this may not always be feasible. Certain lanes may be considered an RDC Override, and Optimal Product Routing will determine the best routing excluding the RDC rates for these lanes. Presented below are two examples of this:

Insufficient Usage—This occurs when the total usage is not sufficient to warrant a Full Truckload from the FOB to the respective RDC. For example, assume that OPR determined that FOB1 shall service DC1 and DC2 via the RDC, each with a respective usage weight of 10,000 lbs. The total usage from FOB1 to the RDC (20,000) is not sufficient to fill a truck.

Infeasible Coverage—This occurs when based on the winning load types for each lane a situation exists in which not all DC's can be serviced regardless of which FOB wins the RDC. This scenario is due to a rule that only one FOB can service an RDC for a particular product. For example, consider the following example in which two FOB's each bid on separate Prosource DC's.

TABLE 30

| FOB | LOAD TYPE | DC 1 | DC 2 | DC 3 | DC 4 |
|---|---|---|---|---|---|
| FOB 1 | RDC | Yes | Yes | | |
| FOB 2 | RDC | | | Yes | Yes |

Note that the above is not feasible. There is no FOB that can service all of the DC's via the Prosource RDC.

TABLE 31

| FOB | LOAD TYPE | DC 1 | DC 2 | DC 3 | DC 4 |
|---|---|---|---|---|---|
| FOB 1 | RDC | Yes | Yes | | |
| FOB 2 | RDC | | | Yes | Yes |
| FOB 3 | LTL | Yes | Yes | | |

In this example, however, it is feasible for FOB 2 to win the RDC, with DC 1 and DC 2 being serviced by FOB 3.

As with the Least Cost Analysis, OPR is calculated on a per Unit basis. As a last step, OPR populates a case freight table which is used to create Cost Matrices once an analysis is complete. All of this information is kept in the system for enhanced analysis by the Logistics department.

FIG. 210 illustrates a Report Selection window 21000. Several of the reports that can be selected are set forth below.

Freight Information Provided: At a Market Basket Level, contains Lane Freight Status, 2-week totals (Cases, Weight, Cube) and Freight Provided information for each lane.

LTL Routing Grid By Lane: Displays all LTL information provided with shading to identify missing rates.

Routing Results by Lane: At a Market Basket Level, contains Truckload and Unit Shipment amounts for each of the Load Types provided (TL, LTL, RDC), along with an indication of the Load Types chosen as the Optimal Product Routing winner.

Routing Results by Lane, Item: At an actual Item level, contains Truckload and Unit Shipment amounts for the Load Types chosen for its lowest cost. This Shipment information is used to create Cost Matrices.

Routing Results w/RDC Breakout by Lane: A breakout of the RDC information provided in the Routing Results by Lane, detailing the Inbound, Markup, and Outbound freight amounts.

Routing Results w/RDC Breakout by Lane, Item: A breakout of the RDC information provided in the Routing Results by Lane, Item, detailing the Inbound, Markup, and Outbound freight amounts.

TL Freight Variance Analysis: Compares Truckload Freight rates against Freight Per Mile benchmarks.

TL Freight Variance Analysis, by Case: Compares Truckload Freight rates against predetermined Freight Per Mile benchmarks at a Case Freight level.

FIG. 211 is a flowchart of a process 21100 for product routing in a supply chain management framework in accordance with an embodiment of the present invention. A plurality of lanes of a supply chain are identified in operation 21102. Next, a lowest cost routing scheme is determined for each of the lanes in operation 21104. A supply chain analysis is then performed using the lowest cost routing scheme in operation 21106.

In one aspect of the present invention, the lowest cost routing scheme may be selected from a group of schemes that includes less-than-truckload carriers (LTL), regional distribution centers (RDC), and full truckloads (FL). In another aspect, the lowest cost routing scheme may be determined automatically prior to performing the supply chain analysis. In a further aspect, a report reflecting the supply chain analysis may also be outputted. In an additional aspect, the lanes may be identified utilizing a network. In yet another aspect, results of the supply chain analysis may be outputted utilizing a browser-based interface.

Solving and Reviewing the Solution

Once all the required information has been entered, the problem can be solved from any of the tabs by selecting the Solve button 21200, shown in FIG. 212. The processing time will vary depending on the complexity of the problem and the quantity of the data that is being passed to the solver.

It will pass through the following phases:

Solver Validation: Incomplete analysis data can be saved, but it is not valid to pass that information to the solver. For example, an analysis can be saved without filling in all the pricing, the solver cannot run until it is complete.

Feasibility Check: A preliminary check is run to ensure that the problem definition attempted to be solved is feasible. Infeasible scenarios would include, say, a lane requirement with no relevant freight quote, or Supplier minimums greater then the sum of the Supplier's FOB maximums. A list of exemplary checks are as follows.

Sum of FOB max<Supplier min

Sum of FOB min>Supplier max

DC has Usage but no Freight (e.g. no Freight quote or all Lanes Excluded)

Total Usage>Total Supplier max

Total Usage>Total FOB max

Required Lanes, No Freight

Required Lanes, insufficient Supplier capacity

Required Lanes, insufficient FOB capacity

Valid Lanes, insufficient Usage for Supplier min capacity

Valid Lanes, insufficient Usage for FOB min capacity

DC Usage>Any FOB max

Lane without facility

Optimal Product Routing: First, a determination is made as to whether there is a need to run OPR or not, and if there is the process will run.

Weighted Delivered: The weighted average delivered cost for the basket of products for each lane is calculated. If applicable the optimal freight is included from the OPR process.

Check Solver Availability: Whether licensing allows one or more concurrent users Run the Solver: Invoke the solver engine Insert Results: Grab the results from the solver and update the Supply System.

FIG. 213 illustrates the Report Selection window 21300 which allows selection of the report type. The Report Type menu d7402 lists associated reports.

The report generator for the least cost system operates in the same manner as the report generator in the 'Utilities' menu of the Supply System.

The Least Cost system has several reports available to analyze and view the solution generated by the solver. These reports fall under the following categories.

Awarded Volume: Awarded Volume reports are used to show each FOB/DC combination and it's awarded volumes. These reports can be used for specific items or the market basket. FIG. 214 illustrates a Report Name drop down list 21400 of related reports.

Awarded Volume by Item—Detail Solver solution with a breakout of each lane awarded, the Invoice FOB (and relevant contract FOB), freight and estimated sales.

Awarded Volume by Item—Freight Solver solution with a breakout of the freight costs on each lane, as well as the period and annualized freight totals.

Awarded Volume by Item—Summary Solver solution with Supplier and FOB summary totals only.

Competing DC Freight Analysis by Item A freight analysis between a series of pre-defined "competitive" DCs based on the latest finalized Cost Matrix and the selected version.

Lane Assignment Matrix A lane assignment grid to quickly review the solver solution, FOB capacity constraints and the Contract FOB used.

Lane Weighted Average Delivered Cost A complete lane grid detailing the delivered costs on each lane. For FOBs with volume pricing, the delivered costs are based on the awarded volume to each FOB point.

Comparison Reports: The comparison reports enable a user to compare different versions of an analysis against each other or against the latest finalized cost matrix by item. FIG. 215 illustrates a Report Name drop down list 21500 listing related reports.

Assigned Volume Percentages A FOB comparison of awards and award percentages of overall volume.

Invoice FOB Detail Comparison A DC comparison of invoice price, freight, delivered costs and routing. It also shows weighted average and summary totals.

Invoice FOB Savings Comparison An overall comparison of invoice price, weighted average freight and delivered costs and summary totals. When compared with a Cost Matrix it will calculate the savings estimate between the matrix and the versions selected.

Cost Matrix Preview: The cost matrix preview report enables the user to preview the cost matrix that would be created from the selected analysis version, before it is actually created in the Supply System. Running this report will show the user all of the DC/FOB combinations and the costs associated with them. The user can also preview the cost matrices from the "Cost" toolbar option.

Optimal Product Routing: OPR reports are used to view the results of the OPR processing. Here the user can check information entered and also the information that OPR has generated. Reports include an OPR by item and OPR by lane report. For a full explanation of the OPR reports, see the earlier section entitled Optimal Product Routing.

Tab Reports: The tab reports will generate reports designed for specific tabs. Here the user can also generate a report for each tab within the least cost analysis. Use this option to view a report of all information for an analysis.

Note that data on individual tabs can be printed using the print option on the toolbar for that specific tab.

The present invention also allows a user to retrieve Comparison Reports. The example below will retrieve the 'Invoice FOB Comparison Report (no conversion)'. Note that the term "conversion" refers to whether the report should show the price information in the analysis units (ex: pounds, pours) or convert the price information to cases. If the analysis was performed in cases, then with and without conversion will be the same.

First, the 'Comparison Reports' report type is selected from the Report Type drop down list. After selecting the Comparison Reports report type the Report Name should appear as shown in the Report Selection window 21000 of FIG. 216. Next, the report is selected from the Report name drop down. In this example, 'Invoice FOB Detail Comparison (no conversion)' is selected from the report name drop down list 21700. See FIG. 217.

Upon selection of the report name, the appropriate parameter entry fields 21800, shown in FIG. 218, are enabled in the lower portion of the screen. As shown in FIG. 218, this report allows selection of an item, multiple versions of the current analysis (using CTRL+Click), and whether to include the latest finalized cost matrix for the current item in the comparison.

In the example above, for HASH BROWNS, the solution for two versions and the latest finalized cost matrix will be compared.

After the correct parameters have been chosen, the report can be prepared for output to the user. Clicking on the 'Retrieve' button 21900 on the toolbar will retrieve this report and open a window so the user can view or print the data. A Retrieve button is shown in FIG. 219.

The process is the same for any report a user wishes to view. The only difference is the parameters that can be selected.

FIG. 220 is a flowchart of a process 22000 for comparison reporting in a supply chain management framework in accordance with an embodiment of the present invention. A plurality of supply chain analyses are selected in operation 22002. Results of the selected supply chain analyses are located in operation 22004. The results of the supply chain analyses are then compared in operation 22006 and a report on the comparison is generated in operation 22008.

In one aspect, each of the supply chain analyses may include a separate version of a single supply chain analysis. In another aspect, the results may include cost information. In a further aspect, the supply chain analyses may be selected utilizing a network. In such an aspect, the supply chain analyses may be selected utilizing TCP/IP protocol.

Creating the Cost Matrices

Since the solver input, routing and solutions are already stored in the system, to generate cost matrices, the user simply has to identify the version from which he or she wishes to create the matrices and select the Cost button 22100 on the toolbar. FIG. 221 illustrates a Cost button.

FIG. 222 is a depiction of a Cost Matrix Creation window 22200 displayed upon selection of the Cost button. The present invention provides two options at this point: the matrices can be created, or a preview of them can be generated and output before creation.

Preview button: allows the user to preview the exact information that will be inserted if a decision is made to create the matrices.

Create Cost button: creates all Cost matrices based on the solution for the current version.

If the system detects any matrices in the system which cause a conflict, a list of those matrices is output. Preferably, the user can only overwrite an existing matrix if the dates are the same as in the analysis and the existing matrix has not been finalized. The matrix that is created by the least cost system can be edited as normal and is created unfinalized.

The present invention automatically generates both inbound and outbound RDC lanes to ProSource and Chicago Consolidated when the user inputs a command to create or preview the cost matrices.

In a preferred embodiment, the solver is designed to restrict each RDC to have only one FOB point. Hence the cost matrix will generate one inbound lane to either RDC and automatically populate the outbound lanes with the relevant Contract and Invoice FOB based on the landed cost to the RDC plus markup and the relevant outbound freight.

If volume pricing is used, the sum of the awards across all RDC lanes that the solver selects can be used to determine the relevant price.

Usage Estimator

The Bid Proposal and Least Cost systems both have a Usage Estimator module which provides a sophisticated mechanism for projecting product case usage by DC for a particular period. The Usage Estimator takes into account for each DC the following:

Projected Average Restaurant Count
Previous Usage (Average Units sold per Restaurant)
Product Growth
Coverage Factor The Usage Estimator is made up of two pieces, DC/Restaurant Information (DC/Rest) and Usage information (Usage). In order to determine the projected product case usage, the system must first calculate the Projected Average Restaurant Count, so the DC/Restaurant portion of the Usage Estimator will be discussed first.

Regarding the DC/Restaurant Information, a Current Restaurant Count is provided monthly by the DC's in the form of Distributor Reported Landed Cost. This information, verified by Finance for Patronage Dividend purposes, provides an accurate monthly snapshot of Restaurant counts by DC. The Usage Estimator uses the most current month of information available for each DC.

Also provided with the DC/Restaurant Information is a Restaurant Growth Percent (Average) report which specifies the overall average increase/decrease in restaurant coverage that each DC will experience for the length of the Contract Period in question. Consider the following example: A DC currently services 100 Restaurants. At the end of the 1-year pricing, the DC will be servicing 110 Restaurants. The Projected Average Restaurant Count would be (110–100)/2=105. The Restaurant Growth Percent in this case is (105–100)/100, or 5%.

The Usage Information provided includes Previous Case Usage. This includes the actual number of cases sold by this DC during the previous period. Each month, the Supply Chain Coordinator receives Product Sales statistics from each of the DC's. This information contains case sales of each Distributor's Item, along with the number of Restaurants that product was sold to during the month. The Previous Case Usage number itself is not used directly to calculate Projected Usage, as it would not allow manipulation of DC Served information. This information is available under Sales/Inv—Distributor Sales from within the Supply System.

Previous Period usage information is determined by the latest information available from the DC's. For example, assume that on December 1, a Bid for a Contract Period from January to June will be completed. At this point, the system would have probably only received complete DC information through October. Since the Contract Period is 6 months, the Previous Case Usage would report usage for the latest 6-month period of DC Sales information (May thru October). This is considered the Previous Period.

The Average Units sold per Restaurant Month includes the average number of cases per month of product sold by a DC to the Restaurants it services, for those restaurants that receive product during the month. Remember, not all Restaurants will receive each product during each month. This figure, unlike the Previous Period information, is based on the latest complete 12-month rolling average of DC Sales information.

A Projected Average Restaurant Count is calculated by multiplying the Current Restaurant Count by the Average Restaurant Growth Percent. This number is manipulated on the DC/Rest tab.

A Product Growth Percent can also be calculated. The Usage Estimator allows the user to effect Projected Usage via a Product Growth Percent. For example, BKC may estimate a 5% jump in sales for a particular product during the length of the Contract Period due to national promotions, product mix changes, etc.

The Usage Estimator takes into account the fact that a particular Item is not necessarily sold to all Restaurants that a DC services. Some items are purchaser's options, others such as sausage patties, come in different sizes. Even an Item such as the Whopper will not be sold to 100% of a DC's Restaurants each month due to mid-month store openings and closings. Coverage Factor is calculated by dividing the number of Restaurants a Product was sold to by Restaurant Count during that Period. For example, if a DC Services 100 Restaurants during a month and sold SAUSAGE 1.5 PATTIES to 50 of them, this Item would have a Coverage Factor of 50/100 or 50%. Because of the difficulty of collecting each Invoice a Restaurant receives, the DC's provide a monthly report of the number of cases sold and the number of Restaurants the product was sold to.

To illustrate, consider the following:

TABLE 32

| Restaurants Served | | | Product Sales Per Restaurant | | | | | | |
|---|---|---|---|---|---|---|---|---|---|
| A Current Rest Count | B Rest Growth (Average) | C Proj. Avg Rest Count (A * B) | D Avg Units Per Month | E Product Growth | F Proj Avg Units/ Month | G Number of Months | H Proj. Units Per Rest (F * G) | I Coverage Factor | Projected Usage (C * H * I) |
| 100 | 10% | 110 | 150 | 10% | 165 | 12 | 1,980 | 95% | 206,910 |

Remember, Projected Usage is comprised of the following:

Projected Average Restaurant Count
Projected Average Units (Previous Usage [Average Units sold per Restaurant]
*Product Growth)

Coverage Factor

Realize that zero growth will still give a higher Projected Usage. It's important to remember that the Previous usage is based on a changing Restaurant base. For example, assume that a DC last year started with 100 Restaurants and ended up with 110, and that the Average Units Per Month was 10. This DC would have sold an average of 1050 units per month (the Average Restaurant Count is 105). Notice that even if no Restaurant or Sales growth occurs the next year, the Projected Usage will be higher than 1050, because of the fact that there are 110 Restaurants at the start (110*10=1100).

The process of estimating usage is user-friendly, providing DC level information, with user-input adjustments for Restaurant and Product Growth.

Landed Cost/Restaurant Count information includes:
Case Sales by Distributor/DC
Landed Cost by Distributor/DC
Restaurant Counts by Distributor/DC
Product Counts by Distributor/DC
Average Landed Cost Per Case
Average Cases Per Restaurant
Average Landed Cost Per Restaurant
Sales reported for Items not in the Product File
Inventory reported for Items not in the Product File
Percentage Growth by DC—Product Sales
Percentage Growth by DC—Landed Cost
Percentage Growth by DC—Restaurant Base
Percentage Growth—Product Count
Percentage Growth by DC—Product Count Each Distributor references a system Item by it's own Distributor Item and Distributor Item Description. For example, a Whopper can be referred to as "BEEF-WHOPPER 4.0 OZ", while another company calls it "WHOPPER", and a third company calls it "WHOPPER CS/144EA". Cross-referencing, or matching system items with each of the Distributors', is what allows a user to view inventory or sales for the Whopper without knowing the Distributor's naming conventions.

In some cases, a Distributor may have more than one Item (SKU) for a particular system Item. A slight packaging change may cause the Distributor to create 2 SKU's for what could otherwise be considered one system Item.

For example, a DC that services 100 Restaurants changes SKU's mid-month and reports selling 1000 cases of the first SKU to half of its Restaurants, and 1000 cases of the second SKU to the other half. Average Units sold per Restaurant Month in this case, would be the number of Items sold (2000) divided by the Restaurant Count (100), or 20.

A Distributor may not always change an SKU. They may consider CUP-PROMO a catch all even though there is a separate Item for each CUP promotion.

Each time the Usage Estimator is used, the following should be verified:
- Appropriate DC's are accounted for in Previous Case Usage
- DC Items appear to be properly Cross-Referenced
- Reasonableness of DC Sales Monthly Detail information for this Item (Sales/Inv—Direct to Restaurant)
- Previous Case Usage and Average Units sold per Restaurant are reasonable and consistent
- DC Sales information coincides with Supplier Sales for the Item (taking timing and DC inventory into account).

Beef Formula Pricing System Example

The Formula Pricing System of the present invention allows quick and easy calculation of the weekly meat block cost for all suppliers.

A new Formula Pricing can be created in either of two ways. The first one is to build a Formula Pricing from scratch. The second method uses the "Sew Using Previous" feature, which will create an entire copy of a previous Formula Pricing and allow a user to make the necessary modifications.

FIG. 223 illustrates the Formula Pricing submenu 22300 of the Supply drop down menu. To create a new Formula Pricing, select Edit/View to open an existing Formula Pricing or create a new one. After selecting the Edit/View menu option, the standard query screen is displayed. Select New.

To use the New Using Previous feature, select New (Using Previous) from the Formula Pricing submenu to copy an existing Formula Pricing into a new one. A complete copy of a previous Formula Pricing can be made by selecting this option.

FIG. 224 illustrates a Formula Pricing window 22400. As shown in FIG. 224, the Formula Pricing window is made up of several different tabs. The labels identify these tabs across the top of the window. Examples of these tabs are 'Pricing', 'Formulas' and 'Block Cost'.

The first tab visible on the Formula Pricing window when it is opened is the 'General Info' tab, which shows pricing description, item, date ranges and Adjustment amount. This tab is where general information for this Formula Pricing is entered. The fields of the General Info page include:
Pricing ID: Unique identifier for this Pricing. Generated by the Supply System. Non editable.
Description: Unique name for this Pricing. It should representative of the type of Formula Pricing being completed, and will be the primary method of identifying and retrieving the Pricing later.
Item: Item whose Price is being calculated. After the Pricing information is saved this field is grayed out, becoming non-editable.
Raw Material Pricing Date: The Coordinator/Supply System calculates this date but it may be changed. The system will pick up the last Monday used for the chosen item and calculate the next Monday. After entering this date or accepting the system generated one, the Formula Pricing date range is calculated as follows: The To Date is calculated subtracting 3 days from Raw Material Pricing Date (Monday) which will give a Friday. Then 11 days are subtracted from this date to calculate the From date (Friday). This date calculation may be changed by the IS Development staff.
Cost Matrix Begin Date (and End Date): Cost Matrix Date period associated to this item Formula Pricing.
FOB Adjustment Amount: Upcharge or downcharge applied to formula calculation.

FIG. 225 depicts the page 22500 displayed upon selecting the Pricing Tab. After entering all of the information on 'General Info' tab, the user will be now be able to move to the next tab 'Pricing'. This tab is used to enter the prices of the raw materials for the Formula Pricing period.

The Date column includes the period dates excluding weekends. These dates can be modified. If the date exist in a previous pricing, the message window 22600 shown in FIG. 226 will pop up. If the user answers yes, the prices for that date will be inserted into the current Formula Pricing.

If there are more than one pricing with the same date, the message window 22700 shown in FIG. 227 will appear. If the user answers yes, a selection window 22800, depicted in FIG. 228, will appear to allow selection of the pricing data that the user wants to copy over the current pricing.

Some of the raw materials price is calculated based on other materials. The following is an illustrative list of these materials with their formulas.

Fresh Domestic 73% Trim:

(Fresh Domestic 75% Trim/75)×73

Fresh Domestic 80% Lean:

(Fresh Domestic 85% Trim/85)×80

Fresh Domestic 90% Lean:

(Fresh Domestic 90% Lean Blue+Fresh Domestic 90% Lean Yellow)/2

Lean Finely Textured Beef:

(Fresh Domestic 90% Lean×0.80 (or 0.82))

FIG. 229 is an illustration of the page 22900 displayed upon selection of the Freight Tab. The Freight tab shows the freight amount that will be added to raw material per Supplier FOB. Preferably, the Freight tab is display only.

FIG. 230 is a depiction of the page 23000 displayed upon selection of the Formulas Tab. This tab is also display only and it will show the different formula values for each supplier. The columns of the Formulas Tab page include:
Formula: Generic name of the formula, which include an acronym for the supplier's name and a number.
Pct.: Percentage of raw material used in the formula.
Cost: Cost of raw material based on percentage (Price+Freight).
Total: Sum of all the costs in formula.

Formula Descriptions

The following Table describes illustrative formulas. The freight amount, if any, is added to each raw material average market quote.

TABLE 33

Company A Food Service:

| Raw Material | Percentage |
| --- | --- |
| Fresh Domestic 50% Trim | 31.200% |
| Fresh Domestic 90% Lean | 18.800% |
| Imported Australian 90% Lean | 40.000% |
| Lean Finely Textured Beef | 10.000% |

FIG. 231 illustrates the page 23100 displayed upon selection of the Block Cost Tab. The Block Cost tab creates the FOB price based on the previous tab calculations and the yield and margin. The columns displayed include:

Formula: Formula short name (supplier).

Raw Material Cost: Total amount from previous tab.

Yield: Processing yield (inverse shrinkage). For example on AFS-1 there is a 0.01 loss of material.

Block Cost: Calculated field. Raw Material Cost/Yield.

Margin: Supplier's markup.

FOB Price: Sum of Block Cost and Margin.

Include?: Specifies if the formula price will be used.

FIG. 232 is a depiction of the page 23200 displayed upon selection of the Adjustments Tab. The final FOB Price may be modified using the Adjustments tab. The toolbar icons 23300, 23302 shown in FIG. 233 are used to insert or delete adjustments.

After the Formula Pricing is completed the user can print the Raw Material Letter which describes the prices of the raw materials for the different suppliers of the current Formula Pricing. To retrieve the Raw Material Letter, the RM Letter icon 23400 is selected. See FIG. 234.

FIG. 235 illustrates the Formula Maintenance window 23500 that is used to modify or add new formulas. To open the Formula Maintenance window, the Formula Maintenance menu item 23600 is selected from the Formula Pricing submenu, as shown in FIG. 236.

The top portion of this window shows the formula's main information, including:

Formula ID: Unique identifier for each formula. Generated by the Supply System. Non editable.

Facility: FOB for each formula.

Description: Formula's unique name.

Short Name: Unique code for each formula. Used as a label in Formula Pricing main window.

The bottom portion of the window displays detailed information of the selected formula from the top.

Material Type: Raw materials used in the selected formula.

Begin Date: Starting date of formula percentage.

Percentage: Amount of raw material used to create a finished item. The sum of the percentage must total 100.

In Summary

The new technological infrastructure and its associated electronic reporting and feedback systems equips retailer management with accurate, timely, and previously unavailable information from the Supply Chain on sales, marketing and other performance indicators allow Supply Chain management to fully engage in managing supply and distribution processes and channels toward identified and agreed strategic objectives provide franchisees and retailers with the Supply Chain information they need to operate efficiently and make effective management decisions minimally impacts the resources of Supply Chain management With Supply Chain management assuming full responsibility for managing the fundamentals of the Supply Chain system, Supply Chain participants are strategically positioned to focus on the six business priorities that have been identified: operational excellence, boosting sales growth, focusing resources, discovering the essence of the Brand, image transformation and revitalizing franchisee relations.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for managing an independent supply chain, comprising:

in a supply chain comprising independent suppliers, independent distributors, independent stores, and an independent supply chain manager with an independent supply chain manager computer connected together by a network, the independent supply chain manager negotiating on behalf of the independent stores and/or the independent distributors supplier master contracts with the independent suppliers, wherein each different supplier master contract is to supply at least one item to a set of the independent distributors and/or independent stores, and negotiating on behalf of the independent stores distributor master contracts with the independent distributors, wherein each of the distributor master contracts requires the distributor to receive items from at least one of the independent suppliers and to distribute the items to a set of the independent stores, wherein each of a plurality of the supplier master contracts includes a term assigning a particular set of the independent distributors to the independent supplier to which to supply the at least one item, wherein each of a plurality of the supplier master contracts sets at least one contract price for at least one item to be supplied to the particular set of independent distributors, wherein each of a plurality of the distributor master contracts includes a term assigning a particular set of the independent stores to the independent distributor to which to distribute the at least one item, and wherein the independent supply chain manager negotiates a mark-up on the at least one item to be distributed to the independent stores;

storing a plurality of terms of the supplier and distributor master contracts in a supply chain electronic database accessible via the network;

registering each of a plurality of the independent suppliers, the independent distributors and the independent stores as one of at least three types comprising suppliers, distributors and stores, assigning to each of the plurality a unique identifier based on their user type, and maintaining a list of registered users in the independent supply chain manager computer;

receiving store sales data from a plurality of the independent stores utilizing the network, the store sales data comprising the sales of goods by the independent stores, wherein the sales of the goods are made independently of the network;

receiving data from the independent suppliers and/or the independent distributors utilizing the network, the data relating to the sales of the items from the independent suppliers to the independent distributors;

receiving distributor sales data from a plurality of the independent distributors and/or independent stores relating to the sales of the items from the distributors to the independent stores utilizing the network;

electronically translating the sales data of individual goods to items that are components of the goods based on a formula or recipe;

electronically determining an actual landed cost for one of the items based at least in part on the distributor sales data;

electronically determining if the actual landed cost for the one item complies with the mark-up negotiated in the master contract by the independent supply chain manager with the independent distributor;

generating an alert if there is non-compliance with the negotiated mark-up;

electronically determining if the price for one of the items supplied to one of the independent distributors matches the contract price in the supplier master contract with the independent supplier for that item;

generating an alert if there is not a match with the contract price for the item in the supplier master contract;

providing an interface on the network to allow access by a registered user on the list to different data in the supply chain electronic database depending on the user type, wherein each of a plurality of the registered users that are independent suppliers or independent distributors has access to the sales data for the stores that they supply either directly or indirectly under at least one of the supplier and distributor master contracts.

2. The method as defined in claim 1, further comprising electronically calculating an actual cost of the individual goods to the independent stores based at least in part on the distributor sales data to an individual store and an ideal cost determined at least in part from a cost of the items used in the formula or recipe to create the goods; and electronically making this actual cost and ideal cost available to selected supply chain participants based on the unique identifier.

3. The method as defined in claim 1, further comprising:
electronically receiving a request from a user for access to the supply chain electronic database utilizing a first web-page, wherein the request includes the unique identifier, and wherein the supply chain electronic database is updated to reflect current information on at least a weekly basis;

electronically identifying the user as a registered user and determining whether the registered user is one of the independent stores, independent distributors or independent suppliers using the unique identifier;

electronically providing a second web-page if the user is identified as one of the independent stores, a third web-page if the user is identified as one of the independent distributors, and a fourth web-page if the user is identified as one of the independent suppliers, wherein each of the second web page, the third web page, and the fourth web page will extract and display at least some different data from the supply chain electronic database based on the unique identifier that will not be made available on the other web pages.

4. The method as defined in claim 1, further comprising allowing electronic access to the store sales data via the network to a plurality of independent equipment suppliers that sell equipment used in the production of the goods; and allowing each of the independent equipment suppliers to make an unsolicited offer to sell equipment to one of the independent stores based on the sales data for that independent store, wherein the offer is not made in response to an auction.

5. The method as defined in claim 4, further comprising determining a charge for access to the independent store sales data by each of the independent equipment suppliers.

6. The method as defined in claim 1, further comprising:
for a goods promotion to independent store customers, the supply chain manager computer automatically obtaining in mid-promotion store sales data from a set of the independent stores;

the supply chain manager computer using sampling to determine based on this mid-promotion store sales data predicted sales for the remainder of the promotion for a group of the independent stores that include at least one independent store that did not supply store sales data; and generating a communication or making accessible via the network to at least one of the supply chain participants data based on the predicted sales for the group of the independent stores.

7. The method as defined in claim 6, further comprising automatically generating an electronic order form based on the predicted sales for ordering items from one of the independent distributors or one of the independent suppliers; and automatically electronically communicating the electronic order form.

8. The method as defined in claim 1, further comprising grouping data from independent stores by a store characteristic other than a region and determining benchmark data for independent stores with that characteristic;

electronically comparing the benchmark data to the data for one of the independent stores having that characteristic to obtain comparison data; and generating a communication or providing electronic access via the network to the comparison data to one of the supply chain participants.

9. The method as defined in claim 1, further comprising providing via the interface on the network a usage estimator for determining for one of the independent distributors or independent suppliers usage of items by the independent stores that it is assigned directly or indirectly under at least one of the supplier and distributor master contracts.

10. The method as defined in claim 9, wherein the usage indicator includes an interface to input a growth amount, and calculates usage based in part on an independent store coverage factor and this growth amount.

11. The method as defined in claim 1, further comprising the supply chain manager computer determining an aspect of supplier performance by receiving an inventory level for an item at one of the independent suppliers that is to be provided to one of the independent distributors under one of the supplier and distributor master contracts; and electronically comparing the inventory level of the one independent supplier for the item to an inventory level of the item at least at one other of the independent suppliers.

12. The method as defined in claim 1, further comprising the supply chain manager computer electronically facilitating the provision utilizing the network of an electronic catalog for the sale of items to the independent stores that includes an electronic order form, wherein the electronic catalog displays items from a plurality of sellers.

13. The method as defined in claim 1, further comprising electronically identifying at least one item to be distributed to at least one of the independent stores;
associating a cost model with the item;
determining a time frame during which the cost model is to be valid; and
electronically performing the cost model for use to identify a supplier of the item.

14. The method as defined in claim 12, wherein a plurality of cost models are performed to identify the supplier of the item.

15. The method as defined in claim 1, comprising
the supply chain manager computer forecasting aggregated future sales of a grouping of the independent stores utilizing the store sales data for selected ones of the independent stores; and
the supply chain manager computer providing electronic access utilizing the network to the aggregated future sales of the grouping of the independent stores to at least one independent distributor or at least one independent supplier aligned directly or indirectly with that grouping of independent stores under at least one of the master contracts.

16. The method as defined in claim 15, wherein the forecasting aggregated future sales of a grouping step comprises the supply chain manager computer parsing the store sales data based on the set of independent stores assigned to a particular one of the independent distributors.

17. The method as defined in claim 15, wherein the forecasting aggregated future sales of a grouping step comprises the supply chain manager computer parsing the store sales data based on the set of the independent distributors assigned to a particular one of the independent suppliers.

18. The method as defined in claim 15, further comprising generating an electronic order form based on the forecast of aggregated future sales for ordering items from one of the independent distributors or one of the independent suppliers; and
electronically communicating the electronic order form.

19. The method as defined in claim 18, further comprising including in the electronic order form a request to a recipient of the electronic order form to send a confirmation of receipt to a sender of the electronic order form before providing fulfillment of the electronic order form; and
generating an alert if the confirmation is not received by the supply chain manager computer.

20. The method as defined in claim 18, wherein the generating an electronic order form step comprises electronically associating the electronic order form with an item utilizing a web page; and
electronically preventing the item from being associated with more than one electronic order form.

21. The method as defined in claim 3, further comprising allowing entry of a growth value into a field in one of the web pages; and
electronically calculating a projected parameter associated with one of the supply chain participants based at least in part on the growth value.

22. The method as defined in claim 1, further comprising electronically linking each of a plurality of the supply chain participants to at least one group based on the unique identifier of the supply chain participant and a characteristic of the supply chain participant; and
automatically providing to different groups electronic access to different data.

23. The method as defined in claim 22, wherein one of the groups comprises peers, and members in the one group of peers may access to aggregated data from their peer group.

24. The method as defined in claim 1, further comprising electronically performing at least one least cost analysis algorithm that includes parameters of a supplier minimum capacity requirement and a supplier maximum capacity; and
selecting at least one supplier based in part on results of the performing the least cost analysis for negotiation of one of the master supply contracts.

25. The method as defined in claim 24, wherein one of the independent suppliers is excluded from one performance of the least cost algorithm step.

26. The method as defined in claim 24, wherein freight cost is one of the parameters of the least cost algorithm; and wherein the least cost algorithm is utilized to determine an optimal product routing.

27. The method as defined in claim 1, wherein the independent stores are electronics and appliances independent stores, the independent distributors are electronics and appliances independent distributors and the independent suppliers are electronics and appliances independent suppliers.

28. The method as defined in claim 1, wherein the independent stores are health and personal care outlets, the independent distributors are health and personal care products independent distributors and the independent suppliers are health and personal care products independent suppliers.

29. The method as defined in claim 1, wherein the independent stores are transportation equipment outlets, the independent distributors are transportation equipment independent distributors and the independent suppliers are transportation equipment independent suppliers.

30. The method as defined in claim 1, wherein the independent stores are home products outlets, the independent distributors are home products independent distributors and the independent suppliers are home products independent suppliers.

31. The method as defined in claim 1, wherein the independent stores are food and beverage outlets, the independent distributors are food and beverage independent distributors and the independent suppliers are food and beverage independent suppliers.

32. The method as defined in claim 1, wherein the independent stores are machinery outlets, the independent distributors are machinery independent distributors and the independent suppliers are machinery independent suppliers.

33. The method as defined in claim 1, wherein the independent stores are sporting goods outlets, the independent distributors are sporting goods independent distributors and the independent suppliers are sporting goods independent suppliers.

34. The method as defined in claim 1, wherein the independent stores are chemicals outlets, the independent distributors are chemicals independent distributors and the independent suppliers are chemicals independent suppliers.

35. The method as defined in claim 1, wherein the independent stores are department store outlets, the independent distributors are department store independent distributors and the independent suppliers are department store independent suppliers.

36. The method as defined in claim 1, wherein the independent stores are office products outlets, the independent distributors are office products independent distributors and the independent suppliers are office products independent suppliers.

37. The method as defined in claim 1, wherein the independent stores are gas station outlets, the independent distributors are gas station independent distributors and the independent suppliers are gas station independent suppliers.

38. The method as defined in claim 1, wherein the independent stores are convenience store outlets, the independent distributors are convenience store independent distributors and the independent suppliers are convenience store independent suppliers.

39. The method as defined in claim 1, wherein the independent stores are entertainment media outlets, the independent distributors are entertainment media independent distributors and the independent suppliers are entertainment media independent suppliers.

40. The method as defined in claim 1, wherein the independent stores are accommodation outlets, the independent distributors are accommodation independent distributors and the independent suppliers are accommodation independent suppliers.

41. A system for managing an independent supply chain, comprising independent suppliers, independent distributors, independent stores, and an independent supply chain manager with an independent supply chain manager computer connected together by a network, comprising:
a storage medium including a supply chain electronic database accessible via the network storing supplier master contracts with the independent suppliers, the supplier master contracts negotiated by the independent supply chain manager on behalf of the independent stores and/or the independent distributors, wherein each different supplier master contract is to supply at least one item to a set of the independent distributors and/or independent stores, and storing distributor master contracts with the independent distributors, the distributor master contracts negotiated by the independent supply chain manager on behalf of the independent stores, wherein each of the distributor master contracts requires the distributor to receive items from at least one of the independent suppliers and to distribute the items to a set of the independent stores, wherein each of a plurality of the supplier master contracts includes a term assigning a particular set of the independent distributors to the independent supplier to which to supply the at least one item, wherein each of a plurality of the supplier master contracts sets at least one contract price for at least one item to be supplied to the particular set of independent distributors, wherein each of a plurality of the distributor master contracts includes a term assigning a particular set of the independent stores to the independent distributor to which to distribute the at least one item, and wherein the independent supply chain manager negotiates a mark-up on the at least one item to be distributed to the independent stores;
a set of processors for implementing the independent supply chain computer that use the storage medium and include among them the following logic elements logic for accessing a plurality of terms of the supplier and distributor master contracts in the supply chain electronic database via the network;
logic for registering each of a plurality of the independent suppliers, the independent distributors and the independent stores as one of at least three types comprising suppliers, distributors and stores, assigning to each of the plurality a unique identifier based on their user type, and maintaining a list of registered users in the independent supply chain manager computer;
logic for receiving store sales data from a plurality of the independent stores utilizing the network, the store sales data comprising the sales of goods by the independent stores, wherein the sales of the goods are made independently of the network;
logic for receiving data from the independent suppliers and/or the independent distributors utilizing the network, the data relating to the sales of the items from the independent suppliers to the independent distributors;
logic for receiving distributor sales data from a plurality of the independent distributors and/or independent stores relating to the sales of the items from the distributors to the independent stores utilizing the network;
logic for electronically translating the sales data of individual goods to items that are components of the goods based on a formula or recipe;
logic for electronically determining an actual landed cost for one of the items based at least in part on the distributor sales data;
logic for electronically determining if the actual landed cost for the one item complies with the mark-up negotiated in the master contract by the independent supply chain manager with the independent distributor;
logic for generating an alert if there is non-compliance with the negotiated mark-up;
logic for electronically determining if the price for one of the items supplied to one of the independent distributors matches the contract price in the supplier master contract with the independent supplier for that item;
logic for generating an alert if there is not a match with the contract price for the item in the supplier master contract;
logic for providing an interface on the network to allow access by a registered user on the list to different data in the supply chain electronic database depending on the user type, wherein each of a plurality of the registered users that are independent suppliers or independent distributors has access to the sales data for the stores that they supply either directly or indirectly under at least one of the supplier and distributor master contracts.

42. A computer program product for managing an independent supply chain comprising independent suppliers, independent distributors, independent stores, and an independent supply chain manager with an independent supply chain manager computer connected together by a network, comprising:
a set of computer usable media having computer readable program code embodied among them to be executed by a computer, the computer readable program code comprising
computer code for electronically accessing in a supply chain electronic database via the network stored supplier master contracts with the independent suppliers, the supplier master contracts negotiated by the independent supply chain manager on behalf of the independent stores and/or the independent distributors, wherein each different supplier master contract is to supply at least one item to a set of the independent distributors and/or independent stores, and computer code for electronically accessing in the supply chain electronic database via the network stored distributor master contracts with the independent distributors, the distributor master contracts negotiated by the supply chain manager on behalf of the independent stores, wherein each of the distributor master contracts requires the distributor to receive items from at least one of the independent suppliers and to distribute the items to a set of the independent stores, wherein each of a plurality of the supplier master contracts includes a term assigning a particular set of the independent distributors to the independent supplier to which to supply the at least one item, wherein each of a plurality of supplier master contracts sets at least one contract price for at least one item to be supplied to the particular set of independent distributors, wherein each of a plurality of the distributor master contracts includes a term assigning a particular set of the independent stores to the independent distributor to which to distribute the at least one item, and wherein the independent supply chain manager negotiates a mark-up on the at least one item to be distributed to the independent stores;

computer code for registering each of a plurality of the independent suppliers, the independent distributors and the independent stores as one of at least three types comprising suppliers, distributors and stores, assigning to each of the plurality a unique identifier based on their user type, and maintaining a list of registered users in the independent supply chain manager computer;

computer code for receiving store sales data from a plurality of the independent stores utilizing the network, the store sales data comprising the sales of goods by the independent stores, wherein the sales of the goods are made independently of the network;

computer code for receiving data from the independent suppliers and/or the independent distributors utilizing the network, the data relating to the sales of the items from the independent suppliers to the independent distributors;

computer code for receiving distributor sales data from a plurality of the independent distributors and/or independent stores relating to the sales of the items from the distributors to the independent stores utilizing the network;

computer code for electronically translating the sales data of individual goods to items that are components of the goods based on a formula or recipe;

computer code for electronically determining an actual landed cost for one of the items based at least in part on the distributor sales data;

computer code for electronically determining if the actual landed cost for the one item complies with the mark-up negotiated in the master contract by the independent supply chain manager with the independent distributor;

computer code for generating an alert if there is non-compliance with the negotiated mark-up;

computer code for electronically determining if the price for one of the items supplied to one of the independent distributors matches the contract price in the supplier master contract with the independent supplier for that item;

computer code for generating an alert if there is not a match with the contract price for the item in the supplier master contract;

computer code for providing an interface on the network to allow access by a registered user on the list to different data in the supply chain electronic database depending on the user type, wherein each of a plurality of the registered users that are independent suppliers or independent distributors has access to the sales data for the stores that they supply either directly or indirectly under at least one of the supplier and distributor master contracts.

* * * * *